US011225493B2

(12) United States Patent
Lou et al.

(10) Patent No.: US 11,225,493 B2

(45) Date of Patent: Jan. 18, 2022

(54) IMMUNOPROTEASOME INHIBITORS

(71) Applicant: Principia Biopharma Inc., South San Francisco, CA (US)

(72) Inventors: Yan Lou, Pleasanton, CA (US); Timothy Duncan Owens, Redwood City, CA (US); Kenneth Albert Brameld, Menlo Park, CA (US); David Michael Goldstein, Redwood City, CA (US)

(73) Assignee: Principia Biopharma Inc., South San Francisco, CA (US)

( * ) Notice: Subject to any disclaimer, the term of this patent is extended or adjusted under 35 U.S.C. 154(b) by 0 days.

(21) Appl. No.: 16/764,136

(22) PCT Filed: Nov. 14, 2018

(86) PCT No.: PCT/US2018/061140

§ 371 (c)(1),
(2) Date: May 14, 2020

(87) PCT Pub. No.: WO2019/099582

PCT Pub. Date: May 23, 2019

(65) Prior Publication Data

US 2020/0277312 A1 Sep. 3, 2020

Related U.S. Application Data

(60) Provisional application No. 62/587,376, filed on Nov. 16, 2017.

(51) Int. Cl.
*C07F 5/02* (2006.01)

(52) U.S. Cl.
CPC .................................... *C07F 5/025* (2013.01)

(58) Field of Classification Search
CPC ....................................................... C07F 5/025
See application file for complete search history.

(56) References Cited

FOREIGN PATENT DOCUMENTS

| | | | |
|---|---|---|---|
| WO | 9509634 | A1 | 4/1995 |
| WO | WO 2005/021558 | | 3/2005 |
| WO | 2013092979 | A1 | 6/2013 |
| WO | WO 2016/050358 | | 4/2016 |
| WO | WO 2018/136401 | | 7/2018 |
| WO | WO 2019/099576 | | 5/2019 |

OTHER PUBLICATIONS

International Search Report and Written Opinion dated Jan. 25, 2019 for PCT Application No. PCT/US2018/061140 filed Nov. 14, 2018, dated Jan. 25, 2019.
International Preliminary Report on Patentability dated May 19, 2020 for PCT Application No. PCT/US2018/061140 filed Nov. 14, 2018, dated Jan. 25, 2019.
Communication dated May 6, 2020 for EP Application No. 18716009.8.
Examination Report dated Jun. 14, 2019 for PK Application No. 0036/2018.
International Preliminary Report on Patentability and Written Opinion dated May 19, 2020, for PCT Application No. PCT/US2018/061132.
International Preliminary Report on Patentability and Written Opinion dated Jul. 23, 2019, for PCT Application No. PCT/US2018/013823.
International Search Report dated Feb. 14, 2019 for PCT Application No. PCT/US2018/061132.
International Search Report dated Jun. 26, 2018 for PCT Application No. PCT/US2018/013823.
Pending U.S. Appl. No. 16/478,788, filed Jul. 17, 2019 (not enclosed).
Pending U.S. Appl. No. 16/764,199, filed May 14, 2020 (not enclosed).

*Primary Examiner* — Golam M Shameem
(74) *Attorney, Agent, or Firm* — McNeill Baur PLLC

(57) ABSTRACT

Provided herein are compounds, such as a compound of Formula (I), or a pharmaceutically acceptable salt thereof, that are immunoproteasome (such as LMP2 and LMP7) inhibitors. The compounds described herein can be useful for the treatment of diseases treatable by inhibition of immunoproteasomes. Also provided herein are pharmaceutical compositions containing such compounds and processes for preparing such compounds.

32 Claims, No Drawings

IMMUNOPROTEASOME INHIBITORS

INCORPORATION BY REFERENCE TO ANY PRIORITY APPLICATIONS

Any and all applications for which a foreign or domestic priority claim is identified, for example, in the Application Data Sheet or Request as filed with the present application, are hereby incorporated by reference under 37 CFR 1.57, and Rules 4.18 and 20.6, including U.S. Provisional Application No. 62/587,376, filed Nov. 16, 2017 and PCT Application No. PCT/US2018/061140, filed Nov. 14, 2018. The present application is the national phase entry of PCT Application No. PCT/US2018/061140, filed Nov. 14, 2018, which claims priority to U.S. Provisional Application No. 62/587,376, filed Nov. 16, 2017.

BACKGROUND OF THE DISCLOSURE

In eukaryotes, protein degradation is mediated through the ubiquitin pathway in which proteins targeted for destruction are ligated to the 76 amino acid polypeptide ubiquitin. Ubiquitinated proteins then serve as substrates for the 26S proteasome, a multicatalytic protease, which cleaves proteins into short peptides through the action of its three major proteolytic activities. Proteasome-mediated degradation plays a key role in many processes such as antigen presentation in the context of the major histocompatibility complex (MHC) class I, apoptosis and cell viability, antigen processing, NF-KB activation, and transduction of pro-inflammatory signals.

The 20S proteasome is a 700 kDa cylinder-shaped multicatalytic protease complex comprised of 28 subunits, classified as alpha- and beta-type, that are arranged in 4 stacked heptameric rings. In yeast and other eukaryotes, 7 different subunits form the outer rings and 7 different subunits comprise the inner rings. The alpha subunits serve as binding sites for the 19S and 11S regulatory complexes, as well as a physical barrier for the inner proteolytic chamber formed by the two subunit rings. Thus, in vivo, the proteasome is believed to exist as a 26S particle. In vivo experiments have shown that inhibition of the 20S form of the proteasome can be readily correlated to inhibition of the 26S proteasome.

In addition to the constitutive proteasome, which is ubiquitously expressed, there is an alternative complex, the immunoproteasome, which can be found in immune cells and/or in cells exposed to inflammatory cytokines, such as IFN-γ and TNF-α. The immunoproteasome differs from the constitutive proteasome in its subunit composition. It contains subunits with chymotrypsin-like (β5i/LMP7), caspase-like (β1i/LMP2) and trypsin-like (β2i) protease activity that replace their counterparts in the constitutive proteasome (β5c, β1c, and β2c respectively). When all three IFN-γ-inducible subunits are present, the proteasome is referred to as the "immunoproteasome." Thus, eukaryotic cells can possess two forms of proteasomes in varying ratios. The immunoproteasome plays an essential role in the generation of antigenic peptide repertoire and shaping MHC class I restricted CD8+ T cell response (see Basler et al. Immunoproteasomes down-regulate presentation of a subdominant T cell epitope from lymphocytic choriomeningitis virus. J Immunol 173:3925-3934 (2004); Moebius, J. M. et al. 2010. Immunoproteasomes are essential for survival and expansion of T cells in virus-infected mice. Eur J Immunol 40:3439-3449).

The immunoproteasome function is not only limited to MHC class I presentation, but it is also involved in a number of pathological disorders including hematological malignancies, inflammatory and autoimmune diseases. The commercially available proteasome inhibitors Bortezomib and Carfilzomib, which have been validated in multiple myeloma and other diseases, appear to target both the constitutive and immunoproteasomes indiscriminately. This lack of specificity may, in part, explain some of the side effects of these agents. It may, however, be possible to keep the therapeutic efficacies (such as antilymphoma and antimyeloma efficacies) of these immunoproteasomes unchanged, and at the same time, increase the therapeutic index, by selectively targeting the immunoproteasome. Therefore, inhibitors which selectively inhibit the immunoproteasome are of interest.

LMP7/β5i is an essential subunit of the immunoproteasome. It regulates inflammatory cytokine production and immune cell functions beyond its role in the generation of MHC class I-restricted epitopes. A small molecule LMP7 inhibitor, PR-957, has been shown to potently block both human and mouse Th1/17 differentiation (see Muchamuel, T., et al. 2009. A selective inhibitor of the immunoproteasome subunit LMP7 blocks cytokine production and attenuates progression of experimental arthritis. Nat Med 15:781-787; Kalim, K. W., et al. 2012. Immunoproteasome Subunit LMP7 Deficiency and Inhibition Suppresses Th1 and Th17 but Enhances Regulatory T Cell Differentiation. J. Immunol. 189:4182-4293) and B cell effector functions and production of proinflammatory cytokines (IL-6, TNF-α, IL-23) (see Basler, M., et al. 2010. Prevention of experimental colitis by a selective inhibitor of the immunoproteasome. J Immunol 185:634-641). In addition, LMP7 inhibition with PR-957 has been demonstrated to produce therapeutic benefits in several preclinical autoimmune disease models. For example, PR-957 was shown to significantly inhibit disease activity in murine collagen-induced arthritis, including significant reduction of inflammation and bone erosion (see Muchamuel, T., et al. 2009. A selective inhibitor of the immunoproteasome subunit LMP7 blocks cytokine production and attenuates progression of experimental arthritis. Nat Med 15:781-787). PR-957 also reduced plasma cell numbers and anti-dsDNA IgG levels in the MRL/lpr lupus model, and prevented disease progression. (see Ichikawa, H. T., et al. 2012. Beneficial effect of novel proteasome inhibitors in murine lupus via dual inhibition of type I interferon and autoantibody-secreting cells. Arthritis Rheum 64:493-503). In addition, PR-957 reduced inflammation and tissue destruction in a murine DSS-induced colitis model (see Basler, M., et al. 2010. Prevention of experimental colitis by a selective inhibitor of the immunoproteasome. J Immunol 185:634-641). Also, PR-957 has been shown to be efficacious in an autoantibody-driven Hashimoto's thyroiditis model (see Nagayama, Y., et al. 2012. Prophylactic and therapeutic efficacies of a selective inhibitor of the immunoproteasome for Hashimoto's thyroiditis, but not for Graves' hyperthyroidism, in mice. Clin Exp Immunol. 168: 268-273). In addition, LMP7 knockout mice are protected from disease in IBD models (see Basler, M., et al. 2010. Prevention of experimental colitis by a selective inhibitor of the immunoproteasome. J Immunol. 185:634-641; Kalim, K. W., et al. 2012. Immunoproteasome Subunit LMP7 Deficiency and Inhibition Suppresses Th1 and Th17 but Enhances Regulatory T Cell Differentiation. J Immunol. 189:4182-4293; Schmidt, N., et al. 2010. Targeting the proteasome: partial inhibition of the proteasome by bortezomib or deletion of the immunosubunit LMP7 attenuates experimental colitis. Gut 59:896-906). Additionally, inhibition of LMP7 with the selective inhibitor PR-924 has been shown to inhibit growth of multiple myeloma cell lines and primary patient tumor cells, including those resistant to conventional and novel prior therapies (see Singh, A. V., et al. 2011. PR-924, a Selective Inhibitor of the Immunoproteasome Subunit LMP-7, Blocks Multiple Myeloma Cell Growth both in Vitro and in Vivo. Br J Haematol. 2011 January; 152(2): 155-163).

An additional immunoproteasome subunit LMP2/β1i has been shown to regulate antiviral and innate immune responses in addition to its contribution to antigen processing (see Hensley, S. E., et al. 2010. Unexpected role for the immunoproteasome subunit LMP2 in antiviral humoral and innate immune responses. J. Immunol 184:4115-4122). A small molecule inhibitor, ISPI-001, which preferentially targets LMP2/β1i, inhibited in vitro proliferation of peripheral blood mononuclear cells (PBMC) isolated from myeloma patients (see Kuhn, D. J., et al. 2009. Targeted inhibition of the immunoproteasome is a potent strategy against models of multiple myeloma that overcomes resistance to conventional drugs and nonspecific immunoproteasome inhibitors. Blood 113:4667-4676). An additional small molecule inhibitor, UK-101, which selectively targets LMP2/β1i, induced apoptosis of an prostate PC-3 cell line in vitro and significantly suppressed tumor growth in vivo (Wehenkel, M., et al. 2012. A selective inhibitor of the immunoproteasome subunit LMP2 induced apoptosis in PC-3 cells and suppresses tumor growth in nude mice. Br J Cancer 107:53-62).

WO 2016/050358 A1 discloses inhibitors of LMP7, which are boronic acid derivatives, that can be used for the treatment of autoimmune disorder or hematological malignancies.

WO 2015/195950 A1 discloses inhibitors of LMP7, and methods of treating various diseases using these inhibitors.

SUMMARY OF THE DISCLOSURE

Some embodiments described herein relate to a compound of Formula (I):

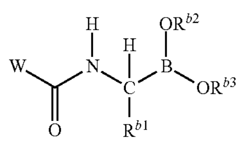

(I)

and/or a pharmaceutically acceptable salt thereof, wherein:

W can be —O—P-Q-C($R^{8a}$)═C($R^{8b}$)($R^{8c}$), —N(R')—P-Q-C($R^{8a}$)═C($R^{8b}$)($R^{8c}$), or a group of formula

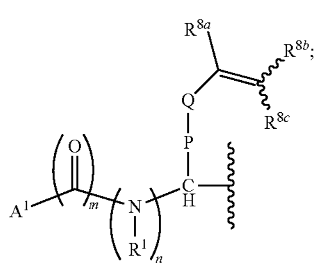

$A^1$ can be hydrogen, hydroxy, optionally substituted alkyl, optionally substituted aryl, optionally substituted heteroaryl, optionally substituted heterocyclyl, or —S(═O)$_2$-alkyl, wherein said alkyl of said —S(═O)$_2$-alkyl is optionally substituted;

R' can be H or optionally substituted alkyl;

each $R^1$ can be H or optionally substituted alkyl;

P can be -alkyl-, -alkyl-O-alkyl-, -alkyl-N(R)—, -alkyl-aryl-N(R)—, -alkyl-N(R)-aryl-N(R)—, -alkyl-O-aryl-N(R)—, -alkyl-aryl-alkyl-N(R)—, -alkyl-heteroaryl-N(R)—, -alkyl-cycloalkyl-N(R)—, -alkyl-O-cycloalkyl-N(R)—, -alkyl-N(R)-cycloalkyl-N(R)—, -alkyl-O-alkyl-N(R)—, -alkyl-N(R)-alkyl-N(R)—,

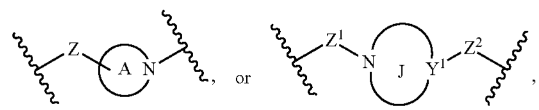

wherein each instance of alkyl, aryl, heteroaryl, and cycloalkyl is optionally substituted;

Z and $Z^1$ can independently be a covalent bond, -alkyl-, -alkyl-O—, -alkyl-N(R)—, or -alkyl-O-alkyl-, wherein each instance of alkyl is optionally substituted;

ring A with the ring nitrogen atom shown can be an optionally substituted saturated mono- or multicyclic 4 to 10 membered heterocyclyl;

ring J with the ring nitrogen atom and ring $Y^1$ atom shown can be an optionally substituted saturated 4 to 10 membered heterocyclyl;

$Y^1$ can be C or N;

$Z^2$ can a covalent bond or N(R);

each R can independently be hydrogen or optionally substituted alkyl; Q can be —C(═O)— or —S(═O)$_2$—;

each $R^{8a}$ independently can be hydrogen, halogen, or cyano;

each $R^{8b}$ independently can be hydrogen or optionally substituted alkyl; or each $R^{8a}$ and $R^{8b}$ independently can be taken together to form a bond; and each $R^{8c}$ independently can be hydrogen, optionally substituted alkyl, optionally substituted cycloalkyl, optionally substituted heteroaryl, or optionally substituted heterocyclyl;

$R^{b1}$ can be optionally substituted alkyl, optionally substituted aryl, optionally substituted heteroaryl, optionally substituted cycloalkyl, optionally substituted cycloalkenyl, or optionally substituted heterocyclyl;

$R^{b2}$ and $R^{b3}$ can independently be hydrogen or optionally substituted $C_{1-6}$ alkyl; or $R^{b2}$ and $R^{b3}$ together with the boron atom to which they are shown attached can form a cyclic boronic ester having 2 to 20 carbons, and optionally containing one or two additional cyclic heteroatoms chosen from N, O and S; and m and n can independently be 0 or 1;

provided that when W is —O—P-Q-C($R^{8a}$)═C($R^{8b}$)($R^{8c}$), or a group of formula

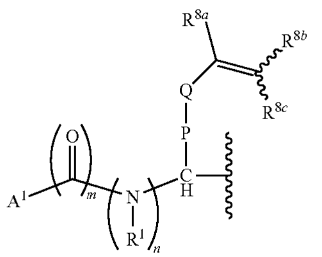

wherein m and n are each 0, then P is not -alkyl-N(R)—, -alkyl-($C_3$-$C_6$) cycloalkyl-N(R)—, alkyl-O-alkyl-N (R)—, or

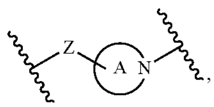

wherein each instance of alkyl, and cycloalkyl is optionally substituted, ring A with the ring nitrogen atom as shown is an optionally substituted saturated monocyclic five- to seven-membered heterocyclyl with only the one nitrogen shown as the ring heteroatom, and wherein Z is connected to ring A at a carbon atom adjacent to the ring nitrogen atom; and provided that when W is —O—P-Q-C($R^{8a}$)═C($R^{8b}$) ($R^{8c}$), or a group of formula

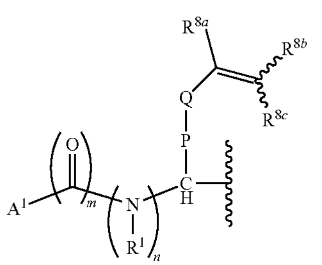

wherein m and n are each 0, and P is

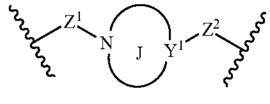

wherein $Y^1$ in ring J is nitrogen, then $Z^2$ is a covalent bond.

Some embodiments described herein also provides a pharmaceutical composition comprising a compound of Formula (I) (or any of the embodiments thereof described herein), and/or a pharmaceutically acceptable salt thereof; and a pharmaceutically acceptable excipient.

Some embodiments described herein also provides a method of treating a disease (such as an autoimmune disease, an inflammatory disease, and/or a hematological disorder), treatable by inhibition of LMP2 and/or LMP7 in a patient which method comprises administering to the patient in need thereof, a therapeutically effective amount of a compound of Formula (I) (or any of the embodiments thereof described herein), and/or a pharmaceutically acceptable salt thereof.

DETAILED DESCRIPTION OF THE DISCLOSURE

Definitions

Unless otherwise stated, the following terms used in the specification and claims are defined for the purposes of this Application and have the following meaning. All undefined technical and scientific terms used in this Application have the meaning as commonly understood by one of ordinary skill in the art to which this disclosure belongs.

As used herein, "a" or "an" entity refers to one or more of that entity; for example, a compound refers to one or more compounds or at least one compound unless stated otherwise. As such, the terms "a" (or "an"), "one or more", and "at least one" can be used interchangeably herein.

The term "about" is used herein to mean approximately, in the region of, roughly, or around. When the term "about" is used in conjunction with a numerical range, it modifies that range by extending the boundaries above and below the numerical values set forth. In general, the term "about" is used herein to modify a numerical value above and below the stated value by a variance of 5%.

"Patient" includes both human and animals. "Patient" and "subject" are used interchangeably herein.

"Mammal" means humans and other mammalian animals.

"P" in Formula (I) is read left to right, wherein the right side of "P" is attached to "Q".

"Z" and "$Z^{1}$" in Formula (I) are read left to right, wherein the right side of "Z" is attached to "ring A" and wherein the right side of "$Z^{1}$" is attached to "ring J".

"Alkyl" means an aliphatic hydrocarbon group, which may be straight or branched, and comprising 1 to 20 carbon atoms in the chain. Preferred alkyl groups contain 1 to 12 carbon atoms in the chain. More preferred alkyl groups contain 1 to 6 carbon atoms in the chain. Branched means that one or more lower alkyl groups such as methyl, ethyl or propyl, are attached to a linear alkyl chain. "Lower alkyl" means a group having 1 to 6 carbon atoms in the chain which may be straight or branched. "Optionally substituted alkyl" means an alkyl group that can be optionally substituted by one or more (e.g., one, two, or three) substituents which may be the same or different, each substituent being independently chosen from halo, aryl optionally substituted by one or more (e.g., one, two, three, or four) ring atom substitutents, heterocyclyl optionally substituted by one or more (e.g., one, two, three, or four) ring atom substitutents, heterocyclenyl optionally substituted by one or more (e.g., one, two, three, or four) ring atom substitutents, heteroaryl optionally substituted by one or more (e.g., one, two, three, or four) ring atom substitutents, cycloalkyl optionally substituted by one or more (e.g., one, two, three, or four) ring atom substitutents, cycloalkenyl optionally substituted by one or more (e.g., one, two, three, or four) ring atom substitutents, cyano, hydroxy, alkoxy, aryloxy, —O-alkyl-O-alkyl, heteroaryloxy, cycloalkyloxy, acyl, carboxy, —SH, alkylthio, amino, oxime (e.g., ═N—OH), —NH(alkyl), —NH(alkyl-O-alkyl), —NH(optionally substituted aryl), —N(alkyl)(optionally substituted aryl), —NH(optionally substituted heteroaryl), —NH(optionally substituted heterocyclyl), —N(alkyl)(optionally substituted heteroaryl), —N(alkyl)(optionally substituted heterocyclyl), —NH(optionally substituted cycloalkyl), —N(alkyl)(optionally substituted cycloalkyl), —N(optionally substituted cycloalkyl) (optionally substituted heterocyclyl), —N(alkyl)$_2$, —NH—C(═O)-alkyl, —N(alkyl)-C(═O)-alkyl, —NH—C(═O)-aryl, —N(alkyl)-C(═O)-aryl, —NH—C(═O)-cycloalkyl, —N(alkyl)-C(═O)-cycloalkyl, —O—C(O)-alkyl, —O—C(O)-aryl, —O—C(O)-cycloalkyl, —SF$_5$, and —C(O)O-alkyl. Non-limiting examples of suitable alkyl groups include methyl, ethyl, n-propyl, isopropyl, n-butyl, iso-butyl, and t-butyl.

"Alkenyl" means an aliphatic hydrocarbon group containing at least one carbon-carbon double bond, which may be straight or branched, and comprising 2 to 15 carbon atoms in the chain. Preferred alkenyl groups have 2 to 12 carbon atoms in the chain; and more preferably 2 to 6 carbon atoms in the chain. Branched means that one or more lower alkyl groups such as methyl, ethyl or propyl, are attached to a linear alkenyl chain. "Lower alkenyl" means 2 to 6 carbon atoms in the chain which may be straight or branched. "Optionally substituted alkenyl" means an alkenyl group that can be optionally substituted by one or more (e.g., one, two or three) substituents which may be the same or different, each substituent being independently chosen from halo, optionally substituted aryl, optionally substituted cycloalkyl, cyano, alkoxy and —S(alkyl). Non-limiting examples of suitable alkenyl groups include ethenyl, propenyl, n-butenyl, 3-methylbut-2-enyl, n-pentenyl, octenyl and decenyl.

"Alkynyl" means an aliphatic hydrocarbon group containing at least one carbon-carbon triple bond, which may be straight or branched, and comprising 2 to 15 carbon atoms in the chain. Preferred alkynyl groups have 2 to 12 carbon atoms in the chain; and more preferably 2 to 4 carbon atoms in the chain. Branched means that one or more lower alkyl groups such as methyl, ethyl or propyl, are attached to a linear alkynyl chain. "Lower alkynyl" means 2 to 6 carbon atoms in the chain which may be straight or branched. "Optionally substituted alkynyl" means an alkynyl group which can be optionally substituted by one or more (e.g., one or two) substituents which may be the same or different, each substituent being independently chosen from aryl and cycloalkyl. Non-limiting examples of suitable alkynyl groups include ethynyl, propynyl, 2-butynyl and 3-methylbutynyl.

"Aryl" means an aromatic monocyclic or multicyclic (e.g., bicyclic, tricyclic) ring system comprising 6 to 14 carbon atoms, preferably 6 to 10 carbon atoms. "Optionally substituted aryl" means an aryl group which can be optionally substituted with one or more (e.g., one, two, three, or four) "ring system substituents" which may be the same or different, and are as defined herein. Non-limiting examples of suitable aryl groups include phenyl and naphthyl.

"Heteroaryl" means an aromatic monocyclic or multicyclic (e.g., bicyclic, tricyclic) ring system comprising 5 to 14 ring atoms, preferably 5 to 10 ring atoms, in which one or more of the ring atoms is an element other than carbon, for example, nitrogen, oxygen or sulfur, alone or in combination. Preferred heteroaryls contain 5 to 6 ring atoms. "Optionally substituted heteroaryl" means a heteroaryl group which can be optionally substituted by one or more (e.g., one, two, three, or four) "ring system substituents" which may be the same or different, and are as defined herein. The prefix aza, oxa or thia before the heteroaryl root name means that at least a nitrogen, oxygen or sulfur atom respectively, is present as a ring atom. A nitrogen atom of a heteroaryl can be optionally oxidized to the corresponding N-oxide. "Heteroaryl" may also include a heteroaryl as defined above fused to an aryl as defined above. Non-limiting examples of suitable heteroaryls include pyridyl, pyrazinyl, furanyl, thienyl, pyrimidinyl, pyridone (including N-substituted pyridones), isoxazolyl, isothiazolyl, oxazolyl, thiazolyl, pyrazolyl, furazanyl, pyrrolyl, triazolyl, 1,2,4-thiadiazolyl, pyrazinyl, pyridazinyl, quinoxalinyl, phthalazinyl, oxindolyl, imidazo[1,2-a]pyridinyl, imidazo[2,1-b]thiazolyl, benzofurazanyl, indolyl, azaindolyl, benzimidazolyl, benzothienyl, quinolinyl, imidazolyl, thienopyridyl, quinazolinyl, thienopyrimidyl, pyrrolopyridyl, imidazopyridyl, isoquinolinyl, benzoazaindolyl, 1,2,4-triazinyl, benzothiazolyl and the like. "Heteroaryl" also includes a heteroaryl ring as described above wherein an oxo (═O) group is also part of the ring, provided the ring is aromatic. For example,

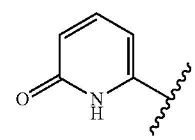 [SMILES: *c1cccc(=O)[nH]1]

is a heteroaryl group.

"Aralkyl" or "arylalkyl" means an aryl-alkyl- group in which the aryl and alkyl are as previously described. Preferred aralkyls comprise a lower alkyl group. Non-limiting examples of suitable aralkyl groups include benzyl, 2-phenethyl and naphthalenylmethyl. The bond to the parent moiety is through the alkyl.

"Cycloalkyl" means a non-aromatic mono- or multicyclic (e.g., bicyclic, tricyclic) ring system comprising 3 to 10 carbon atoms, preferably 5 to 10 carbon atoms. Preferred cycloalkyl rings contain t 5 to 7 ring atoms. "Optionally substituted cycloalkyl" means a cycloalkyl group which can be optionally substituted with one or more (e.g., one, two, three, or four) "ring system substituents" which may be the same or different, and are as defined herein. Non-limiting examples of suitable monocyclic cycloalkyls include cyclopropyl, cyclopentyl, cyclohexyl, cycloheptyl and the like. Non-limiting examples of suitable multicyclic cycloalkyls include 1-decalinyl, norbornyl, adamantyl and the like.

"Cycloalkenyl" means a non-aromatic mono or multicyclic (e.g., bicyclic, tricyclic) ring system comprising 3 to 10 carbon atoms, preferably 5 to 10 carbon atoms which contains at least one carbon-carbon double bond. Preferred cycloalkenyl rings contain 5 to 7 ring atoms. "Optionally substituted cycloalkenyl" means a cycloalkenyl group which can be optionally substituted with one or more (e.g., one, two, three, or four) "ring system substituents" which may be the same or different, and are as defined herein. Non-limiting examples of suitable monocyclic cycloalkenyls include cyclopentenyl, cyclohexenyl, cyclohepta-1,3-dienyl, and the like. Non-limiting example of a suitable multicyclic cycloalkenyl is norbornylenyl.

"Halogen" or "Halo" means fluorine, chlorine, bromine, or iodine. Preferred are fluorine, chlorine and bromine.

"Haloalkyl" means alkyl radical as defined above, which is substituted with one or more halogen atoms, preferably one to five halogen atoms, preferably fluorine or chlorine, including those substituted with different halogens, e.g., —$CH_2Cl$, —$CF_3$, —$CHF_2$, —$CClF_2$, —$CH_2CF_3$, —$CF_2CF_3$, —$CF(CH_3)_2$, and the like. When the alkyl is substituted with only fluoro, it can be referred to in this Application as fluoroalkyl.

"Hydroxyalkyl" means a HO-alkyl- group in which alkyl is as previously described. Preferred hydroxyalkyls contain lower alkyl. Non-limiting examples of suitable hydroxyalkyl groups include hydroxymethyl and 2-hydroxyethyl.

"Acyl" means an H—C(O)—, alkyl-C(O)— or cycloalkyl-C(O)—, group in which the various groups are as previously described. The bond to the parent moiety is through the carbonyl. Preferred acyls contain a lower alkyl. Non-limiting examples of suitable acyl groups include formyl, acetyl and propanoyl.

"Aroyl" means an aryl-C(O)— group in which the aryl group is as previously described. The bond to the parent moiety is through the carbonyl. Non-limiting examples of suitable groups include benzoyl and 1-naphthoyl.

"Alkoxy" means an alkyl-O— group in which the alkyl group is as previously described. Non-limiting examples of suitable alkoxy groups include methoxy, ethoxy, n-propoxy, isopropoxy and n-butoxy. The bond to the parent moiety is through the ether oxygen.

"Aryloxy" means an aryl-O— group in which the aryl group is as previously described. Non-limiting examples of suitable aryloxy groups include phenoxy and naphthoxy. The bond to the parent moiety is through the ether oxygen.

"Cycloalkyloxy" means a cycloalkyl-O— group in which the cycloalkyl group is as previously described. Non-limiting examples of suitable cycloalkyloxy groups include cyclopentyloxy and cyclohexyloxy. The bond to the parent moiety is through the ether oxygen.

"Heteroaryloxy" means a heteroaryl-O— group in which the heteroaryl group is as previously described. Non-limiting examples of suitable heteroaryloxy groups include pyridyloxy and thiophenyloxy. The bond to the parent moiety is through the ether oxygen.

"Heterocyclyloxy" means a heterocyclyl-O— group in which the heterocyclyl group is as described herein. Non-limiting examples of suitable heterocyclyloxy groups include piperazinyloxy and morpholinyloxy. The bond to the parent moiety is through the ether oxygen.

"Aralkyloxy" means an aralkyl-O— group in which the aralkyl group is as previously described. Non-limiting examples of suitable aralkyloxy groups include benzyloxy and 1- or 2-naphthalenemethoxy. The bond to the parent moiety is through the ether oxygen.

"Alkylthio" means an alkyl-S— group in which the alkyl group is as previously described. Non-limiting examples of suitable alkylthio groups include methylthio and ethylthio. The bond to the parent moiety is through the sulfur.

"Arylthio" means an aryl-S— group in which the aryl group is as previously described. Non-limiting examples of suitable arylthio groups include phenylthio and naphthylthio. The bond to the parent moiety is through the sulfur.

"Aralkylthio" means an aralkyl-S— group in which the aralkyl group is as previously described. Non-limiting example of a suitable aralkylthio group is benzylthio. The bond to the parent moiety is through the sulfur.

"Alkoxycarbonyl" means an alkyl-O—CO— group in which the alkyl group is as previously described. Non-limiting examples of suitable alkoxycarbonyl groups include methoxycarbonyl and ethoxycarbonyl. The bond to the parent moiety is through the carbonyl.

"Aryloxycarbonyl" means an aryl-O—C(O)— group in which the aryl group is as previously described. Non-limiting examples of suitable aryloxycarbonyl groups include phenoxycarbonyl and naphthoxycarbonyl. The bond to the parent moiety is through the carbonyl.

"Aralkoxycarbonyl" means an aralkyl-O—C(O)— group in which the aralkyl group is as previously described. Non-limiting example of a suitable aralkoxycarbonyl group is benzyloxycarbonyl. The bond to the parent moiety is through the carbonyl.

"Alkylsulfonyl" means an alkyl-S($O_2$)— group in which the alkyl group is as previously described. Preferred groups are those in which the alkyl group is lower alkyl. The bond to the parent moiety is through the sulfonyl.

"Arylsulfonyl" means an aryl-S($O_2$)— group in which the aryl group is as previously described. The bond to the parent moiety is through the sulfonyl.

"Cyclic boronic ester" means a monocyclic or multicyclic ring system that includes a boronic ester as part of the ring(s). When more than one ring is present, the rings can be fused (two rings share two adjacent atoms) or bridged (two rings share three or more atoms). A cyclic boronic ester can include additional heteroatoms in the ring(s), such as N, O and/or S. A cyclic boronic ester can be monocyclic or bicyclic.

"Ring system substituent" means a substituent attached to an aromatic or non-aromatic ring system (for example, cycloalkyl, cycloalkenyl, aryl, heteroaryl, heterocyclyl, heterocyclenyl) which, for example, replaces an available hydrogen on the ring system. Ring system substituents may be the same or different, each being independently chosen from alkyl, alkenyl, alkynyl, aryl, heteroaryl, aralkyl, alkylaryl, heteroaralkyl, heteroarylalkenyl, heteroarylalkynyl, alkylheteroaryl, hydroxy, hydroxyalkyl, alkoxy, alkoxyalkyl, aryloxy, aralkoxy, acyl, aroyl, halo, haloalkyl, nitro, cyano, carboxy, alkoxycarbonyl, aryloxycarbonyl, aralkoxycarbonyl, alkylsulfonyl, arylsulfonyl, heteroarylsulfonyl, alkylthio, arylthio, heteroarylthio, aralkylthio, heteroaralkylthio, cycloalkyl, heterocyclyl, —SH, —$SF_5$, —$OSF_5$ (for aryl), —O— alkyl-O-alkyl, —O—C(O)-alkyl, —O—C(O)-aryl, —O—C(O)-cycloalkyl, —C(=N—CN)—$NH_2$, —C(=NH)—$NH_2$, —C(=NH)—NH(alkyl), oxime (e.g., =N—OH), —$NY_1Y_2$, -alkyl-$NY_1Y_2$, —C(O)$NY_1Y_2$, —$SO_2NY_1Y_2$ and —$SO_2NY_1Y_2$, wherein $Y_1$ and $Y_2$ can be the same or different and are independently chosen from hydrogen, alkyl, -alkyl-O-alkyl, aryl, cycloalkyl, heterocyclyl, and aralkyl. "Ring system substituent" may also mean a single moiety which simultaneously replaces two available hydrogens on two adjacent carbon atoms (one H on each carbon, and form a fused ring) or replaces two available hydrogens on a single carbon atom (i.e., a spiro ring) on a ring system. Examples of the former, i.e., a moiety replacing two hydrogens on adjacent carbon atoms are methylene dioxy, ethylenedioxy, —$C(CH_3)_2$— and the like which form moieties such as, for example:

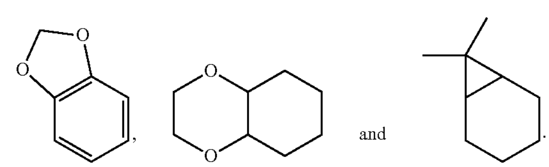

An example of the latter, i.e., a moiety replacing two hydrogens on a single carbon atom (i.e., spiro ring) is

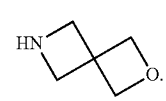

When connected in a bridged manner, the linkage of one or more atoms in a ring system is via non-adjacent atoms. An example of two rings connected in a bridged manner is:

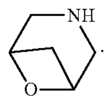

"Heterocyclyl" means a non-aromatic saturated monocyclic or multicyclic (e.g., bicyclic, tricyclic) ring system comprising 3 to 10 ring atoms, preferably 4 to 7 ring atoms, or 5 to 10 ring atoms, in which one or more of the atoms in the ring system is an element other than carbon, for example, nitrogen, oxygen or sulfur, alone or in combination. There are no adjacent oxygen and/or sulfur atoms present in the ring system. When the heterocyclyl is a multicyclic ring system, the rings can be connected in a fused, bridged or spiro manner. Preferred heterocyclyls contain 4 to 6 ring atoms. The prefix aza, oxa or thia before the heterocyclyl root name means that at least a nitrogen, oxygen or sulfur atom respectively is present as a ring atom. Any —NH in a heterocyclyl ring may exist protected such as, for example, as an —N(Boc), —N(CBz), —N(Tos) group and the like; and are part of the heterocyclyl. "Optionally substituted heterocyclyl" means a heterocyclyl group which can be optionally substituted by one or more (e.g., one, two, three, or four) "ring system substituents" which may be the same or different, and are as defined herein. The nitrogen or sulfur atom of the heterocyclyl can be optionally oxidized to the corresponding N-oxide, S-oxide or S,S-dioxide. Non-limiting examples of suitable monocyclic heterocyclyl rings include piperidinyl, pyrrolidinyl, piperazinyl, morpholinyl, thiomorpholinyl, thiazolidinyl, 1,4-dioxanyl, tetrahydrofuranyl, tetrahydrothiophenyl, lactam, lactone, and the like. "Heterocyclyl" also includes heterocyclyl rings as described above wherein =O replaces two available hydrogens on the same ring carbon atom.

"Heterocyclenyl" means a non-aromatic monocyclic or multicyclic (e.g., bicyclic, tricyclic) ring system comprising 3 to 10 ring atoms, preferably 5 to 10 ring atoms, in which one or more of the atoms in the ring system is an element other than carbon, for example, nitrogen, oxygen or sulfur atom, alone or in combination, and which contains at least one carbon-carbon double bond or carbon-nitrogen double bond. There are no adjacent oxygen and/or sulfur atoms present in the ring system. When the heterocyclenyl is a multicyclic ring system, the rings can be connected in a fused, bridged or spiro manner. Preferred heterocyclenyl rings contain 5 to 6 ring atoms. The prefix aza, oxa or thia before the heterocyclenyl root name means that at least a nitrogen, oxygen or sulfur atom respectively is present as a ring atom. "Optionally substituted heterocyclenyl" means a heterocyclenyl group which can be optionally substituted by one or more (e.g., one, two, three, or four) ring system substituents, wherein "ring system substituent" is as defined above. The nitrogen or sulfur atom of the heterocyclenyl can be optionally oxidized to the corresponding N-oxide, S-oxide or S,S-dioxide. Non-limiting examples of suitable heterocyclenyl groups include 1,2,3,4-tetrahydropyridinyl, 1,2-dihydropyridinyl, 1,4-dihydropyridinyl, 1,2,3,6-tetrahydropyridinyl, 1,4,5,6-tetrahydropyrimidinyl, 2-pyrrolinyl, 3-pyrrolinyl, 2-imidazolinyl, 2-pyrazolinyl, dihydroimidazolyl, dihydrooxazolyl, dihydrooxadiazolyl, dihydrothiazolyl, 3,4-dihydro-2H-pyranyl, dihydrofuranyl, fluorodihydrofuranyl, 7-oxabicyclo[2.2.1]heptenyl, dihydrothiophenyl, dihydrothiopyranyl, and the like. "Heterocyclenyl" also includes heterocyclenyl rings as described above wherein =O replaces two available hydrogens on the same ring carbon atom.

It should be noted that in hetero-atom containing ring systems described herein, there are no hydroxyl groups on carbon atoms adjacent to a N, O or S, as well as there are no N or S groups on carbon adjacent to another heteroatom. Thus, for example, in the ring:

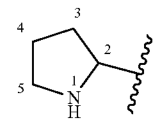

there is no —OH attached directly to carbons marked 2 and 5.

It should also be noted that tautomeric forms such as, for example, the moieties:

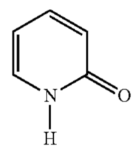

and

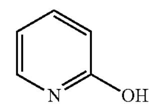

are considered equivalent unless otherwise specified.

As used herein, the structure

indicates that the configuration of groups on the double bond can be either E (trans) or Z (cis). Thus, for example,

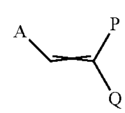

has the same meaning as

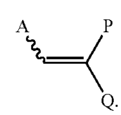

The term "substituted" means that one or more hydrogens on the designated atom is replaced with a selection from the indicated group, provided that the designated atom's normal valency under the existing circumstances is not exceeded, and that the substitution results in a stable compound. Combinations of substituents and/or variables are permissible only if such combinations result in stable compounds. By "stable compound" or "stable structure" is meant a compound that is sufficiently robust to survive isolation to a useful degree of purity from a reaction mixture, and formulation into an efficacious therapeutic agent.

The term "optionally substituted" means optional substitution (i.e., unsubstituted or substituted) with the specified groups, radicals or moieties. When a list of optional substituents is not explicitly provided, the optional substituents provided in the definitions of various terms (such as “alkyl”, “cycloalkyl”, “heterocyclyl”, “aryl”, and “heteroaryl”) are to be used.

Unless otherwise specified, reference to an Embodiment number refers to all the subparts of the Embodiment. Thus for example, reference to “Embodiment 12”, refers to Embodiment 12, as well as Embodiments 12A-12D. However, this construction does not apply to a subpart within an Embodiment. Thus, for example, reference to “Embodiment 4” in Embodiment 4C refers only to “Embodiment 4” and not to each of “Embodiments 4, 4A, and 4B” unless specified otherwise”.

As used herein, the term “composition” is intended to encompass a product comprising the specified ingredients in the specified amounts, as well as any product which results, directly or indirectly, from combination of the specified ingredients in the specified amounts.

“Effective amount” or “therapeutically effective amount” is meant to describe an amount of compound or a composition described herein that is effective in inhibiting the above-noted diseases and thus producing the desired therapeutic, ameliorative, inhibitory and/or preventative effect.

EMBODIMENTS

Examples of embodiments of the present application include the following:

Embodiment 1

A compound of Formula (I):

(I)

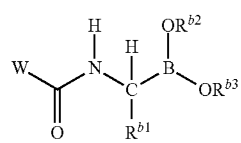

and/or a pharmaceutically acceptable salt thereof, wherein:

W is —O—P-Q-C($R^{8a}$)═C($R^{8b}$)($R^{8c}$), —N(R')—P-Q-C($R^{8a}$)═C($R^{8b}$)($R^{8c}$), or a group of formula

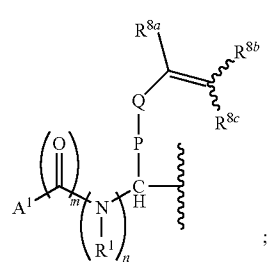

;

$A^1$ is hydrogen, hydroxy, optionally substituted alkyl, optionally substituted aryl, optionally substituted heteroaryl, optionally substituted heterocyclyl, or —S(═O)$_2$-alkyl, wherein said alkyl of said —S(═O)$_2$-alkyl is optionally substituted;

R' is H or optionally substituted alkyl;

each $R^1$ is H or optionally substituted alkyl;

P is -alkyl-, -alkyl-O-alkyl-, -alkyl-N(R)—, -alkyl-aryl-N(R)—, -alkyl-N(R)-aryl-N(R)—, -alkyl-O-aryl-N(R)—, -alkyl-aryl-alkyl-N(R)—, -alkyl-heteroaryl-N(R)—, -alkyl-cycloalkyl-N(R)—, -alkyl-O-cycloalkyl-N(R)—, -alkyl-N(R)-cycloalkyl-N(R)—, -alkyl-O-alkyl-N(R)—, -alkyl-N(R)-alkyl-N(R)—,

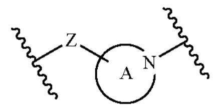, or 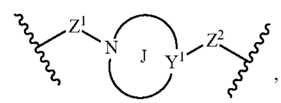, wherein each instance of alkyl, aryl, heteroaryl, and cycloalkyl is optionally substituted;

Z and $Z^1$ are independently a covalent bond, -alkyl-, -alkyl-O—, -alkyl-N(R)—, or -alkyl-O-alkyl-, wherein each instance of alkyl is optionally substituted;

ring A with the ring nitrogen atom shown is an optionally substituted saturated mono- or multicyclic 4 to 10 membered heterocyclyl;

ring J with the ring nitrogen atom and ring $Y^1$ atom shown is an optionally substituted saturated 4 to 10 membered heterocyclyl;

$Y^1$ is C or N;

$Z^2$ is a covalent bond or N(R);

each R is independently hydrogen, or optionally substituted alkyl;

Q is —C(═O)— or —S(═O)$_2$—;

each $R^{8a}$ independently is hydrogen, halogen, or cyano;

each $R^{8b}$ independently is hydrogen or optionally substituted alkyl; or each $R^{8a}$ and $R^{8b}$ independently are taken together to form a bond; and each $R^{8c}$ independently is hydrogen, optionally substituted alkyl, optionally substituted cycloalkyl, optionally substituted heteroaryl, or optionally substituted heterocyclyl;

$R^{b1}$ is optionally substituted alkyl, optionally substituted aryl, optionally substituted heteroaryl, optionally substituted cycloalkyl, optionally substituted cycloalkenyl, or optionally substituted heterocyclyl;

$R^{b2}$ and $R^{b3}$ are independently hydrogen or optionally substituted $C_{1-6}$ alkyl; or $R^{b2}$ and $R^{b3}$ together with the boron atom to which they are shown attached form an optionally substituted cyclic boronic ester having 2 to 20 carbons, and optionally containing one or two additional cyclic heteroatoms chosen from N, O and S; and m and n are independently 0 or 1;

provided that when W is —O—P-Q-C($R^{8a}$)═C($R^{8b}$)($R^{8c}$), or a group of formula

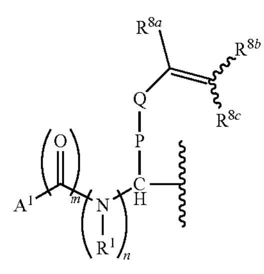

wherein m and n are each 0, then P is not -alkyl-N(R)—, -alkyl-($C_3$-$C_6$) cycloalkyl-N(R)—, alkyl-O-alkyl-N(R)—, or

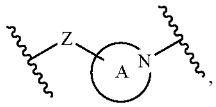

wherein each instance of alkyl, and cycloalkyl is optionally substituted, ring A with the ring nitrogen atom as shown is an optionally substituted saturated monocyclic five- to seven-membered heterocyclyl with only the one nitrogen shown as the ring heteroatom, and wherein Z is connected to ring A at a carbon atom adjacent to the ring nitrogen atom; and provided that when W is —O—P-Q-C($R^{8a}$)═C($R^{8b}$)($R^{8c}$), or a group of formula

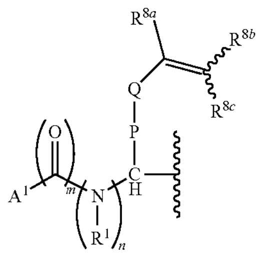

wherein m and n are each 0, and P is

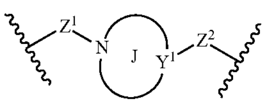

wherein $Y^1$ in ring J is nitrogen, then $Z^2$ is a covalent bond.

Embodiment 1A

A compound of Formula (I'):

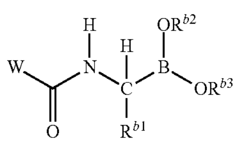

(I')

and/or a pharmaceutically acceptable salt thereof, wherein:

W is —O—P-Q-C($R^{8a}$)═C($R^{8b}$)($R^{8c}$), —N(R')—P-Q-C($R^{8a}$)═C($R^{8b}$)($R^{8c}$), or a group of formula

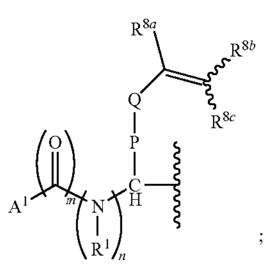

;

wherein:

$A^1$ is hydrogen; hydroxy; alkyl which is optionally substituted with 1-2 substituents chosen from halo, hydroxy, and —N(H)—C(═O)-alkyl; —S(═O)$_2$-alkyl; heterocyclyl; aryl; or heteroaryl; wherein each of said heterocyclyl, aryl and heteroaryl is independently optionally substituted with 1-3 substituents independently chosen from halo, hydroxy, alkyl, alkoxy, cyano, haloalkyl, —NH$_2$, —NH(alkyl), —N(alkyl)$_2$, heterocyclyl, aryl, and heteroaryl;

R' is H or alkyl;

each $R^1$ is H or alkyl;

P is -alkyl-N(R)—, -alkyl-aryl-N(R)—, or

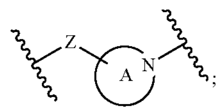

Z is a covalent bond, -alkyl-, or -alkyl-O-alkyl-;

ring A with the ring nitrogen atom shown is an optionally substituted saturated mono- or multicyclic 4 to 10 membered heterocyclyl;

each R independently is hydrogen or alkyl;

Q is —C(═O)— or —S(═O)$_2$—;

$R^{8a}$ is hydrogen or cyano;

$R^{8b}$ is hydrogen or alkyl; or $R^{8a}$ and $R^{8b}$ are taken together to form a bond; and $R^{8c}$ is hydrogen or alkyl which is optionally substituted with 1-2 substituents chosen from cycloalkyl and heterocyclyl, wherein said heterocyclyl is optionally substituted with 1-2 substituents chosen from halo, alkyl, and heterocyclyl;

$R^{b1}$ is alkyl which is optionally substituted with 1-2 substituents chosen from aryl and heteroaryl, wherein each of said aryl and heteroaryl is optionally substituted with 1-3 substituents chosen from alkyl, halo, hydroxy, alkoxy, cyano, haloalkyl, —NH$_2$, —NH(alkyl), and —N(alkyl)$_2$;

$R^{b2}$ and $R^{b3}$ are independently hydrogen or $C_{1-6}$ alkyl; or $R^{b2}$ and $R^{b3}$ together with the boron atom to which they are shown attached form an optionally substituted cyclic boronic ester having 2 to 20 carbons, and optionally containing one or two additional cyclic heteroatoms chosen from N, O and S; and m and n are independently 0 or 1;

provided that when W is —O—P-Q-C($R^{8a}$)═C($R^{8b}$)($R^{8c}$), or a group of formula

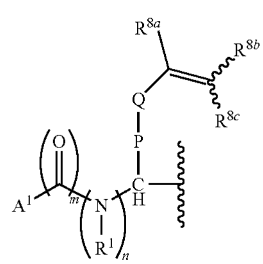

wherein m and n are each 0, then P is not -alkyl-N(R)— or

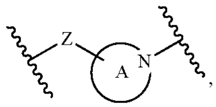

wherein ring A with the ring nitrogen atom as shown is an optionally substituted saturated monocyclic five- to seven-membered heterocyclyl with only the one nitrogen shown as the ring heteroatom, and wherein Z is connected to ring A at a carbon atom adjacent to the ring nitrogen atom.

In some embodiments of Embodiment 1A, $R^{8c}$ is alkyl which is optionally substituted with a heterocyclyl, wherein two substituents on the same carbon atom of said heterocyclyl are taken together with the carbon atom to which they are attached form a cycloalkyl, and wherein said heterocyclyl including said cycloalkyl is optionally substituted with 1-2 substituents chosen from halo, alkyl, and heterocyclyl.

Embodiment 2

The compound and/or pharmaceutically acceptable salt thereof of Embodiment 1, wherein:

said-alkyl-N(R)— of P is —$(CH_2)_{1-4}$N(R)—;

said-alkyl-aryl-N(R)— of P is —$(CH_2)_{1-4}$-phenyl-N(R)—;

said -alkyl-N(R)-aryl-N(R)— of P is —$(CH_2)_{1-4}$—N(R)-phenyl-N(R)—;

said-alkyl-O-aryl-N(R)— of P is —$(CH_2)_{1-4}$—O-phenyl-N(R)—;

said-alkyl-aryl-alkyl-N(R)— of P is —$(CH_2)_{1-4}$-phenyl-$(CH_2)_{1-4}$N(R)—;

said -alkyl-heteroaryl-N(R)— of P is —$(CH_2)_{1-4}$-heteroaryl-N(R)—;

said -alkyl-O-alkyl-N(R)— of P is —$(CH_2)_{1-4}$—O—$(CH_2)_{1-4}$N(R)—;

said -alkyl- of Z in

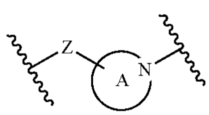

of P is —$(CH_2)_{1-4}$—;

said -alkyl-O— of Z in

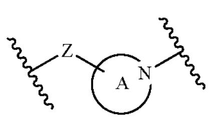

of P is —$(CH_2)_{1-4}$—O—;

said -alkyl-N(R)— of Z in

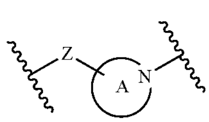

of P is —$(CH_2)_{1-4}$—N(R)—, wherein R is H, unsubstituted alkyl, or alkyl substituted with an alkoxy;

said -alkyl-O-alkyl- of Z in

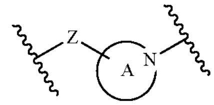

of P is —$(CH_2)_{1-4}$—O—$(CH_2)_1$ 4-;

said

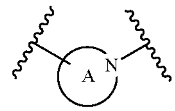

in said

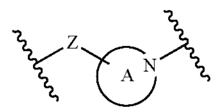

of P is a mono- or multicyclic heterocyclyl;

said $Z^1$ in said

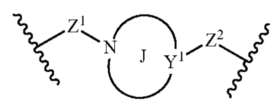

of P is —$(CH_2)_{1-4}$—; and said ring J in said

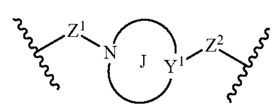

of P is heterocyclyl;

wherein each phenyl and each heterocyclyl is independently optionally substituted with 1-3 substituents independently chosen from halo, hydroxy, alkyl, alkoxy, cyano, haloalkyl, —$NH_2$, —NH(alkyl), —$N(alkyl)_2$, heterocyclyl, aryl, and heteroaryl.

Embodiment 2A

The compound and/or pharmaceutically acceptable salt thereof of Embodiment 2, wherein said -heteroaryl- of —$(CH_2)_{1-4}$-heteroaryl-N(R)— of P is pyridinyl, pyrimidinyl, pyrazinyl, imidazolyl, or thiazolyl.

Embodiment 2B

The compound and/or pharmaceutically acceptable salt thereof of Embodiment 2, wherein said heterocyclyl of ring J in

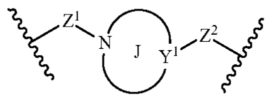

of P is a monocyclic ring.

Embodiment 2C

The compound and/or pharmaceutically acceptable salt thereof of Embodiment 2, wherein said heterocyclyl of ring J in

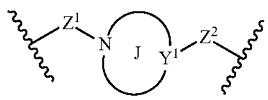

of P is a bicyclic ring.

Embodiment 2D

The compound and/or pharmaceutically acceptable salt thereof of Embodiment 2, wherein said heterocyclyl of ring J in

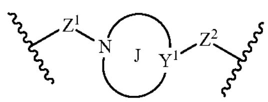

of P is pyrrolidinyl, azetidinyl, or piperadinyl.

Embodiment 2E

The compound and/or pharmaceutically acceptable salt thereof of Embodiment 2, wherein said heterocyclyl of ring A in

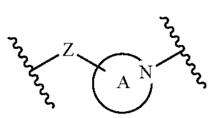

of P is a monocyclic ring.

Embodiment 2F

The compound and/or pharmaceutically acceptable salt thereof of Embodiment 2, wherein said heterocyclyl of ring A in

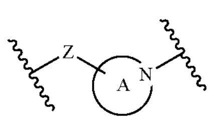

of P is a bicyclic ring.

Embodiment 3

The compound and/or pharmaceutically acceptable salt thereof of any of Embodiments 1-2, wherein:

said -alkyl-N(R)— of P is

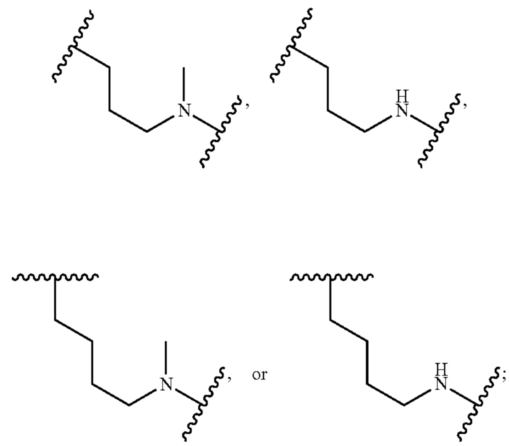

said -alkyl-aryl-N(R)— of P is

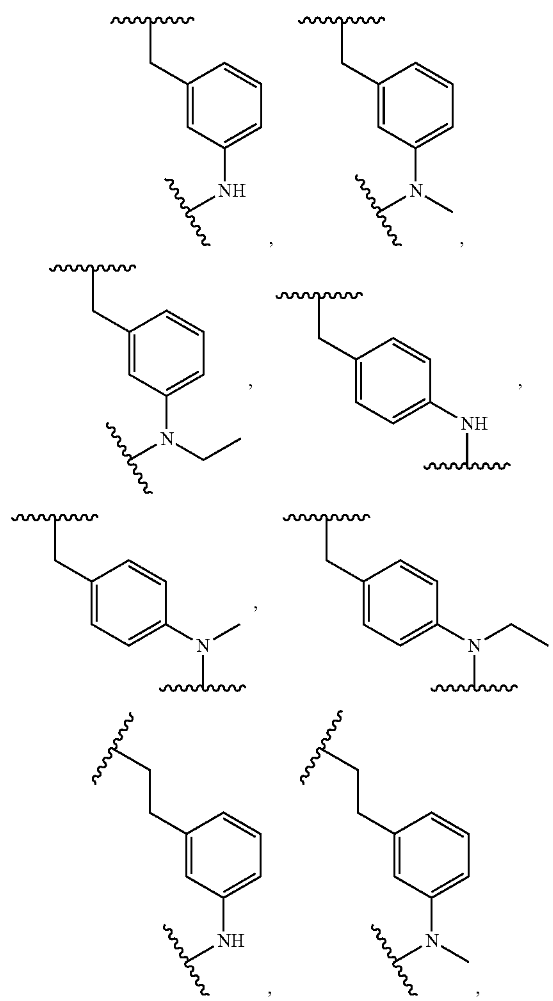

-continued
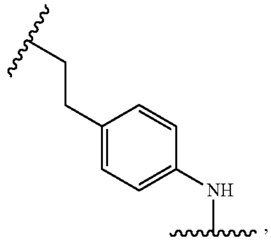
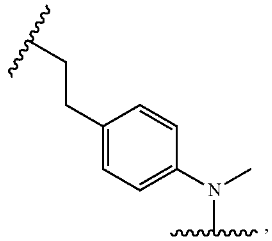
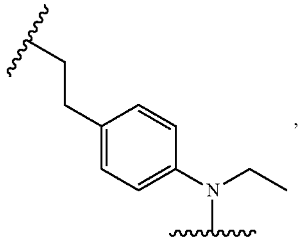
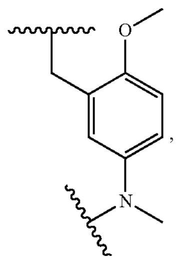
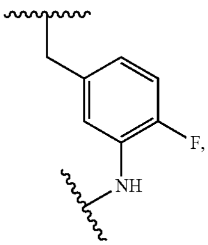
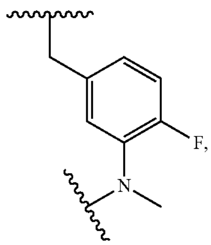
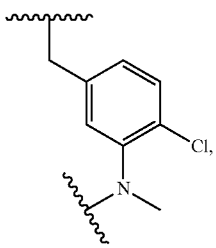
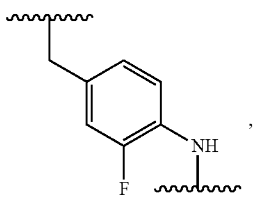
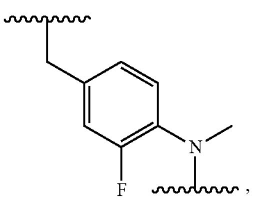
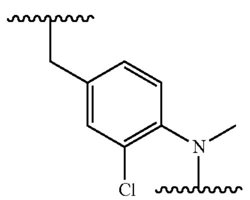
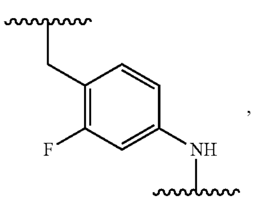
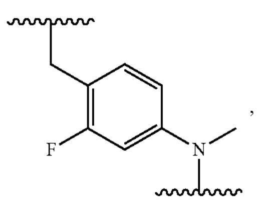
or
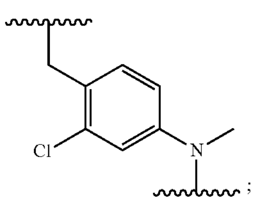
said -alkyl-N(R)-aryl-N(R)— of P is
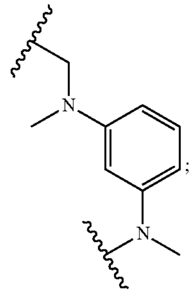
said -alkyl-O-aryl-N(R)— of P is
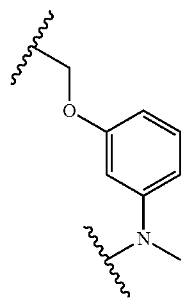
said -alkyl-aryl-alkyl-N(R)— of P is
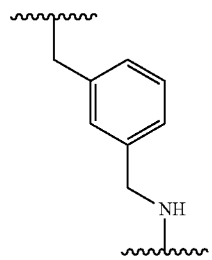
or
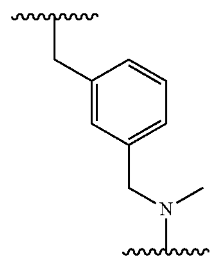
said -alkyl-heteroaryl-N(R)— of P is
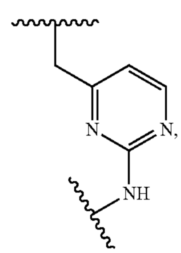
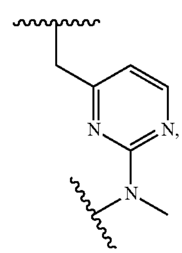
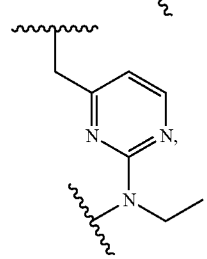
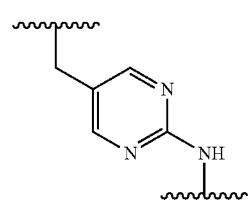

-continued
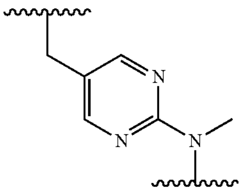,
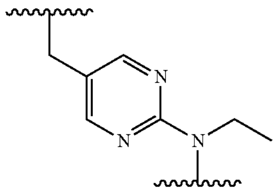,
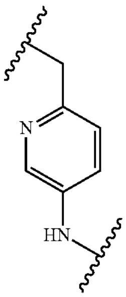,
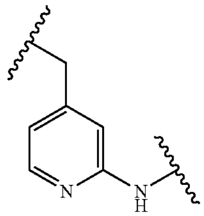,
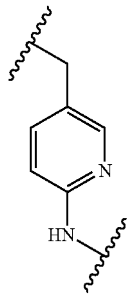,
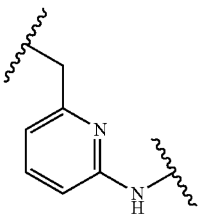,
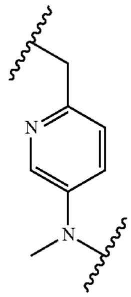,
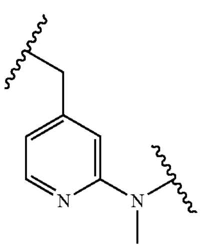,
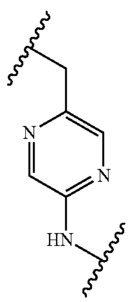,
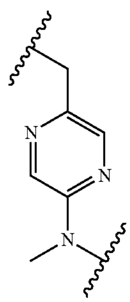,
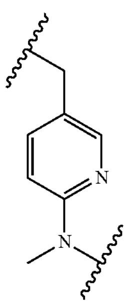,
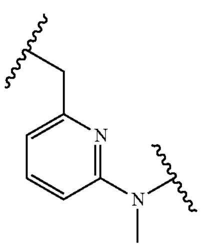,
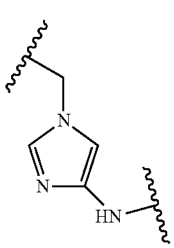
or
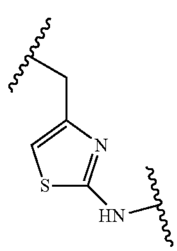;
said -alkyl-O-alkyl-N(R)— of P is
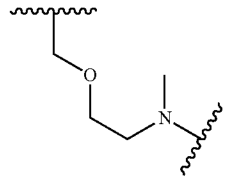
or
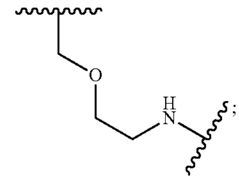;
said
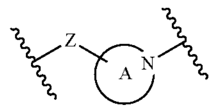
of P is
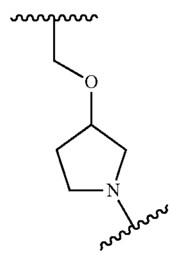,
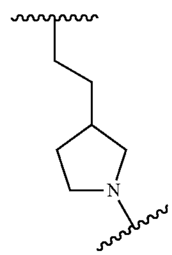,
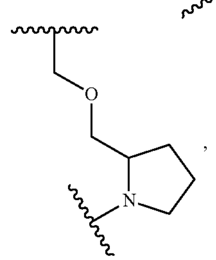,
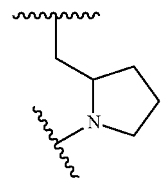,
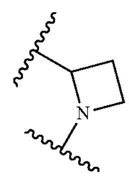,
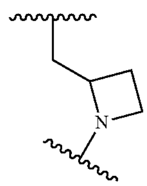,
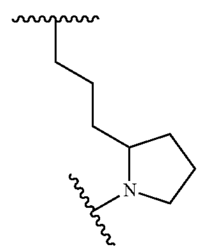,
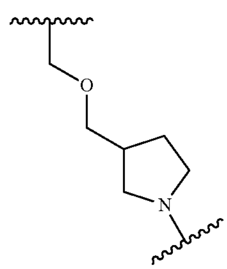,
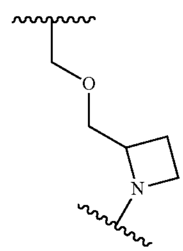,
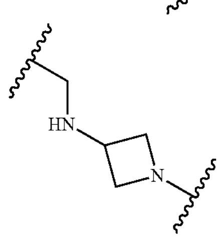,
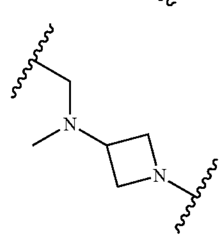, -continued
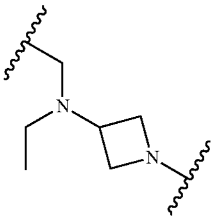,
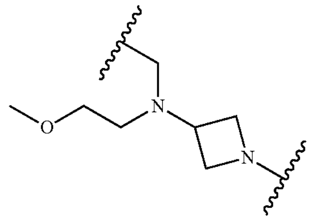,
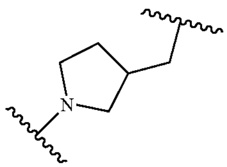,
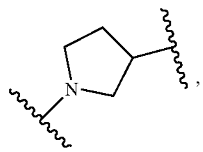,
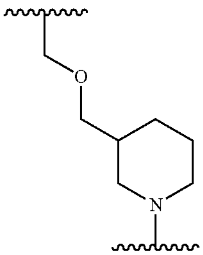,
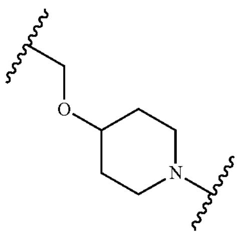,
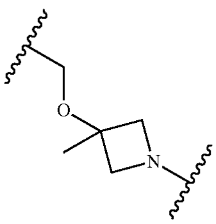,
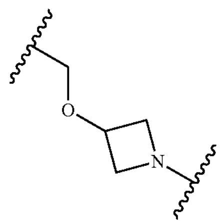,
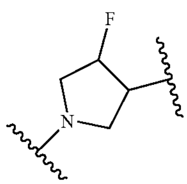,
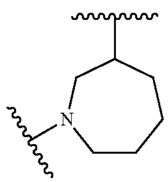,
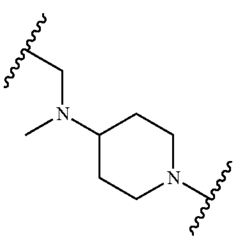,
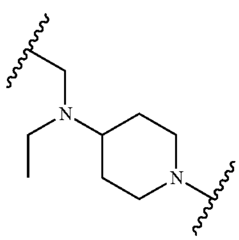,
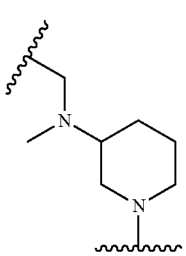,
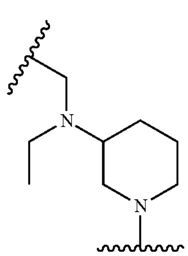,
-continued
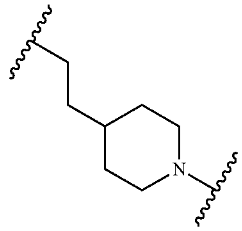,
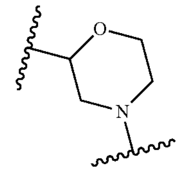,
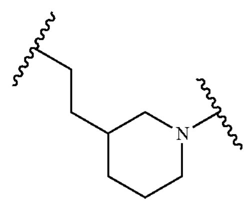,
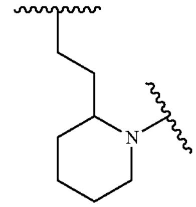,
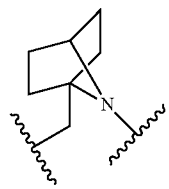,
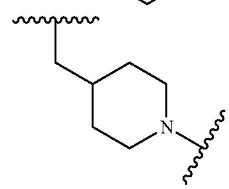,
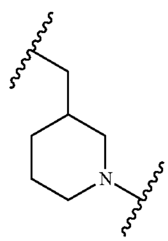,
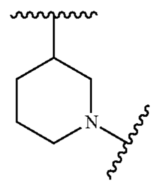,
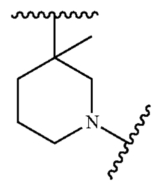, or
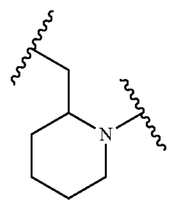;
and said
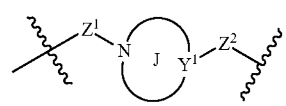
of P is
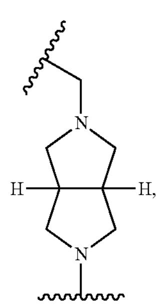
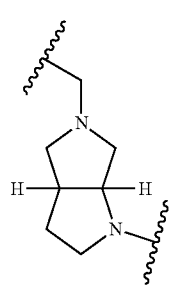,
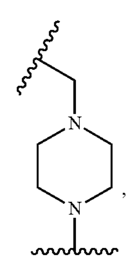, -continued

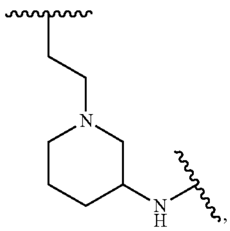,

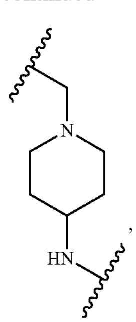,

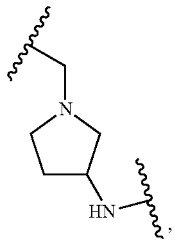,

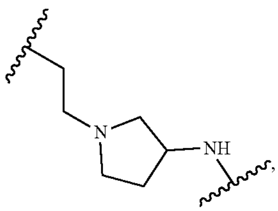,

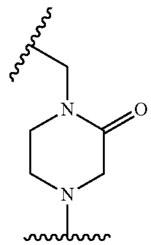

or

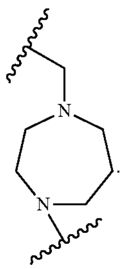.

Embodiment 4

The compound and/or pharmaceutically acceptable salt thereof of any of Embodiments 1-3, wherein the optional substituents of each of said cycloalkyl, heteroaryl, and heterocyclyl of $R^{8c}$ are 1-3 substituents independently chosen from halo, hydroxy, alkyl, alkoxy, cyano, haloalkyl, —$NH_2$, —SH, —C(═O)-alkyl, —C(═O)—O-alkyl, —O-alkyl-O-alkyl, —NH(alkyl), —NH(optionally substituted cycloalkyl), —NH(alkyl-O-alkyl), —N$(alkyl)_2$, —NH(optionally substituted heterocyclyl), —N(alkyl)(optionally substituted heterocyclyl), —N(optionally substituted cycloalkyl)(optionally substituted heterocyclyl), optionally substituted cycloalkyl, optionally substituted heterocyclyl, optionally substituted aryl, and optionally substituted heteroaryl, and wherein the optionally substituents of said alkyl are 1-3 substituents independently chosen from halo, hydroxy, alkoxy, cyano, —$NH_2$, —SH, —C(═O)-alkyl, —C(═O)—O-alkyl, —O— alkyl-O-alkyl, —NH(alkyl), —NH(optionally substituted cycloalkyl), —NH(alkyl-O-alkyl), —N$(alkyl)_2$, —NH(optionally substituted heterocyclyl), —N(alkyl)(optionally substituted heterocyclyl), —N(optionally substituted cycloalkyl)(optionally substituted heterocyclyl), optionally substituted cycloalkyl, optionally substituted heterocyclyl, optionally substituted aryl, and optionally substituted heteroaryl.

Embodiment 4A

The compound and/or pharmaceutically acceptable salt thereof of Embodiment 4, wherein $R^{8c}$ is alkyl which is optionally substituted with 1-3 substituents chosen from —N$(alkyl)_2$, —NH(alkyl), —N(alkyl)(optionally substituted heterocyclyl), —N(optionally substituted cycloalkyl)(optionally substituted heterocyclyl), —NH(optionally substituted heterocyclyl), alkoxy, hydroxy, —NH(alkyl-O-alkyl), optionally substituted heterocyclyl, optionally substituted heteroaryl, —O-alkyl-O-alkyl, —NH(optionally substituted cycloalkyl), —$NH_2$, and optionally substituted cycloalkyl; wherein the optional substituents of each of said optionally substituted cycloalkyl, optionally substituted heterocyclyl and optionally substituted heteroaryl are 1-3 substituents independently chosen from alkyl, -haloalkyl, halo, alkoxyalkyl, -hydroxy, —C(═O)-alkyl, —C(═O)—O-alkyl, —NH(alkyl), and heterocyclyl.

Embodiment 4B

The compound and/or pharmaceutically acceptable salt thereof of any of Embodiments 1-3, wherein the optional substituents of said alkyl of $R^{8c}$ are 1-3 substituents independently chosen from halo, hydroxy, alkoxy, cyano, —$NH_2$, —SH, —C(═O)-alkyl, —C(═O)—O-alkyl, —O-alkyl-O-alkyl, —NH(alkyl), —NH(optionally substituted cycloalkyl), —NH(alkyl-O-alkyl), —N$(alkyl)_2$, —NH(optionally substituted heterocyclyl), —N(alkyl)(optionally substituted heterocyclyl), —N(optionally substituted cycloalkyl)(optionally substituted heterocyclyl), optionally substituted cycloalkyl, optionally substituted heterocyclyl, optionally substituted aryl, and optionally substituted heteroaryl.

Embodiment 4C

The compound and/or pharmaceutically acceptable salt thereof of any of Embodiments 1-3, wherein the optional substituents of each of said cycloalkyl, heteroaryl, and heterocyclyl of $R^{8c}$ are 1-3 substituents independently chosen from halo, hydroxy, alkyl, alkoxy, cyano, haloalkyl, —$NH_2$, —SH, —C(═O)-alkyl, —C(═O)—O-alkyl, —O-alkyl-O-alkyl, —NH(alkyl), —NH(optionally substituted cycloalkyl), —NH(alkyl-O-alkyl), —N$(alkyl)_2$, —NH(optionally substituted heterocyclyl), —N(alkyl)(optionally substituted heterocyclyl), —N(optionally substituted cycloalkyl)(optionally substituted heterocyclyl), optionally substituted cycloalkyl, optionally substituted heterocyclyl, optionally substituted aryl, and optionally substituted heteroaryl.

Embodiment 4D

The compound and/or pharmaceutically acceptable salt thereof of Embodiment 4, wherein $R^{8c}$ is an unsubstituted or substituted alkyl chosen from:

,

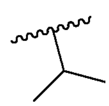,

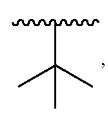,

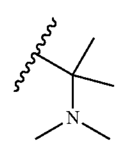,

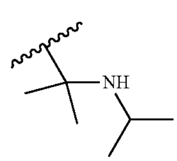,

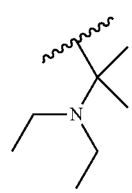,

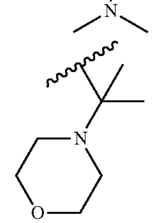,

-continued
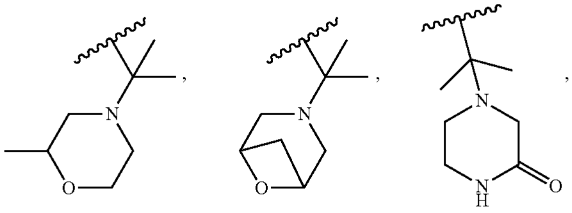
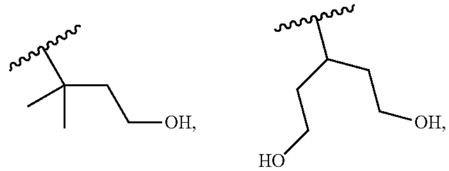
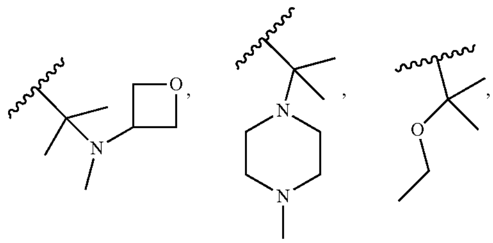
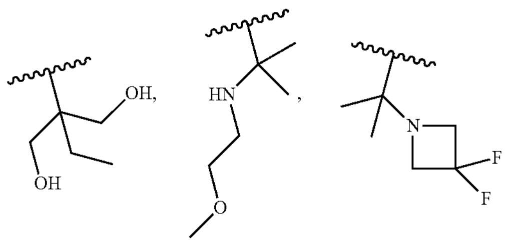
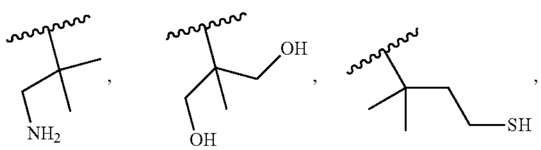
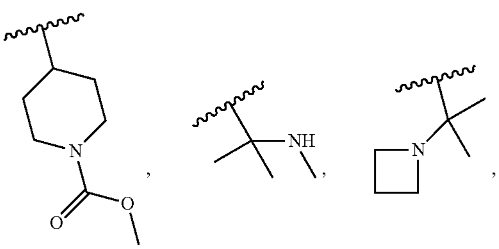
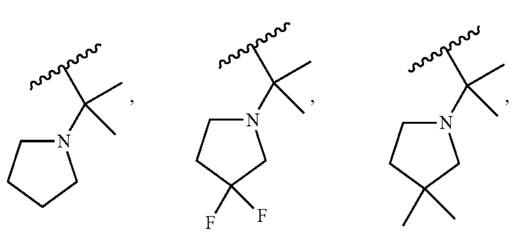
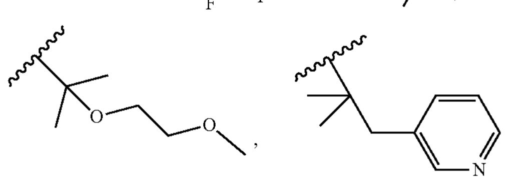
-continued
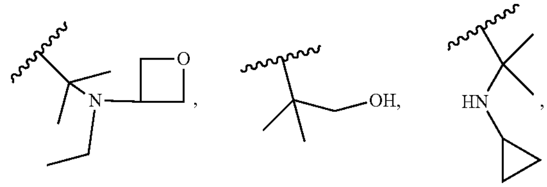
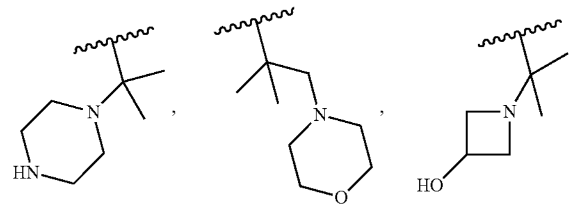
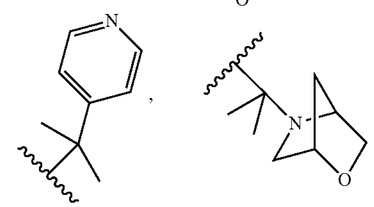
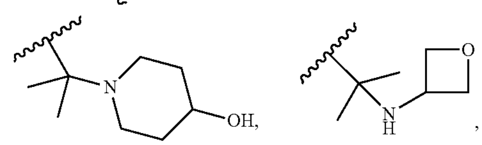
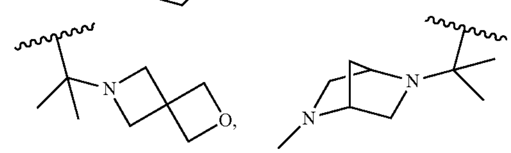
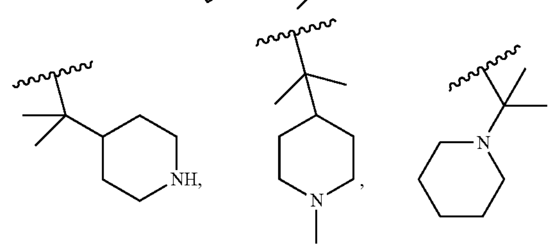
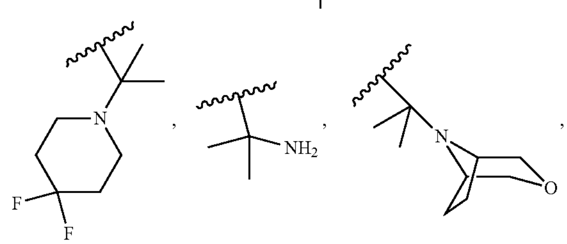
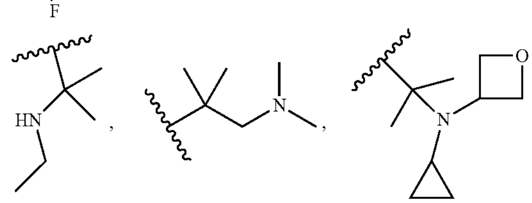
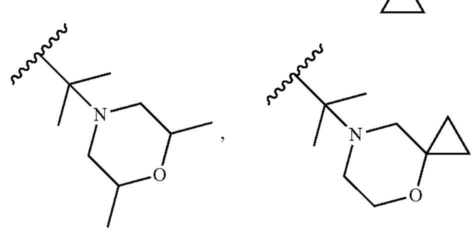

-continued

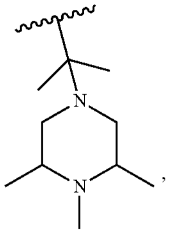
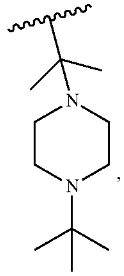
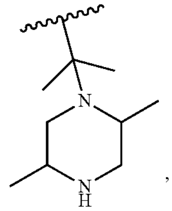
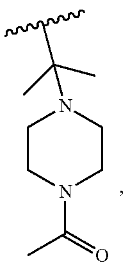
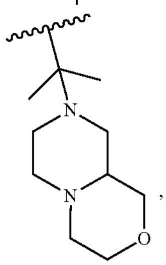
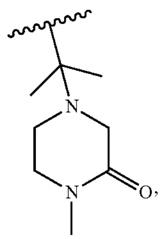
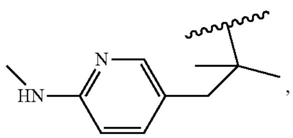
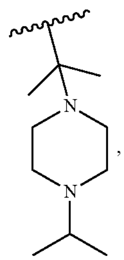
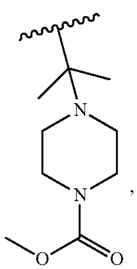
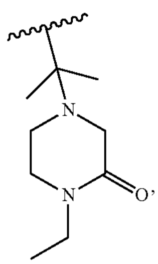
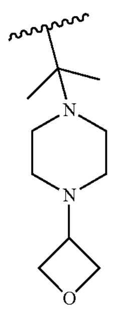
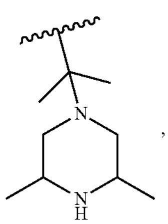
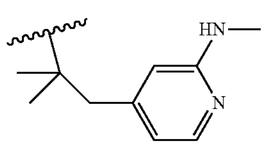
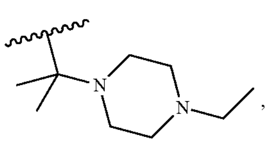
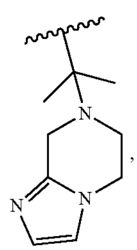

-continued

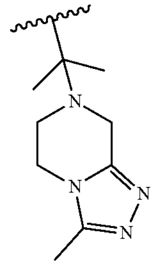
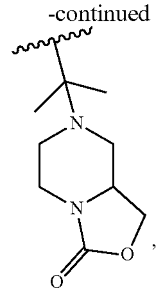
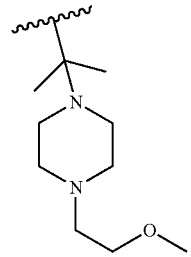
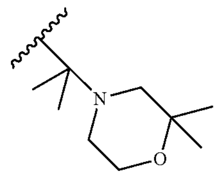

and

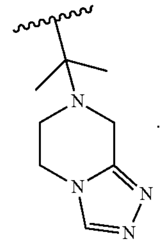

Embodiment 4E

The compound and/or pharmaceutically acceptable salt thereof of Embodiment 4, wherein $R^{8c}$ is heterocyclyl which is optionally substituted with 1-3 substituents chosen from alkyl, -alkoxyalkyl, —C(═O)-alkyl, —C(═O)—O-alkyl, and heterocyclyl.

Embodiment 4F

The compound and/or pharmaceutically acceptable salt thereof of Embodiment 4E, wherein $R^{8c}$ is an optionally substituted heterocyclyl chosen from:

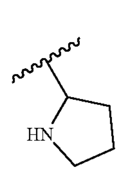
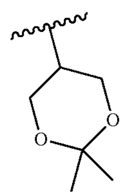
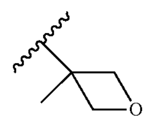
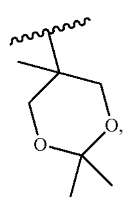
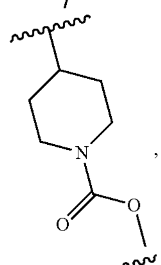
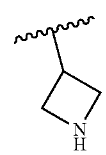
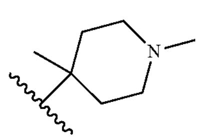
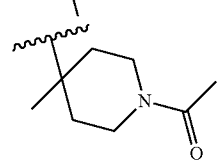
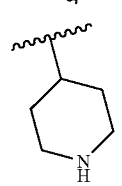
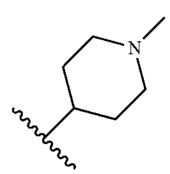
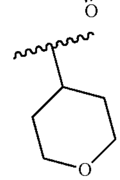

-continued

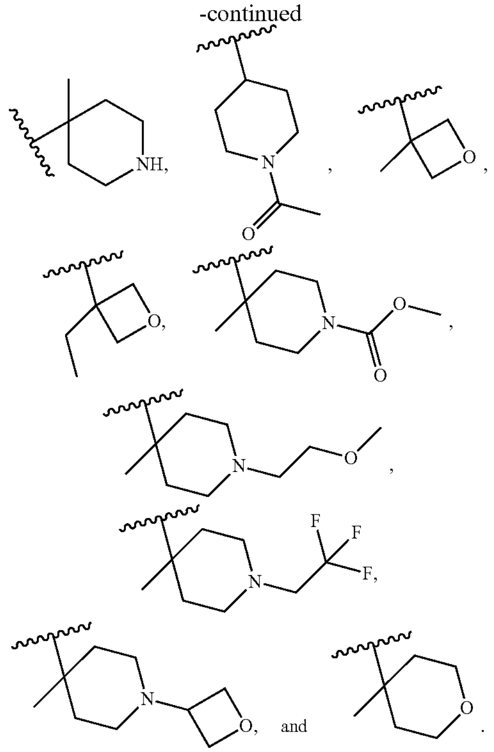

Embodiment 4F

The compound and/or pharmaceutically acceptable salt thereof of Embodiment 4, wherein $R^{8b}$ is an optionally substituted cycloalkyl chosen from:

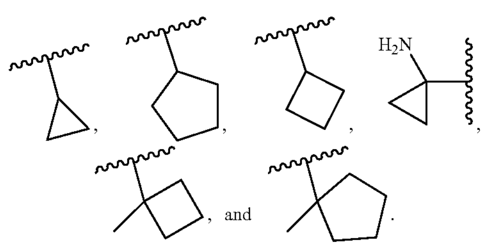

Embodiment 4G

The compound and/or pharmaceutically acceptable salt thereof of Embodiment 4, wherein $R^{8b}$ is hydrogen.

Embodiment 4H

The compound and/or pharmaceutically acceptable salt thereof of Embodiment 4, wherein $R^{8c}$ is hydrogen.

Embodiment 5

The compound and/or pharmaceutically acceptable salt thereof of any of Embodiments 1-4, wherein W is a group of formula

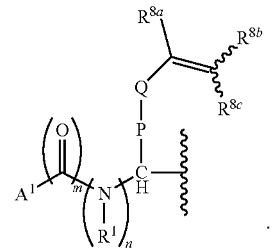

Embodiment 6

The compound and/or pharmaceutically acceptable salt thereof of any of Embodiments 1-4, wherein W is —O—P-Q-C($R^{8a}$)═C($R^{8b}$)($R^{8c}$) or —N(R)—P-Q-C($R^{8a}$)═C($R^{8b}$)($R^{8c}$).

Embodiment 6A

The compound and/or pharmaceutically acceptable salt thereof of Embodiment 6, wherein W is —N(R)—P-Q-C($R^{8a}$)═C($R^{8b}$)($R^{8c}$).

Embodiment 6B

The compound and/or pharmaceutically acceptable salt thereof of Embodiments 6, wherein W is —O—P-Q-C($R^{8a}$)═C($R^{8b}$)($R^{8c}$).

Embodiment 6C

The compound and/or pharmaceutically acceptable salt thereof of Embodiment 6,
wherein P is

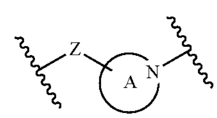

wherein Z is a covalent bond or -alkyl-, wherein said -alkyl- is —$(CH_2)_{1-4}$—.

Embodiment 6D

The compound and/or pharmaceutically acceptable salt thereof of Embodiment 6C, wherein P is

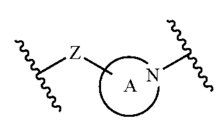

wherein Z is a covalent bond.

Embodiment 6E

The compound and/or pharmaceutically acceptable salt thereof of Embodiment 6C, wherein P is

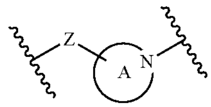

wherein Z is $—CH_2—$.

Embodiment 6F

The compound and/or pharmaceutically acceptable salt thereof of Embodiments 6C, wherein said

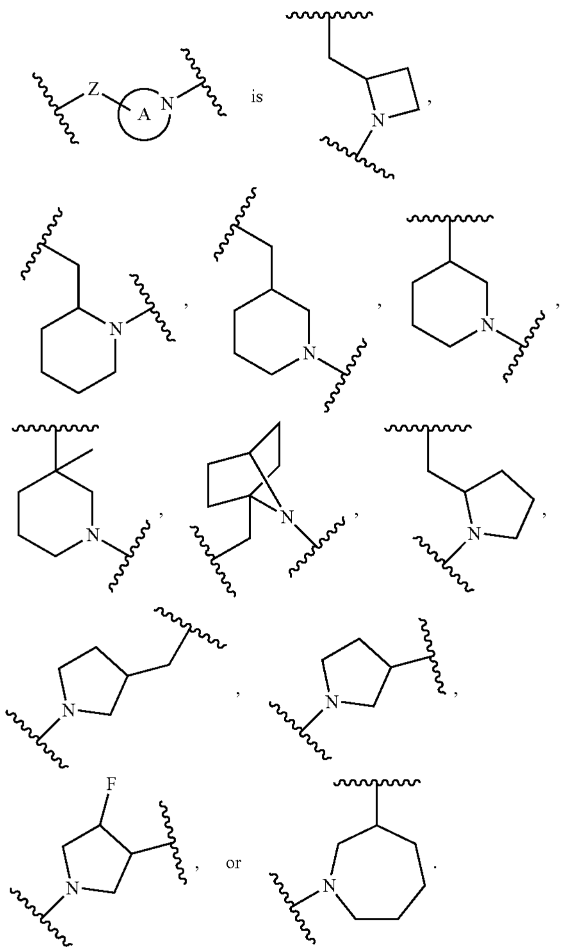

Embodiment 6G

The compound and/or pharmaceutically acceptable salt thereof of Embodiments 6A, wherein said

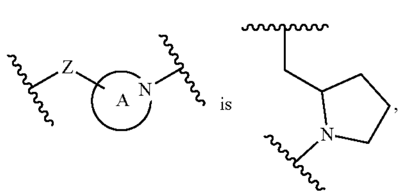

-continued

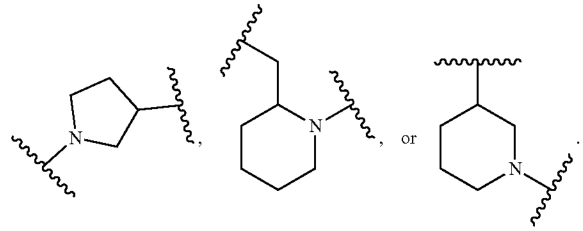

Embodiment 6H

The compound and/or pharmaceutically acceptable salt thereof of Embodiments 6B, wherein said

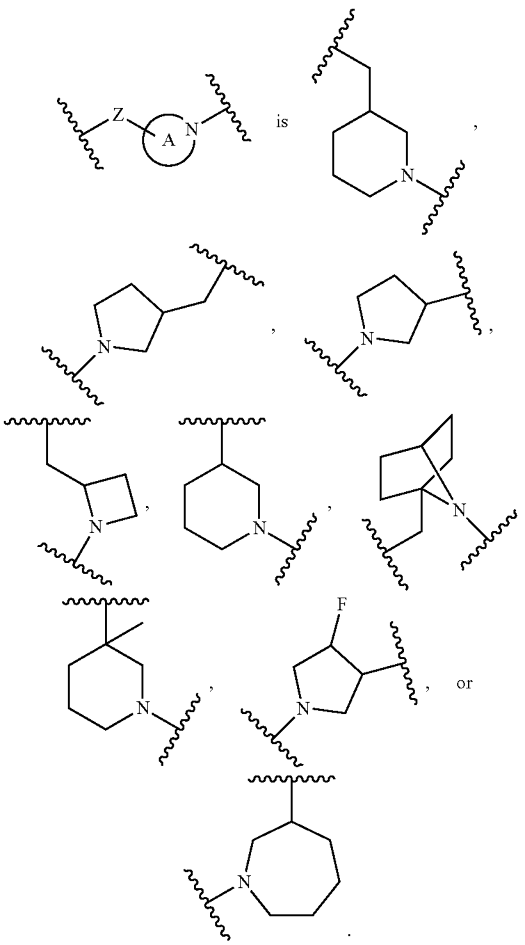

Embodiment 7

The compound and/or pharmaceutically acceptable salt thereof of Embodiment 5, wherein m and n are each 1.

Embodiment 8

The compound and/or pharmaceutically acceptable salt thereof of Embodiment 5, wherein m is 0 and n is 1.

Embodiment 9

The compound and/or pharmaceutically acceptable salt thereof of Embodiment 5, wherein m and n are each 0.

Embodiment 10

The compound and/or pharmaceutically acceptable salt thereof of Embodiment 7, wherein $A^1$ is optionally substituted alkyl, optionally substituted aryl, or optionally substituted heteroaryl.

Embodiment 10A

The compound and/or pharmaceutically acceptable salt thereof of Embodiment 10, wherein the optional substituents of alkyl of $A^1$ are 1-2 substituents chosen from —N(H)—C(═O)-alkyl, hydroxy, and halo.

Embodiment 10B

The compound and/or pharmaceutically acceptable salt thereof of Embodiment 10, wherein the optional substituents of said aryl of $A^1$ is are 1-3 substituents chosen from halo, hydroxy, alkyl, alkoxy, cyano, haloalkyl, —$NH_2$, —NH(alkyl), —N(alkyl)$_2$, heterocyclyl, aryl, and heteroaryl.

Embodiment 10C

The compound and/or pharmaceutically acceptable salt thereof of Embodiment 10, wherein the optional substituents of said heteroaryl of $A^1$ is are 1-3 substituents chosen from halo, hydroxy, alkyl, alkoxy, cyano, haloalkyl, —$NH_2$, —NH(alkyl), —N(alkyl)$_2$, heterocyclyl, aryl, and heteroaryl.

Embodiment 10D

The compound and/or pharmaceutically acceptable salt thereof of Embodiment 10A, wherein said optionally substituted alkyl of $A^1$ is $CH_3$, —CH(CH(OH)$CH_3$)—NH—C(═O)CH($CH_3$)$_2$, or CH($CH_3$)—NH—C(═O)—CH($CH_3$)$_2$.

Embodiment 10E

The compound and/or pharmaceutically acceptable salt thereof of Embodiment 10B, wherein said optionally substituted aryl of $A^1$ is 2,5-dichlorophenyl.

Embodiment 10F

The compound and/or pharmaceutically acceptable salt thereof of Embodiment 10C, wherein said optionally substituted heteroaryl of $A^1$ is 2-pyrazinyl, 4-methyl-3-pyridyl,

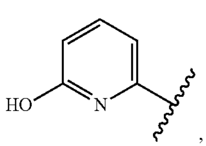
, or
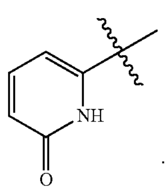
.

Embodiment 11

The compound and/or pharmaceutically acceptable salt thereof of Embodiment 7 or 10, wherein P is -alkyl-N(R)—, -alkyl-aryl-N(R)—,

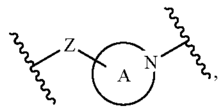
, or
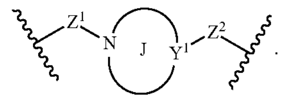
.

Embodiment 11A

The compound and/or pharmaceutically acceptable salt thereof of Embodiment 11, wherein said-alkyl-N(R)— of P is —($CH_2$)$_4$—N(H)—; said -alkyl-aryl-N(R)— of P is —$CH_2$-phenyl-N($CH_3$)—; and said

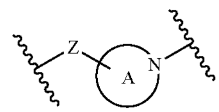

of P is —$CH_2$—O—$CH_2$-pyrrolidinyl-.

Embodiment 11B

The compound and/or pharmaceutically acceptable salt thereof of Embodiment 11A, wherein said —$CH_2$-phenyl-N($CH_3$)— is

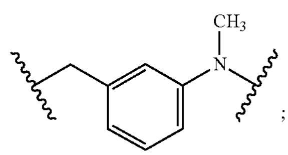 [SMILES: *Cc1cccc(N(*)C)c1]
;

and said —$CH_2$—O—$CH_2$-pyrrolidinyl- is

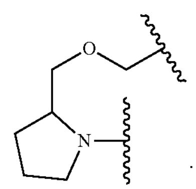 [SMILES: *COCC1CCCN1*]
.

Embodiment 12

The compound and/or pharmaceutically acceptable salt thereof of any of Embodiments 1-11, wherein $R^{b1}$ is optionally substituted alkyl wherein the optional substituents are 1-2 substituents chosen from —O-aryl, —O-heteroaryl, —N(R)-aryl, —N(R)-heteroaryl, cycloalkenyl, aryl, heterocyclyl, heterocyclenyl, or heteroaryl; wherein each instance of said aryl, heteroaryl, heterocyclyl, and heterocyclenyl is optionally substituted with 1-3 substituents independently chosen from halo, alkyl, alkoxy, haloalkyl, cyano, —$NH_2$, —NH(alkyl), —N(alkyl)$_2$, and heterocyclyl.

Embodiment 12A

The compound and/or pharmaceutically acceptable salt thereof of Embodiment 12, wherein said $R^{b1}$ is unsubstituted alkyl or a substituted alkyl of the formula —$(CH_2)_{1-2}$—R" wherein R" is —O-aryl, —O-heteroaryl, —N(R)-aryl, —N(R)-heteroaryl, cycloalkenyl, aryl, heterocyclyl, heterocyclenyl, or heteroaryl; wherein each instance of said aryl, heteroaryl, heterocyclyl, and heterocyclenyl is optionally substituted with 1-3 substituents independently chosen from halo, alkyl, alkoxy, haloalkyl, cyano, —$NH_2$, —NH(alkyl), —$N(alkyl)_2$, and heterocyclyl.

Embodiment 12B

The compound and/or pharmaceutically acceptable salt thereof of Embodiment 12, wherein $R^{b1}$ is optionally substituted alkyl, wherein the optional substituents are 1-2 substituents chosen from aryl, —O-aryl, heterocyclyl, —N(alkyl)-aryl, or heteroaryl, wherein each instance of said aryl, heterocyclyl, and heteroaryl is optionally substituted with 1-3 substituents independently chosen from halo, alkyl, alkoxy, haloalkyl, cyano, —$NH_2$, —NH(alkyl), —$N(alkyl)_2$, and heterocyclyl.

Embodiment 12C

The compound and/or pharmaceutically acceptable salt thereof of Embodiment 12, wherein said $R^{b1}$ is chosen from —$CH_2CH(CH_3)_2$, —$CH_2C(CH_3)_3$, —$CH_2$-cyclopentenyl, —$CH_2$-phenyl, —$CH_2$— phenyl-trifluoromethyl, —$CH_2$-phenyl-methyl, —$CH_2$-phenyl-ethyl, —$CH_2CH_2$-phenyl, —$CH_2$-phenyl-fluoro, —$CH_2$-thiophenyl, —$CH_2$—$CH_2$-benzofuranyl, —$CH_2CH_2$-benzimidazolyl, —$CH_2CH_2$-dihydroindolyl, —$CH_2$— benzofuranyl, —$CH_2$-benzimidazolyl, —$CH_2$-dihydroindolyl, —$CH_2$—O-phenyl, and —$CH_2$—$N(CH_3)$-phenyl.

Embodiment 12D

The compound and/or pharmaceutically acceptable salt thereof of Embodiment 12C, wherein $R^{b1}$ is chosen from —$CH_2CH(CH_3)_2$, —$CH_2$-cyclopentenyl, —$CH_2$-phenyl, —$CH_2$-phenyl-trifluoromethyl, —$CH_2$-fluorophenyl, —$CH_2$-phenyl-methyl, —$CH_2$-phenyl-ethyl, and —$CH_2$-benzofuranyl.

Embodiment 13

The compound and/or pharmaceutically acceptable salt thereof of any of Embodiments 1-12, wherein $R^{8a}$ is hydrogen or cyano; $R^{8b}$ is hydrogen or alkyl; or $R^{8a}$ and $R^{8b}$ are taken together to form a covalent bond.

Embodiment 14

The compound and/or pharmaceutically acceptable salt thereof of any of Embodiments 1-12, wherein $R^{8a}$, $R^{8b}$ and $R^{8c}$ are each hydrogen; or $R^{8a}$ is halogen, and $R^{8b}$ and $R^{8c}$ are each hydrogen.

Embodiment 15

The compound and/or pharmaceutically acceptable salt thereof of any of Embodiments 1-14, wherein $R^{b2}$ and $R^{b3}$ are each H; or wherein $R^{b2}$ and $R^{b3}$ together with the boron atom to which they are shown attached form a cyclic boronic ester of the formula

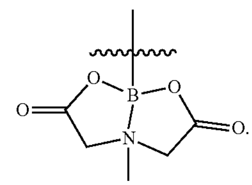

Embodiment 16

The compound and/or pharmaceutically acceptable salt thereof of any of Embodiments 7 and 10-15, wherein the compound is chosen from:

((R)-1-((S)-6-(2-cyano-4-methylpent-2-enamido)-2-((S)-2-isobutyramidopropanamido)hexanamido)-3-methylbutyl)boronic acid;
((R)-1-((S)-6-(2-cyano-4-methylpent-2-enamido)-2-(pyrazine-2-carboxamido)hexanamido)-3-methylbutyl)boronic acid;
((R)-1-((S)-6-(2-cyano-4-methylpent-2-enamido)-2-(2,5-dichlorobenzamido)hexanamido)-3-methylbutyl)boronic acid;
((R)-1-((S)-6-(2-cyano-4-methylpent-2-enamido)-2-((S)-2-isobutyramidopropanamido)hexanamido)-2-phenylethyl)boronic acid;
((R)-1-((S)-6-(2-cyano-4-methylpent-2-enamido)-2-(pyrazine-2-carboxamido)hexanamido)-2-phenylethyl)boronic acid;
((R)-1-((S)-6-(2-cyano-4-methylpent-2-enamido)-2-(6-hydroxypicolinamido)hexanamido)-2-phenylethyl)boronic acid;
((R)-1-((S)-6-(2-cyano-4-methylpent-2-enamido)-2-(6-hydroxypicolinamido)hexanamido)-3-methylbutyl)boronic acid;
((R)-1-((S)-6-(2-cyano-4-methylpent-2-enamido)-2-(6-oxo-1,6-dihydropyridine-2-carboxamido)hexanamido)-2-phenylethyl)boronic acid;
((R)-1-((S)-6-(2-cyano-4-methylpent-2-enamido)-2-(6-oxo-1,6-dihydropyridine-2-carboxamido)hexanamido)-3-methylbutyl)boronic acid;
((R)-1-((S)-6-(2-cyano-4-methylpent-2-enamido)-2-(2,5-dichlorobenzamido)hexanamido)-2-phenylethyl)boronic acid;
((R)-1-((S)-6-(2-cyano-4-methylpent-2-enamido)-2-((2S,3R)-3-hydroxy-2-isobutyramidobutanamido)hexanamido)-3-methylbutyl)boronic acid;
((R)-1-((S)-6-(2-cyano-4-methylpent-2-enamido)-2-((2S,3R)-3-hydroxy-2-isobutyramidobutanamido)hexanamido)-2-phenylethyl)boronic acid;
((R)-1-((S)-2-acetamido-6-(2-cyano-4-methylpent-2-enamido)hexanamido)-2-phenylethyl)boronic acid;
((R)-1-((S)-3-(((R)-1-(2-cyano-4-methylpent-2-enoyl)pyrrolidin-2-yl)methoxy)-2-(2,5-dichlorobenzamido)propanamido)-2-phenylethyl)boronic acid;
((R)-1-((S)-2-(2,5-dichlorobenzamido)-3-(3-(N-methylacrylamido)phenyl)propanamido)-2-phenylethyl)boronic acid;
((R)-1-((S)-2-(2,5-dichlorobenzamido)-3-(3-(N-methylvinylsulfonamido)phenyl)propanamido)-2-phenylethyl)boronic acid;

((R)-1-((S)-6-(2-cyano-4-methylpent-2-enamido)-2-(4-methylnicotinamido)hexanamido)-2-phenylethyl)boronic acid;
((R)-1-((S)-2-(2,5-dichlorobenzamido)-3-(3-(N-methylbut-2-ynamido)phenyl)propanamido)-2-phenylethyl)boronic acid;
8-((R)-1-((S)-3-(((R)-1-(2-cyano-4-methylpent-2-enoyl)pyrrolidin-2-yl)methoxy)-2-(2,5-dichlorobenzamido)propanamido)-2-phenylethyl)-4-methyl-2,6-dioxohexahydro-[1,3,2]oxazaborolo[2,3-b][1,3,2]oxazaborol-4-ium-8-uide;
((R)-1-((S)-3-(3-(2-cyano-N,4-dimethylpent-2-enamido)phenyl)-2-(2,5-dichlorobenzamido)propanamido)-2-phenylethyl)boronic acid; and
((R)-1-((S)-3-(3-(2-cyano-N,4-dimethylpent-2-enamido)phenyl)-2-(pyrazine-2-carboxamido)propanamido)-2-phenylethyl)boronic acid;
an individual E or Z isomer thereof; and/or
a pharmaceutically acceptable salt thereof.

Embodiment 17

The compound and/or pharmaceutically acceptable salt thereof of any of Embodiments 8 and 12-16 wherein $A^1$ is optionally substituted alkyl or —S(=O)$_2$-alkyl.

Embodiment 17A

The compound and/or pharmaceutically acceptable salt thereof of Embodiment 17, wherein said optional substituents of alkyl of $A^1$ are 1-2 substituents chosen from halo, hydroxy, alkoxy, cyano, haloalkyl, —$NH_2$, —NH(alkyl), —N(alkyl)$_2$, heterocyclyl, aryl, and heteroaryl.

Embodiment 17B

The compound and/or pharmaceutically acceptable salt thereof of Embodiment 17A, wherein $A^1$ is —$CH_2$—$CF_3$.

Embodiment 17C

The compound and/or pharmaceutically acceptable salt thereof of Embodiment 17, wherein $A^1$ is —S(=O)$_2$-alkyl, wherein said alkyl is methyl.

Embodiment 18

The compound and/or pharmaceutically acceptable salt thereof of any of Embodiments 8, 12-15, and 17, wherein P is -alkyl-N(R)—, -alkyl-aryl-N(R)—,

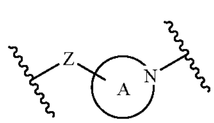

wherein Z is -alkyl-O-alkyl- and ring A with the ring nitrogen atom shown is a monocyclic five- to six-membered heterocyclyl, or

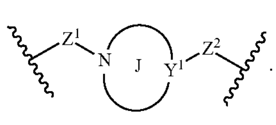

Embodiment 18A

The compound and/or pharmaceutically acceptable salt thereof of Embodiment 18, wherein said -alkyl-N(R)— of P is —$(CH_2)_4$—N(H)—; said

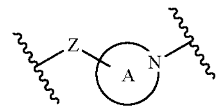

of P is —$CH_2$—O—$CH_2$-pyrrolidinyl; and said-alkyl-aryl-N(R)— of P is —$CH_2$-phenyl-N($CH_3$)—.

Embodiment 18B

The compound and/or pharmaceutically acceptable salt thereof of Embodiment 18A, wherein said —$CH_2$-phenyl-N($CH_3$)— is

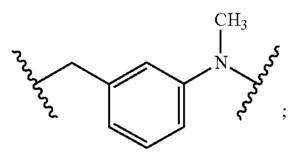 [SMILES: *Cc1cccc(N(*)C)c1]

and
said —$CH_2$—O—$CH_2$-pyrrolidinyl- is

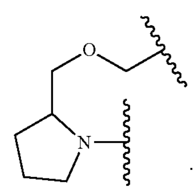 [SMILES: *COCC1CCCN1*]

Embodiment 19

The compound and/or pharmaceutically acceptable salt thereof of any of Embodiments 1-18, wherein $R^{8a}$ is cyano; and $R^{8b}$ is hydrogen or alkyl.

Embodiment 20

The compound and/or pharmaceutically acceptable salt thereof of any of Embodiments 8, 12-15, and 17-19, wherein the compound is chosen from:
((R)-1-((S)-6-(2-cyano-4-methylpent-2-enamido)-2-(methylsulfonamido)hexanamido)-2-phenylethyl)boronic acid;
((R)-1-((S)-6-(2-cyano-4-methylpent-2-enamido)-2-((2,2,2-trifluoroethyl)amino)hexanamido)-2-phenylethyl)boronic acid;
((R)-1-((S)-3-(((R)-1-(2-cyano-3-cyclopropylacryloyl)pyrrolidin-2-yl)methoxy)-2-((2,2,2-trifluoroethyl)amino)propanamido)-2-phenylethyl)boronic acid;
((R)-1-((S)-3-(((R)-1-(2-cyano-4-methylpent-2-enoyl)pyrrolidin-2-yl)methoxy)-2-((2,2,2-trifluoroethyl)amino)propanamido)-2-phenylethyl)boronic acid;
((R)-1-((S)-3-(((R)-1-(2-cyano-4,4-dimethylpent-2-enoyl)pyrrolidin-2-yl)methoxy)-2-((2,2,2-trifluoroethyl)amino)propanamido)-2-phenylethyl)boronic acid;

((R)-1-((S)-3-(((R)-1-(2-cyano-4-methylpent-2-enoyl)piperidin-2-yl)methoxy)-2-((2,2,2-trifluoroethyl)amino)propanamido)-2-phenylethyl)boronic acid;
((R)-1-((S)-3-(3-(2-cyano-N,4-dimethylpent-2-enamido)phenyl)-2-((2,2,2-trifluoroethyl)amino)propanamido)-2-phenylethyl)boronic acid;
((R)-1-((S)-3-(3-(2-cyano-N,4-dimethylpent-2-enamido)phenyl)-2-((2,2,2-trifluoroethyl)amino)propanamido)-3-methylbutyl)boronic acid;
((R)-1-((S)-3-(((R)-1-(2-cyano-4-methylpent-2-enoyl)pyrrolidin-2-yl)methoxy)-2-((2,2,2-trifluoroethyl)amino)propanamido)-3-methylbutyl)boronic acid;
((R)-1-((S)-3-(((R)-1-(2-cyano-4-methylpent-2-enoyl)pyrrolidin-2-yl)methoxy)-2-((2,2,2-trifluoroethyl)amino)propanamido)-2-(3-ethylphenyl)ethyl)boronic acid;
((R)-2-(benzofuran-3-yl)-1-((S)-3-(((R)-1-(2-cyano-4-methylpent-2-enoyl)pyrrolidin-2-yl)methoxy)-2-((2,2,2-trifluoroethyl)amino)propanamido)ethyl)boronic acid;
(R)-1-((S)-3-(((R)-1-(2-cyano-3-cyclopropylacryloyl)pyrrolidin-2-yl)methoxy)-2-(2,2,2-trifluoroethylamino)propanamido)-2-phenylethylboronic acid;
(R)-1-((S)-3-(((R)-1-(2-cyano-4-methylpent-2-enoyl)pyrrolidin-2-yl)methoxy)-2-(2,2,2-trifluoroethylamino)propanamido)-2-phenylethylboronic acid; and
(R)-1-((S)-3-(((R)-1-(2-cyano-4,4-dimethylpent-2-enoyl)pyrrolidin-2-yl)methoxy)-2-(2,2,2-trifluoroethylamino)propanamido)-2-phenylethylboronic acid;
an individual E or Z isomer thereof; and/or
a pharmaceutically acceptable salt thereof.

Embodiment 21

The compound and/or pharmaceutically acceptable salt thereof of Embodiment 9, wherein $A^1$ is hydrogen.

Embodiment 22

The compound and/or pharmaceutically acceptable salt thereof of Embodiment 9 or 21, wherein P is

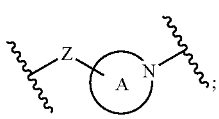

wherein Z is covalent bond or -alkyl-; and ring A with the ring nitrogen atom shown is piperidinyl or morpholinyl.

Embodiment 22A

The compound and/or pharmaceutically acceptable salt thereof of Embodiment 22, wherein said

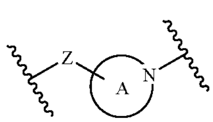

of P is —$(CH_2)_{2-3}$-piperidinyl-, -piperidinyl-, or -morpholinyl-.

Embodiment 22B

The compound and/or pharmaceutically acceptable salt thereof of Embodiment 22A, wherein said —$(CH_2)_{2-3}$-piperidinyl- of P is

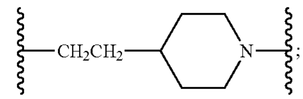

said piperidinyl of P is

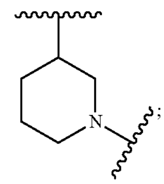 [SMILES: *C1CCCN(*)C1]

said morpholinyl of P is

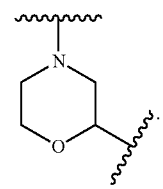 [SMILES: *C1CN(*)CCO1]

Embodiment 23

The compound and/or pharmaceutically acceptable salt thereof of any of Embodiments 9 and 21-22, wherein the compound is
(R)-(1-(4-(1-(2-cyano-4-methylpent-2-enoyl)piperidin-4-yl)butanamido)-2-phenylethyl)boronic acid;
((R)-1-(2-((R)-1-(2-cyano-4-(3,3-difluoropyrrolidin-1-yl)-4-methylpent-2-enoyl)piperidin-3-yl)acetamido)-2-phenylethyl)boronic acid;
((R)-1-(2-((R)-4-(2-cyano-4-(3,3-difluoropyrrolidin-1-yl)-4-methylpent-2-enoyl)morpholin-2-yl)acetamido)-2-phenylethyl)boronic acid;
((R)-1-(2-((S)-1-(2-cyano-4-(3,3-difluoropyrrolidin-1-yl)-4-methylpent-2-enoyl)piperidin-3-yl)acetamido)-2-phenylethyl)boronic acid; and
((R)-1-(2-((S)-4-(2-cyano-4-(3,3-difluoropyrrolidin-1-yl)-4-methylpent-2-enoyl)morpholin-2-yl)acetamido)-2-phenylethyl)boronic acid;
an individual E or Z isomer thereof; and/or
a pharmaceutically acceptable salt thereof.

Embodiment 24

The compound and/or pharmaceutically acceptable salt thereof of any of Embodiments 6A, 6C-6D and 12-15, wherein the compound is chosen from:
((R)-1-(3-(((R)-1-(2-cyano-4-methylpent-2-enoyl)pyrrolidin-2-yl)methyl)ureido)-2-phenylethyl)boronic acid;
((R)-1-(3-(((R)-1-(2-cyano-4-methylpent-2-enoyl)piperidin-2-yl)methyl)ureido)-2-phenylethyl)boronic acid;
((R)-1-(3-(((S)-1-(2-cyano-4-methylpent-2-enoyl)pyrrolidin-2-yl)methyl)ureido)-2-phenylethyl)boronic acid;
((R)-1-(3-(((S)-1-(2-cyano-4-methylpent-2-enoyl)piperidin-2-yl)methyl)ureido)-2-phenylethyl)boronic acid;
((R)-1-(3-(((R)-1-acryloylpyrrolidin-2-yl)methyl)ureido)-2-phenylethyl)boronic acid;

((R)-1-(3-(((S)-1-acryloylpyrrolidin-2-yl)methyl)ureido)-2-phenylethyl)boronic acid;
((R)-1-(3-(((S)-1-acryloylpiperidin-2-yl)methyl)ureido)-2-phenylethyl)boronic acid;
((R)-1-(3-(((S)-1-(2-cyano-4,4-dimethylpent-2-enoyl)pyrrolidin-2-yl)methyl)ureido)-2-phenylethyl)boronic acid;
((R)-1-(3-(((S)-1-(2-cyano-4,4-dimethylpent-2-enoyl)piperidin-2-yl)methyl)ureido)-2-phenylethyl)boronic acid;
((R)-1-(3-(((R)-1-acryloylpyrrolidin-2-yl)methyl)ureido)-2-(benzofuran-3-yl)ethyl)boronic acid;
((R)-1-(3-(((S)-1-(2-cyano-4,4-dimethylpent-2-enoyl)pyrrolidin-2-yl)methyl)ureido)-2-(p-tolyl)ethyl)boronic acid;
((R)-1-(3-(((R)-1-(2-cyano-4,4-dimethylpent-2-enoyl)pyrrolidin-2-yl)methyl)ureido)-2-(p-tolyl)ethyl)boronic acid;
((R)-2-(benzofuran-3-yl)-1-(3-(((R)-1-(2-cyano-4,4-dimethylpent-2-enoyl)pyrrolidin-2-yl)methyl)ureido)ethyl)boronic acid;
((R)-2-(benzofuran-3-yl)-1-(3-(((R)-1-(2-cyano-4-methyl-4-morpholinopent-2-enoyl)pyrrolidin-2-yl)methyl)ureido)ethyl)boronic acid;
((R)-2-(benzofuran-3-yl)-1-(3-(((R)-1-(2-cyano-4-methyl-4-(4-(oxetan-3-yl)piperazin-1-yl)pent-2-enoyl)pyrrolidin-2-yl)methyl)ureido)ethyl)boronic acid;
((R)-2-(benzofuran-3-yl)-1-(3-(((R)-1-(2-cyano-4-(4,4-difluoropiperidin-1-yl)-4-methylpent-2-enoyl)pyrrolidin-2-yl)methyl)ureido)ethyl)boronic acid;
((R)-2-(benzofuran-3-yl)-1-(3-(((R)-1-(2-cyano-4-(3,3-difluoropyrrolidin-1-yl)-4-methylpent-2-enoyl)pyrrolidin-2-yl)methyl)ureido)ethyl)boronic acid;
((R)-1-(3-(((R)-1-(2-cyano-4-(3,3-difluoropyrrolidin-1-yl)-4-methylpent-2-enoyl)piperidin-2-yl)methyl)-3-methylureido)-2-phenylethyl)boronic acid;
((R)-1-(3-((S)-1-(2-cyano-4-(3,3-difluoropyrrolidin-1-yl)-4-methylpent-2-enoyl)pyrrolidin-3-yl)ureido)-2-phenylethyl)boronic acid;
((R)-1-(3-((R)-1-(2-cyano-4-(3,3-difluoropyrrolidin-1-yl)-4-methylpent-2-enoyl)piperidin-3-yl)ureido)-2-phenylethyl)boronic acid; and
((R)-1-(3-((S)-1-(2-cyano-4-(3,3-difluoropyrrolidin-1-yl)-4-methylpent-2-enoyl)piperidin-3-yl)ureido)-2-phenylethyl)boronic acid;
an individual E or Z isomer thereof; and/or
a pharmaceutically acceptable salt thereof.

Embodiment 25

The compound and/or pharmaceutically acceptable salt thereof of any of Embodiments 6B-6D and 12-15, wherein the compound is chosen from:
((R)-1-(((((S)-1-(2-cyano-4,4-dimethylpent-2-enoyl)piperidin-3-yl)methoxy)carbonyl)amino)-2-(p-tolyl)ethyl)boronic acid;
((R)-1-(((((S)-1-(2-cyano-4,4-dimethylpent-2-enoyl)pyrrolidin-3-yl)methoxy)carbonyl)amino)-2-(p-tolyl)ethyl)boronic acid; and
((R)-1-(((((S)-1-acryloylazetidin-2-yl)methoxy)carbonyl)amino)-2-phenylethyl)boronic acid;
((R)-1-(((((S)-1-(2-cyano-4-(3,3-difluoropyrrolidin-1-yl)-4-methylpent-2-enoyl)piperidin-3-yl)methoxy)carbonyl)amino)-2-(p-tolyl)ethyl)boronic acid;
((R)-1-(((((S)-1-(2-cyano-4-(3,3-difluoropyrrolidin-1-yl)-4-methylpent-2-enoyl)piperidin-3-yl)methoxy)carbonyl)amino)-2-phenylethyl)boronic acid;
((R)-1-(((((R)-1-(2-cyano-4-(3,3-difluoropyrrolidin-1-yl)-4-methylpent-2-enoyl)azetidin-2-yl)methoxy)carbonyl)amino)-2-phenylethyl)boronic acid;
((R)-1-(((((R)-1-(2-cyano-4-(3,3-difluoropyrrolidin-1-yl)-4-methylpent-2-enoyl)piperidin-3-yl)oxy)carbonyl)amino)-2-phenylethyl)boronic acid; and
(R)-(1-((((7-(2-cyano-4-(3,3-difluoropyrrolidin-1-yl)-4-methylpent-2-enoyl)-7-azabicyclo[2.2.1]heptan-1-yl)methoxy)carbonyl)amino)-2-phenylethyl)boronic acid;
((R)-1-(((((S)-1-(2-cyano-4-(3,3-difluoropyrrolidin-1-yl)-4-methylpent-2-enoyl)piperidin-3-yl)oxy)carbonyl)amino)-2-phenylethyl)boronic acid;
((R)-1-(((((R)-1-acryloylazetidin-2-yl)methoxy)carbonyl)amino)-2-(benzofuran-3-yl)ethyl)boronic acid;
((R)-2-(benzofuran-3-yl)-1-(((((S)-1-(2-cyano-4-(3,3-dimethylpyrrolidin-1-yl)-4-methylpent-2-enoyl)piperidin-3-yl)oxy)carbonyl)amino)ethyl)boronic acid;
((R)-1-(((((S)-1-(2-cyano-4-(3,3-dimethylpyrrolidin-1-yl)-4-methylpent-2-enoyl)piperidin-3-yl)oxy)carbonyl)amino)-2-(4-(trifluoromethyl)phenyl)ethyl)boronic acid;
((R)-1-(((((S)-1-(2-cyano-4-(3,3-dimethylpyrrolidin-1-yl)-4-methylpent-2-enoyl)piperidin-3-yl)oxy)carbonyl)amino)-2-(4-fluorophenyl)ethyl)boronic acid;
((R)-2-(benzofuran-3-yl)-1-(((((S)-1-(2-cyano-4-(3,3-difluoropyrrolidin-1-yl)-4-methylpent-2-enoyl)piperidin-3-yl)oxy)carbonyl)amino)ethyl)boronic acid;
((R)-1-(((((S)-1-(2-fluoroacryloyl)piperidin-3-yl)oxy)carbonyl)amino)-2-(4-fluorophenyl)ethyl)boronic acid;
(R)-(1-((((7-(2-cyano-4-(3,3-difluoropyrrolidin-1-yl)-4-methylpent-2-enoyl)-7-azabicyclo[2.2.1]heptan-1-yl)methoxy)carbonyl)amino)-3-phenylpropyl)boronic acid;
((R)-1-(((((S)-1-(2-cyano-4-(3,3-difluoropyrrolidin-1-yl)-4-methylpent-2-enoyl)piperidin-3-yl)oxy)carbonyl)amino)-2-(4-fluorophenyl)ethyl)boronic acid;
((R)-1-(((((S)-1-(2-cyano-4-methyl-4-(4-(oxetan-3-yl)piperazin-1-yl)pent-2-enoyl)piperidin-3-yl)oxy)carbonyl)amino)-2-phenylethyl)boronic acid;
((R)-1-(((((S)-1-(2-cyano-4-methyl-4-(4-methylpiperazin-1-yl)pent-2-enoyl)piperidin-3-yl)oxy)carbonyl)amino)-2-phenylethyl)boronic acid;
(R)-(1-((((7-(2-cyano-4-methyl-4-morpholinopent-2-enoyl)-7-azabicyclo[2.2.1]heptan-1-yl)methoxy)carbonyl)amino)-2-phenylethyl)boronic acid;
(R)-(1-((((7-(2-cyano-4-methyl-4-morpholinopent-2-enoyl)-7-azabicyclo[2.2.1]heptan-1-yl)methoxy)carbonyl)amino)-2-(4-fluorophenyl)ethyl)boronic acid;
((R)-1-(((((S)-1-(2-cyano-4-(4-(methoxycarbonyl)piperazin-1-yl)-4-methylpent-2-enoyl)piperidin-3-yl)oxy)carbonyl)amino)-2-phenylethyl)boronic acid;
(R)-(1-((((7-(2-cyano-4-(3,3-difluoropyrrolidin-1-yl)-4-methylpent-2-enoyl)-7-azabicyclo[2.2.1]heptan-1-yl)methoxy)carbonyl)amino)-2-(4-fluorophenyl)ethyl)boronic acid;
((R)-1-(((((S)-1-((E)-2-cyano-4,4-dimethylpent-2-enoyl)pyrrolidin-3-yl)oxy)carbonyl)amino)-2-phenylethyl)boronic acid;
((R)-1-(((((S)-1-(2-cyano-4-(3,3-difluoropyrrolidin-1-yl)-4-methylpent-2-enoyl)pyrrolidin-3-yl)oxy)carbonyl)amino)-2-phenylethyl)boronic acid;
((R)-1-(((((R)-1-(2-cyano-4-(3,3-difluoropyrrolidin-1-yl)-4-methylpent-2-enoyl)pyrrolidin-3-yl)oxy)carbonyl)amino)-2-phenylethyl)boronic acid;
((R)-1-(((((R)-1-(2-cyano-4-(3,3-difluoropyrrolidin-1-yl)-4-methylpent-2-enoyl)-3-methylpiperidin-3-yl)oxy)carbonyl)amino)-2-phenylethyl)boronic acid;
((R)-1-(((((S)-1-(2-cyano-4-(3,3-difluoropyrrolidin-1-yl)-4-methylpent-2-enoyl)-3-methylpiperidin-3-yl)oxy)carbonyl)amino)-2-phenylethyl)boronic acid;

((1R)-1-((((1-(2-cyano-4-(3,3-difluoropyrrolidin-1-yl)-4-methylpent-2-enoyl)-3-methylpiperidin-3-yl)oxy)carbonyl)amino)-2-(4-fluorophenyl)ethyl)boronic acid;
((R)-1-(((((S)-1-(2-cyano-4-(3,3-difluoropyrrolidin-1-yl)-4-methylpent-2-enoyl)pyrrolidin-3-yl)methoxy)carbonyl)amino)-2-phenylethyl)boronic acid;
((R)-1-(((((S)-1-(2-cyano-4-(4-(methoxycarbonyl)piperazin-1-yl)-4-methylpent-2-enoyl)pyrrolidin-3-yl)methoxy)carbonyl)amino)-2-phenylethyl)boronic acid;
((R)-1-(((((S)-1-(2-cyano-4-methyl-4-((S)-3-oxotetrahydro-3H-oxazolo[34-a]pyrazin-7(1H)-yl)pent-2-enoyl)piperidin-3-yl)oxy)carbonyl)amino)-2-phenylethyl)boronic acid;
((R)-1-(((((S)-1-(2-cyano-4-methyl-4-((R)-3-oxotetrahydro-3H-oxazol[3,4-a]pyrazin-7(1H)-yl)pent-2-enoyl)piperidin-3-yl)oxy)carbonyl)amino)-2-phenylethyl)boronic acid;
((R)-1-(((((S)-1-(2-cyano-4-methyl-4-morpholinopent-2-enoyl)pyrrolidin-3-yl)methoxy)carbonyl)amino)-2-phenylethyl)boronic acid;
((R)-1-(((((R)-1-(2-cyano-4-methyl-4-morpholinopent-2-enoyl)azepan-3-yl)oxy)carbonyl)amino)-2-phenylethyl)boronic acid;
((R)-1-(((((S)-1-(2-cyano-4-methyl-4-morpholinopent-2-enoyl)azepan-3-yl)oxy)carbonyl)amino)-2-phenylethyl)boronic acid;
((R)-1-(((((R)-1-(2-cyano-4-(3,3-difluoropyrrolidin-1-yl)-4-methylpent-2-enoyl)azepan-3-yl)oxy)carbonyl)amino)-2-phenylethyl)boronic acid;
((R)-1-(((((S)-1-(2-cyano-4-(3,3-difluoropyrrolidin-1-yl)-4-methylpent-2-enoyl)azepan-3-yl)oxy)carbonyl)amino)-2-phenylethyl)boronic acid;
((R)-1-(((((R)-1-(2-cyano-4-(4-(methoxycarbonyl)piperazin-1-yl)-4-methylpent-2-enoyl)azepan-3-yl)oxy)carbonyl)amino)-2-phenylethyl)boronic acid;
((R)-1-(((((S)-1-(2-cyano-4-(4-(methoxycarbonyl)piperazin-1-yl)-4-methylpent-2-enoyl)azepan-3-yl)oxy)carbonyl)amino)-2-phenylethyl)boronic acid;
((R)-1-(((((3S,4S)-1-(2-cyano-4-(3,3-difluoropyrrolidin-1-yl)-4-methylpent-2-enoyl)-4-fluoropyrrolidin-3-yl)oxy)carbonyl)amino)-2-phenylethyl)boronic acid;
((R)-1-(((((3R,4S)-1-(2-cyano-4-(3,3-difluoropyrrolidin-1-yl)-4-methylpent-2-enoyl)-4-fluoropyrrolidin-3-yl)oxy)carbonyl)amino)-2-phenylethyl)boronic acid;
((R)-1-(((((3R,4R)-1-(2-cyano-4-(3,3-difluoropyrrolidin-1-yl)-4-methylpent-2-enoyl)-4-fluoropyrrolidin-3-yl)oxy)carbonyl)amino)-2-phenylethyl)boronic acid;
((R)-1-((((7-(2-cyano-4-((2S,6R)-2,6-dimethylmorpholino)-4-methylpent-2-enoyl)-7-azabicyclo[2.2.1]heptan-1-yl)methoxy)carbonyl)amino)-2-phenylethyl)boronic acid;
(R)-(1-((((7-(2-cyano-4-methyl-4-(4-oxa-7-azaspiro[2.5]octan-7-yl)pent-2-enoyl)-7-azabicyclo[2.2.1]heptan-1-yl)methoxy)carbonyl)amino)-2-phenylethyl)boronic acid;
((R)-1-(((((S)-1-(2-cyano-4-(3,3-difluoropyrrolidin-1-yl)-4-methylpent-2-enoyl)piperidin-3-yl)oxy)carbonyl)amino)-2-(cyclopent-1-en-1-yl)ethyl)boronic acid;
((R)-1-((((7-(2-cyano-4-methyl-4-((R)-2-methylmorpholino)pent-2-enoyl)-7-azabicyclo[2.2.1]heptan-1-yl)methoxy)carbonyl)amino)-2-phenylethyl)boronic acid;
(R)-(1-((((7-(2-cyano-4-(2,2-dimethylmorpholino)-4-methylpent-2-enoyl)-7-azabicyclo[2.2.1]heptan-1-yl)methoxy)carbonyl)amino)-2-phenylethyl)boronic acid;
((R)-1-(((((S)-1-(2-cyano-4-(4-(methoxycarbonyl)piperazin-1-yl)-4-methylpent-2-enoyl)piperidin-3-yl)oxy)carbonyl)amino)-2-(cyclopent-1-en-1-yl)ethyl)boronic acid;
((R)-1-(((((S)-1-(2-cyano-4-methyl-4-morpholinopent-2-enoyl)piperidin-3-yl)oxy)carbonyl)amino)-2-(cyclopent-1-en-1-yl)ethyl)boronic acid;
((R)-1-((((7-(2-cyano-4-methyl-4-((S)-2-methylmorpholino)pent-2-enoyl)-7-azabicyclo[2.2.1]heptan-1-yl)methoxy)carbonyl)amino)-2-phenylethyl)boronic acid;
((R)-1-((((7-(2-cyano-4-((2S,6S)-2,6-dimethylmorpholino)-4-methylpent-2-enoyl)-7-azabicyclo[2.2.1]heptan-1-yl)methoxy)carbonyl)amino)-2-phenylethyl)boronic acid;
((R)-1-(((((3S,4R)-1-acryloyl-4-fluoropyrrolidin-3-yl)oxy)carbonyl)amino)-2-phenylethyl)boronic acid;
((R)-1-(((((3S,4R)-1-(2-cyano-4-(3,3-difluoropyrrolidin-1-yl)-4-methylpent-2-enoyl)-4-fluoropyrrolidin-3-yl)oxy)carbonyl)amino)-2-phenylethyl)boronic acid;
((R)-1-((((7-(2-cyano-4-((2R,6R)-2,6-dimethylmorpholino)-4-methylpent-2-enoyl)-7-azabicyclo[2.2.1]heptan-1-yl)methoxy)carbonyl)amino)-2-phenylethyl)boronic acid;
((R)-1-(((((R)-1-(2-cyano-4-((2S,6R)-2,6-dimethylmorpholino)-4-methylpent-2-enoyl)azepan-3-yl)oxy)carbonyl)amino)-2-phenylethyl)boronic acid;
((R)-1-(((((R)-1-(2-cyano-4-((2R,6R)-2,6-dimethylmorpholino)-4-methylpent-2-enoyl)azepan-3-yl)oxy)carbonyl)amino)-2-phenylethyl)boronic acid;
((R)-1-(((((R)-1-(2-cyano-4-methyl-4-((S)-2-methylmorpholino)pent-2-enoyl)azepan-3-yl)oxy)carbonyl)amino)-2-phenylethyl)boronic acid;
((R)-1-(((((R)-1-(2-cyano-4-methyl-4-((R)-2-methylmorpholino)pent-2-enoyl)azepan-3-yl)oxy)carbonyl)amino)-2-phenylethyl)boronic acid;
((1R)-1-((((7-(4-(6-oxa-3-azabicyclo[3.1.1]heptan-3-yl)-2-cyano-4-methylpent-2-enoyl)-7-azabicyclo[2.2.1]heptan-1-yl)methoxy)carbonyl)amino)-2-phenylethyl)boronic acid;
((R)-1-(((((R)-1-(2-cyano-4-methyl-4-(4-oxa-7-azaspiro[2.5]octan-7-yl)pent-2-enoyl)azepan-3-yl)oxy)carbonyl)amino)-2-phenylethyl)boronic acid;
((1R)-1-(((((3R)-1-(4-(6-oxa-3-azabicyclo[3.1.1]heptan-3-yl)-2-cyano-4-methylpent-2-enoyl)azepan-3-yl)oxy)carbonyl)amino)-2-phenylethyl)boronic acid;
((R)-1-(((((3R,4R)-1-acryloyl-4-fluoropyrrolidin-3-yl)oxy)carbonyl)amino)-2-(4-fluorophenyl)ethyl)boronic acid;
((R)-1-(((((R)-1-(2-cyano-4-(2,2-dimethylmorpholino)-4-methylpent-2-enoyl)azepan-3-yl)oxy)carbonyl)amino)-2-phenylethyl)boronic acid;
((R)-1-(((((R)-1-(2-cyano-4-methyl-4-morpholinopent-2-enoyl)azepan-3-yl)oxy)carbonyl)amino)-2-(4-fluorophenyl)ethyl)boronic acid; and
((R)-1-(((((R)-1-(2-cyano-4-methyl-4-morpholinopent-2-enoyl)azepan-3-yl)oxy)carbonyl)amino)-2-(cyclopent-1-en-1-yl)ethyl)boronic acid;
an individual E or Z isomer thereof; and/or
a pharmaceutically acceptable salt thereof.

Embodiment 25A

The compound and/or pharmaceutically acceptable salt thereof of any of Embodiments 6B-6D and 14-15, wherein the compound is chosen from:
(R)-(1-((((7-acryloyl-7-azabicyclo[2.2.1]heptan-1-yl)methoxy)carbonyl)amino)-2-(benzofuran-3-yl)ethyl)boronic acid;
((R)-1-(((((S)-1-acryloylpiperidin-3-yl)oxy)carbonyl)amino)-2-(benzofuran-3-yl)ethyl)boronic acid;
((R)-1-(((((S)-1-acryloylpiperidin-3-yl)oxy)carbonyl)amino)-2-(4-(trifluoromethyl)phenyl)ethyl)boronic acid;

((R)-1-(((((S)-1-acryloylpiperidin-3-yl)oxy)carbonyl)amino)-2-phenylethyl)boronic acid;
((R)-1-(((((S)-1-acryloylpiperidin-3-yl)oxy)carbonyl)amino)-2-(4-fluorophenyl)ethyl)boronic acid;
(R)-(1-((((7-acryloyl-7-azabicyclo[2.2.1]heptan-1-yl)methoxy)carbonyl)amino)-3-phenylpropyl)boronic acid;
(R)-(1-((((7-(2-fluoroacryloyl)-7-azabicyclo[2.2.1]heptan-1-yl)methoxy)carbonyl)amino)-2-(4-fluorophenyl)ethyl)boronic acid;
(R)-(1-((((7-acryloyl-7-azabicyclo[2.2.1]heptan-1-yl)methoxy)carbonyl)amino)-2-(4-fluorophenyl)ethyl)boronic acid;
((1R)-1-(((((1-acryloyl-3-methylpiperidin-3-yl)oxy)carbonyl)amino)-2-phenylethyl)boronic acid;
(R)-(1-((((1-acryloylazetidin-3-yl)methoxy)carbonyl)amino)-2-phenylethyl)boronic acid;
((R)-1-(((((S)-1-acryloylpyrrolidin-3-yl)oxy)carbonyl)amino)-2-phenylethyl)boronic acid;
((1R)-1-((((1-acryloyl-3-methylpiperidin-3-yl)oxy)carbonyl)amino)-2-(4-fluorophenyl)ethyl)boronic acid;
((R)-1-(((((3R,4R)-1-acryloyl-4-fluoropyrrolidin-3-yl)oxy)carbonyl)amino)-2-phenylethyl)boronic acid;
((R)-1-(((((3R,4S)-1-acryloyl-4-fluoropyrrolidin-3-yl)oxy)carbonyl)amino)-2-phenylethyl)boronic acid;
((R)-1-(((((3S,4R)-1-acryloyl-4-fluoropyrrolidin-3-yl)oxy)carbonyl)amino)-2-phenylethyl)boronic acid; and
((R)-1-(((((3R,4R)-1-acryloyl-4-fluoropyrrolidin-3-yl)oxy)carbonyl)amino)-2-(4-fluorophenyl)ethyl)boronic acid;
an individual E or Z isomer thereof; and/or
a pharmaceutically acceptable salt thereof.

Embodiment 26

Combinations of certain embodiments are further contemplated herein.

For example, in certain embodiments of Formula (I), wherein W is —O—P-Q-C($R^{8a}$)=C($R^{8b}$)($R^{8c}$) (Embodiment 6B); P is

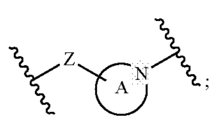

Q is —C(=O)—; and $R^{8a}$ is cyano; such that the compound of Formula (I) is a compound of Formula I(a)

Formula I(a)

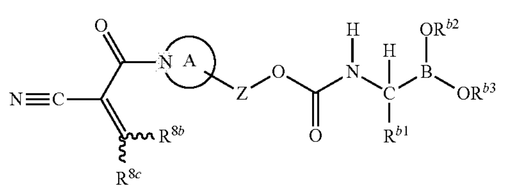

wherein $R^{b1}$, $R^{b2}$, $R^{b3}$, ring A (with the nitrogen atom shown), Z, $R^{8b}$, and $R^{8c}$ are as set forth for Formula (I).

Embodiment 26A

The compound and/or pharmaceutically acceptable salt of Embodiment 26, wherein in Formula I(a), $R^{b1}$ is —$CH_2$-(optionally substituted phenyl) or —$CH_2$-(optionally substituted benzofuranyl); Z is covalent bond; and ring A with the ring nitrogen atom shown is azetidinyl, pyrrolidinyl, piperidinyl, or azabicyclo[2.2.1]heptan-1yl.

Embodiment 26B

The compound and/or pharmaceutically acceptable salt of Embodiment 26, wherein in Formula I(a), $R^{b1}$ is —$CH_2$-(optionally substituted phenyl) or —$CH_2$-(optionally substituted benzofuranyl); Z is —$CH_2$—; and ring A with the ring nitrogen atom shown is azetidinyl, pyrrolidinyl, piperidinyl, or azabicyclo[2.2.1]heptan-1yl.

Embodiment 26C

The compound and/or pharmaceutically acceptable salt of Embodiment 26A or 26B, wherein $R^{b1}$ is —$CH_2$-phenyl, —$CH_2$-fluorophenyl, —$CH_2$-phenyl-methyl, —$CH_2$-phenyl-ethyl, or —$CH_2$— benzofuranyl.

Embodiment 26D

The compound and/or pharmaceutically acceptable salt of Embodiment 26A or 26B, wherein in Formula I(a):

said azetidinyl of ring A is

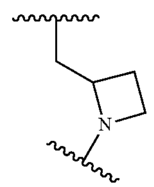

said pyrrolidinyl of ring A is

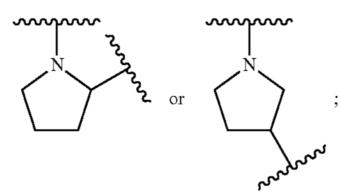 [SMILES: *C1CCCN1* ; *C1CCN(*)C1]

said piperidinyl of ring A is

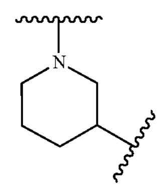

and said 7-azabicyclo[2.2.1]heptan-yl- of ring A is

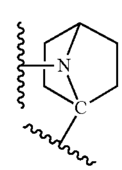

Embodiment 26E

The compound and/or pharmaceutically acceptable salt of Embodiment 26, wherein in Formula I(a), $R^{b2}$ and $R^{b3}$ are each hydrogen.

Embodiment 26F

The compound and/or a pharmaceutically acceptable salt of Embodiment 26, wherein in Formula I(a), $R^{8b}$ is H; and $R^{8c}$ is H or optionally substituted alkyl.

Embodiment 26G

The compound and/or a pharmaceutically acceptable salt of Embodiment 26, wherein in Formula I(a), $R^{8b}$ is H; and $R^{8c}$ is H.

Embodiment 26H

The compound and/or a pharmaceutically acceptable salt of Embodiment 26, wherein the optional substituent of said alkyl of $R^{8c}$ is

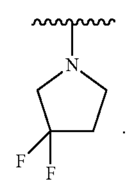 [SMILES: *N1CCC(F)(F)C1]

Embodiment 26I

The compound and/or pharmaceutically acceptable salt of Embodiment 26, wherein the compound of Formula I(a) is the E-isomer.

Embodiment 26J

The compound and/or pharmaceutically acceptable salt of Embodiment 26, wherein the compound of Formula I(a) is the Z-isomer.

Embodiment 26K

The compound and/or pharmaceutically acceptable salt of Embodiment 26, wherein the compound of Formula I(a) is chosen from:

((R)-1-(((((S)-1-(2-cyano-4,4-dimethylpent-2-enoyl)piperidin-3-yl)methoxy)carbonyl)amino)-2-(p-tolyl)ethyl)boronic acid;

((R)-1-(((((S)-1-(2-cyano-4,4-dimethylpent-2-enoyl)pyrrolidin-3-yl)methoxy)carbonyl)amino)-2-(p-tolyl)ethyl)boronic acid;

((R)-1-(((((S)-1-(2-cyano-4-(3,3-difluoropyrrolidin-1-yl)-4-methylpent-2-enoyl)piperidin-3-yl)methoxy)carbonyl)amino)-2-(p-tolyl)ethyl)boronic acid;

((R)-1-(((((S)-1-(2-cyano-4-(3,3-difluoropyrrolidin-1-yl)-4-methylpent-2-enoyl)piperidin-3-yl)methoxy)carbonyl)amino)-2-phenylethyl)boronic acid;

((R)-1-(((((R)-1-(2-cyano-4-(3,3-difluoropyrrolidin-1-yl)-4-methylpent-2-enoyl)azetidin-2-yl)methoxy)carbonyl)amino)-2-phenylethyl)boronic acid;

((R)-1-(((((R)-1-(2-cyano-4-(3,3-difluoropyrrolidin-1-yl)-4-methylpent-2-enoyl)piperidin-3-yl)oxy)carbonyl)amino)-2-phenylethyl)boronic acid;

((R)-1-(((((S)-1-(2-cyano-4-(3,3-difluoropyrrolidin-1-yl)-4-methylpent-2-enoyl)piperidin-3-yl)oxy)carbonyl)amino)-2-phenylethyl)boronic acid;

((R)-1-(((((R)-1-acryloylazetidin-2-yl)methoxy)carbonyl)amino)-2-(benzofuran-3-yl)ethyl)boronic acid; and (R)-(1-((((7-acryloyl-7-azabicyclo[2.2.1]heptan-1-yl)methoxy)carbonyl)amino)-2-(benzofuran-3-yl)ethyl)boronic acid;

(R)-(1-((((7-(2-cyano-4-methyl-4-morpholinopent-2-enoyl)-7-azabicyclo[2.2.1]heptan-1-yl)methoxy)carbonyl)amino)-2-phenylethyl)boronic acid; and (R)-(1-((((7-(2-cyano-4-methyl-4-morpholinopent-2-enoyl)-7-azabicyclo[2.2.1]heptan-1-yl)methoxy)carbonyl)amino)-2-(4-fluorophenyl)ethyl)boronic acid;

an individual E or Z isomer thereof; and/or a pharmaceutically acceptable salt thereof.

Embodiment 27

The compound and/or a pharmaceutically acceptable salt of Formula (I), wherein W is —N(R)—P-Q-C($R^{8a}$)═C($R^{8b}$)($R^{8c}$) (Embodiment 6A); P is

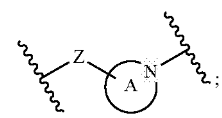

and Q is —C(═O)—; such that the compound of Formula (I) is a compound of Formula I(b)

Formula I(b)

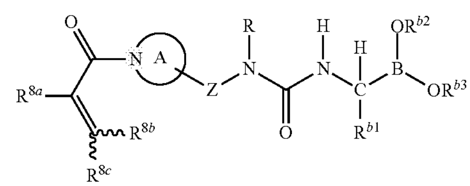

wherein $R^{b1}$, $R^{b2}$, $R^{b3}$, ring A (with the nitrogen atom shown), Z, $R^{8a}$, $R^{8b}$, and $R^{8c}$ are as set forth for Formula (I).

Embodiment 27A

The compound and/or pharmaceutically acceptable salt of Embodiment 27, wherein in Formula I(b), $R^{b1}$ is —$CH_2$-(optionally substituted phenyl) or —$CH_2$-(optionally substituted benzofuranyl), wherein the optional substituent in each instance is 1-2 substituents chosen from alkyl, haloalkyl, cyano, alkoxy, hydroxy, —$NH_2$, —NH(alkyl), and —N(alkyl)$_2$; Z is covalent bond; and ring A with the ring nitrogen atom shown is pyrrolidinyl, Embodiment 27B The compound and/or pharmaceutically acceptable salt of Embodiment 27, wherein in Formula I(b), $R^{b1}$ is —$CH_2$-(optionally substituted phenyl) or —$CH_2$-(optionally substituted benzofuranyl), wherein the optional substituent in each instance is 1-2 substituents chosen from alkyl, haloalkyl, cyano, alkoxy, hydroxy, —$NH_2$, —NH(alkyl), and —N(alkyl)$_2$; Z is —$CH_2$—; and ring A with the ring nitrogen atom shown is pyrrolidinyl, Embodiment 27C The compound and/or a pharmaceutically acceptable salt of Embodiment 27A or 27B, wherein $R^{b1}$ is —$CH_2$-phenyl, —$CH_2$-phenyl-methyl, or —$CH_2$-benzofuranyl.

Embodiment 27D

The compound and/or a pharmaceutically acceptable salt of Embodiment 27A or 27B, wherein in Formula I(a), said pyrrolidinyl of ring A is

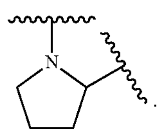 [SMILES: *C1CCCN1*]

Embodiment 27E

The compound and/or a pharmaceutically acceptable salt of Embodiment 27, wherein in Formula I(b), $R^{8a}$ is H or cyano.

Embodiment 27F

The compound and/or a pharmaceutically acceptable salt of Embodiment 27, wherein in Formula I(b), $R^{b2}$ and $R^{b3}$ are each hydrogen.

Embodiment 27G

The compound and/or a pharmaceutically acceptable salt of Embodiment 27, wherein in Formula I(b), $R^{8b}$ is H; and $R^{8c}$ is H or optionally substituted alkyl.

Embodiment 27H

The compound and/or a pharmaceutically acceptable salt of Embodiment 27, wherein the compound of Formula I(b) is the E-isomer.

Embodiment 27I

The compound and/or a pharmaceutically acceptable salt of Embodiment 27, wherein the compound of Formula I(b) is the Z-isomer.

Embodiment 27J

The compound and/or a pharmaceutically acceptable salt of Embodiment 27, wherein the compound of Formula I(b) is chosen from:

((R)-1-(3-(((R)-1-acryloylpyrrolidin-2-yl)methyl)ureido)-2-(benzofuran-3-yl)ethyl)boronic acid;

((R)-1-(3-(((R)-1-(2-cyano-4,4-dimethylpent-2-enoyl)pyrrolidin-2-yl)methyl)ureido)-2-(p-tolyl)ethyl)boronic acid; and ((R)-2-(benzofuran-3-yl)-1-(3-(((R)-1-(2-cyano-4,4-dimethylpent-2-enoyl)pyrrolidin-2-yl)methyl)ureido)ethyl) boronic acid;

an individual E or Z isomer thereof; and/or a pharmaceutically acceptable salt thereof.

Embodiment 28

The compound and/or a pharmaceutically acceptable salt of Formula (I), wherein W is a group of formula

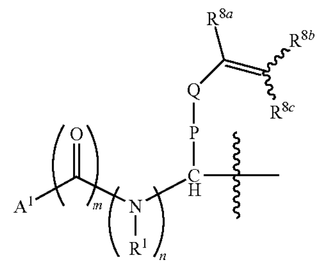

(Embodiment 5); m and n are each 1 (Embodiment 7); $R^1$ is H; P is

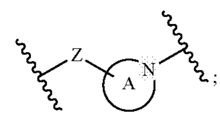

and Q is —C(═O)—; such that the compound of Formula (I) is a compound of Formula I(c)

Formula I(c)

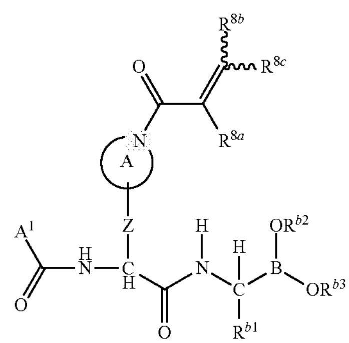

wherein $R^{b1}$, $R^{b2}$, $R^{b3}$, ring A (with the nitrogen atom shown), Z, $A^1$, $R^{8a}$, $R^{8b}$, and $R^8$ are as set forth for Formula (I).

Embodiment 28A

The compound and/or a pharmaceutically acceptable salt of Embodiment 28, wherein in Formula I(c), $R^{b1}$ is —$CH_2$-phenyl; $R^{b1}$, $R^{b2}$ and $R^{b3}$ are each H; Z is -alkyl-O-alkyl-; ring A with the nitrogen atom shown is pyrrolidinyl; $R^{8a}$ is cyano; $R^{8b}$ is H; $R^{8c}$ is alkyl; and $A^1$ is aryl.

Embodiment 28B

The compound and/or a pharmaceutically acceptable salt of Embodiment 28, wherein $A^1$ is aryl optionally and substituted with one or two halogen.

Embodiment 28C

The compound and/or a pharmaceutically acceptable salt of Embodiment 28, wherein the compound of Formula I(c) is the E-isomer.

Embodiment 28D

The compound and/or a pharmaceutically acceptable salt of Embodiment 28, wherein the compound of Formula I(c) is the Z-isomer.

Embodiment 28E

The compound and/or a pharmaceutically acceptable salt of Embodiment 28, wherein the compound of Formula I(c) is:

((R)-1-((S)-3-(((R)-1-(2-cyano-4-methylpent-2-enoyl)pyrrolidin-2-yl)methoxy)-2-(2,5-dichlorobenzamido)propanamido)-2-phenylethyl)boronic acid;

an individual E or Z isomer thereof; and/or a pharmaceutically acceptable salt thereof.

Embodiment 29

The compound and/or a pharmaceutically acceptable salt of Formula (I), wherein W is —N(R)—P-Q-C($R^{8a}$)═C($R^{8b}$)($R^{8c}$) (Embodiment 6A); P is

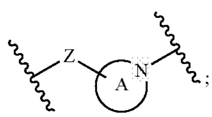

and Q is —C(═O)—; such that the compound of Formula (I) is a compound of Formula I(d)

Formula I(d)

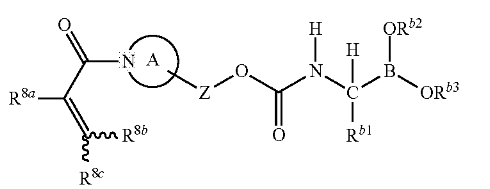

wherein $R^{b1}$, $R^{b2}$, $R^{b3}$, ring A (with the nitrogen atom shown) and Z are as set forth for Formula (I); and $R^{8a}$, $R^{8b}$ and $R^{8c}$ are each hydrogen; or wherein $R^{b1}$, $R^{b2}$, $R^{b3}$, ring A (with the nitrogen atom shown) and Z are as set forth for Formula (I); $R^{8a}$ is halogen; and $R^{8b}$ and $R^{8c}$ are each hydrogen.

Embodiment 29A

The compound and/or a pharmaceutically acceptable salt of Embodiment 29, wherein Z is a covalent bond.

Embodiment 29B

The compound and/or a pharmaceutically acceptable salt of Embodiment 29, wherein Z is —$(CH_2)_{1-4}$—.

Embodiment 29C

The compound and/or a pharmaceutically acceptable salt of Embodiment 29B, wherein Z is —$(CH_2)$—.

Embodiment 29D

The compound and/or pharmaceutically acceptable salt of Embodiment 29, wherein in Formula I(d), $R^{b1}$ is —$CH_2$-(optionally substituted phenyl) or —$CH_2$-(optionally substituted benzofuranyl); and ring A with the ring nitrogen atom shown is azetidinyl, pyrrolidinyl, piperidinyl, or azabicyclo[2.2.1]heptan-1yl.

Embodiment 29E

The compound and/or pharmaceutically acceptable salt of Embodiment 29D, wherein $R^{b1}$ is —$CH_2$-phenyl, —$CH_2$-fluorophenyl, —$CH_2$-phenyl-methyl, —$CH_2$-phenyl-ethyl, or —$CH_2$-benzofuranyl.

Embodiment 29F

The compound and/or pharmaceutically acceptable salt of Embodiment 29D, wherein in Formula I(d):

said azetidinyl of ring A is

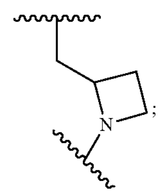 [SMILES: *CC1CCN1*]

said pyrrolidinyl of ring A is

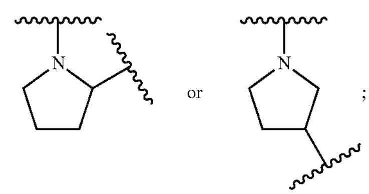 [SMILES: *C1CCCN1* ; *C1CCN(*)C1]

said piperidinyl of ring A is

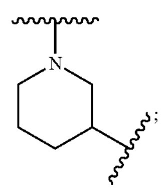 [SMILES: *C1CCCN(*)C1]

and said 7-azabicyclo[2.2.1]heptan-yl- of ring A is

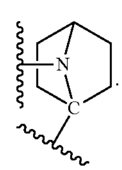 [SMILES: *N1C2CCC1(*)CC2]

Embodiment 29G

The compound and/or a pharmaceutically acceptable salt of Embodiment 29, wherein the compound of Formula I(d) is:

(R)-(1-((((7-acryloyl-7-azabicyclo[2.2.1]heptan-1-yl)methoxy)carbonyl)amino)-2-(benzofuran-3-yl)ethyl)boronic acid;
((R)-1-(((((S)-1-acryloylpiperidin-3-yl)oxy)carbonyl)amino)-2-(benzofuran-3-yl)ethyl)boronic acid;
((R)-1-(((((S)-1-acryloylpiperidin-3-yl)oxy)carbonyl)amino)-2-(4-(trifluoromethyl)phenyl)ethyl)boronic acid;
((R)-1-(((((S)-1-acryloylpiperidin-3-yl)oxy)carbonyl)amino)-2-phenylethyl)boronic acid;
((R)-1-(((((S)-1-acryloylpiperidin-3-yl)oxy)carbonyl)amino)-2-(4-fluorophenyl)ethyl)boronic acid;
(R)-(1-((((7-acryloyl-7-azabicyclo[2.2.1]heptan-1-yl)methoxy)carbonyl)amino)-3-phenylpropyl)boronic acid;
(R)-(1-((((7-(2-fluoroacryloyl)-7-azabicyclo[2.2.2.1]heptan-1-yl)methoxy)carbonyl)amino)-2-(4-fluorophenyl)ethyl)boronic acid;
(R)-(1-((((7-acryloyl-7-azabicyclo[2.2.1]heptan-1-yl)methoxy)carbonyl)amino)-2-(4-fluorophenyl)ethyl)boronic acid;
((1R)-1-((((1-acryloyl-3-methylpiperidin-3-yl)oxy)carbonyl)amino)-2-phenylethyl)boronic acid;
(R)-(1-((((1-acryloylazetidin-3-yl)methoxy)carbonyl)amino)-2-phenylethyl)boronic acid;
((R)-1-(((((S)-1-acryloylpyrrolidin-3-yl)oxy)carbonyl)amino)-2-phenylethyl)boronic acid;
((1R)-1-((((1-acryloyl-3-methylpiperidin-3-yl)oxy)carbonyl)amino)-2-(4-fluorophenyl)ethyl)boronic acid;
((R)-1-(((((3R,4R)-1-acryloyl-4-fluoropyrrolidin-3-yl)oxy)carbonyl)amino)-2-phenylethyl)boronic acid;
((R)-1-(((((3S,4S)-1-acryloyl-4-fluoropyrrolidin-3-yl)oxy)carbonyl)amino)-2-phenylethyl)boronic acid; and
((R)-1-(((((3R,4S)-1-acryloyl-4-fluoropyrrolidin-3-yl)oxy)carbonyl)amino)-2-phenylethyl)boronic acid;
an individual E or Z isomer thereof; and/or
a pharmaceutically acceptable salt thereof.

Embodiment 30

The compound and/or a pharmaceutically acceptable salt of Formula (I), wherein W is —N(R)—P-Q-C($R^{8a}$)═C($R^{8b}$)($R^{8c}$) (Embodiment 6A); P is

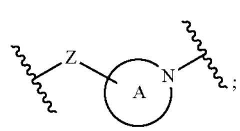

and Q is —C(═O)—; such that the compound of Formula (I) is a compound of Formula I(e)

Formula I(e)

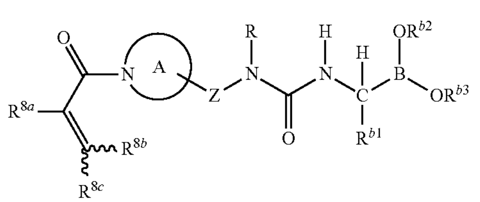

wherein $R^{b1}$, $R^{b2}$, $R^{b3}$, ring A (with the nitrogen atom shown) and Z are as set forth for Formula (I); and $R^{8a}$, $R^{8b}$ and $R^{8c}$ are each hydrogen; or wherein $R^{b1}$, $R^{b2}$, $R^{b3}$, ring A (with the nitrogen atom shown) and Z are as set forth for Formula (I); $R^{8a}$ is halogen; $R^{8b}$ and $R^{8c}$ are each hydrogen.

Embodiment 30A

The compound and/or a pharmaceutically acceptable salt of Embodiment 30, wherein Z is a covalent bond.

Embodiment 30B

The compound and/or a pharmaceutically acceptable salt of Embodiment 30, wherein Z is —$(CH_2)_{1-4}$—.

Embodiment 30C

The compound and/or a pharmaceutically acceptable salt of Embodiment 30B, wherein Z is —$(CH_2)$—.

Embodiment 30D

The compound and/or pharmaceutically acceptable salt of Embodiment 30, wherein in Formula I(e), $R^{b1}$ is —$CH_2$-(optionally substituted phenyl) or —$CH_2$-(optionally substituted benzofuranyl); and ring A with the ring nitrogen atom shown is azetidinyl, pyrrolidinyl, piperidinyl, or azabicyclo[2.2.1]heptan-1yl.

Embodiment 30E

The compound and/or pharmaceutically acceptable salt of Embodiment 30D, wherein $R^{b1}$ is —$CH_2$-phenyl, —$CH_2$-fluorophenyl, —$CH_2$-phenyl-methyl, —$CH_2$-phenyl-ethyl, or —$CH_2$-benzofuranyl.

Embodiment 30F

The compound and/or pharmaceutically acceptable salt of Embodiment of Embodiment 30D, wherein in Formula I(e):

said azetidinyl of ring A is

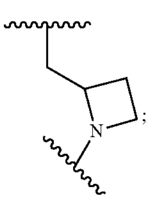 [SMILES: *CC1CCN1*]

said pyrrolidinyl of ring A is

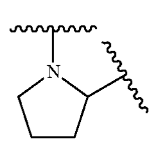

or

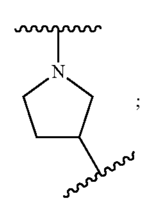

;

said piperidinyl of ring A is

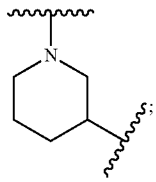

and said 7-azabicyclo[2.2.1]heptan-yl- of ring A is

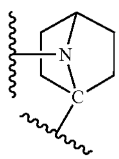

Embodiment 31

A pharmaceutical composition comprising at least one compound of any of Embodiments 1-30, and/or a pharmaceutical acceptable salt thereof, and a pharmaceutically acceptable excipient.

Embodiment 32

A method of inhibiting Large Multifunctional Protease 2 (LMP2) and/or Large Multifunctional Protease 7 (LMP7) in a subject comprising administering to said subject in need of said inhibition a therapeutically effective amount of a compound of any one of Embodiments 1-30, and/or a pharmaceutically acceptable salt thereof, and thereby inhibiting Large Multifunctional Protease 2 (LMP2) and/or Large Multifunctional Protease 7 (LMP7).

Embodiment 33

A method of treating a disease chosen from an autoimmune disorder, an inflammatory disorder, and a hematological disorder in a patient in need of such treatment, comprising administering to the patient a therapeutically effective amount of a compound of any one of Embodiments 1-30, and/or a pharmaceutically acceptable salt thereof.

Embodiment 34

The method of Embodiment 33, wherein the disease is chosen from lupus, rheumatoid arthritis, scleroderma, ankylosing spondylitis, Duchene muscular dystrophy (DMD), Becker muscular dystrophy (BMD), idiopathic inflammatory myopathies (IIMs), polymyositis, sporadic inclusion body myositis, dermatomyositis, immune-mediated necrotizing myopathies (IMNM), psoriasis, multiple sclerosis, inflammatory bowel disease, Behçet's disease, ulcerative colitis, Crohn's disease, Sjogren's Syndrome, bronchitis, conjunctivitis, pancreatitis, cholecystitis, bronchiectasis, aortic valve stenosis, restenosis, psoriasis, arthritis, fibrosis, infection, ischemia, cardiovascular disease, hepatitis, cirrhosis, steatohepatitis, liver inflammation, Alzheimer's Disease (AD), amyotrophic lateral sclerosis (ALS), Huntington's disease, body myositis, myofibrilar myopathy, GVHD, and multiple myeloma.

The compounds of Formula (I), (I'), (I(a)), (I(b)), (I(c), I(d), and I(e)) can form salts. Reference to a compound of Formula (I) herein is understood to include reference to salts thereof, unless otherwise indicated. The term "salt(s)", as employed herein, denotes acidic salts formed with inorganic and/or organic acids, as well as basic salts formed with inorganic and/or organic bases. In addition, when a compound of Formula (I), (I'), (I(a)), (I(b)), (I(c), I(d), and I(e)) contains both a basic moiety, such as, but not limited to a pyridine or imidazole, and an acidic moiety, such as, but not limited to a carboxylic acid, zwitterions ("inner salts") may be formed and are included within the term "salt(s)" as used herein. Pharmaceutically acceptable (i.e., non-toxic, physiologically acceptable) salts are preferred, although other salts are also useful. Salts of the compounds of the Formula (I), (I'), (I(a)), (I(b)), (I(c), I(d), and I(e)) may be formed, for example, by reacting a compound of Formula (I) with an amount of acid or base, such as an equivalent amount, in a medium such as one in which the salt precipitates or in an aqueous medium followed by lyophilization.

Exemplary acid addition salts include acetates, ascorbates, benzoates, benzenesulfonates, bisulfates, borates, butyrates, citrates, camphorates, camphorsulfonates, fumarates, hydrochlorides, hydrobromides, hydroiodides, lactates, maleates, methanesulfonates, naphthalenesulfonates, nitrates, oxalates, phosphates, propionates, salicylates, succinates, sulfates, tartrates, thiocyanates, toluenesulfonates (also known as tosylates), and the like. Additional exemplary acids are those generally considered suitable for the formation of pharmaceutically useful salts from basic pharmaceutical compounds, and are discussed, for example, by P. Stahl et al, Camille G. (eds.) Handbook of Pharmaceutical Salts. *Properties, Selection and Use*. (2002) Zurich: Wiley-VCH; S. Berge et al, *Journal of Pharmaceutical Sciences* (1977) 66(1) 1-19; P. Gould, *International J. of Pharmaceutics* (1986) 33 201-217; Anderson et al, *The Practice of Medicinal Chemistry* (1996), *Academic Press*, New York; and in *The Orange Book* (Food & Drug Administration, Washington, D.C. on their website). These disclosures are incorporated herein by reference thereto.

Exemplary basic salts include ammonium salts, alkali metal salts such as sodium, lithium, and potassium salts, alkaline earth metal salts such as calcium and magnesium salts, salts with organic bases (for example, organic amines) such as dicyclohexylamines, t-butyl amines, and salts with amino acids such as arginine, lysine and the like. Basic nitrogen-containing groups may be quarternized with agents such as lower alkyl halides (e.g. methyl, ethyl, and butyl chlorides, bromides and iodides), dialkyl sulfates (e.g. dimethyl, diethyl, and dibutyl sulfates), long chain halides (e.g. decyl, lauryl, and stearyl chlorides, bromides and iodides), aralkyl halides (e.g. benzyl and phenethyl bromides), and others.

All such acid salts and base salts are intended to be pharmaceutically acceptable salts, and all acid and base salts are considered equivalent to the free forms of the corresponding compounds (for example, a compound of Formula (I), (I'), (I(a)), (I(b)), (I(c), I(d), and I(e))).

Compounds described herein may contain asymmetric or chiral centers, and, therefore, exist in different stereoisomeric forms. It is intended that all stereoisomeric forms of a compound describe herein (such as a compound of Formula (I), (I'), (I(a)), (I(b)), (I(c), I(d), and I(e))) as well as mixtures thereof, including racemic mixtures, form part of the described compound. In addition, all geometric and positional isomers are included in a compound described herein. For example, if a compound of Formula (I), (I'), (I(a)), (I(b)), (I(c), I(d), and I(e)) incorporates a double bond or a fused ring, both the cis- and trans-forms, as well as mixtures, are embraced.

Diastereomeric mixtures can be separated into their individual diastereomers on the basis of their physical chemical differences by methods well known to those skilled in the art, such as, for example, by chromatography and/or fractional crystallization. Enantiomers can be separated by converting the enantiomeric mixture into a diastereomeric mixture by reaction with an appropriate optically active compound (e.g., chiral auxiliary such as a chiral alcohol or Mosher's acid chloride), separating the diastereomers and converting (e.g., hydrolyzing) the individual diastereomers to the corresponding pure enantiomers. Enantiomers can also be separated by use of chiral HPLC column. Also, some of the compounds of Formula (I), (I'), (I(a)), (I(b)), (I(c), I(d), and I(e)) may be atropisomers (e.g., substituted biaryls) and are considered as part of Formula (I).

It is also possible that compounds described herein (for example, a compound of Formula (I), (I'), (I(a)), (I(b)), (I(c), I(d), and I(e))) may exist in different tautomeric forms, and all such forms are embraced. Also, for example, all keto-enol and imine-enamine forms of the compounds described herein are included.

All stereoisomers (for example, geometric isomers, optical isomers and the like) of the compounds described herein (including those of the salts, solvates, esters and prodrugs of the compounds as well as the salts, solvates and esters of the prodrugs), such as those which may exist due to asymmetric carbons on various substituents, including enantiomeric forms (which may exist even in the absence of asymmetric carbons), rotameric forms, atropisomers, and diastereomeric forms, are contemplated within the compounds described herein, as are positional isomers (such as, for example, 4-pyridyl and 3-pyridyl). (For example, if a compound of Formula (I), (I'), (I(a)), (I(b)), (I(c), I(d), and I(e))) incorporates a double bond or a fused ring, both the cis- and trans-forms, as well as mixtures) are embraced. Individual stereoisomers of the compounds described herein, for example, may be substantially free of other isomers, or may be admixed, for example, as racemates or with all other, or other selected, stereoisomers. The chiral centers can have the S or R configuration as defined by the IUPAC 1974 Recommendations. The use of the terms "salt", "solvate", "ester", "prodrug" and the like, is intended to equally apply to the salt, solvate, ester and prodrug of enantiomers, stereoisomers, rotamers, tautomers, positional isomers, racemates or prodrugs of the compounds described herein.

Isotopically-labelled compounds of the compounds described herein which are identical to those recited herein, but for the fact that one or more atoms are replaced by an atom having an atomic mass or mass number different from the atomic mass or mass number usually found in nature are also embraced. Examples of isotopes that can be incorporated into compounds described herein include isotopes of hydrogen, carbon, nitrogen, oxygen, phosphorus, fluorine and chlorine and iodine, such as $^{2}H$, $^{3}H$, $^{11}C$, $^{13}C$, $^{14}C$, $^{15}N$, 180, 170, $^{31}P$, $^{32}P$, 35S, $^{18}F$, $^{36}Cl$ and 1231, respectively.

Certain isotopically-labelled compounds of Formula (I), (I'), (I(a)), (I(b)), (I(c), I(d), and I(e)) (e.g., those labeled with $^{3}H$ and $^{14}C$) are useful in compound and/or substrate tissue distribution assays. Tritiated (i.e., $^{3}H$) and carbon-14 (i.e., $^{14}C$) isotopes are particularly preferred for their ease of preparation and detectability. Certain isotopically-labelled compounds of Formula (I), (I'), (I(a)), (I(b)), (I(c), I(d), and I(e)) can be useful for medical imaging purposes, for example, those labeled with positron-emitting isotopes like $^{1}C$ or $^{18}F$ can be useful for application in Positron Emission Tomography (PET) and those labeled with gamma ray emitting isotopes like $^{123}I$ can be useful for application in Single Photon Emission Computed Tomography (SPECT). Further, substitution with heavier isotopes such as deuterium (i.e., $^{2}H$) may afford certain therapeutic advantages resulting from greater metabolic stability (e.g., increased in vivo half-life or reduced dosage requirements) and hence may be preferred in some circumstances. Further, substitution with heavier isotopes such as deuterium (i.e., $^{2}H$) may afford certain therapeutic advantages resulting from greater metabolic stability (e.g., increased in vivo half-life or reduced dosage requirements), and hence, may be preferred in some circumstances. Additionally, isotopic substitution at a site where epimerization occurs may slow or reduce the epimerization process and thereby retain the more active or efficacious form of the compound for a longer period of time. Isotopically labeled compounds of Formula (I), (I'), (I(a)), (I(b)), (I(c), I(d), and I(e)), in particular those containing isotopes with longer half-lives ($t_{1/2}$>1 day), can generally be prepared by following procedures analogous to those disclosed in the Schemes and/or in the Examples herein below, by substituting an appropriate isotopically labeled reagent for a non-isotopically labeled reagent.

Scheme 1 below illustrates a general synthetic procedure for preparing compounds of Formula (I) wherein W is a group of formula

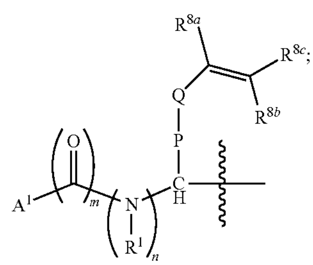

$A^1$, $R^{b1}$, $R^{b2}$, $R^{b3}$, $R^{8a}$, $R^{8b}$, $R^{8c}$ are provided herein, m is 1, n is 1, $R^1$ is H, and P is -alkylene-NR— (more specifically —$(CH_2)_4$—NH—), and Q is —CO—. Compound of formula 1, commercially available, undergoes amide coupling with a carboxylic acid of formula 2 to give a compound of formula 3. Hydrolysis and subsequent amide coupling with an aminoborate of formula 5 affords a compound of formula 6. Deprotection of the Boc group and subsequent amide coupling with an acid of formula 8 provides a group of compounds of Formula (I). Deprotection of the boronic ester yields the corresponding compounds of Formula (I), where $R^{b2}$ and $R^{b3}$ is H.

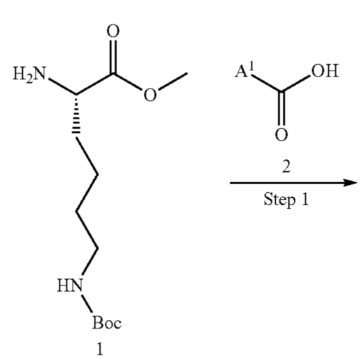

-continued

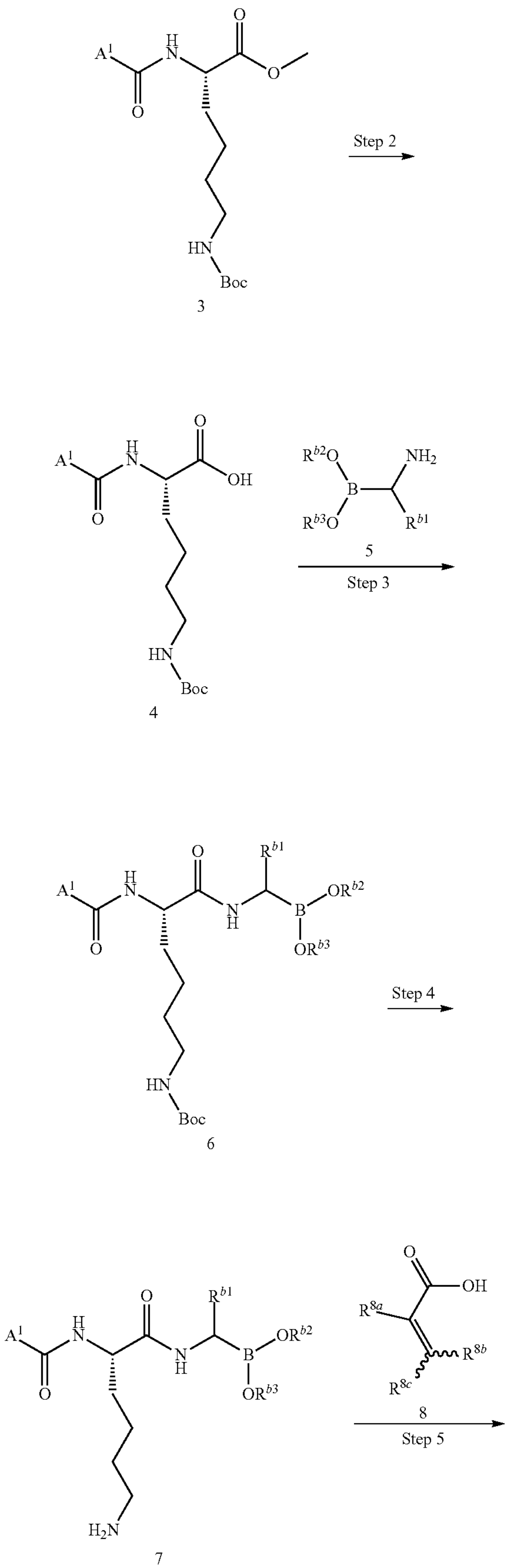

-continued

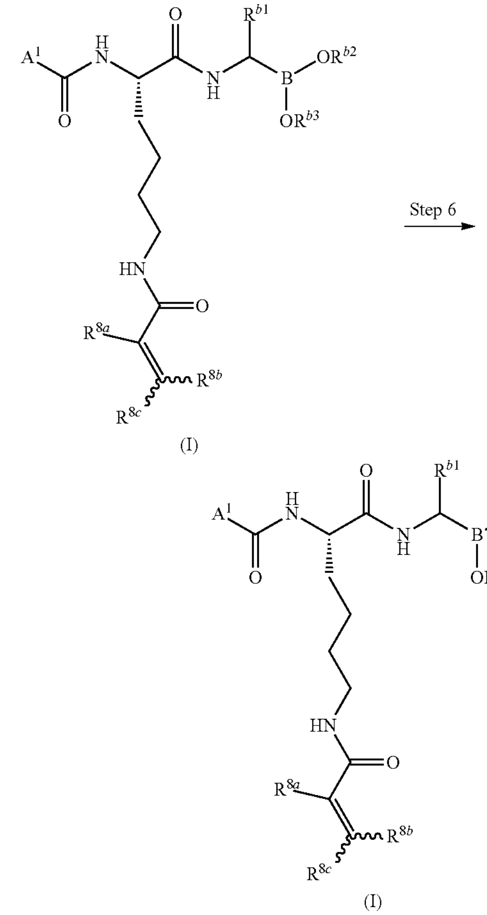

Scheme 2 below illustrates a general synthetic procedure for preparing compounds of Formula (I) wherein W is a group of formula

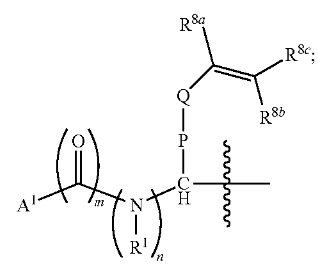

$R^{b1}$, $R^{b2}$, $R^{b3}$, $R^{8b}$, $R^{8c}$ are as provided herein, $A^1$ is alkyl group (specifically $CF_3CH_2$—), m is 0, n is 1, $R^1$ is H, P is -alkylene-NR— (more specifically —$(CH_2)_4$—NH—), Q is —CO—, and $R^{8a}$ is —CN. Compound of formula (I), commercially available, undergoes amide coupling with a carboxylic acid of formula 2 to give a compound of formula 3. Hydrolysis and subsequent amide coupling with an aminoborate of formula 5 affords a compound of formula 6. Deprotection of the Boc group and subsequent amide coupling with an acid of formula 8 provides a group of compounds of Formula (I). Deprotection of the boronic ester yields the corresponding boronic acid analogues, where $R^{b2}$ and $R^{b3}$ is H.

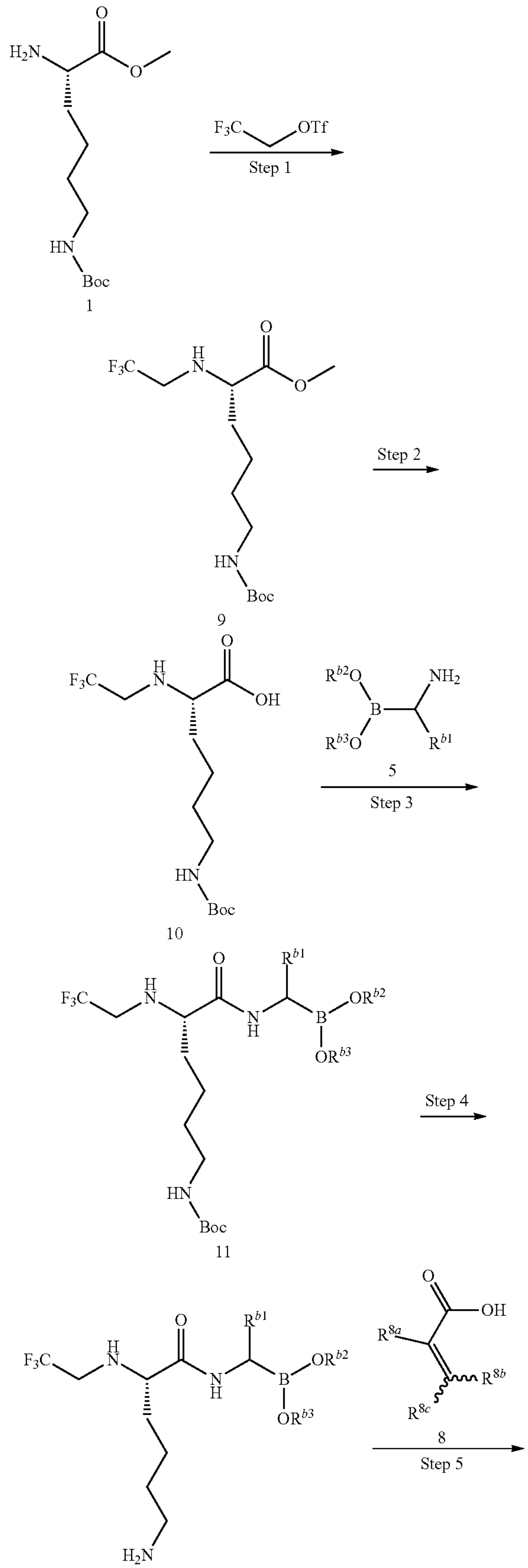

1, 9, 10, 11, 12

-continued

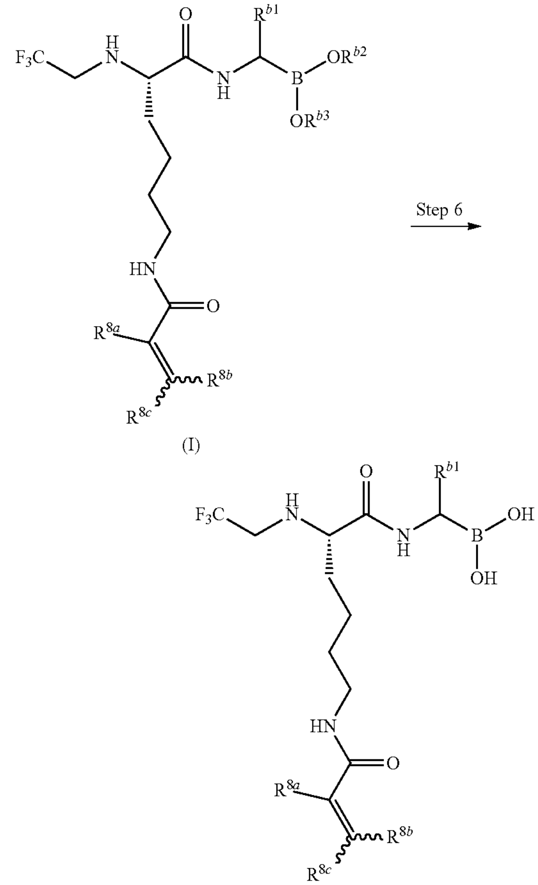

(I)

Scheme 3 below illustrates a general synthetic procedure for preparing compounds of Formula (I) wherein W is a group of formula

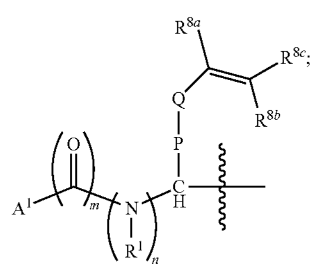

$A^1$, $R^{b1}$, $R^{b2}$, $R^{b3}$, $R^{8a}$, $R^{8b}$, $R^{8c}$ are as provided herein, m is 1, n is 1, $R^1$ is H, P is

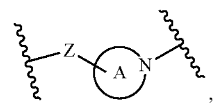

where Z is alkylene-O-alkylene (specifically —$CH_2OCH_2$—) and A is 5-membered pyrrolidine ring, and Q is —CO—. Azetidine 13 undergoes a series of transformations (switching trityl protective group to Cbz group, ring opening reaction with N-Boc protected pyrrolidinol, hydrolysis to free carboxylic acid) to give an intermediate of formula 17. Subsequent amide coupling with an aminoborate of formula 5 affords a compound of formula 19. Deprotection of the Cbz group and subsequent amide coupling with an acid of formula 2 leads to a compound of formula 20. Deprotection of the Boc group and subsequent amide coupling with an acid of formula 8 provides a group of compounds of Formula (I). Deprotection of the boronic ester yields the corresponding boronic acid analogues, where $R^{b2}$ and $R^{b3}$ is H.

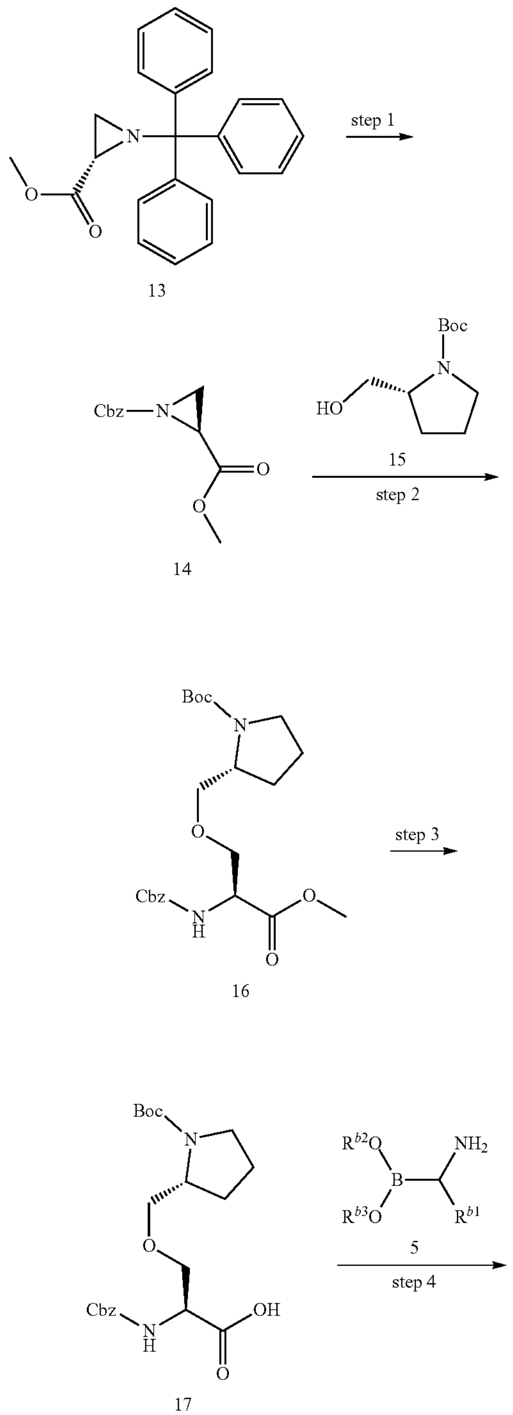

-continued

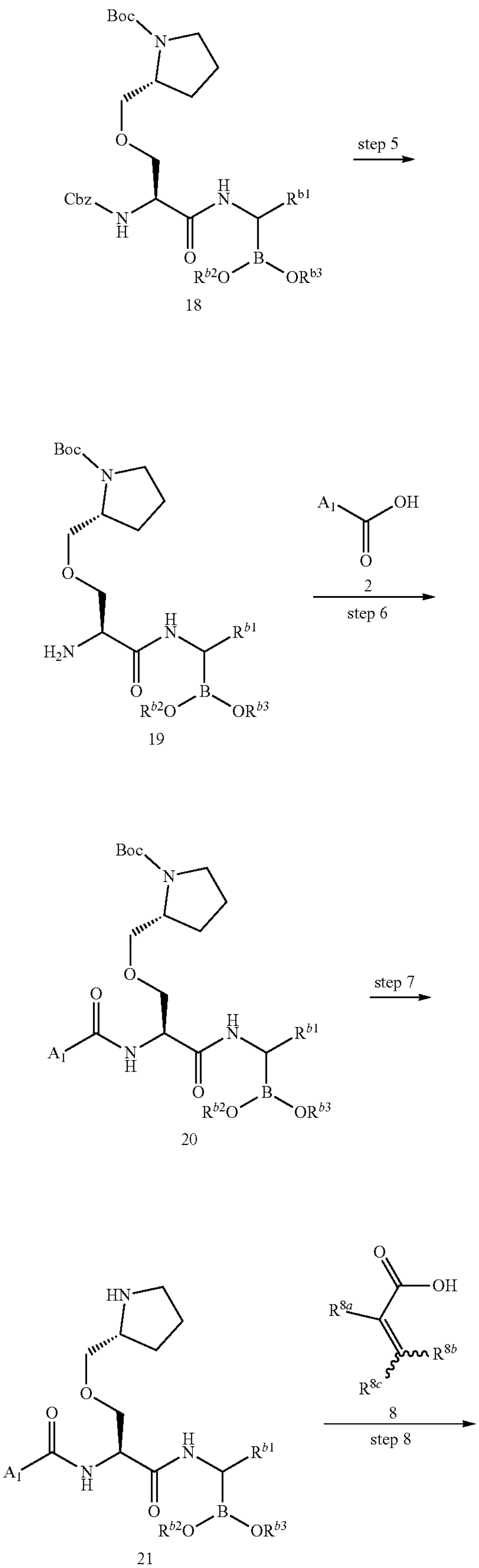

-continued

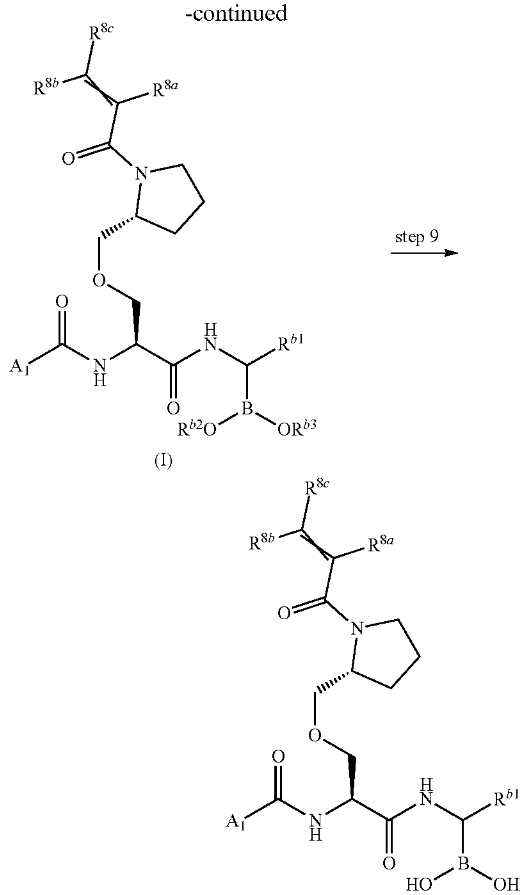

(I)

(I)

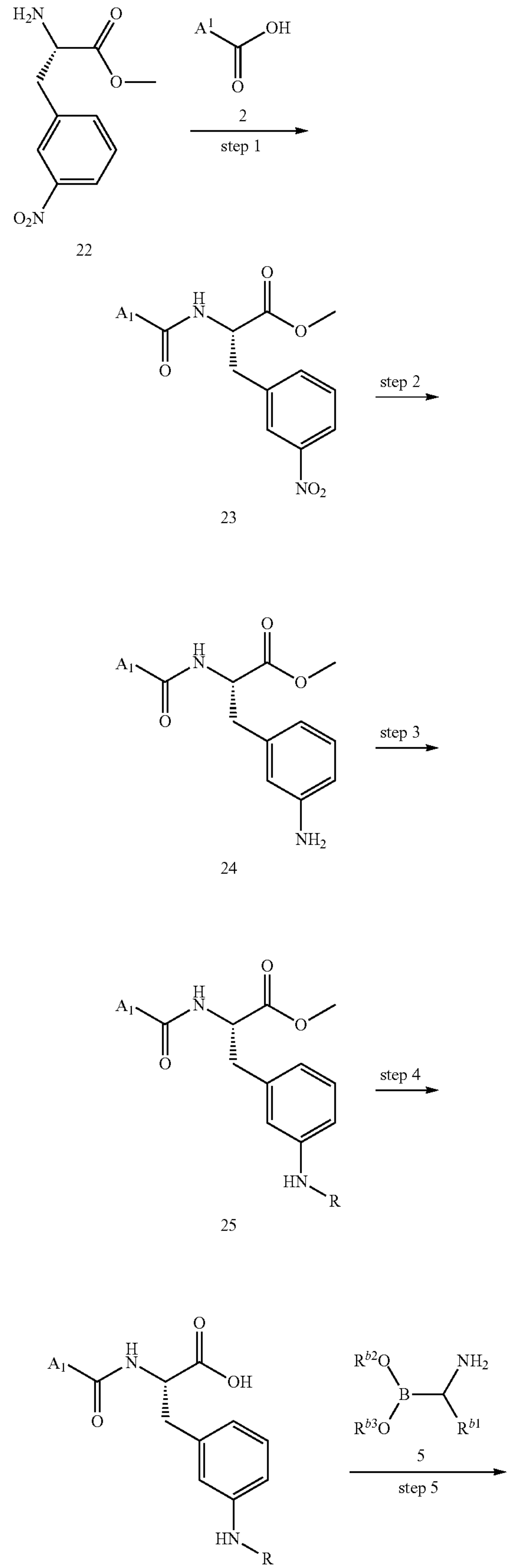

22

23

24

25

26

Scheme 4 below illustrates a general synthetic procedure for preparing compounds of Formula (I) wherein W is a group of formula

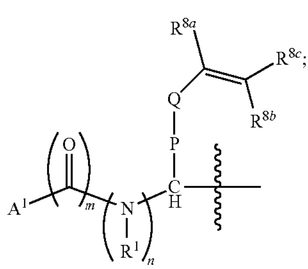

$A^1$, R, $R^{b1}$, $R^{b2}$, $R^{b3}$, $R^{8a}$, $R^{8b}$, $R^{8c}$ are as provided herein, m is 1, n is 1, $R^1$ is H, P is -alkylene-phenylene-NR— (specifically —$CH_2PhCH_2NH$—), and Q is —CO—. Amino-ester 22 undergoes amide coupling to give an intermediate of formula 23. Reduction of the nitro group and subsequent reductive amination leads to a compound of formula 25. Sequential hydrolysis and amide coupling reactions with an aminoborate of formula 5 and a carboxylic acid of formula 8 affords a group of compounds of Formula (I). Deprotection of the boronic ester yields the corresponding boronic acid analogues, where $R^{b2}$ and $R^{b3}$ is H.

-continued

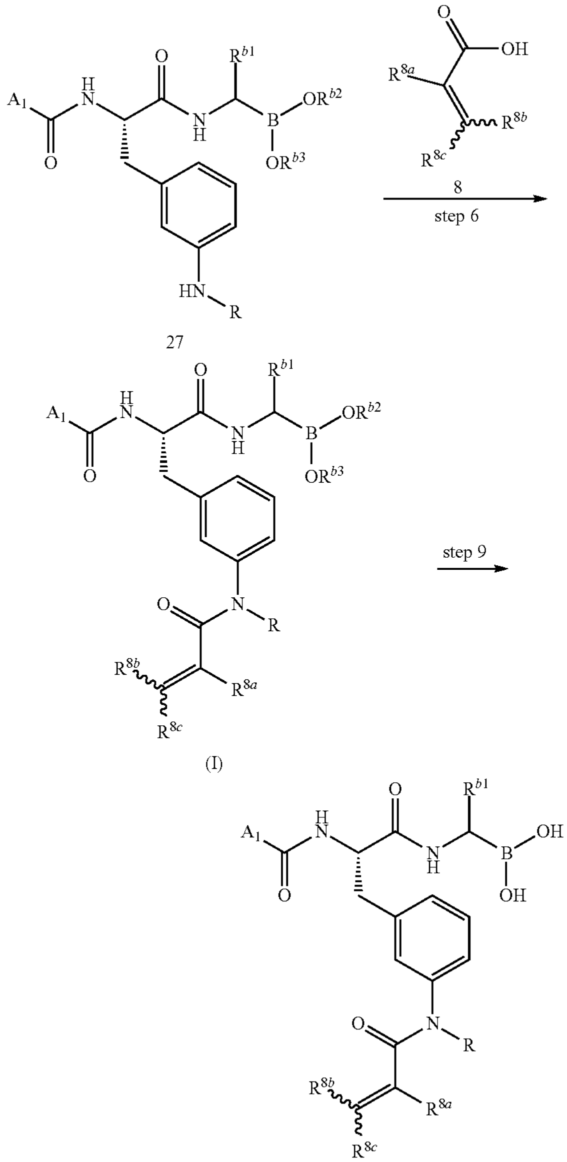

27

(I)

(I)

Scheme 5 below illustrates a general synthetic procedure for preparing compounds of Formula (I) wherein W is a group of formula

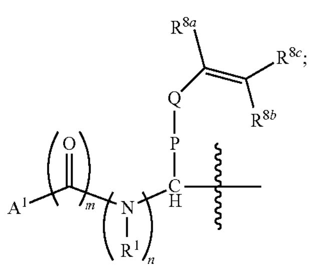

$R^{b1}$, $R^{b2}$, $R^{b3}$, $R^{8a}$, $R^{8b}$, $R^{8c}$ are as provided herein, $A^1$ is alkyl group (specifically $CF_3CH_2$—), m is 0, n is 1, $R^1$ is H, P is

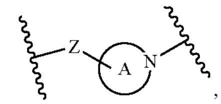

where Z is alkylene-O-alkylene (specifically —$CH_2OCH_2$—) and A is 5-membered pyrrolidine ring, and Q is —CO—. Compound 16 undergoes deprotection of the Cbz group to give a compound of formula 28, which then reacts with 2,2,2-trifluoroethyl trifluoromethanesulfonate to give a compound of formula 29. Subsequent hydrolysis to the free carboxylic acid of formula 30 and amide coupling with an aminoborate of formula 5 affords a compound of formula 31. Deprotection of the Boc group and subsequent amide coupling with an acid of formula 8 provides a group of compounds of Formula (I). Deprotection of the boronic ester yields the corresponding boronic acid analogues, where $R^{b2}$ and $R^{b3}$ is H.

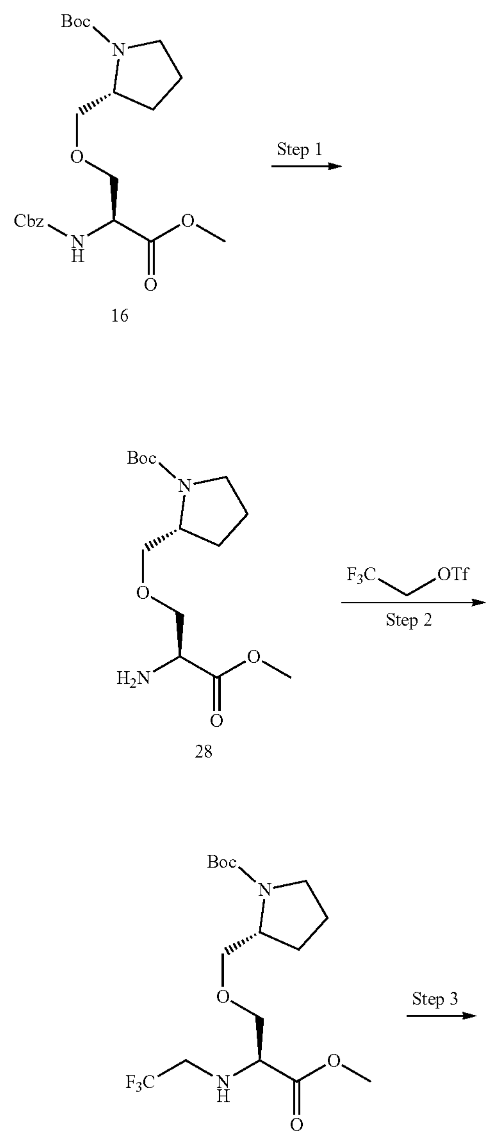

16

28

29

-continued

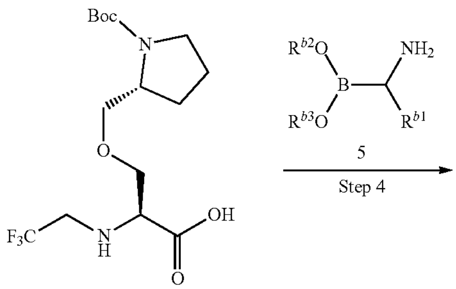

30

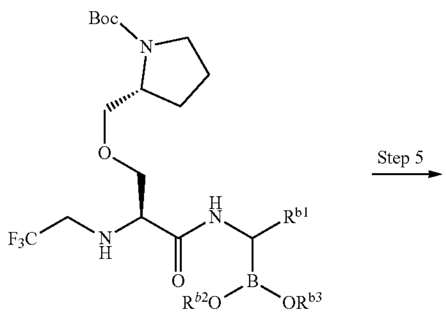

31

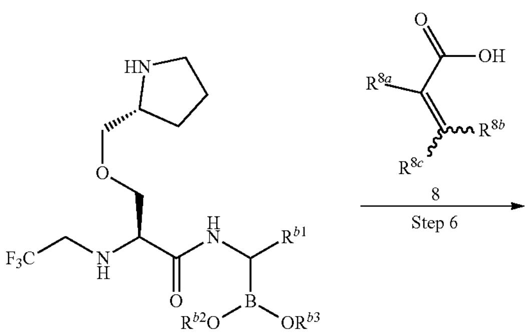

32

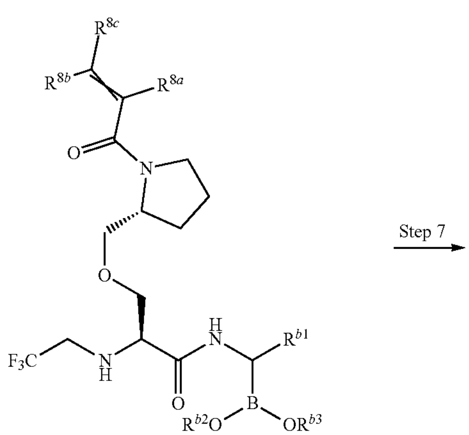

(I)

-continued

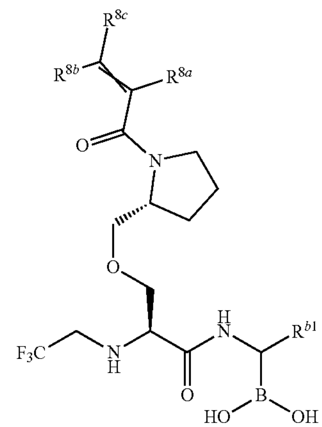

(I)

Scheme 6 below illustrates a general synthetic procedure for preparing compounds of Formula (I) wherein W is a group of formula

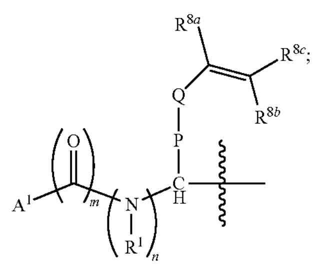

R, $R^{b1}$, $R^{b2}$, $R^{b3}$, $R^{8a}$, $R^{8b}$, $R^{8c}$ are as provided herein, $A^1$ is alkyl group (specifically $CF_3CH_2$—), m is 0, n is 1, $R^1$ is H, P is -alkylene-phenylene-NR— (specifically —$CH_2PhCH_2NH$—), and Q is —CO—. Amino-ester 22 reacts with 2,2,2-trifluoroethyl trifluoromethanesulfonate to give an intermediate of formula 33. Reduction of the nitro group and subsequent reductive amination leads to a compound of formula 35. Sequential hydrolysis and amide coupling reactions with an aminoborate of formula 5 and a carboxylic acid of formula 8 affords a compound of Formula (I). Deprotection of the boronic ester yields the corresponding boronic acid analogues, where $R^{b2}$ and $R^{b3}$ is H.

Scheme 6

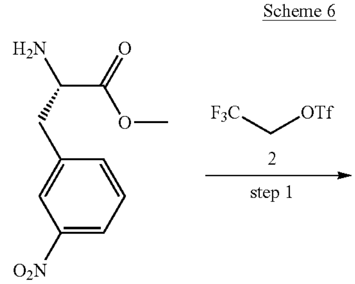

22

-continued
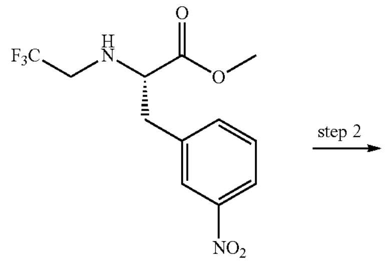
33
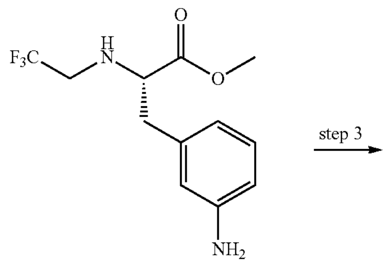
34
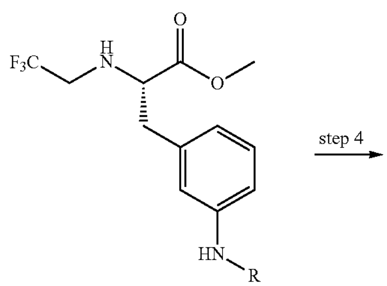
35
-continued
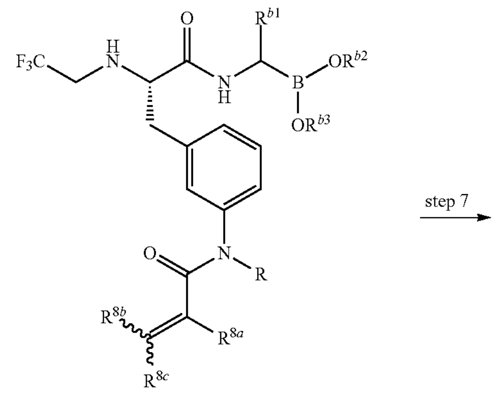
(I)
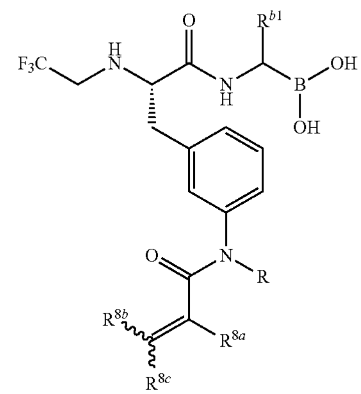
(I)
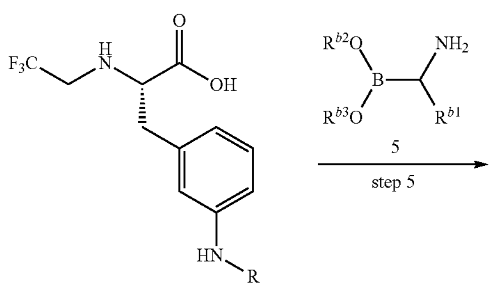
36
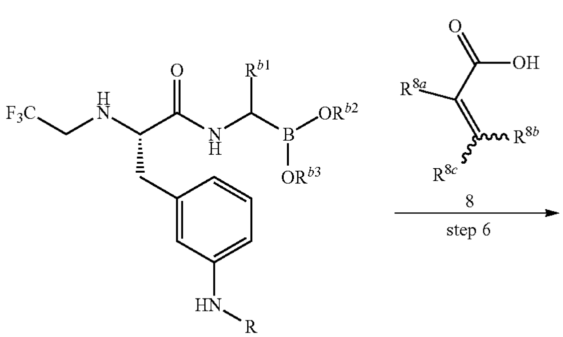
37
Scheme 7
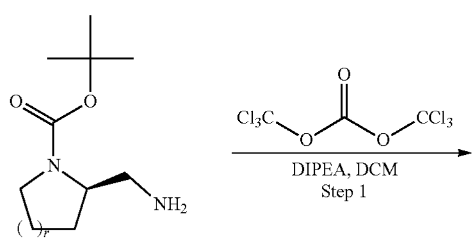
r = 1, 2, 3
38
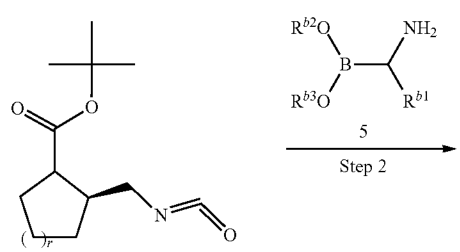
39

-continued

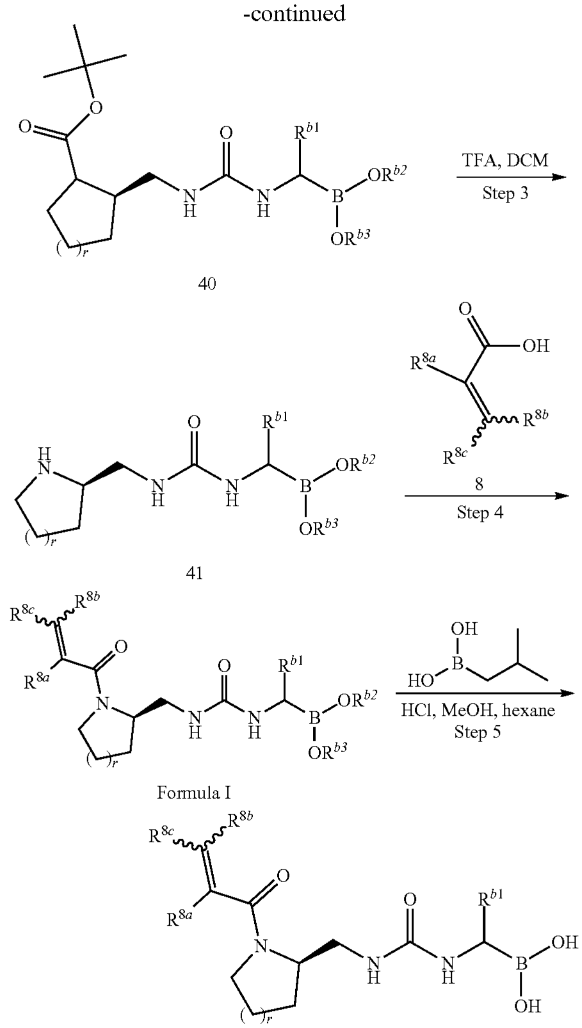

40

41

Formula I

Formula I

Scheme 7 above illustrates a general synthetic procedure for preparing compounds of Formula (I) wherein R, $R^{b1}$, $R^{b2}$, $R^{b3}$, $R^{8a}$, $R^{8b}$, $R^{8c}$ are as provided herein, $A^1$ is H; m is 0, n is 0, —N(R')—P-Q-C($R^{8a}$)═C($R^{8b}$)($R^{8c}$), R' is H, P is

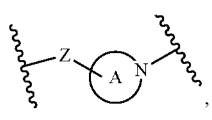

and Q is —CO—. A compound of formula 38, reacts with triphosgene to give an isocyanate intermediate of formula 39, which is coupled with an aminoborate of formula 5 and affords a compound of formula 40. Deprotection of the Boc group and subsequent condensation with an acid intermediate of formula 8 gives a compound of Formula (I). Deprotection of the boronic ester yields the corresponding boronic acid analogues, where $R^{b2}$ and $R^{b3}$ is H.

Utility

Given the evidence that immunoproteasomes (e.g., LMP-2 and/or LMP-7) are important in the regulation of various immune responses and the selective expression of LMP-2 and/or LMP-7 in tissues that contain the immunoproteasome, inhibitors of LMP-2 and/or LMP-7 can be used for the treatment of autoimmune disorders. Autoimmune disorders are characterized by inappropriate reaction of the immune system to the host's healthy organs and tissues. Examples of autoimmune disorders that could be treated with an LMP-2 and/or LMP-7 inhibitors include but are not limited to lupus, rheumatoid arthritis, scleroderma, ankylosing spondylitis, dermatomyositis, psoriasis, multiple sclerosis and inflammatory bowel disease (such as ulcerative colitis and Crohn's disease). Another example of an autoimmune disease is Sjogren's Syndrome (SS), which is characterized by infiltration and focal accumulation of lymphocytes in the exocrine glands. It has been shown that there is a significant up-regulation of LMP7 in the salivary glands of Sjogren's patients (see Egerer et al, 2006. Tissue-specific up-regulation of the proteasome subunit beta5i (LMP7) in Sjögren's syndrome. Arthritis Rheum 54:1501-8). Thus, treatment of SS patients with an immunoproteasome inhibitor can mitigate the symptoms of the disease. In addition to autoimmune diseases, tissue/organ transplant rejection occurs when the immune system attacks therapeutic cells that are introduced to the host's body. Graft versus host disease (GVHD), resulting from allogenic transplantation, arises when the immune cells from the donor tissue attack the host's tissues. Therefore, GVHD is another potential utility of treatment with an immunoproteasome inhibitor.

In addition to autoimmune diseases, immunoproteasome inhibitors can be used in circumstances when chronic or acute inflammation leads to tissue damage or loss of function. Proteasome inhibitors have been shown to have anti-inflammatory activity (see Elliot et al. Proteasome inhibition: a new anti-inflammatory strategy. 2003, J Mol Med. 81:235-245). Examples of inflammatory diseases in which treatment with an immunoproteasome inhibitor may have utility include acute conditions (e.g., bronchitis, conjunctivitis, pancreatitis) and chronic conditions (e.g., chronic cholecystitis, hepatitis, bronchiectasis, aortic valve stenosis, restenosis, Behçet's disease, psoriasis and arthritis), along with conditions associated with inflammation (such as fibrosis, infection and ischemia). Behçet's disease (BD) is a chronic, relapsing, inflammatory multisystem disease of unknown etiology. Oral ulcers, genital ulcers, cutaneous lesions, and ocular and articular involvement are the most frequent features of the disease. Accordingly, immunoproteasome inhibitors may be used to treat one or more of oral ulcers, genital ulcers, cutaneous lesions, and ocular and articular involvement.

Upregulation of the immunoproteasome has been detected in response to cardiovascular inflammation potentially resulting in vascular cell apoptosis (see Zang et al. 2009. Cardiovascular inflammation and lesion cell apoptosis: a novel connection via the interferon-inducible immunoproteasome. Arterioscler Thromb Vasc Biol. 29:1213-1219), thus, providing utility in cardiovascular disease. Upregulation of the immunoproteasome has also been detected in liver biopsies of patients with chronic active hepatitis, cirrhosis and steatohepatitis (see French, et al. The immunoproteasome in steatohepatitis: Its role in Mallory-Denk body formation. 2011, Experimental and Molecular Pathology 90: 252-256), thus, providing utility in treating chronic liver inflammation. Another chronic inflammatory condition characterized by tissue damage is Alzheimer's Disease (AD) in which microglia, the resident macrophages in the brain, are stimulated to release various proinflammatory cytokines. Increased expression of the immunoproteasome has been found in brain tissue from AD patients compared to control elderly adults not exhibiting symptoms of dementia (see Mishto et al. Immunoproteasome and LMP2 polymorphism in aged and Alzheimer's disease brains. 2006. Neurobiol Aging 27:54-66). In addition, inclusion body myositis and myofibrilar myopathy are muscle diseases that show protein accumulation and increased immunoproteasome expression (see Ferrer et al. 2004. Proteasomal expression, induction of immunoproteasome subunits and local MHC class I presentation in myofibrillar myopathy and inclusion body myositis. J Neuropathol Exp Neurol. 63:484-498). Therefore, treatment of AD patients or other neurodegenerative conditions (such as amyotrophic lateral sclerosis (ALS), and Huntington's disease resulting from chronic inflammation in response to accumulation of protein aggregates) with an immunoproteasome inhibitor constitute additional potential utilities.

Duchene muscular dystrophy (DMD) is an inherited disease, characterized by progressive muscle degeneration and weakness. The disease is caused by a mutation of the DMD gene which leads to deficiency of dystrophin, a protein found throughout the cytoplasmic face of the plasma membrane in both skeletal and cardiac muscle. Becker muscular dystrophy (BMD), a much milder allelic form of the disease, is caused by a reduction in the amount, or an alteration in the size, of the dystrophin protein. These diseases may also be treated by the presently disclosed immunoproteasome inhibitors.

Idiopathic inflammatory myopathies (IIMs) are muscle diseases characterized by muscle weakness and specific inflammatory infiltrates in muscle. These diseases can be classified as polymyositis, sporadic inclusion body myositis (sIBM), dermatomyositis (DM) and immune-mediated necrotizing myopathies (IMNM). These diseases may also be treated by the presently disclosed immunoproteasome inhibitors.

Targeted inhibition of immunoproteasome is also a potent strategy against models of multiple myeloma that overcome resistance to conventional drugs and nonspecific proteasome inhibitors. Accordingly multiple myeloma may also be treated by the presently disclosed immunoproteasome inhibitors.

Testing

The immunoproteasome inhibitory activity of the compounds described herein can be tested using the in vitro assays described in Biological Examples below. A determination of the immunoproteasome inhibitory activity by any of those assays is considered to be immunoproteasome inhibitory activity within the scope of this disclosure even if any or all of the other assays do not result in a determination of immunoproteasome inhibitory activity. The residence time of the compound immunoproteasome bound complexes can be tested using the Biological Example 5 and 6 below. The ability of the compounds described herein to form reversible covalent bond with the immunoproteasome can be determined by the assays described in Biological Examples 4-6 below.

Without being bound to any specific mechanistic theory, when a compound described herein forms a reversible covalent bond with a cysteine of the immunoproteasome, it is believed that the cysteine sulfhydryl group and a carbon atom forming part of the carbon-carbon double bond in the Y group of Formula (I) where $R^2$ is a group of Formula (a) or (b) (see Formula (I)) can form a reversible, i.e., labile, covalent bond, defined herein, such as wherein Cys48 of LMP7 attacks an electron deficient carbon atom of the carbon-carbon double bond in the group of Formula (a) or (b) in the compound of Formula (I) to form a thiol adduct (e.g., Michael reaction with cysteine).

Furthermore, all the subunits of an immunoproteasome contain a catalytic threonine residue which can interact with the boronic acid/boronic esters through labile covalent binding (see for example Reem Smoum et al., "Boron Containing Compounds as Protease Inhibitors", *Chemical Reviews,* 2012, 112, 4156-4220.) In some embodiments, the electron deficient carbon atom of the olefin is distal to the carbon attached to the cyano group and to the electron withdrawing —$X^1NR^6R^7$ or Het, moiety in the compounds described herein. Therefore, the combination of the cyano, a second electron withdrawing group and the olefinic moiety to which they are bonded in a compound described herein (for example, a compound of Formula (I)) can increase the reactivity of the olefin to form a thiol adduct with the active site cysteine residue in LMP7.

The compounds described herein can bind with the immunoproteasome in several different manners. In addition to the labile covalent binding, discussed above (with respect to the cysteine —SH group and the threonine —OH group), they also can form non-covalent binding (e.g., via van der Waals binding, hydrogen binding, hydrophobic binding, hydrophilic binding, and/or electrostatic charge binding) with the immunoproteasome, the non-covalent binding being sufficient to at least partially inhibit the kinase activity of the immunoproteasome As disclosed herein, with regard to LMP7, one of the labile covalent bindings between compound described herein and the immunoproteasome occurs between the olefin mentioned above in the compound and the thiol (sulfhydryl) residue of cysteine 48 of LMP7, at or near the site where the compound has the aforementioned non-covalent binding with the LMP7.

Therefore, a compound described herein, which form a reversible covalent with the immunoproteasome, can have both a cysteine-mediated covalent binding (in the case of LMP7) and threonine-mediated covalent binding (for all subunits of immunoproteasome) and a non-covalent binding. This is in contrast with non-covalent reversible inhibitors which inhibit the immunoproteasome only via non-covalent binding and lack the cysteine-mediated and/or the threonine-mediated covalent binding.

The result of the binding of a compound described herein (for example, a compound of Formula (I)) with the immunoproteasome in the several different manners as disclosed herein is a reversible covalent inhibitor having a slow off-rate and a protracted duration of action, in some instances comparable to an irreversible covalent inhibitor without forming permanent irreversible protein adducts. The difference between irreversible and reversible covalent inhibitors, particularly the compounds disclosed herein, can be ascertained utilizing assays disclosed herein.

In general, the binding involved in an inhibitor that forms a reversible covalent bond with the immunoproteasome, i.e., the compounds disclosed herein, is stable when the immunoproteasome/immunoproteasome subunit is in certain configurations and susceptible to being broken when the immunoproteasome/immunoproteasome subunit is in different configurations (in both cases under physiologic conditions), whereas the interaction between an inhibitor that forms an irreversible covalent bond is stable under physiologic conditions even when the immunoproteasome/immunoproteasome subunit is in different configurations.

A reversible covalent bond often imparts unique properties related to the residence time of the compound within the cysteine-containing and/or threonine-containing binding site. In this context, residence time refers to the temporal duration of the compound-target complex under different conditions (see Copeland R A, Pompliano D L, Meek T D. Drug-target residence time and its implications for lead optimization. Nat. Rev. Drug Discov. 5(9), 730-739 (2006)).

The presence of a reversible covalent bond in a reversible covalent inhibitor as disclosed herein can lead to an extended residence time when compared to a compound that does not form a covalent bond with the immunoproteasome/immunoproteasome subunit. In some embodiments disclosed herein, a compound described herein (for example, a compound of Formula (I)) that are reversible covalent inhibitors have a residence time of at least about 1 h. Residence time may be measured using wash-out assay in a biochemical or cellular environment (see Biological Examples 4-6 below.) A determination of the binding reversibility of the covalent bond between the cysteine residue and the olefinic bond (in the case of LMP7) and between the threonine residue and the boronic acid/ester (in the case of all immunoproteasome subunits) of the compounds described herein by any of the Biological Examples 4-6 below is considered to be binding reversibility within the scope of this disclosure even if one or the other method does not result in a determination of binding reversibility.

Administration and Pharmaceutical Composition

In general, the compounds described herein will be administered in a therapeutically effective amount by any of the accepted modes of administration for agents that serve similar utilities. Therapeutically effective amounts of a compound described herein may range from about 0.01 to about 500 mg per kg patient body weight per day, which can be administered in single or multiple doses. A suitable dosage level may be from about 0.1 to about 250 mg/kg per day; about 0.5 to about 100 mg/kg per day. A suitable dosage level may be about 0.01 to about 250 mg/kg per day, about 0.05 to about 100 mg/kg per day, or about 0.1 to about 50 mg/kg per day. Within this range the dosage can be about 0.05 to about 0.5, about 0.5 to about 5 or about 5 to about 50 mg/kg per day. For oral administration, the compositions can be provided in the form of tablets containing about 1.0 to about 1000 milligrams of the active ingredient, particularly about 1, 5, 10, 15, 20, 25, 50, 75, 100, 150, 200, 250, 300, 400, 500, 600, 750, 800, 900, and 1000 milligrams of the active ingredient. The actual amount of the compound, i.e., the active ingredient, will depend upon numerous factors such as the severity of the disease to be treated, the age and relative health of the patient, the potency of the compound being utilized, the route and form of administration, and other factors.

In general, compounds described herein will be administered as pharmaceutical compositions by any one of the following routes: oral, systemic (e.g., transdermal, intranasal or by suppository), parenteral (e.g., intramuscular, intravenous or subcutaneous) or topical (e.g., application to skin) administration. The preferred manner of administration is oral using a convenient daily dosage regimen, which can be adjusted according to the degree of affliction. Compositions can take the form of tablets, pills, capsules, semisolids, powders, sustained release formulations, solutions, suspensions, elixirs, aerosols, or any other appropriate compositions.

The choice of formulation depends on various factors such as the mode of drug administration (e.g., for oral administration, formulations in the form of tablets, pills or capsules, including enteric coated or delayed release tablets, pills or capsules are preferred) and the bioavailability of the drug substance. Recently, pharmaceutical formulations have been developed especially for drugs that show poor bioavailability based upon the principle that bioavailability can be increased by increasing the surface area i.e., decreasing particle size. For example, U.S. Pat. No. 4,107,288 describes a pharmaceutical formulation having particles in the size range from 10 to 1,000 nm in which the active material is supported on a crosslinked matrix of macromolecules. U.S. Pat. No. 5,145,684 describes the production of a pharmaceutical formulation in which the drug substance is pulverized to nanoparticles (average particle size of 400 nm) in the presence of a surface modifier and then dispersed in a liquid medium to give a pharmaceutical formulation that exhibits remarkably high bioavailability.

The compositions are comprised of in general, a compound described herein) in combination with at least one pharmaceutically acceptable excipient. Acceptable excipients are non-toxic, aid administration, and do not adversely affect the therapeutic benefit of the compound. Such excipient may be any solid, liquid, semi-solid or, in the case of an aerosol composition, gaseous excipient that is generally available to one of skill in the art.

Solid pharmaceutical excipients include starch, cellulose, talc, glucose, lactose, sucrose, gelatin, malt, rice, flour, chalk, silica gel, magnesium stearate, sodium stearate, glycerol monostearate, sodium chloride, dried skim milk and the like. Liquid and semisolid excipients may be chosen from glycerol, propylene glycol, water, ethanol and various oils, including those of petroleum, animal, vegetable or synthetic origin, e.g., peanut oil, soybean oil, mineral oil, sesame oil, etc. Preferred liquid carriers, particularly for injectable solutions, include water, saline, aqueous dextrose, and glycols.

Compressed gases may be used to disperse a compound described herein in aerosol form. Inert gases suitable for this purpose are nitrogen, carbon dioxide, etc.

Other suitable pharmaceutical excipients and their formulations are described in Remington's Pharmaceutical Sciences, edited by E. W. Martin (Mack Publishing Company, 20th ed., 2000).

The level of the compound in a formulation can vary within the full range employed by those skilled in the art. Typically, the formulation will contain, on a weight percent (wt %) basis, from about 0.01-99.99 wt % of a compound described based on the total formulation, with the balance being one or more suitable pharmaceutical excipients. Preferably, the compound is present at a level of about 1-80 wt %.

A compound described herein may be used in combination with one or more other drugs in the treatment of diseases or conditions for which a compound described herein or the other drugs may have utility, where the combination of the drugs together are safer or more effective than either drug alone. Such other drug(s) may be administered, by a route and in an amount commonly used therefore, contemporaneously or sequentially with a compound described herein. When a compound described herein is used contemporaneously with one or more other drugs, a pharmaceutical composition in unit dosage form containing such other drugs and a compound described herein is preferred. However, the combination therapy may also include therapies in which a compound described herein and one or more other drugs are administered on different overlapping schedules. It is also contemplated that when used in combination with one or more other active ingredients, a compound described herein and the other active ingredients may be used in lower doses than when each is used singly.

Accordingly, a pharmaceutical composition described herein also can include those that contain one or more other active ingredients, in addition to a compound described herein.

SYNTHETIC EXAMPLES
Example 1
((R)-1-((S)-6-(2-cyano-4-methylpent-2-enamido)-2-((S)-2-isobutyramidopropanamido)hexanamido)-3-methylbutyl)boronic Acid
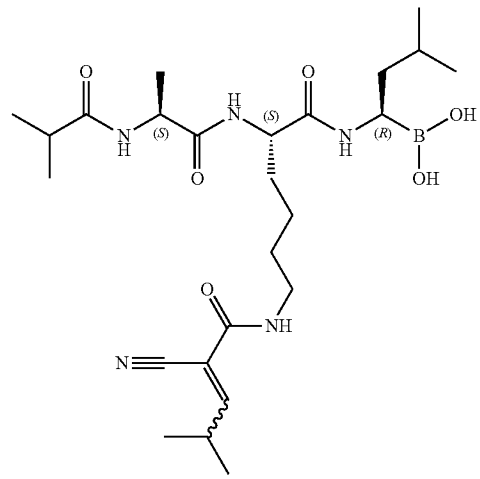
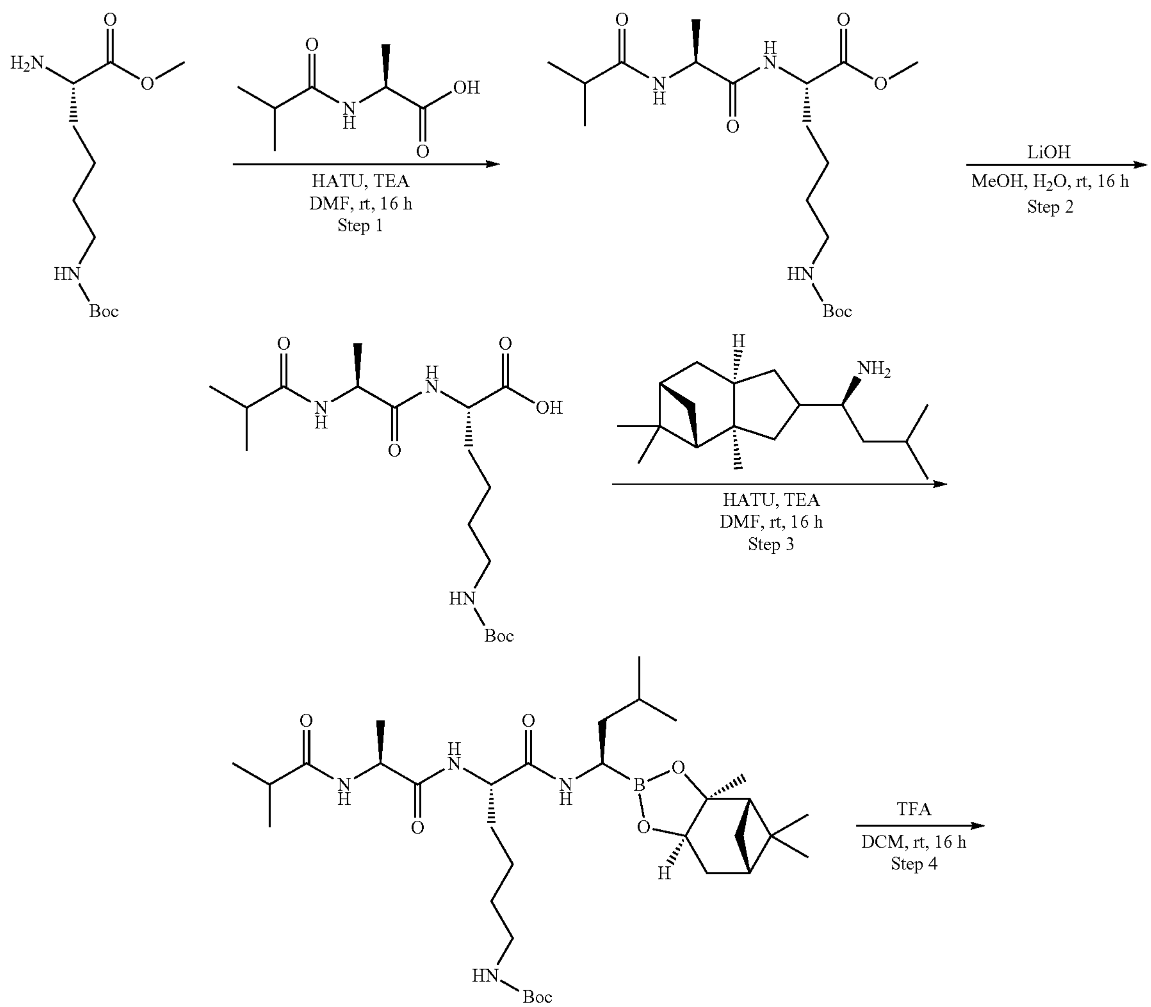

-continued

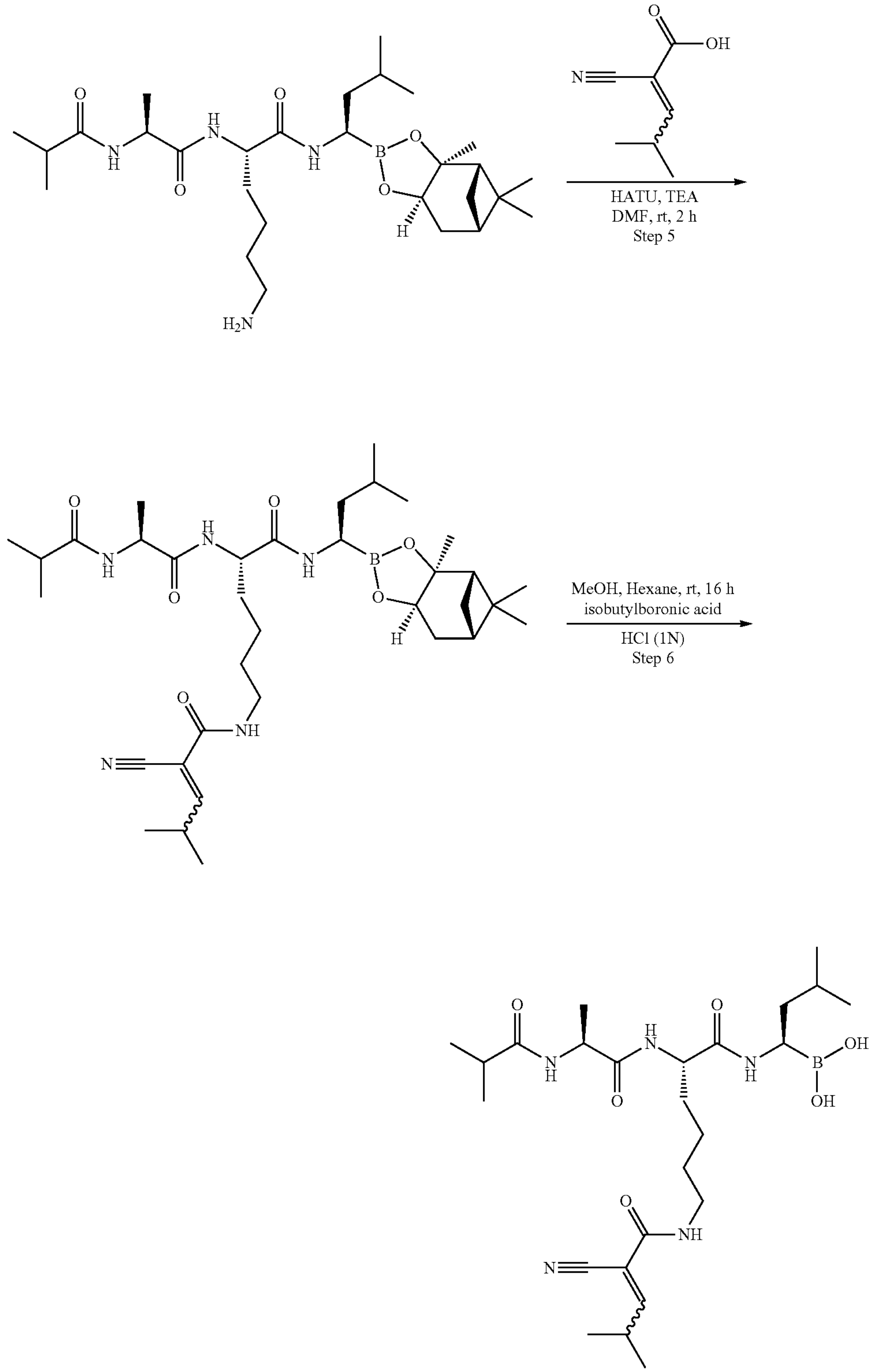

A solution of (S)-methyl 2-amino-6-((tert-butoxycarbonyl)amino)hexanoate (5.2 g, 20 mmol), isobutyryl-L-alanine (3.18 g, 20 mmol), HATU (8.36 g, 22 mmol) and TEA (4.04 g, 40 mmol) in DMF (20 mL), was stirred at rt (rt) for 4 h. Water (80 mL) was added, and the mixture was extracted with ethyl acetate (3×30 mL). The combined organic layer was washed with brine (2×20 mL), dried over $Na_2SO_4$, and concentrated to afford (S)-methyl 6-((tert-butoxycarbonyl) amino)-2-((S)-2-isobutyramidopropanamido) hexanoate as a white solid (10 g, crude).

A suspension of (S)-methyl 6-((tert-butoxycarbonyl) amino)-2-((S)-2-isobutyramidopropanamido) hexanoate (10 g, crude), LiOH (2.4 g, 100 mmol) in $H_2O$ (5 mL) and MeOH (15 mL), was stirred at rt for 4 h. MeOH was removed and aqueous phase was acidified with HCl (2N) to pH ~3-4. After removing water, the oil was dissolved in ethyl acetate (40 mL). The resulting solution was dried and concentrated to afford (S)-6-((tert-butoxycarbonyl)amino)-2-((S)-2-isobutyramidopropanamido)hexanoic acid as a light brown oil (5.7 g).

A mixture of (S)-6-((tert-butoxycarbonyl)amino)-2-((S)-2-isobutyramidopropanamido)hexanoic acid (1.3 g, crude), (R)-3-methyl-1-((3aS,4S,6S,7aR)-3a,5,5-trimethylhexahydro-4,6-methanobenzo[d][1,3,2]dioxaborol-2-yl)butan-1-amine (1.226 g, 3.36 mmol), HATU (1.4 g, 3.696 mmol) and TEA (0.678 g, 6.72 mmol) in DMF (8 mL), was stirred at rt for 3 h. Water (50 mL) was added and the resulting mixture was extracted with ethyl acetate (3×20 mL). The combined organic layer was washed with brine (3×20 mL), dried over $Na_2SO_4$, and concentrated to afford tert-butyl ((S)-5-((S)-2-isobutyramidopropanamido)-6-(((R)-3-methyl-1-((3aS,4S,6S,7aR)-3a,5,5-trimethylhexahydro-4,6-methanobenzo[d][1,3,2]dioxaborol-2-yl)butyl)amino)-6-oxohexyl)carbamate as a brown solid (2 g, crude).

A solution of tert-butyl ((S)-5-((S)-2-isobutyramidopropanamido)-6-(((R)-3-methyl-1-((3aS,4S,6S,7aR)-3a,5,5-trimethylhexahydro-4,6-methanobenzo[d][1,3,2]dioxaborol-2-yl)butyl)amino)-6-oxohexyl)carbamate (2 g, crude) and TFA (5.39 g, 47.32 mmol) in dichloromethane (10 mL), was stirred at rt for 4 h. The reaction mixture was treated with NaOH solution (5N) to pH ~7-8. The organic layer was separated, dried over $Na_2SO_4$, and concentrated to afford (S)-6-amino-2-((S)-2-isobutyramidopropanamido)-N—((R)-3-methyl-1-((3aS,4S,6S,7aR)-3a,5,5-trimethylhexahydro-4,6-methanobenzo[d][1,3,2]dioxaborol-2-yl)butyl)hexanamide as a brown oil (1.7 g, crude).

A solution of (S)-6-amino-2-((S)-2-isobutyramidopropanamido)-N—((R)-3-methyl-1-((3aS,4S,6S,7aR)-3a,5,5-trimethylhexahydro-4,6-methanobenzo[d][1,3,2]dioxaborol-2-yl)butyl)hexanamide (1.7 g, crude), 2-cyano-4-methylpent-2-enoic acid (0.443 g, 3.18 mmol), HATU (1.33 g, 3.498 mmol) and TEA (0.642 g, 6.36 mmol) in DMF (8 mL), was stirred at rt for 4 h. Water (50 mL) was added and the resulting mixture was extracted with ethyl acetate (3×20 mL). The combined organic layer was washed with brine (3×20 mL), dried over $Na_2SO_4$, and concentrated in vacuo and purified by flash column (silica:200-300 mesh, eluted with DCM:MeOH (50:1) to afford (S)-6-(2-cyano-4-methylpent-2-enamido)-2-((S)-2-isobutyramidopropanamido)-N—((R)-3-methyl-1-((3aS,4S,6S,7aR)-3a,5,5-trimethylhexahydro-4,6-methanobenzo[d][1,3,2]dioxaborol-2-yl)butyl)hexanamide as a yellow solid (0.6 g, 18% for 5 steps).

A solution of (S)-6-(2-cyano-4-methylpent-2-enamido)-2-((S)-2-isobutyramidopropanamido)-N—((R)-3-methyl-1-((3aS,4S,6S,7aR)-3a,5,5-trimethylhexahydro-4,6-methanobenzo[d][1,3,2]dioxaborol-2-yl)butyl)hexanamide (0.6 g, 0.916 mmol), isobutylboronic acid (189 mg, 1.832 mmol), HCl (1N, 2 mL) in MeOH (6 mL) and hexane (6 mL), was stirred at rt for 6 h. The mixture was separated, and the MeOH layer was washed with hexane (6 mL) and the solution was directly purified with prep-HPLC [eluted with MeOH:$H_2O$ (0.1% TFA) from (65:35) to (75:25)], the eluent was lyophilized to afford ((R)-1-((S)-6-(2-cyano-4-methylpent-2-enamido)-2-((S)-2-isobutyramidopropanamido)hexanamido)-3-methylbutyl)boronic acid as a white solid (180 mg, 37%). LC-MS (ES, m/z): 544.0 [M+23]; 504.0 [M-17].

Example 2

((R)-1-((S)-6-(2-cyano-4-methylpent-2-enamido)-2-(pyrazine-2-carboxamido)hexanamido)-3-methylbutyl)boronic Acid

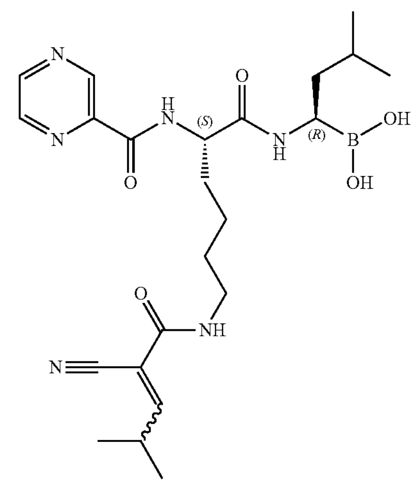

Using the procedure in Example 1, and starting with pyrazine-2-carboxylic acid, the title compound was obtained. LC-MS (ES, m/z): 509.1 [M+23]; 469.1 [M-17].

Example 3

((R)-1-((S)-6-(2-cyano-4-methylpent-2-enamido)-2-(2,5-dichlorobenzamido)hexanamido)-3-methylbutyl)boronic Acid

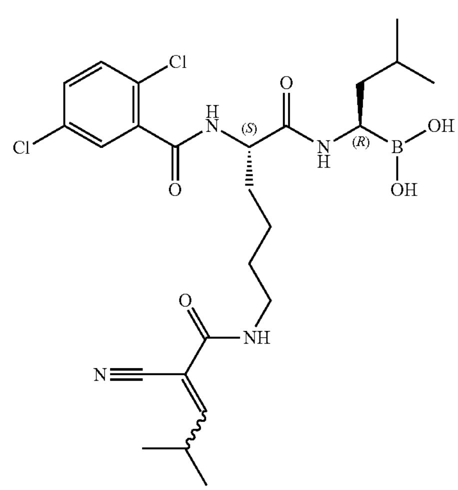

Using the procedure in Example 1, and starting with 2,5-dichlorobenzoic acid, the title compound was obtained. LC-MS (ES, m/z): 631.2 [M-17].

Example 4

((R)-1-((S)-6-(2-cyano-4-methylpent-2-enamido)-2-((S)-2-isobutyramidopropanamido)hexanamido)-2-phenylethyl)boronic Acid

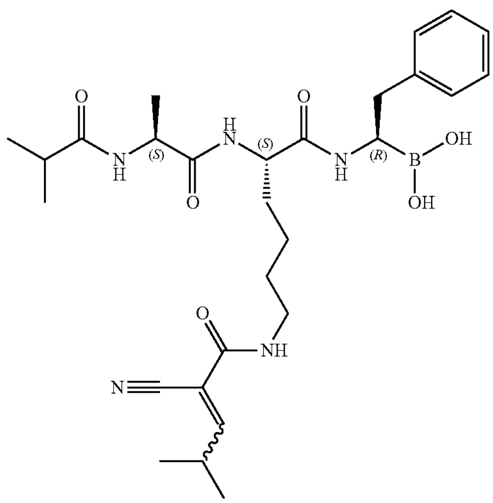

Using the procedure in Example 1, and starting with (R)-2-phenyl-1-((3aS,4S,6S,7aR)-3a,5,5-trimethylhexahydro-4,6-methanobenzo[d][1,3,2]dioxaborol-2-yl)ethan-1-amine, the title compound was obtained. LC-MS (ES, m/z): 578.0 [M+23]; 538.1 [M-17].

Example 5

((R)-1-((S)-6-(2-cyano-4-methylpent-2-enamido)-2-(pyrazine-2-carboxamido)hexanamido)-2-phenylethyl)boronic Acid

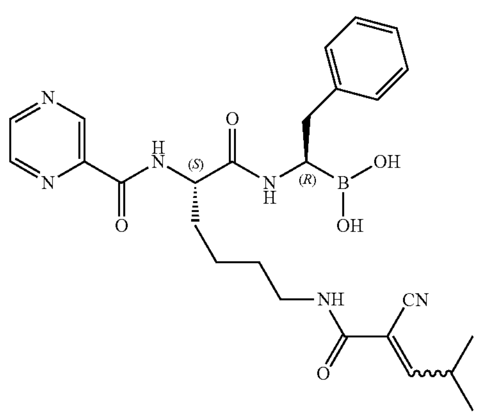

Using the procedure in Example 1, and starting with pyrazine-2-carboxylic acid and (R)-2-phenyl-1-((3aS,4S,6S,7aR)-3a,5,5-trimethylhexahydro-4,6-methanobenzo[d][1,3,2]dioxaborol-2-yl)ethan-1-amine, the title compound was obtained. LC-MS (ES, m/z): 543.0 [M+23]; 503.0 [M-17].

Example 6

((R)-1-((S)-6-(2-cyano-4-methylpent-2-enamido)-2-(6-hydroxypicolinamido)hexanamido)-2-phenylethyl)boronic Acid

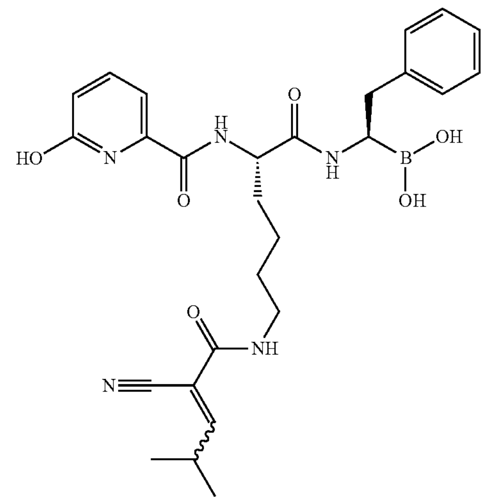 [SMILES: CC(C)C=C(C#N)C(=O)NCCCC[C@H](NC(=O)c1cccc(O)n1)C(=O)N[C@@H](Cc1ccccc1)B(O)O]

Using the procedure in Example 1, and starting with 6-hydroxypicolinic acid and (R)-2-phenyl-1-((3aS,4S,6S,7aR)-3a,5,5-trimethylhexahydro-4,6-methanobenzo[d][1,3,2]dioxaborol-2-yl)ethan-1-amine, the title compound was obtained. LC-MS (ES, m/z): 557.9 [M+23]; 517.8 [M-17].

Example 7

((R)-1-((S)-6-(2-cyano-4-methylpent-2-enamido)-2-(6-hydroxypicolinamido)hexanamido)-3-methylbutyl)boronic Acid

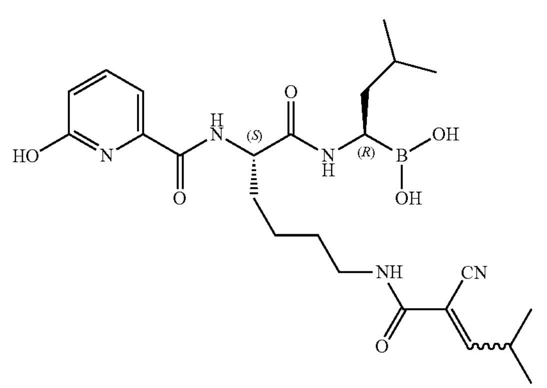

Using the procedure in Example 1, and starting with 6-hydroxypicolinic acid, the title compound was obtained. LC-MS (ES, m/z): 483.8 [M-17].

Example 8

((R)-1-((S)-6-(2-cyano-4-methylpent-2-enamido)-2-(2,5-dichlorobenzamido)hexanamido)-2-phenylethyl)boronic Acid

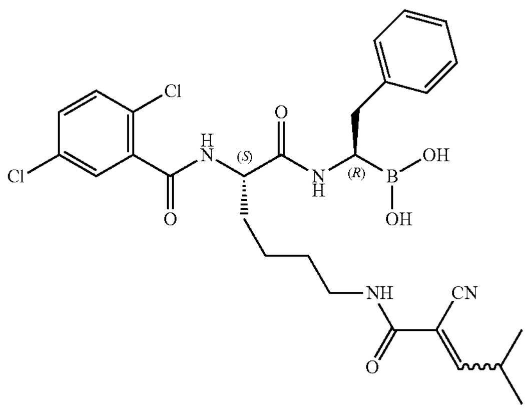

Using the procedure in Example 1, and starting with 2,5-dichlorobenzoic acid and (R)-2-phenyl-1-((3aS,4S,6S,7aR)-3a,5,5-trimethylhexahydro-4,6-methanobenzo[d][1,3,2]dioxaborol-2-yl)ethan-1-amine, the title compound was obtained. LC-MS (ES, m/z): 568.9 [M-17].

Example 9

((R)-1-((S)-6-(2-cyano-4-methylpent-2-enamido)-2-((2S,3R)-3-hydroxy-2-isobutyramidobutanamido)hexanamido)-3-methylbutyl)boronic Acid

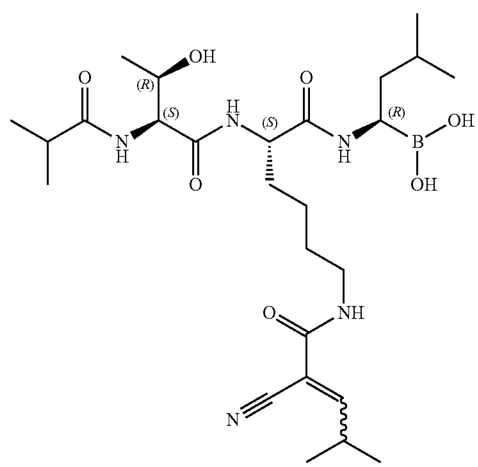

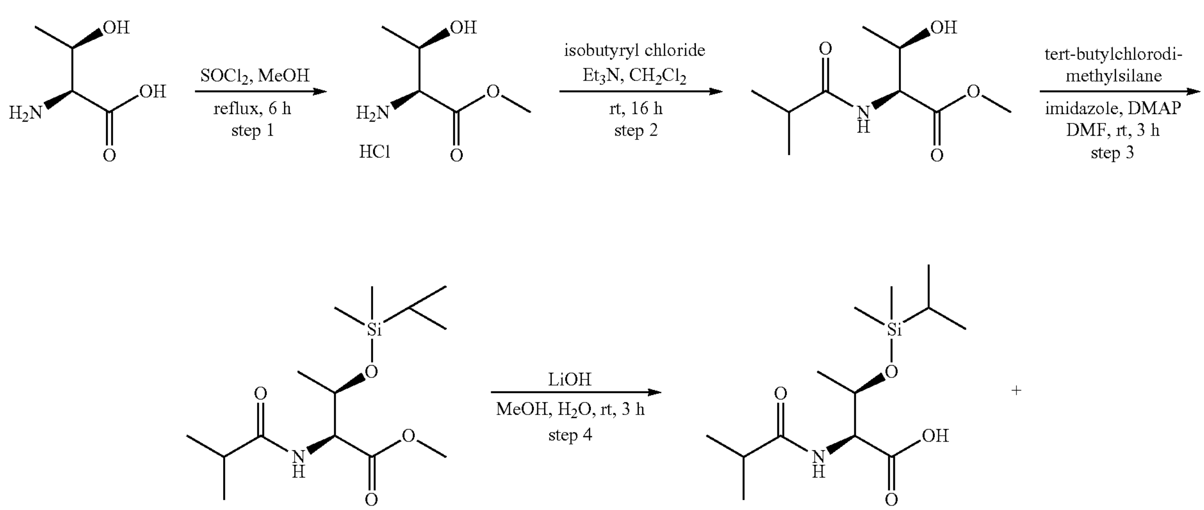

-continued
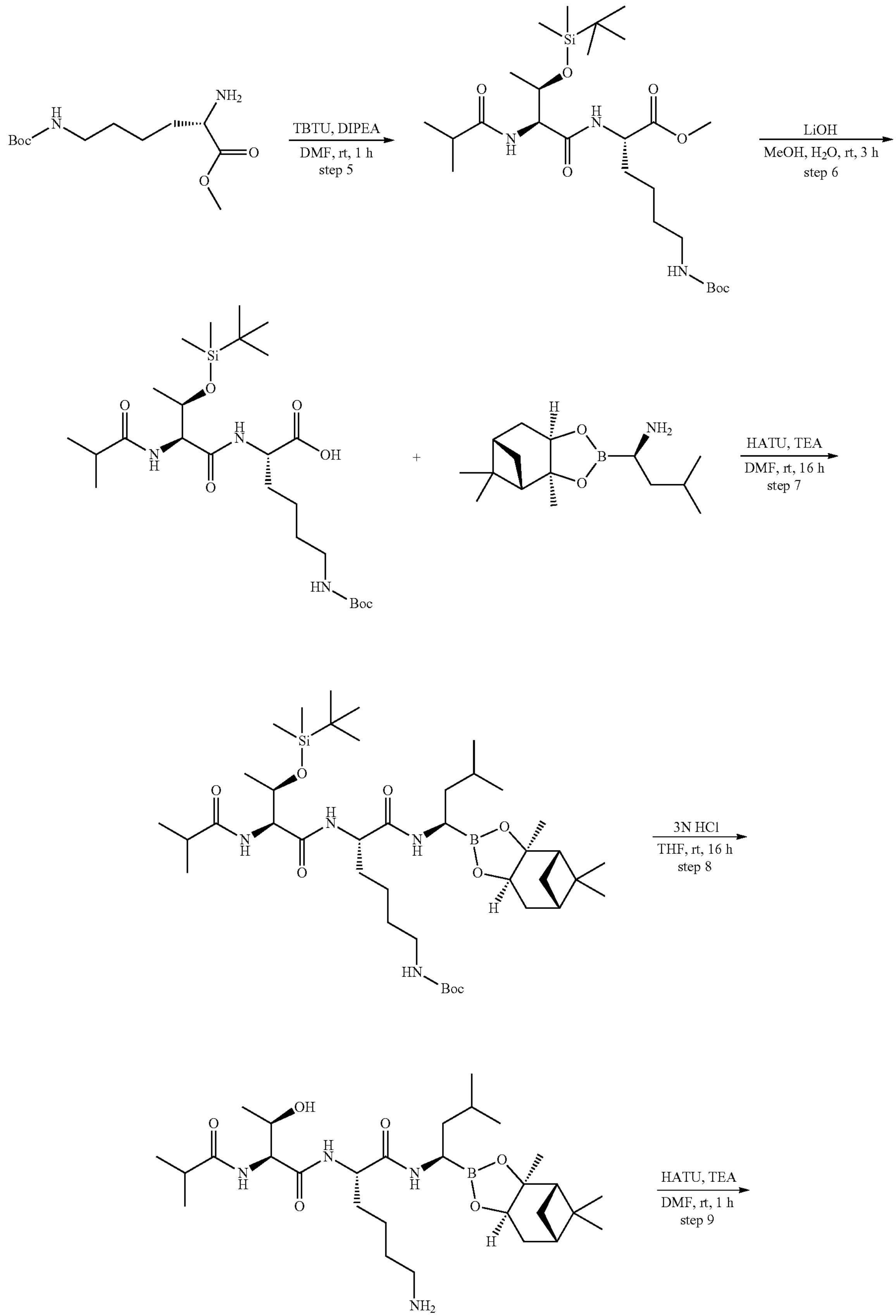

-continued

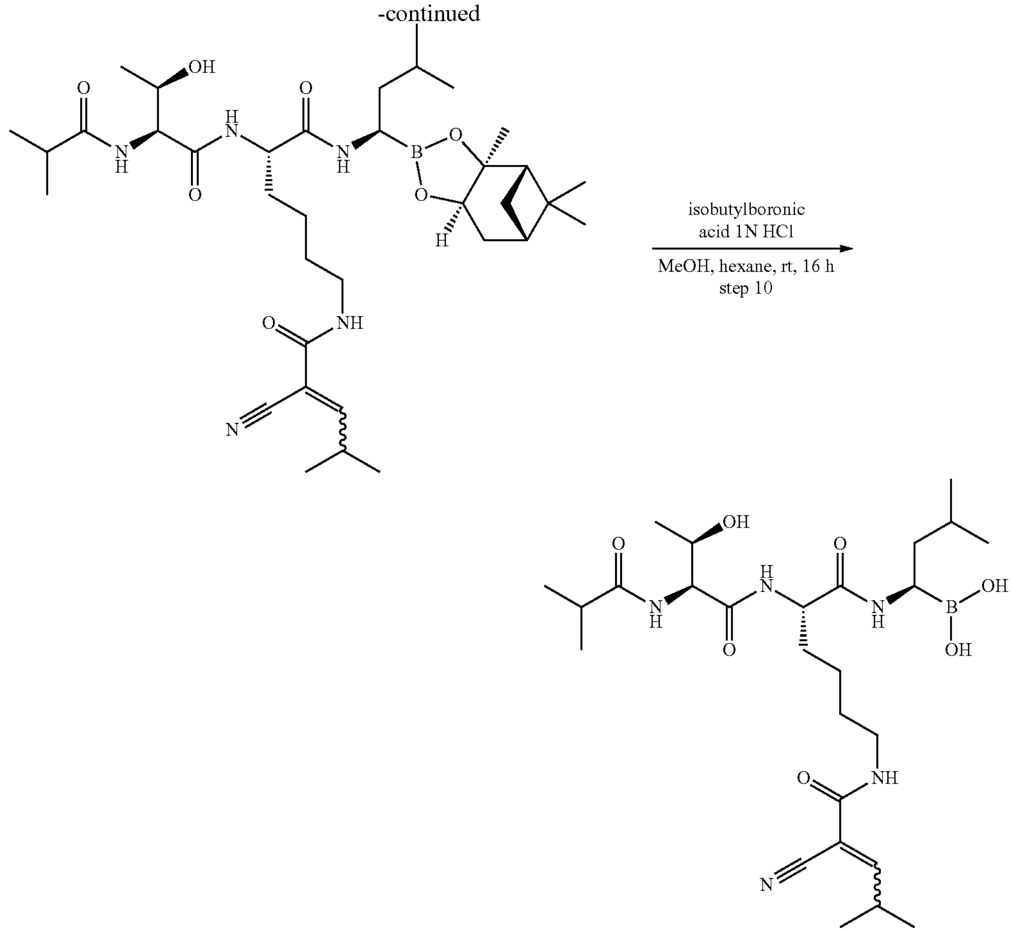

To a solution of (2S,3R)-2-amino-3-hydroxybutanoic acid (10 g, 84 mmol) in MeOH (100 mL), $SOCl_2$ (10 mL) was added dropwise at 0° C., after addition. The reaction mixture was stirred at rt for 4 h, before concentration to give (2S,3R)-methyl 2-amino-3-hydroxybutanoate hydrochloride as brown oil (15.35 g, crude).

To a solution of (2S,3R)-methyl 2-amino-3-hydroxybutanoate hydrochloride (15.35 g, 84 mmol), TEA (21.21 g, 210 mmol) in dichloromethane (80 mL), isobutyryl chloride (8.96 g, 84 mmol) was added dropwise at 0° C. The reaction mixture was stirred at rt for 3 h. After removing insoluble material by filtration, the filtrate was concentrated. The residue was dissolved in ethyl acetate (50 mL), and the insoluble solid was filtered and the filtrate was concentrated to give (2S,3R)-methyl 3-hydroxy-2-isobutyramidobutanoate as brown oil (13 g, crude).

To a solution of (2S,3R)-methyl 3-hydroxy-2-isobutyramidobutanoate as brown oil (6 g, 29.6 mmol), DMAP (72 mg, 0.59 mmol), imidazole (6 g, 88.8 mmol) in DMF (30 mL), TBDMSCl (6.68 g, 44.3 mmol) was added at 0° C. The reaction mixture was stirred at rt under argon for 3 h. Water (50 mL) was added, and the resulting mixture was extracted with ethyl acetate (3×30 mL). The combined organic layer was washed with brine (3×20 mL), dried over $Na_2SO_4$, and concentrated to give (2S,3R)-methyl 3-((tert-butyldimethylsilyl)oxy)-2-isobutyramidobutanoate as colorless oil (9 g, crude).

A mixture of (2S,3R)-methyl 3-((tert-butyldimethylsilyl)oxy)-2-isobutyramidobutanoate (9 g, 28.4 mmol), LiOH monohydrate (5.68 g, 142 mmol) in $H_2O$ (10 mL) and MeOH (45 mL), was stirred at rt for 3 h. MeOH was removed and the mixture was acidified with HCl (2 N) to pH ~3-4, then extracted with ethyl acetate (3×30 mL). The combined organic layer was washed with brine (2×20 mL), dried over $Na_2SO_4$, and concentrated to afford (2S,3R)-3-((tert-butyldimethylsilyl)oxy)-2-isobutyramidobutanoic acid as light yellow oil (7 g, crude).

A solution of (2S,3R)-3-((tert-butyldimethylsilyl)oxy)-2-isobutyramidobutanoic acid (7 g, 23.1 mmol), (S)-methyl 2-amino-6-((tert-butoxycarbonyl)amino)hexanoate (6 g, 23.1 mmol), HATU (9.66 g, 25.4 mmol) and TEA (4.67 g, 46.2 mmol) in DMF (45 mL), was stirred at rt for 3 h under argon. Water (100 mL) was added and the mixture was extracted with ethyl acetate (3×50 mL) The combined organic layer was washed with brine (3×30 mL), dried over $Na_2SO_4$, and concentrated afford (S)-methyl 6-((tert-butoxycarbonyl)amino)-2-((2S,3R)-3-((tert-butyldimethylsilyl)oxy)-2-isobutyramidobutanamido)hexanoate as a light yellow oil (17 g, crude).

A solution of (S)-methyl 6-((tert-butoxycarbonyl)amino)-2-((2S,3R)-3-((tert-butyldimethylsilyl) oxy)-2-isobutyramidobutanamido)hexanoate (17 g, 23.1 mmol), LiOH monohydrate (4.6 g, 115.5 mmol) in $H_2O$ (15 mL) and MeOH (45 mL), was stirred at rt for 4 h. MeOH was removed and water (50 mL) was added. The resulting mixture was acidified with HCl (2 N) to pH ~3-4, and the precipitate was collected by filtration and dissolved in ethyl acetate (50 mL). The resulting solution was dried over $Na_2SO_4$, and concentrated to afford (S)-6-((tert-butoxycarbonyl)amino)-2-((2S,3R)-3-((tert-butyldimethylsilyl)oxy)-2-isobutyramidobutanamido)hexanoic acid as a yellow solid (9.75 g, 79%).

A solution of (S)-6-((tert-butoxycarbonyl)amino)-2-((2S,3R)-3-((tert-butyldimethylsilyl)oxy)-2-isobutyramidobutanamido)hexanoic acid (2 g, 3.766 mmol), (R)-3-methyl-1-((3aS,4S,6S,7aR)-3a,5,5-trimethylhexahydro-4,6-methanobenzo[d][1,3,2]dioxaborol-2-yl)butan-1-amine (1.31 g, 3.766 mmol), HATU (1.574 g, 4.143 mmol) and TEA (0.96 g, 7.532 mmol) in DMF (10 mL), was stirred at rt for 2 h. Water (80 mL) was added and the mixture was extracted with ethyl acetate (3×30 mL). The combined organic layer was washed with brine (3×25 mL), dried over $Na_2SO_4$, and concentrated to afford tert-butyl ((S)-5-((2S,3R)-3-((tert-butyldimethylsilyl)oxy)-2-isobutyramidobutanamido)-6-(((R)-3-methyl-1-((3aS,4S,6S,7aR)-3a,5,5-trimethylhexahydro-4,6-methanobenzo[d][1,3,2]dioxaborol-2-yl)butyl)amino)-6-oxohexyl)carbamate as a yellow solid (2.94 g, crude).

A solution of tert-butyl ((S)-5-((2S,3R)-3-((tert-butyldimethylsilyl)oxy)-2-isobutyramidobutanamido)-6-(((R)-3-methyl-1-((3aS,4S,6S,7aR)-3a,5,5-trimethylhexahydro-4,6-methanobenzo[d][1,3,2]dioxaborol-2-yl)butyl)amino)-6-oxohexyl)carbamate (2.9 g, 3.73 mmol), in HCl (3 N in 1,4-dioxane), was stirred at rt for 16 h. THF was removed and the aqueous solution was lyophilized to afford (S)-6-amino-2-((2S,3R)-3-hydroxy-2-isobutyramidobutanamido)-N—((R)-3-methyl-1-((3aS,4S,6S,7aR)-3a,5,5-trimethylhexahydro-4,6-methanobenzo[d][1,3,2]dioxaborol-2-yl)butyl)hexanamide as brown oil (1.6 g, crude).

A solution of (S)-6-amino-2-((2S,3R)-3-hydroxy-2-isobutyramidobutanamido)-N—((R)-3-methyl-1-((3aS,4S,6S,7aR)-3a,5,5-trimethylhexahydro-4,6-methanobenzo[d][1,3,2]dioxaborol-2-yl)butyl)hexanamide (1.6 g, 2.83 mmol), 2-cyano-4-methylpent-2-enoic acid (0.394 g, 2.83 mmol), HATU (1.18 g, 3.11 mmol) and TEA (0.571 g, 5.66 mmol) in DMF (10 mL), was stirred at rt for 3 h under argon. Water (50 mL) was added, and the resulting mixture was extracted with ethyl acetate (3×30 mL). The combined organic layer was washed with brine (2×20 mL), dried over $Na_2SO_4$, and concentrated in vacuo. The residue was purified by flash column (silica:200-300 mesh, eluted with DCM:MeOH (20:1)) to afford (S)-6-(2-cyano-4-methylpent-2-enamido)-2-((2S,3R)-3-hydroxy-2-isobutyramidobutanamido)-N—((R)-3-methyl-1-((3aS,4S,6S,7aR)-3a,5,5-trimethylhexahydro-4,6-methanobenzo[d][1,3,2]dioxaborol-2-yl)butyl)hexanamide as a yellow solid (0.32 g, 17%).

A solution of (S)-6-(2-cyano-4-methylpent-2-enamido)-2-((2S,3R)-3-hydroxy-2-isobutyramidobutanamido)-N—((R)-3-methyl-1-((3aS,4S,6S,7aR)-3a,5,5-trimethylhexahydro-4,6-methanobenzo[d][1,3,2]dioxaborol-2-yl)butyl)hexanamide (0.32 g, 0.467 mmol), isobutylboronic acid (95 mg, 0.934 mmol), HCl (1N, 1 mL) in MeOH (4 mL) and hexane (4 mL), was stirred at rt for 6 h under argon. The mixture was separated, and the MeOH layer was washed with hexane (3×4 mL) before being purified with prep-HPLC [eluted with MeOH:$H_2O$ (0.1% TFA) from (60:40) to (70:30)] to afford ((R)-1-((S)-6-(2-cyano-4-methylpent-2-enamido)-2-((2S,3R)-3-hydroxy-2-isobutyramidobutanamido)hexanamido)-3-methylbutyl)boronic acid as a white solid (55 mg, 21%). LC-MS (ES, m/z): 573.9 [M+23]; 533.9 [M-17].

Example 10

((R)-1-((S)-6-(2-cyano-4-methylpent-2-enamido)-2-((2S,3R)-3-hydroxy-2-isobutyramidobutanamido)hexanamido)-2-phenylethyl)boronic Acid

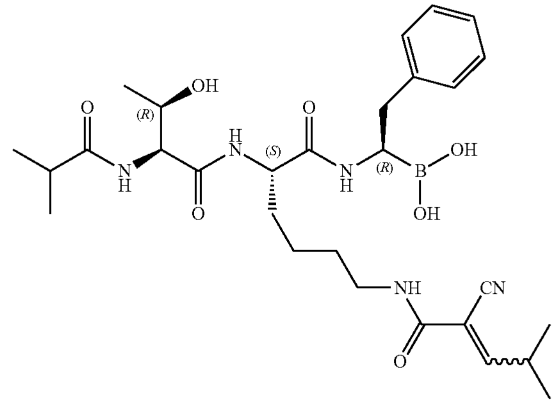

Using the procedure in Example 9, and starting with (R)-2-phenyl-1-((3aS,4S,6S,7aR)-3a,5,5-trimethylhexahydro-4,6-methanobenzo[d][1,3,2]dioxaborol-2-yl)ethan-1-amine, the title compound was obtained. LC-MS (ES, m/z): 607.9 [M+23]; 567.8 [M-17].

Example 11

((R)-1-((S)-2-acetamido-6-(2-cyano-4-methylpent-2-enamido)hexanamido)-2-phenylethyl)boronic Acid

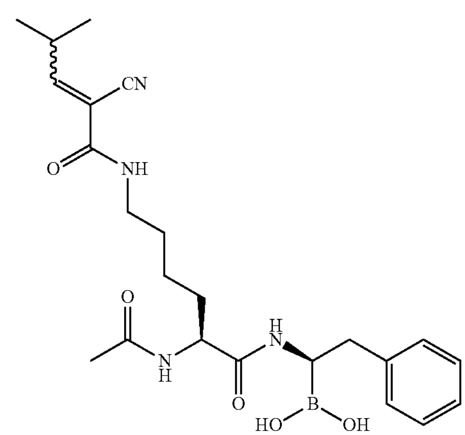

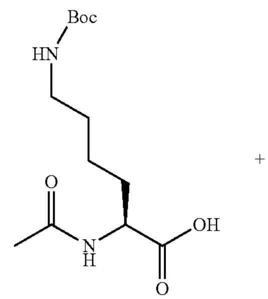

-continued

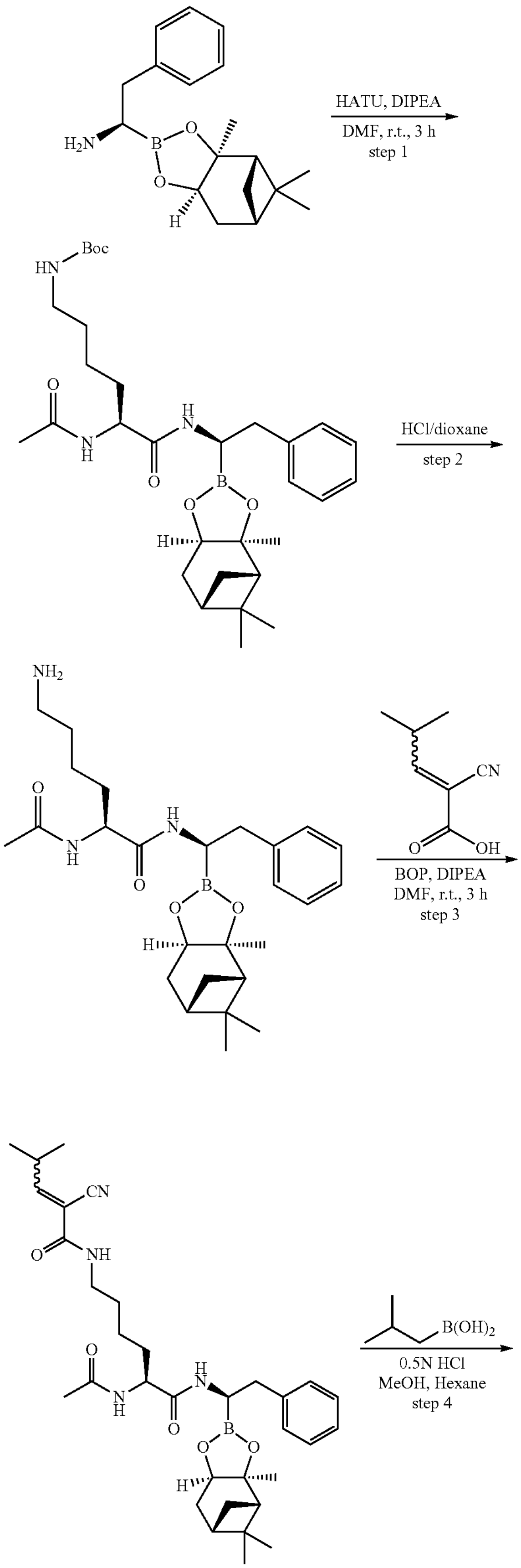

-continued

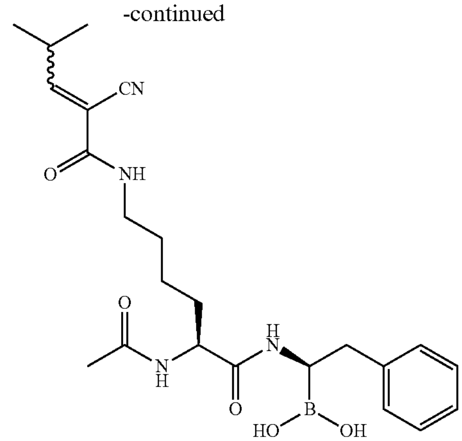

To a solution of N2-acetyl-N6-(tert-butoxycarbonyl)-L-lysine (576 mg, 2 mmol) and DIPEA (774 mg, 6 mmol) in DMF (8 mL) at 0° C. was added HATU (800 mg, 2.1 mmol). After stirring at 0° C. for 1 h, (R)-2-phenyl-1-((3aS,4S,6S,7aR)-3a,5,5-trimethylhexahydro-4,6-methanobenzo[d][1,3,2]dioxaborol-2-yl)ethan-1-amine (600 mg, 2 mmol) was added. The resulting mixture was stirred at rt for 3 h, before partitioned between HCl (1 M) and EtOAc. The organic layer was washed with $NaHCO_3$ solution, water and brine, before being dried over $Na_2SO_4$ and filtrated. The filtrate was concentrated to dryness to afford tert-butyl ((S)-5-acetamido-6-oxo-6-(((R)-2-phenyl-1-((3aS,4S,6S,7aR)-3a,5,5-trimethylhexahydro-4,6-methanobenzo[d][1,3,2]dioxaborol-2-yl)ethyl)amino)hexyl)carbamate as an off-white solid (630 mg, 56%).

A solution of tert-butyl ((S)-5-acetamido-6-oxo-6-(((R)-2-phenyl-1-((3aS,4S,6S,7aR)-3a,5,5-trimethylhexahydro-4,6-methanobenzo[d][1,3,2]dioxaborol-2-yl)ethyl)amino)hexyl)carbamate (630 mg, 1.12 mmol) and HCl (5 mL, 4 N in dioxane) in dioxane was stirred at rt for 0.5 h. The mixture was concentrated in vacuo to give (S)-2-acetamido-6-amino-N—((R)-2-phenyl-1-((3aS,4S,6S,7aR)-3a,5,5-trimethylhexahydro-4,6-methanobenzo[d][1,3,2]dioxaborol-2-yl)ethyl)hexanamide as an off-white solid (520 mg, crude).

To a solution of (S)-2-acetamido-6-amino-N—((R)-2-phenyl-1-((3aS,4S,6S,7aR)-3a,5,5-trimethylhexahydro-4,6-methanobenzo[d][1,3,2]dioxaborol-2-yl)ethyl)hexanamide (167 mg, 1.2 mmol) and DIPEA (390 mg, 3 mmol) in DMF (5 mL) at 0° C. was added BOP (530 mg, 1.2 mmol). After stirring at 0° C. for 1 h, 2-cyano-4-methylpent-2-enoic acid (470 mg, 1. mmol) was added. The resulting mixture was stirred at rt for 3 h, before being partitioned between HCl (1M) and EtOAc. The organic layer was washed with aq. $NaHCO_3$, water and brine, dried over $Na_2SO_4$ and filtrated. The filtrate was concentrated to dryness to afford (S)-2-acetamido-6-(2-cyano-4-methylpent-2-enamido)-N—((R)-2-phenyl-1-((3aS,4S,6S,7aR)-3a,5,5-trimethylhexahydro-4,6-methanobenzo[d][1,3,2]dioxaborol-2-yl)ethyl)hexanamide as an off-white solid (380 mg, 65%).

To a solution of (S)-2-acetamido-6-(2-cyano-4-methylpent-2-enamido)-N—((R)-2-phenyl-1-((3aS,4S,6S,7aR)-3a,5,5-trimethylhexahydro-4,6-methanobenzo[d][1,3,2]dioxaborol-2-yl)ethyl)hexanamide (380 mg, 0.64 mmol) in MeOH (5 mL) were added hexane (5 mL) and HCl (0.5 N, 3 mL), followed by addition of isobutyl boronic acid (164 mg, 1.61 mol). After stirring at rt for 4 h, the solution was concentrated to give a residue which was purified by prep-HPLC to afford ((R)-1-((S)-2-acetamido-6-(2-cyano-4- methylpent-2-enamido)hexanamido)-2-phenylethyl)boronic acid as a white solid (23 mg, 8%). LC-MS (ES, m/z): 479.2 [M+23]; 439.2 [M-17].

Example 12

((R)-1-((S)-6-(2-cyano-4-methylpent-2-enamido)-2-(methylsulfonamido)hexanamido)-2-phenylethyl) boronic Acid

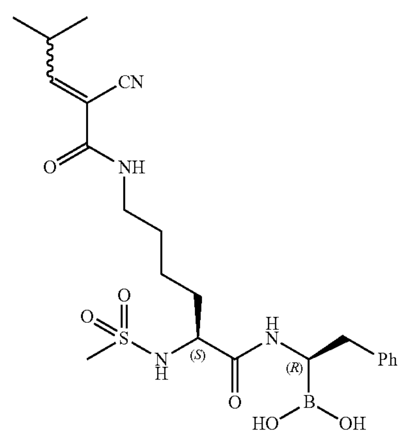

Using the procedure in Example 10, and starting with N6-(tert-butoxycarbonyl)-N2-(methylsulfonyl)-L-lysine, the title compound was obtained. LC-MS (ES, m/z): 515.1 [M+23]; 475.1 [M-17].

Example 13

((R)-1-((S)-6-(2-cyano-4-methylpent-2-enamido)-2-((2,2,2-trifluoroethyl)amino)hexanamido)-2-phenylethyl)boronic Acid

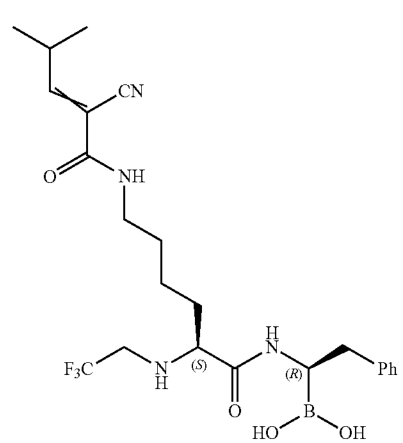

-continued

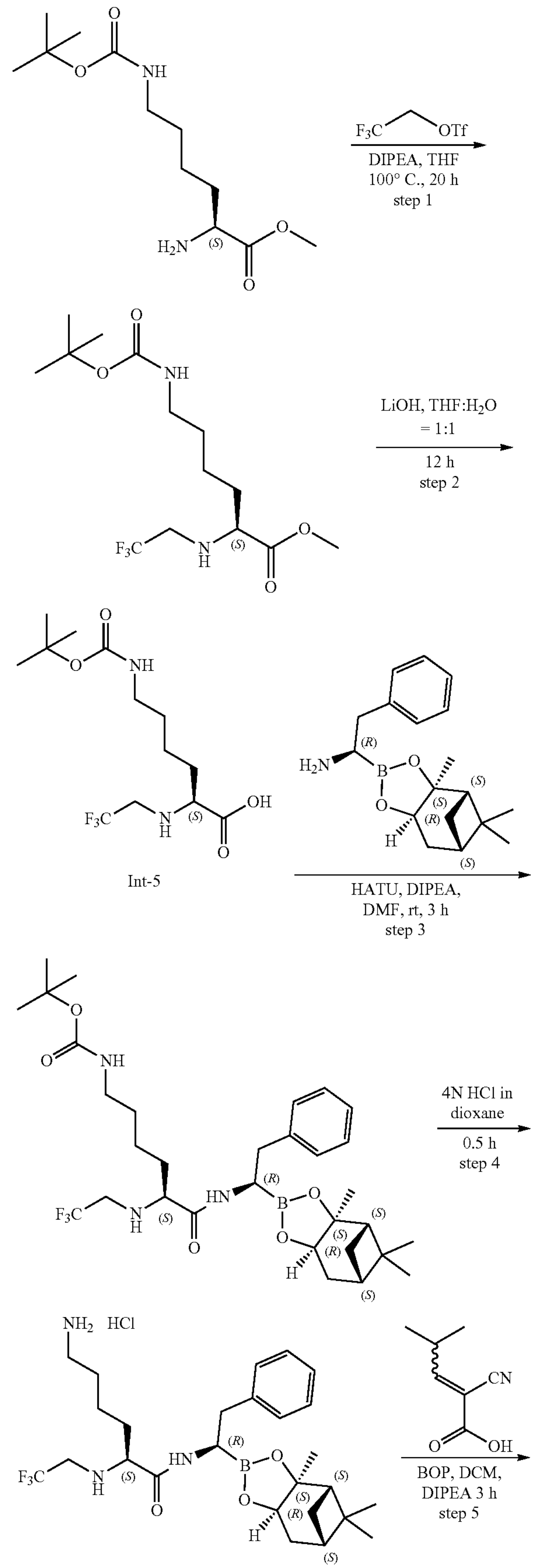

-continued

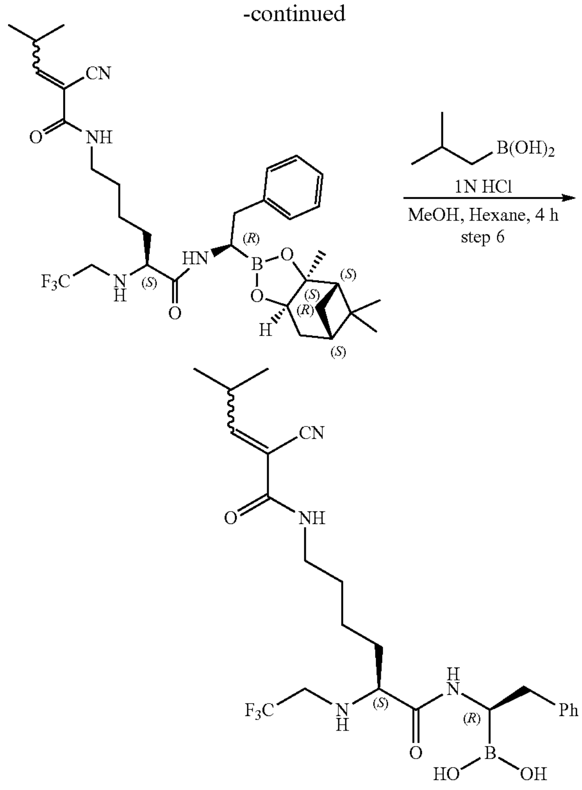

2,2,2-trifluoroethyl trifluoromethanesulfonate (3.516 g, 15.05 mmol) was added to a stirred solution of (S)-methyl 2-amino-6-((tert-butoxycarbonyl)amino)hexanoate (3.0 g, 10 mmol) and DIPEA (3.99 g, 30.03 mmol) in THF (30 mL) at rt. The mixture was stirred at 100° C. in a sealed tube overnight, then the solvent was removed under reduced pressure and the residue was purified by flash column to give (S)-methyl 6-(tert-butoxycarbonylamino)-2-(2,2,2-trifluoroethylamino)hexanoate as pale yellow oil (1.835 g, 55%).

To a solution of (S)-methyl 6-(tert-butoxycarbonylamino)-2-(2,2,2-trifluoroethylamino)hexanoate (334 mg, 0.98 mmol) in THF and $H_2O$ (5 mL, 1:1) was added LiOH monohydrate (123 mg, 2.93 mmol). The reaction was stirred at rt for 12 h. The pH of the mixture was adjusted to ~3-4 with HCl (1 M) before extraction with dichloromethane: methanol (5:1, 3×20 mL). The organic layers were combined and washed with brine (20 mL), dried over $Na_2SO_4$ and concentrated in vacuo to give (S)-6-(tert-butoxycarbonylamino)-2-(2,2,2-trifluoroethylamino)hexanoic acid as a yellow solid (240 mg, 75%) which was used directly without further purification.

To a solution of (S)-6-(tert-butoxycarbonylamino)-2-(2,2,2-trifluoroethylamino)hexanoic acid (500 mg, 1.53 mmol) and DIPEA (592 mg, 4.59 mmol) in DMF (5 mL) at 0° C. was added HATU (698 mg, 1.84 mmol). After stirring at 0° C. for 1 h, (R)-2-phenyl-1-((3aS,4S,6S,7aR)-3a,5,5-trimethylhexahydro-4,6-methanobenzo[d][1,3,2]dioxaborol-2-yl)ethan-1-amine (563 mg, 1.68 mmol) was added. The resulting mixture was stirred at rt for 3 h before partitioned between HCl (1 M) and EtOAc. The organic layer was washed with aq. $NaHCO_3$, water and brine, dried over $Na_2SO_4$ and filtrated. The filtration was concentrated to dryness to afford tert-butyl((S)-6-oxo-6-(((R)-2-phenyl-1-((3aS,4S,6S,7aR)-3a,5,5-trimethylhexahydro-4,6-methanobenzo[d][1,3,2]dioxaborol-2-yl)ethyl)amino)-5-((2,2,2-trifluoroethyl)amino)hexyl)carbamate as an off-white solid (1.19 g, crude).

A solution of tert-butyl((S)-6-oxo-6-(((R)-2-phenyl-1-((3aS,4S,6S,7aR)-3a,5,5-trimethylhexahydro-4,6-methanobenzo[d][1,3,2]dioxaborol-2-yl)ethyl)amino)-5-((2,2,2-trifluoroethyl)amino)hexyl)carbamate (1.19 g, 1.97 mmol) and HCl (10 mL, 4 M in dioxane) in dioxane was stirred at rt for 0.5 h. The mixture was concentrated in vacuo to give (S)-6-amino-N—((R)-2-phenyl-1-((3aS,4S,6S,7aR)-3a,5,5-trimethylhexahydro-4,6-methanobenzo[d][1,3,2]dioxaborol-2-yl)ethyl)-2-((2,2,2-trifluoroethyl)amino)hexanamide hydrochloride as a white solid (1.35 g, crude).

DIPEA (0.96 g, 7.41 mmol) was added to a stirred solution of (S)-6-amino-N—((R)-2-phenyl-1-((3aS,4S,6S,7aR)-3a,5,5-trimethylhexahydro-4,6-methanobenzo[d][1,3,2]dioxaborol-2-yl)ethyl)-2-((2,2,2-trifluoroethyl)amino) hexanamide hydrochloride (1.35 g, 2.47 mmol), 2-cyano-4-methylpent-2-enoic acid (275 mg, 1.98 mmol) and BOP (1.092 g, 2.47 mmol) in DMF (10 mL) at 0° C. The mixture was stirred at rt for 2 h, then washed with brine (25 mL), dried over $Na_2SO_4$ and concentrated in vacuo. The crude residue was purified by flash column chromatography with MeOH:dichloromethane to afford (S)-6-(2-cyano-4-methylpent-2-enamido)-N—((R)-2-phenyl-1-((3aS,4S,6S,7aR)-3a,5,5-trimethylhexahydro-4,6-methanobenzo[d][1,3,2]dioxaborol-2-yl)ethyl)-2-((2,2,2-trifluoroethyl)amino) hexanamide as a white solid (400 mg, 25%).

To a solution of (S)-6-(2-cyano-4-methylpent-2-enamido)-N—((R)-2-phenyl-1-((3aS,4S,6S,7aR)-3a,5,5-trimethylhexahydro-4,6-methanobenzo[d][1,3,2]dioxaborol-2-yl)ethyl)-2-((2,2,2-trifluoroethyl)amino)hexanamide (400 mg, 0.64 mmol) in MeOH (5 mL) were added hexane (5 mL) and HCl (1 N, 5 mL), followed by addition of isobutyl boronic acid (167 mg, 1.65 mol). After stirring at rt for 4 h, the solution was concentrated to give a residue which was purified by prep-HPLC to afford ((R)-1-((S)-6-(2-cyano-4-methylpent-2-enamido)-2-((2,2,2-trifluoroethyl)amino) hexanamido)-2-phenylethyl)boronic acid as a white solid (54 mg, 14%). LC-MS (ES, m/z): 519.2 [M+23]; 479.2 [M-17].

Example 14

((R)-1-((S)-3-(((R)-1-(2-cyano-4-methylpent-2-enoyl)pyrrolidin-2-yl)methoxy)-2-(2,5-dichlorobenzamido)propanamido)-2-phenylethyl)boronic Acid

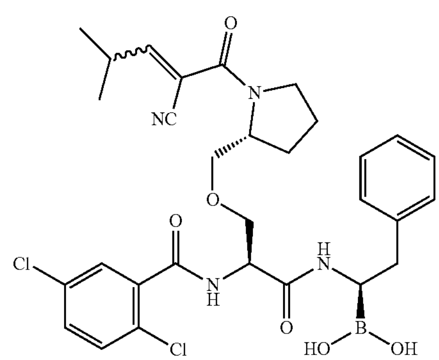

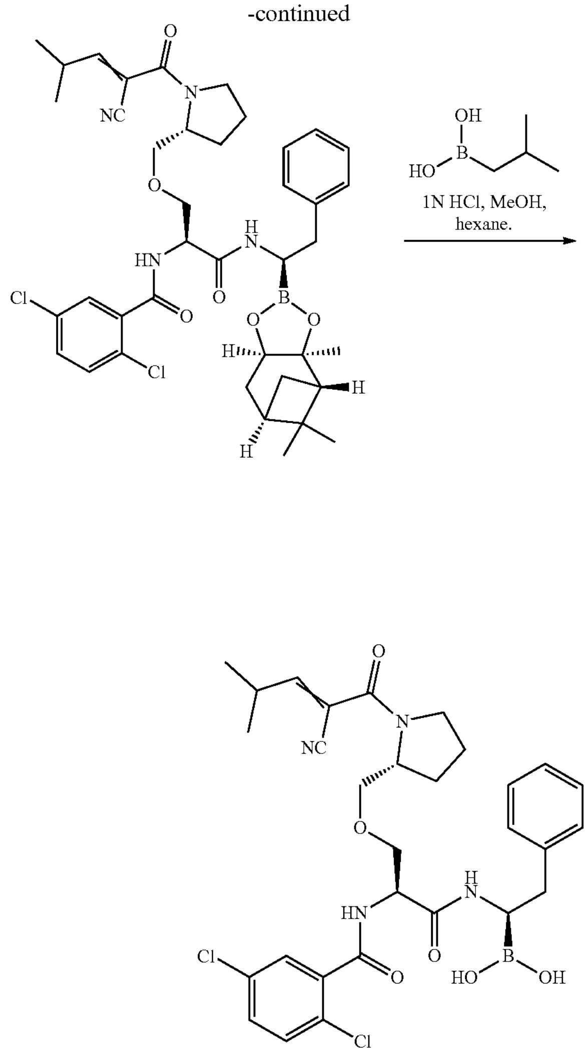

Into a 25-mL round-bottom flask, was placed (2S)-3-[[(2R)-1-[2-cyano-2-(2-methylpropylidene)acetyl]pyrrolidin-2-yl]methoxy]-2-[(2,5-dichlorophenyl)formamido]-N-[(1R)-2-phenyl-1-[(1S,2S,6R,8R)-2,9,9-trimethyl-3,5-dioxa-4-boratricyclo[6.1.1.0^[2,6]]decan-4-yl]ethyl] propanamide from above sequence (100 mg, 0.13 mmol, 1.00 eq.), methanol (6 mL), 1N hydrogen chloride (2.3 mL), (2-methylpropyl)boronic acid (40.18 mg, 0.39 mmol, 3.01 eq.), and hexane (6 mL). The resulting solution was stirred for 3-5 h at rt. The hexane layer was discarded, the methanol layer was diluted with water and lyophilized, then washed with hexane and ether twice. This resulted in 24.4 mg (30%) of ((R)-1-((S)-3-(((R)-1-(2-cyano-4-methylpent-2-enoyl) pyrrolidin-2-yl)methoxy)-2-(2,5-dichlorobenzamido)propanamido)-2-phenylethyl)boronic acid as a white solid. LC-MS m/z: 627.2 [M−1, negative mode].

Example 15

((R)-1-((S)-2-(2,5-dichlorobenzamido)-3-(3-(N-methylacrylamido)phenyl)propanamido)-2-phenylethyl)boronic Acid

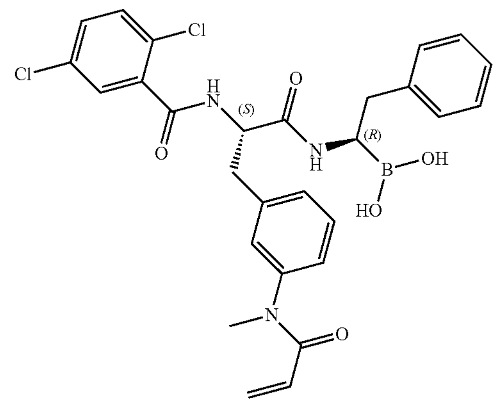

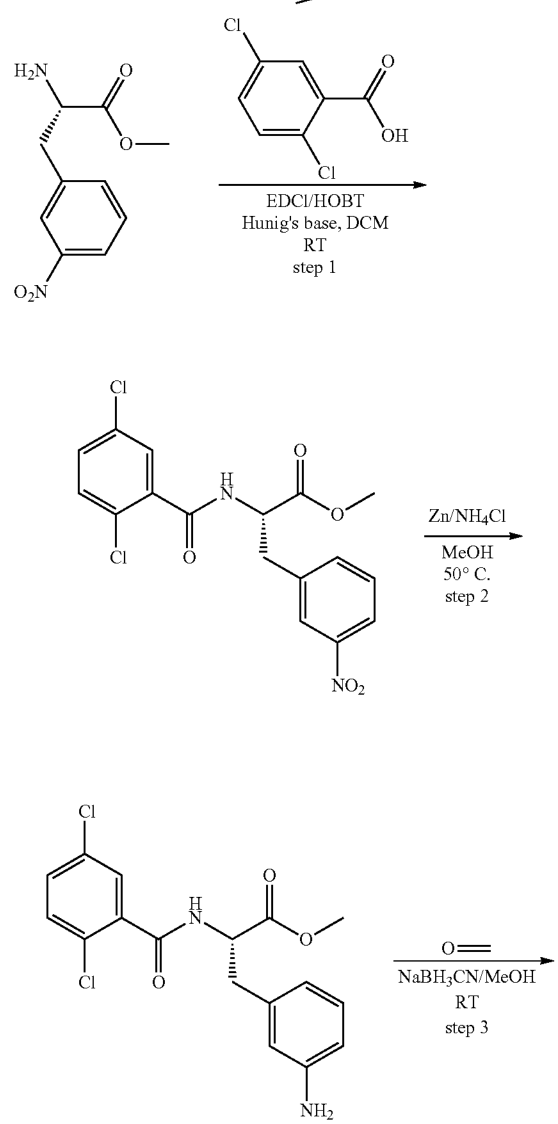

-continued

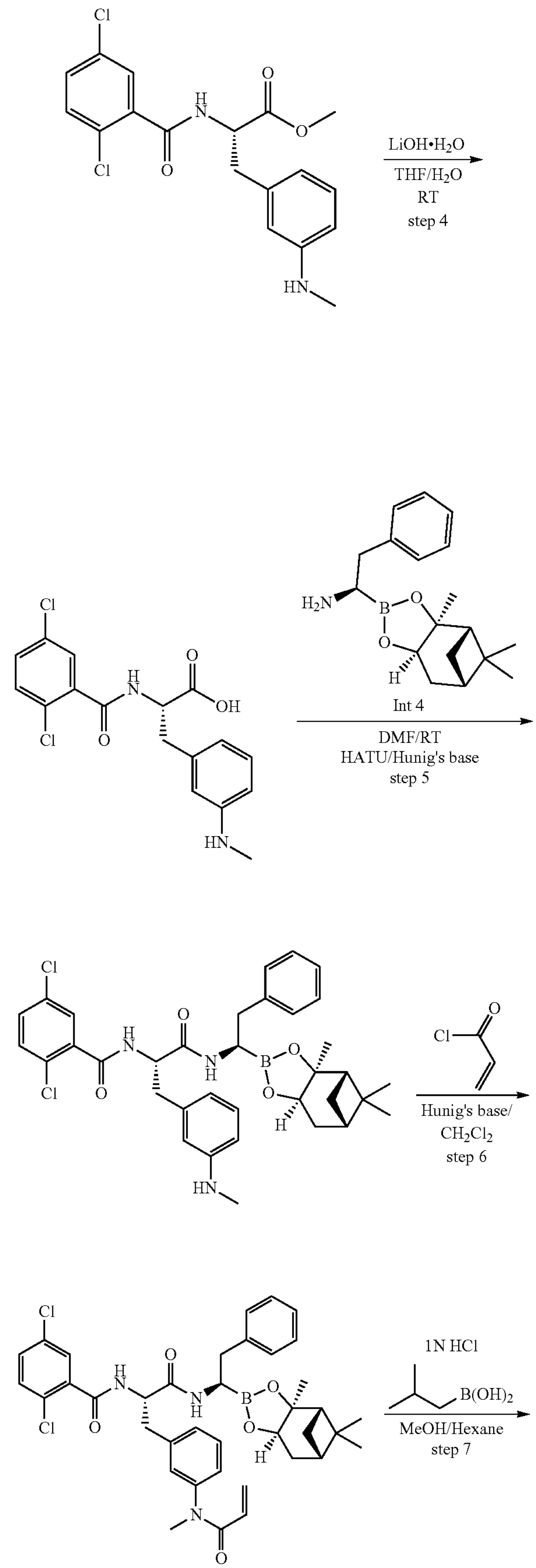

-continued

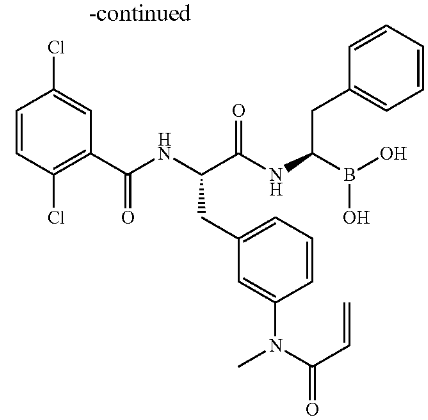

To a well-stirred solution of 2,5-dichlorobenzoic acid (3.665 g, 19.2 mmol) in DCM (75 mL) at 0° C. were added methyl (S)-2-amino-3-(3-nitrophenyl)propanoate (5 g, 19.2 mmol), EDCI (4.715 g, 24.96 mol), and HOBT (3.82 g, 24.96 mmol), followed by slow addition of Hunig's base (7.175 g, 96 mmol). After stirring at rt overnight, the resulted mixture was washed with cold water (2×100 mL) and brine (200 mL) sequentially, dried over $Na_2SO_4$ and concentrated in vacuo to give crude product, which was purified by combiflash to afford (S)-methyl 2-(2,5-dichlorobenzamido)-3-(3-nitrophenyl)propanoate as light yellow solid (5.6 g, 79%).

A mixture of (S)-methyl 2-(2,5-dichlorobenzamido)-3-(3-nitrophenyl)propanoate (2.6 g, 6.55 mmol), zinc powder (2.14 g, 32.7 mmol), $NH_4Cl$ (1.749 g, 32.7 mmol) and methanol (50 mL) was stirred at 50° C. under nitrogen for 1 h. The solvent was removed under reduced pressure, and then diluted by EtOAc. The resulting mixture was filtered through the celite pad and the filtrate was concentrated in vacuo to give the crude product, which was purified by combiflash to afford (S)-methyl 3-(3-aminophenyl)-2-(2,5-dichlorobenzamido)propanoate as light yellow solid (2.08 g, 87%).

A mixture of (S)-methyl 3-(3-aminophenyl)-2-(2,5-dichlorobenzamido)propanoate (2.089 g, 5.7 mmol), formalin (431 mg, 5.7 mmol), acetic acid (14 drops) and methanol(30 mL) was stirred at rt under nitrogen for 8 h before addition of sodium cyanoborohydride (537 mg, 8.54 mmol). The resulting mixture was allowed to stir overnight, and then the solvent was removed under reduced pressure. Water was added and extracted by ethyl acetate. The combined organic phase was washed with brine, dried over $Na_2SO_4$, and then filtered. The filtrate was concentrated in vacuo to give (S)-methyl 2-(2,5-dichlorobenzamido)-3-(3-(methylamino)phenyl)propanoate as light yellow solid (1.306 g, 60%).

A mixture of (S)-methyl 2-(2,5-dichlorobenzamido)-3-(3-(methylamino)phenyl)propanoate (1.306 g, 3.44 mmol) and $LiOH.H_2O$ (0.159 g, 3.78 mmol) in THF:$H_2O$ (10:10 mL) was stirred at rt for 2 h, then THF was removed under reduced pressure. The residual aqueous was washed with $CH_2Cl_2$ (3×15 mL) and neutralized with aq. HCl (6 N, 30 mL) slowly at 0° C. to pH=7. The solvent was removed and then dried over high vacuum to afford (S)-2-(2,5-dichlorobenzamido)-3-(3-(methylamino)phenyl)propanoic acid as light yellow solid (1.413 g, 99%).

Hunig's base (647.80 mg, 3.62 mmol) was added to a stirred solution of (S)-2-(2,5-dichlorobenzamido)-3-(3-(methylamino)phenyl)propanoic acid (405.00 mg, 1.21 mmol), (R)-2-phenyl-1-((3aS,4S,6S,7aR)-3a,5,5-trimethylhexahydro-4,6-methanobenzo[d][1,3,2]dioxaborol-2-yl) ethan-1-amine (443.07 mg, 1.21 mmol) and HATU (596.38 mg, 1.57 mmol) in $CH_2Cl_2$ (40 mL) at 0° C. The mixture was stirred at rt for 12 h, then washed with brine (2×20 mL), dried over $Na_2SO_4$ and concentrated in vacuo. The crude residue was purified by flash column chromatography with MeOH:$CH_2Cl_2$ to afford 2,5-dichloro-N—((S)-3-(3-(methylamino)phenyl)-1-oxo-1-(((R)-2-phenyl-1-((3aS,4S,6S,7aR)-3a,5,5-trimethylhexahydro-4,6-methanobenzo[d][1,3,2]dioxaborol-2-yl)ethyl)amino)propan-2-yl)benzamide as a white solid (400.0 mg, 51.15%).

Acryloyl chloride (55.83 mg, 0.62 mmol) was added to a stirred solution of 2,5-dichloro-N—((S)-3-(3-(methylamino)phenyl)-1-oxo-1-(((R)-2-phenyl-1-((3aS,4S,6S,7aR)-3a,5,5-trimethylhexahydro-4,6-methanobenzo[d][1,3,2]dioxaborol-2-yl)ethyl)amino)propan-2-yl)benzamide (100.00 mg, 0.15 mmol) and Hunig's base (79.73 mg, 0.62 mmol) in $CH_2Cl_2$ (10 mL) at 0° C. The mixture was stirred at 0° C. for 1 h, then washed with brine (10 mL), dried over $Na_2SO_4$ and concentrated in vacuo. The crude residue was purified by flash column chromatography with MeOH:$CH_2Cl_2$ to afford 2,5-dichloro-N—((S)-3-(3-(N-methylacrylamido)phenyl)-1-oxo-1-(((R)-2-phenyl-1-((3aS,4S,6S,7aR)-3a,5,5-trimethylhexahydro-4,6-methanobenzo[d][1,3,2]dioxaborol-2-yl)ethyl)amino)propan-2-yl)benzamide as a white solid (50.0 mg, 46.3%).

To a solution of 2,5-dichloro-N—((S)-3-(3-(N-methylacrylamido)phenyl)-1-oxo-1-(((R)-2-phenyl-1-((3aS,4S,6S,7aR)-3a,5,5-trimethylhexahydro-4,6-methanobenzo[d][1,3,2]dioxaborol-2-yl)ethyl)amino)propan-2-yl)benzamide (50 mg, 0.07 mmol) in MeOH (5 mL) were added hexane (5 mL) and 1 mol/L HCl (3 mL), then isobutyl boronic acid (14.51 mg, 0.14 mol) was added. After stirring at rt for 12 h, the solvent was removed. The residue was purified by prep-HPLC to afford ((R)-1-((S)-2-(2,5-dichlorobenzamido)-3-(3-(N-methylacrylamido)phenyl)propanamido)-2-phenylethyl)boronic acid as a white solid (16.5 mg, 41.25%). LC-MS m/z: 550.2 [M-17]; 590.2 [M+23].

Example 16

((R)-1-((S)-2-(2,5-dichlorobenzamido)-3-(3-(N-methylvinylsulfonamido)phenyl)propanamido)-2-phenylethyl)boronic Acid

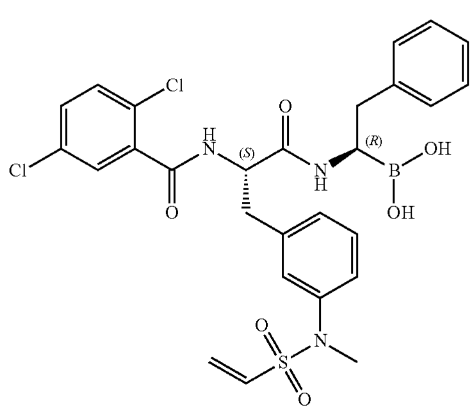

Using the procedure in Example 15, and using 2-chloroethanesulfonyl chloride in step 6, the title compound was obtained. LC-MS (ES, m/z): 626.0 [M+23]; 586.1 [M-17].

Example 17

((R)-1-((S)-6-(2-cyano-4-methylpent-2-enamido)-2-(4-methylnicotinamido)hexanamido)-2-phenylethyl)boronic Acid

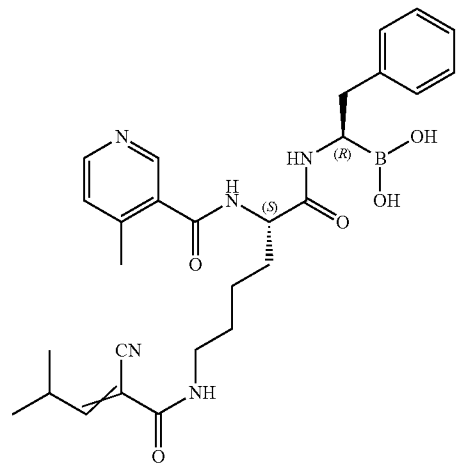

Using the procedure in Example 1, and starting with 4-methylnicotinic acid and (R)-2-phenyl-1-((3aS,4S,6S,7aR)-3a,5,5-trimethylhexahydro-4,6-methanobenzo[d][1,3,2]dioxaborol-2-yl)ethan-1-amine, the title compound was obtained. LC-MS (ES, m/z): 516.2 [M-17].

Example 18

((R)-1-((S)-2-(2,5-dichlorobenzamido)-3-(3-(N-methylbut-2-ynamido)phenyl)propanamido)-2-phenylethyl)boronic Acid

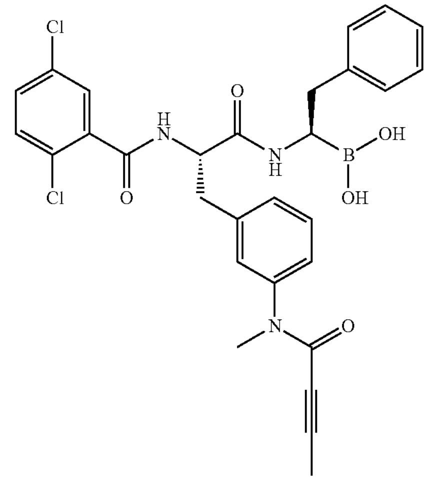 [SMILES: CC#CC(=O)N(C)c1cccc(C[C@H](NC(=O)c2cc(Cl)ccc2Cl)C(=O)N[C@@H](Cc2ccccc2)B(O)O)c1]

Using the procedure in Example 15, and using in situ prepared acid chloride of but-2-ynoic acid from treatment with phosgene in step 6, the title compound was obtained. LC-MS (ES, m/z): 602 [M+23]; 562 [M-17].

Example 19
8-((R)-1-((S)-3-(((R)-1-(2-cyano-4-methylpent-2-enoyl)pyrrolidin-2-yl)methoxy)-2-(2,5-dichlorobenzamido)propanamido)-2-phenylethyl)-4-methyl-2,6-dioxohexahydro-[1,3,2]oxazaborolo[2,3-b][1,3,2]oxazaborol-4-ium-8-uide
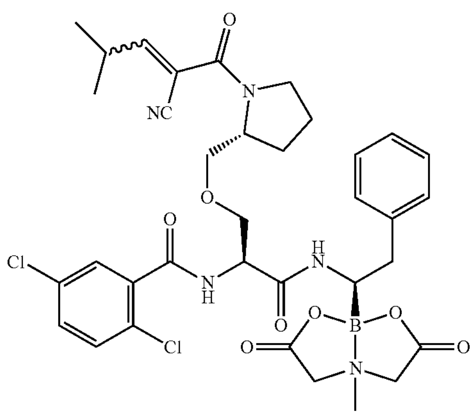
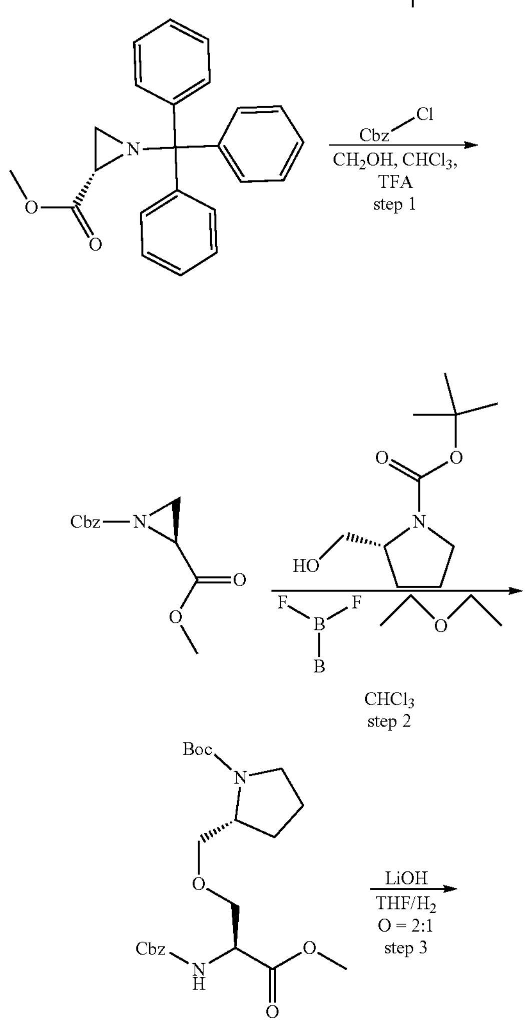
Int-6
-continued
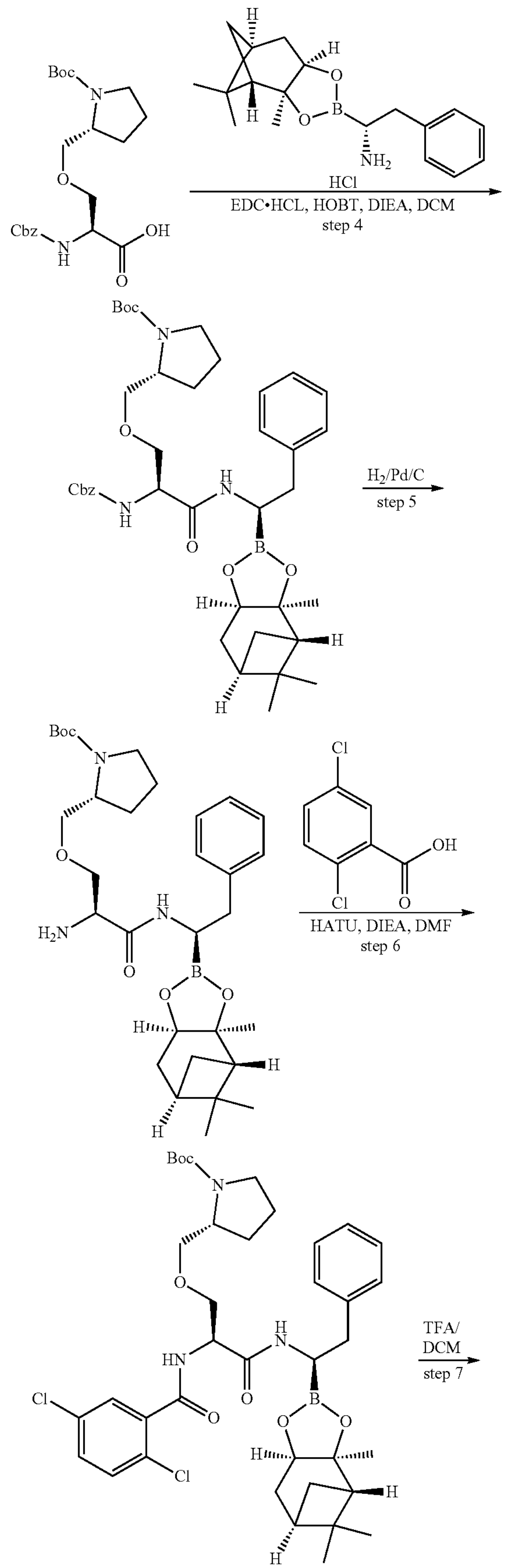

-continued

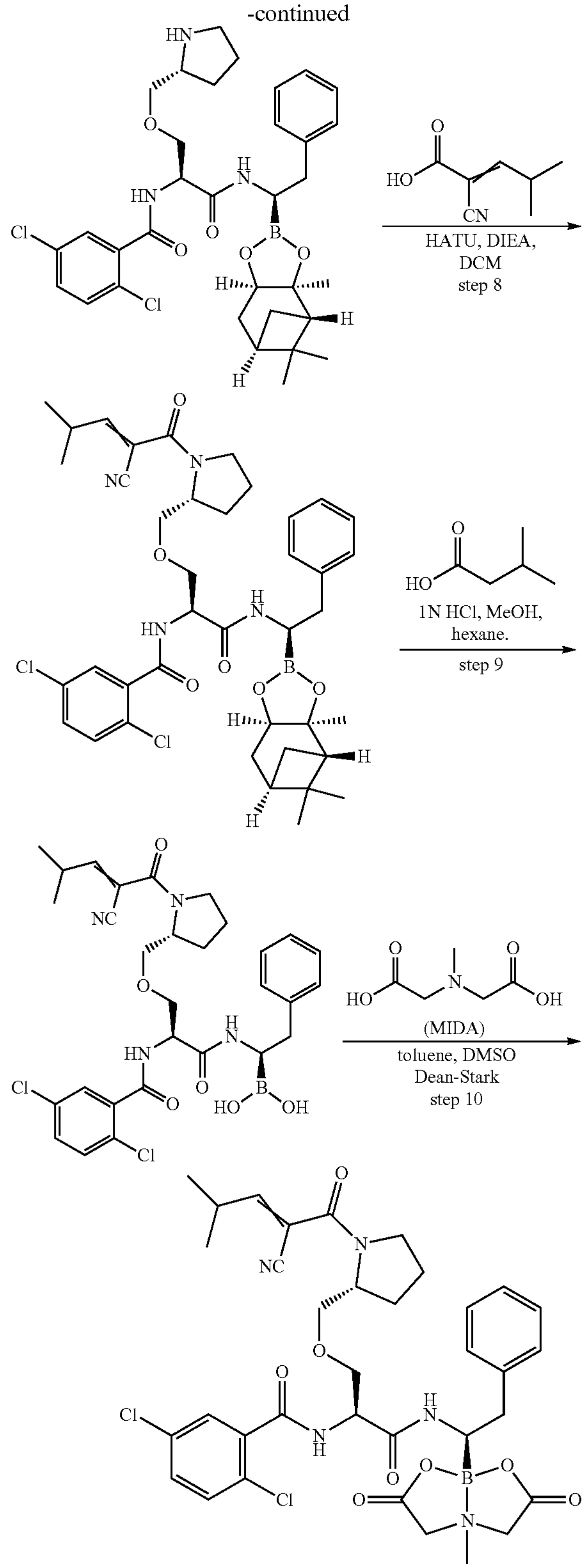

Into a 250-mL round-bottom flask, was placed methyl (2S)-1-(triphenylmethyl)aziridine-2-carboxylate (5 g, 14.56 mmol, 1.00 eq.), chloroform (18.4 mL), methanol (18.4 mL), dropped in trifluoroacetic acid (18.4 mL) under 0° C., and the resulting solution was stirred for 4 h at 0° C. The solvents were removed in vacuum at 0° C., The resulting solution was diluted with ether (23 mL), extracted with water (4×23 mL), and the aqueous layers combined. Took in $NaHCO_3$ (7.69 g), dropped in EA (100 mL), dropped in benzyl chloroformate (2.545 mL) under 0° C. The resulting solution was allowed to react, with stirring, for an additional overnight at rt. The resulting solution was extracted with ethyl acetate (2×100 mL), and the organic layers combined. The organic layer was washed with sodium chloride (2×200 mL). The mixture was dried over anhydrous sodium sulfate. Removal of the solvent in vacuo yielded 3 g (88%) of 1-benzyl 2-methyl (2S)-aziridine-1,2-dicarboxylate as colorless oil.

Into a 100-mL 3-necked round-bottom flask, was placed 1-benzyl 2-methyl (2S)-aziridine-1,2-dicarboxylate (3 g, 12.75 mmol, 1.00 eq.), chloroform (50 mL), tert-butyl (2R)-2-(hydroxymethyl)pyrrolidine-1-carboxylate (12.85 g, 63.85 mmol, 5.01 eq.), dropped in boron trifluoride etherate (906.58 mg, 6.39 mmol, 0.50 eq.) under 0° C. The resulting solution was stirred overnight at rt. The resulting solution was diluted with DCM (100 mL), washed with $H_2O$ (3×50 mL). The organic layer was dried over anhydrous sodium sulfate. The residue was applied onto a silica gel column with ethyl acetate:petroleum ether (1:1). This resulted in 5 g (90%) of tert-butyl (2R)-2-[[(2S)-2-[[(benzyloxy)carbonyl] amino]-3-methoxy-3-oxopropoxy]methyl]pyrrolidine-1-carboxylate as light yellow oil.

Into a 250-mL round-bottom flask, was placed tert-butyl (2R)-2-[[(2S)-2-[[(benzyloxy)carbonyl]amino]-3-methoxy-3-oxopropoxy]methyl]pyrrolidine-1-carboxylate (15 g, 34.36 mmol, 1.00 eq.), tetrahydrofuran (80 mL), water (40 mL), LiOH (4.328 g, 103.15 mmol, 3.00 eq.). The resulting solution was stirred for 1-2 h at rt and then concentrated under vacuum. The resulting solution was extracted with ethyl acetate and the aqueous phase combined. The pH value of the solution was adjusted to 5-6 with 3M HCl. The resulting solution was extracted with of dichloromethane and the organic layers combined and dried over anhydrous sodium sulfate and concentrated under vacuum. This resulted in 3 g (21%) of (2S)-2-[[(benzyloxy)carbonyl] amino]-3-[[(2R)-1-[(tert-butoxy)carbonyl]pyrrolidin-2-yl] methoxy]propanoic acid as colorless oil.

Into a 25-mL round-bottom flask, was placed (2S)-2-[[(benzyloxy)carbonyl]amino]-3-[[(2R)-1-[(tert-butoxy)carbonyl]pyrrolidin-2-yl]methoxy]propanoic acid (100 mg, 0.24 mmol, 1.00 eq.), dichloromethane (10 mL), HOBT (76.8 mg, 0.57 mmol, 2.40 eq.), cooled to −5° C., After 20 min, the temperature of the reaction system was cooled to −15° C., took in EDC.HCl (101 mg, 0.53 mmol, 2.23 eq.), and dropped in the precooled (0° C.) mixture of DIEA (36.7 mg, 0.28 mmol, 1.20 eq.), (1R)-2-phenyl-1-[(1S,2S,6R,8S)-2,9,9-trimethyl-3,5-dioxa-4-boratricyclo[6.1.1.0^2,6]decan-4-yl]ethan-1-amine hydrochloride (79 mg, 0.24 mmol, 0.99 eq.), DCM. The resulting solution was stirred for 1 h at -15° C. The resulting solution was allowed to react, with stirring, for an additional 2-4 h at rt. The reaction was then quenched by the addition of water. The resulting solution was extracted with dichloromethane and the organic layers combined, washed with sodium chloride (2×30 mL). The organic layer was dried over anhydrous sodium sulfate. The residue was purified by prep-TLC with ethyl acetate:petroleum ether (1:1). This resulted in 0.1 g (60%) of tert-butyl (2R)-2-[[(2S)-2-[[(benzyloxy)carbonyl]amino]-2-[[(1R)-2-phenyl-1-[(1S,2S,6R,8R)-2,9,9-trimethyl-3,5-dioxa-4-boratricyclo [6.1.1.0^[2,6]]decan-4-yl]ethyl]carbamoyl]ethoxy]methyl] pyrrolidine-1-carboxylate as colorless oil.

Into a 50-mL round-bottom flask, was placed tert-butyl (2R)-2-[[(2S)-2-[[(benzyloxy)carbonyl]amino]-2-[[(1R)-2- phenyl-1-[(1S,2S,6R,8R)-2,9,9-trimethyl-3,5-dioxa-4-boratricyclo[6.1.1.0^[2,6]]decan-4-yl]ethyl]carbamoyl]ethoxy]methyl]pyrrolidine-1-carboxylate (320 mg, 0.45 mmol, 1.00 eq.), methanol (30 mL), Palladium carbon (0.06 g). The resulting solution was stirred for 3-5 h at rt. The solids were filtered off. The resulting mixture was concentrated under vacuum. This resulted in 0.25 g (97%) of tert-butyl (2R)-2-[[(2S)-2-amino-2-[[(1R)-2-phenyl-1-[(1S,2S,6R,8R)-2,9,9-trimethyl-3,5-dioxa-4-boratricyclo[6.1.1.0^[2,6]]decan-4-yl]ethyl]carbamoyl]ethoxy]methyl]pyrrolidine-1-carboxylate as colorless oil.

Into a 25-mL round-bottom flask, was placed tert-butyl (2R)-2-[[(2S)-2-amino-2-[[(1R)-2-phenyl-1-[(1S,2S,6R,8R)-2,9,9-trimethyl-3,5-dioxa-4-boratricyclo[6.1.1.0^[2,6]]decan-4-yl]ethyl]carbamoyl]ethoxy]methyl]pyrrolidine-1-carboxylate (130 mg, 0.23 mmol, 1.00 eq.), N,N-dimethylformamide (10 mL), 2,5-dichlorobenzoic acid (47.97 mg, 0.25 mmol, 1.10 eq.), DIEA (73.6 mg, 0.57 mmol, 2.49 eq.), HATU (95.4 mg, 0.25 mmol, 1.10 eq.). The resulting solution was stirred for 2-3 h at rt. The reaction was then quenched by the addition of water. The resulting solution was extracted with of ethyl acetate and the organic layers combined. The resulting mixture was washed with sodium chloride (1×30 mL). The mixture was dried over anhydrous sodium sulfate and concentrated under vacuum. The residue was applied onto a silica gel column with ethyl acetate:petroleum ether (1:1). This resulted in 0.15 g (89%) of tert-butyl (2R)-2-[[(2S)-2-[(2,5-dichlorophenyl)formamido]-2-[[(1R)-2-phenyl-1-[(1S,2S,6R,8R)-2,9,9-trimethyl-3,5-dioxa-4-boratricyclo[6.1.1.0^[2,6]]decan-4-yl]ethyl]carbamoyl]ethoxy]methyl]pyrrolidine-1-carboxylate as colorless oil.

Into a 25-mL round-bottom flask, was placed tert-butyl (2R)-2-[[(2S)-2-[(2,5-dichlorophenyl)formamido]-2-[[(1R)-2-phenyl-1-[(1S,2S,6R,8R)-2,9,9-trimethyl-3,5-dioxa-4-boratricyclo[6.1.1.0^[2,6]]decan-4-yl]ethyl]carbamoyl]ethoxy]methyl]pyrrolidine-1-carboxylate (120 mg, 0.16 mmol, 1.00 eq.), dichloromethane (4 mL), trifluoroacetic acid (1 mL). The resulting solution was stirred for 1-2 h at rt. The resulting mixture was concentrated under vacuum. The pH value of the solution was adjusted to 11-12 with sodium bicarbonate(sat.). The resulting solution was extracted with of dichloromethane and the organic layers combined. The resulting mixture was washed with sodium bicarbonate (1×20 mL). The mixture was dried over anhydrous sodium sulfate and concentrated under vacuum. This resulted in 0.1 g (96%) of (2S)-2-[(2,5-dichlorophenyl)formamido]-N-[(1R)-2-phenyl-1-[(1S,2S,6R,8R)-2,9,9-trimethyl-3,5-dioxa-4-boratricyclo[6.1.1.0^[2,6]]decan-4-yl]ethyl]-3-[(2R)-pyrrolidin-2-ylmethoxy]propanamide as light yellow oil.

Into a 25-mL round-bottom flask, was placed (2S)-2-[(2,5-dichlorophenyl)formamido]-N-[(1R)-2-phenyl-1-[(1S,2S,6R,8R)-2,9,9-trimethyl-3,5-dioxa-4-boratricyclo[6.1.1.0^[2,6]]decan-4-yl]ethyl]-3-[(2R)-pyrrolidin-2-ylmethoxy]propanamide (110 mg, 0.17 mmol, 1.00 eq.), dichloromethane (10 mL), 2-cyano-4-methylpent-2-enoic acid (28.6 mg, 0.21 mmol, 1.20 eq.), DIEA (33.19 mg, 0.26 mmol, 1.50 eq.), HATU (78.22 mg, 0.21 mmol, 1.20 eq.). The resulting solution was stirred for 1-2 h at rt. The reaction was then quenched by the addition of water. The resulting solution was extracted with of dichloromethane, and the organic layers combined. The resulting mixture was washed with sodium chloride (1×20 mL). The mixture was dried over anhydrous sodium sulfate. The residue was applied onto a silica gel column with ethyl acetate:petroleum ether (1:1). This resulted in 0.06 g (46%) of (2S)-3-[[(2R)-1-[2-cyano-2-(2-methylpropylidene)acetyl]pyrrolidin-2-yl]methoxy]-2-[(2,5-dichlorophenyl)formamido]-N-[(1R)-2-phenyl-1-[(1S,2S,6R,8R)-2,9,9-trimethyl-3,5-dioxa-4-boratricyclo[6.1.1.0^[2,6]]decan-4-yl]ethyl]propanamide as colorless oil.

Into a 25-mL round-bottom flask, was placed (2S)-3-[[(2R)-1-[2-cyano-2-(2-methylpropylidene)acetyl]pyrrolidin-2-yl]methoxy]-2-[(2,5-dichlorophenyl)formamido]-N-[(1R)-2-phenyl-1-[(1S,2S,6R,8R)-2,9,9-trimethyl-3,5-dioxa-4-boratricyclo[6.1.1.0^[2,6]]decan-4-yl]ethyl]propanamide (30 mg, 0.04 mmol, 1.00 eq.), methanol (5 mL), hexane (5 mL), (2-methylpropyl)boronic acid (24 mg, 0.24 mmol, 5.99 eq.), 0.1N hydrogen chloride (0.2 mL). The resulting solution was stirred overnight at rt. The resulting mixture was concentrated under vacuum and dissolved in DCM. The resulting mixture was washed with 5% sodium bicarbonate (1×10 mL). The mixture was dried over anhydrous sodium sulfate and concentrated under vacuum. This resulted in 0.02 g (81%) of [(1R)-1-[(2S)-3-[[(2R)-1-[2-cyano-2-(2-methylpropylidene)acetyl]pyrrolidin-2-yl]methoxy]-2-[(2,5-dichlorophenyl)formamido]propanamido]-2-phenylethyl]boronic acid as a light yellow solid.

Into a 100-mL round-bottom flask, was placed [(1R)-1-[(2S)-3-[[(2R)-1-[2-cyano-2-(2-methylpropylidene)acetyl]pyrrolidin-2-yl]methoxy]-2-[(2,5-dichlorophenyl)formamido]propanamido]-2-phenylethyl]boronic acid (70 mg, 0.11 mmol, 1.00 eq.), toluene (35 mL), 2-[(carboxymethyl)(methyl)amino]acetic acid (49 mg, 0.33 mmol, 2.99 eq.), DMSO (7 mL). The reaction is heated to reflux and agitated for overnight while removing water via the Dean-Stark trap. The resulting mixture was concentrated under vacuum. The crude product (4 mL) was purified by prep-HPLC with the following conditions (2 #-AnalyseHPLC-SHIMADZU (HPLC-10)): Column, XBridge Prep C18 OBD Column; mobile phase, Waters(0.05% TFA) and ACN (45.0% ACN up to 60.0% in 8 min); Detector, UV 254 nm. This resulted in 0.015 g (18%) of 8-((R)-1-((S)-3-(((R)-1-(2-cyano-4-methylpent-2-enoyl)pyrrolidin-2-yl)methoxy)-2-(2,5-dichlorobenzamido)propanamido)-2-phenylethyl)-4-methyl-2,6-dioxohexahydro-[1,3,2]oxazaborolo[2,3-b][1,3,2]oxazaborol-4-ium-8-uide as a white solid. LC-MS m/z: 740.1 [M+1]; 762.2 [M+23].

Example 20

((R)-1-((S)-3-(3-(2-cyano-N,4-dimethylpent-2-enamido)phenyl)-2-(2,5-dichlorobenzamido)propanamido)-2-phenylethyl)boronic Acid

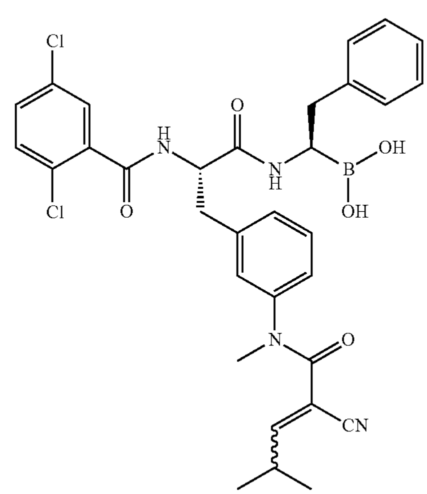 [SMILES: CC(C)C=C(C#N)C(=O)N(C)c1cccc(C[C@H](NC(=O)c2cc(Cl)ccc2Cl)C(=O)N[C@@H](Cc2ccccc2)B(O)O)c1]

Using the procedure in Example 15, and using in situ prepared acid chloride of 2-cyano-4-methylpent-2-enoic acid from treatment with phosgene in step 6, the title compound was obtained. LC-MS (ES, m/z): 616.9 [M-17].

Example 21

((R)-1-((S)-3-(3-(2-cyano-N,4-dimethylpent-2-enamido)phenyl)-2-(pyrazine-2-carboxamido)propanamido)-2-phenylethyl)boronic Acid

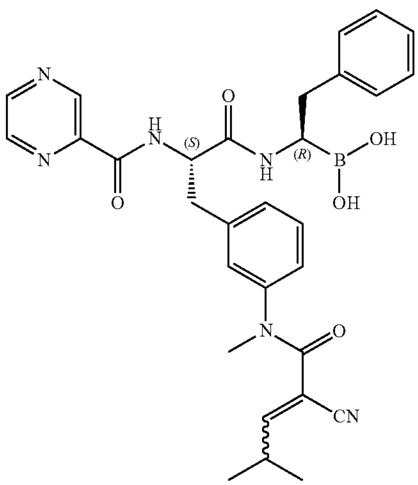

Using the procedure in Example 15, and starting with pyrazine-2-carboxylic acid and using in situ prepared acid chloride of 2-cyano-4-methylpent-2-enoic acid from treatment with phosgene in step 6, the title compound was obtained. LC-MS (ES, m/z): 550.8 [M-17]; 590.8 [M+23].

Example 22

(R)-1-((S)-3-(((R)-1-(2-cyano-3-cyclopropylacryloyl)pyrrolidin-2-yl)methoxy)-2-(2,2,2-trifluoroethylamino)propanamido)-2-phenylethylboronic Acid

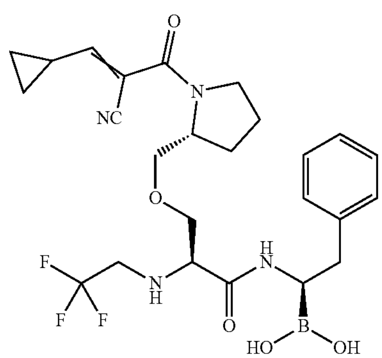

-continued

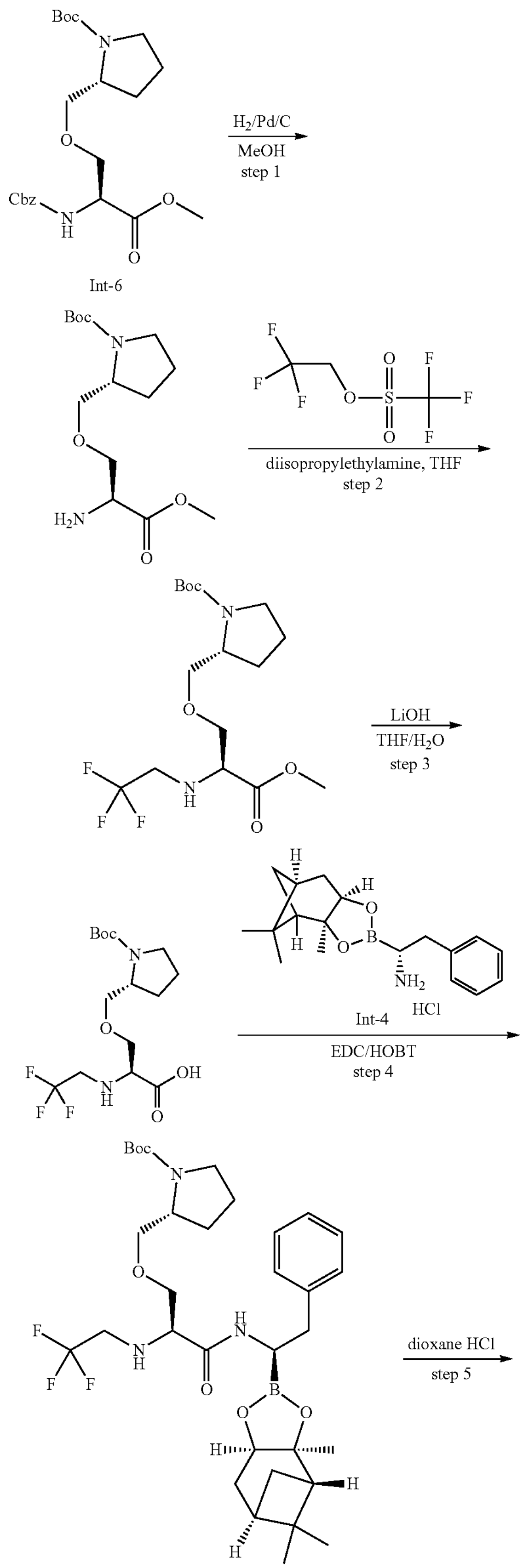

-continued

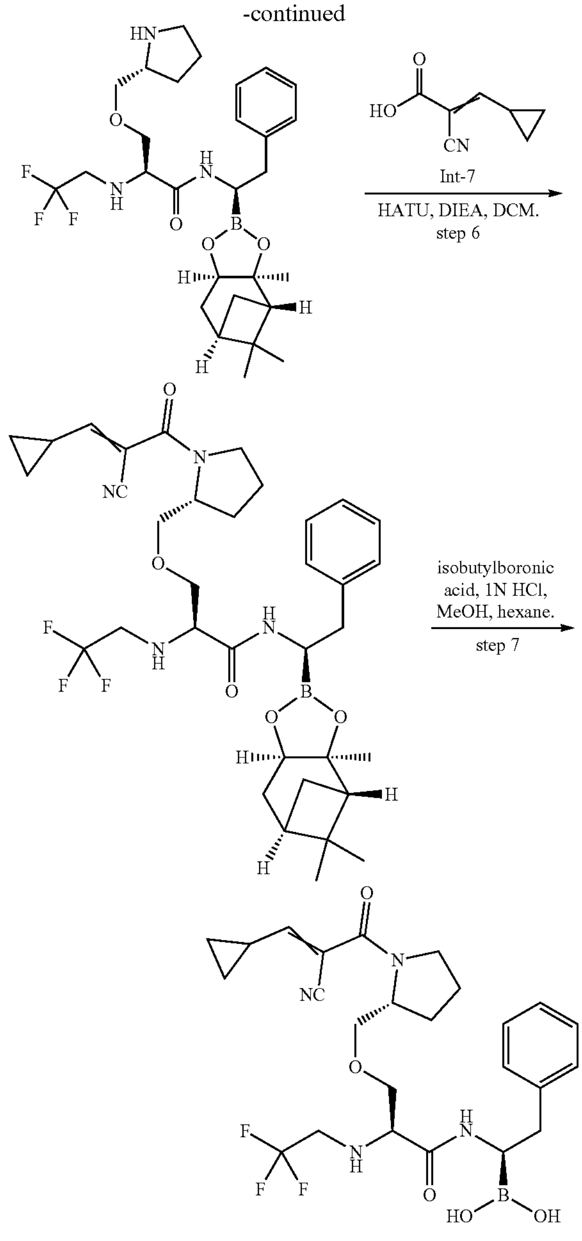

Into a 100-mL round-bottom flask, was placed tert-butyl (2R)-2-[[(2S)-2-[[(benzyloxy)carbonyl]amino]-3-methoxy-3-oxopropoxy]methyl]pyrrolidine-1-carboxylate (5.7 g, 13.06 mmol, 1.00 eq.), methanol (50 mL), palladium carbon (0.57 g). The resulting solution was stirred for 3-4 h at rt. The solids were filtered off. The resulting mixture was concentrated under vacuum. This resulted in 3 g (76%) of tert-butyl (2R)-2-[[(2S)-2-amino-3-methoxy-3-oxopropoxy]methyl]pyrrolidine-1-carboxylate as yellow oil.

Into a 100-mL round-bottom flask, was placed tert-butyl (2R)-2-[[(2S)-2-amino-3-methoxy-3-oxopropoxy]methyl]pyrrolidine-1-carboxylate (1.5 g, 4.96 mmol, 1.00 eq.), tetrahydrofuran (50 mL), DIEA (1.28 g, 9.90 mmol, 2.00 eq.), 2,2,2-trifluoroethyl trifluoromethanesulfonate (2.3 g, 9.91 mmol, 2.00 eq.). The resulting solution was stirred overnight at 60° C. The resulting mixture was concentrated under vacuum, diluted with ethyl acetate, then washed with sodium bicarbonate (2×50 mL). The organic layer was dried over anhydrous sodium sulfate and concentrated under vacuum. This resulted in 1.8 g (94%) of tert-butyl (2R)-2-[[(2S)-3-methoxy-3-oxo-2-[(2,2,2-trifluoroethyl)amino]propoxy]methyl]pyrrolidine-1-carboxylate as yellow oil.

Into a 100-mL round-bottom flask, was placed tert-butyl (2R)-2-[[(2S)-3-methoxy-3-oxo-2-[(2,2,2-trifluoroethyl)amino]propoxy]methyl]pyrrolidine-1-carboxylate (1.8 g, 4.68 mmol, 1.00 eq.), tetrahydrofuran (30 mL), water (15 mL), $LiOH.H_2O$ (590 mg, 14.06 mmol, 3.00 eq.). The resulting solution was stirred for 2-3 h at rt. The pH value of the solution was adjusted to 6 with 3M hydrogen chloride. The resulting solution was extracted with ethyl acetate and the organic layers combined. The resulting mixture was washed with sodium chloride (2×40 mL). The organic layer was dried over anhydrous sodium sulfate and concentrated under vacuum. This resulted in 1.5 g (86%) of (2S)-3-[[(2R)-1-[(tert-butoxy)carbonyl]pyrrolidin-2-yl]methoxy]-2-[(2,2,2-trifluoroethyl)amino]propanoic acid as yellow oil.

Into a 50-mL 3-necked round-bottom flask, was placed (2S)-3-[[(2R)-1-[(tert-butoxy)carbonyl]pyrrolidin-2-yl]methoxy]-2-[(2,2,2-trifluoroethyl)amino]propanoic acid (450 mg, 1.22 mmol, 1.00 eq.), dichloromethane (15 mL), HOBT (393.8 mg, 2.91 mmol, 2.40 eq.), cooled to −5° C., After 20 min, the temperature of the reaction system was cooled to −15° C. and took in EDC.HCl (559.2 mg, 2.92 mmol, 2.40 eq.), dropped in the precooled(0° C.) mixture of the (1R)-2-phenyl-1-[(1S,2S,6R,8S)-2,9,9-trimethyl-3,5-dioxa-4-boratricyclo[6.1.1.0^[2,6]]decan-4-yl]ethan-1-amine hydrochloride (407 mg, 1.21 mmol, 0.99 eq.), DIEA (188.2 mg, 1.46 mmol, 1.20 eq.), DCM (5 mL). The resulting solution was stirred for 20 min at -5° C. The resulting solution was allowed to react, with stirring, for an additional 1 h at −15° C. The resulting solution was allowed to react, with stirring, for an additional 1 overnight at rt. The resulting mixture was washed with sodium chloride (2×20 mL) The residue was applied onto a silica gel column with EA:PE (1:1). This resulted in 0.2 g (25%) of tert-butyl (2R)-2-[[(2S)-2-[[(1R)-2-phenyl-1-[(1S,2S,6R,8R)-2,9,9-trimethyl-3,5-dioxa-4-boratricyclo[6.1.1.0^[2,6]]decan-4-yl]ethyl]carbamoyl]-2-[(2,2,2-trifluoroethyl)amino]ethoxy]methyl]pyrrolidine-1-carboxylate as light yellow oil.

Into a 50-mL round-bottom flask, was placed tert-butyl (2R)-2-[[(2S)-2-[[(1R)-2-phenyl-1-[(1S,2S,6R,8R)-2,9,9-trimethyl-3,5-dioxa-4-boratricyclo[6.1.1.0^[2,6]]decan-4-yl]ethyl]carbamoyl]-2-[(2,2,2-trifluoroethyl)amino]ethoxy]methyl]pyrrolidine-1-carboxylate (1.2 g, 1.84 mmol, 1.00 eq.), dioxane (10 mL), hydrogen chloride (5 mL). The resulting solution was stirred for 1-2 h at rt. The pH value of the solution was adjusted to 11-12 with sodium bicarbonate. The resulting solution was extracted with dichloromethane, and the organic layers combined and dried over anhydrous sodium sulfate and concentrated under vacuum. This resulted in 0.7 g (69%) of (2S)—N-[(1R)-2-phenyl-1-[(1S,2S,6R,8R)-2,9,9-trimethyl-3,5-dioxa-4-boratricyclo[6.1.1.0^[2,6]]decan-4-yl]ethyl]-3-[(2R)-pyrrolidin-2-ylmethoxy]-2-[(2,2,2-trifluoroethyl)amino]propanamide as yellow oil.

Into a 25-mL round-bottom flask, was placed (2S)—N-[(1R)-2-phenyl-1-[(1S,2S,6R,8R)-2,9,9-trimethyl-3,5-dioxa-4-boratricyclo[6.1.1.0^[2,6]]decan-4-yl]ethyl]-3-[(2R)-pyrrolidin-2-ylmethoxy]-2-[(2,2,2-trifluoroethyl)amino]propanamide (80 mg, 0.15 mmol, 1.00 eq.), dichloromethane (5 mL), 3-cyclopropyl-2-isocyanoprop-2-enoic acid (23.86 mg, 0.17 mmol, 1.20 eq.), DIEA (46.8 mg, 0.36 mmol, 2.50 eq.), HATU (66.17 mg, 0.17 mmol, 1.20 eq.). The resulting solution was stirred for 1-2 h at rt. The resulting mixture was washed with sodium chloride (1×15 mL). The mixture was dried over anhydrous sodium sulfate.

The residue was purified by prep-TLC with ethyl acetate: petroleum ether (1:1). This resulted in 10 mg (10%) of (2S)-3-[[(2R)-1-[2-cyano-2-(cyclopropylmethylidene) acetyl]pyrrolidin-2-yl]methoxy]-N-[(1R)-2-phenyl-1-[(1S, 2S,6R,8R)-2,9,9-trimethyl-3,5-dioxa-4-boratricyclo [6.1.1.0^[2,6]]decan-4-yl]ethyl]-2-[(2,2,2-trifluoroethyl) amino]propanamide as yellow oil.

Into a 25-mL round-bottom flask, was placed (2S)-3-[[(2R)-1-[2-cyano-2-(cyclopropylmethylidene)acetyl]pyrrolidin-2-yl]methoxy]-N-[(1R)-2-phenyl-1-[(1S,2S,6R,8R)-2,9,9-trimethyl-3,5-dioxa-4-boratricyclo[6.1.1.0^[2,6]]decan-4-yl]ethyl]-2-[(2,2,2-trifluoroethyl)amino]propanamide (60 mg, 0.09 mmol, 1.00 eq.), methanol (1 mL), (2-methylpropyl)boronic acid (54.8 mg, 0.54 mmol, 6.01 eq.), 1M hydrogen chloride (0.4475 mL), hexane (1 mL). The resulting solution was stirred overnight at rt. The resulting mixture was concentrated under vacuum. The resulting solution was diluted with DCM (20 mL), washed with 5% sodium bicarbonate (1×15 mL). The mixture was dried over anhydrous sodium sulfate and concentrated under vacuum. The crude product was purified by prep-HPLC to give 18.6 mg (39%) of (R)-1-((S)-3-(((R)-1-(2-cyano-3-cyclopropylacryloyl) pyrrolidin-2-yl)methoxy)-2-(2,2,2-trifluoroethylamino)propanamido)-2-phenylethylboronic acid as a white solid. LC-MS (ES, m/z): 519.2 [M-17]; 559.2 [M+23].

Example 23

(R)-1-((S)-3-(((R)-1-(2-cyano-4-methylpent-2-enoyl) pyrrolidin-2-yl)methoxy)-2-(2,2,2-trifluoroethylamino)propanamido)-2-phenylethylboronic Acid

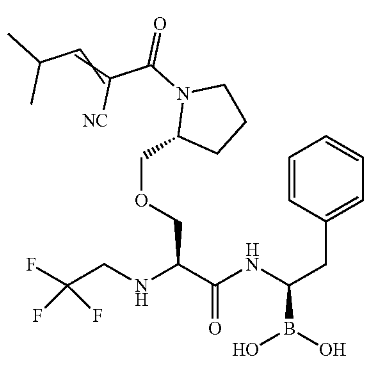

Using the procedure in Example 21, and 2-cyano-4-methylpent-2-enoic acid in step 6, the title compound was obtained. LC-MS (ES, m/z): 521.3 [M-17]; 561.3 [M+23].

Example 24

(R)-1-((S)-3-(((R)-1-(2-cyano-4,4-dimethylpent-2-enoyl)pyrrolidin-2-yl)methoxy)-2-(2,2,2-trifluoroethylamino)propanamido)-2-phenylethylboronic Acid

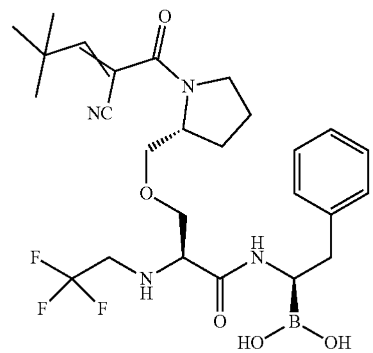

Using the procedure in Example 21, and 2-cyano-4,4-dimethylpent-2-enoic acid in step 6, the title compound was obtained. LC-MS (ES, m/z): 535.2 [M-17].

Example 25

((R)-1-((S)-3-(((R)-1-(2-cyano-4-methylpent-2-enoyl)piperidin-2-yl)methoxy)-2-((2,2,2-trifluoroethyl)amino)propanamido)-2-phenylethyl)boronic Acid

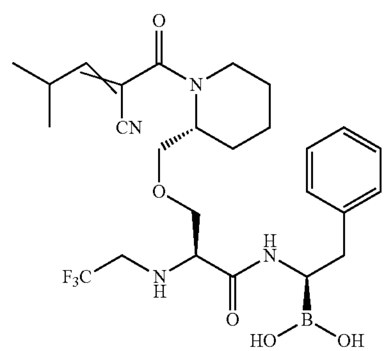

Using the procedure in Example 21, and using tert-butyl (R)-2-(((S)-2-(((benzyloxy)carbonyl)amino)-3-methoxy-3-oxopropoxy)methyl)piperidine-1-carboxylate (synthesis described below) in step 1, the title compound was obtained. LC-MS (ES, m/z): 534.9 [M-17].

Synthesis of tert-butyl (R)-2-(((S)-2-(((benzyloxy)carbonyl)amino)-3-methoxy-3-oxopropoxy)methyl)piperidine-1-carboxylate: to a stirred solution of 1-benzyl 2-methyl (S)-aziridine-1,2-dicarboxylate (2.0 g, 8.50 mmol) and tert-butyl (R)-2-(hydroxymethyl)piperidine-1-carboxylate (7.32 g, 34.01 mmol) in chloroform (50 mL) at 0° C. was added boron trifluoride etherate (603.34 mg, 4.25 mmol). The resulting solution was stirred overnight at rt. The resulting solution was diluted with DCM (100 mL), washed with $H_2O$ (3×50 mL). The organic layer was dried over $Na_2SO_4$ and concentrated in vacuo to afford crude tert-butyl (R)-2-(((S)-

2-(((benzyloxy)carbonyl)amino)-3-methoxy-3-oxopropoxy)methyl)piperidine-1-carboxylate as an oil (8 g), which was used for next step reaction without further purification.

Example 26

((R)-1-((S)-3-(3-(2-cyano-N,4-dimethylpent-2-enamido)phenyl)-2-((2,2,2-trifluoroethyl)amino)propanamido)-2-phenylethyl)boronic Acid

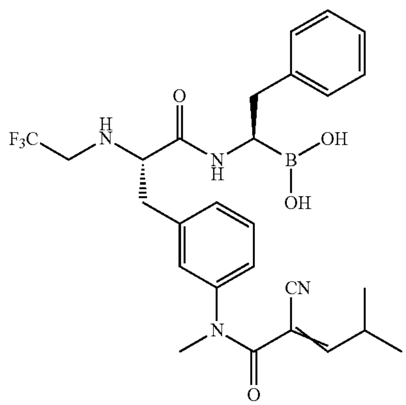

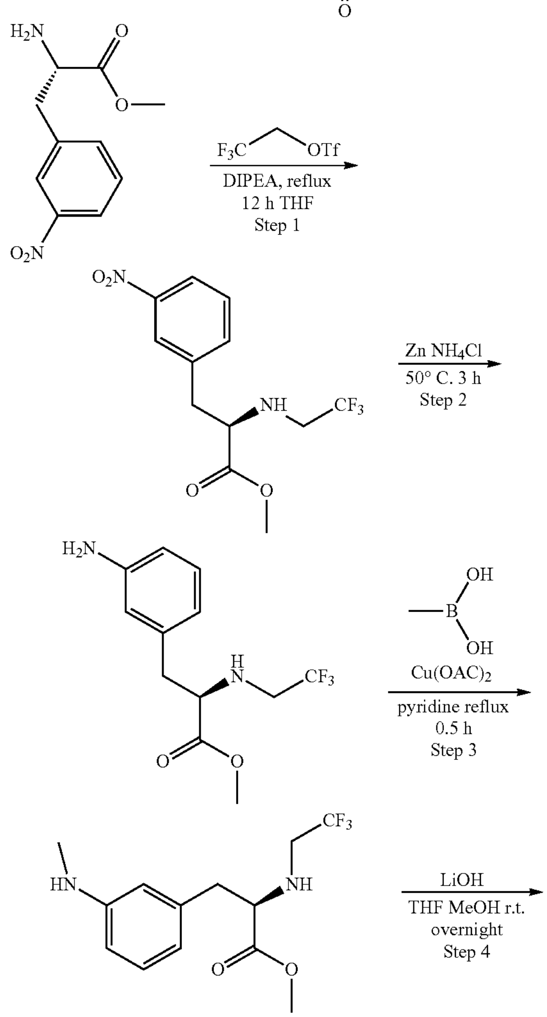

-continued

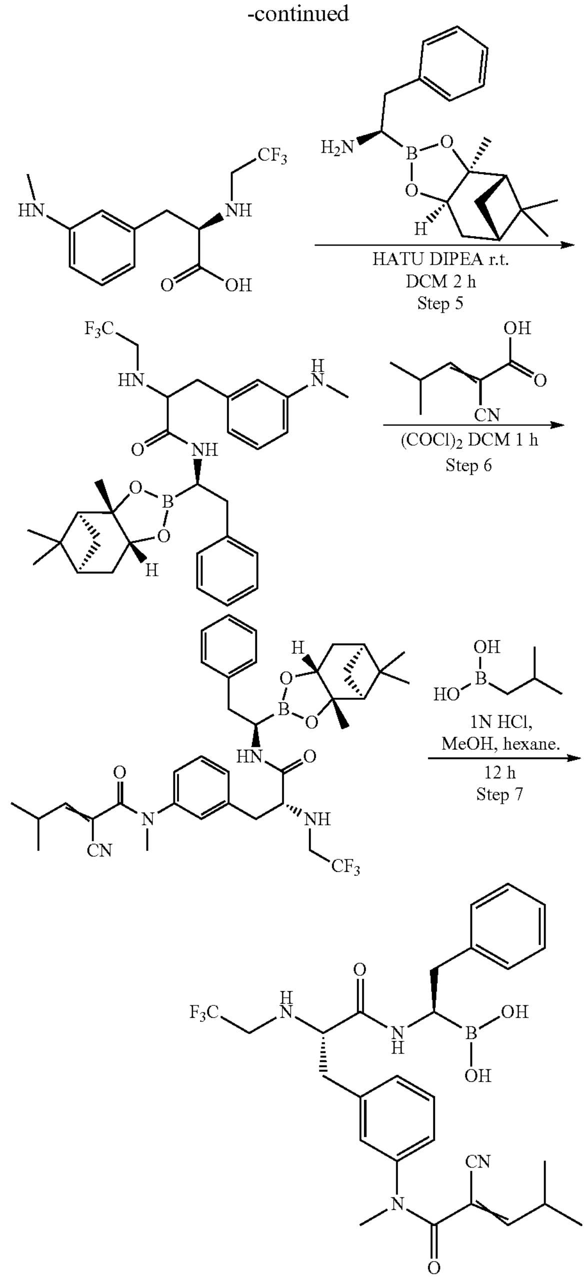

2, 2, 2-trifluoroethyl trifluoromethanesulfonate (12.42 g, 53.52 mmol) was added to a stirred solution of methyl (S)-2-amino-3-(3-nitrophenyl)propanoate (6.0 g, 26.76 mmol) and DIPEA (10.38 g, 80.28 mmol) in THF (60 mL) at rt. The mixture was stirred at 100° C. in a sealed tube overnight, then the solvent was removed under reduced pressure to give a residue. The residue was dissolved in DCM (100 mL). then washed with water (30 mL), brine (30 mL), dried over $Na_2SO_4$ and concentrated in vacuo to afford (R)-methyl3-(3-nitrophenyl)-2-((2,2,2-trifluoroethyl)amino)propanoate as a brown solid (15 g, crude).

A mixture of (R)-methyl3-(3-nitrophenyl)-2-((2,2,2-trifluoroethyl)amino)propanoate (8.0 g, 26.12 mmol), zinc powder (8.54 g, 130.62 mmol), $NH_4Cl$ (12.08 g, 130.62 mmol) and methanol (100 mL) was stirred at 50° C. under nitrogen for 3 hours. The solvent was removed under reduced pressure, and diluted by EtOAc. The resulting mixture was filtered through a celite pad, and the filtrate was concentrated in vacuo to give the crude (R)-methyl3-(3-aminophenyl)-2-((2,2,2-trifluoroethyl)amino)propanoate as an oil (8 g, crude).

Copper acetate (8.71 g, 47.96 mmol) was added to a solution of (R)-methyl3-(3-aminophenyl)-2-((2,2,2-trifluoroethyl)amino)propanoate (5.30 g, 19.19 mmol) and pyridine (5.31 g, 67.15 mmol) in dioxane (60 mL). The mixture was stirred for 15 minutes, then methyl boronic acid (5.87 g, 47.96 mmol) was added in. The reaction was refluxed for 0.5 h before allowing to reach rt, filtered through Celite and solvent was concentrated off. The residue was purified by flash chromatography with DCM:MeOH to give (R)-methyl 3-(3-(methylamino)phenyl)-2-((2,2,2-trifluoroethyl)amino) propanoate as an oil (1.6 g, 28.73%)

To a solution of (R)-methyl 3-(3-(methylamino)phenyl)-2-((2,2,2-trifluoroethyl)amino)propanoate (1.6 g, 5.51 mmol), MeOH (5 mL) in THF:$H_2O$ (20 mL, 1:1) was added LiOH $H_2O$ (346.95 mg, 8.21 mmol). The reaction was stirred at rt for 12 h. The pH of the mixture was adjusted to 5-6 with HCl (1N) before extraction with DCM (3×50 mL). The organic layers were combined then washed with brine (50 mL), dried over $Na_2SO_4$ and concentrated in vacuo to afford (R)-3-(3-(methylamino)phenyl)-2-((2,2,2-trifluoroethyl)amino)propanoic acid as a yellow solid (1.0 g, 65.78%).

To a stirred solution of (R)-3-(3-(methylamino)phenyl)-2-((2,2,2-trifluoroethyl)amino)propanoic acid (386 mg, 1.40 mmol) and HATU (1.06 g, 2.79 mmol) in DCM (150 mL) at 0° C. was added DIPEA (541.76 mg, 4.19 mmol) The mixture was stirred at 0° C. for 30 min, then (R)-2-phenyl-1-((3aS,4S,6S,7aR)-3a,5,5-trimethylhexahydro-4,6-methanobenzo[d][1,3,2]dioxaborol-2-yl)ethan-1-amine (469.03 mg, 1.40 mmol) was added at rt. After stirring for additional 2 hrs at rt, the mixture washed with brine (2×50 mL), dried ($Na_2SO_4$) and concentrated in vacuo to give (R)-3-(3-(methylamino)phenyl)-N—((R)-2-phenyl-1-((3aS,4S,6S,7aR)-3a,5,5-trimethylhexahydro-4,6-methanobenzo[d][1,3,2]dioxaborol-2-yl)ethyl)-2-((2,2,2-trifluoroethyl)amino) propanamide as an oil (800 mg, crude), which was used with further purification.

To a solution of 2-cyano-4-methylpent-2-enoic acid (300 mg, 2.15 mmol) in DCM (5 mL) were added $(COCl)_2$ (273.64 mg, 2.16 mmol) and one drop of DMF. After stirring at rt for 1 h, the reaction solution was concentrated under reduced pressure to give a residue. The residue was dissolved in DCM (3 mL) and added dropwise into a well-stirred solution of (R)-3-(3-(methylamino)phenyl)-N—((R)-2-phenyl-1-((3aS,4S,6S,7aR)-3a,5,5-trimethylhexahydro-4,6-methanobenzo[d][1,3,2]dioxaborol-2-yl)ethyl)-2-((2,2,2-trifluoroethyl)amino)propanamide (800 mg, 1.44 mmol) and DIPEA (556.43 mg, 4.31 mmol) in DCM (20 mL) at 0° C. The reaction was stirred at rt for 1 h, then washed with water (10 mL) and aq. $NaHCO_3$ (10 mL, 5%), the organic extracts was dried over $Na_2SO_4$ and concentrated in vacuo. The crude material was purified by prep-HPLC to afford 2-cyano-N,4-dimethyl-N-(3-((R)-3-oxo-3-(((R)-2-phenyl-1-((3aS,4S,6S,7aR)-3a,5,5-trimethylhexahydro-4,6-methanobenzo[d][1,3,2]dioxaborol-2-yl)ethyl)amino)-2-((2,2,2-trifluoroethyl)amino)propyl)phenyl)pent-2-enamide as white solid (250 mg, 25.67%).

To a solution of 2-cyano-N,4-dimethyl-N-(3-((R)-3-oxo-3-(((R)-2-phenyl-1-((3aS,4S,6S,7aR)-3a,5,5-trimethylhexahydro-4,6-methanobenzo[d][1,3,2]dioxaborol-2-yl)ethyl) amino)-2-((2,2,2-trifluoroethyl)amino)propyl)phenyl)pent-2-enamide (250 mg, 0.37 mmol) in MeOH (5 mL) were added hexane (5 mL) and 1 mol/L HCl (3 mL), followed by isobutyl boronic acid (150.22 mg, 1.47 mol).

After stirring at rt for 12 h, the solvent was removed. The residue was purified by flash chromatography ($Al_2CO_3$) with DCM:MeOH to give ((R)-1-((S)-3-(3-(2-cyano-N,4-dimethylpent-2-enamido)phenyl)-2-((2,2,2-trifluoroethyl)amino) propanamido)-2-phenylethyl)boronic acid as white solid (85 mg, 44%). LC-MS (ES, m/z): 527.2 [M-17].

Example 27

((R)-1-((S)-3-(3-(2-cyano-N,4-dimethylpent-2-enamido)phenyl)-2-((2,2,2-trifluoroethyl)amino)propanamido)-3-methylbutyl)boronic Acid

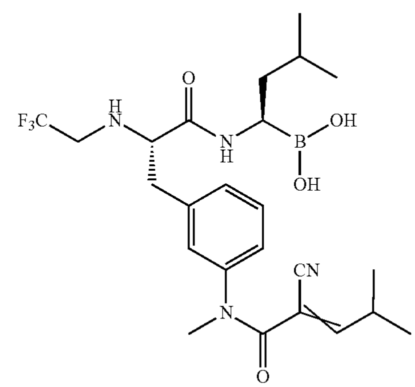

Using the procedure in Example 25, and using (R)-3-methyl-1-((3aS,4S,6S,7aR)-3a,5,5-trimethylhexahydro-4,6-methanobenzo[d][1,3,2]dioxaborol-2-yl)butan-1-amine in step 5, the title compound was obtained. LC-MS (ES, m/z): 493.2 [M-17].

Example 28

((R)-1-((S)-3-(((R)-1-(2-Cyano-4-methylpent-2-enoyl)pyrrolidin-2-yl)methoxy)-2-((2,2,2-trifluoroethyl)amino)propanamido)-3-methylbutyl)boronic Acid

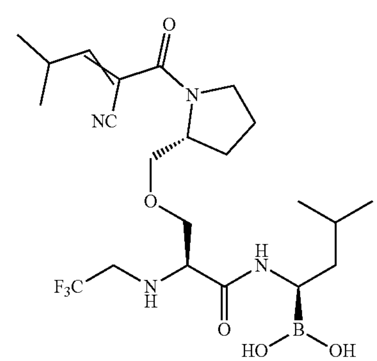

Using the procedure in Example 21, (R)-3-methyl-1-((3aS,4S,6S,7aR)-3a,5,5-trimethylhexahydro-4,6-methanobenzo[d][1,3,2]dioxaborol-2-yl)butan-1-amine in step 4, and 2-cyano-4-methylpent-2-enoic acid in step 6, the title compound was obtained. LC-MS (ES, m/z): 487.2 [M-17].

Example 29
(R)-(1-(4-(1-(2-cyano-4-methylpent-2-enoyl)piperidin-4-yl)butanamido)-2-phenylethyl)boronic Acid
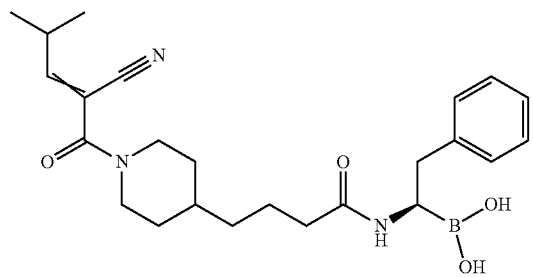
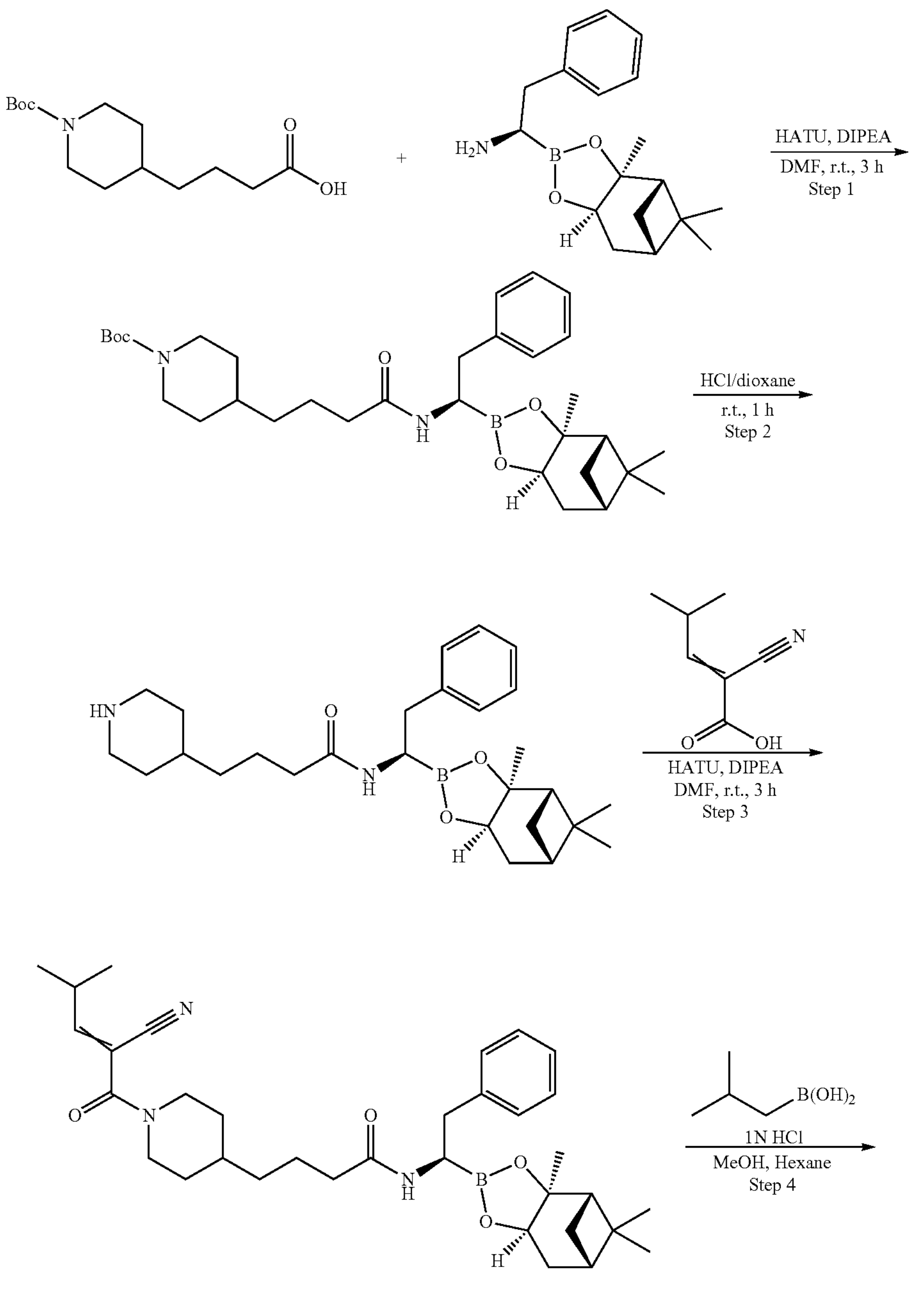

-continued

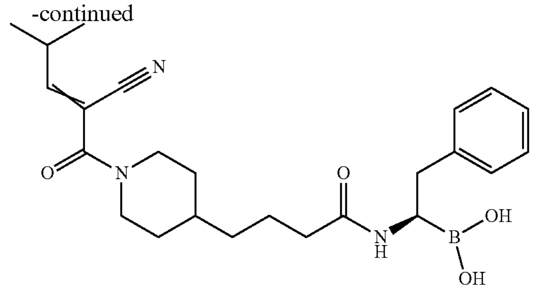

To a solution of 4-(1-(tert-butoxycarbonyl)piperidin-4-yl) butanoic acid (542 mg, 2 mmol) and DIPEA (774 mg, 6 mmol) in DMF (8 mL) at 0° C. was added HATU (800 mg, 2.1 mmol). After stirring at 0° C. for 1 h, (R)-2-phenyl-1-((3aS,4S,6S,7aR)-3a,5,5-trimethylhexahydro-4,6-methanobenzo[d][1,3,2]dioxaborol-2-yl)ethan-1-amine (600 mg, 2 mmol) was added. The resulting mixture was stirred at rt for 4 h, before partitioned between HCl (1 M) and EtOAc. The organic layer was washed with aq. $NaHCO_3$, water and brine, dried over $Na_2SO_4$ and filtrated. The filtration was concentrated to dryness to afford tert-butyl 4-(4-oxo-4-(((R)-2-phenyl-1-((3aS,4S,6S,7aR)-3a,5,5-trimethylhexahydro-4,6-methanobenzo[d][1,3,2]dioxaborol-2-yl)ethyl)amino)butyl) piperidine-1-carboxylate (700 mg, 66%) as an off-white solid.

A solution of tert-butyl 4-(4-oxo-4-(((R)-2-phenyl-1-((3aS,4S,6S,7aR)-3a,5,5-trimethylhexahydro-4,6-methanobenzo[d][1,3,2]dioxaborol-2-yl)ethyl)amino)butyl) piperidine-1-carboxylate (700 mg, 1.5 mmol) and HCl (8 mL, 4 N in dioxane) in dioxane was stirred at rt for 0.5 h. The mixture was concentrated in vacuo to give N—((R)-2-phenyl-1-((3aS,4S,6S,7aR)-3a,5,5-trimethylhexahydro-4,6-methanobenzo[d][1,3,2]dioxaborol-2-yl)ethyl)-4-(piperidin-4-yl)butanamide as an off-white solid (570 mg, crude), which was used in next step reaction without further purification.

To a solution of 2-cyano-4-methylpent-2-enoic acid (177 mg, 1.27 mmol) and DIPEA (410 mg, 3.18 mmol) in DMF (8 mL) at 0° C. was added HATU (483 mg, 1.27 mmol). After stirring at 0° C. for 1 h, N—((R)-2-phenyl-1-((3aS,4S,6S,7aR)-3a,5,5-trimethylhexahydro-4,6-methanobenzo[d][1,3,2]dioxaborol-2-yl)ethyl)-4-(piperidin-4-yl)butanamide (480 mg, 1.06 mmol) was added. The resulting mixture was stirred at rt for 4 h before partitioned between HCl (1 N) and EtOAc. The organic layer was washed with aq. $NaHCO_3$, water and brine, dried over $Na_2SO_4$ and filtrated. The filtration was concentrated to dryness to afford 4-(1-(2-cyano-4-methylpent-2-enoyl)piperidin-4-yl)-N—((R)-2-phenyl-1-((3aS,4S,6S,7aR)-3a,5,5-trimethylhexahydro-4,6-methanobenzo[d][1,3,2]dioxaborol-2-yl)ethyl)butanamide (500 mg, 82%) as an off-white solid.

To a solution of 4-(1-(2-cyano-4-methylpent-2-enoyl)piperidin-4-yl)-N—((R)-2-phenyl-1-((3aS,4S,6S,7aR)-3a,5,5-trimethylhexahydro-4,6-methanobenzo[d][1,3,2]dioxaborol-2-yl)ethyl)butanamide (440 mg, 0.77 mmol) in MeOH (5 mL) were added hexane (5 mL) and HCl (0.5 N, 5 mL), followed by addition of isobutyl boronic acid (196 mg, 2.5 mol). After stirring at rt for 4 h, the solution was concentrated to give a residue which was purified by prep-HPLC to afford (R)-(1-(4-(1-(2-cyano-4-methylpent-2-enoyl)piperidin-4-yl)butanamido)-2-phenylethyl)boronic acid as a white solid (65 mg, 20%). LC-MS (ES, m/z): 422.2 [M-17].

Example 30

((R)-1-((S)-3-(((R)-1-(2-cyano-4-methylpent-2-enoyl)pyrrolidin-2-yl)methoxy)-2-((2,2,2-trifluoroethyl)amino)propanamido)-2-(3-ethylphenyl)ethyl) boronic Acid

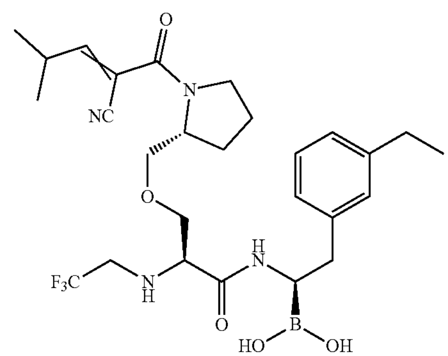

Using the procedure in Example 21, (3aS,4S,6S,7aR)-2-(3-ethylbenzyl)-3a,5,5-trimethylhexahydro-4,6-methanobenzo[d][1,3,2]dioxaborole (synthesized according to below 7 step sequence) in step 4, and 2-cyano-4-methylpent-2-enoic acid step 6, the title compound was obtained. LC-MS (ES, m/z): 549.1 [M-17].

Synthesis of (3aS,4S,6S,7aR)-2-(3-ethylbenzyl)-3a,5,5-trimethylhexahydro-4,6-methanobenzo[d][1,3,2]dioxaborole:

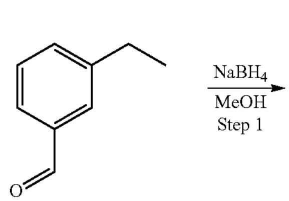

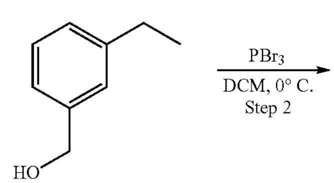

-continued

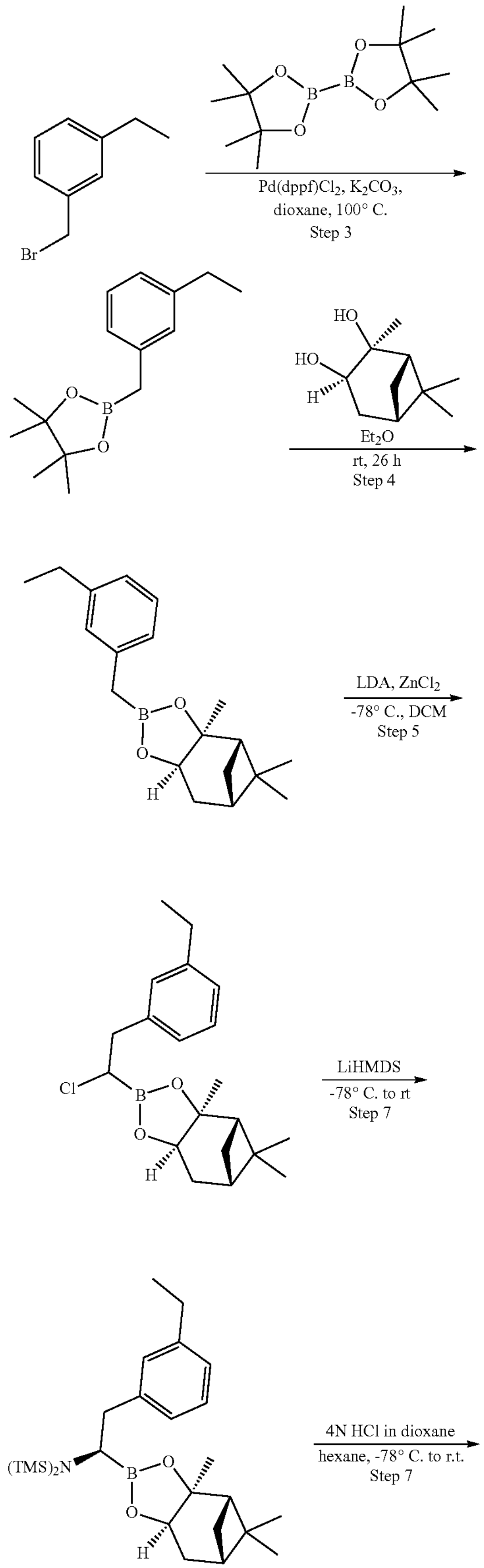

-continued

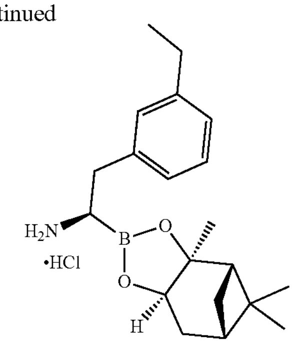

A solution of 3-ethylbenzaldehyde (5 g, 37.3 mmol) in methanol (50 mL) was cooled with ice and sodium borohydride (2.1 g, 56 mmol) was added portion-wise. The reaction mixture was stirred at rt for 1 h. The mixture was concentrated and the residue was partitioned between saturated ammonium chloride and DCM. The organic layer was separated, dried over sodium sulfate and concentrated. The crude (3-ethylphenyl)methanol (4.5 g, 90%) was taken as such for next step without further purification.

A cooled (0° C.) solution of (3-ethylphenyl)methanol (3.9 g, 28.7 mmol) in diethyl ether (50 mL) was treated with phosphorus tribromide (0.94 mL, 9.56 mmol) and the mixture was stirred at 0° C. for 30 min. The reaction mixture was then poured into ice and extracted with ether. The organic layer was dried over sodium sulfate and concentrated. The crude 1-(bromomethyl)-3-ethylbenzene (5 g, 82%) was used without further purification.

A solution of 1-(bromomethyl)-3-ethylbenzene (5 g, 25 mmol) in degassed 1,4-dioxane (50 mL) was treated with bis(pinacolato)diboron (7.6 g, 37.5 mmol), potassium carbonate (10.4 g, 75 mmol), and Pd(dppf)$Cl_2$ (914 mg, 1.25 mmol), and the mixture heated at 100° C. for 12 h. The mixture was cooled to rt and filtered. Filtrate was concentrated, and the crude was purified by column chromatography on silica gel, eluting with 5% of ethylacetate in petroleum ether to afford 2-(3-ethylbenzyl)-4,4,5,5-tetramethyl-1,3,2-dioxaborolane (4 g, 66%) as a yellow oil.

A solution of 2-(3-ethylbenzyl)-4,4,5,5-tetramethyl-1,3,2-dioxaborolane (4 g, 16 mmol) in diethyl ether (30 mL) was treated with (1S,2S,3R,5S)-2,6,6-trimethylbicyclo[3.1.1]heptane-2,3-diol (3.5 g, 20.8 mmol). The mixture was stirred at rt for 12 h. Then the mixture was concentrated and the crude was purified by column chromatography on silica gel, eluting with 5% of EtOAc in petroleum ether to afford (3aS,4S,6S,7aR)-2-(3-ethylbenzyl)-3a,5,5-trimethylhexahydro-4,6-methanobenzo[d][1,3,2]dioxaborole (3 g, 63%) as a yellow oil.

To a cooled (−78° C.) mixture of dichloromethane (0.97 mL, 15 mmol) and anhydrous tetrahydrofuran (10 mL) was added LDA (2 M in tetrahydrofuran, 2.75 mL, 5.5 mmol). After stirring for 20 min at −78° C., a solution of (3aS,4S,6S,7aR)-2-(3-ethylbenzyl)-3a,5,5-trimethylhexahydro-4,6-methanobenzo[d][1,3,2]dioxaborole (1.5 g, 5 mmol) in anhydrous tetrahydrofuran (4 mL) was added over 10 min. Then a solution of zinc chloride (1 M in diethyl ether, 5 mL, 5 mmol) was added at −78° C. over 30 min. The mixture was allowed to reach rt and stirred for 3 h. Then the mixture was concentrated. To the resulting oil was added diethyl ether and sat. ammonium chloride, the aqueous layer was extracted with diethyl ether (3×), and the combined organic layers were dried over anhydrous $Na_2SO_4$ and concentrated in vacuo. The crude was purified by column chromatography on silica gel, eluting with 5% of EtOAc in petroleum ether to afford (3aS,4S,6S,7aR)-2-(3-ethylbenzyl)-3a,5,5-trimethylhexahydro-4,6-methanobenzo[d][1,3,2]dioxaborole (1.2 g, 67%) as a colorless oil.

To a cooled (−78° C.) solution of (3aS,4S,6S,7aR)-2-(3-ethylbenzyl)-3a,5,5-trimethylhexahydro-4,6-methanobenzo[d][1,3,2]dioxaborole (1.2 g, 3.5 mmol) in anhydrous tetrahydrofuran (15 mL) was added LiHMDS (1 M in tetrahydrofuran, 4.2 mL, 4.2 mmol). The mixture was allowed to rt, stirred for 3 h and concentrated to dryness. To the resulting residue was added hexane, and then the precipitated solid was filtered off. The filtrate containing crude N—((R)-2-(3-ethylphenyl)-1-((3aS,4S,6S,7aR)-3a,5,5-trimethylhexahydro-4,6-methanobenzo[d][1,3,2]dioxaborol-2-yl)ethyl)-1,1,1-trimethyl-N-(trimethylsilyl)silanamine was used without further purification.

A cooled (0° C.) solution of (3aS,4S,6S,7aR)-2-(3-ethylbenzyl)-3a,5,5-trimethylhexahydro-4,6-methanobenzo[d][1,3,2]dioxaborole was treated with 4N HCl in dioxane (2.6 mL, 10.5 mmol) dropwise. The mixture was allowed to rt and stirred for 2 h, and the white solid was filtered to afford the product (3aS,4S,6S,7aR)-2-(3-ethylbenzyl)-3a,5,5-trimethylhexahydro-4,6-methanobenzo[d][1,3,2]dioxaborole (400 mg, 30% for two steps), which was used without further purification.

Example 31

((R)-2-(benzofuran-3-yl)-1-((S)-3-(((R)-1-(2-cyano-4-methylpent-2-enoyl)pyrrolidin-2-yl)methoxy)-2-((2,2,2-trifluoroethyl)amino)propanamido)ethyl) boronic Acid

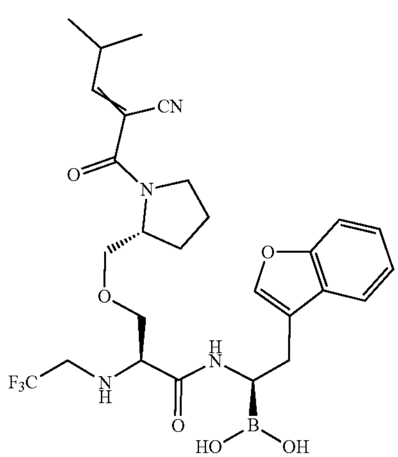 [SMILES: CC(C)C=C(C#N)C(=O)N1CCC[C@@H]1COC[C@H](NCC(F)(F)F)C(=O)N[C@@H](Cc1coc2ccccc12)B(O)O]

Using the procedure in Example 22, (R)-2-(benzofuran-3-yl)-1-((3aS,4S,6S,7aR)-3a,5,5-trimethylhexahydro-4,6-methanobenzo[d][1,3,2]dioxaborol-2-yl)ethan-1-amine (synthesized according to below 7 step sequence) in step 4, and 2-cyano-4-methylpent-2-enoic acid step 6, the title compound was obtained. LC-MS (ES, m/z): 561.1 [M-17].

Synthesis of (R)-2-(benzofuran-3-yl)-1-((3aS,4S,6S,7aR)-3a,5,5-trimethylhexahydro-4,6-methanobenzo[d][1,3,2]dioxaborol-2-yl)ethan-1-amine:

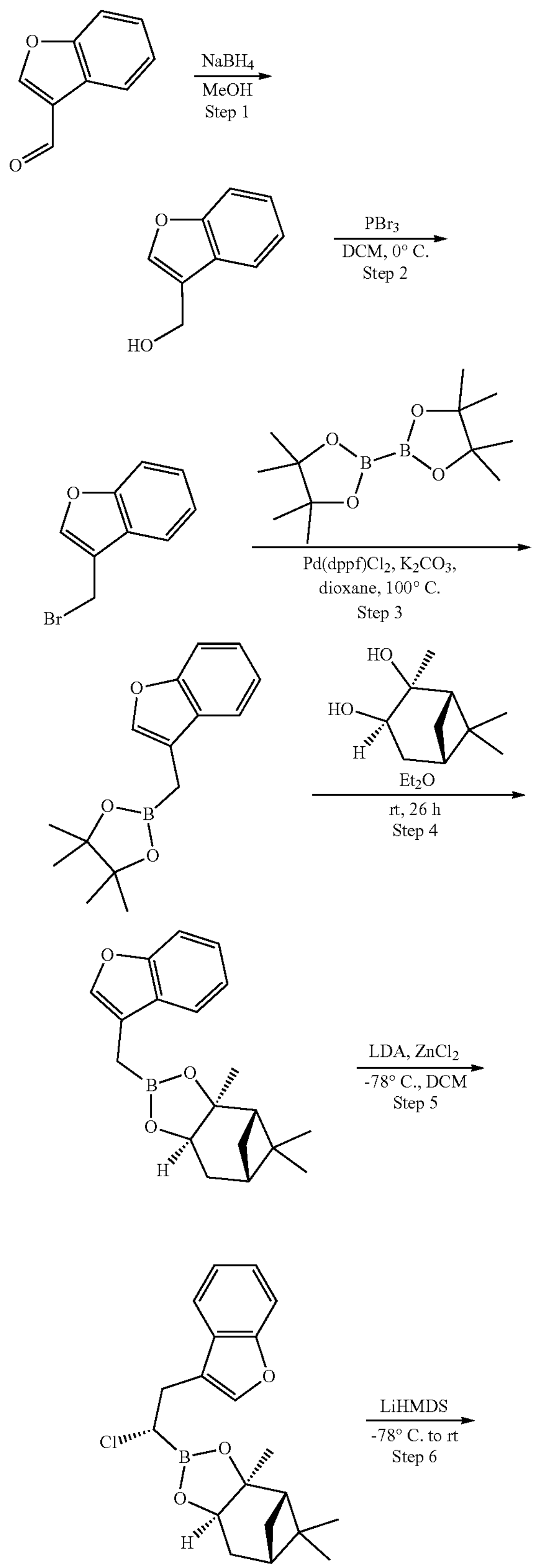

-continued

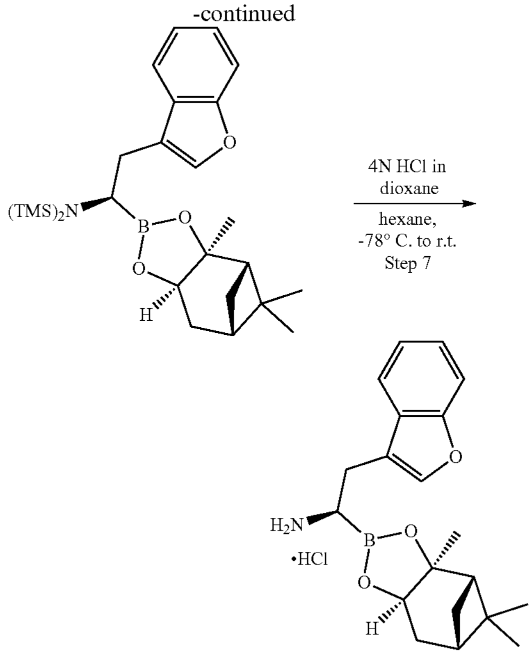

A solution of benzofuran-3-carbaldehyde (5 g, 33.8 mmol) in methanol (50 mL) was cooled with ice and sodium borohydride (1.9 g, 50.7 mmol) was added portionwise. The reaction mixture was stirred at rt for 1 h. The mixture was concentrated and the residue was partitioned between saturated ammonium chloride and DCM. The organic layer was separated, dried over sodium sulfate and concentrated. The crude benzofuran-3-ylmethanol (4.6 g, 92%) was taken as such for next step without further purification.

A cooled (0° C.) solution of benzofuran-3-ylmethanol (4.6 g, 21.8 mmol) in diethyl ether (50 mL) was treated with phosphorus tribromide (0.71 mL, 7.27 mmol), and the mixture was stirred at 0° C. for 30 min. The reaction mixture was then poured into ice and extracted with ether. The organic layer was dried over sodium sulfate and concentrated. The crude 3-(bromomethyl)benzofuran (5.9 g, 90%) was used without further purification.

A solution of 3-(bromomethyl)benzofuran (5.9 g, 28 mmol) in degassed 1,4-dioxane (50 mL) was treated with bis(pinacolato)diboron (8.5 g, 33.6 mmol), potassium carbonate (11.6 g, 84 mmol), and Pd(dppf)$Cl_2$ (1.02 g, 1.4 mmol). The mixture heated at 100° C. for 12 h. The mixture was cooled to rt and filtered. Filtrate was concentrated and the crude was purified by column chromatography on silica gel, eluting with 5% of ethylacetate in petroleum ether to afford 2-(benzofuran-3-ylmethyl)-4,4,5,5-tetramethyl-1,3,2-dioxaborolane (4.58 g, 64%) as a yellow oil.

A solution of 2-(benzofuran-3-ylmethyl)-4,4,5,5-tetramethyl-1,3,2-dioxaborolane (4.58 g, 17.7 mmol) in diethyl ether (30 mL) was treated with (1S,2S,3R,5S)-2,6,6-trimethylbicyclo[3.1.1]heptane-2,3-diol (3.9 g, 23.1 mmol), the mixture was stirred at rt for 12 h. Then the mixture was concentrated and the crude was purified by column chromatography on silica gel, eluting with 5% of ethylacetate in petroleum ether to afford (3aS,4S,6S,7aR)-2-(benzofuran-3-ylmethyl)-3a,5,5-trimethylhexahydro-4,6-methanobenzo[d][1,3,2]dioxaborole (4.5 g, 80%) as a yellow oil.

To a cooled (−78° C.) mixture of dichloromethane (3.7 g, 43.5 mmol) and anhydrous tetrahydrofuran (20 mL) was added LDA (2 M in tetrahydrofuran, 9.5 mL, 19 mmol). After stirring for 20 min at −78° C., a solution of (3aS,4S,6S,7aR)-2-(benzofuran-3-ylmethyl)-3a,5,5-trimethylhexahydro-4,6-methanobenzo[d][1,3,2]dioxaborole (4.5 g, 14.5 mmol) in anhydrous tetrahydrofuran (10 mL) was added over 10 min. Then a solution of zinc chloride (1 M in Diethyl ether, 14.5 mL, 14.5 mmol) was added at -78° C. over 30 min. The mixture was allowed to reach rt and stirred for 3 h. Then the mixture was concentrated. To the resulting oil was added diethyl ether and sat. ammonium chloride. The aqueous layer was extracted with diethyl ether (3×), and the combined organic layers were dried over anhydrous sodium sulphate and concentrated in vacuo. The crude was purified by column chromatography on silica gel, eluting with 5% of ethylacetate in petroleum ether to afford (3aS,4S,6S,7aR)-2-((S)-2-(benzofuran-3-yl)-1-chloroethyl)-3a,5,5-trimethylhexahydro-4,6-methanobenzo[d][1,3,2]dioxaborole (1.5 g pure, 2 g crude) as a colorless oil.

To a cooled (−78° C.) solution of (3aS,4S,6S,7aR)-2-((S)-2-(benzofuran-3-yl)-1-chloroethyl)-3a,5,5-trimethylhexahydro-4,6-methanobenzo[d][1,3,2]dioxaborole (1.5 g, 4.2 mmol) in anhydrous tetrahydrofuran (15 mL) was added LiHMDS (1 M in tetrahydrofuran, 5 mL, 5 mmol). The mixture was allowed to rt, stirred for 3 h and concentrated to dryness. To the resulting residue was added hexane, and then the precipitated solid was filtered off. The filtrate containing N—((R)-2-(benzofuran-3-yl)-1-((3aS,4S,6S,7aR)-3a,5,5-trimethylhexahydro-4,6-methanobenzo[d][1,3,2]dioxaborol-2-yl)ethyl)-1,1,1-trimethyl-N-(trimethylsilyl)silanamine was used without further purification.

A cooled (0° C.) solution of N—((R)-2-(benzofuran-3-yl)-1-((3aS,4S,6S,7aR)-3a,5,5-trimethylhexahydro-4,6-methanobenzo[d][1,3,2]dioxaborol-2-yl)ethyl)-1,1,1-trimethyl-N-(trimethylsilyl)silanamine was treated with 4N HCl in dioxane (3.2 mL, 12.6 mmol) dropwise. The mixture was allowed to rt, stirred for 2 h. Then the solid was filtered. The white solid product (R)-2-(benzofuran-3-yl)-1-((3aS,4S,6S,7aR)-3a,5,5-trimethylhexahydro-4,6-methanobenzo[d][1,3,2]dioxaborol-2-yl)ethan-1-amine hydrochloride (800 mg, 51% for two steps) was used without further purification.

Example 32

((R)-1-(3-(((R)-1-(2-cyano-4-methylpent-2-enoyl)pyrrolidin-2-yl)methyl)ureido)-2-phenylethyl)boronic Acid

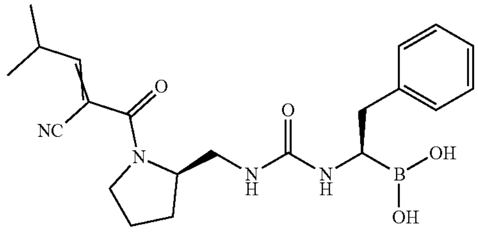

-continued

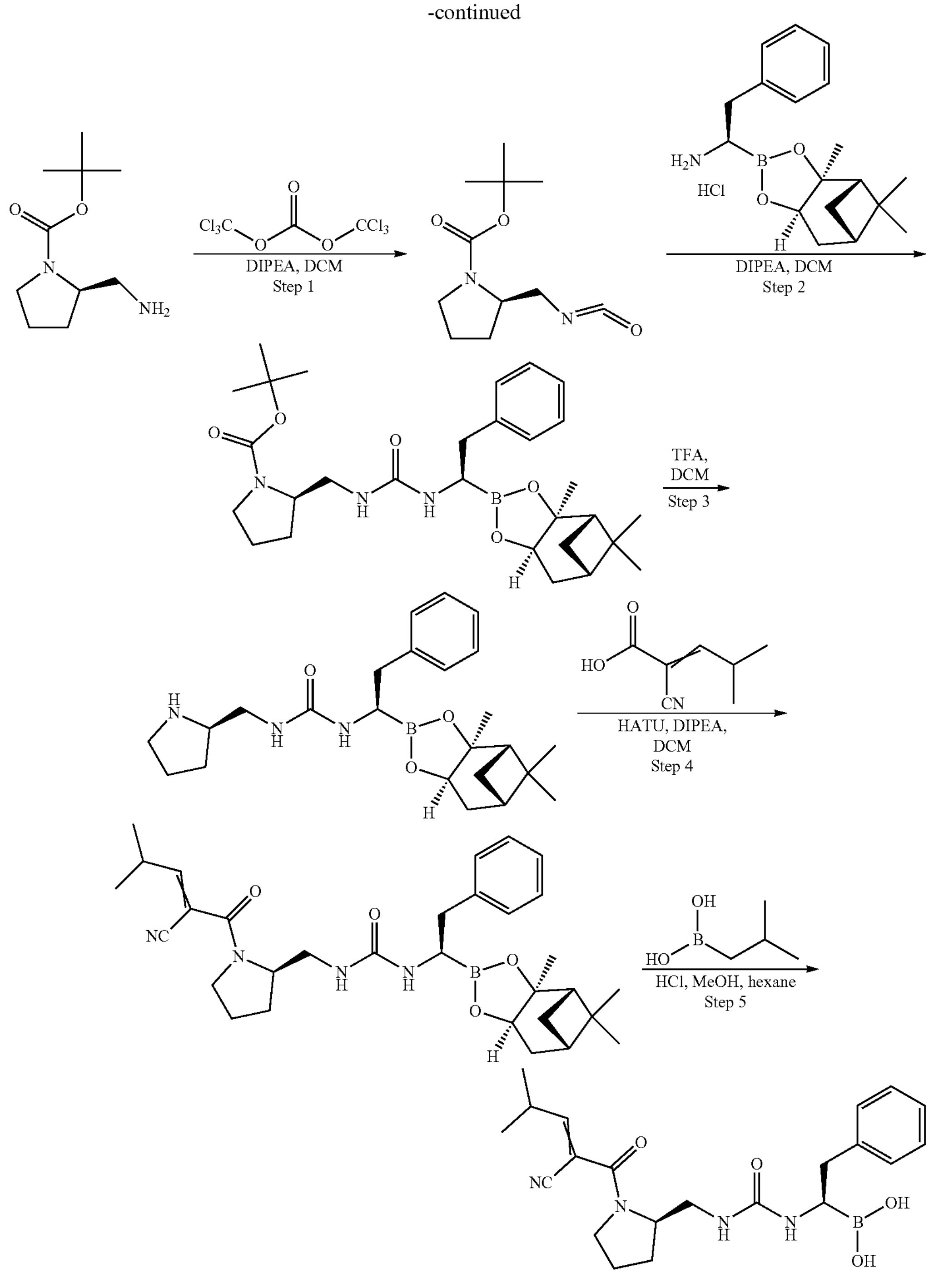

Into a 100-mL 3-necked round-bottom flask purged and maintained with an inert atmosphere of nitrogen, was placed tert-butyl (2R)-2-(aminomethyl)pyrrolidine-1-carboxylate (600 mg, 3.00 mmol, 1 eq.), dichloromethane (16 mL), and DIEA (774 mg, 5.99 mmol, 2 eq.). This was followed by the addition of ditrichloromethyl carbonate (1.77 g, 5.96 mmol, 2 eq.) dropwise with stirring at 0° C. The resulting solution was stirred for 6 h at 25° C. The resulting mixture was concentrated under vacuum, and the crude product was used directly in the next step.

Into a 100-mL round-bottom flask, was placed (1R)-2-phenyl-1-[(1S,2S,6R,8S)-2, 9,9-trimethyl-3,5-dioxa-4-boratricyclo[6.1.1.0^[2,6]]decan-4-yl]ethan-1-amine hydrochloride (1 g, 2.98 mmol, 1 eq.), dichloromethane (20 mL), DIEA (774.5 mg, 5.99 mmol, 2.00 eq.) and tert-butyl (2R)-2-(isocyanatomethyl)pyrrolidine-1-carboxylate (678.4 mg, 3.00 mmol, 1.00 eq.). The resulting solution was stirred for overnight at 25° C. The resulting mixture was concentrated under vacuum. The crude product was purified by to give 760 mg (49%) of tert-butyl (2R)-2-[([[(1R)-2-phenyl-1-[(1S,2S,6R,8S)-2,9,9-trimethyl-3,5-dioxa-4-boratricyclo [6.1.1.0^[2,6]]decan-4-yl]ethyl]carbamoyl]amino)methyl] pyrrolidine-1-carboxylate as a yellow solid after lyophilization.

Into a 100-mL round-bottom flask, was placed tert-butyl (2R)-2-[([[(1R)-2-phenyl-1-[(1S,2S,6R,8S)-2,9,9-trimethyl-3,5-dioxa-4-boratricyclo[6.1.1.0^[2,6]]decan-4-yl]ethyl]carbamoyl]amino)methyl]pyrrolidine-1-carboxylate (780 mg, 1.48 mmol, 1 eq.), dichloromethane (20 mL) and trifluoroacetic acid (10 mL). The resulting solution was stirred for 30 min at 25° C. The resulting mixture was concentrated under vacuum, and the crude product was used directly in the next step.

Into a 100-mL round-bottom flask, was placed 1-[(1R)-2-phenyl-1-[(1S,2S,6R,8S)-2,9,9-trimethyl-3,5-dioxa-4-boratricyclo[6.1.1.0^[2,6]]decan-4-yl]ethyl]-3-[(2R)-pyrrolidin-2-ylmethyl]urea (631 mg, 1.48 mmol, 1 eq.), 2-cyano-4-methylpent-2-enoic acid (412.7 mg, 2.97 mmol, 2 eq.), HATU (1.1 g, 2.89 mmol, 2 eq.), DIEA (574.6 mg, 4.45 mmol, 3 eq.) and dichloromethane (20 mL). The resulting solution was stirred for 4 h at 25° C. The resulting mixture was concentrated under vacuum. The crude product was purified by prep-HPLC to give 190 mg (23%) of 3-[[(2R)-1-[2-cyano-2-(2-methylpropylidene)acetyl]pyrrolidin-2-yl]methyl]-1-[(1R)-2-phenyl-1-[(1S,2S,6R,8S)-2,9,9-trimethyl-3,5-dioxa-4-boratricyclo[6.1.1.0^[2,6]]decan-4-yl]ethyl]urea as a yellow solid after lyophilization.

Into a 100-mL round-bottom flask, was placed 3-[[(2R)-1-[2-cyano-2-(2-methylpropylidene)acetyl]pyrrolidin-2-yl]methyl]-1-[(1R)-2-phenyl-1-[(1S,2S,6R,8S)-2,9,9-trimethyl-3,5-dioxa-4-boratricyclo[6.1.1.0^[2,6]]decan-4-yl]ethyl]urea (190 mg, 0.35 mmol, 1 eq.), methanol (8.2 mL), hexane (8.2 mL), (2-methylpropyl)boronic acid (102.9 mg, 1.01 mmol, 2.90 eq.) and 1 M hydrogen chloride (7 mL, 20 eq.). The resulting solution was stirred for 2 h at 25° C. The resulting mixture was washed with hexane (3×10 mL). The methanol layer was diluted with water (100 mL), then dried over lyophylization to give a crude product which was further purified by prep-HPLC to give 48.6 mg (34%) of ((R)-1-(3-(((R)-1-(2-cyano-4-methylpent-2-enoyl)pyrrolidin-2-yl)methyl)ureido)-2-phenylethyl)boronic acid as a white solid after lyophilization. LC-MS m/z: 395.

Example 33

((R)-1-(3-(((R)-1-(2-cyano-4-methylpent-2-enoyl)piperidin-2-yl)methyl)ureido)-2-phenylethyl)boronic Acid

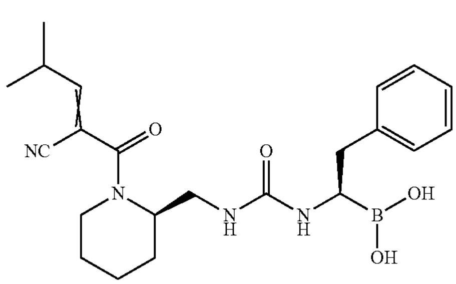

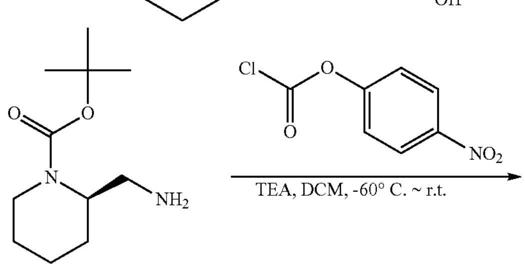

-continued

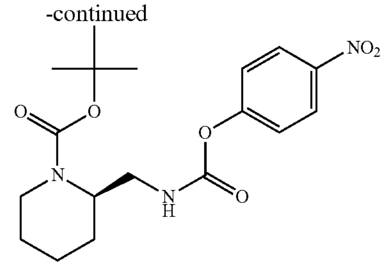

Into a 100-mL 3-necked round-bottom flask, was placed a solution of tert-butyl (2R)-2-(aminomethyl)piperidine-1-carboxylate (500 mg, 2.33 mmol, 1.00 eq.) in dichloromethane (20 mL). This was followed by the addition of TEA (472 mg, 4.66 mmol, 2.00 eq.) dropwise with stirring at -60° C. To this was added 4-nitrophenyl chloroformate (940 mg, 4.66 mmol, 2.00 eq.) in several batches at -60° C. The resulting solution was stirred for 2 h at rt. The reaction was then quenched by the addition of water (20 mL). The resulting solution was extracted with dichloromethane (2×20 mL) and the organic layers combined. The resulting mixture was washed with sodium chloride. (1×20 mL) The mixture was dried over anhydrous sodium sulfate and concentrated under vacuum. The residue was applied onto a silica gel column with ethyl acetate:petroleum ether (10:90). This resulted in 600 mg (68%) of tert-butyl(2R)-2-[[(4-nitrophenoxycarbonyl)amino]methyl]piperidine-1-carboxylate as yellow oil.

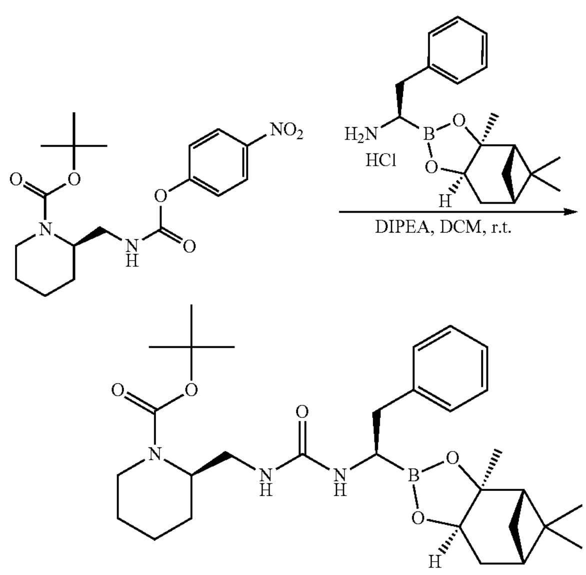

Into a 25-mL round-bottom flask, was placed a solution of tert-butyl (2R)-2-[[(4-nitrophenoxycarbonyl)amino]methyl]piperidine-1-carboxylate (500 mg, 1.32 mmol, 1.00 eq.) in dichloromethane (20 mL), (1R)-2-phenyl-1-[(1S,2S,6R,8S)-2,9,9-trimethyl-3,5-dioxa-4-boratricyclo[6.1.1.0^2,6]decan-4-yl]ethan-1-amine hydrochloride (443 mg, 1.32 mmol, 1.00 eq.), and DIEA (511 mg, 3.95 mmol, 3.00 eq.). The resulting solution was stirred for overnight at rt. The reaction was then quenched by the addition of $H_2O$ (15 mL). The resulting mixture was washed with sodium chloride (1×5 mL). The mixture was dried over sodium sulfate and concentrated under vacuum. The crude product (500 mg) was purified by prep-HPLC with the following conditions (2 #-AnalyseHPLC-SHIMADZU(HPLC-10)): Column, XBridge Prep C18 OBD Column, 19¿Á150 mm 5 um; mobile phase, Water (10 mmol/L $NH_4HCO3$+0.1% $NH_3.H_2O$) and ACN (hold 68% ACN in 10 min); Detector, UV 254/220 nm. This resulted in 90 mg (13%) of tert-butyl (2R)-2-[([[(1R)-2-phenyl-1-[(1S,2S,6R,8S)-2,9,9-trimethyl-3,5-dioxa-4-boratricyclo[6.1.1.0^[2,6]]decan-4-yl]ethyl]carbamoyl]amino)methyl]piperidine-1-carboxylate as a white solid.

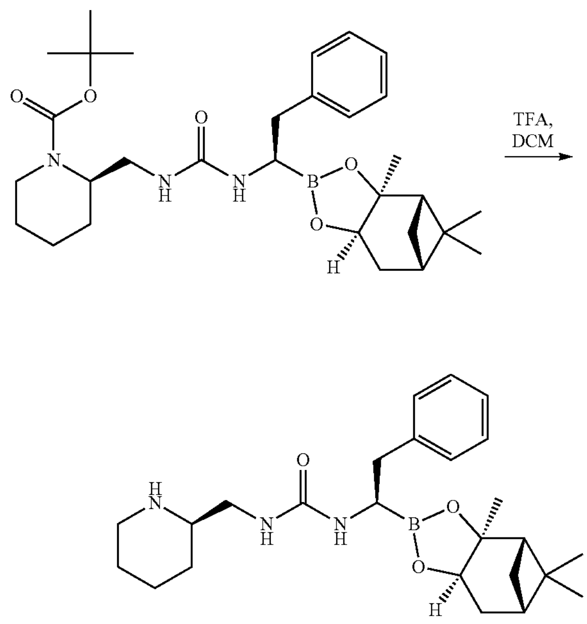

Into a 25-mL round-bottom flask, was placed a solution of tert-butyl (2R)-2-[([[(1R)-2-phenyl-1-[(1S,2S,6R,8S)-2,9,9-trimethyl-3,5-dioxa-4-boratricyclo[6.1.1.0^[2,6]]decan-4-yl]ethyl]carbamoyl]amino)methyl]piperidine-1-carboxylate (90 mg, 0.17 mmol, 1.00 eq.) in dichloromethane (2 mL), and trifluoroacetic acid (1 mL). The resulting solution was stirred for 2 h at rt. The resulting mixture was concentrated under vacuum. This resulted in 73 mg (90%) of 1-[(1R)-2-phenyl-1-[(1S,2S,6R,8S)-2,9,9-trimethyl-3,5-dioxa-4-boratricyclo[6.1.1.0^[2,6]]decan-4-yl]ethyl]-3-[(2R)-piperidin-2-ylmethyl]urea as brown oil.

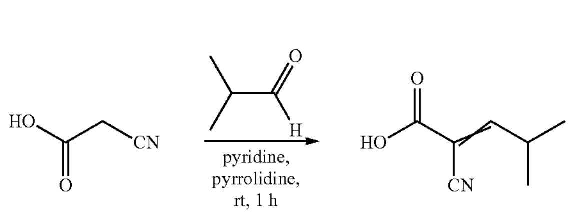

Into a 100-mL round-bottom flask, was placed 2-cyanoacetic acid (2 g, 23.51 mmol, 1.00 eq.), pyridine (10 mL), 2-methylpropanal (1.85 g, 25.66 mmol, 1.09 eq.), pyrrolidine (400 mg, 5.62 mmol, 0.24 eq.). The resulting solution was stirred for 1.5 h at rt. The reaction was then quenched by the addition of hydrogen chloride:$H_2O$ (12:20 mL). The resulting solution was extracted with ethyl acetate (2×20 mL). The organic layers combined and dried over anhydrous sodium sulfate and concentrated under vacuum. This resulted in 2.9 g (89%) of 2-cyano-4-methylpent-2-enoic acid as a light yellow solid.

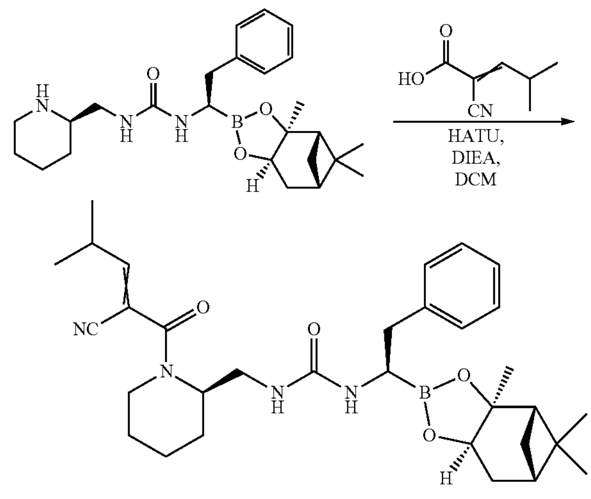

Into a 25-mL round-bottom flask, was placed a solution of 1-[(1R)-2-phenyl-1-[(1S,2S,6R,8S)-2,9,9-trimethyl-3,5-dioxa-4-boratricyclo[6.1.1.0^[2,6]]decan-4-yl]ethyl]-3-[(2R)-piperidin-2-ylmethyl]urea (73 mg, 0.17 mmol, 1.00 eq.) in dichloromethane (4 mL), DIEA (64.4 mg, 0.50 mmol, 3.00 eq.), HATU (95 mg, 0.25 mmol, 1.50 eq.), and 2-cyano-4-methylpent-2-enoic acid (28 mg, 0.20 mmol, 1.20 eq.). The resulting solution was stirred for overnight at rt. The reaction was then quenched by the addition of $H_2O$ (2 mL). The resulting mixture was washed with brine (1×10 mL). The mixture was dried over sodium sulfate and concentrated under vacuum. The crude product (73 mg) was purified by prep-HPLC with the following conditions (2 #-AnalyseHPLC-SHIMADZU(HPLC-10)): Column, XBridge Prep C18 OBD Column, 19 mm×150 mm 5 um; mobile phase, Water (10 mmol/L $NH_4HCO_3$+0.1% $NH_3.H_2O$) and ACN (69% ACN up to 70% in 7 min); Detector, UV 254/220 nm. This resulted in 28 mg (30%) of 3-[[(2R)-1-[2-cyano-2-(2-methylpropylidene)acetyl]piperidin-2-yl]methyl]-1-[(1R)-2-phenyl-1-[(1S,2S,6R,8S)-2,9,9-trimethyl-3,5-dioxa-4-boratricyclo[6.1.1.0^[2,6]]decan-4-yl]ethyl]urea as a white solid.

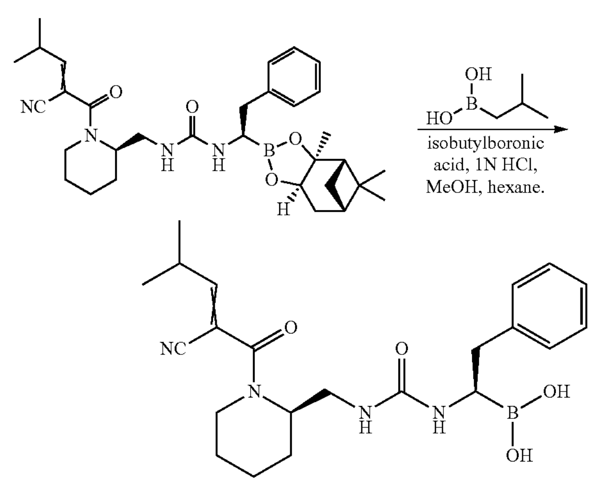

Into a 25-mL round-bottom flask, was placed a solution of 3-[[(2R)-1-[2-cyano-2-(2-methylpropylidene)acetyl]piperidin-2-yl]methyl]-1-[(1R)-2-phenyl-1-[(1S,2S,6R,8S)-2,9,9- trimethyl-3,5-dioxa-4-boratricyclo[6.1.1.0^[2,6]]decan-4-yl]ethyl]urea (28 mg, 0.05 mmol, 1.00 eq.) in methanol: Hexane (1.5:1.5 mL), 1N HCl (1 mL, 20.00 eq.), and (2-methylpropyl)boronic acid (16 mg, 0.16 mmol, 3.00 eq.). The resulting solution was stirred for 2 h at rt. The hexane layer was discarded, the methanol layer was diluted with water and freeze dried directly to get a crude product. The crude product (28 mg) was purified by prep-HPLC with the following conditions (2 #-AnalyseHPLC-SHIMADZU (HPLC-10)): Column, XBridge Prep C18 OBD Column, 19×150 mm, 5 um; mobile phase, Water (10 mmol/L $NH_4HCO_3$+0.1% $NH_3.H_2O$) and ACN (2% ACN up to 30% in 1 min, up to 32% in 6 min); Detector, UV 254/220 nm. This resulted in 5.3 mg (25%) of ((R)-1-(3-(((R)-1-(2-cyano-4-methylpent-2-enoyl)piperidin-2-yl)methyl)ureido)-2-phenylethyl)boronic acid as a white solid. LC-MS m/z: 409 [M-17].

Example 34

((R)-1-(3-(((S)-1-(2-cyano-4-methylpent-2-enoyl) pyrrolidin-2-yl)methyl)ureido)-2-phenylethyl)boronic Acid

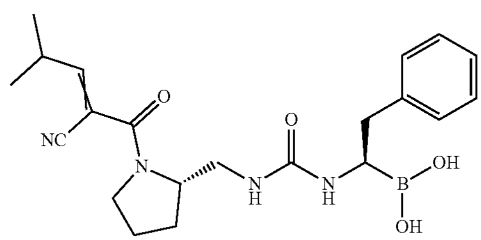

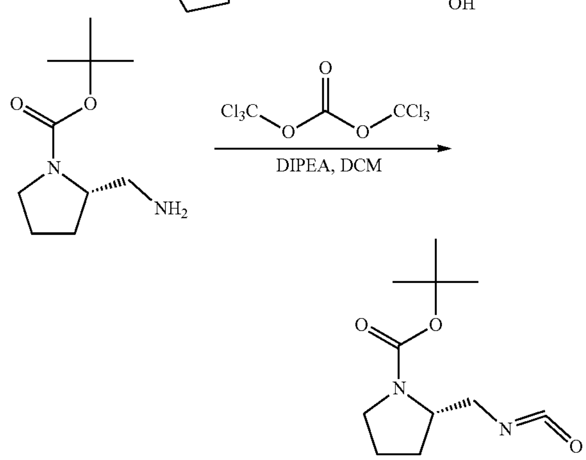

Into a 100-mL 3-necked round-bottom flask, was placed tert-butyl (2S)-2-(aminomethyl)pyrrolidine-1-carboxylate (600 mg, 3.00 mmol, 1.00 eq.), dichloromethane (16 mL), and DIPEA (744 mg, 5.77 mmol, 2.00 eq.). This was followed by the addition of ditrichloromethyl carbonate (1.77 g, 5.96 mmol, 2.00 eq.) at 0° C. The resulting solution was stirred for 6 h at 25° C. The resulting mixture was concentrated under vacuum and the crude product was used directly to the next step.

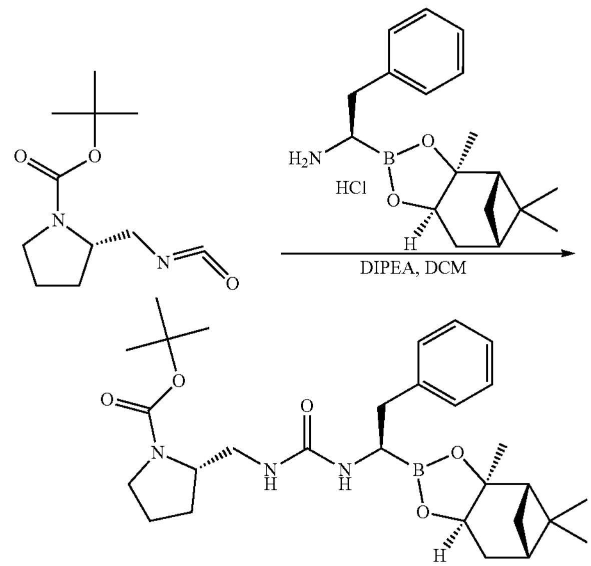

Into a 100-mL round-bottom flask, was placed tert-butyl (2S)-2-(isocyanatomethyl) pyrrolidine-1-carboxylate (678.4 mg, 3.00 mmol, 1.00 eq.), (1R)-2-phenyl-1-[(1S,2S,6R,8S)-2,9,9-trimethyl-3,5-dioxa-4-boratricyclo[6.1.1.0^[2,6]]decan-4-yl]ethan-1-amine (1 g, 3.34 mmol, 1.00 eq.), DIPEA (774.5 mg, 6.00 mmol, 2.00 eq.), and dichloromethane (20 mL). The resulting solution was stirred for overnight at 25° C. The resulting mixture was concentrated under vacuum. The crude product was purified by prep-HPLC with the following conditions (2 #-AnalyseHPLC-SHIMADZU (HPLC-10)): Column, XBridge Prep C18 OBD Column, 19×150 mm, 5 um; mobile phase, Water (10 mmol/L $NH_4HCO_3$+0.1% $NH_3.H_2O$) and ACN (46.0% ACN up to 95.0% in 7 min); Detector, UV 254/220 nm. This resulted in 750 mg (48%) of tert-butyl (2S)-2-[([[(1R)-2-phenyl-1-[(1S,2S,6R,8S)-2,9,9-trimethyl-3,5-dioxa-4-boratricyclo[6.1.1.0^[2,6]]decan-4-yl]ethyl]carbamoyl]amino)methyl]pyrrolidine-1-carboxylate as a yellow solid after the lyophilization.

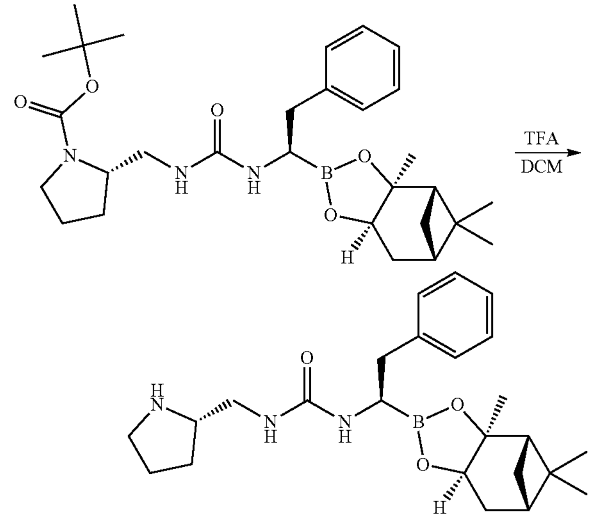

Into a 100-mL round-bottom flask, was placed tert-butyl (2S)-2-[([[(1R)-2-phenyl-1-[(1S,2S,6R,8S)-2,9,9-trimethyl- 3,5-dioxa-4-boratricyclo[6.1.1.0^[2,6]]decan-4-yl]ethyl]carbamoyl]amino)methyl]pyrrolidine-1-carboxylate (750 mg, 1.43 mmol, 1.00 eq.), dichloromethane (20 mL), and trifluoroacetic acid (10 mL). The resulting solution was stirred for 30 min at 25° C. The resulting mixture was concentrated under vacuum and the crude product was used directly to the next step.

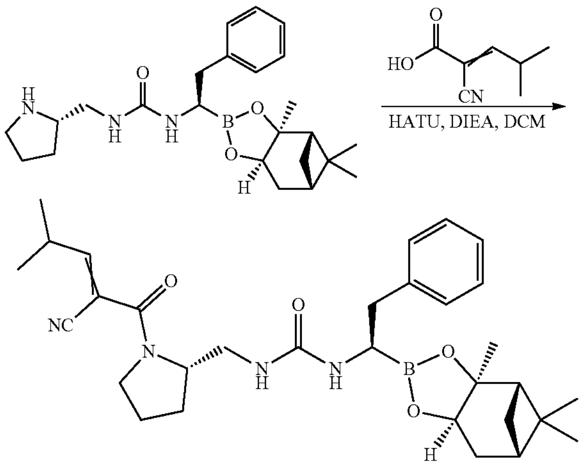

Into a 100-mL round-bottom flask, was placed 1-[(1R)-2-phenyl-1-[(1S,2S,6R,8S)-2,9,9-trimethyl-3,5-dioxa-4-boratricyclo[6.1.1.0^[2,6]]decan-4-yl]ethyl]-3-[(2S)-pyrrolidin-2-ylmethyl]urea (607 mg, 1.43 mmol, 1.00 eq.), 2-cyano-4-methylpent-2-enoic acid (397 mg, 2.85 mmol, 2.00 eq.), HATU (1.1 g, 2.89 mmol, 2.00 eq.), DIPEA (552.7 mg, 4.28 mmol, 3.00 eq.), and dichloromethane (20 mL). The resulting solution was stirred for 4 h at 25° C. The resulting mixture was concentrated under vacuum. The crude product was purified by prep-HPLC with the following conditions (2 #-AnalyseHPLC-SHIMADZU(HPLC-10)): Column, XBridge Prep C18 OBD Column, 19×150 mm, 5 um; mobile phase, Water (10 mmol/L $NH_4HCO_3$+0.1% $NH_3$.$H_2O$) and ACN (65.0% ACN up to 69.0% in 7 min); Detector, UV 254/220 nm. This resulted in 210 mg (27%) of 3-[[(2S)-1-[2-cyano-2-(2-methylpropylidene)acetyl]pyrrolidin-2-yl]methyl]-1-[(1R)-2-phenyl-1-[(1S,2S,6R,8S)-2,9,9-trimethyl-3,5-dioxa-4-boratricyclo[6.1.1.0^[2,6]]decan-4-yl]ethyl]urea as a yellow solid after the lyophilization.

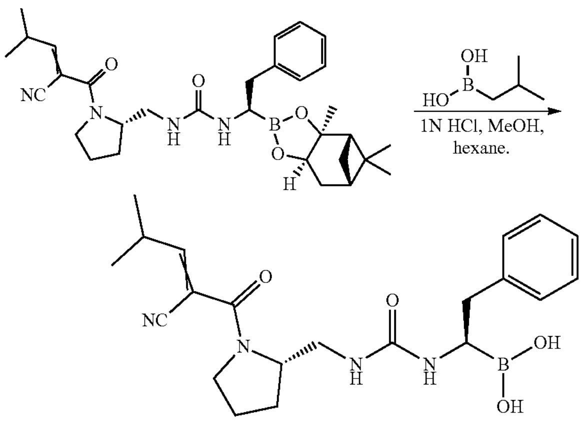

Into a 100-mL round-bottom flask, was placed 3-[[(2S)-1-[2-cyano-2-(2-methylpropylidene)acetyl]pyrrolidin-2-yl]methyl]-1-[(1R)-2-phenyl-1-[(1S,2S,6R,8S)-2,9,9-trimethyl-3,5-dioxa-4-boratricyclo[6.1.1.0^[2,6]]decan-4-yl]ethyl]urea (210 mg, 0.38 mmol, 1.00 eq.), methanol (9.1 mL), hexane (9.1 mL), (2-methylpropyl)boronic acid (113.8 mg, 1.12 mmol, 2.90 eq.), and 1N HCl (7.7 mL, 20.00 eq.). The resulting solution was stirred for 2 h at 25° C. The resulting mixture was washed with hexane (3×10 mL). The methanol layer was diluted with water (100 mL), then dried over lyophylization to give a crude product which was further purified by prep-HPLC with the following conditions (2 #-AnalyseHPLC-SHIMADZU(HPLC-10)): Column, XBridge Prep C18 OBD Column, 19×150 mm, 5 um; mobile phase, Water (10 mmol/L $NH_4HCO_3$+0.1% $NH_3$.$H_2O$) and ACN (30.0% ACN up to 33.0% in 7 min); Detector, UV 254/220 nm. This resulted in 64.7 mg (41%) of ((R)-1-(3-(((S)-1-(2-cyano-4-methylpent-2-enoyl)pyrrolidin-2-yl)methyl)ureido)-2-phenylethyl)boronic acid as a white solid. LC-MS m/z: 395[M-17].

Example 35

((R)-1-(3-(((S)-1-(2-cyano-4-methylpent-2-enoyl)piperidin-2-yl)methyl)ureido)-2-phenylethyl)boronic Acid

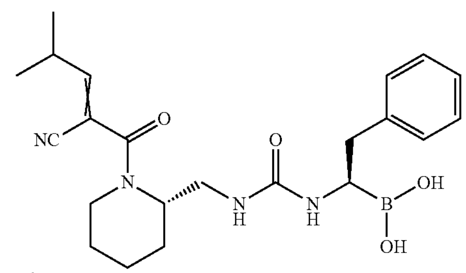

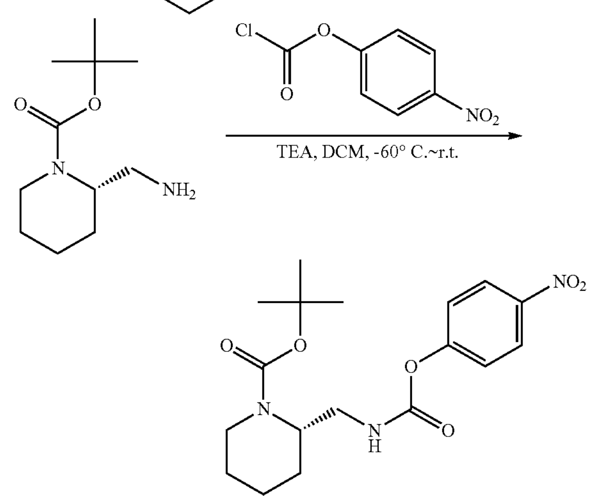

Into a 100-mL 3-necked round-bottom flask purged and maintained with an inert atmosphere of nitrogen, was placed tert-butyl (2S)-2-(aminomethyl)piperidine-1-carboxylate (500 mg, 2.33 mmol, 1.00 eq.) in dichloromethane (50 mL). TEA (472 mg, 4.66 mmol, 2.00 eq.) and 4-nitrophenyl chloroformate (939 mg, 4.66 mmol, 2.00 eq.) was added at -60° C. The reaction was warmed to rt and then stirred for 2 h at rt. The resulting solution was extracted with dichloromethane (3×50 mL), and the organic layers combined and dried over anhydrous sodium sulfate and concentrated under vacuum. The residue was applied onto a silica gel column with ethyl acetate:petroleum ether (1:3). The crude product was purified by C18 column with water:ACN (20%-100% in 30 min). This resulted in 790 mg (89%) of tert-butyl (2S)-2-[[(4-nitrophenoxycarbonyl)amino]methyl]piperidine-1-carboxylate as yellow oil.

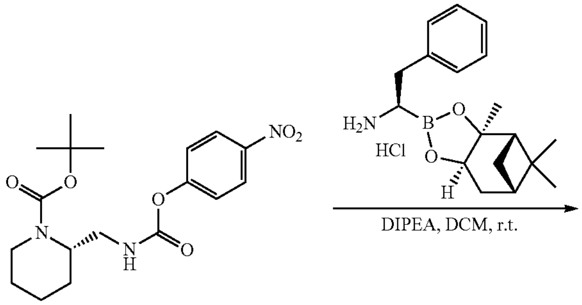

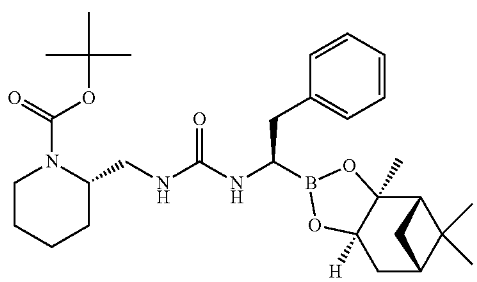

Into a 100-mL round-bottom flask, was placed tert-butyl (2S)-2-[[(4-nitrophenoxycarbonyl)amino]methyl]piperidine-1-carboxylate (1.5 g, 3.95 mmol, 1.00 eq.), (1R)-2-phenyl-1-[(1S,2S,6R,8S)-2,9,9-trimethyl-3,5-dioxa-4-boratricyclo[6.1.1.0^2,6]decan-4-yl]ethan-1-amine hydrochloride (1.33 g, 3.96 mmol, 1.00 eq.), DIEA (1.53 g, 11.84 mmol, 3.00 eq.), dichloromethane (50 mL). The resulting solution was stirred for 3 h at rt. The resulting solution was extracted with dichloromethane (3×100 mL), and the organic layers combined and concentrated under vacuum. The residue was purified by C18 column with water:ACN (20%-100% in 30 min). This resulted in 440 mg (21%) of tert-butyl (2S)-2-[([[(1R)-2-phenyl-1-[(1S,2S,6R,8S)-2,9,9-trimethyl-3,5-dioxa-4-boratricyclo[6.1.1.0^[2,6]]decan-4-yl]ethyl]carbamoyl]amino)methyl]piperidine-1-carboxylate as a yellow solid.

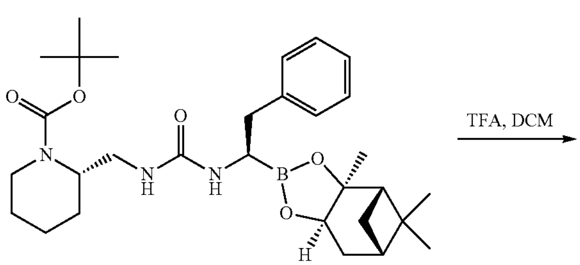

-continued

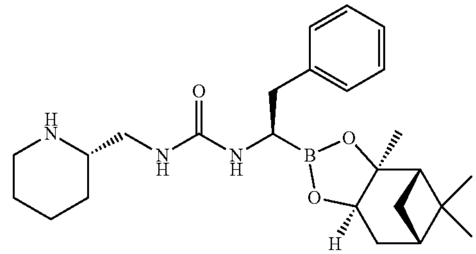

Into a 50-mL round-bottom flask, was placed tert-butyl (2S)-2-[([[(1R)-2-phenyl-1-[(1S,2S,6R,8S)-2,9,9-trimethyl-3,5-dioxa-4-boratricyclo[6.1.1.0^[2,6]]decan-4-yl]ethyl]carbamoyl]amino)methyl]piperidine-1-carboxylate (440 mg, 0.82 mmol, 1.00 eq.), trifluoroacetic acid (4 mL), dichloromethane (20 mL). The resulting solution was stirred for 3 h at rt. The resulting mixture was concentrated under vacuum. The residue was purified by C18 column with water:ACN (20%-100% in 30 min). This resulted in 320 mg (89%) of 1-[(1R)-2-phenyl-1-[(1S,2S,6R,8S)-2,9,9-trimethyl-3,5-dioxa-4-boratricyclo[6.1.1.0^[2,6]]decan-4-yl]ethyl]-3-[(2S)-piperidin-2-ylmethyl]urea as a yellow solid.

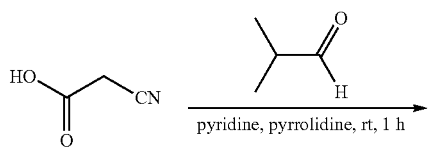

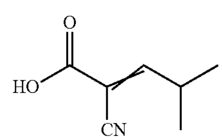

Into a 100-mL round-bottom flask, was placed 2-cyanoacetic acid (2 g, 23.51 mmol, 1.00 eq.), pyridine (10 mL), 2-methylpropanal (1.85 g, 25.66 mmol, 1.09 eq.), pyrrolidine (400 mg, 5.62 mmol, 0.24 eq.). The resulting solution was stirred for 1.5 h at rt. The reaction was then quenched by the addition of 12:20 mL of hydrogen chloride:$H_2O$. The resulting solution was extracted with ethyl acetate (2×20 mL), and the organic layers combined and dried over anhydrous sodium sulfate and concentrated under vacuum. This resulted in 2.9 g (89%) of 2-cyano-4-methylpent-2-enoic acid as a light yellow solid.

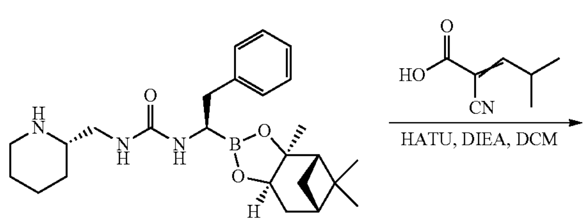

-continued

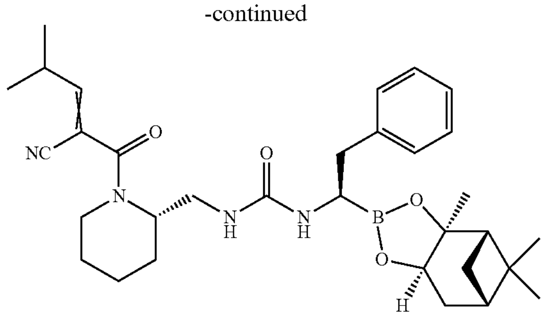

Into a 50-mL round-bottom flask, was placed 1-[(1R)-2-phenyl-1-[(1S,2S,6R,8S)-2,9,9-trimethyl-3,5-dioxa-4-boratricyclo[6.1.1.0^[2,6]]decan-4-yl]ethyl]-3-[(2S)-piperidin-2-ylmethyl]urea (320 mg, 0.73 mmol, 1.00 eq.), 2-cyano-4-methylpent-2-enoic acid (122 mg, 0.88 mmol, 1.20 eq.), HATU (415 mg, 1.09 mmol, 1.50 eq.), DIEA (282 mg, 2.18 mmol, 3.00 eq.), dichloromethane (10 mL). The resulting solution was stirred for 3 h at rt. The resulting solution was extracted with dichloromethane (3×50 mL) and the organic layers combined. The resulting mixture was washed with 1×50 mL of sodium chloride(sat.). The mixture was dried over anhydrous sodium sulfate and concentrated under vacuum. The crude product was purified by prep-HPLC with the following conditions (HPLC-SHIMADZU): Column, XBridge Prep C18 OBD Column, 19×150 mm, 5 um; mobile phase, Water (10 mmol/L $NH_4HCO_3$+0.1% $NH_3.H_2O$) and ACN (70.0% ACN up to 72.0% in 7 min); Detector, UV 254/220 nm. This resulted in 65 mg (16%) of 3-[[(2S)-1-[2-cyano-2-(2-methylpropylidene)acetyl]piperidin-2-yl]methyl]-1-[(1R)-2-phenyl-1-[(1S,2S,6R,8S)-2,9,9-trimethyl-3,5-dioxa-4-boratricyclo[6.1.1.0^[2,6]]decan-4-yl]ethyl]urea as a light yellow solid after the lyophilization.

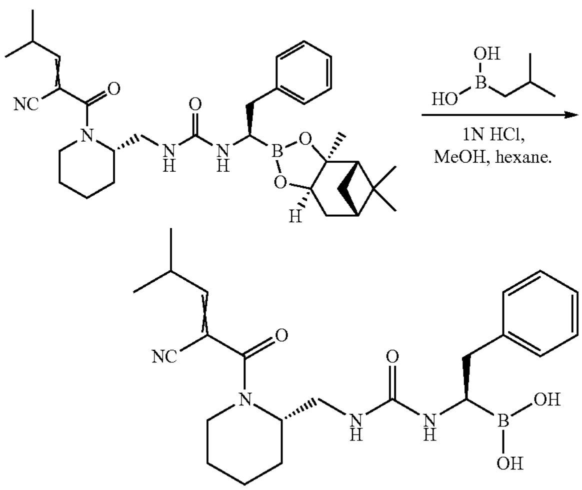

Into a 50-mL round-bottom flask, was placed 3-[[(2S)-1-[2-cyano-2-(2-methylpropylidene)acetyl]piperidin-2-yl]methyl]-1-[(1R)-2-phenyl-1-[(1S,2S,6R,8S)-2,9,9-trimethyl-3,5-dioxa-4-boratricyclo[6.1.1.0^[2,6]]decan-4-yl]ethyl]urea (65 mg, 0.12 mmol, 1.00 eq.), (2-methylpropyl)boronic acid (35.5 mg, 0.35 mmol, 3.00 eq.), hydrogen chloride(1N) (0.6 mL), methanol (3 mL), hexane (3 mL). The resulting solution was stirred for 3 h at rt. The hexane layer was discarded. The methanol layer was diluted with water (10 mL) and then dried over lyophylization to give a crude product. The crude product was purified by prep-HPLC with the following conditions (HPLC-SHIMADZU): Column, XBridge Prep C18 OBD Column, 19×150 mm, 5 um; mobile phase, Water (10 mmol/L $NH_4HCO_3$+0.1% $NH_3.H_2O$) and ACN (28.0% ACN up to 32.0% in 7 min); Detector, UV 254/220 nm. This resulted in 29.4 mg (59%) of ((R)-1-(3-(((S)-1-(2-cyano-4-methylpent-2-enoyl)piperidin-2-yl)methyl)ureido)-2-phenylethyl)boronic acid as a white solid after the lyophilization. LC-MS m/z: 409 [M-17].

Example 36

((R)-1-(3-(((R)-1-acryloylpyrrolidin-2-yl)methyl)ureido)-2-phenylethyl)boronic Acid

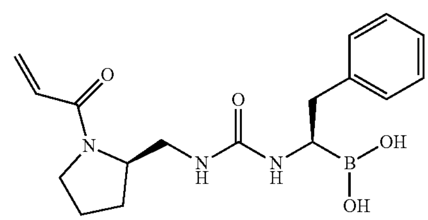

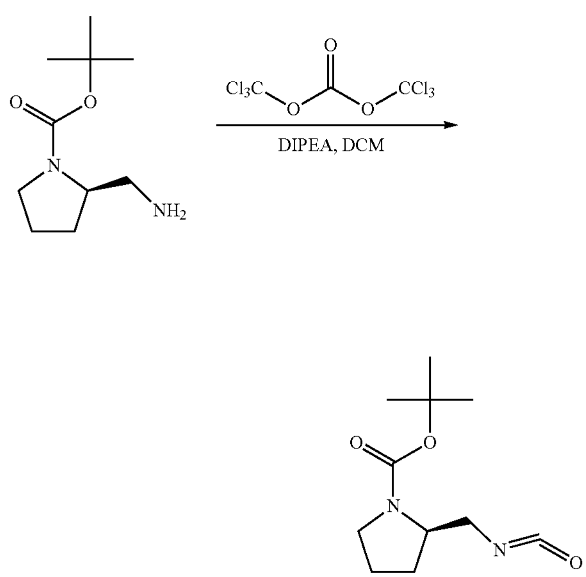

Into a 100-mL 3-necked round-bottom flask purged and maintained with an inert atmosphere of nitrogen, was placed tert-butyl (2R)-2-(aminomethyl)pyrrolidine-1-carboxylate (600 mg, 3.00 mmol, 1.00 eq.), dichloromethane (16 mL), and DIEA (774 mg, 5.99 mmol, 2.00 eq.). This was followed by the addition of ditrichloromethyl carbonate (1.77 g, 5.96 mmol, 2.00 eq.) dropwise with stirring at 0° C. The resulting solution was stirred for 6 h at 25° C. The resulting mixture was concentrated under vacuum and the crude product was used directly to the next step.

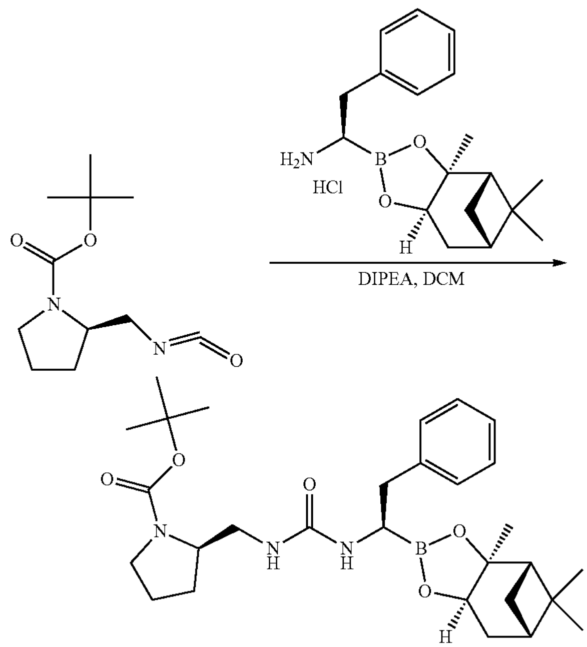

Into a 100-mL round-bottom flask, was placed (1R)-2-phenyl-1-[(1S,2S,6R,8S)-2, 9,9-trimethyl-3,5-dioxa-4-boratricyclo[6.1.1.0^[2,6]]decan-4-yl]ethan-1-amine hydrochloride (1 g, 2.98 mmol, 1.00 eq.), dichloromethane (20 mL), DIEA (774.5 mg, 5.99 mmol, 2.00 eq.), and tert-butyl (2R)-2-(isocyanatomethyl)pyrrolidine-1-carboxylate (678.4 mg, 3.00 mmol, 1.00 eq.). The resulting solution was stirred for overnight at 25° C. The resulting mixture was concentrated under vacuum. The crude product was purified by prep-HPLC with the following conditions (HPLC-SHIMADZU): Column, XBridge Prep C18 OBD Column, 19×150 mm, 5 um; mobile phase, Water (10 mmol/L $NH_4HCO_3$+0.1% $NH_3.H_2O$) and ACN (46.0% ACN up to 95.0% in 7 min); Detector, UV 254/220 nm. This resulted in 760 mg (49%) of tert-butyl (2R)-2-[([[(1R)-2-phenyl-1-[(1S,2S,6R,8S)-2,9,9-trimethyl-3,5-dioxa-4-boratricyclo [6.1.1.0^[2,6]]decan-4-yl]ethyl]carbamoyl]amino)methyl] pyrrolidine-1-carboxylate as a yellow solid.

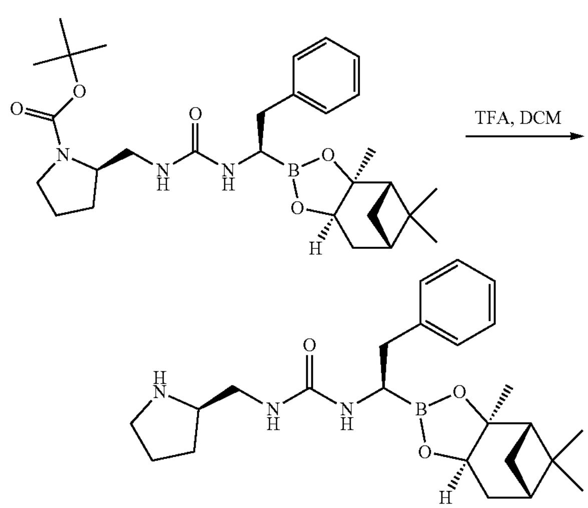

Into a 100-mL round-bottom flask, was placed tert-butyl (2R)-2-[([[(1R)-2-phenyl-1-[(1S,2S,6R,8S)-2,9,9-trimethyl-3,5-dioxa-4-boratricyclo[6.1.1.0^[2,6]]decan-4-yl]ethyl]carbamoyl]amino)methyl]pyrrolidine-1-carboxylate (780 mg, 1.48 mmol, 1.00 eq.), dichloromethane (20 mL), trifluoroacetic acid (10 mL). The resulting solution was stirred for 30 min at 25° C. The resulting mixture was concentrated under vacuum and the crude product was used directly to the

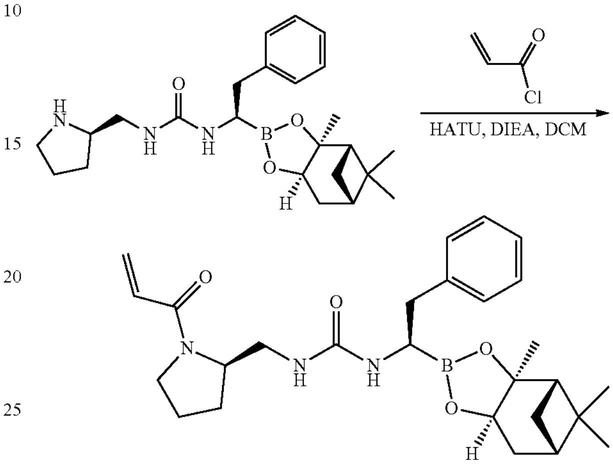

Into a 50-mL 3-necked round-bottom flask purged and maintained with an inert atmosphere of nitrogen, was placed 1-[(1R)-2-phenyl-1-[(1S,2S,6R,8S)-2,9,9-trimethyl-3,5-dioxa-4-boratricyclo[6.1.1.0^[2,6]]decan-4-yl]ethyl]-3-[(2R)-pyrrolidin-2-ylmethyl]urea (242.9 mg, 0.57 mmol, 1.00 eq.), TEA (173.1 mg, 1.71 mmol, 3.00 eq.), dichloromethane (8 mL). This was followed by the addition of prop-2-enoyl chloride (62.1 mg, 0.69 mmol, 1.20 eq.) dropwise with stirring at 0° C. The resulting solution was stirred for 2 h at 25° C. The resulting mixture was concentrated under vacuum. The crude product was purified by prep-HPLC with the following conditions (HPLC-SHIMADZU): Column, XBridge Prep C18 OBD Column, 19×150 mm, 5 um; mobile phase, Water (10 mmol/L $NH_4HCO_3$+0.1% $NH_3.H_2O$) and ACN (50.0% ACN up to 53.0% in 7 min); Detector, UV 254/220 nm. This resulted in 60 mg (22%) of 1-[(1R)-2-phenyl-1-[(1S,2S,6R,8S)-2,9,9-trimethyl-3,5-dioxa-4-boratricyclo[6.1.1.0^[2,6]]decan-4-yl]ethyl]-3-[[(2R)-1-(prop-2-enoyl)pyrrolidin-2-yl]methyl]urea as a white solid after the lyophilization.

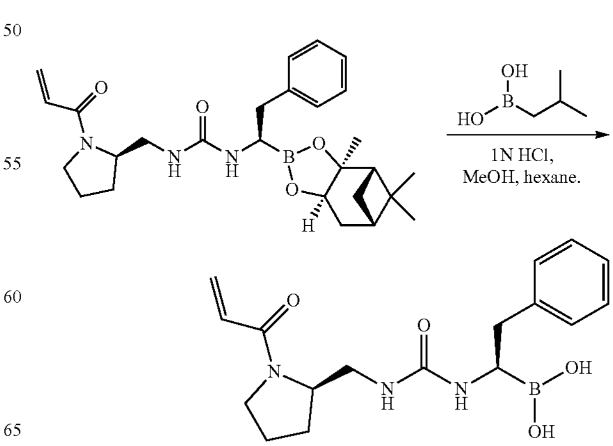

Into a 100-mL round-bottom flask, was placed 1-[(1R)-2-phenyl-1-[(1S,2S,6R,8S)-2,9,9-trimethyl-3,5-dioxa-4-boratricyclo[6.1.1.0^[2,6]]decan-4-yl]ethyl]-3-[[(2R)-1-(prop-2-enoyl)pyrrolidin-2-yl]methyl]urea (60 mg, 0.13 mmol, 1.00 eq.), methanol (2.6 mL), hexane (2.6 mL), (2-methylpropyl)boronic acid (37.1 mg, 0.36 mmol, 2.90 eq.), and 1N HCl (2.5 mL, 20.00 eq.). The resulting solution was stirred for 2 h at 25° C. The resulting mixture was washed with hexane (3×10 mL). The methanol layer was diluted with $H_2O$ (100 mL), then dried over lyophylization to give a crude product which was purified by prep-HPLC with the following conditions (HPLC-SHIMADZU): Column, XBridge Prep C18 OBD Column, 19×150 mm, 5 um; mobile phase, Water (10 mmol/L $NH_4HCO_3$+0.1% $NH_3.H_2O$) and ACN (5.0% ACN up to 30.0% in 7 min); Detector, UV 254/220 nm. This resulted in 25 mg (58%) of ((R)-1-(3-(((R)-1-acryloylpyrrolidin-2-yl)methyl)ureido)-2-phenylethyl)boronic acid as a white solid after the lyophilization again. LC-MS m/z: 328 [M-17].

Example 37

((R)-1-(3-(((S)-1-acryloylpyrrolidin-2-yl)methyl) ureido)-2-phenylethyl)boronic Acid

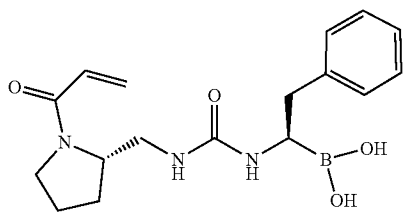

The title compound was prepared as in example 35 by replacing tert-butyl (2R)-2-(aminomethyl)pyrrolidine-1-carboxylate with tert-butyl (2S)-2-(aminomethyl)pyrrolidine-1-carboxylate. LC-MS m/z: 499 [M+1].

Example 38

((R)-1-(3-(((S)-1-acryloylpiperidin-2-yl)methyl) ureido)-2-phenylethyl)boronic Acid

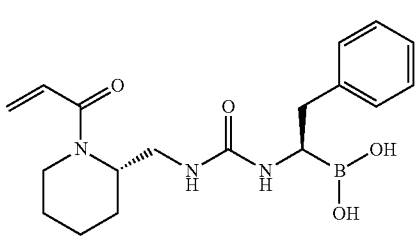

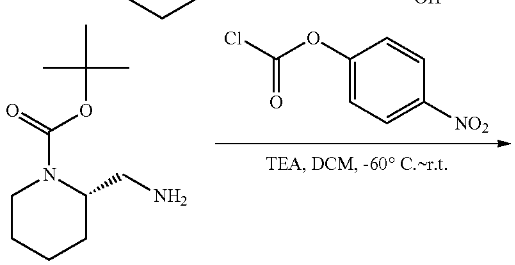

-continued

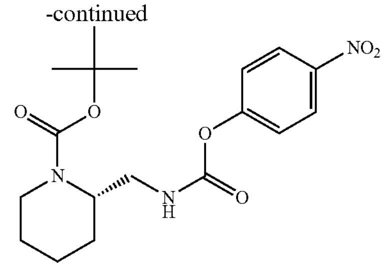

Into a 100-mL 3-necked round-bottom flask purged and maintained with an inert atmosphere of nitrogen, was placed tert-butyl (2S)-2-(aminomethyl)piperidine-1-carboxylate (500 mg, 2.33 mmol, 1.00 eq.) in dichloromethane (50 mL). TEA (472 mg, 4.66 mmol, 2.00 eq.) and 4-nitrophenyl chloroformate (939 mg, 4.66 mmol, 2.00 eq.) was added at -60° C. The reaction was warmed to rt and then stirred for 2 h at rt. The resulting solution was extracted with dichloromethane (3×50 mL). The organic layers combined and dried over anhydrous sodium sulfate and concentrated under vacuum. The residue was applied onto a silica gel column with ethyl acetate:petroleum ether (1:3). The crude product was purified by C18 column with water:ACN (20%-100% in 30 min). This resulted in 790 mg (89%) of tert-butyl (2S)-2-[[(4-nitrophenoxycarbonyl)amino]methyl]piperidine-1-carboxylate as yellow oil.

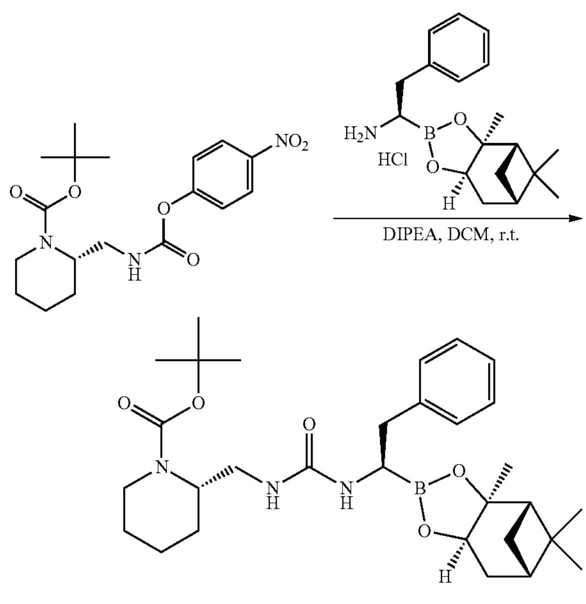

Into a 100-mL round-bottom flask, was placed tert-butyl (2S)-2-[[(4-nitrophenoxycarbonyl)amino]methyl]piperidine-1-carboxylate (1.5 g, 3.95 mmol, 1.00 eq.), (1R)-2-phenyl-1-[(1S,2S,6R,8S)-2,9,9-trimethyl-3,5-dioxa-4-boratricyclo[6.1.1.0^2,6]decan-4-yl]ethan-1-amine hydrochloride (1.33 g, 3.96 mmol, 1.00 eq.), DIEA (1.53 g, 11.84 mmol, 3.00 eq.), dichloromethane (50 mL). The resulting solution was stirred for 3 h at rt. The resulting solution was extracted with dichloromethane (3×100 mL), and the organic layers combined and concentrated under vacuum. The residue was purified by C18 column with water:ACN (20%-100% in 30 min). This resulted in 440 mg (21%) of tert-butyl (2S)-2-[([[(1R)-2-phenyl-1-[(1S,2S,6R,8S)-2,9,9-trimethyl-3,5-dioxa-4-boratricyclo[6.1.1.0^[2,6]]

decan-4-yl]ethyl]carbamoyl]amino)methyl]piperidine-1-carboxylate as a yellow solid.

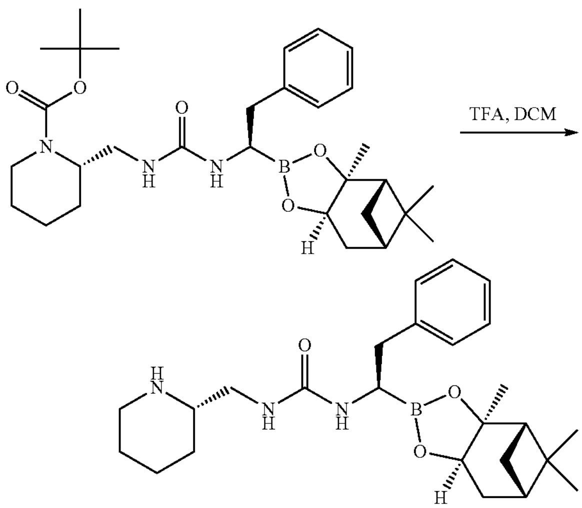

Into a 50-mL round-bottom flask, was placed tert-butyl (2S)-2-[([[(1R)-2-phenyl-1-[(1S,2S,6R,8S)-2,9,9-trimethyl-3,5-dioxa-4-boratricyclo[6.1.1.0^[2,6]]decan-4-yl]ethyl]carbamoyl]amino)methyl]piperidine-1-carboxylate (440 mg, 0.82 mmol, 1.00 eq.), trifluoroacetic acid (4 mL), dichloromethane (20 mL). The resulting solution was stirred for 3 h at rt. The resulting mixture was concentrated under vacuum. The residue was purified by C18 column with water:ACN (20%-100% in 30 min). This resulted in 320 mg (89%) of 1-[(1R)-2-phenyl-1-[(1S,2S,6R,8S)-2,9,9-trimethyl-3,5-dioxa-4-boratricyclo[6.1.1.0^[2,6]]decan-4-yl]ethyl]-3-[(2S)-piperidin-2-ylmethyl]urea as a yellow solid.

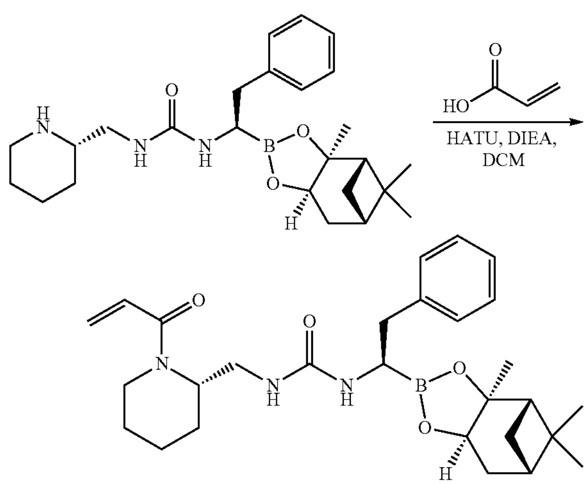

Into a 50-mL round-bottom flask, was placed 1-[(1R)-2-phenyl-1-[(1S,2S,6R,8S)-2,9,9-trimethyl-3,5-dioxa-4-boratricyclo[6.1.1.0^[2,6]]decan-4-yl]ethyl]-3-[(2S)-piperidin-2-ylmethyl]urea (160 mg, 0.36 mmol, 1.00 eq.), prop-2-enoic acid (39.4 mg, 0.55 mmol, 1.50 eq.), HATU (208 mg, 0.55 mmol, 1.50 eq.), DIEA (141 mg, 1.09 mmol, 3.00 eq.), dichloromethane (5 mL). The resulting solution was stirred for 3 h at rt. The resulting solution was extracted with dichloromethane (3×20 mL), and the organic layers combined and dried over anhydrous sodium sulfate and concentrated under vacuum. The crude product was purified by prep-HPLC with the following conditions (HPLC-SHIMADZU): Column, XBridge Prep C18 OBD Column, 19×150 mm, 5 um; mobile phase, Water (10 mmol/L $NH_4HCO_3$+0.1% $NH_3.H_2O$) and ACN (40.0% ACN up to 72.0% in 7 min); Detector, UV 254/220 nm. This resulted in 30 mg (17%) of 1-[(1R)-2-phenyl-1-[(1S,2S,6R,8S)-2,9,9-trimethyl-3,5-dioxa-4-boratricyclo[6.1.1.0^[2,6]]decan-4-yl]ethyl]-3-[[(2S)-1-(prop-2-enoyl)piperidin-2-yl]methyl]urea as a white solid after the lyophilization.

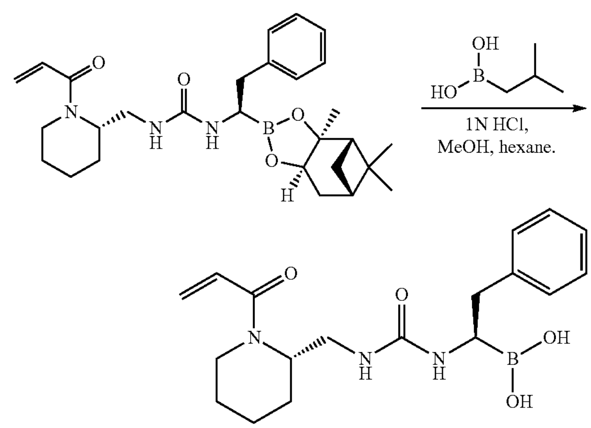

Into a 25-mL round-bottom flask, was placed 1-[(1R)-2-phenyl-1-[(1S,2S,6R,8S)-2,9,9-trimethyl-3,5-dioxa-4-boratricyclo[6.1.1.0^[2,6]]decan-4-yl]ethyl]-3-[[(2S)-1-(prop-2-enoyl)piperidin-2-yl]methyl]urea (30 mg, 0.06 mmol, 1.00 eq.), (2-methylpropyl)boronic acid (18.6 mg, 0.18 mmol, 3.00 eq.), hydrogen chloride(1N) (0.3 mL), methanol (1.5 mL), hexane (1.5 mL). The resulting solution was stirred for 3 h at rt. The hexane layer was discarded. The methanol layer was diluted with water (10 mL) and then dried over lyophylization to give a crude product. The crude product was purified by prep-HPLC with the following conditions (HPLC-SHIMADZU): Column, XBridge Prep C18 OBD Column, 19×150 mm, 5 um; mobile phase, Water (10 mmol/L $NH_4HCO_3$+0.1% $NH_3.H_2O$) and ACN (5.0% ACN up to 35.0% in 7 min); Detector, UV 254/220 nm. This resulted in 11.7 mg (54%) of ((R)-1-(3-(((S)-1-acryloylpiperidin-2-yl)methyl)ureido)-2-phenylethyl)boronic acid as a white solid after the lyophilization. LC-MS m/z: 360 [M+1].

Example 39

((R)-1-(3-(((S)-1-(2-cyano-4,4-dimethylpent-2-enoyl)pyrrolidin-2-yl)methyl)ureido)-2-phenylethyl) boronic Acid

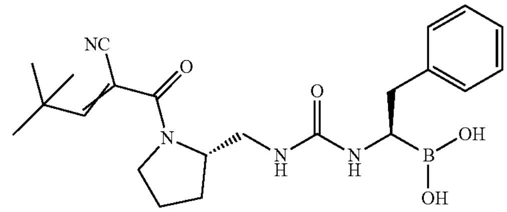

-continued

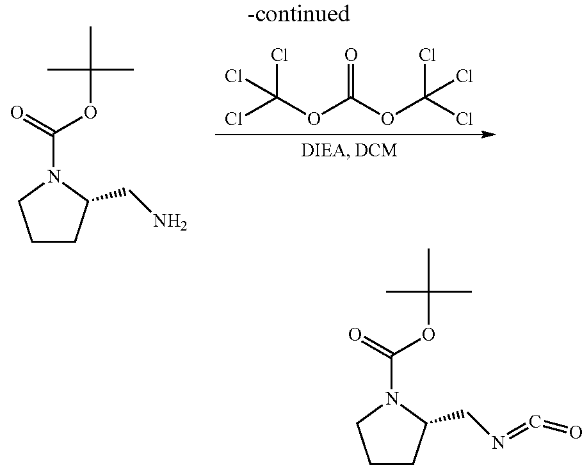

Into a 100-mL 3-necked round-bottom flask, was placed ditrichloromethyl carbonate (1 g, 3.37 mmol, 1.00 eq.), dichloromethane (30 mL), DIEA (1.289 g, 9.97 mmol, 2.00 eq.). This was followed by the addition of tert-butyl (2S)-2-(aminomethyl)pyrrolidine-1-carboxylate (2.94 g, 14.68 mmol, 2.00 eq.) at 0° C. The resulting solution was stirred for 4 h at rt. The resulting mixture was concentrated under vacuum. This resulted in 1.13 g (crude) of tert-butyl (2S)-2-(isocyanatomethyl)pyrrolidine-1-carboxylate as a yellow solid.

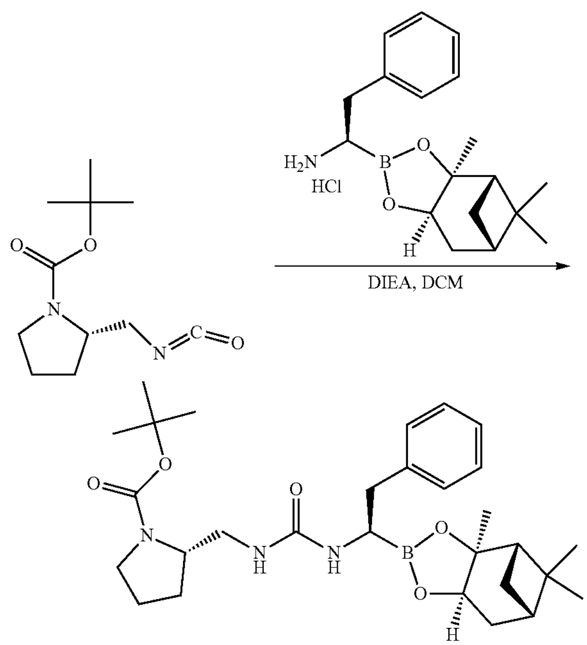

Into a 100-mL 3-necked round-bottom flask, was placed (1R)-2-phenyl-1-[(1S,2S,6R,8S)-2,9,9-trimethyl-3,5-dioxa-4-boratricyclo[6.1.1.0^{2,6}]decan-4-yl]ethan-1-amine hydrochloride (1.507 g, 4.49 mmol, 0.90 eq.), dichloromethane (20 mL), DIEA (1.16 g, 8.98 mmol, 1.80 eq.). This was followed by the addition of tert-butyl (2S)-2-(isocyanatomethyl)pyrrolidine -1-carboxylate (1.13 g, 4.99 mmol, 1.00 eq.) at 0° C. The resulting solution was stirred for 1 h at 25 degrees C. The reaction was then quenched by the addition of brine (50 mL). The resulting solution was extracted with dichloromethane (3×50 mL), and the organic layers combined and concentrated under vacuum. The residue was applied onto reverse phase C18 column with $H_2O$:$CH_3CN$ (20%-100% in 30 min). This resulted in 1.8 g (69%) of tert-butyl (2S)-2-[([[(1R)-2-phenyl-1-[(1S,2S,6R,8S)-2,9,9-trimethyl-3,5-dioxa -4-boratricyclo[6.1.1.0^[2,6]]decan-4-yl]ethyl]carbamoyl]amino)methyl]pyrrolidine-1-carboxylate as a yellow solid.

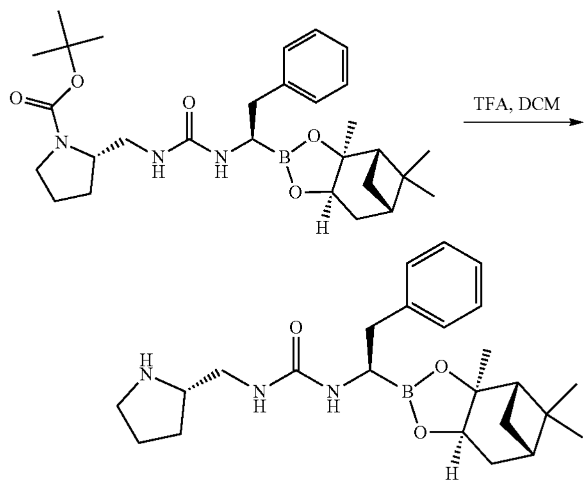

Into a 100-mL round-bottom flask, was placed tert-butyl (2S)-2-[([[(1R)-2-phenyl-1-[(1S,2S,6R,8S)-2,9,9-trimethyl-3,5-dioxa-4-boratricyclo[6.1.1.0^[2,6]]decan-4-yl]ethyl]carbamoyl]amino)methyl]pyrrolidine-1-carboxylate (1.0 g, 1.90 mmol, 1.00 eq.), dichloromethane (22 mL), trifluoroacetic acid (8.3 mL). The resulting solution was stirred for 1 h at 25° C. The resulting mixture was concentrated under vacuum. This resulted in 0.8 g (crude) of 1-[(1R)-2-phenyl-1-[(1S,2S,6R,8S)-2,9,9-trimethyl-3,5-dioxa-4-boratricyclo [6.1.1.0^[2,6]]decan -4-yl]ethyl]-3-[(2S)-pyrrolidin-2-ylmethyl]urea as a yellow solid.

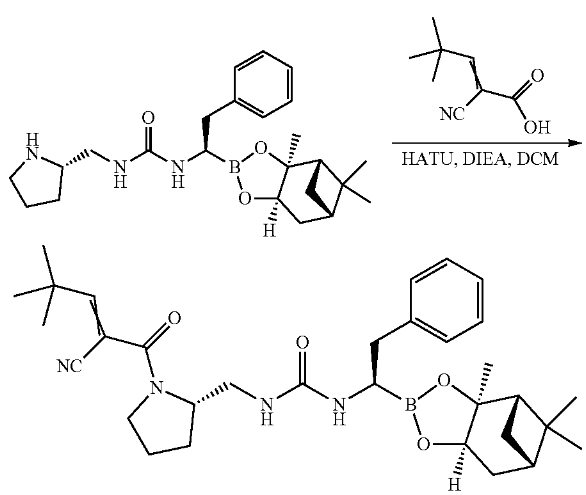

Into a 100-mL 3-necked round-bottom flask, was placed 1-[(1R)-2-phenyl-1-[(1S,2S,6R,8S)-2,9,9-trimethyl-3,5-dioxa-4-boratricyclo[6.1.1.0^[2,6]]decan-4-yl]ethyl]-3-[(2S)-pyrrolidin-2-ylmethyl]urea (400 mg, 0.94 mmol, 1.00 eq.), dichloromethane (10 mL), DIEA (303 mg, 2.34 mmol, 2.49 eq.), 2-cyano-4,4-dimethylpent-2-enoic acid (172 mg, 1.12 mmol, 1.19 eq.), HATU (429 mg, 1.13 mmol, 1.20 eq.). The resulting solution was stirred for 1-2 h at rt. The reaction was then quenched by the addition of brine (100 mL). The resulting solution was extracted with of dichloromethane (3×50 mL) and the organic layers combined and was dried over anhydrous sodium sulfate and concentrated under vacuum. The crude product was purified by prep-HPLC with the following conditions (2 #-AnalyseHPLC-SHIMADZU (HPLC-10)): Column, XBridge Prep C18 OBD Column, 19×150 mm 5 um; mobile phase, Water (10 mmol/L $NH_4HCO_3$+0.1% $NH_3.H_2O$) and ACN (70.0% ACN up to 72.0% in 7 min); Detector, UV 254/220 nm. After lyophilization, this resulted in 0.13 g (25%) of 3-[[(2S)-1-[2-cyano-2-(2,2-dimethylpropylidene)acetyl]pyrrolidin-2-yl]methyl]-1-[(1R)-2-phenyl-1-[(1S,2S,6R,8S)-2,9,9-trimethyl-3,5-dioxa-4-boratricyclo[6.1.1.0^[2,6]]decan-4-yl]ethyl]urea as a white solid.

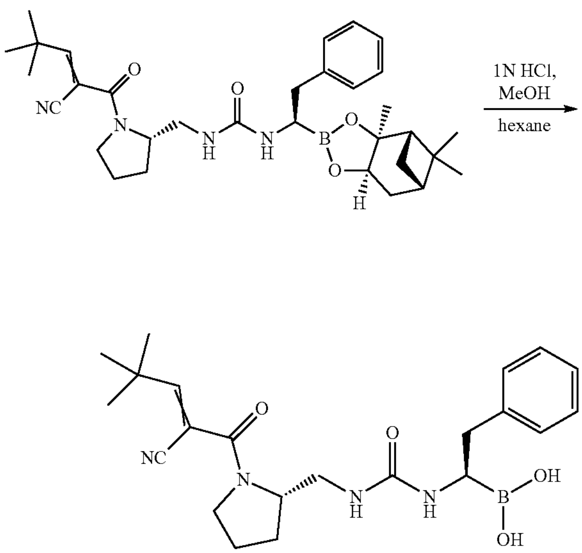

Into a 100-mL round-bottom flask, was placed 3-[[(2S)-1-[2-cyano-2-(2,2-dimethylpropylidene) acetyl]pyrrolidin-2-yl]methyl]-1-[(1R)-2-phenyl-1-[(1S,2S,6R,8S)-2,9,9-trimethyl-3,5-dioxa-4-boratricyclo[6.1.1.0^[2,6]]decan-4-yl]ethyl]urea (150 mg, 0.27 mmol, 1.00 eq.), methanol (10 mL), (2-methylpropyl)boronic acid (82.6 mg, 0.81 mmol, 3.00 eq.), 1N hydrogen chloride (5.3 mL, 20.00 eq.), hexane (10 mL). The resulting solution was stirred for 4 h at rt. The hexane of the resulting solution was removed, then the rest of the solution was added water (10 mL) to lyophilize. After lyophilization, the crude product was purified by prep-HPLC with the following conditions (2 #-AnalyseHPLC-SHIMADZU(HPLC-10)): Column, XBridge Prep C18 OBD Column, 19×150 mm 5 um; mobile phase, Water (10 mmol/L $NH_4HCO_3$+0.1% $NH_3.H_2O$) and ACN (22.0% ACN up to 47.0% in 7 min); Detector, UV 254/220 nm. This resulted in 54.3 mg (48%) of ((R)-1-(3-(((S)-1-(2-cyano-4,4-dimethylpent-2-enoyl)pyrrolidin-2-yl)methyl)ureido)-2-phenylethyl)boronic acid as a white solid after the lyophilization. LC-MS m/z: 409 [M-17].

Example 40

((R)-1-(3-(((S)-1-(2-cyano-4,4-dimethylpent-2-enoyl)piperidin-2-yl)methyl)ureido)-2-phenylethyl) boronic Acid

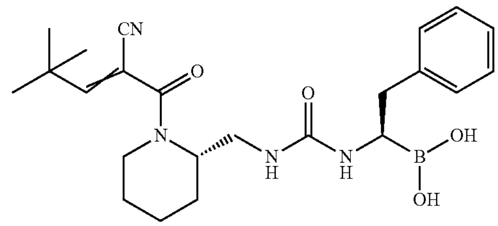

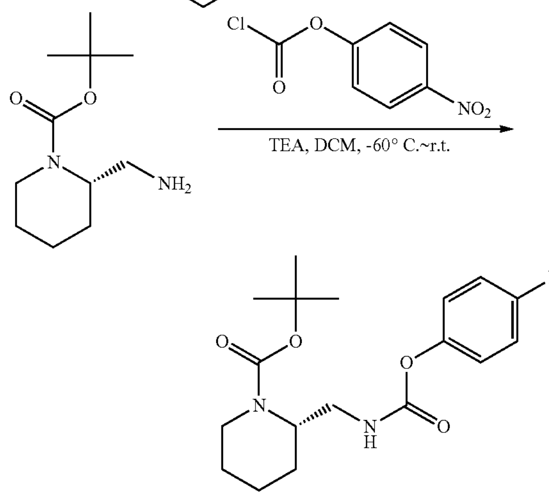

Into a 100-mL 3-necked round-bottom flask purged and maintained with an inert atmosphere of nitrogen, was placed tert-butyl (2S)-2-(aminomethyl)piperidine-1-carboxylate (500 mg, 2.33 mmol, 1.00 eq.) in dichloromethane (50 mL). TEA (472 mg, 4.66 mmol, 2.00 eq.) and 4-nitrophenyl chloroformate (939 mg, 4.66 mmol, 2.00 eq.) was added at -60° C. The reaction was warmed to rt and then stirred for 2 h at rt. The resulting solution was extracted with dichloromethane (3×50 mL), and the organic layers combined and dried over anhydrous sodium sulfate and concentrated under vacuum. The residue was applied onto a silica gel column with ethyl acetate:petroleum ether (1:3). The crude product was purified by C18 column with water:ACN (20%-100% in 30 min). This resulted in 790 mg (89%) of tert-butyl (2S)-2-[[(4-nitrophenoxycarbonyl)amino]methyl]piperidine-1-carboxylate as yellow oil.

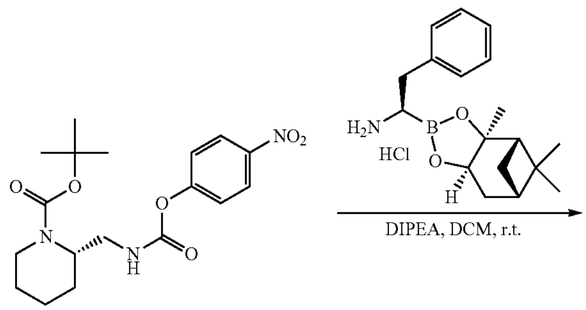

-continued

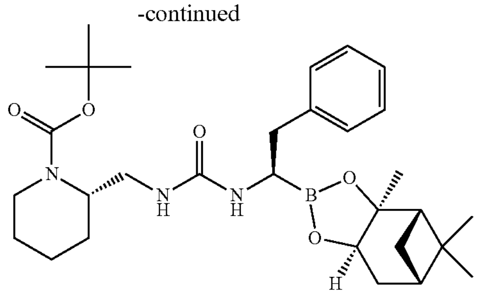

Into a 100-mL round-bottom flask, was placed tert-butyl (2S)-2-[[(4-nitrophenoxycarbonyl)amino]methyl]piperidine-1-carboxylate (1.5 g, 3.95 mmol, 1.00 eq.), (1R)-2-phenyl-1-[(1S,2S,6R,8S)-2,9,9-trimethyl-3,5-dioxa-4-boratricyclo[6.1.1.0^2,6]decan-4-yl]ethan-1-amine hydrochloride (1.33 g, 3.96 mmol, 1.00 eq.), DIEA (1.53 g, 11.84 mmol, 3.00 eq.), dichloromethane (50 mL). The resulting solution was stirred for 3 h at rt. The resulting solution was extracted with dichloromethane (3×100 mL), and the organic layers combined and concentrated under vacuum. The residue was purified by C18 column with water:ACN (20%-100% in 30 min). This resulted in 440 mg (21%) of tert-butyl (2S)-2-[([[(1R)-2-phenyl-1-[(1S,2S,6R,8S)-2,9,9-trimethyl-3,5-dioxa-4-boratricyclo[6.1.1.0^[2,6]]decan-4-yl]ethyl]carbamoyl]amino)methyl]piperidine-1-carboxylate as a yellow solid.

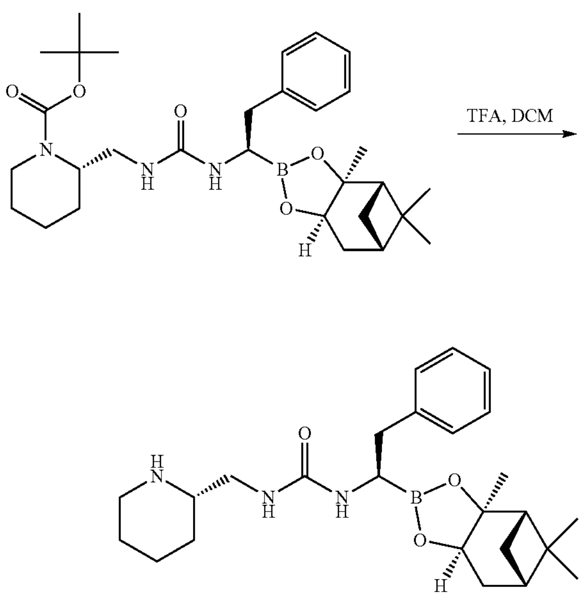

Into a 50-mL round-bottom flask, was placed tert-butyl (2S)-2-[([[(1R)-2-phenyl-1-[(1S,2S,6R,8S)-2,9,9-trimethyl-3,5-dioxa-4-boratricyclo[6.1.1.0^[2,6]]decan-4-yl]ethyl]carbamoyl]amino)methyl]piperidine-1-carboxylate (440 mg, 0.82 mmol, 1.00 eq.), trifluoroacetic acid (4 mL), dichloromethane (20 mL). The resulting solution was stirred for 3 h at rt. The resulting mixture was concentrated under vacuum. The residue was purified by C18 column with water:ACN (20%-100% in 30 min). This resulted in 320 mg (89%) of 1-[(1R)-2-phenyl-1-[(1S,2S,6R,8S)-2,9,9-trimethyl-3,5-dioxa-4-boratricyclo[6.1.1.0 [2,6]]decan-4-yl]ethyl]-3-[(2S)-piperidin-2-ylmethyl]urea as a yellow solid.

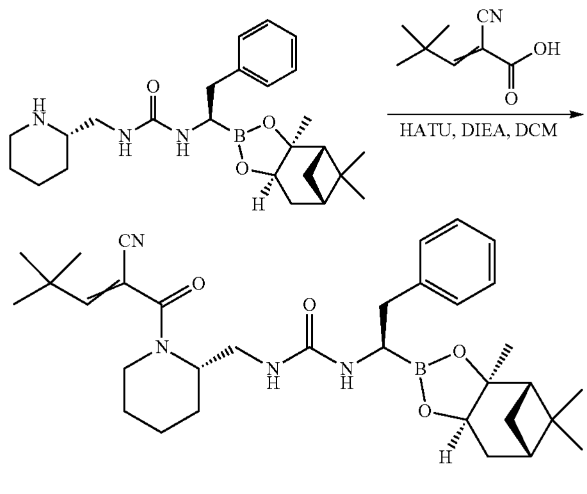

Into a 50-mL round-bottom flask, was placed 1-[(1R)-2-phenyl-1-[(1S,2S,6R,8S)-2,9,9-trimethyl-3,5-dioxa-4-boratricyclo[6.1.1.0^[2,6]]decan-4-yl]ethyl]-3-[(2S)-piperidin-2-ylmethyl]urea (150 mg, 0.34 mmol, 1.00 eq.), 2-cyano-4,4-dimethylpent-2-enoic acid (78.4 mg, 0.51 mmol, 1.50 eq.), HATU (195 mg, 0.51 mmol, 1.50 eq.), DIEA (132 mg, 1.02 mmol, 3.00 eq.), dichloromethane (5 mL). The resulting solution was stirred for 3 h at rt. The resulting solution was extracted with dichloromethane (3×20 mL), and the organic layers combined and dried over anhydrous sodium sulfate and concentrated under vacuum. The crude product was purified by prep-HPLC with the following conditions (HPLC-SHIMADZU): Column, XBridge Prep C18 OBD Column, 19×150 mm, 5 um; mobile phase, Water (10 mmol/L $NH_4HCO_3$+0.1% $NH_3.H_2O$) and ACN (67.0% ACN up to 77.0% in 7 min); Detector, UV 254/220 nm. This resulted in 40 mg (20%) of 3-[[(2S)-1-[2-cyano-2-(2,2-dimethylpropylidene)acetyl]piperidin-2-yl]methyl]-1-[(1R)-2-phenyl-1-[(1S,2S,6R,8S)-2,9,9-trimethyl-3,5-dioxa-4-boratricyclo[6.1.1.0^[2,6]]decan-4-yl]ethyl]urea as a white solid after the lyophilization.

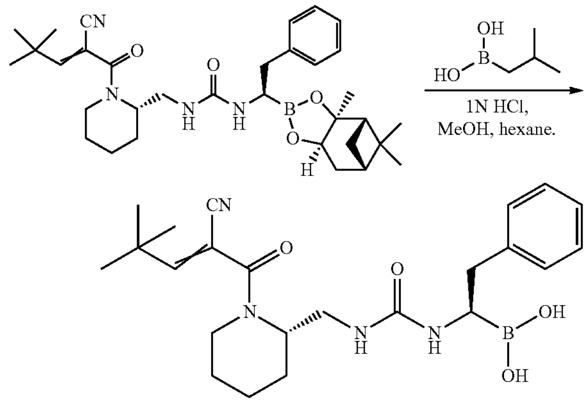

Into a 25-mL round-bottom flask, was placed 3-[[(2S)-1-[2-cyano-2-(2,2-dimethylpropylidene)acetyl]piperidin-2-yl]methyl]-1-[(1R)-2-phenyl-1-[(1S,2S,6R,8S)-2,9,9-trimethyl-3,5-dioxa-4-boratricyclo[6.1.1.0^[2,6]]decan-4-yl]ethyl]urea (40 mg, 0.07 mmol, 1.00 eq.), (2-methylpropyl)boronic acid (21.3 mg, 0.21 mmol, 3.00 eq.), hydrogen chloride(1N) (0.4 mL), methanol (2 mL), hexane (2 mL).

The resulting solution was stirred for 3 h at rt. The hexane layer was discarded. The methanol layer was diluted with water (10 mL) and then dried over lyophylization to give a crude product. The crude product was purified by prep-HPLC with the following conditions (HPLC-SHIMADZU): Column, XBridge Prep C18 OBD Column, 19×150 mm, 5 um; mobile phase, Water (10 mmol/L $NH_4HCO_3$+0.1% $NH_3.H_2O$) and ACN (25.0% ACN up to 45.0% in 7 min); Detector, UV 254/220 nm. This resulted in 20.6 mg (67%) of ((R)-1-(3-(((S)-1-(2-cyano-4,4-dimethylpent-2-enoyl)piperidin-2-yl)methyl)ureido)-2-phenylethyl)boronic acid as a white solid after the lyophilization. LC-MS m/z: 441 [M+1].

Example 41

((R)-1-(3-(((R)-1-acryloylpyrrolidin-2-yl)methyl)ureido)-2-(benzofuran-3-yl)ethyl)boronic Acid

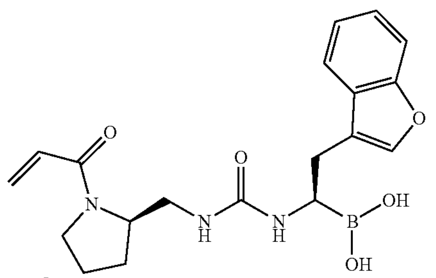

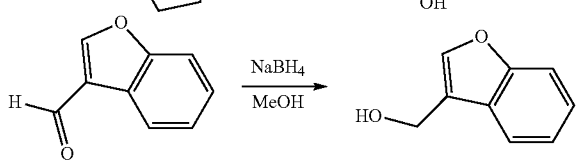

Into a 50-mL round-bottom flask, was placed 1-benzofuran-3-carbaldehyde (5 g, 34.21 mmol, 1.00 eq.), methanol (50 mL). This was followed by the addition of $NaBH_4$ (1.96 g, 51.81 mmol, 1.50 eq.) in several batches. The resulting solution was stirred for 1 h at rt. The resulting mixture was concentrated under vacuum. The resulting solution was diluted with DCM (100 mL). The resulting mixture was washed with $NH_4Cl$ (1×50 mL). The mixture was dried over anhydrous sodium sulfate and concentrated under vacuum. The residue was applied onto a silica gel column with PE:EA (60:40). This resulted in 4.8 g (95%) of 1-benzofuran-3-ylmethanol as a white solid.

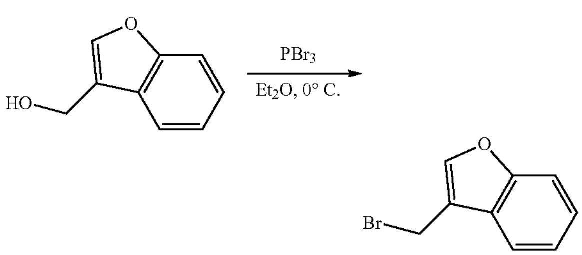

Into a 100-mL 3-necked round-bottom flask, was placed 1-benzofuran-3-ylmethanol (1 g, 6.75 mmol, 1.00 eq.), ether (10 mL). This was followed by the addition of $PBr_3$ (730 mg, 2.70 mmol, 0.40 eq.) dropwise with stirring at 0° C. The resulting solution was stirred for 30 min at 0° C. The reaction was then quenched by the addition of water:ice. The resulting solution was extracted with ether (3×50 mL), and the organic layers combined and dried over anhydrous sodium sulfate and concentrated under vacuum. This resulted in 1.3 g (crude) of 3-(bromomethyl)-1-benzofuran as colorless oil.

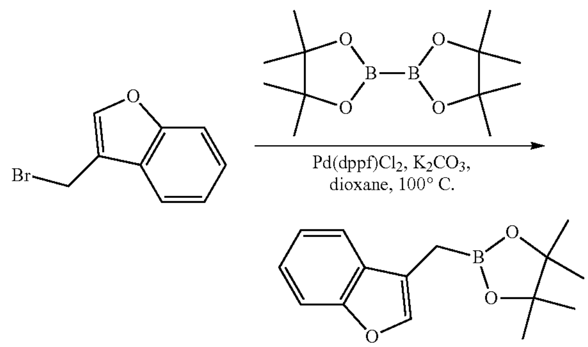

Into a 100-mL round-bottom flask, was placed 3-(bromomethyl)-1-benzofuran (1.3 g, 6.16 mmol, 1.00 eq.), 1,4-dioxane (13 mL), 4,4,5,5-tetramethyl-2-(tetramethyl-1,3,2-dioxaborolan-2-yl)-1,3,2-dioxaborolane (1.88 g, 7.40 mmol, 1.21 eq.), potassium carbonate (2.55 g, 18.48 mmol, 3.00 eq.), $Pd(dppf)Cl_2$ (450 mg, 0.62 mmol, 0.10 eq.). The resulting solution was stirred overnight at 100° C. The solids were filtered off. The resulting mixture was concentrated under vacuum. The residue was applied onto a silica gel column with PE:EA (100:0-97:3). This resulted in 490 mg (31%) of 2-(1-benzofuran-3-ylmethyl)-4,4,5,5-tetramethyl-1,3,2-dioxaborolane as light yellow oil.

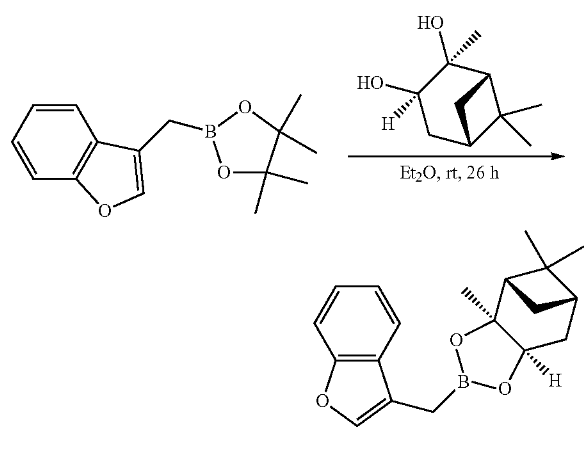

Into a 50-mL round-bottom flask, was placed a solution of 2-(1-benzofuran-3-ylmethyl)-4,4,5,5-tetramethyl-1,3,2-dioxaborolane (490 mg, 1.90 mmol, 1.00 eq.) in ether (5 mL), (1S,2S,3R,5S)-2,6,6-trimethylbicyclo[3.1.1]heptane-2,3-diol (420 mg, 2.47 mmol, 1.30 eq.). The resulting solution was stirred for overnight at rt. The resulting mixture was concentrated under vacuum. The residue was applied onto a silica gel column with ethyl acetate:petroleum ether (3:97). This resulted in 200 mg (34%) of (1S,2S,6R,8S)-4-(1-benzofuran-3-ylmethyl)-2,9,9-trimethyl-3,5-dioxa-4-boratricyclo[6.1.1.0^[2,6]]decane as yellow oil.

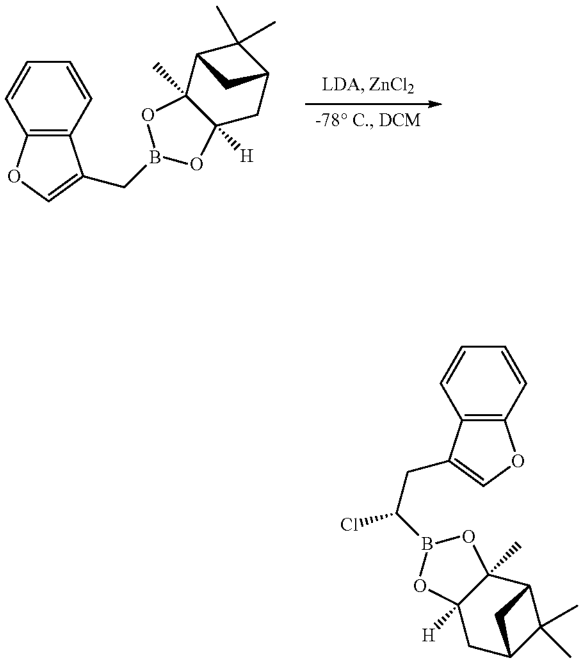

Into a 50-mL 3-necked round-bottom flask, was placed a solution of dichloromethane (617 mg, 7.26 mmol, 3.00 eq.) in tetrahydrofuran (4 mL). This was followed by the addition of LDA (1.6 mL, 1.30 eq.) dropwise with stirring at −78° C. The mixture was stirred for 20 min. at −78° C. To this was added a solution of (1S,2S,6R,8S)-4-(1-benzofuran-3-ylmethyl)-2,9,9-trimethyl-3,5-dioxa-4-boratricyclo[6.1.1.0^[2,6]]decane (750 mg, 2.42 mmol, 1.00 eq.) in tetrahydrofuran (2 mL) dropwise with stirring at −78° C. The mixture was stirred for 10 min at −78° C. To the mixture was added $ZnCl_2$ (5 mL, 1.00 eq., 0.5N) dropwise with stirring at −78° C. The final reaction mixture was stirred for 30 min at −78° C. The resulting solution was allowed to react, with stirring, for an additional 3 h at rt. The resulting mixture was concentrated under vacuum. The reaction was then quenched by the addition of $NH_4Cl$ 20 mL). The resulting solution was extracted with ether (3×20 mL), and the organic layers combined and dried over anhydrous sodium sulfate and concentrated under vacuum. The residue was applied onto a silica gel column with ethyl acetate:petroleum ether (3:97). This resulted in 600 mg (69%) of (1S,2S,6R,8S)-4-[(1S)-2-(1-benzofuran-3-yl)-1-chloroethyl]-2,9,9-trimethyl-3,5-dioxa-4-boratricyclo[6.1.1.0^[2,6]]decane as yellow oil.

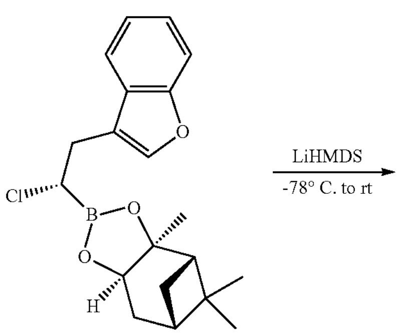

-continued

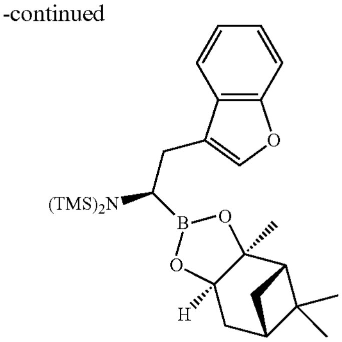

Into a 50-mL 3-necked round-bottom flask purged and maintained with an inert atmosphere of nitrogen, was placed (1S,2S,6R,8S)-4-[(1S)-2-(1-benzofuran-3-yl)-1-chloroethyl]-2,9,9-trimethyl-3,5-dioxa-4-boratricyclo[6.1.1.0^[2,6]]decane (600 mg, 1.67 mmol, 1.00 eq.), tetrahydrofuran (6 mL). This was followed by the addition of LiHMDS (2 mL, 1.20 eq.) dropwise with stirring at −78° C. The resulting solution was stirred for overnight at rt. The resulting mixture was concentrated under vacuum. The residue was dissolved in n-hexane (5 mL). The solids were filtered off. The resulting mixture was concentrated under vacuum. This resulted in 480 mg (59%) of [(1R)-2-(1-benzofuran-3-yl)-1-[(1S,2S,6R,8S)-2,9,9-trimethyl-3,5-dioxa-4-boratricyclo[6.1.1.0^[2,6]]decan-4-yl]ethyl]bis(trimethylsilyl)amine as yellow oil.

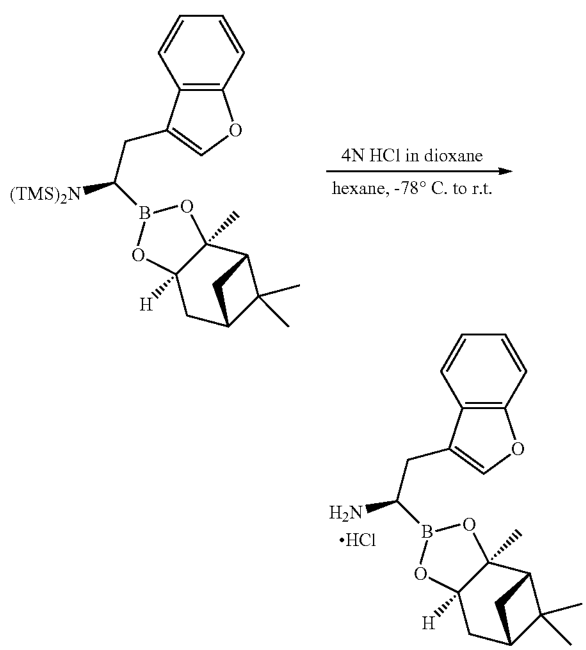

Into a 50-mL 3-necked round-bottom flask purged and maintained with an inert atmosphere of nitrogen, was placed a solution of [(1R)-2-(1-benzofuran-3-yl)-1-[(1S,2S,6R,8S)-2,9,9-trimethyl-3,5-dioxa-4-boratricyclo[6.1.1.0^[2,6]]decan-4-yl]ethyl]bis(trimethylsilyl)amine (480 mg, 0.99 mmol, 1.00 eq.) in n-hexane (10 mL). This was followed by the addition of 4N HCl in dioxane (0.85 mL, 3.00 eq.) at 0° C. The resulting solution was stirred for 2 h at rt. The solids were collected by filtration. This resulted in 230 mg (62%) of (1R)-2-(1-benzofuran-3-yl)-1-[(1S,2S,6R,8S)-2,9,9-trimethyl-3,5-dioxa-4-boratricyclo[6.1.1.0^[2,6]]decan-4-yl]ethan-1-amine hydrochloride as an off-white solid.

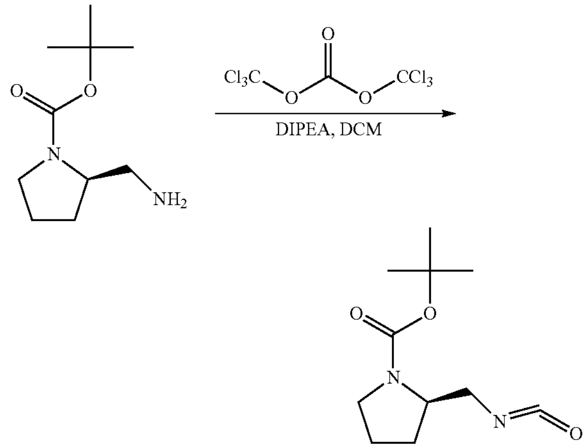

Into a 25-mL round-bottom flask, was placed tert-butyl (2R)-2-(aminomethyl)pyrrolidine-1-carboxylate (33 mg, 0.16 mmol, 1.00 eq.), dichloromethane (1 mL), DIEA (14 mg, 0.11 mmol, 2.00 eq.). This was followed by the addition of ditrichloromethyl carbonate (49 mg, 0.17 mmol, 1.00 eq.) at 0° C. The resulting solution was stirred for 3 h at rt. The resulting mixture was concentrated under vacuum. This resulted in 37 mg (crude) of tert-butyl (2R)-2-(isocyanatomethyl)pyrrolidine-1-carboxylate as yellow oil.

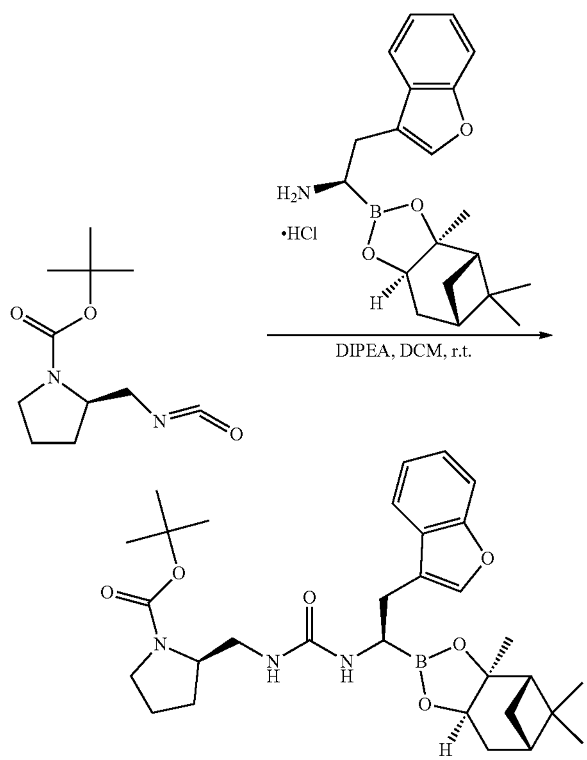

Into a 25-mL round-bottom flask, was placed tert-butyl (2R)-2-(isocyanatomethyl)pyrrolidine-1-carboxylate (37 mg, 0.16 mmol, 1.00 eq.), dichloromethane (1 mL), (1R)-2-(1-benzofuran-3-yl)-1-[(1S,2S,6R,8S)-2,9,9-trimethyl-3,5-dioxa-4-boratricyclo[6.1.1.0^2,6]decan-4-yl]ethan-1-amine hydrochloride (62 mg, 0.17 mmol, 1.00 eq.), DIEA (43 mg, 0.33 mmol, 2.00 eq.). The resulting solution was stirred for 2 h at rt. The reaction was then quenched by the addition of water (2 mL). The resulting solution was diluted with DCM (10 mL). The resulting mixture was washed with sodium chloride (1×5 mL). The mixture was dried over anhydrous sodium sulfate and concentrated under vacuum. This resulted in 93 mg (crude) of tert-butyl (2R)-2-[([[(1R)-2-(1-benzofuran-3-yl)-1-[(1S,2S,6R,8S)-2,9,9-trimethyl-3,5-dioxa-4-boratricyclo[6.1.1.0^[2,6]]decan-4-yl]ethyl]carbamoyl]amino)methyl]pyrrolidine-1-carboxylate as yellow oil.

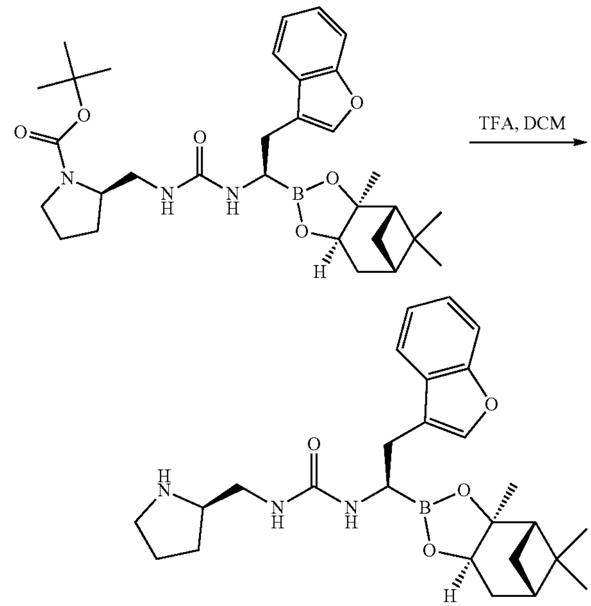

Into a 25-mL round-bottom flask, was placed tert-butyl (2R)-2-[([[(1R)-2-(1-benzofuran-3-yl)-1-[(1S,2S,6R,8S)-2,9,9-trimethyl-3,5-dioxa-4-boratricyclo[6.1.1.0^[2,6]]decan-4-yl]ethyl]carbamoyl]amino)methyl]pyrrolidine-1-carboxylate (93 mg, 0.16 mmol, 1.00 eq.), dichloromethane (2 mL), trifluoroacetic acid (0.5 mL). The resulting solution was stirred for 1 h at rt. The resulting mixture was concentrated under vacuum. This resulted in 77 mg (crude) of 1-[(1R)-2-(1-benzofuran-3-yl)-1-[(1S,2S,6R,8S)-2,9,9-trimethyl-3,5-dioxa-4-boratricyclo[6.1.1.0^[2,6]]decan-4-yl]ethyl]-3-[(2R)-pyrrolidin-2-ylmethyl]urea as brown oil.

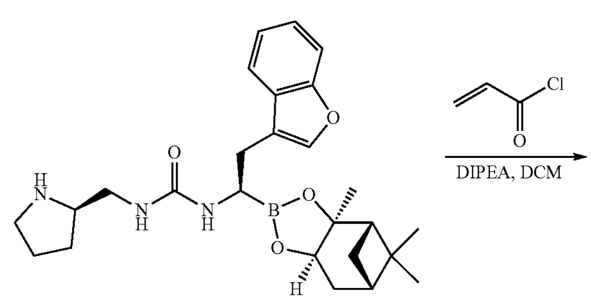

-continued

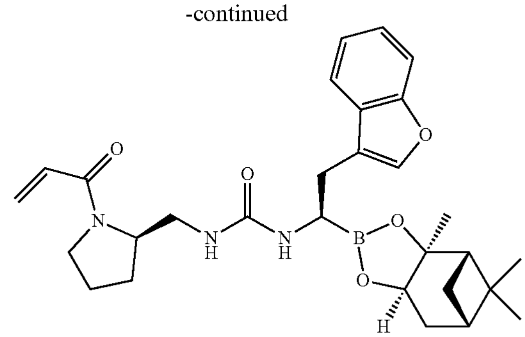

Into a 50-mL round-bottom flask, was placed a solution of 1-[(1R)-2-(1-benzofuran-3-yl)-1-[(1S,2S,6R,8S)-2,9,9-trimethyl-3,5-dioxa-4-boratricyclo[6.1.1.0^[2,6]]decan-4-yl]ethyl]-3-[(2R)-pyrrolidin-2-ylmethyl]urea (77 mg, 0.17 mmol, 1.00 eq.) in dichloromethane (1 mL), TEA (51 mg, 0.50 mmol, 3.00 eq.), prop-2-enoyl chloride (18 mg, 0.20 mmol, 1.20 eq.). The resulting solution was stirred for 1 h at rt. The reaction was then quenched by the addition of water (2 mL). The resulting solution was diluted with DCM (10 mL). The resulting mixture was washed with sodium chloride (1×10 mL). The mixture was dried over anhydrous sodium sulfate and concentrated under vacuum. The crude product was purified by prep-HPLC with the following conditions: Column, XBridge Prep C18 OBD Column, 19×150 mm, 5 um; mobile phase, Water (10 mmol/L $NH_4HCO_3$+0.1% $NH_3.H_2O$) and ACN (50.0% ACN up to 62.0% in 7 min); Detector, UV 254/220 nm. This resulted in 50 mg (58%) of 1-[(1R)-2-(1-benzofuran-3-yl)-1-[(1S,2S,6R,8S)-2,9,9-trimethyl-3,5-dioxa-4-boratricyclo[6.1.1.0^[2,6]]decan-4-yl]ethyl]-3-[[(2R)-1-(prop-2-enoyl)pyrrolidin-2-yl]methyl]urea as a white solid after the lyophilization.

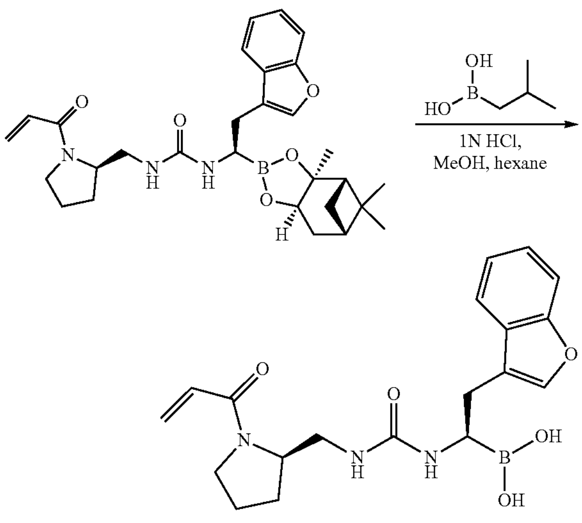

Into a 100-mL round-bottom flask, was placed a solution of 3-[(1R)-2-(1-benzofuran-3-yl)-1-[(1S,2S,6R,8S)-2,9,9-trimethyl-3,5-dioxa-4-boratricyclo[6.1.1.0^[2,6]]decan-4-yl]ethyl]-1-[[(2R)-1-(prop-2-enoyl)pyrrolidin-2-yl]methyl] urea (50 mg, 0.10 mmol, 1.00 eq.) in methanol:Hexane (1.5:1.5 mL), 1N HCl (1.9 mL, 20.00 eq.), (2-methylpropyl) boronic acid (30 mg, 0.29 mmol, 3.00 eq.). The resulting solution was stirred for 2 h at rt. The hexane layer was discarded. The methanol layer was diluted with water (20 mL), then dried over lyophilization to give a crude product. The crude product was purified by prep-HPLC with the following conditions: Column, XBridge Prep C18 OBD Column, 19×150 mm, 5 um; mobile phase, Water (10 mmol/L $NH_4HCO_3$+0.1% $NH_3.H_2O$) and ACN (5% ACN up to 53% in 7 min); Detector, UV 254/220 nm. This resulted in 22.0 mg (59%) of ((R)-1-(3-(((R)-1-acryloylpyrrolidin-2-yl)methyl)ureido)-2-(benzofuran-3-yl)ethyl)boronic acid as a white solid after the lyophilization. LC-MS m/z: 368 [M-17].

Example 42

((R)-1-(3-(((S)-1-(2-cyano-4,4-dimethylpent-2-enoyl)pyrrolidin-2-yl)methyl)ureido)-2-(p-tolyl) ethyl)boronic Acid

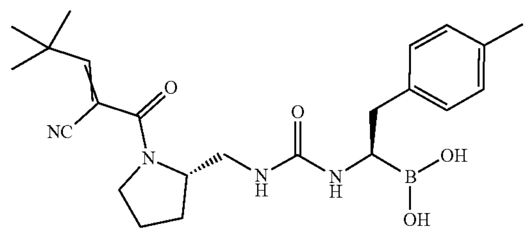 [SMILES: Cc1ccc(C[C@H](NC(=O)NC[C@@H]2CCCN2C(=O)C(C#N)=CC(C)(C)C)B(O)O)cc1]

The title compound was prepared as in example 38 by replacing (1R)-2-phenyl-1-[(1S,2S,6R,8S)-2,9,9-trimethyl-3,5-dioxa-4-boratricyclo[6.1.1.0^{2,6}]decan-4-yl]ethan-1-amine hydrochloride with tert-butyl (2S)-2-[([[(1R)-2-(4-methylphenyl)-1-[(1S,2S,6R,8S)-2,9,9-trimethyl-3,5-dioxa-4-boratricyclo[6.1.1.0^[2,6]]decan-4-yl]ethyl]carbamoyl] amino)methyl]pyrrolidine-1-carboxylate. LC-MS m/z: 423 [M-17].

Example 43

((R)-1-(3-(((R)-1-(2-cyano-4,4-dimethylpent-2-enoyl)pyrrolidin-2-yl)methyl)ureido)-2-(p-tolyl) ethyl)boronic Acid

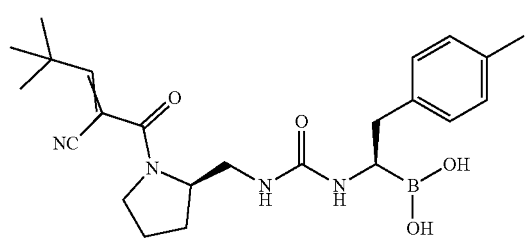 [SMILES: Cc1ccc(C[C@H](NC(=O)NC[C@H]2CCCN2C(=O)C(C#N)=CC(C)(C)C)B(O)O)cc1]

The title compound was prepared as in example 41 by replacing tert-butyl (2S)-2-(aminomethyl)pyrrolidine-1-carboxylate with tert-butyl (2R)-2-(aminomethyl)pyrrolidine-1-carboxylate. LC-MS m/z: 423 [M-17].

Example 44

((R)-1-(((((S)-1-(2-cyano-4,4-dimethylpent-2-enoyl)piperidin-3-yl)methoxy)carbonyl)amino)-2-(p-tolyl)ethyl)boronic Acid

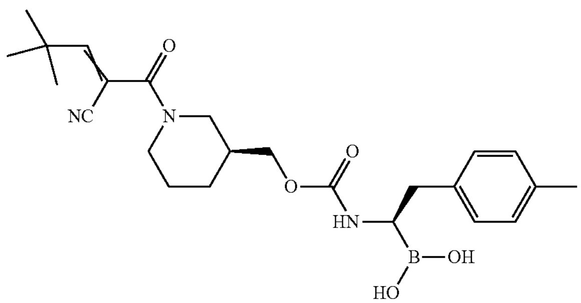

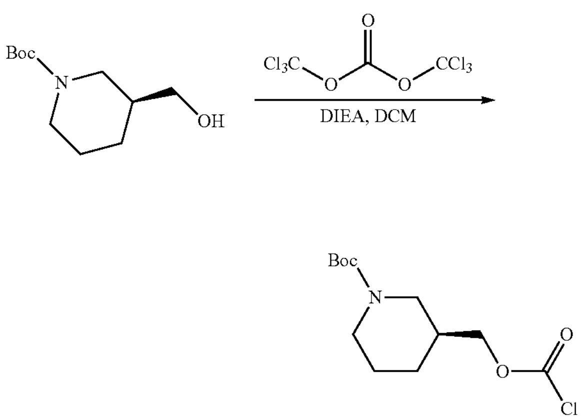

Into a 50-mL 3-necked round-bottom flask, was placed tert-butyl (3S)-3-(hydroxymethyl) piperidine -1-carboxylate (500 mg, 2.32 mmol, 1.00 eq.), dichloromethane (4 mL), DIEA (896 mg, 6.93 mmol, 3.00 eq.). This was followed by the addition of ditrichloromethyl carbonate (341 mg, 1.15 mmol, 0.50 eq.) at 0° C. The resulting solution was stirred for 2 h at rt. The resulting mixture was concentrated under vacuum. This resulted in 645 mg (crude) of tert-butyl (3S)-3-[[(chlorocarbonyl)oxy]methyl]piperidine-1-carboxylate as a yellow oil.

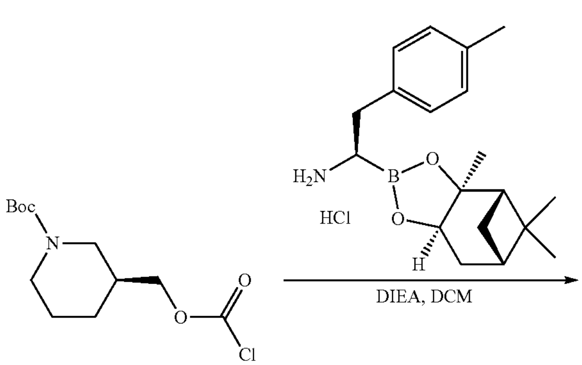

-continued

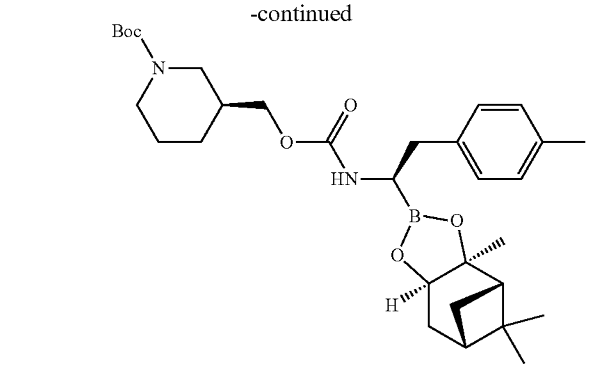

Into a 50-mL 3-necked round-bottom flask, was placed (1R)-2-(4-methylphenyl)-1-[(1S,2S,6R,8S)-2,9,9-trimethyl-3,5-dioxa-4-boratricyclo[6.1.1.0^[2,6]]decan-4-yl]ethan-1-amine hydrochloride (690 mg, 1.97 mmol, 0.85 eq.), dichloromethane (3 mL), DIEA (537 mg, 4.16 mmol, 1.80 eq.). This was followed by the addition of tert-butyl (3S)-3-[[(chlorocarbonyl)oxy]methyl]piperidine-1-carboxylate (645 mg, 2.32 mmol, 1.00 eq.) at 0° C. The resulting solution was stirred for 1 h at rt. The resulting solution was diluted with DCM (100 mL). The resulting mixture was washed with sat. brine (3×100 mL) The resulting organic layers combined and dried over anhydrous sodium sulfate. The resulting mixture was concentrated under vacuum. The crude product was purified by flash-prep-HPLC with the following conditions: Column, C18 silica gel; mobile phase, $H_2O$:$CH_3CN$ (99:1) increasing to $H_2O$:$CH_3CN$ (1:99); Detector, UV 220 nm. This resulted in 740 mg (57%) of tert-butyl (3S)-3-[([[(1R)-2-(4-methylphenyl)-1-[(1S,2S,6R,8S)-2,9,9-trimethyl-3,5-dioxa-4-boratricyclo [6.1.1.0^[2,6]]decan-4-yl]ethyl]carbamoyl]oxy)methyl]piperidine-1-carboxylate as yellow oil.

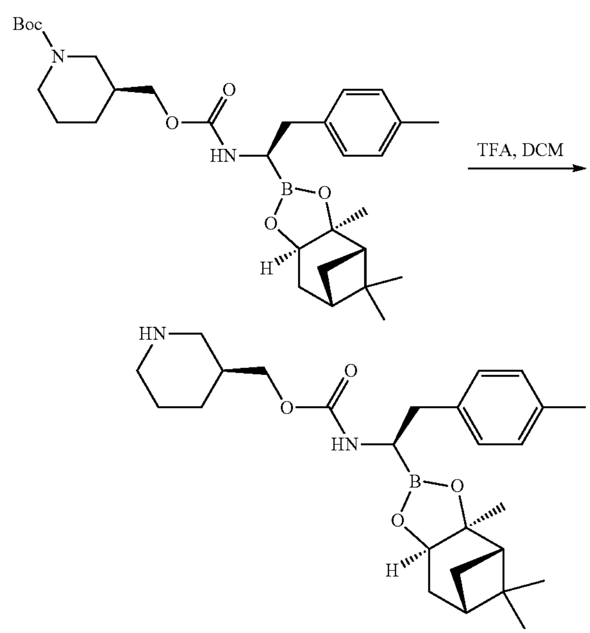

Into a 50-mL round-bottom flask, was placed tert-butyl (3S)-3-[([[(1R)-2-(4-methylphenyl)-1-[(1S,2S,6R,8S)-2,9,9-trimethyl-3,5-dioxa-4-boratricyclo[6.1.1.0^[2,6]]decan-4-yl]ethyl]carbamoyl]oxy)methyl]piperidine-1-carboxylate (400 mg, 0.72 mmol, 1.00 eq.), dichloromethane (10 mL), trifluoroacetic acid (2.5 mL). The resulting solution was stirred for 1 h at rt. The resulting mixture was concentrated under vacuum. This resulted in 328 mg (crude) of (3S)-piperidin-3-ylmethyl N-[(1R)-2-(4-methylphenyl)-1-[(1S,2S,6R,8S)-2,9,9-trimethyl-3,5-dioxa-4-boratricyclo[6.1.1.0^[2,6]]decan-4-yl]ethyl]carbamate as yellow oil.

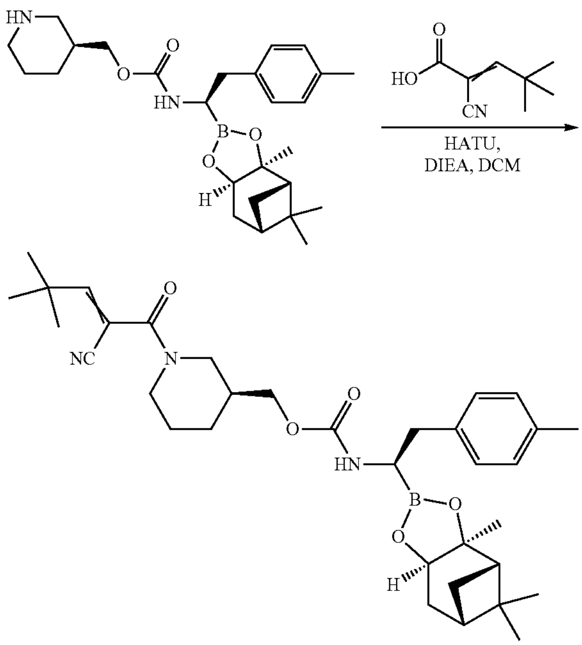

Into a 50-mL round-bottom flask, was placed (3S)-piperidin-3-ylmethyl N-[(1R)-2-(4-methylphenyl)-1-[(1S,2S,6R,8S)-2,9,9-trimethyl-3,5-dioxa-4-boratricyclo[6.1.1.0^[2,6]]decan-4-yl]ethyl]carbamate (328 mg, 0.72 mmol, 1.00 eq.), dichloromethane (8 mL), 2-cyano-4,4-dimethylpent-2-enoic acid (165 mg, 1.08 mmol, 1.50 eq.), DIEA (278 mg, 2.15 mmol, 3.00 eq.), HATU (821 mg, 2.16 mmol, 3.00 eq.). The resulting solution was stirred for 2 h at rt. The resulting solution was diluted with 100 mL of DCM. The resulting mixture was washed with sat. brine (3×100 mL). The resulting organic layers combined and concentrated under vacuum. The crude product was purified by prep-HPLC with the following conditions: Column, XBridge Prep C18 OBD Column, 19×150 mm, 5 um; mobile phase, Water (10 mmol/L $NH_4HCO_3$+0.1% $NH_3.H_2O$) and ACN (74.0% ACN up to 77.0% in 10 min); Detector, UV 254/220 nm. This resulted in 290 mg (68%) of [(3S)-1-[2-cyano -2-(2,2-dimethylpropylidene)acetyl]piperidin-3-yl]methyl N-[(1R)-2-(4-methylphenyl)-1-[(1S,2S,6R,8S)-2,9,9-trimethyl-3,5-dioxa-4-boratricyclo[6.1.1.0^[2,6]]decan-4-yl]ethyl]carbamate as a white solid after the lyophilization.

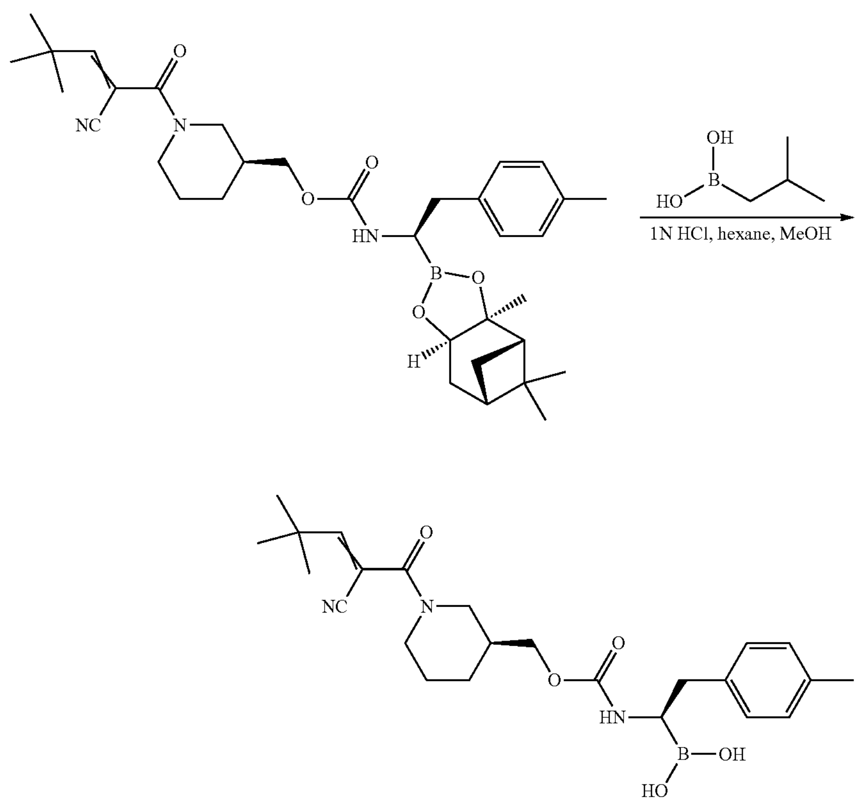

Into a 100-mL 3-necked round-bottom flask, was placed [(3S)-1-[2-cyano-2-(2,2-dimethylpropylidene)acetyl]piperidin-3-yl]methyl N-[(1R)-2-(4-methylphenyl)-1-[(1S,2S,6R,8S)-2,9,9-trimethyl-3,5-dioxa-4-boratricyclo[6.1.1.0^[2,6]]decan-4-yl]ethyl]carbamate (170 mg, 0.29 mmol, 1.00 eq.), methanol (12 mL), (2-methylpropyl)boronic acid (88.98 mg, 0.87 mmol, 3.00 eq.), hexane (12 mL), 1N hydrogen chloride (5.7 mL, 20.00 eq.). The resulting solution was stirred for 4 h at rt. The resulting mixture was washed with hexane (3×5 mL). The methanol layer was diluted with water (5 mL), and dried over lyophylization to give a crude product which was further purified by prep-HPLC with the following conditions: Column, XBridge Prep C18 OBD Column, 19×150 mm, 5 um; mobile phase, Water (10 mmol/L $NH_4HCO_3$+0.1% $NH_3.H_2O$) and ACN (40.0% ACN up to 53.0% in 7 min); Detector, UV 254/220 nm. This resulted in 36.1 mg (27%) of ((R)-1-(((((S)-1-(2-cyano-4,4-dimethylpent-2-enoyl)piperidin-3-yl)methoxy)carbonyl)amino)-2-(p-tolyl)ethyl)boronic acid as a white solid after the lyophilization. LC-MS m/z: 438 [M-17].

Example 45

((R)-2-(benzofuran-3-yl)-1-(3-(((R)-1-(2-cyano-4,4-dimethylpent-2-enoyl)pyrrolidin-2-yl)methyl)ureido)ethyl)boronic Acid

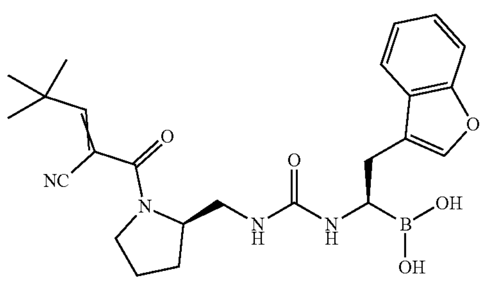 [SMILES: CC(C)(C)C=C(C#N)C(=O)N1CCC[C@@H]1CNC(=O)N[C@@H](Cc1coc2ccccc12)B(O)O]

The title compound was prepared as in example 42 by replacing tert-butyl (2S)-2-[([[(1R)-2-(4-methylphenyl)-1-[(1S,2S,6R,8S)-2,9,9-trimethyl-3,5-dioxa-4-boratricyclo [6.1.1.0^[2,6]]decan-4-yl]ethyl]carbamoyl]amino)methyl] pyrrolidine-1-carboxylate with (1R)-2-(1-benzofuran-3-yl)-1-[(1S,2S,6R,8S)-2,9,9-trimethyl-3,5-dioxa-4-boratricyclo [6.1.1.0^2,6]decan-4-yl]ethan-1-amine hydrochloride. LC-MS m/z: 449 [M-17].

Example 46

((R)-1-(((((S)-1-(2-cyano-4,4-dimethylpent-2-enoyl) pyrrolidin-3-yl)methoxy)carbonyl)amino)-2-(p-tolyl) ethyl)boronic Acid

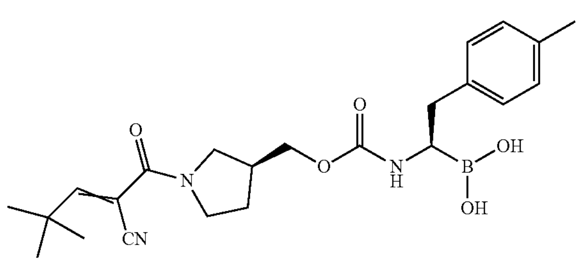

-continued

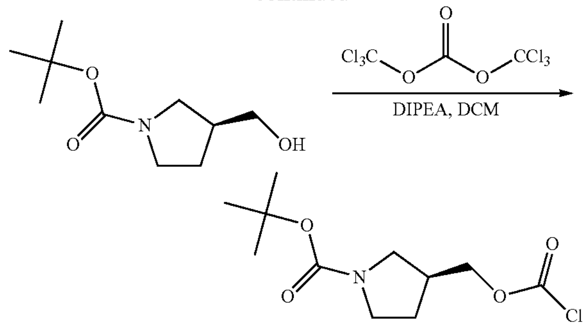

Into a 50-mL 3-necked round-bottom flask purged and maintained with an inert atmosphere of nitrogen, it was placed tert-butyl (3S)-3-(hydroxymethyl)pyrrolidine-1-carboxylate (200 mg, 0.99 mmol, 1.00 eq.), dichloromethane (8 mL), ditrichloromethyl carbonate (150 mg, 0.51 mmol, 0.50 eq.), DIEA (390 mg, 3.02 mmol, 3.00 eq.). The resulting solution was stirred for 2.5 h at 0° C. The resulting solution was used directly to next step.

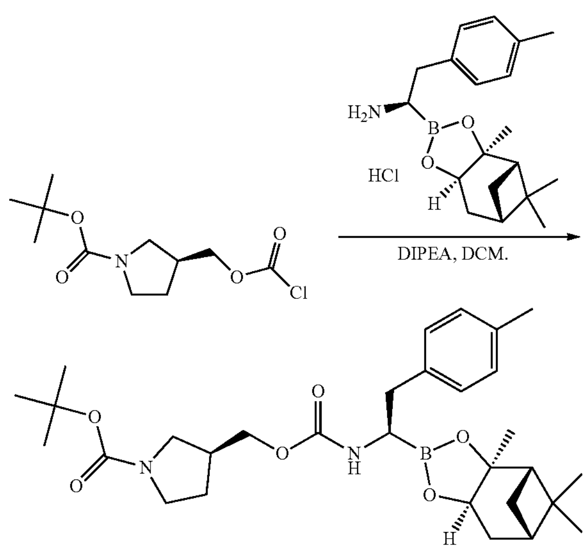

Into a 50-mL 3-necked round-bottom flask purged and maintained with an inert atmosphere of nitrogen, it was placed tert-butyl (3S)-3-[[(chlorocarbonyl)oxy]methyl]pyrrolidine-1-carboxylate (250 mg, 0.95 mmol, 1.00 eq.), DCM (8 mL), (1R)-2-(4-methylphenyl)-1-[(1S,2S,6R,8S)-2,9,9-trimethyl-3,5-dioxa-4-boratricyclo[6.1.1.0^[2,6]]decan-4-yl]ethan-1-amine hydrochloride (280 mg, 0.80 mmol, 0.85 eq.), DIPEA (116 mg, 2.00 eq.). The resulting solution was stirred for 1 h at rt. The reaction was then quenched by the addition of 10 mL of water. The resulting solution was extracted with dichloromethane (3×10 mL), and the organic layers combined and dried over anhydrous sodium sulfate and concentrated under vacuum. The crude product was purified by flash-prep-HPLC with the following conditions: Column, C18; mobile phase, $CH_3CN:H_2O$ (1:99) increasing to $CH_3CN:H_2O$ (99:1) within 100 min; Detector, UV 254 nm. This resulted in 350 mg (68%) of tert-butyl (3S)-3-[([[(1R)-2-(4-methylphenyl)-1-[(1S,2S,6R,8S)-2,9,9-trimethyl-3,5-dioxa-4-boratricyclo[6.1.1.0^[2,6]]decan-4-yl] ethyl]carbamoyl]oxy)methyl]pyrrolidine-1-carboxylate as yellow oil.

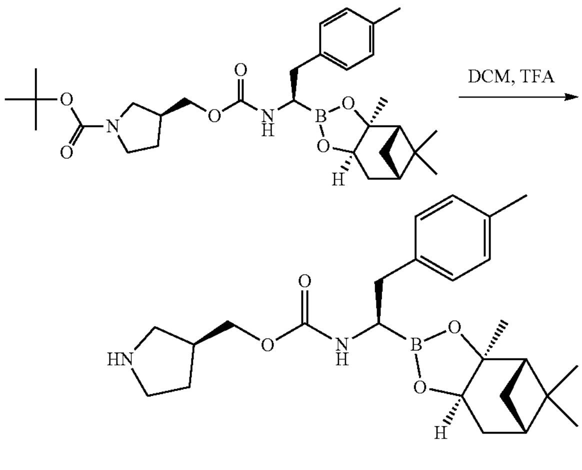

Into a 50-mL round-bottom flask purged and maintained with an inert atmosphere of nitrogen, it was placed tert-butyl (3S)-3-[([[(1R)-2-(4-methylphenyl)-1-[(1S,2S,6R,8S)-2,9,9-trimethyl-3,5-dioxa-4-boratricyclo[6.1.1.0^[2,6]]decan-4-yl]ethyl]carbamoyl]oxy)methyl]pyrrolidine-1-carboxylate (330 mg, 0.61 mmol, 1.00 eq.), dichloromethane (17 mL), trifluoroacetic acid (1.7 mL). The resulting solution was stirred for 1 h at rt. The resulting mixture was concentrated under vacuum. This resulted in 270 mg (crude) of (3S)-pyrrolidin-3-ylmethyl N-[(1R)-2-(4-methylphenyl)-1-[(1S,2S,6R,8S)-2,9,9-trimethyl-3,5-dioxa-4-boratricyclo[6.1.1.0^[2,6]]decan-4-yl]ethyl]carbamate as a yellow solid.

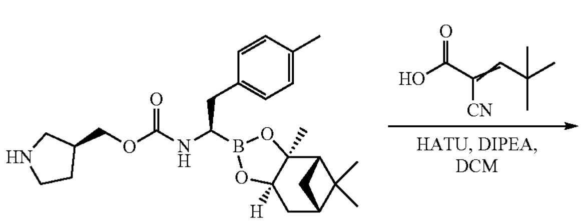

-continued

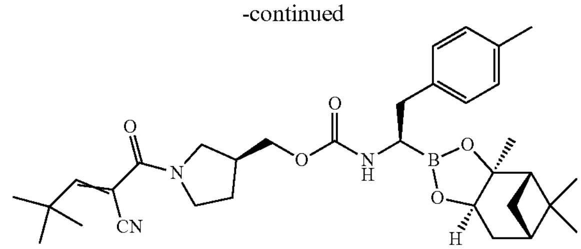

Into a 100-mL round-bottom flask purged and maintained with an inert atmosphere of nitrogen, it was placed (3S)-pyrrolidin-3-ylmethyl N-[(1R)-2-(4-methylphenyl)-1-[(1S,2S,6R,8S)-2,9,9-trimethyl-3,5-dioxa-4-boratricyclo[6.1.1.0^[2,6]]decan-4-yl]ethyl]carbamate (270 mg, 0.61 mmol, 1.00 eq.), dichloromethane (15 mL), 2-cyano-4,4-dimethylpent-2-enoic acid (140 mg, 0.91 mmol, 1.50 eq.), HATU (695 mg, 1.83 mmol, 3.00 eq.), DIPEA (236 mg, 3.00 eq.). The resulting solution was stirred for 1.5 h at rt. The reaction was then quenched by the addition of water (20 mL). The resulting solution was extracted with dichloromethane (3×20 mL), and the organic layers combined and dried over anhydrous sodium sulfate and concentrated under vacuum. The crude product was purified by prep-HPLC with the following conditions: Column, XBridge Prep C18 OBD Column, 19×150 mm 5 um; mobile phase, Water (10 mmol/L $NH_4HCO_3$+0.1% $NH_3.H_2O$) and ACN (60.0% ACN up to 95.0% in 7 min); Detector, UV 254/220 nm. This resulted in 170 mg (48%) of [(3S)-1-[2-cyano-2-(2,2-dimethylpropylidene)acetyl]pyrrolidin-3-yl]methyl N-[(1R)-2-(4-methylphenyl)-1-[(1S,2S,6R,8S)-2,9,9-trimethyl-3,5-dioxa-4-boratricyclo[6.1.1.0^[2,6]]decan-4-yl]ethyl] carbamate as a white solid after lyophilization.

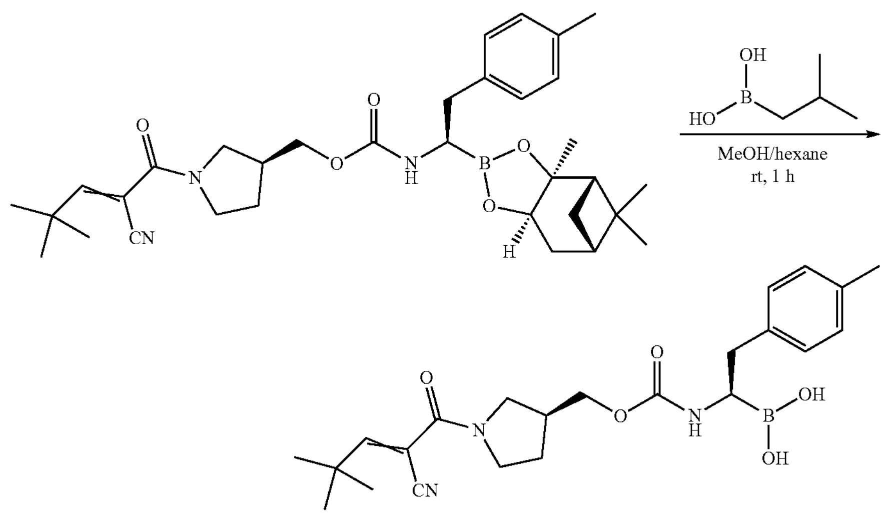

Into a 40-mL vial purged and maintained with an inert atmosphere of nitrogen, it was placed [(3S)-1-[2-cyano-2-(2,2-dimethylpropylidene)acetyl]pyrrolidin-3-yl]methyl N-[(1R)-2-(4-methylphenyl)-1-[(1S,2S,6R,8S)-2,9,9-trimethyl-3,5-dioxa-4-boratricyclo[6.1.1.0^[2,6]]decan-4-yl] ethyl]carbamate (170 mg, 0.30 mmol, 1.00 eq.), methanol: hexane:1N HCl (3:3:2 mL), (2-methylpropyl)boronic acid (90 mg, 0.88 mmol, 3.00 eq.). The resulting solution was stirred for 1 h at rt. The resulting mixture was washed with hexane (3×10 mL). The methanol layer was diluted with $H_2O$ (17 mL), then dried over lyophylization to give a crude product. The crude product was purified by prep-HPLC with the following conditions: Column, XBridge Prep C18 OBD Column, 19×150 mm 5 um; mobile phase, Water (10 mmol/L $NH_4HCO_3$+0.1% $NH_3.H_2O$) and ACN (32.0% ACN up to 52.0% in 7 min); Detector, UV 254/220 nm. This resulted in 55.8 mg (43%) of ((R)-1-(((((S)-1-(2-cyano-4,4-dimethylpent-2-enoyl)pyrrolidin-3-yl)methoxy)carbonyl)amino)-2-(p-tolyl)ethyl)boronic acid as a white solid after lyophilization. LC-MS m/z: 424 [M-17].

Example 47

((R)-2-(benzofuran-3-yl)-1-(3-(((R)-1-(2-cyano-4-methyl-4-morpholinopent-2-enoyl)pyrrolidin-2-yl)methyl)ureido)ethyl)boronic Acid

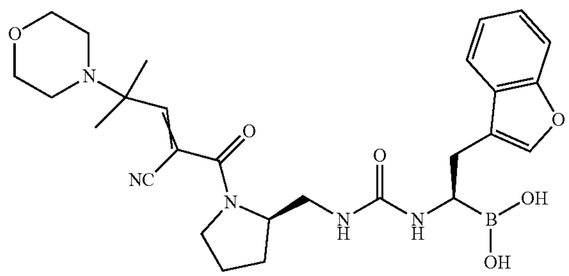

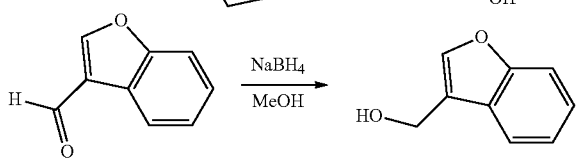

Into a 50-mL round-bottom flask, was placed 1-benzofuran-3-carbaldehyde (5 g, 34.21 mmol, 1.00 eq.), methanol (50 mL). This was followed by the addition of $NaBH_4$ (1.96 g, 51.81 mmol, 1.50 eq.) in several batches. The resulting solution was stirred for 1 h at rt. The resulting mixture was concentrated under vacuum. The resulting solution was diluted with DCM (100 mL). The resulting mixture was washed with $NH_4Cl$ (1×50 mL). The mixture was dried over anhydrous sodium sulfate and concentrated under vacuum. The residue was applied onto a silica gel column with PE:EA (60:40). This resulted in 4.8 g (95%) of 1-benzofuran-3-ylmethanol as a white solid.

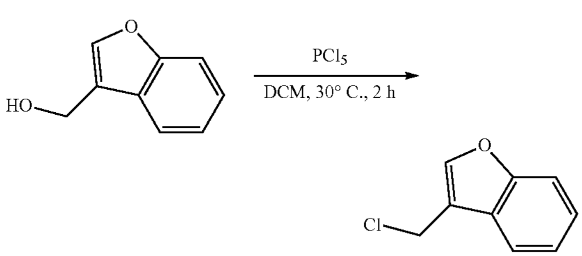

Into a 100-mL round-bottom flask, was placed 1-benzofuran-3-ylmethanol (2 g, 13.50 mmol, 1.00 eq.), dichloromethane (40 mL), $PCl_5$ (3.65 g, 17.53 mmol, 1.30 eq.). The resulting solution was stirred for 2 h at 30° C. The resulting mixture was washed with sodium chloride. The resulting solution was extracted with of dichloromethane and the organic layers combined and dried over anhydrous sodium sulfate and concentrated under vacuum. The residue was applied onto a silica gel column with ethyl acetate: petroleum ether (1:100). This resulted in 1.76 g (78%) of 3-(chloromethyl)-1-benzofuran as yellow oil.

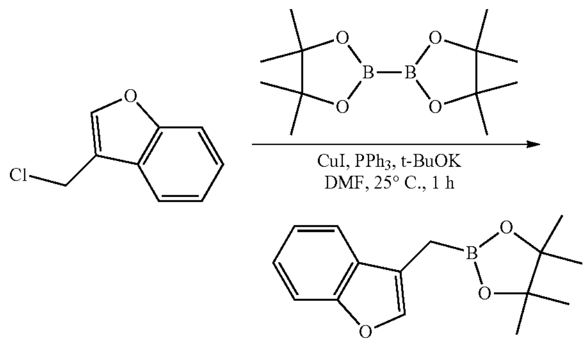

Into a 250-mL 3-necked round-bottom flask, was placed 3-(chloromethyl)-1-benzofuran (2 g, 12.00 mmol, 1.00 eq.), N,N-dimethylformamide (64 mL), 4,4,5,5-tetramethyl-2-(tetramethyl-1,3,2-dioxaborolan-2-yl)-1,3,2-dioxaborolane (3.352 g, 13.20 mmol, 1.10 eq.), CuI (228 mg, 1.20 mmol, 0.10 eq.), PPh3 (314 mg, 1.20 mmol, 0.10 eq.). This was followed by the addition of (tert-butoxy)lithium (1.532 g, 19.14 mmol, 1.60 eq.) at 0° C. The resulting solution was stirred for 1 h at 25° C. The reaction was then quenched by the addition of water:ice (200 mL). The resulting solution was extracted with ethyl acetate (3×100 mL), and the organic layers combined and dried over anhydrous sodium sulfate and concentrated under vacuum. The residue was applied onto a silica gel column with PE (100%). This resulted in 1.54 g (50%) of 2-(1-benzofuran-3-ylmethyl)-4,4,5,5-tetramethyl-1,3,2-dioxaborolane as yellow oil.

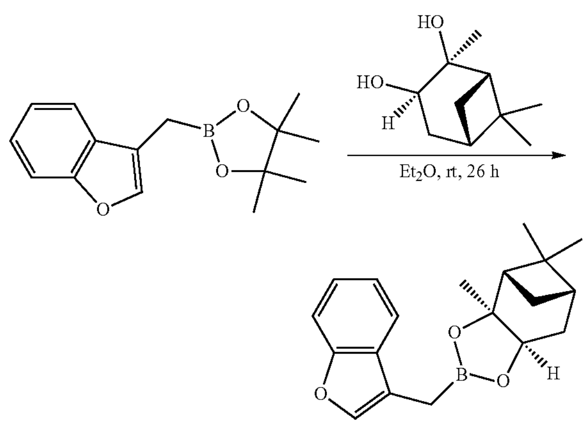

Into a 50-mL round-bottom flask, was placed a solution of 2-(1-benzofuran-3-ylmethyl)-4,4,5,5-tetramethyl-1,3,2-dioxaborolane (490 mg, 1.90 mmol, 1.00 eq.) in ether (5 mL), (1S,2S,3R,5S)-2,6,6-trimethylbicyclo[3.1.1]heptane-2,3-diol (420 mg, 2.47 mmol, 1.30 eq.). The resulting solution was stirred for overnight at rt. The resulting mixture was concentrated under vacuum. The residue was applied onto a silica gel column with ethyl acetate:petroleum ether (3:97). This resulted in 200 mg (34%) of (1S,2S,6R,8S)-4-(1-benzofuran-3-ylmethyl)-2,9,9-trimethyl-3,5-dioxa-4-boratricyclo[6.1.1.0^[2,6]]decane as yellow oil.

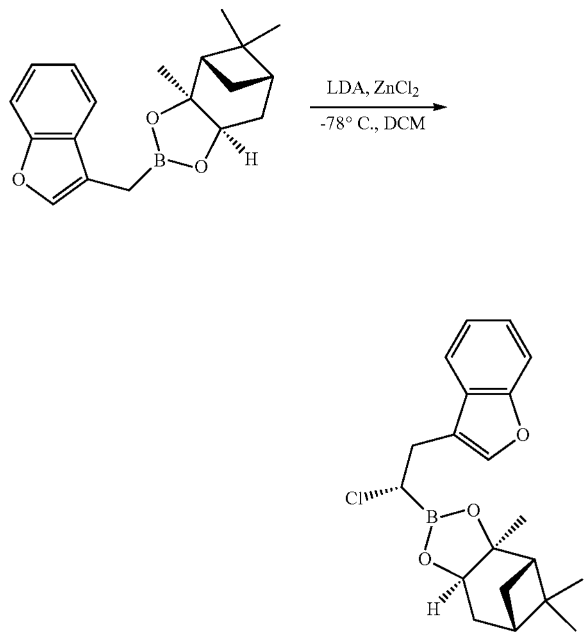

Into a 50-mL 3-necked round-bottom flask, was placed a solution of dichloromethane (617 mg, 7.26 mmol, 3.00 eq.) in tetrahydrofuran (4 mL). This was followed by the addition of LDA (1.6 mL, 1.30 eq.) dropwise with stirring at −78° C. The mixture was stirred for 20 min. at −78° C. To this was added a solution of (1S,2S,6R,8S)-4-(1-benzofuran-3-ylmethyl)-2,9,9-trimethyl-3,5-dioxa-4-boratricyclo[6.1.1.0^[2,6]]decane (750 mg, 2.42 mmol, 1.00 eq.) in tetrahydrofuran (2 mL) dropwise with stirring at −78° C. The mixture was stirred for 10 min at −78° C. To the mixture was added $ZnCl_2$ (5 mL, 1.00 eq., 0.5N) dropwise with stirring at −78° C. The final reaction mixture was stirred for 30 min at −78° C. The resulting solution was allowed to react, with stirring, for an additional 3 h at rt. The resulting mixture was concentrated under vacuum. The reaction was then quenched by the addition of $NH_4Cl$ (20 mL). The resulting solution was extracted with ether (3×20 mL), and the organic layers combined and dried over anhydrous sodium sulfate and concentrated under vacuum. The residue was applied onto a silica gel column with ethyl acetate:petroleum ether (3:97). This resulted in 600 mg (69%) of (1S,2S,6R,8S)-4-[(1S)-2-(1-benzofuran-3-yl)-1-chloroethyl]-2,9,9-trimethyl-3,5-dioxa-4-boratricyclo[6.1.1.0^[2,6]]decane as yellow oil.

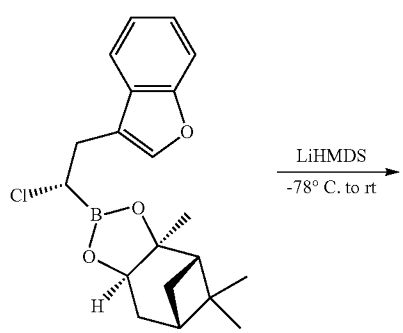

-continued

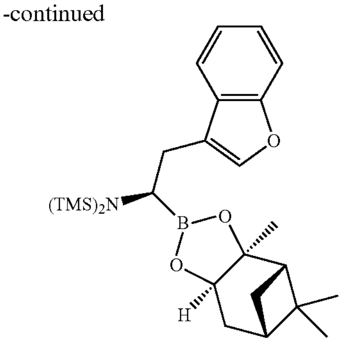

Into a 50-mL 3-necked round-bottom flask purged and maintained with an inert atmosphere of nitrogen, was placed (1S,2S,6R,8S)-4-[(1S)-2-(1-benzofuran-3-yl)-1-chloroethyl]-2,9,9-trimethyl-3,5-dioxa-4-boratricyclo[6.1.1.0^[2,6]]decane (600 mg, 1.67 mmol, 1.00 eq.), tetrahydrofuran (6 mL). This was followed by the addition of LiHMDS (2 mL, 1.20 eq.) dropwise with stirring at −78° C. The resulting solution was stirred for overnight at rt. The resulting mixture was concentrated under vacuum. The residue was dissolved in n-hexane (5 mL). The solids were filtered off. The resulting mixture was concentrated under vacuum. This resulted in 480 mg (59%) of [(1R)-2-(1-benzofuran-3-yl)-1-[(1S,2S,6R,8S)-2,9,9-trimethyl-3,5-dioxa-4-boratricyclo[6.1.1.0^[2,6]]decan-4-yl]ethyl]bis(trimethylsilyl)amine as yellow oil.

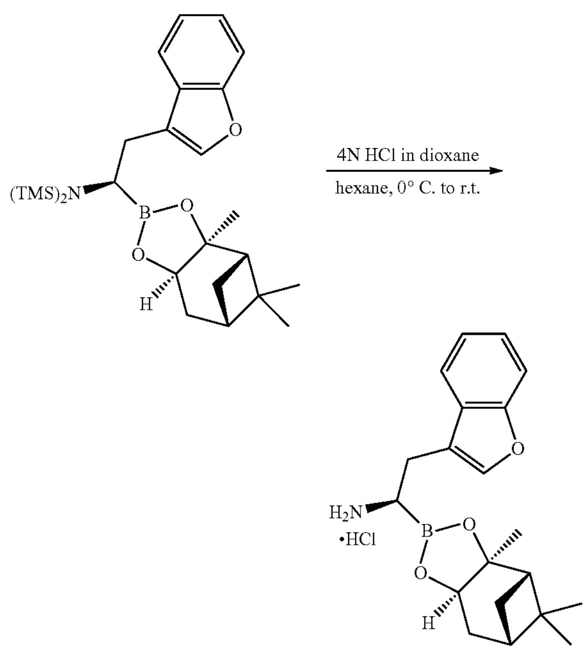

Into a 50-mL 3-necked round-bottom flask purged and maintained with an inert atmosphere of nitrogen, was placed a solution of [(1R)-2-(1-benzofuran-3-yl)-1-[(1S,2S,6R,8S)-2,9,9-trimethyl-3,5-dioxa-4-boratricyclo[6.1.1.0^[2,6]]decan-4-yl]ethyl]bis(trimethylsilyl)amine (480 mg, 0.99 mmol, 1.00 eq.) in n-hexane (10 mL). This was followed by the addition of 4N HCl in dioxane (0.85 mL, 3.00 eq.) at 0° C. The resulting solution was stirred for 2 h at rt. The solids were collected by filtration. This resulted in 230 mg (62%) of (1R)-2-(1-benzofuran-3-yl)-1-[(1S,2S,6R,8S)-2,9,9-trimethyl-3,5-dioxa-4-boratricyclo[6.1.1.0^[2,6]]decan-4-yl]ethan-1-amine hydrochloride as an off-white solid.

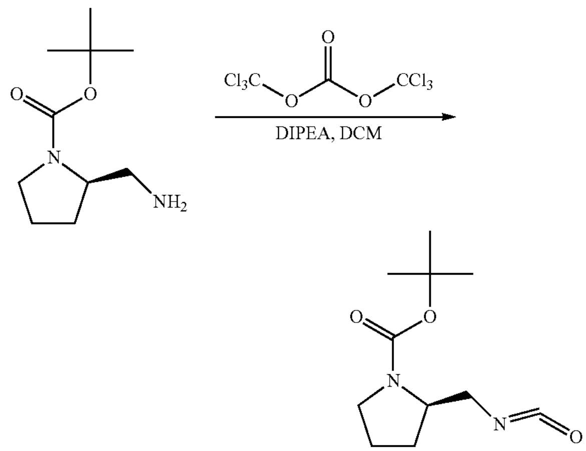

Into a 25-mL round-bottom flask, was placed tert-butyl (2R)-2-(aminomethyl)pyrrolidine-1-carboxylate (33 mg, 0.16 mmol, 1.00 eq.), dichloromethane (1 mL), DIEA (14 mg, 0.11 mmol, 2.00 eq.). This was followed by the addition of ditrichloromethyl carbonate (49 mg, 0.17 mmol, 1.00 eq.) at 0° C. The resulting solution was stirred for 3 h at rt. The resulting mixture was concentrated under vacuum. This resulted in 37 mg (crude) of tert-butyl (2R)-2-(isocyanatomethyl)pyrrolidine-1-carboxylate as yellow oil.

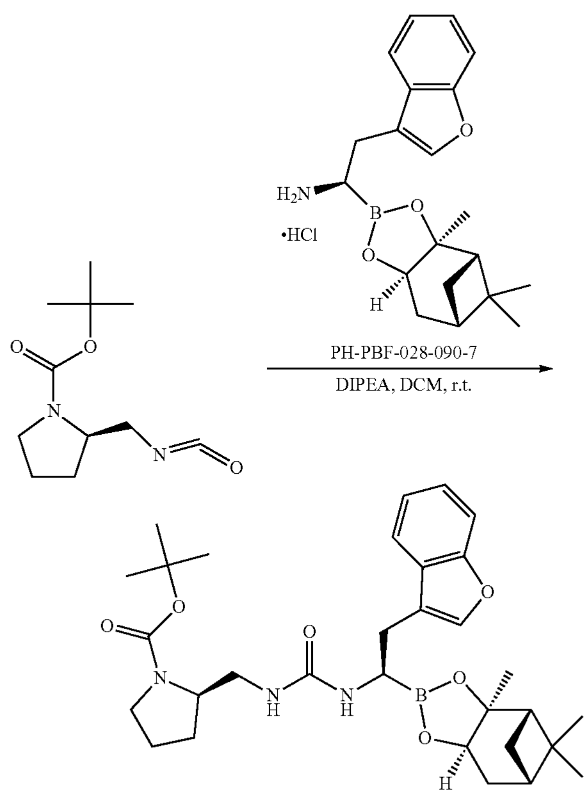

Into a 25-mL round-bottom flask, was placed tert-butyl (2R)-2-(isocyanatomethyl)pyrrolidine-1-carboxylate (37 mg, 0.16 mmol, 1.00 eq.), dichloromethane (1 mL), (1R)-2-(1-benzofuran-3-yl)-1-[(1S,2S,6R,8S)-2,9,9-trimethyl-3,5-dioxa-4-boratricyclo[6.1.1.0^2,6]decan-4-yl]ethan-1-amine hydrochloride (62 mg, 0.17 mmol, 1.00 eq.), DIEA (43 mg, 0.33 mmol, 2.00 eq.). The resulting solution was stirred for 2 h at rt. The reaction was then quenched by the addition of water (2 mL). The resulting solution was diluted with DCM (10 mL). The resulting mixture was washed with sodium chloride (1×5 mL). The mixture was dried over anhydrous sodium sulfate and concentrated under vacuum. This resulted in 93 mg (crude) of tert-butyl (2R)-2-[([[(1R)-2-(1-benzofuran-3-yl)-1-[(1S,2S,6R,8S)-2,9,9-trimethyl-3,5-dioxa-4-boratricyclo[6.1.1.0^[2,6]]decan-4-yl]ethyl]carbamoyl]amino)methyl]pyrrolidine-1-carboxylate as yellow oil.

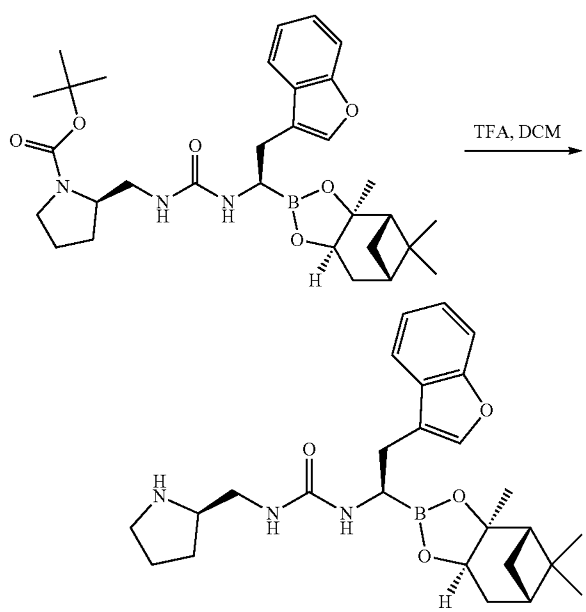

Into a 25-mL round-bottom flask, was placed tert-butyl (2R)-2-[([[(1R)-2-(1-benzofuran-3-yl)-1-[(1S,2S,6R,8S)-2,9,9-trimethyl-3,5-dioxa-4-boratricyclo[6.1.1.0^[2,6]]decan-4-yl]ethyl]carbamoyl]amino)methyl]pyrrolidine-1-carboxylate (93 mg, 0.16 mmol, 1.00 eq.), dichloromethane (2 mL), trifluoroacetic acid (0.5 mL). The resulting solution was stirred for 1 h at rt. The resulting mixture was concentrated under vacuum. This resulted in 77 mg (crude) of 1-[(1R)-2-(1-benzofuran-3-yl)-1-[(1S,2S,6R,8S)-2,9,9-trimethyl-3,5-dioxa-4-boratricyclo[6.1.1.0^[2,6]]decan-4-yl]ethyl]-3-[(2R)-pyrrolidin-2-ylmethyl]urea as brown oil.

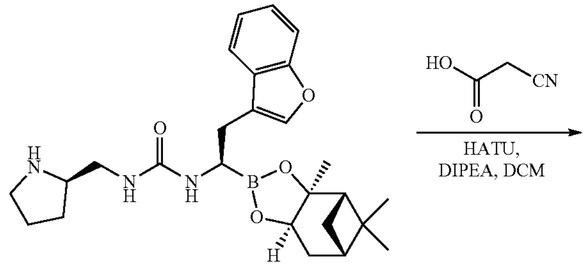

-continued

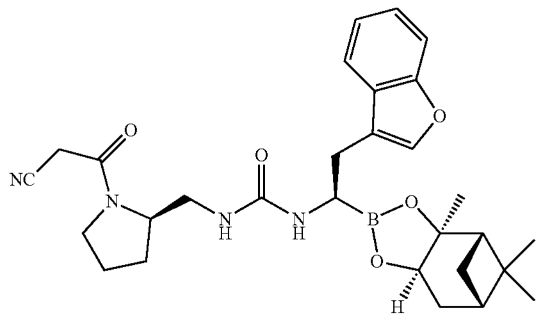

Into a 50-mL round-bottom flask, was placed a solution of 3-[(1R)-2-(1-benzofuran-3-yl)-1-[(1S,2S,6R,8S)-2,9,9-trimethyl-3,5-dioxa-4-boratricyclo[6.1.1.0^[2,6]]decan-4-yl]ethyl]-1-[(2R)-pyrrolidin-2-ylmethyl]urea (510 mg, 1.10 mmol, 1.00 eq.) in dichloromethane (mL), DIPEA (425 mg, 3.29 mmol, 3.00 eq.), 2-cyanoacetic acid (141 mg, 1.66 mmol, 1.50 eq.), HATU (625 mg, 1.64 mmol, 1.50 eq.). The resulting solution was stirred for 1 h at rt. The resulting solution was diluted with DCM (10 mL). The resulting mixture was washed with brine (1×10 mL). The mixture was dried over anhydrous sodium sulfate and concentrated under vacuum. The residue was applied onto a silica gel column with ethyl acetate:petroleum ether (80:20). This resulted in 570 mg (98%) of 3-[(1R)-2-(1-benzofuran-3-yl)-1-[(1S,2S,6R,8S)-2,9,9-trimethyl-3,5-dioxa-4-boratricyclo[6.1.1.0^[2,6]]decan-4-yl]ethyl]-1-[[(2R)-1-(2-cyanoacetyl)pyrrolidin-2-yl]methyl]urea as a yellow solid.

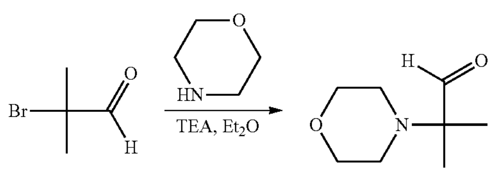

Into a 25-mL 3-necked round-bottom flask purged and maintained with an inert atmosphere of nitrogen, was placed 2-bromo-2-methylpropanal (1 g, 6.62 mmol, 1.00 eq.), ether (5 mL), morpholine (2.04 g, 23.42 mmol, 3.50 eq.). The resulting solution was stirred for 1 h at 0° C. in an ice:salt bath. The resulting solution was diluted with $H_2O$ (5 mL). The resulting solution was extracted with ether (3×10 mL), and the organic layers combined and dried over anhydrous sodium sulfate and concentrated under vacuum. This resulted in 0.228 g (22%) of 2-methyl-2-(morpholin-4-yl) propanal as off-white oil.

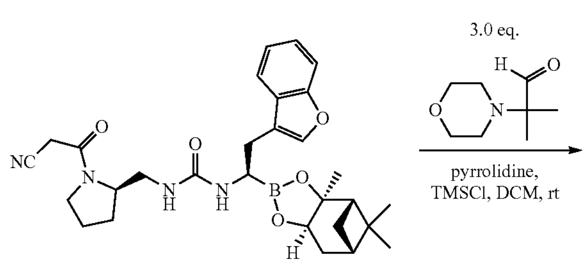

-continued

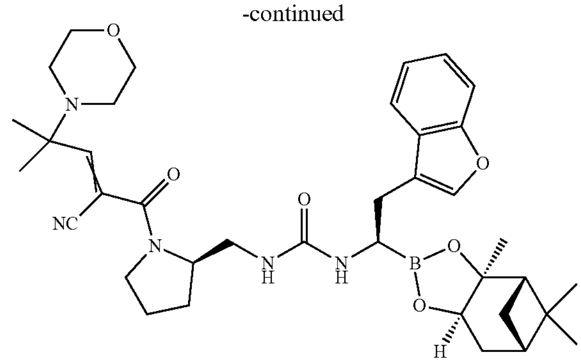

Into a 50-mL round-bottom flask, was placed a solution of 1-[(1R)-2-(1-benzofuran-3-yl)-1-[(1S,2S,6R,8S)-2,9,9-trimethyl-3,5-dioxa-4-boratricyclo[6.1.1.0^[2,6]]decan-4-yl]ethyl]-3-[[(2R)-1-(2-cyanoacetyl)pyrrolidin-2-yl]methyl] urea (130 mg, 0.24 mmol, 1.00 eq.) in dichloromethane (5 mL), 2-methyl-2-(morpholin-4-yl)propanal (115 mg, 0.73 mmol, 3.00 eq.), pyrrolidine (88 mg, 1.24 mmol, 5.00 eq.), TMSCl (132 mg, 1.22 mmol, 5.00 eq.). The resulting solution was stirred for 1 h at rt. The reaction was then quenched by the addition of 2 mL of water. The resulting solution was diluted with 10 mL of DCM. The resulting mixture was washed with brine (1×10 mL). The mixture was dried over anhydrous sodium sulfate and concentrated under vacuum. The crude product was purified by prep-HPLC with the following conditions: Column, XBridge Prep C18 OBD Column, 19×150 mm 5 um; mobile phase, Water (10 mmol/L $NH_4HCO_3$+0.1% $NH_3.H_2O$) and ACN (53% ACN up to 59% in 10 min); Detector, UV 254/220 nm. This resulted in 80 mg (49%) of 1-[(1R)-2-(1-benzofuran-3-yl)-1-[(1S,2S,6R,8S)-2,9,9-trimethyl-3,5-dioxa-4-boratricyclo[6.1.1.0^[2,6]]decan-4-yl]ethyl]-3-[[(2R)-1-[2-cyano-2-[2-methyl-2-(morpholin-4-yl)propylidene]acetyl]pyrrolidin-2-yl]methyl]urea as a white solid after lyophilization.

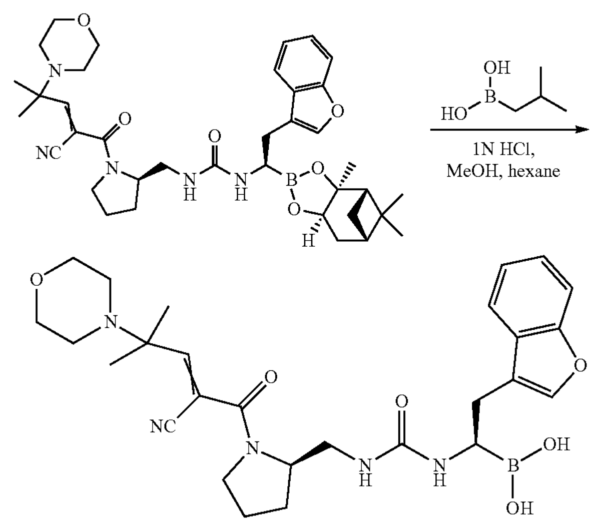

Into a 100-mL round-bottom flask, was placed a solution of 1-[(1R)-2-(1-benzofuran-3-yl)-1-[(1S,2S,6R,8S)-2,9,9-trimethyl-3,5-dioxa-4-boratricyclo[6.1.1.0^[2,6]]decan-4-yl]ethyl]-3-[[(2R)-1-[2-cyano-2-[2-methyl-2-(morpholin-4-yl)propylidene]acetyl]pyrrolidin-2-yl]methyl]urea (100 mg, 0.15 mmol, 1.00 eq.) in methanol:n-hexane (5:5 mL), (2-methylpropyl)boronic acid (46 mg, 0.45 mmol, 3.00 eq.), 1N HCl (3 mL, 20.00 eq.). The resulting solution was stirred for 2 h at rt. The hexane layer was discarded. The methanol layer was diluted with water (10 mL), then dried over lyophilization. The crude product was purified by prep-HPLC with the following conditions: Column, XBridge Prep C18 OBD Column, 19×150 mm, 5 um; mobile phase, Water (10 mmol/L $NH_4HCO_3$+0.1% $NH_3.H_2O$) and ACN (5.0% ACN up to 23.0% in 1 min, up to 47.0% in 6 min); Detector, UV 254/220 nm. This resulted in 62.1 mg (76%) of ((R)-2-(benzofuran-3-yl)-1-(3-(((R)-1-(2-cyano-4-methyl-4-morpholinopent-2-enoyl)pyrrolidin-2-yl)methyl)ureido)ethyl)boronic acid as a white solid after lyophilization. LC-MS m/z: 520 [M-17].

Example 48

((R)-2-(benzofuran-3-yl)-1-(3-(((R)-1-(2-cyano-4-methyl-4-(4-(oxetan-3-yl)piperazin-1-yl)pent-2-enoyl)pyrrolidin-2-yl)methyl)ureido)ethyl)boronic Acid

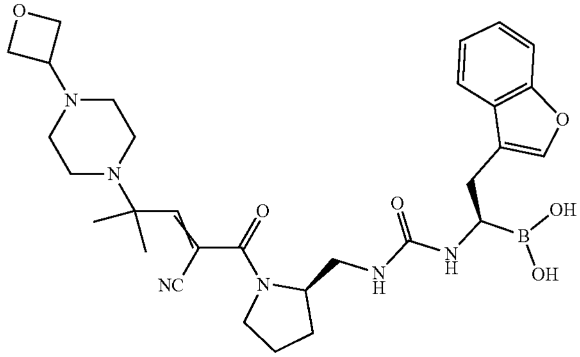 [SMILES: CC(C)(C=C(C#N)C(=O)N1CCC[C@@H]1CNC(=O)N[C@@H](Cc1coc2ccccc12)B(O)O)N1CCN(C2COC2)CC1]

The title compound was prepared as in example 46 by replacing morpholine with 4-(oxetan-3-yl)piperazine. LC-MS m/z: 575 [M-17].

Example 49

((R)-2-(benzofuran-3-yl)-1-(3-(((R)-1-(2-cyano-4-(4,4-difluoropiperidin-1-yl)-4-methylpent-2-enoyl)pyrrolidin-2-yl)methyl)ureido)ethyl)boronic Acid

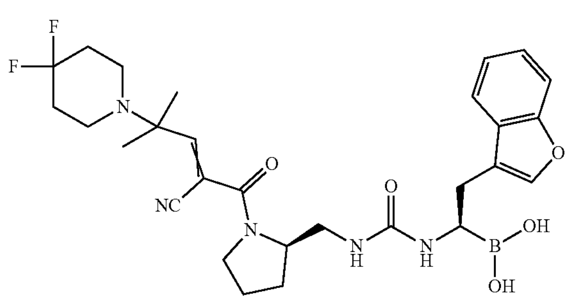 [SMILES: CC(C)(C=C(C#N)C(=O)N1CCC[C@@H]1CNC(=O)N[C@@H](Cc1coc2ccccc12)B(O)O)N1CCC(F)(F)CC1]

The title compound was prepared as in example 46 by replacing morpholine with 3,3-difluoropiperidine. LC-MS m/z: 554 [M-17].

Example 50

((R)-2-(benzofuran-3-yl)-1-(3-(((R)-1-(2-cyano-4-(3,3-difluoropyrrolidin-1-yl)-4-methylpent-2-enoyl)pyrrolidin-2-yl)methyl)ureido)ethyl)boronic Acid

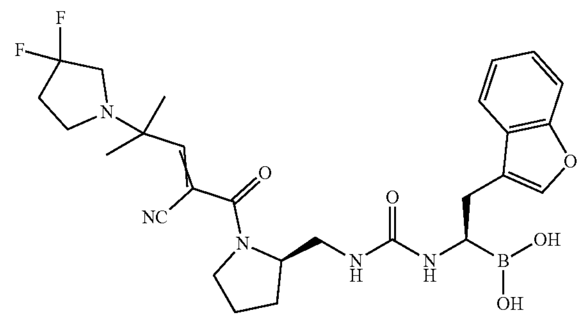 [SMILES: CC(C)(C=C(C#N)C(=O)N1CCC[C@@H]1CNC(=O)N[C@@H](Cc1coc2ccccc12)B(O)O)N1CCC(F)(F)C1]

The title compound was prepared as in example 46 by replacing morpholine with 2,2-difluoropyrrolidine. LC-MS m/z: 540 [M-17].

Example 51

((R)-1-(((((S)-1-acryloylazetidin-2-yl)methoxy)carbonyl)amino)-2-phenylethyl)boronic Acid

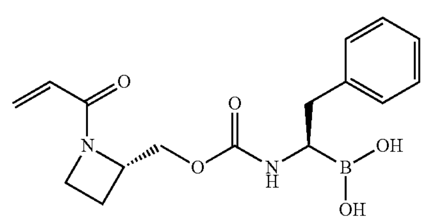

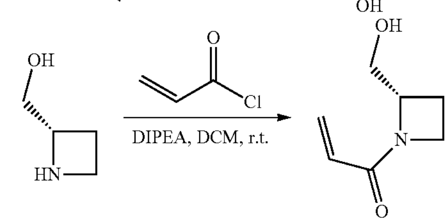

Into a 100-mL round-bottom flask, was placed a solution of [(2S)-azetidin-2-yl]methanol (204.mg, 2.34 mmol, 1.00 eq.) in dichloromethane (20 mL) and followed N,N-Diisopropylethylamine (0.62 mL, 3.51 mmol, 1.50 eq.). To this was added acryloyl chloride (0.19 mL, 2.34 mmol, 1.00 eq.). The resulting solution was stirred for 30 mins at rt. The reaction was then quenched by the addition of water (20 mL). The resulting solution was extracted with dichloromethane (2×20 mL), and the organic layers combined. The resulting mixture was washed with sodium chloride (1×20 mL). The mixture was dried over anhydrous magnesium sulfate and concentrated under vacuum to obtain 330 mg (99%) of 1-[(2S)-2-(hydroxymethyl)azetidin-1-yl]prop-2-en-1-one. LC-MS m/z: 142 [M+1].

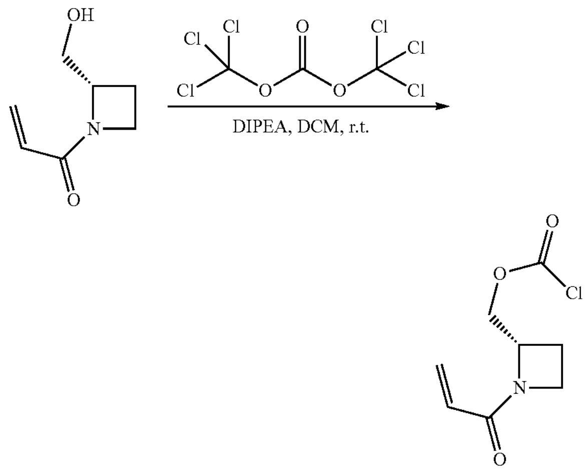

Into a 25-mL round-bottom flask, was placed a solution of 1-[(2S)-2-(hydroxymethyl)azetidin-1-yl]prop-2-en-1-one (330.00 mg, 2.34 mmol, 1.00 eq.) and —N,N-Diisopropylethylamine (0.62 mL, 3.51 mmol, 1.5 eq.) in dichloromethane (20 mL). To this was added slowly of bis (trichloromethyl) carbonate (693.68 mg, 2.34 mmol, 1.00 eq.). The resulting solution was stirred for 1 h at rt. The reaction mixture was then used in the step 3 right away.

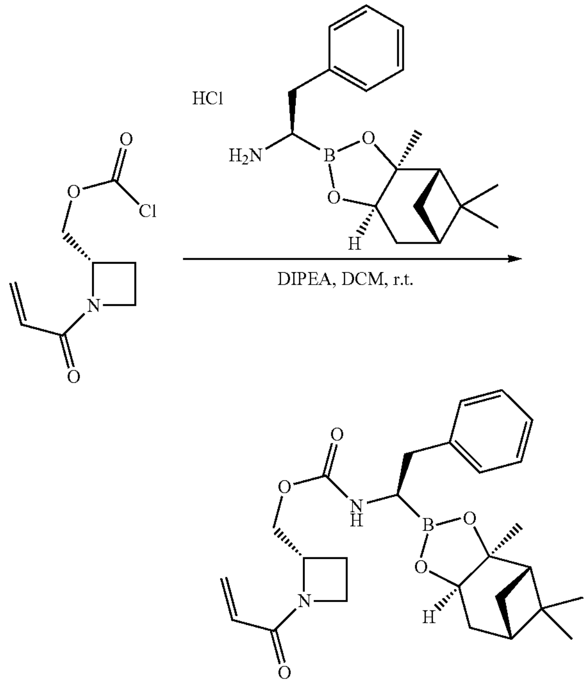

Into a 25-mL round-bottom flask, the solution of (1R)-2-phenyl-1-[(1S,2S,6R,8S)-2,9,9-trimethyl-3,5-dioxa-4-boratricyclo[6.1.1.0^2,6]decan-4-yl]ethan-1-amine hydrochloride (320.00 mg, 0.95 mmol, 1.00 eq.) and N,N-Diisopropylethylamine (0.25 mL, 1.43 mmol, 1.5 eq.) in dichloromethane (20 mL). To this was added slowly the mixture of [(2S)-1-prop-2-enoylazetidin-2-yl]methyl carbonochloridate (388.22 mg, 1.91 mmol, 2.00 eq.). The resulting solution was stirred for 2 h at rt. The resulting mixture was worked up with DCM (2×50 mL) and water (50 mL) then the organic layer was dried with $MgSO_4$. The crude was prepped by Shimazu HPLC. Collected fractions were frozen and lyophilized to obtain 175 mg (40%) of ((S)-1-acryloylazetidin-2-yl)methyl ((R)-2-phenyl-1-((3aS,4S,6S,7aR)-3a,5,5-trimethylhexahydro-4,6-methanobenzo[d][1,3,2]dioxaborol-2-yl)ethyl)carbamate as a white solid.

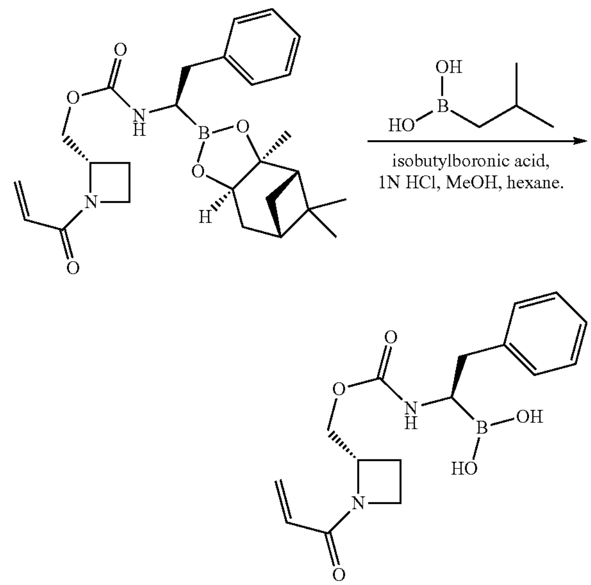

Into a 25-mL round-bottom flask, was placed a solution of ((S)-1-acryloylazetidin-2-yl)methyl ((R)-2-phenyl-1-((3aS,4S,6S,7aR)-3a,5,5-trimethylhexahydro-4,6-methanobenzo[d][1,3,2]dioxaborol-2-yl)ethyl)carbamate (170.mg, 0.36 mmol, 1.00 eq.) in methanol:Hexane (1.5:1.5 mL), 1N HCl (1 mL, 20.00 eq.), (2-methylpropyl)boronic acid (16 mg, 0.16 mmol, 3.00 eq.). The resulting solution was stirred for 2 h at rt. The hexane layer was discarded, the methanol layer was purified by Shimazu prep-HPLC. Collected fractions were frozen and lyophilized to obtain in 51 mg (42%) of ((R)-1-(((((S)-1-acryloylazetidin-2-yl)methoxy)carbonyl)amino)-2-phenylethyl)boronic acid as a white solid. LC-MS m/z: 645 [2×M-1-18].

Example 52

((R)-1-(((((S)-1-(2-cyano-4-(3,3-difluoropyrrolidin-1-yl)-4-methylpent-2-enoyl)piperidin-3-yl)methoxy)carbonyl)amino)-2-(p-tolyl)ethyl)boronic Acid

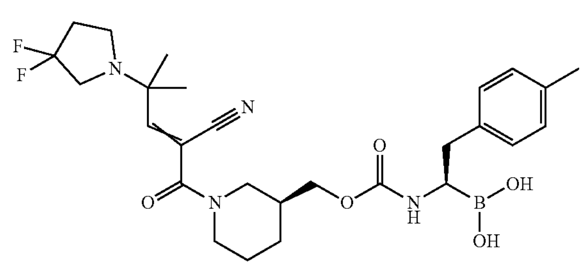

-continued

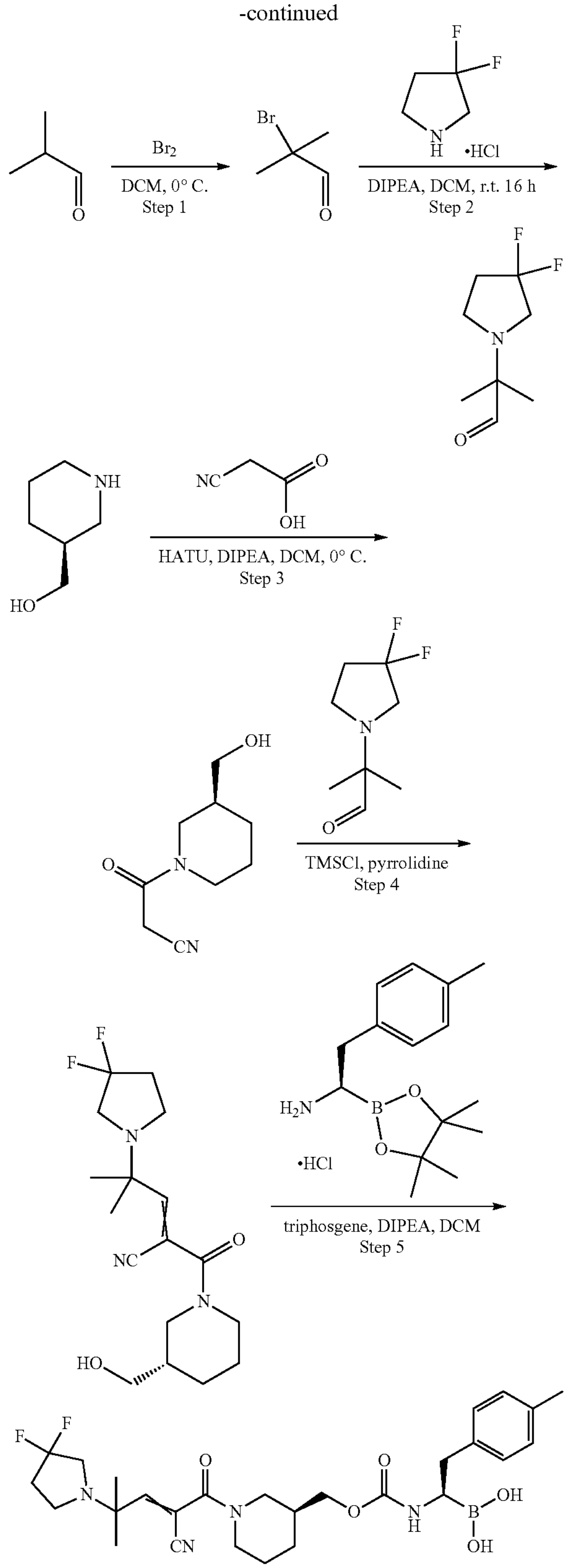

To a stirring solution of isobutyraldehyde (4.04 g, 56 mmol) in DCM (150 mL) at 0° C. was added dropwise $Br_2$ (6.28 g, 39.2 mmol). The resulted mixture was stirred at 0° C. for 5 min, then washed with water (45 mL), saturated $NaHCO_3$ aq. (45 mL) and brine (45 mL) sequentially. After dried over $Na_2SO_4$, the organic phase was concentrated under vacuum to give crude 2-bromo-2-methylpropanal as 6 g colorless liquid which was used into next step.

To a mixture of 2-bromo-2-methylpropanal (3.5 g impure), 3,3-difluoropyrrolidine hydrochloride (2.0 g, 13.9 mmol) in DCM (70 mL) was added dropwise DIPEA (5.4 g, 41.8 mmol) at 0° C. The resulted mixture was allowed to warm to rt and stirred for 6h, then concentrated to dryness. The residue was stirred in EtOAc (40 mL) for 5 min, then filtered. The filtration was concentrated in vacuo. The crude residue was purified via silica chromatography and a gradient of 0%-20% EtOAc in hexanes to afford 2-(3,3-difluoropyrrolidin-1-yl)-2-methylpropanal as colorless solid (1.4 g, 57%).

To a mixture of 2-cyanoacetic acid (1.7 g, 20 mmol), (S)-piperidin-3-ylmethanol (2.3 g, 20 mmol) and DIPEA (5.17 g, 40 mmol) in DCM (200 mL) was added portionwise HATU (7.6 g, 20 mmol) at 0° C. The resulted mixture was stirred at 0° C. for 40 min, then concentrated to dryness. The residue was stirred in EtOAc (80 mL) for 5 min, then filtered. The filtration was concentrated in vacuo. The crude residue was purified via silica chromatography and a gradient of 0%-100% EtOAc in hexanes to afford 1.75 g pure and 1.8 g 75% purity (S)-3-(3-(hydroxymethyl)piperidin-1-yl)-3-oxopropanenitrile.

To a solution of (S)-3-(3-(hydroxymethyl)piperidin-1-yl)-3-oxopropanenitrile (1.15 g, 6.21 mmol), 2-(3,3-difluoropyrrolidin-1-yl)-2-methylpropanal (1.1 g, 6.21 mmol) and pyrrolidine (1.77 g, 24.5 mmol) in DCM (25 mL) in ice-water bath was added chloro(trimethyl)silane (1.35 g, 12.44 mmol) dropwise. The reaction was stirred at 0° C. for 0.5 h, then washed with brine (5 mL). The DCM layer was dried over $Na_2SO_4$, concentrated to dryness. The crude residue was purified via silica chromatography and a gradient of 0%-100% EtOAc in hexanes to afford the title compound (S)-4-(3,3-difluoropyrrolidin-1-yl)-2-(3-(hydroxymethyl)piperidine-1-carbonyl)-4-methylpent-2-enenitrile (475 mg) and another product (S)-4-(3,3-difluoropyrrolidin-1-yl)-4-methyl-2-(3-((trimethylsilyloxy)methyl)piperidine-1-carbonyl)pent-2-enenitrile as a colorless oil (510 mg).

Bis(trichloromethyl) carbonate (178 mg, 0.6 mmol) in DCM (1 mL) was added dropwise into a stirring solution of (S)-4-(3,3-difluoropyrrolidin-1-yl)-2-(3-(hydroxymethyl)piperidine-1-carbonyl)-4-methylpent-2-enenitrile (215 mg, 0.63 mmol) and DIPEA (488 mg, 3.77 mmol) in DCM (4 mL) at −15° C. The mixture was stirred for 2 h below 0° C. This resulted solution was added dropwise into a well-stirred solution of (R)-1-(4,4,5,5-tetramethyl-1,3,2-dioxaborolan-2-yl)-2-p-tolylethanamine hydrochloride (160 mg, 0.54 mmol) and DIPEA (244 mg, 1.9 mmol) in DCM (3 mL) at 0° C. The reaction was stirred at 0° C. for 1 h, then diluted with DCM (25 mL), washed with water (10 mL) and brine (10 mL), dried over $Na_2SO_4$, concentrated in vacuo. The residue was purified by prep-HPLC to afford ((R)-1-(((((S)-1-(2-cyano-4-(3,3-difluoropyrrolidin-1-yl)-4-methylpent-2-enoyl)piperidin-3-yl)methoxy)carbonyl)amino)-2-(p-tolyl)ethyl)boronic acid as a white solid (133.4 mg, 39% yield). LC-MS m/z: 547 [M+1].

Example 53

((R)-1-(((((S)-1-(2-cyano-4-(3,3-difluoropyrrolidin-1-yl)-4-methylpent-2-enoyl)piperidin-3-yl)methoxy)carbonyl)amino)-2-phenylethyl)boronic Acid

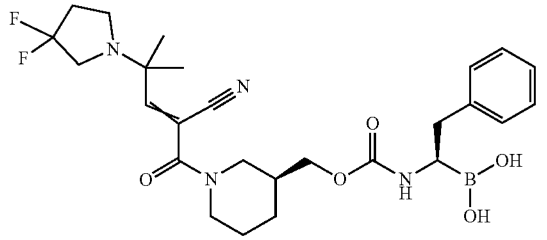 [SMILES: CC(C)(C=C(C#N)C(=O)N1CCC[C@H](COC(=O)N[C@@H](Cc2ccccc2)B(O)O)C1)N1CCC(F)(F)C1]

The title compound was prepared as in example 52 by replacing (R)-1-(4,4,5,5-tetramethyl-1,3,2-dioxaborolan-2-yl)-2-(p-tolyl)ethanamine hydrochloride with (1R)-2-phenyl-1-[(1S,2S,6R,8S)-2,9,9-trimethyl-3,5-dioxa-4-boratricyclo[6.1.1.0^[2,6]]decan-4-yl]ethan-1-amine hydrochloride. LC-MS m/z: 515 [M-17].

Example 54

((R)-1-(((((R)-1-(2-cyano-4-(3,3-difluoropyrrolidin-1-yl)-4-methylpent-2-enoyl)azetidin-2-yl)methoxy)carbonyl)amino)-2-phenylethyl)boronic Acid

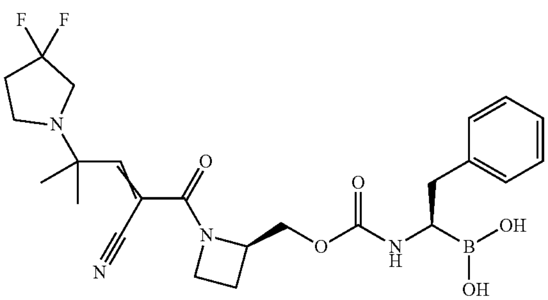

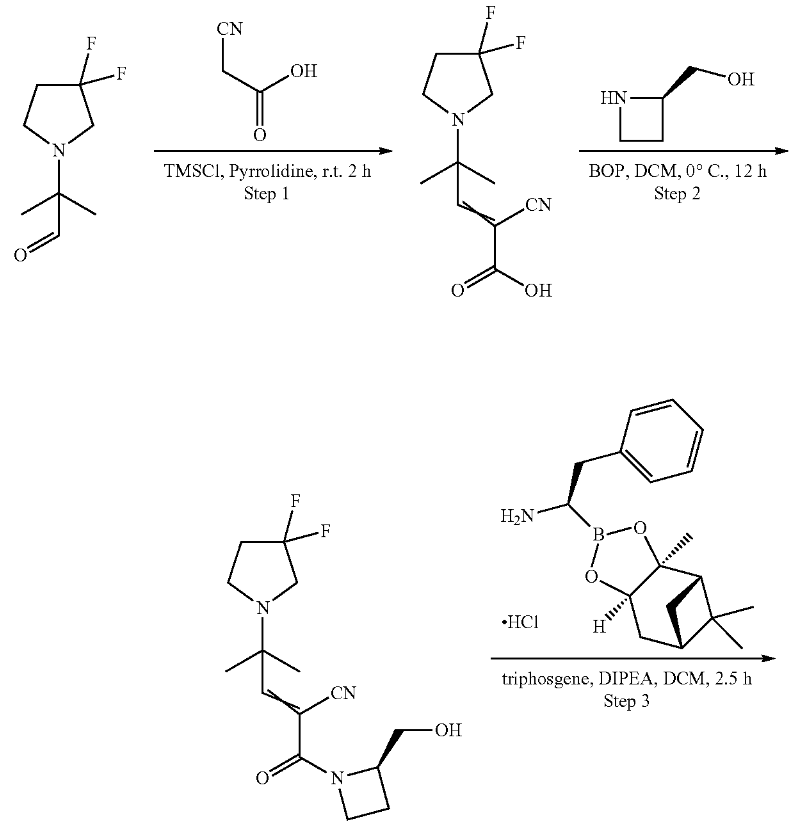

-continued

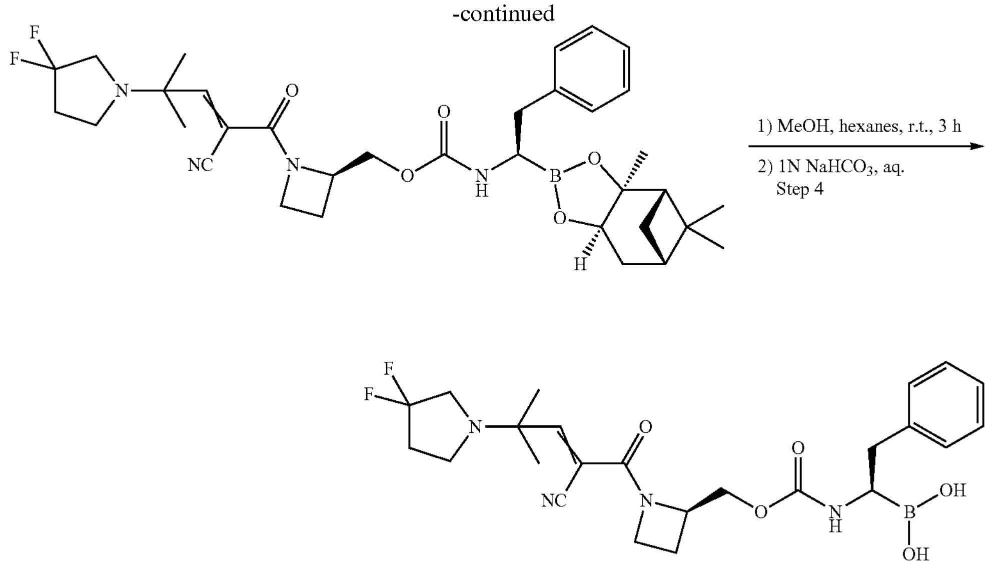

To a solution of 2-(3,3-difluoropyrrolidin-1-yl)-2-methylpropanal (2.3 g, 12.98 mmol), 2-cyanoacetic acid (1.10 g, 12.98 mmol) and pyrrolidine (7.39 g, 103.84 mmol) in DCM (30 mL) in ice-water bath was added dropwise chloro (trimethyl)silane (6.58 mL, 51.92 mmol). The reaction was stirred at rt for 2 h, then concentrated in vacuo. The pH of the mixture was adjusted to 5-6 with $KHSO_4$ (aq) before extraction with DCM (3×50 mL). The organic layers were combined then washed with brine (50 mL), dried over $Na_2SO_4$ and concentrated in vacuo. The crude material was purified via silica chromatography to afford the title compound as a yellow solid (800 mg, 25.24%).

To a mixture of 2-cyano-4-(3,3-difluoropyrrolidin-1-yl)-4-methylpent-2-enoic acid (292 mg, 1.2 mmol), (R)-azetidin-2-ylmethanol (104.16 mg, 1.2 mmol) and DIPEA (463.55 mg, 3.59 mmol) in DCM (10 mL) was added portionwise BOP (528.77 mg, 1.2 mmol) at 0° C. The resulted mixture was stirred at rt for 12 h, then concentrated to dryness. The crude residue was purified via silica chromatography and a gradient of 0%-100% EtOAc in hexanes to afford (R)-4-(3,3-difluoropyrrolidin-1-yl)-2-(2-(hydroxymethyl)azetidine-1-carbonyl)-4-methylpent-2-enenitrile as a colorless oil (182 mg, 48.67%).

Bis(trichloromethyl) carbonate (155.13 mg, 0.52 mmol) in DCM (1.5 mL) was added dropwise into a stirring solution of (R)-4-(3,3-difluoropyrrolidin-1-yl)-2-(2-(hydroxymethyl)azetidine-1-carbonyl)-4-methylpent-2-enenitrile (182 mg, 0.58 mmol) and DIPEA (375.34 mg, 2.90 mmol) in DCM (6 mL) at 0° C. The mixture was stirred for 2 h at 0° C. This resulted solution was added dropwise into a well-stirred solution of (R)-2-phenyl-1-((3aS,4S,6S,7aR)-3a,5,5-trimethylhexahydro-4,6-methanobenzo[d][1,3,2]dioxaborol-2-yl)ethanamine hydrochloride (152.11 mg, 0.45 mmol) and DIPEA (175.70 mg, 1.36 mmol) in DCM (5 mL) at 0° C. The reaction was stirred at 0° C. for 1 h, then diluted with DCM (25 mL), washed with water (10 mL) and brine (10 mL), dried over $Na_2SO_4$, concentrated in vacuo. The residue was purified in prep-HPLC to afford ((R)-1-(2-cyano-4-(3,3-difluoropyrrolidin-1-yl)-4-methylpent-2-enoyl)azetidin-2-yl)methyl ((R)-2-phenyl-1-((3aS,4S,6S,7aR)-3a,5,5-trimethylhexahydro-4,6-methanobenzo[d][1,3,2]dioxaborol-2-yl)ethyl)carbamate as a white solid (70 mg, 24.31%).

To a solution of ((R)-1-(2-cyano-4-(3,3-difluoropyrrolidin-1-yl)-4-methylpent-2-enoyl)azetidin-2-yl)methyl ((R)-2-phenyl-1-((3aS,4S,6S,7aR)-3a,5,5-trimethylhexahydro-4,6-methanobenzo[d][1,3,2]dioxaborol-2-yl)ethyl)carbamate (70 mg, 0.11 mmol) in MeOH (2 mL) were added hexanes (2 mL) and 1 N HCl (1 mL), followed by isobutyl boric acid (33.52 mg, 0.33 mmol). After stirred at rt for 3 h and TLC suggested the reaction was completed, The pH of the mixture was adjusted to 7 with $NaHCO_3$ (aq) before the hexanes layer was discarded. The methanol layer was diluted with water (20 mL), then dried over lyophilization to give a crude product which was further purified by Gel column (Methanol eluent) to afford ((R)-1-(((((R)-1-(2-cyano-4-(3,3-difluoropyrrolidin-1-yl)-4-methylpent-2-enoyl)azetidin-2-yl)methoxy)carbonyl)amino)-2-phenylethyl)boronic acid as a white solid (13.5 mg, 25.47%). LC-MS m/z: 487 [M-17].

Example 55

((R)-1-(((((R)-1-(2-cyano-4-(3,3-difluoropyrrolidin-1-yl)-4-methylpent-2-enoyl)piperidin-3-yl)oxy)carbonyl)amino)-2-phenylethyl)boronic Acid

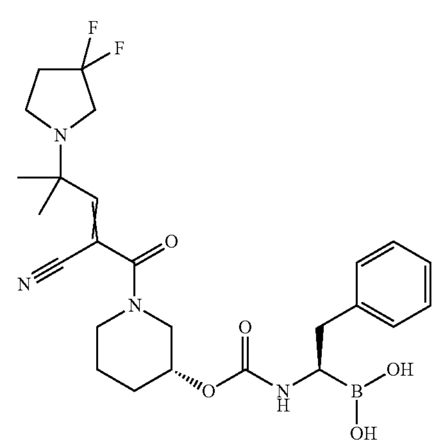

-continued

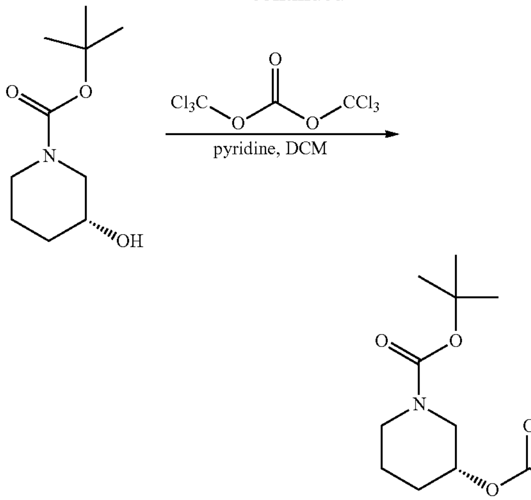

Into a 100-mL 3-necked round-bottom flask purged and maintained with an inert atmosphere of nitrogen, was placed tert-butyl (3R)-3-hydroxypiperidine-1-carboxylate (500 mg, 2.48 mmol, 1.00 eq.), dichloromethane (5 mL), pyridine (737 mg, 9.32 mmol, 3.00 eq.). This was followed by the addition of a solution of ditrichloromethyl carbonate (737 mg, 2.48 mmol, 0.50 eq.) in dichloromethane (10 mL) dropwise with stirring at 0° C. The resulting solution was stirred for 2 h at 0° C. The reaction mixture solution was used directly to the next step.

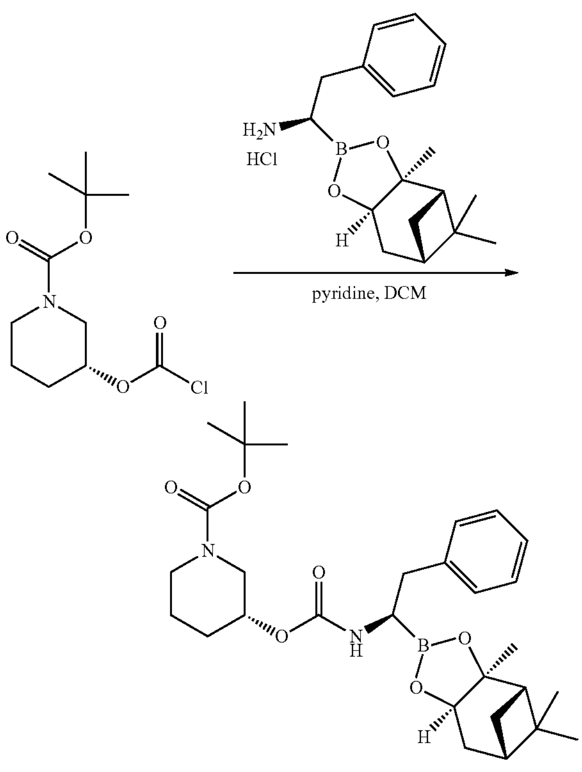

Into a 100-mL 3-necked round-bottom flask purged and maintained with an inert atmosphere of nitrogen, was placed (1R)-2-phenyl-1-[(1S,2S,6R,8S)-2,9,9-trimethyl -3,5-dioxa-4-boratricyclo[6.1.1.0^2,6]decan-4-yl]ethan-1-amine hydrochloride (750 mg, 2.23 mmol, 0.90 eq.), dichloromethane (18 mL), pyridine (0.6 mL, 3.00 eq.). This was followed by the addition of a solution of tert-butyl (3R)-3-[(chlorocarbonyl)oxy]piperidine-1-carboxylate (655 mg, 2.48 mmol, 1.00 eq.) in dichloromethane (15 mL) dropwise with stirring at 0° C. The resulting solution was stirred for 1 overnight at rt. The resulting mixture was washed with water (1×100 mL) and sodium chloride (sat., 1×100 mL). The mixture was dried over anhydrous sodium sulfate and concentrated under vacuum. The crude product was purified by flash-prep-HPLC with the following conditions: Column, C18 silica gel; mobile phase, ACN (acetonitrile):Water (5:95) increasing to ACN:Water (100:0) within 60 min; Detector, UV 220 nm. This resulted in 0.3884 g (30%) of tert-butyl (3R)-3-([[(1R)-2-phenyl-1-[(1S,2S,6R,8S)-2,9,9-trimethyl-3,5-dioxa-4-boratricyclo[6.1.1.0^[2,6]]decan-4-yl]ethyl]carbamoyl]oxy)piperidine-1-carboxylate as a light yellow solid.

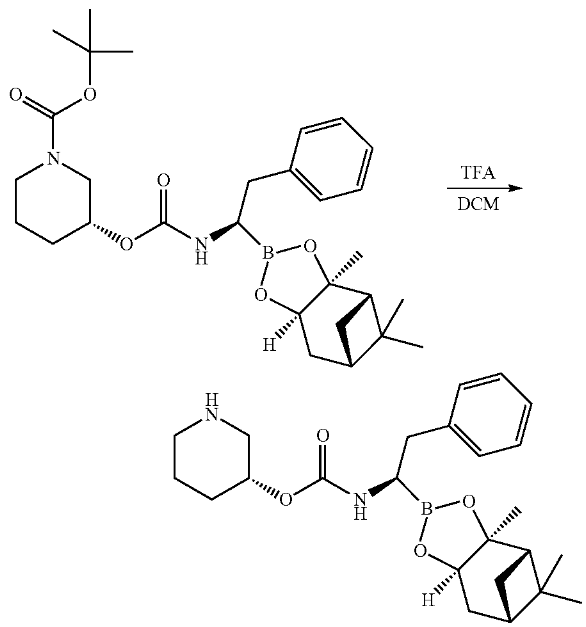

Into a 100-mL round-bottom flask, was placed tert-butyl (3R)-3-([[(1R)-2-phenyl -1-[(1S,2S,6R,8S)-2,9,9-trimethyl-3,5-dioxa-4-boratricyclo[6.1.1.0^[2,6]]decan-4-yl]ethyl]carbamoyl]oxy)piperidine-1-carboxylate (450 mg, 0.85 mmol, 1.00 eq.), dichloromethane (10 mL), trifluoroacetic acid (2 mL). The resulting solution was stirred for 30 min. at rt. The resulting mixture was concentrated under vacuum. This resulted in 364 mg (crude) of (3R)-piperidin-3-yl N-[(1R)-2-phenyl-1-[(1S,2S,6R,8S)-2,9,9-trimethyl-3,5-dioxa-4-boratricyclo[6.1.1.0^[2,6]]decan-4-yl]ethyl]carbamate as a light yellow solid.

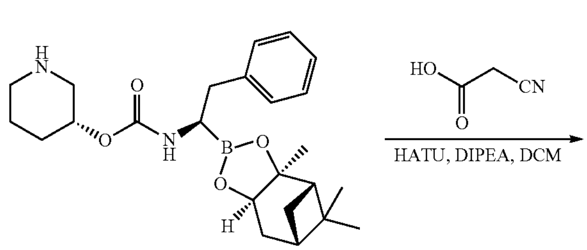

-continued

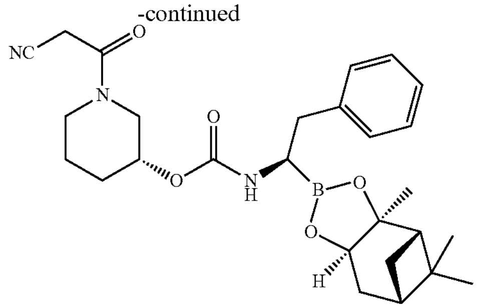

Into a 100-mL round-bottom flask, was placed (3R)-piperidin-3-yl N-[(1R)-2-phenyl -1-[(1S,2S,6R,8S)-2,9,9-trimethyl-3,5-dioxa-4-boratricyclo[6.1.1.0^[2,6]]decan-4-yl]ethyl]carbamate (364 mg, 0.85 mmol, 1.00 eq.), dichloromethane (10 mL), DIPEA (0.45 mL, 3.00 eq.), 2-cyanoacetic acid (72 mg, 0.85 mmol, 1.00 eq.), HATU (486 mg, 1.28 mmol, 1.50 eq.). The resulting solution was stirred for 1 h at rt. The resulting mixture was washed with 1×50 mL of Water and 1×50 mL of sodium chloride (aq.). The mixture was dried over anhydrous sodium sulfate and concentrated under vacuum. The crude product was purified by flash-prep-HPLC with the following conditions: Column, C18 silica gel; mobile phase, ACN:Water (5:95) increasing to ACN:Water (100:0) within 60 min.; Detector, UV 220 nm. This resulted in 150 mg (36%) of (3R)-1-(2-cyanoacetyl) piperidin-3-yl N-[(1R)-2-phenyl-1-[(1S,2S,6R,8S)-2,9,9-trimethyl-3,5-dioxa-4-boratricyclo[6.1.1.0^[2,6]]decan-4-yl]ethyl]carbamate as an off-white solid.

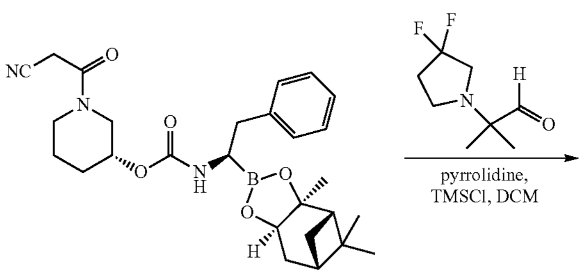

-continued

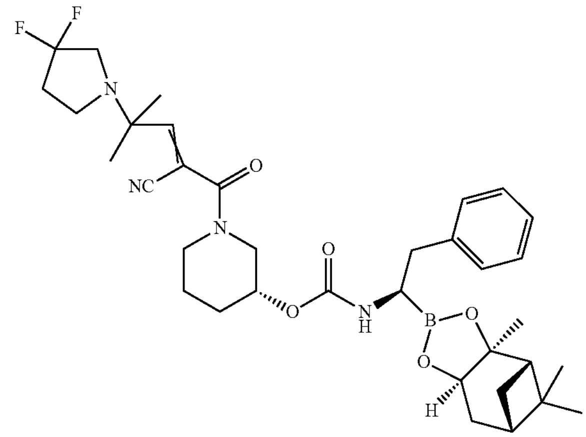

Into a 100-mL round-bottom flask, was placed (3R)-1-(2-cyanoacetyl)piperidin-3-yl N-[(1R)-2-phenyl-1-[(1S,2S,6R,8S)-2,9,9-trimethyl-3,5-dioxa-4-boratricyclo[6.1.1.0^[2,6]]decan-4-yl]ethyl]carbamate (150 mg, 0.30 mmol, 1.00 eq.), dichloromethane (5 mL), 2-(3,3-difluoropyrrolidin-1-yl)-2-methylpropanal (161.9 mg, 0.91 mmol, 3.00 eq.), pyrrolidine (0.156 mL, 5.00 eq.), TMSCl (0.168 mL, 5.00 eq.). The resulting solution was stirred for overnight at rt. The resulting mixture was washed with 1×100 mL of sodium chloride (aq.). The mixture was dried over anhydrous sodium sulfate. The crude product was purified by prep-HPLC with the following conditions: Column, XBridge Prep OBD C18 Column, 30*150 mm, 5 um; mobile phase, Water (10 mmol/L $NH_4HCO_3$ 0.1% $NH_3.H_2O$) and ACN (60.0% ACN up to 90.0% in 8 min); Detector, UV 254 nm. This resulted in 83 mg (41.83%) of (3R)-1-[2-cyano-2-[2-(3,3-difluoropyrrolidin-1-yl)-2-methylpropylidene]acetyl]piperidin-3-yl N-[(1R)-2-phenyl-1-[(1S,2S,6R,8S)-2,9,9-trimethyl-3,5-dioxa-4-boratricyclo[6.1.1.0^[2,6]]decan-4-yl]ethyl]carbamate as an off-white solid after lyophilization.

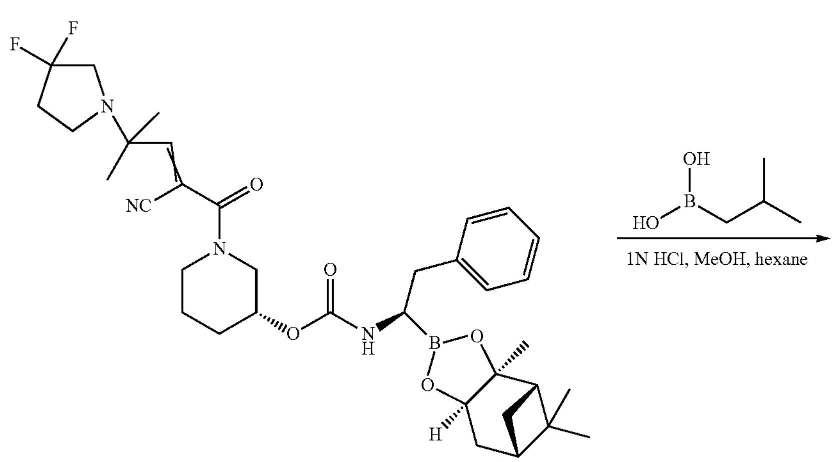

-continued

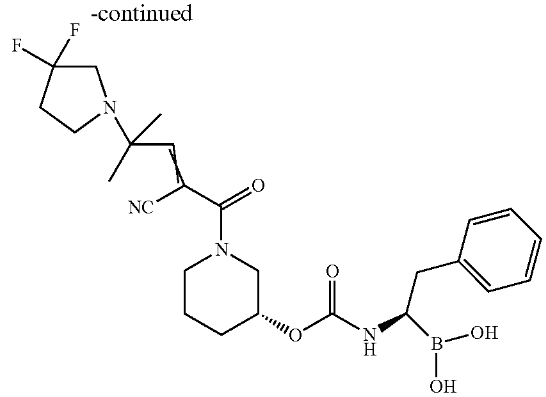

Into a 25-mL round-bottom flask, was placed (3R)-1-[2-cyano-2-[2-(3,3-difluoropyrrolidin-1-yl)-2-methylpropylidene]acetyl]piperidin-3-yl N-[(1R)-2-phenyl -1-[(1S,2S,6R,8S)-2,9,9-trimethyl-3,5-dioxa-4-boratricyclo[6.1.1.0^[2,6]]decan-4-yl]ethyl]carbamate (83 mg, 0.13 mmol, 1.00 eq.), methanol (6 mL), (2-methylpropyl) boronic acid (40 mg, 0.39 mmol, 3.00 eq.), hexane (6 mL), 1N hydrogen chloride (2.4 mL). The resulting solution was stirred for 1 h at rt. The hexane layer was discarded. The Methanol phase was dried over lyophilization. The crude product was purified by prep-HPLC with the following conditions: Column, XBridge Prep OBD C18 Column, 30*150 mm, 5 um; mobile phase, Water (10 mmol/L $NH_4HCO_3$+0.1% $NH_3.H_2O$) and ACN (28.0% ACN up to 39.0% in 10 min); Detector, UV 254 nm. This resulted in 25.3 mg (38%) of ((R)-1-(((((R)-1-(2-cyano-4-(3,3-difluoropyrrolidin-1-yl)-4-methylpent-2-enoyl)piperidin-3-yl)oxy)carbonyl)amino)-2-phenylethyl) boronic acid as a white solid after lyophilization again. LC-MS m/z: 501 [M-17].

Example 56

((R)-1-(2-((R)-1-(2-cyano-4-(3,3-difluoropyrrolidin-1-yl)-4-methylpent-2-enoyl)piperidin-3-yl)acetamido)-2-phenylethyl)boronic Acid

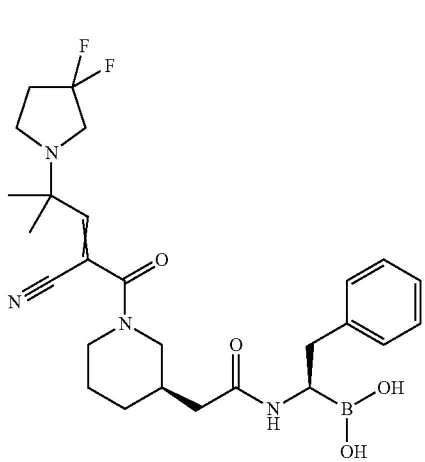

-continued

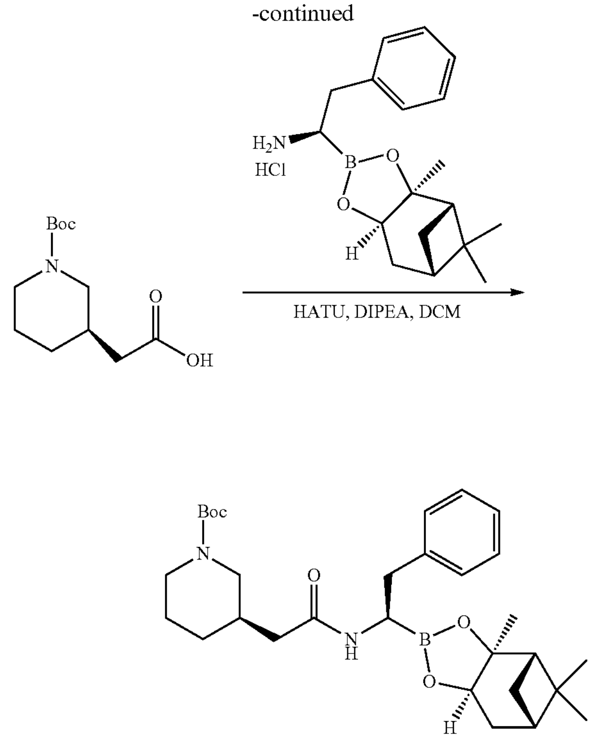

Into a 50-mL round-bottom flask, was placed 2-[(3R)-1-[(tert-butoxy)carbonyl]piperidin-3-yl]acetic acid (300 mg, 1.23 mmol, 1 eq.), DCM (10 mL), HATU (703.26 mg, 1.85 mmol, 1.500 eq.), DIPEA (478 mg, 3.70 mmol, 3.00 eq.), (1R)-2-phenyl-1-[(1S,2S,6R,8S)-2,9,9-trimethyl-3,5-dioxa-4-boratricyclo[6.1.1.0^[2,6]]decan-4-yl]ethan-1-amine hydrochloride (414 mg, 1.23 mmol, 1.00 eq.). The resulting solution was stirred for 1 h at rt. The resulting mixture was washed with $H_2O$ (1×20 mL) and brine (1×20 mL). The mixture was dried over anhydrous sodium sulfate concentrated under vacuum. The crude product was purified by flash-prep-HPLC with the following conditions: Column, C18 silica gel; mobile phase, ACN:$H_2O$ (5:95) increasing to ACN:$H_2O$ (24:1) within 60 min; Detector, uv 220 nm. This resulted in 440 mg (68.0%) of tert-butyl (R)-3-(2-oxo-2-(((R)-2-phenyl-1-((3aS,4S,6S,7aR)-3a,5,5-trimethylhexahydro-4,6-methanobenzo[d][1,3,2]dioxaborol-2-yl)ethyl)amino)ethyl)piperidine-1-carboxylate as a yellow solid.

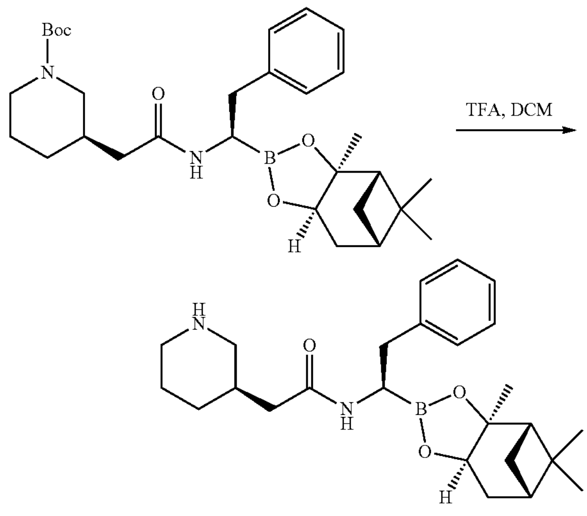

Into a 50-mL round-bottomed flask, was placed tert-butyl (3R)-3-([[(1R)-2-phenyl-1-[(1S,2S,6R,8S)-2,9,9-trimethyl-3,5-dioxa-4-boratricyclo[6.1.1.0^[2,6]]decan-4-yl]ethyl]carbamoyl]methyl)piperidine-1-carboxylate (257 mg, 0.49 mmol, 1 eq.), DCM (10 mL), TFA (2 mL). The resulting solution was stirred for 30 min at rt. The resulting mixture was concentrated under vacuum affording 200 mg (96.2%) of N-[(1R)-2-phenyl-1-[(1S,2S,6R,8S)-2,9,9-trimethyl-3,5-dioxa-4-boratricyclo[6.1.1.0^[2,6]]decan-4-yl]ethyl]-2-[(3R)-piperidin-3-yl]acetamide as a brown oil.

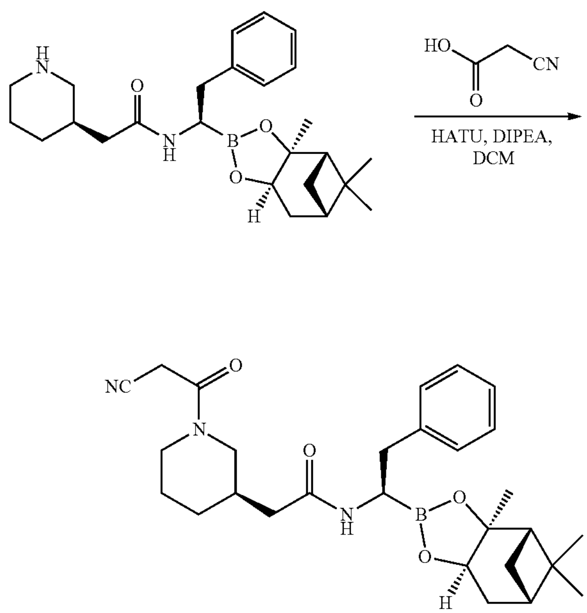

Into a 50-mL round-bottom flask, was placed N-[(1R)-2-phenyl-1-[(1S,2S,6R,8S)-2,9,9-trimethyl-3,5-dioxa-4-boratricyclo [6.1.1.0^[2,6]]decan-4-yl]ethyl]-2-[(3R)-piperidin-3-yl]acetamide (194 mg, 0.46 mmol, 1 eq.), DCM (10 mL), DIEA (177.4 mg, 1.37 mmol, 3.00 eq.), 2-cyanoacetic acid (38 mg, 0.45 mmol, 0.98 eq.), HATU (261 mg, 0.69 mmol, 1.50 eq.). The resulting solution was stirred for 1 h at rt. The resulting mixture was washed with water (1×30 mL) and brine (1×30 mL). The mixture was dried over anhydrous sodium sulfate concentrated under vacuum. The crude product was purified by flash-prep-HPLC with the following conditions: Column, C18 silica gel; mobile phase, ACN:$H_2O$=(5:95) increasing to ACN:$H_2O$ (30:70) within 60 min; Detector, uv 220 nm. This resulted in 180 mg (80.13%) of 2-[(3R)-1-(2-cyanoacetyl)piperidin-3-yl]-N-[(1R)-2-phenyl-1-[(1S,2S,6R,8S)-2,9,9-trimethyl-3,5-dioxa-4-boratricyclo[6.1.1.0^[2,6]]decan-4-yl]ethyl]acetamide as a light yellow solid.

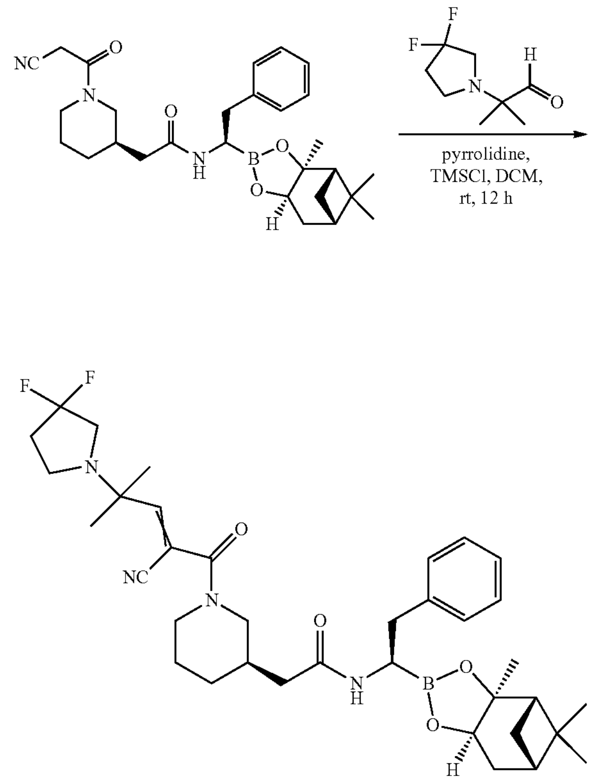 [SMILES: CC1(C)[C@@H]2C[C@H]3OB([C@H](Cc4ccccc4)NC(=O)C[C@H]4CCCN(C(=O)CC#N)C4)O[C@@]3(C)[C@H]1C2 ; CC(C)(C=O)N1CCC(F)(F)C1 ; CC1(C)[C@@H]2C[C@H]3OB([C@H](Cc4ccccc4)NC(=O)C[C@H]4CCCN(C(=O)C(C#N)=CC(C)(C)N5CCC(F)(F)C5)C4)O[C@@]3(C)[C@H]1C2]

Into a 50-mL round-bottom flask, was placed 2-[(3R)-1-(2-cyanoacetyl)piperidin-3-yl]-N-[(1R)-2-phenyl-1-[(1S, 2S,6R,8S)-2,9,9-trimethyl-3,5-dioxa-4-boratricyclo[6.1.1.0^ [2,6]]decan-4-yl]ethyl]acetamide (260 mg, 0.53 mmol, 1 eq.), DCM (8 mL, 0.35 mmol), 2-(3,3-difluoropyrrolidin-1-yl)-2-methylpropanal (280.9 mg, 1.59 mmol, 3.00 eq.), pyrrolidine (187.9 mg, 2.64 mmol, 4.99 eq.), chlorotrimethylsilane (287.1 mg, 2.64 mmol, 4.99 eq.). The resulting solution was stirred for 1 h at rt. The resulting mixture was washed with brine (1×30 mL), dried over anhydrous sodium sulfate and concentrated under vacuum. The crude product was purified by prep-HPLC with the following conditions: Column, XBridge Prep OBD C18 Column, 30*150 mm*5 um; mobile phase, Water (10 mmol/L $NH_4HCO_3$+0.1% $NH_3.H_2O$) and ACN (50% PhaseB up to 80% in 8 min); Detector, uv 254 nm. This resulted in 140 mg (40.67%) of 2-((R)-1-(2-cyano-4-(3,3-difluoropyrrolidin-1-yl)-4-methylpent-2-enoyl)piperidin-3-yl)-N—((R)-2-phenyl-1-((3aS, 4S,6S,7aR)-3a,5,5-trimethylhexahydro-4,6-methanobenzo [d][1,3,2]dioxaborol-2-yl)ethyl)acetamide as a white solid.

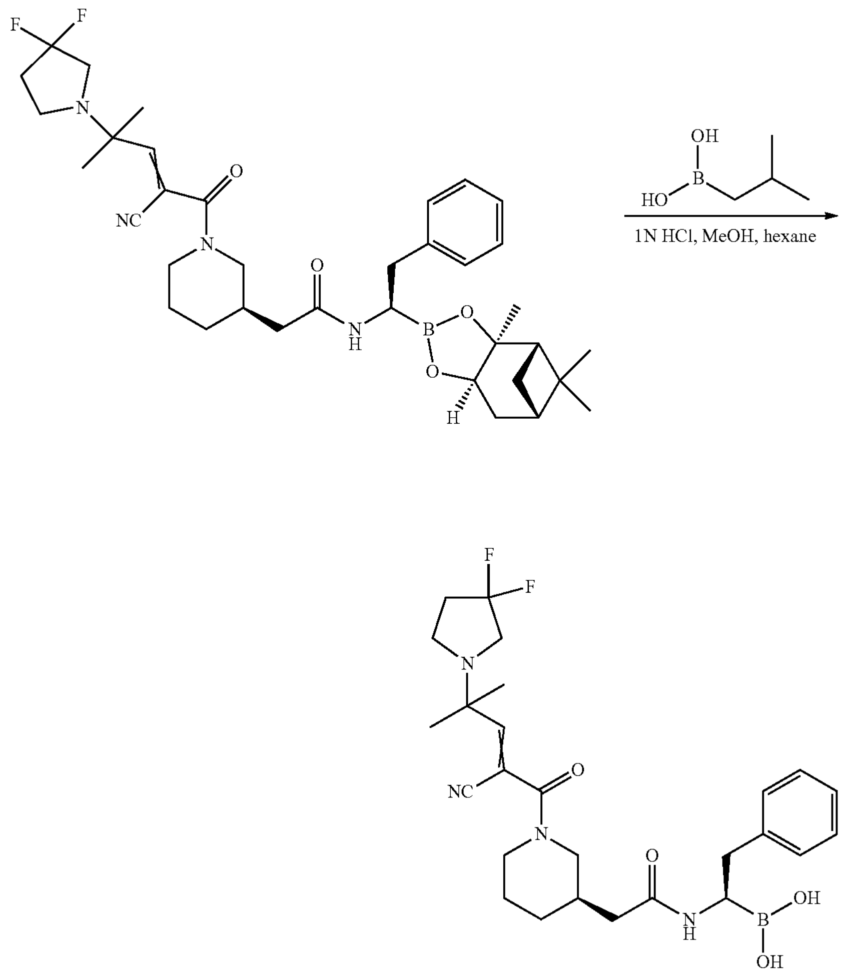

Into a 50-mL round-bottomed flask, was placed 2-((R)-1-(2-cyano-4-(3,3-difluoropyrrolidin-1-yl)-4-methylpent-2-enoyl)piperidin-3-yl)-N—((R)-2-phenyl-1-((3aS,4S,6S,7aR)-3a,5,5-trimethylhexahydro-4,6-methanobenzo[d][1,3,2]dioxaborol-2-yl)ethyl)acetamide (120 mg, 0.18 mmol, 1 eq.), MeOH (4 mL), (2-methylpropyl)boronic acid (56.4 mg, 0.55 mmol, 3.00 eq.), hexane (4 mL), and 1N HCl (4 mL). The resulting solution was stirred for 1 h at rt. The hexane layer was discarded. The methanol layer was diluted with water (20 mL) then dried over lyophilization. The crude product was purified by prep-HPLC with the following conditions: Column, Atlantis HILIC OBD Column, 19×150 mm, 5 um; mobile phase, Water (10 mmol/L $NH_4HCO_3$+0.1% $NH_3.H_2O$) and ACN (65% PhaseB up to 95% in 8 min); Detector, uv 254 nm. This resulted in 49.5 mg (51.9%) of ((R)-1-(2-((R)-1-(2-cyano-4-(3,3-difluoropyrrolidin-1-yl)-4-methylpent-2-enoyl)piperidin-3-yl)acetamide-N—((R)-2-phenylethyl)boronic acid as a white solid. LC-MS m/z: 499 [M-17].

Example 57

(R)-(1-((((7-(2-cyan-4-(3,3-difluoropyrrolidin-yl)-4-methylpent-2-enoyl)-7-azabicyclo[2.2.1]heptan-1-yl)methoxy)carbonyl)amino)-2-phenylethyl)boronic Acid

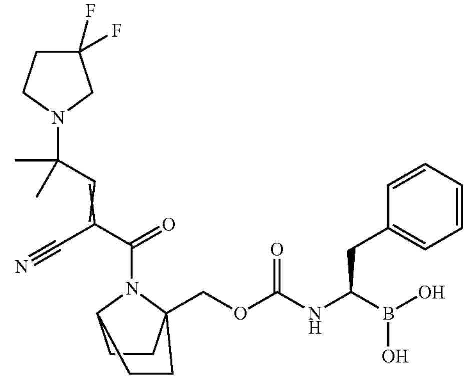

-continued

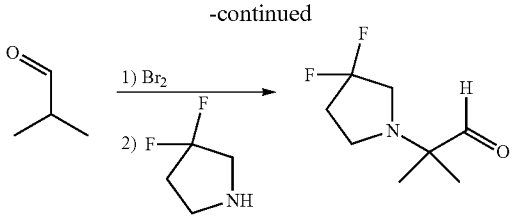

To a solution of isobutyraldehyde (4.04 g, 56 mmol) in DCM (150 mL) at 0° C. was added dropwise $Br_2$ (6.28 g, 39.2 mmol). The resulted mixture was stirred at 0° C. for 5 min, then washed with water (45 mL), saturated $NaHCO_3$ aq. (45 mL) and brine (45 mL). After dried over $Na_2SO_4$, the organic phase was concentrated under vacuum to give 6 g of 2-bromo-2-methylpropanal as colorless liquid which was used into next step without further purification.

To a mixture of a portion of the 2-bromo-2-methylpropanal (3.5 g), 3,3-difluoropyrrolidine hydrochloride (2.0 g, 13.9 mmol) in DCM (70 mL) was added dropwise DIPEA (5.4 g, 41.8 mmol) at 0° C. The resulting mixture was allowed to warm to rt and stirred for 6 h, then concentrated to dryness. The residue was stirred in EtOAc (40 mL) for 5 min, then filtered. The filtrate was concentrated in vacuo. The crude residue was purified via silica chromatography to afford 2-(3,3-difluoropyrrolidin-1-yl)-2-methylpropanal as a colorless solid (1.4 g).

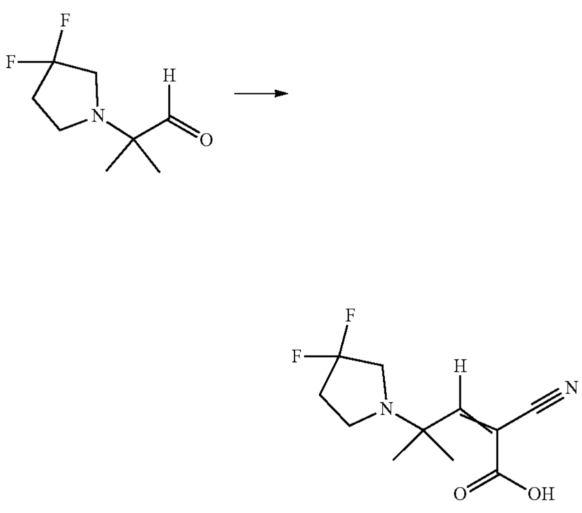

To a solution of 2-(3,3-difluoropyrrolidin-1-yl)-2-methylpropanal (2.3 g, 12.98 mmol), 2-cyanoacetic acid (1.10 g, 12.98 mmol) and pyrrolidine (7.39 g, 103.8 mmol) in DCM (30 mL) in ice-water bath was added dropwise chloro (trimethyl)silane (6.58 mL, 51.92 mmol). The reaction was stirred at rt for 2 h, then concentrated in vacuo. The pH of the mixture was adjusted to 5-6 with $NaHSO_4$ (aq) before extraction with DCM (3×50 mL). The organic layers were combined then washed with brine (50 mL), dried over $Na_2SO_4$ and concentrated in vacuo. The crude material was purified via silica chromatography to afford 800 mg of 2-cyano-4-(3,3-difluoropyrrolidin-1-yl)-4-methylpent-2-enoic acid as a yellow solid.

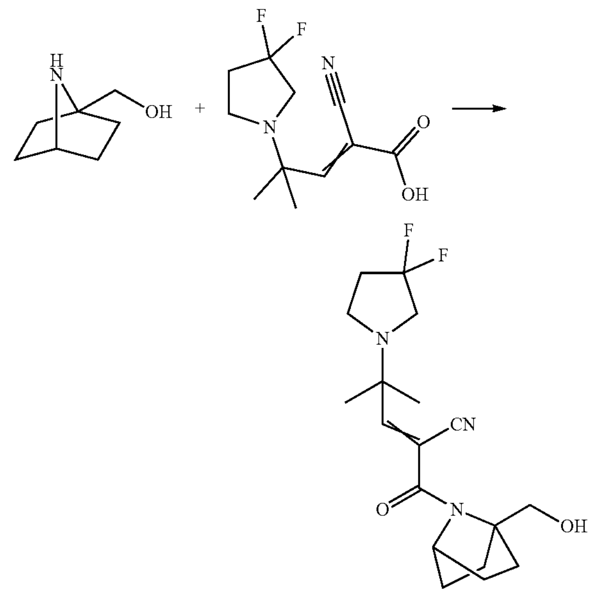

To a mixture of 2-cyano-4-(3,3-difluoropyrrolidin-1-yl)-4-methylpent-2-enoic acid (300 mg, 1.23 mmol), 7-azabicyclo[2.2.1]heptan-1-ylmethanol (156.2 mg, 1.23 mmol) and DIPEA (952.5 mg, 7.37 mmol) in DCM (10 mL) was added portionwise BOP (543.3 mg, 1.23 mmol) at 0° C. The resulted mixture was stirred at rt for 12 h, then concentrated to dryness. The crude residue was purified via silica chromatography and a gradient of 0%-100% EtOAc in hexanes to afford 4-(3,3-difluoropyrrolidin-1-yl)-2-(1-(hydroxymethyl)-7-azabicyclo[2.2.1]heptane-7-carbonyl)-4-methylpent-2-enenitrile as colorless oil (170 mg, 39.2%).

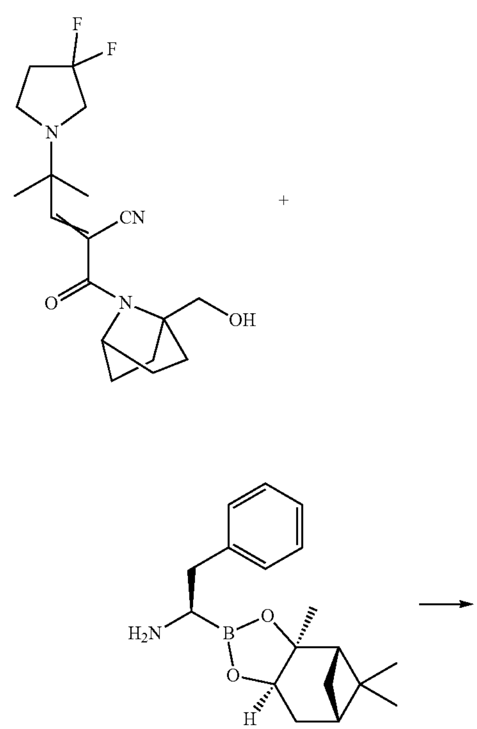

-continued

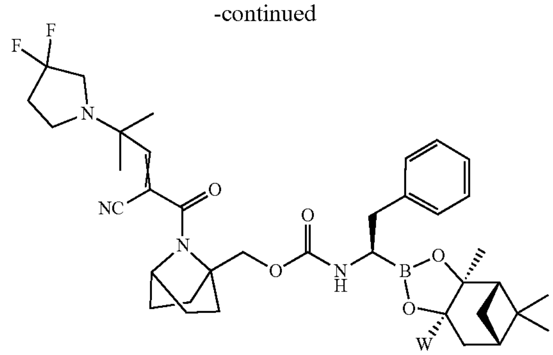

Bis(trichloromethyl) carbonate (142.75 mg, 0.48 mmol) in DCM (1.5 mL) was added dropwise into a stirring solution of 4-(3,3-difluoropyrrolidin-1-yl)-2-(1-(hydroxymethyl)-7-azabicyclo[2.2.1]heptane-7-carbonyl)-4-methylpent-2-enenitrile (170 mg, 0.48 mmol) and DIPEA (373.0 mg, 2.89 mmol) in DCM (6 mL) at 0° C. The mixture was stirred for 2 h at 0° C. The resulting solution was added dropwise into a well-stirred solution of (R)-2-phenyl-1-((3aS,4S,6S,7aR)-3a,5,5-trimethylhexahydro-4,6-methanobenzo[d][1,3,2]dioxaborol-2-yl)ethanamine hydrochloride (161.4 mg, 0.48 mmol) and DIPEA (186.5 mg, 1.44 mmol) in DCM (5 mL) at 0° C. The reaction was stirred at 0° C. for 1 h, then diluted with DCM (25 mL), washed with water (10 mL) and brine (10 mL), dried over $Na_2SO_4$, filtered, and concentrated in vacuo to afford 400 mg (7-(2-cyano-4-(3,3-difluoropyrrolidin-1-yl)-4-methylpent-2-enoyl)-7-azabicyclo[2.2.1]heptan-1-yl)methyl((R)-2-phenyl-1-((3aS,4S,6S,7aR)-3a,5,5-trimethylhexahydro-4,6-methanobenzo[d][1,3,2]dioxaborol-2-yl)ethyl)carbamate as an oil which was used in the following step without further purification.

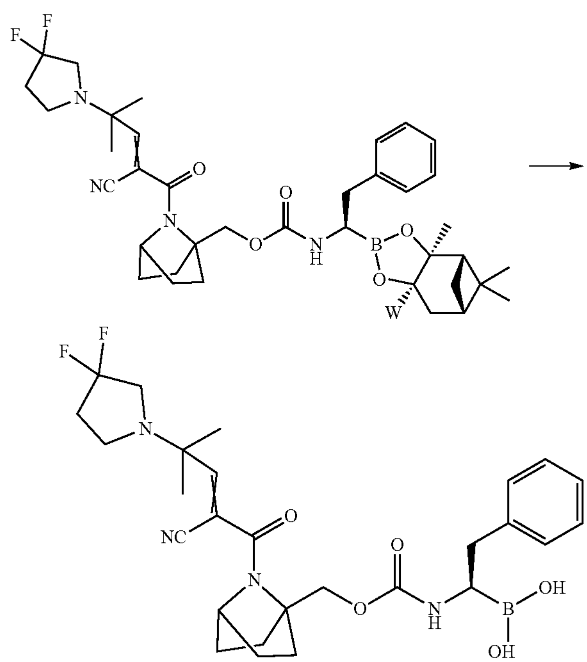

To a solution of (7-(2-cyano-4-(3,3-difluoropyrrolidin-1-yl)-4-methylpent-2-enoyl)-7-azabicyclo[2.2.1]heptan-1-yl) methyl ((R)-2-phenyl-1-((3aS,4S,6S,7aR)-3a,5,5-trimethylhexahydro-4,6-methanobenzo[d][1,3,2]dioxaborol-2-yl)ethyl)carbamate (400 mg, 0.59 mmol) in MeOH (3 mL) were added hexanes (3 mL) and 1 N HCl (1 mL), followed by isobutyl boric acid (180.3 mg, 1.77 mmol). After stirring at rt for 3 h, the pH of the mixture was adjusted to 7 with $NaHCO_3$ (aq) before the hexanes layer was discarded. The methanol layer was diluted with water (20 mL), then dried over lyophilization to give a crude product which was further purified in prep-HPLC to afford (R)-(1-((((7-(2-cyano-4-(3,3-difluoropyrrolidin-1-yl)-4-methylpent-2-enoyl)-7-azabicyclo[2.2.1]heptan-1-yl)methoxy)carbonyl)amino)-2-phenylethyl)boronic acid as a colorless solid (4 mg). LC-MS m/z: 567 [M+23]

Example 58

((R)-1-(2-((R)-4-(2-cyano-4-(3,3-difluoropyrrolidin-1-yl)-4-methylpent-2-enoyl)morpholin-2-yl)acetamido)-2-phenylethyl)boronic Acid

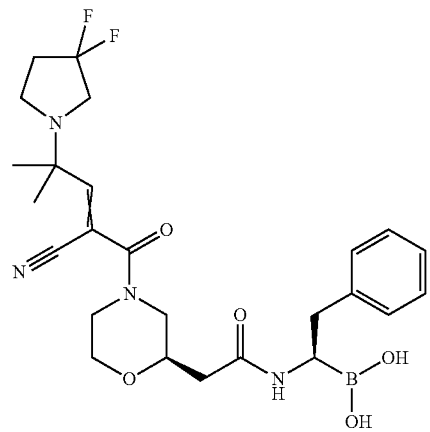

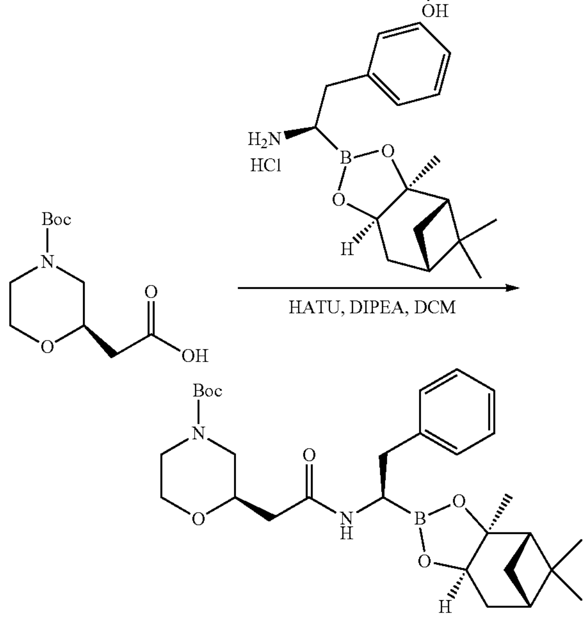

Into a 50-mL round-bottom flask, was placed 2-[(2R)-4-[(tert-butoxy)carbonyl]morpholin-2-yl]acetic acid (300 mg, 1.22 mmol, 1 eq.), HATU (698.0 mg, 1.84 mmol, 1.50 eq.), DCM (10 mL), DIPEA (474.5 mg, 3.67 mmol, 3.00 eq.), (1R)-2-phenyl-1-[(1S,2S,6R,8S)-2,9,9-trimethyl-3,5-dioxa-4-boratricyclo[6.1.1.0^[2,6]]decan-4-yl]ethan-1-amine hydrochloride (410.8 mg, 1.22 mmol, 1.00 eq.). The resulting solution was stirred for 1 h at rt. The resulting mixture was washed with water (1×30 mL) and brine (1×30 mL). The mixture was dried over anhydrous magnesium sulfate and concentrated under vacuum. The crude product was purified by flash-prep-HPLC with the following conditions: Column, C18 silica gel; mobile phase, ACN:$H_2O$ (5:95) increasing to ACN:$H_2O$ (97:3) within 60 min; Detector, uv 220 nm. This resulted in 500 mg (77.6%) of tert-butyl (2R)-2-([[(1R)-2-phenyl-1-[(1S,2S,6R,8S)-2,9,9-trimethyl-3,5-dioxa-4-boratricyclo[6.1.1.0^[2,6]]decan-4-yl]ethyl]carbamoyl]methyl)morpholine-4-carboxylate as a light yellow solid.

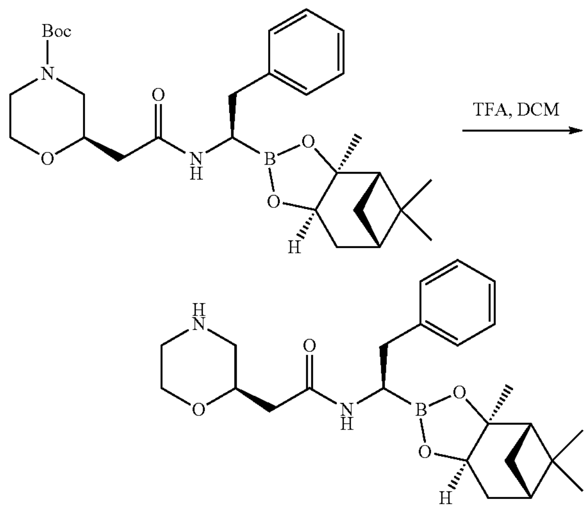

Into a 50-mL round-bottom flask, was placed tert-butyl (2R)-2-([[(1R)-2-phenyl-1-[(1S,2S,6R,8S)-2,9,9-trimethyl-3,5-dioxa-4-boratricyclo[6.1.1.0^[2,6]]decan-4-yl]ethyl]carbamoyl]methyl)morpholine-4-carboxylate (538 mg, 1.02 mmol, 1 eq.), DCM (15 mL), TFA (3 mL, 40.39 mmol, 39.524 eq.). The resulting solution was stirred for 30 min at rt. The resulting mixture was concentrated under vacuum. This resulted in 420 mg (96.40%) of 2-[(2R)-morpholin-2-yl]-N-[(1R)-2-phenyl-1-[(1S,2S,6R,8S)-2,9,9-trimethyl-3,5-dioxa-4-boratricyclo[6.1.1.0^[2,6]]decan-4-yl]ethyl]acetamide as a brown oil.

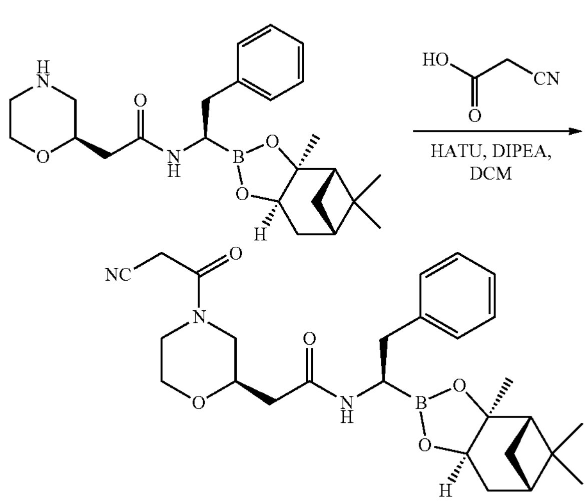

Into a 50-mL round-bottom flask, was placed 2-[(2R)-morpholin-2-yl]-N-[(1R)-2-phenyl-1-[(1S,2S,6R,8S)-2,9,9-trimethyl-3,5-dioxa-4-boratricyclo[6.1.1.0^[2,6]]decan-4-yl]ethyl]acetamide (435.7 mg, 1.02 mmol, 1 eq.), DCM (10 mL, 157.3 mmol, 153.9 eq.), DIEA (396.3 mg, 3.07 mmol, 3.00 eq.), 2-cyanoacetic acid (87 mg, 1.02 mmol, 1.00 eq.), HATU (583 mg, 1.53 mmol, 1.50 eq.). The resulting solution was stirred for 1 h at rt. The resulting mixture was washed with water (1×30 mL) and brine (1×30 mL). The mixture was dried over anhydrous sodium sulfate and concentrated under vacuum. The crude product was purified by flash-prep-HPLC with the following conditions: Column, C18 silica gel; mobile phase, ACN:$H_2O$ (5:95) increasing to ACN:$H_2O$ (70:30) within 60 min; Detector, uv 220 nm. This resulted in 450 mg (89.2%) of 2-[(2R)-4-(2-cyanoacetyl)morpholin-2-yl]-N-[(1R)-2-phenyl-1-[(1S,2S,6R,8S)-2,9,9-trimethyl-3,5-dioxa-4-boratricyclo[6.1.1.0^[2,6]]decan-4-yl]ethyl]acetamide as a light yellow solid.

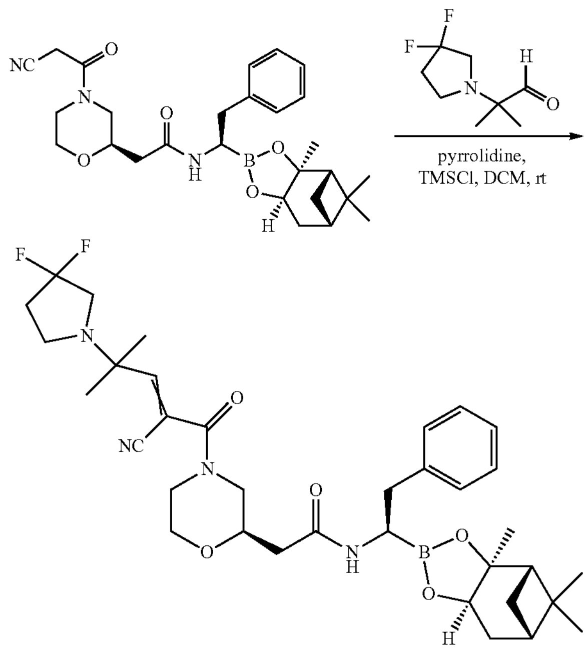

Into a 50-mL round-bottom flask, was placed 2-[(2R)-4-(2-cyanoacetyl)morpholin-2-yl]-N-[(1R)-2-phenyl-1-[(1S,2S,6R,8S)-2,9,9-trimethyl-3,5-dioxa-4-boratricyclo[6.1.1.0^[2,6]]decan-4-yl]ethyl]acetamide (260 mg, 0.53 mmol, 1 eq.), DCM (10 mL), 2-(3,3-difluoropyrrolidin-1-yl)-2-methylpropanal (280.2 mg, 1.58 mmol, 3.00 eq.), pyrrolidine (187.43 mg, 2.64 mmol, 5.001 eq.), chlorotrimethylsilane (286.3 mg, 2.64 mmol, 5.00 eq.). The resulting solution was stirred for 2 h at rt. The resulting mixture was washed with brine (50 mL). The mixture was dried over anhydrous sodium sulfate and concentrated under vacuum. The crude product was purified by prep-HPLC with the following conditions: Column, XBridge Prep OBD C18 Column, 30*150 mm*5 um; mobile phase, Water (10 mmol/L $NH_4HCO_3$+0.1% $NH_3.H_2O$) and ACN (50% PhaseB up to 80% in 8 min); Detector, uv 254 nm. This resulted in 120 mg of 2-((R)-4-(2-cyano-4-(3,3-difluoropyrrolidin-1-yl)-4-methylpent-2-enoyl)morpholin-2-yl)-N—((R)-2-phenyl-1-((3aS,4S,6S,7aR)-3a,5,5-trimethylhexahydro-4,6-methanobenzo [d][1,3,2]dioxaborol-2-yl)ethyl)acetamide as a white solid.

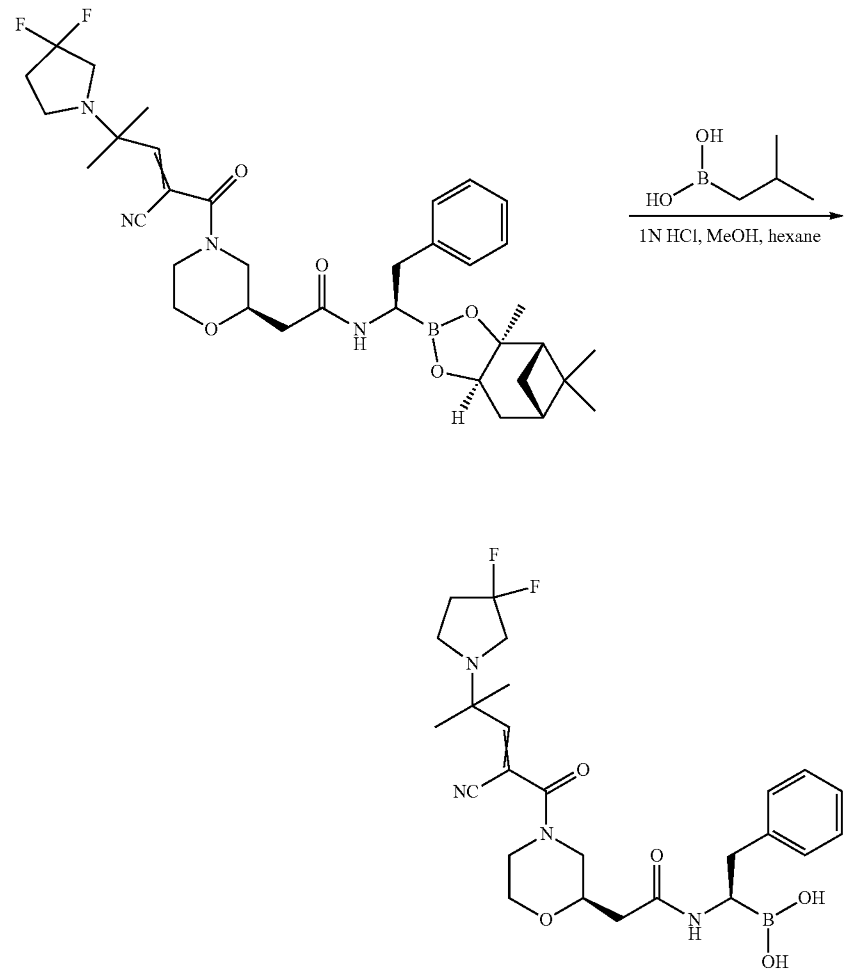

Into a 50-mL round-bottom flask, was placed 2-((R)-4-(2-cyano-4-(3,3-difluoropyrrolidin-1-yl)-4-methylpent-2-enoyl)morpholin-2-yl)-N—((R)-2-phenyl-1-((3 aS,4S,6S,7aR)-3a,5,5-trimethylhexahydro-4,6-methanobenzo[d][1,3,2]dioxaborol-2-yl)ethyl)acetamide (120 mg, 0.18 mmol, 1 eq.), MeOH (4 mL), (2-methylpropyl)boronic acid (56.2 mg, 0.55 mmol, 2.998 eq.), hexane (4 mL), 1N HCl (3.7 mL). The resulting solution was stirred for 1 h at rt. The hexane layer was discarded. The methanol layer was diluted with water (20 mL) then dried over lyophilization. The crude product was purified by prep-HPLC with the following conditions: Column, XBridge Prep OBD C18 Column, 30*150 mm*5 um; mobile phase, Water (10 mmol/L $NH_4HCO_3$+0.1% $NH_3.H_2O$) and ACN (25% PhaseB up to 45% in 8 min); Detector, uv 254 nm. This resulted in 36.6 mg (38.40%) of ((R)-1-(2-((R)-4-(2-cyano-4-(3,3-difluoropyrrolidin-1-yl)-4-methylpent-2-enoyl)morpholin-2-yl)acetamido)-2-phenylethyl)boronic acid as a white solid. LC-MS m/z: 501 [M-17].

Example 59

((R)-1-(2-((S)-1-(2-cyano-4-(3,3-difluoropyrrolidin-1-yl)-4-methylpent-2-enoyl)piperidin-3-yl)acetamido)-2-phenylethyl)boronic Acid

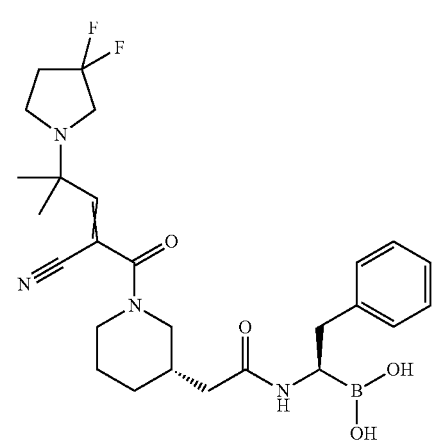

-continued

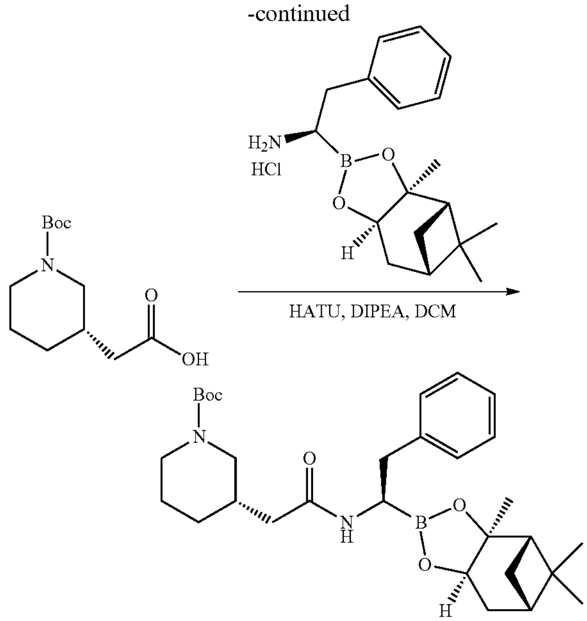

Into a 50-mL round-bottom flask, was placed 2-[3S)-1-[(tert-butoxy) carbonyl]piperidin-3-yl]acetic acid (300 mg, 1.23 mmol, 1 eq.). HATU (703 mg, 1.85 mmol, 1.50eq.), DCM (10 mL), DIPEA (478.7 mg, 3.70 mmol, 3.00 eq.), (1R)-2-phenyl-1-[(1S,2S,6R,8S)-2,9,9-trimethyl-3,5-dioxa-4-boratricyclo [6.1.1.0/\[2.6]]decan-4-yl]ethan-1-amine hydrochloride (413.9 mg, 1.23 mmol, 1.00 eq.). The resulting solution was stirred for 1 h at rt. The resulting mixture was washed with water (1×20 mL) and brine (1×20 mL). The mixture was dried over anhydrous sodium sulfate concentrated under vacuum. The crude product was purified by flash-prep-HPLC with the following conditions: Column, C18 silica gel: mobile phase, ACN:$H_2O$ (5:95) increasing to ACN:$H_2O$ (100:0) within 60 min; Detector, uv 220 nm. This resulted in 600 mg (92.8%) of tert-butyl (3S)-3-([[(1R)-2-phenyl-1-[(1S,2S,6R,8S)-2,9,9-trimethyl-3,5-dioxa-4-boratricyclo[6.1.1.0/\[2.6]]decan-4-yl]ethyl]carbamoyl] methyl)piperidine-1-carboxylate as a light yellow solid.

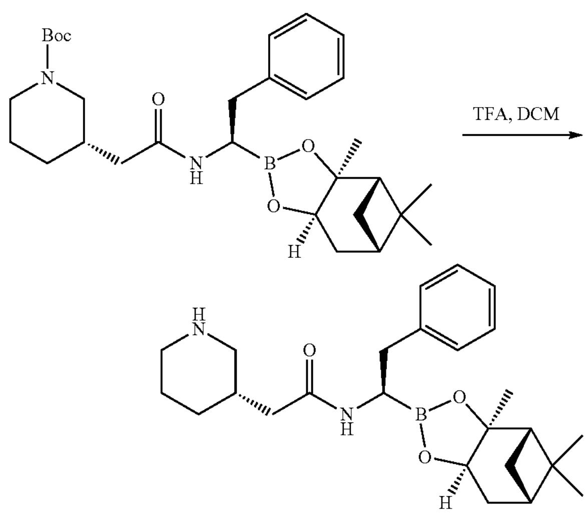

Into a 50-mL round-bottom flask, was placed tert-butyl (3S)-3-([[(1R)-2-phenyl-1-[(1S,2S,6R,8S)-2,9,9-trimethyl-3,5-dioxa-4-boratricyclo[6.1.1.0^[2,6]]decan-4-yl]ethyl]carbamoyl]methyl)piperidine-1-carboxylate (645 mg, 1.23 mmol, 1 eq.), DCM (15 mL), TFA (3.0 mL, 26.3 mmol, 32.8 eq.). The resulting solution was stirred for 30 min at rt. The resulting mixture was concentrated under vacuum. This resulted in 520 mg (99.6%) of N-[(1R)-2-phenyl-1-[(1S,2S,6R,8S)-2,9,9-trimethyl-3,5-dioxa-4-boratricyclo[6.1.1.0^[2,6]]decan-4-yl]ethyl]-2-[(3S)-piperidin-3-yl]acetamide as a brown oil.

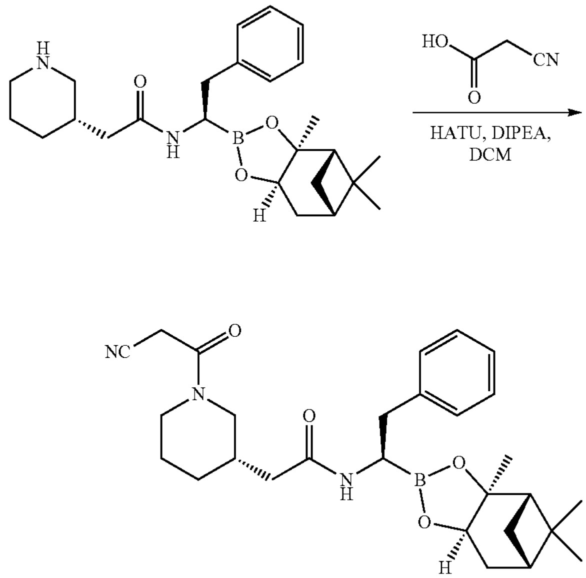 [SMILES: CC1(C)[C@@H]2C[C@H]3OB([C@H](Cc4ccccc4)NC(=O)C[C@@H]4CCCNC4)O[C@@]3(C)[C@H]1C2 ; N#CCC(=O)O ; CC1(C)[C@@H]2C[C@H]3OB([C@H](Cc4ccccc4)NC(=O)C[C@@H]4CCCN(C(=O)CC#N)C4)O[C@@]3(C)[C@H]1C2]

Into a 50-mL round-bottom flask, was placed N-[(1R)-2-phenyl-1-[(1S,2S,6R,8S)-2,9,9-trimethyl-3,5-dioxa-4-boratricyclo [6.1.1.0^[2,6]]decan-4-yl]ethyl]-2-[(3S)-piperidin-3-yl]acetamide (520 mg, 1.23 mmol, 1 eq.), DCM (15 mL), DIEA (476.8 mg, 3.69 mmol, 3.01 eq.), 2-cyanoacetic acid (104.6 mg, 1.23 mmol, 1.00 eq.), HATU (701 mg, 1.84 mmol, 1.50 eq.). The resulting solution was stirred for 1 h at rt. The resulting mixture was washed with water (1×30 mL) and brine (1×30 mL). The mixture was dried over anhydrous sodium sulfate and concentrated under vacuum. The crude product was purified by flash-prep-HPLC with the following conditions: Column, C18 silica gel; mobile phase, ACN:$H_2O$ (5:95) increasing to ACN:$H_2O$ (70:30) within 60; Detector, uv 220 nm. This resulted in 530 mg (88.0%) of 2-[(3S)-1-(2-cyanoacetyl)piperidin-3-yl]-N-[(1R)-2-phenyl-1-[(1S,2S,6R,8S)-2,9,9-trimethyl-3,5-dioxa-4-boratricyclo [6.1.1.0^[2,6]]decan-4-yl]ethyl]acetamide as a light yellow solid.

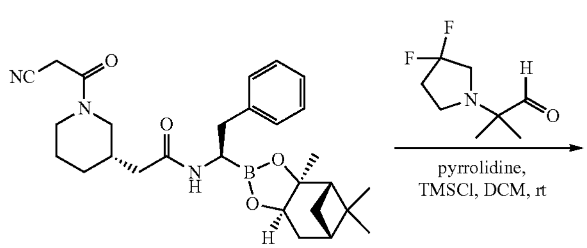

-continued

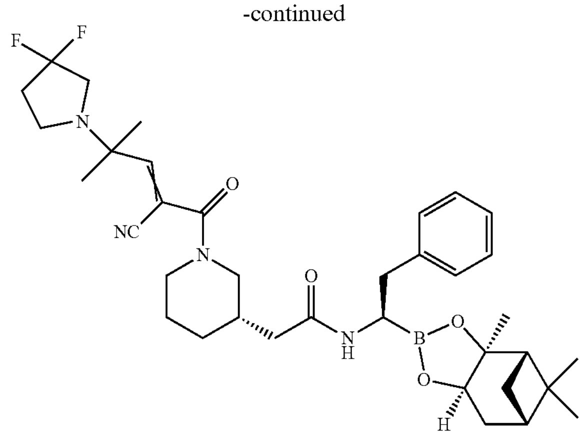

Into a 50-mL round-bottom flask, was placed 2-[(3S)-1-(2-cyanoacetyl)piperidin-3-yl]-N-[(1R)-2-phenyl-1-[(1S, 2S,6R,8S)-2,9,9-trimethyl-3,5-dioxa-4-boratricyclo[6.1.1.0^[2,6]]decan-4-yl]ethyl]acetamide (256 mg, 0.52 mmol, 1 eq.), DCM (10 mL, 157.30 mmol), 2-(3,3-difluoropyrrolidin-1-yl)-2-methylpropanal (276.6 mg, 1.56 mmol, 2.99 eq.), pyrrolidine (185.0 mg, 2.60 mmol, 4.99 eq.), chlorotrimethylsilane (282.6 mg, 2.60 mmol, 4.99 eq.). The resulting solution was stirred for 1 h at rt. The resulting mixture was washed with water (1×30 mL) and brine (1×30 mL). The mixture was dried over anhydrous sodium sulfate and concentrated under vacuum. The crude product was purified by prep-HPLC with the following conditions: Column, XBridge Prep OBD C18 Column, 30*150 mm*5 um; mobile phase, Water (10 mmol/L $NH_4HCO_3$+0.1% $NH_3.H_2O$) and ACN (50% PhaseB up to 80% in 8 min); Detector, uv 254 nm. This resulted in 131 mg (38.6%) of 2-((S)-1-(2-cyano-4-(3,3-difluoropyrrolidin-1-yl)-4-methylpent-2-enoyl)piperidin-3-yl)-N—((R)-2-phenyl-1-((3aS,4S, 6S,7aR)-3a,5,5-trimethylhexahydro-4,6-methanobenzo[d][1,3,2]dioxaborol-2-yl)ethyl)acetamide as a white solid.

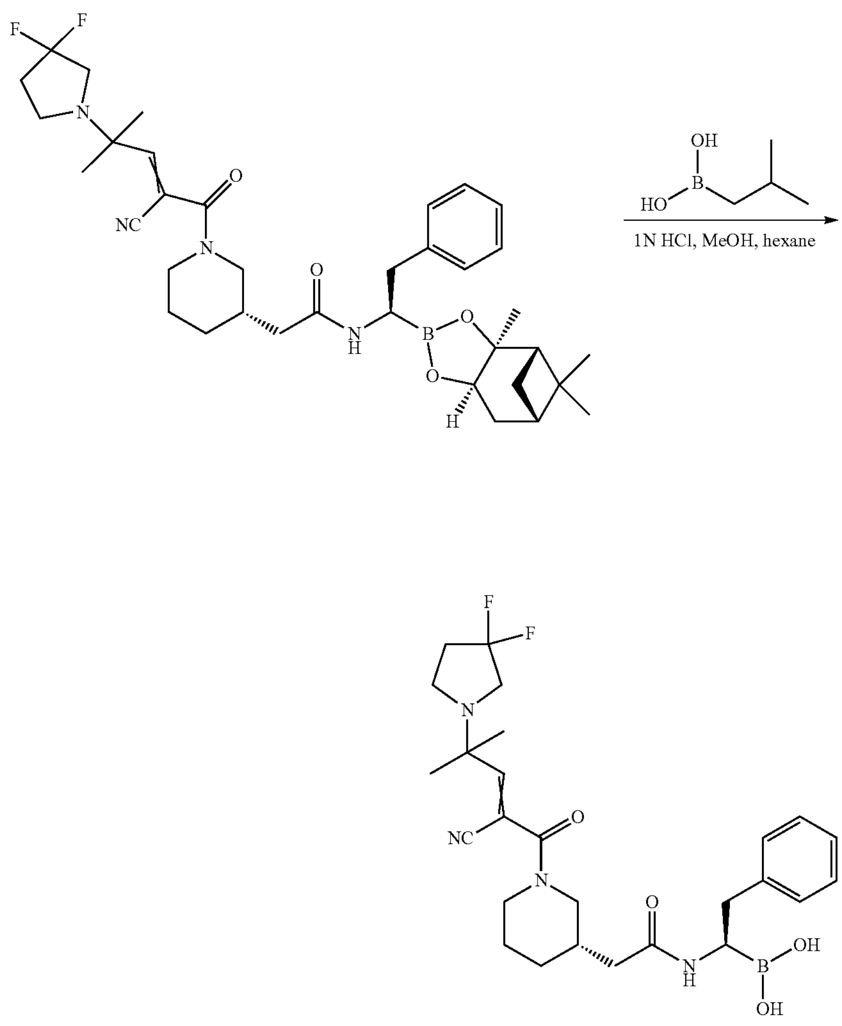

Into a 50-mL round-bottom flask, was placed 2-((S)-1-(2-cyano-4-(3,3-difluoropyrrolidin-1-yl)-4-methylpent-2-enoyl)piperidin-3-yl)-N—((R)-2-phenyl-1-((3aS,4S,6S,7aR)-3a,5,5-trimethylhexahydro-4,6-methanobenzo[d][1,3,2]dioxaborol-2-yl)ethyl)acetamide (140 mg, 0.22 mmol, 1 eq.), MeOH (5 mL), (2-methylpropyl)boronic acid (65.7 mg, 0.65 mmol, 2.99 eq.), hexane (5 mL), 1N HCl (4.3 mL). The resulting solution was stirred for 1 h at rt. The hexane layer was discarded. The methanol layer was diluted with water (20 mL) then dried over lyophilization. The crude product was purified by prep-HPLC with the following conditions: Column, XBridge Prep OBD C18 Column, 30*150 mm*5 um; mobile phase, Water (10 mmol/L $NH_4HCO_3$+0.1% $NH_3.H_2O$) and ACN (25% PhaseB up to 45% in 8 min); Detector, UV. This resulted in 38.4 mg (51.9%) of ((R)-1-(2-((S)-1-(2-cyano-4-(3,3-difluoropyrrolidin-1-yl)-4-methylpent-2-enoyl)piperidin-3-yl)acetamido)-2-phenylethyl)boronic acid as a white solid. LC-MS m/z: 517 [M+1].

Example 60

((R)-1-(((((S)-1-(2-cyano-4-(3,3-difluoropyrrolidin-1-yl)-4-methylpent-2-enoyl)piperidin-3-yl)oxy)carbonyl)amino)-2-phenylethyl)boronic Acid

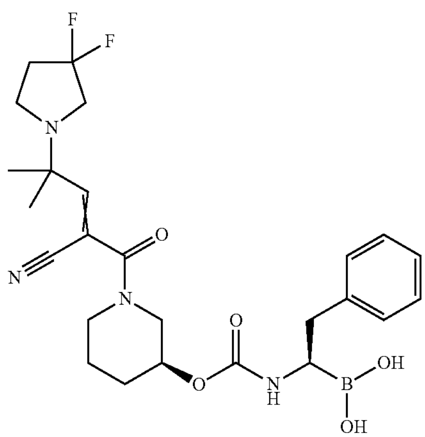

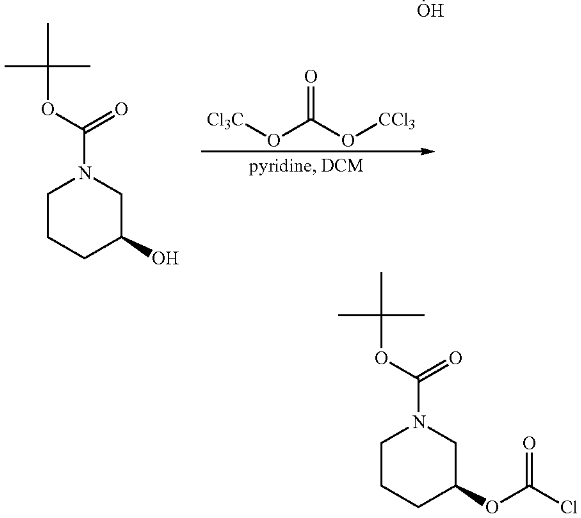

Into a 50-mL 3-necked round-bottom flask purged and maintained with an inert atmosphere of nitrogen, was placed tert-butyl (3S)-3-hydroxypiperidine-1-carboxylate (600 mg, 2.98 mmol, 1 eq.), DCM (12 mL) and pyridine (708 mg, 8.95 mmol, 3.00 eq.). The mixture was stirred and cooled to 0° C. A solution of ditrichloromethyl carbonate (442 mg, 1.49 mmol, 0.50 eq.) in DCM (6 mL) was added dropwise. The resulting suspension was stirred for 2 h at 0° C. and used directly to the next step.

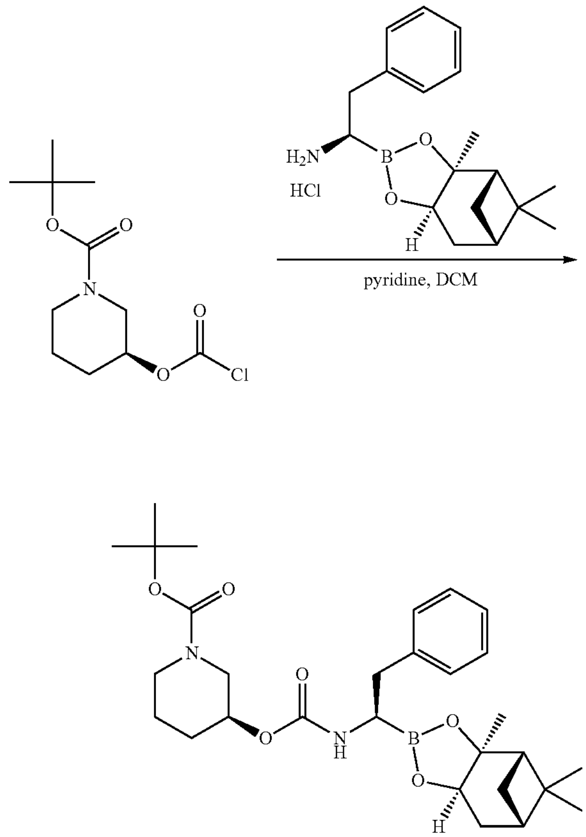

Into a 100-mL 3-necked round-bottom flask purged and maintained with an inert atmosphere of nitrogen, was placed (1R)-2-phenyl-1-[(1S,2S,6R,8S)-2,9,9-trimethyl-3,5-dioxa-4-boratricyclo[6.1.1.0^[2,6]]decan-4-yl]ethan-1-amine hydrochloride (300 mg, 0.89 mmol, 1.00 eq.), DCM (24 mL) and pyridine (707 mg, 8.94 mmol, 10.0 eq.). The mixture was stirred and cooled to 0° C. A suspension of tert-butyl (3S)-3-[(chlorocarbonyl)oxy]piperidine-1-carboxylate (786 mg, 2.98 mmol, 3.33 eq.) in DCM (18 mL) was added. The resulting mixture was stirred overnight at rt. The resulting mixture was washed with brine (30 mL). The organic layer was dried over anhydrous sodium sulfate and concentrated under vacuum. The crude product was purified by flash-prep-HPLC with the following conditions: Column, C18 silica gel; mobile phase, $H_2O$:$CH_3CN$ (19:1) increasing to 100% $CH_3CN$ within 50 min; Detector, UV 220 nm. This resulted in 400 mg (85.01%) of tert-butyl (3S)-3-([[(1R)-2-phenyl-1-[(1S,2S,6R,8S)-2,9,9-trimethyl-3,5-dioxa-4-boratricyclo[6.1.1.0^[2,6]]decan-4-yl]ethyl]carbamoyl]oxy)piperidine-1-carboxylate as a white solid.

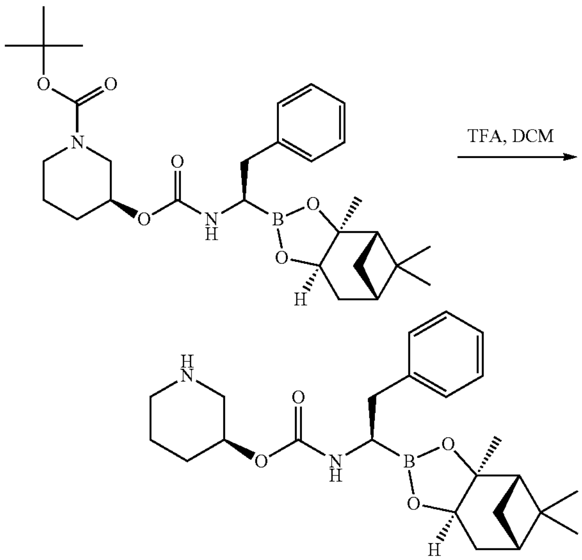

Into a 25-mL round-bottom flask, was placed tert-butyl (3S)-3-([[(1R)-2-phenyl-1-[(1S,2S,6R,8S)-2,9,9-trimethyl-3,5-dioxa-4-boratricyclo[6.1.1.0^[2,6]]decan-4-yl]ethyl]carbamoyl]oxy)piperidine-1-carboxylate (300 mg, 0.57 mmol, 1 eq.), DCM (6 mL) and TFA (1.2 mL). The resulting solution was stirred for 30 min at rt. The resulting mixture was concentrated under vacuum. This resulted in 243 mg (crude) of (3S)-piperidin-3-yl N-[(1R)-2-phenyl-1-[(1S,2S,6R,8S)-2,9,9-trimethyl-3,5-dioxa-4-boratricyclo [6.1.1.0^[2,6]]decan-4-yl]ethyl]carbamate as yellow oil, which was used directly to the next step.

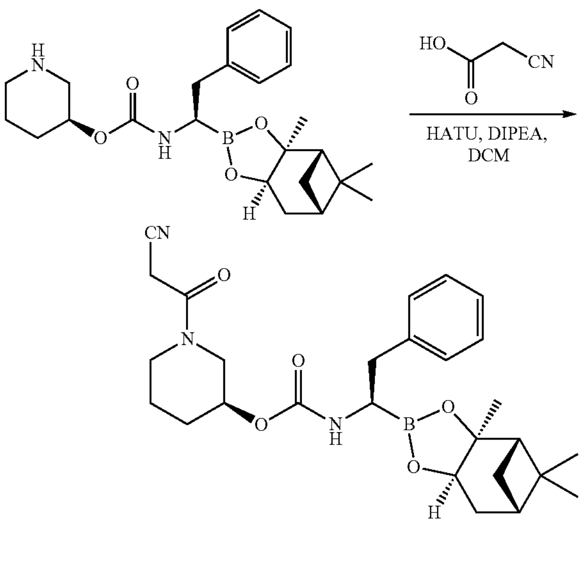

Into a 25-mL round-bottom flask, was placed (3S)-piperidin-3-yl N-[(1R)-2-phenyl-1-[(1S,2S,6R,8S)-2,9,9-trimethyl-3,5-dioxa-4-boratricyclo[6.1.1.0^[2,6]]decan-4-yl] ethyl]carbamate (243 mg, 0.57 mmol, 1 eq.), DCM (6 mL), DIPEA (222 mg, 1.72 mmol, 3.0 eq.), 2-cyanoacetic acid (73 mg, 0.86 mmol, 1.5 eq.), HATU (327 mg, 0.86 mmol, 1.51 eq.). The resulting solution was stirred for 30 min at rt. The resulting solution was diluted with DCM (60 mL) and washed brine (60 mL). The organic layer was dried over anhydrous sodium sulfate and concentrated under vacuum. The crude product was purified by flash-prep-HPLC with the following conditions: Column, C18 silica gel; mobile phase, $H_2O$:$CH_3CN$ (19:1) increasing to 100% $CH_3CN$ within 50 min; Detector, UV 220 nm. This resulted in 230 mg (81.8%) of (3S)-1-(2-cyanoacetyl)piperidin-3-yl N-[(1R)-2-phenyl-1-[(1S,2S,6R,8S)-2,9,9-trimethyl-3,5-dioxa-4-boratricyclo [6.1.1.0^[2,6]]decan-4-yl]ethyl]carbamate as a white solid.

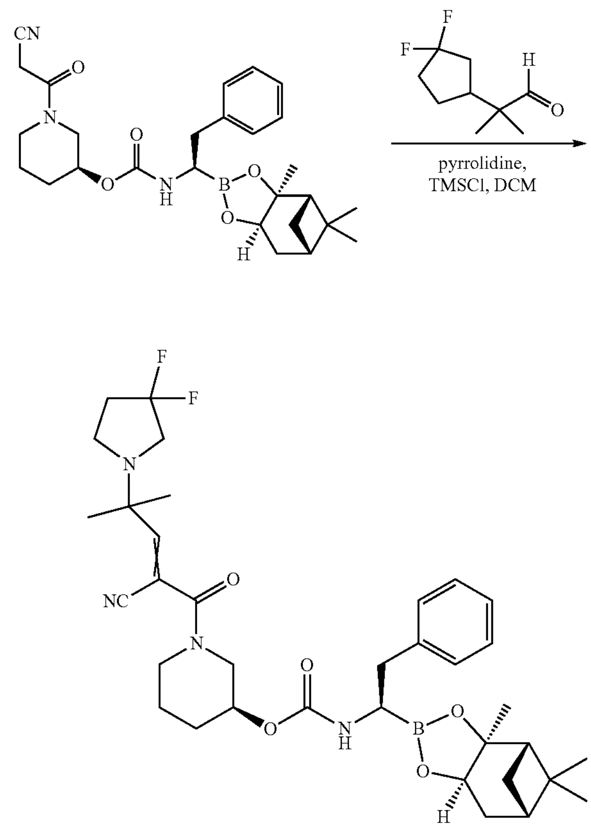 [SMILES: CC1(C)[C@@H]2C[C@H]3OB([C@H](Cc4ccccc4)NC(=O)O[C@H]4CCCN(C(=O)CC#N)C4)O[C@@]3(C)[C@H]1C2 ; CC(C)(C=O)C1CCC(F)(F)C1 ; CC1(C)[C@@H]2C[C@H]3OB([C@H](Cc4ccccc4)NC(=O)O[C@H]4CCCN(C(=O)C(C#N)=CC(C)(C)N5CCC(F)(F)C5)C4)O[C@@]3(C)[C@H]1C2]

Into a 100-mL round-bottom flask, was placed (3S)-1-(2-cyanoacetyl)piperidin-3-yl N-[(1R)-2-phenyl-1-[(1S,2S,6R,8S)-2,9,9-trimethyl-3,5-dioxa-4-boratricyclo[6.1.1.0^[2,6]] decan-4-yl]ethyl]carbamate (280 mg, 0.57 mmol, 1.0 eq.), 2-(3,3-difluoropyrrolidin-1-yl)-2-methylpropanal (302 mg, 1.70 mmol, 3.0 eq.), pyrrolidine (202 mg, 2.84 mmol, 5.0 eq.), DCM (28 mL), chlorotrimethylsilane (308 mg, 2.83 mmol, 5.0 eq.). The resulting solution was stirred for 2 h at rt. The resulting mixture was washed with brine (30 mL). The aqueous layer was extracted with dichloromethane (30 mL). The combined organic layers were dried over anhydrous sodium sulfate and concentrated under vacuum. The crude product was purified by flash-prep-HPLC with the following conditions: Column, C18 silica gel; mobile phase, $H_2O$:$CH_3CN$ (19:1) increasing to 100% $CH_3CN$ within 50 min; Detector, UV 220 nm. This resulted in 140 mg (37.8%) of (3S)-1-[2-cyano-2-[2-(3,3-difluoropyrrolidin-1-yl)-2-methylpropylidene]acetyl]piperidin-3-ylN-[(1R)-2-phenyl-1-[(1S,2S,6R,8S)-2,9,9-trimethyl-3,5-dioxa-4-boratricyclo [6.1.1.0^[2,6]]decan-4-yl]ethyl]carbamate as a white solid.

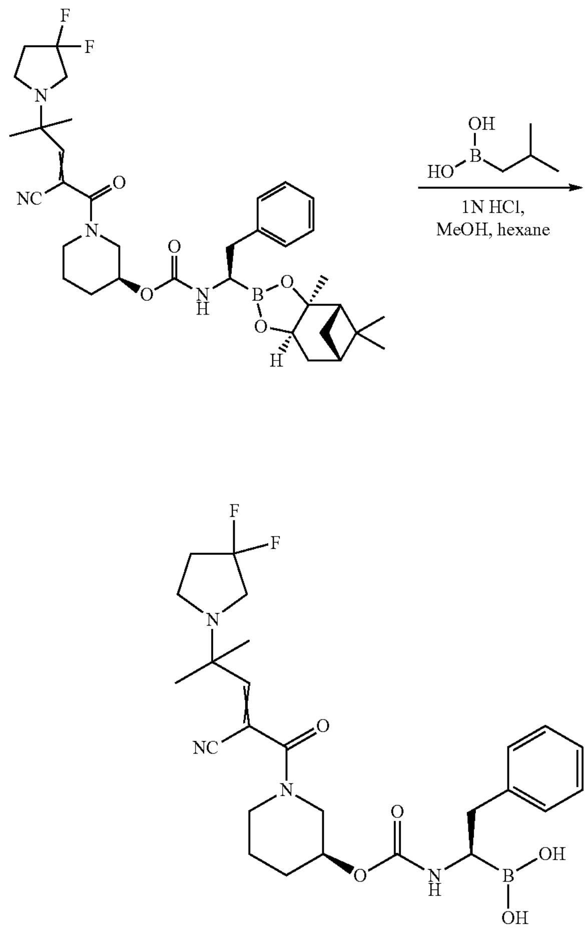

Into a 50-mL round-bottom flask, was placed (3S)-1-[2-cyano-2-[2-(3,3-difluoropyrrolidin-1-yl)-2-methylpropylidene]acetyl]piperidin-3-ylN-[(1R)-2-phenyl-1-[(1S,2S,6R,8S)-2,9,9-trimethyl-3,5-dioxa-4-boratricyclo[6.1.1.0^[2,6]]decan-4-yl]ethyl]carbamate (120 mg, 0.18 mmol, 1 eq.), (2-methylpropyl)boronic acid (57 mg, 0.56 mmol, 3 eq.), MeOH (6 mL), hexane (6 mL), 1N HCl (3.7 mL, 3.70 mmol, 20 eq.). The resulting solution was stirred for 1 h at rt. The two layers were separated. The methanol layer was diluted with 20 mL of water, and dried over lyophilization to give a crude product, which was purified by prep-HPLC with the following conditions: Column: XBridge Prep OBD C18 Column 30×150 mm 5 um; Mobile Phase A: Water (10 mmol/L $NH_4HCO_3$+0.1% $NH_3.H_2O$), Mobile Phase B: ACN; Flow rate: 60 mL/min; Gradient: 60% B to 85% B in 8 min; 220 nm; Rt: 7 min. This resulted in 44.0 mg (46.16%) of ((R)-1-(((((S)-1-(2-cyano-4-(3,3-difluoropyrrolidin-1-yl)-4-methylpent-2-enoyl)piperidin-3-yl)oxy)carbonyl) amino)-2-phenylethyl)boronic acid as a white solid after the lyophilization. LC-MS m/z: 519 [M+1], 501 [M-17].

Example 61

((R)-1-(2-((S)-4-(2-cyano-4-(3,3-difluoropyrrolidin-1-yl)-4-methylpent-2-enoyl)morpholin-2-yl)acetamido)-2-phenylethyl)boronic Acid

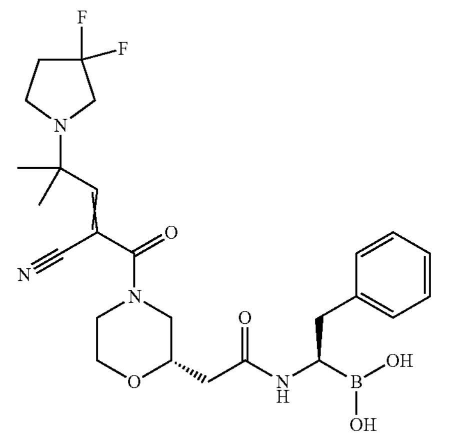

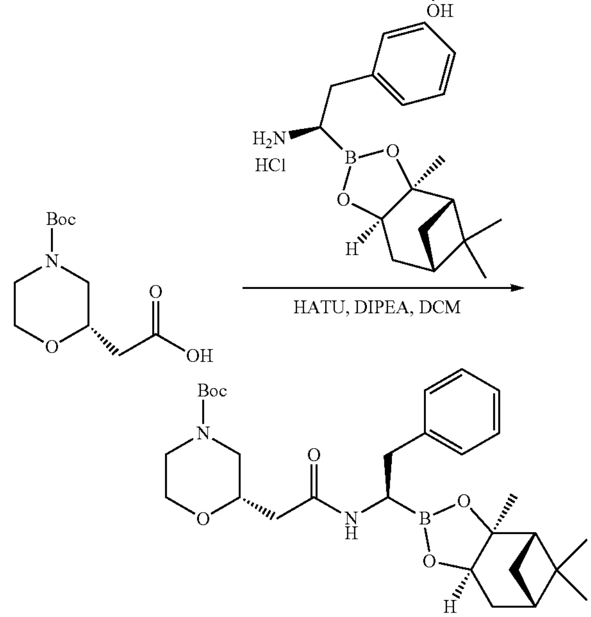

Into a 50-mL round-bottom flask, was placed 2-[(2S)-4-[(tert-butoxy)carbonyl]morpholin-2-yl]acetic acid (260 mg, 1.06 mmol, 1 eq.), HATU (604.9 mg, 1.59 mmol, 1.501 eq.), DCM (10 mL), DIPEA (411.27 mg, 3.18 mmol, 3.002 eq.), (1R)-2-phenyl-1-[(1S,2S,6R,8S)-2,9,9-trimethyl-3,5-dioxa-4-boratricyclo[6.1.1.0^[2,6]]decan-4-yl]ethan-1-amine hydrochloride (356.0 mg, 1.06 mmol, 1.00 eq.). The resulting solution was stirred for 1 h at rt. The resulting mixture was washed with water (1×30 mL) and brine (1×30 mL). The mixture was dried over anhydrous sodium sulfate and concentrated under vacuum. The crude product was purified by flash-prep-HPLC with the following conditions: Column, C18 silica gel; mobile phase, ACN:$H_2O$ (5:95) increasing to ACN:$H_2O$ (92:8) within 60 min; Detector, uv 220 nm. This resulted in 471.7 mg (84.5%) of tert-butyl (2S)-2-([[(1R)-2-phenyl-1-[(1S,2S,6R,8S)-2,9,9-trimethyl-3,5-dioxa-4-boratricyclo[6.1.1.0^[2,6]]decan-4-yl]ethyl]carbamoyl] methyl)morpholine-4-carboxylate as a light yellow solid.

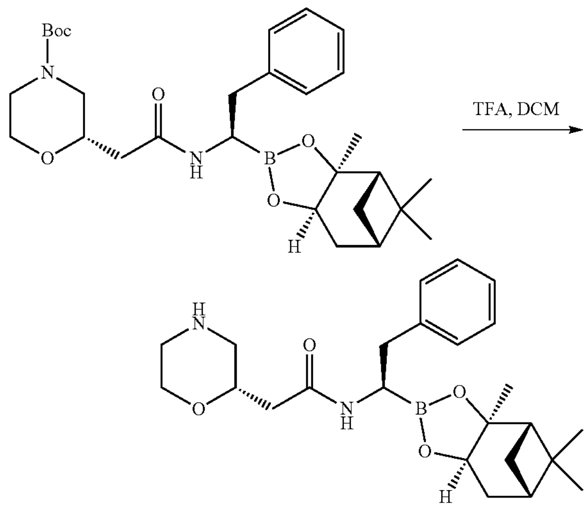

Into a 25-mL round-bottom flask, was placed tert-butyl (2S)-2-([[(1R)-2-phenyl-1-[(1S,2S,6R,8S)-2,9,9-trimethyl-3,5-dioxa-4-boratricyclo[6.1.1.0^[2,6]]decan-4-yl]ethyl]carbamoyl]methyl)morpholine-4-carboxylate (285 mg, 0.54 mmol, 1 eq.), DCM (10 mL), TFA (2 mL). The resulting solution was stirred for 30 min at rt. The resulting mixture was concentrated under vacuum. This resulted in 220 mg (95.32%) of 2-[(2S)-morpholin-2-yl]-N-[(1R)-2-phenyl-1-[(1S,2S,6R,8S)-2,9,9-trimethyl-3,5-dioxa-4-boratricyclo[6.1.1.0^[2,6]]decan-4-yl]ethyl]acetamide as brown oil.

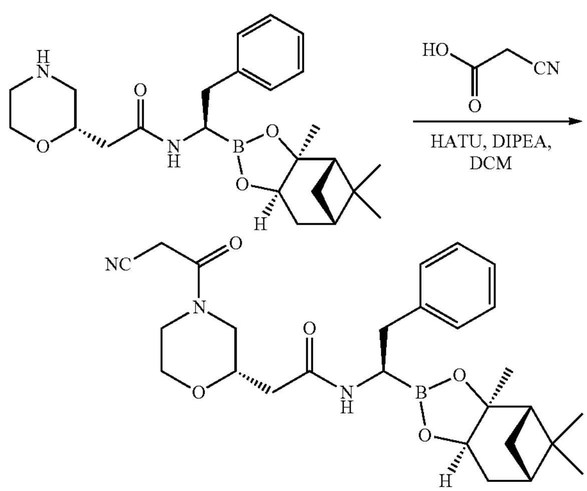

Into a 25-mL round-bottom flask, was placed 2-[(2S)-morpholin-2-yl]-N-[(1R)-2-phenyl-1-[(1S,2S,6R,8S)-2,9,9-trimethyl-3,5-dioxa-4-boratricyclo[6.1.1.0^[2,6]]decan-4-yl]ethyl]acetamide (230 mg, 0.54 mmol, 1 eq.), DCM (10 mL), DIEA (209.7 mg, 1.62 mmol, 3.01 eq.), 2-cyanoacetic acid (46.0 mg, 0.54 mmol, 1.00 eq.), HATU (308.4 mg, 0.81 mmol, 1.504 eq.). The resulting solution was stirred for 1 h at rt. The resulting mixture was washed with water (1×30 mL) and brine (1×30 mL). The mixture was dried over anhydrous sodium sulfate and concentrated under vacuum. The crude product was purified by flash-prep-HPLC with the following conditions: Column, C18 silica gel; mobile phase, ACN:$H_2O$=(5:95) increasing to ACN:$H_2O$ (62:38) within 60 min; Detector, uv 220 nm. This resulted in 220 mg (82.6%) of 2-[(2S)-4-(2-cyanoacetyl)morpholin-2-yl]-N-[(1R)-2-phenyl-1-[(1S,2S,6R,8S)-2,9,9-trimethyl-3,5-dioxa-4-boratricyclo[6.1.1.0^[2,6]]decan-4-yl]ethyl]acetamide as a light yellow solid.

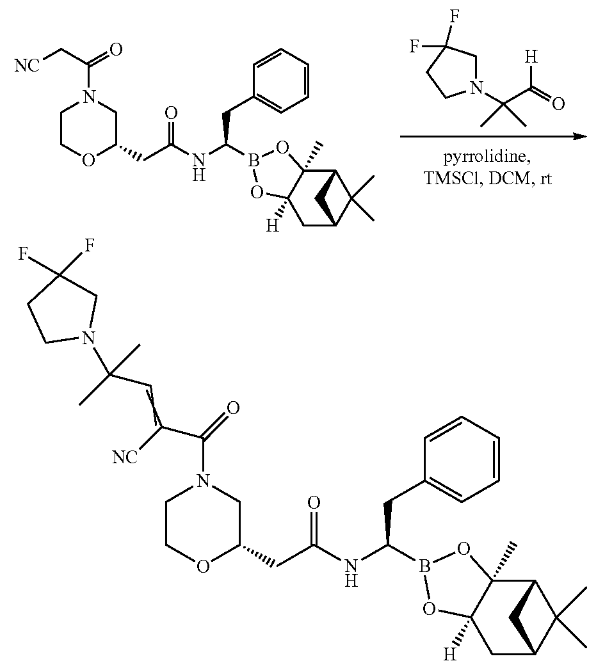

Into a 50-mL round-bottom flask, was placed 2-[(2S)-4-(2-cyanoacetyl)morpholin-2-yl]-N-[(1R)-2-phenyl-1-[(1S,2S,6R,8S)-2,9,9-trimethyl-3,5-dioxa-4-boratricyclo[6.1.1.0^[2,6]]decan-4-yl]ethyl]acetamide (267 mg, 0.54 mmol, 1 eq.), DCM (10 mL), 2-(3,3-difluoropyrrolidin-1-yl)-2-methylpropanal (287.3 mg, 1.62 mmol, 2.99 eq.), pyrrolidine (192 mg, 2.70 mmol, 4.99 eq.), chlorotrimethylsilane (293 mg, 2.70 mmol, 4.99 eq.). The resulting solution was stirred for 1 h at rt. The resulting mixture was washed with water (1×30 mL) and brine (1×30 mL). The mixture was dried over anhydrous sodium sulfate and concentrated under vacuum. The crude product was purified by prep-HPLC with the following conditions: Column, XBridge Prep OBD C18 Column, 30*150 mm 5 um; mobile phase, Water (10 mmol/L $NH_4HCO_3$+0.1% $NH_3.H_2O$) and ACN (45% PhaseB up to 75% in 8 min); Detector, uv 254 nm. This resulted in 121.36 mg (34.4%) of 2-((S)-4-(2-cyano-4-(3,3-difluoropyrrolidin-1-yl)-4-methylpent-2-enoyl)morpholin-2-yl)-N—((R)-2-phenyl-1-((3aS,4S,6S,7aR)-3a,5,5-trimethylhexahydro-4,6-methanobenzo[d][1,3,2]dioxaborol-2-yl)ethyl)acetamide as a white solid.

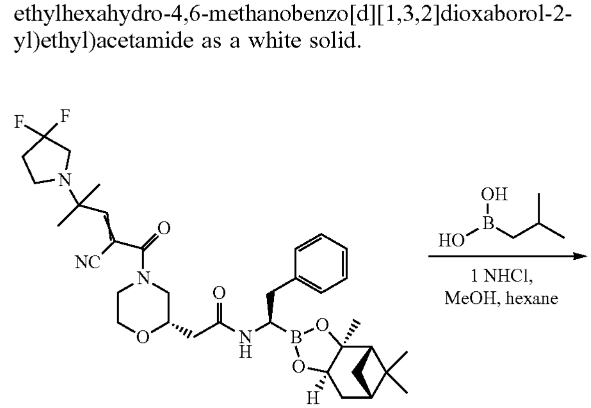

-continued

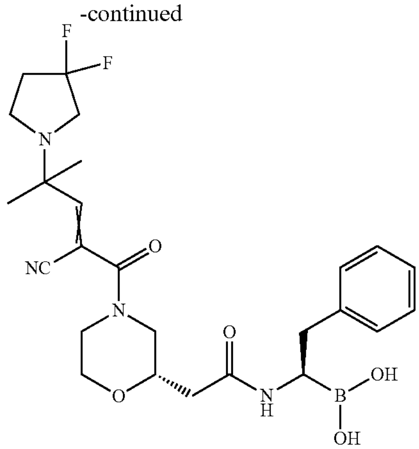

Into a 100-mL round-bottom flask, was placed 2-((S)-4-(2-cyano-4-(3,3-difluoropyrrolidin-1-yl)-4-methylpent-2-enoyl)morpholin-2-yl)-N—((R)-2-phenyl-1-((3 aS,4S,6S,7aR)-3a,5,5-trimethylhexahydro-4,6-methanobenzo[d][1,3,2]dioxaborol-2-yl)ethyl)acetamide (100 mg, 0.15 mmol, 1 eq.), MeOH (4 mL), (2-methylpropyl)boronic acid (46.8 mg, 0.46 mmol, 2.996 eq.), hexane (4 mL), 1N HCl (4 mL). The resulting solution was stirred for 1 h at rt. The hexane layer was discarded. The methanol layer was diluted with water (20 mL) then dried over lyophilization. The crude product was purified by prep-HPLC with the following conditions: Column, XBridge Prep OBD C18 Column, 30*150 mm*5 um; mobile phase, Water (10 mmol/L $NH_4HCO_3$+0.1% $NH_3.H_2O$) and ACN (30% PhaseB up to 60% in 8 min); Detector, uv 254 nm. This resulted in 43.81 mg (55.15%) of ((R)-1-(2-((S)-4-(2-cyano-4-(3,3-difluoropyrrolidin-1-yl)-4-methylpent-2-enoyl)morpholin-2-yl)acetamido)-2-phenylethyl)boronic acid as a white solid. LC-MS m/z: 501[M-17].

Example 62

((R)-1-(((((R)-1-acryloylazetidin-2-yl)methoxy)carbonyl)amino)-2-(benzofuran-3-yl)ethyl)boronic Acid

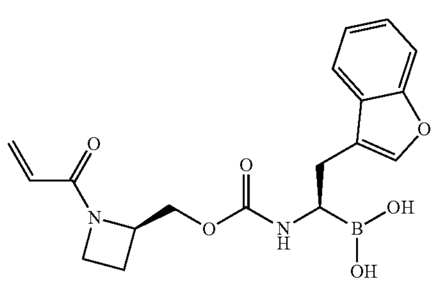

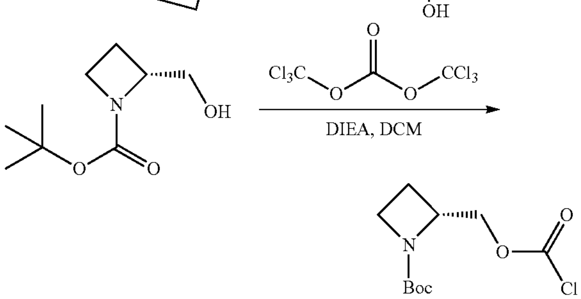

Into a 50-mL 3-necked round-bottom flask, was placed tert-butyl (2R)-2-(hydroxymethyl)azetidine-1-carboxylate (400 mg, 2.14 mmol, 1.00 eq.), dichloromethane (9.2 mL), DIEA (828 mg, 6.41 mmol, 3.00 eq.). This was followed by the addition of a solution of ditrichloromethyl carbonate (316 mg, 1.06 mmol, 0.50 eq.) in dichloromethane (4 mL) at 0° C. The resulting solution was stirred for 2 h at 0° C. The reaction mixture was used directly to the next step.

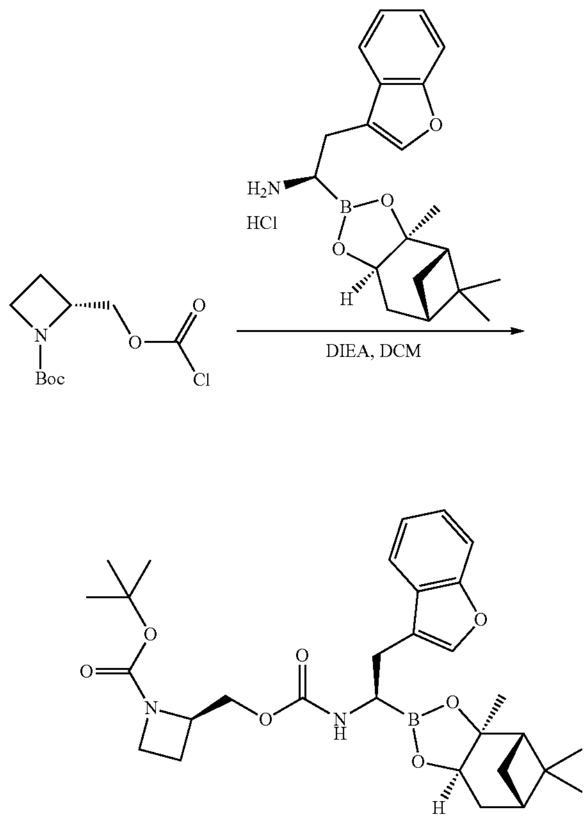

Into a 100-mL 3-necked round-bottom flask, was placed (1R)-2-(1-benzofuran-3-yl)-1-[(1S,2S,6R,8S)-2,9,9-trimethyl-3,5-dioxa-4-boratricyclo[6.1.1.0^[2,6]]decan-4-yl]ethan-1-amine hydrochloride (684 mg, 1.82 mmol, 0.85 eq.), dichloromethane (17.6 mL), DIEA (828 mg, 6.41 mmol, 3.00 eq.). This was followed by the addition of tert-butyl (2R)-2-[[(chlorocarbonyl)oxy]methyl]azetidine-1-carboxylate (533 mg, 2.13 mmol, 1.00 eq.) at 0° C. The resulting solution was stirred for 1 h at 25° C. The resulting mixture was washed with brine (50 mL). The resulting solution was extracted with dichloromethane (3×50 mL), and the organic layers combined and dried over anhydrous sodium sulfate and concentrated under vacuum. The residue was applied onto a silica gel column with ethyl acetate:petroleum ether (1:10). This resulted in 700 mg (59%) of tert-butyl (2R)-2-[([[(1R)-2-(1-benzofuran-3-yl)-1-[(1S,2S,6R,8S)-2,9,9-trimethyl-3,5-dioxa-4-boratricyclo[6.1.1.0^[2,6]]decan-4-yl]ethyl]carbamoyl]oxy)methyl]azetidine-1-carboxylate as yellow oil.

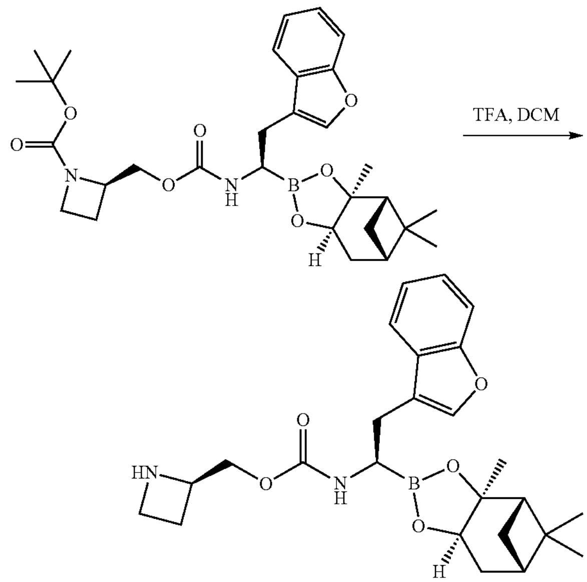

Into a 50-mL round-bottom flask, was placed tert-butyl (2R)-2-[([[(1R)-2-(1-benzofuran-3-yl)-1-[(1S,2S,6R,8S)-2,9,9-trimethyl-3,5-dioxa-4-boratricyclo[6.1.1.0^[2,6]]decan-4-yl]ethyl]carbamoyl]oxy)methyl]azetidine-1-carboxylate (700 mg, 1.27 mmol, 1.00 eq.), dichloromethane (14 mL), trifluoroacetic acid (2.8 mL). The resulting solution was stirred for 1 h at 25° C. The resulting mixture was concentrated under vacuum to afford 573 mg of (2R)-azetidin-2-ylmethyl N-[(1R)-2-(1-benzofuran-3-yl)-1-[(1S,2S,6R,8S)-2,9,9-trimethyl-3,5-dioxa-4-boratricyclo[6.1.1.0^[2,6]]decan-4-yl]ethyl]carbamate as yellow oil which was used directly in the next step.

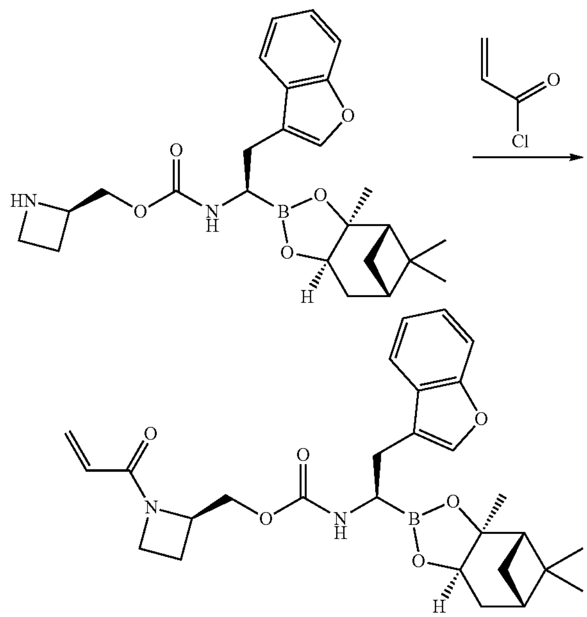

Into a 100-mL round-bottom flask, was placed (2R)-azetidin-2-ylmethyl N-[(1R)-2-(1-benzofuran-3-yl)-1-[(1S,2S,6R,8S)-2,9,9-trimethyl-3,5-dioxa-4-boratricyclo[6.1.1.0^[2,6]]decan-4-yl]ethyl]carbamate (573 mg, 1.27 mmol, 1.00 eq.), dichloromethane (14 mL), TEA (377 mg, 3.73 mmol, 2.94 eq.), prop-2-enoyl chloride (137 mg, 1.51 mmol, 1.19 eq.). The resulting solution was stirred for 1 h at 25° C. The resulting mixture was washed with brine (1×20 mL). The resulting solution was extracted with dichloromethane (1×30 mL), and the organic layers combined and dried over anhydrous sodium sulfate and concentrated under vacuum. The crude product was purified by prep-HPLC with the following conditions: Column, XBridge Prep OBD C18 Column, 30*150 mm 5 um; mobile phase, Water (10 mmol/L $NH_4HCO_3$+0.1% $NH_3.H_2O$) and ACN (45.0% ACN up to 70.0% in 8 min); Detector, uv 254 nm. This resulted in 150 mg (23%) of [(2R)-1-(prop-2-enoyl)azetidin-2-yl]methyl N-[(1R)-2-(1-benzofuran-3-yl)-1-[(1S,2S,6R,8S)-2,9,9-trimethyl-3,5-dioxa-4-boratricyclo[6.1.1.0^[2,6]]decan-4-yl]ethyl]carbamate as an off-white solid.

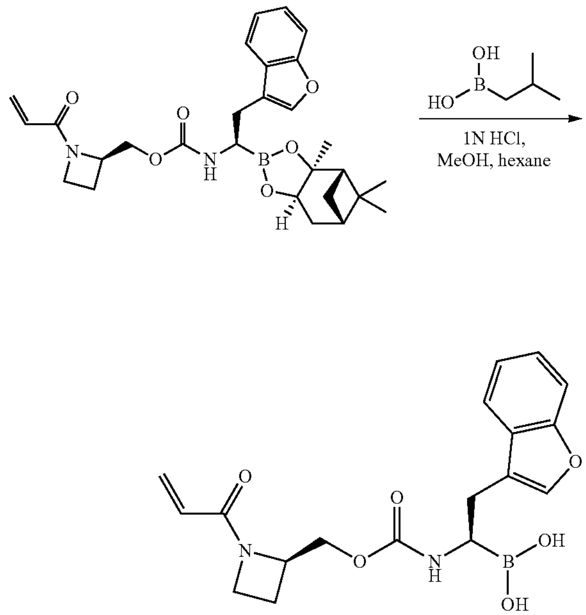

Into a 100-mL round-bottom flask, was placed [(2R)-1-(prop-2-enoyl) azetidin-2-yl]methyl N-[(1R)-2-(1-benzofuran-3-yl)-1-[(1S,2S,6R,8S)-2,9,9-trimethyl-3,5-dioxa-4-boratricyclo[6.1.1.0^[2,6]]decan-4-yl]ethyl]carbamate (130 mg, 0.26 mmol, 1.00 eq.), methanol (6 mL), (2-methylpropyl)boronic acid (78 mg, 0.77 mmol, 3.00 eq.), hexane (6 mL), 1N hydrogen chloride (5 mL, 20.00 eq.). The resulting solution was stirred for 1 h at 25° C. The resulting mixture was washed with 3× hexane (10 mL). The methanol layer was diluted with water (12 mL), and dried over lyophylization to give a crude product which was further purified by prep-HPLC with the following conditions: Column, XBridge Prep OBD C18 Column, 30*150 mm 5 um; mobile phase, Water (10 mmol/L $NH_4HCO_3$+0.1% $NH_3.H_2O$) and ACN (10.0% ACN up to 35.0% in 8 min); Detector, uv 254 nm. This resulted in 40.1 mg (42%) of ((R)-1-(((((R)-1-acryloylazetidin-2-yl)methoxy)carbonyl)amino)-2-(benzofuran-3-yl)ethyl)boronic acid as a white solid. LC-MS m/z: 355[M-17].

Example 63

(R)-(1-((((7-acryloyl-7-azabicyclo[2.2.1]heptan-1-yl)methoxy)carbonyl)amino)-2-(benzofuran-3-yl)ethyl)boronic Acid

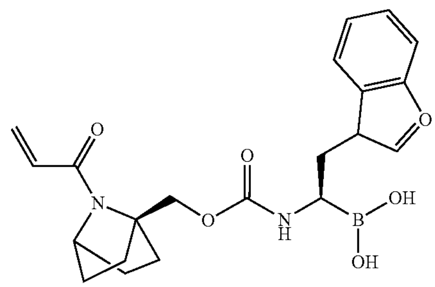

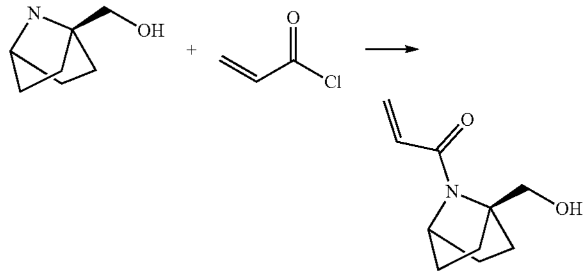

To a mixture of (7-azabicyclo[2.2.1]heptan-1-yl)methanol (250 mg, 1.97 mmol) in THF (5 mL) and saturated $NaHCO_3$aq. (2 mL), was added dropwise acryloyl chloride (178 mg, 1.97 mmol) at rt. The mixture was stirred at rt for 1 h. The mixture was concentrated and the crude was purified by column chromatography on silica gel, eluting with 10%-50% of ethyl acetate in petroleum ether to afford the 210 mg of 1-(1-(hydroxymethyl)-7-azabicyclo[2.2.1]heptan-7-yl)prop-2-en-1-one as a colorless oil.

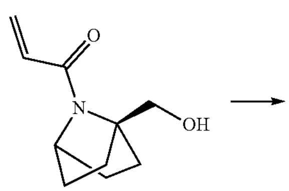

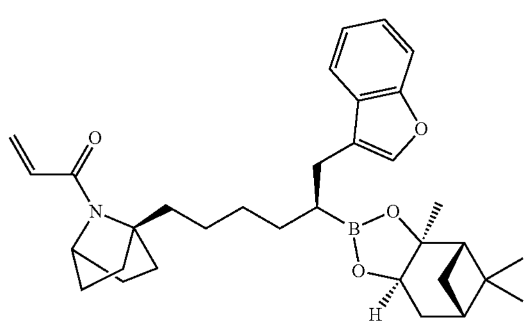

Bis(trichloromethyl) carbonate (216 mg, 0.66 mmol) in DCM (0.5 mL) was added dropwise into a stirring solution of 1-(1-(hydroxymethyl)-7-azabicyclo[2.2.1]heptan-7-yl)prop-2-en-1-one (120 mg, 0.66 mmol) and DIPEA (514 mg, 3.97 mmol) in DCM (5 mL) at 0° C. The mixture was stirred for 1 h at 0° C. This resulted solution was added dropwise into a well-stirred solution of (R)-2-(benzofuran-3-yl)-1-((3aS,4S,6S,7aR)-3a,5,5-trimethylhexahydro-4,6-methanobenzo[d][1,3,2]dioxaborol-2-yl)ethan-1-amine hydrochloride (373 mg, 0.993 mmol) and DIPEA (257 mg, 1.99 mmol) in DCM (2 mL) at 0° C. The reaction was stirred at 0° C. for 1 h, then diluted with DCM (25 mL), washed with water (5 mL) and brine (5 mL), dried over $Na_2SO_4$, concentrated in vacuo. The residue was purified by prep-HPLC to afford 110 mg of (7-acryloyl-7-azabicyclo[2.2.1]heptan-1-yl)methyl ((R)-2-(benzofuran-3-yl)-1-((3aS,4S,6S,7aR)-3a,5,5-trimethylhexahydro-4,6-methanobenzo[d][1,3,2]dioxaborol-2-yl)ethyl)carbamate as a colorless solid.

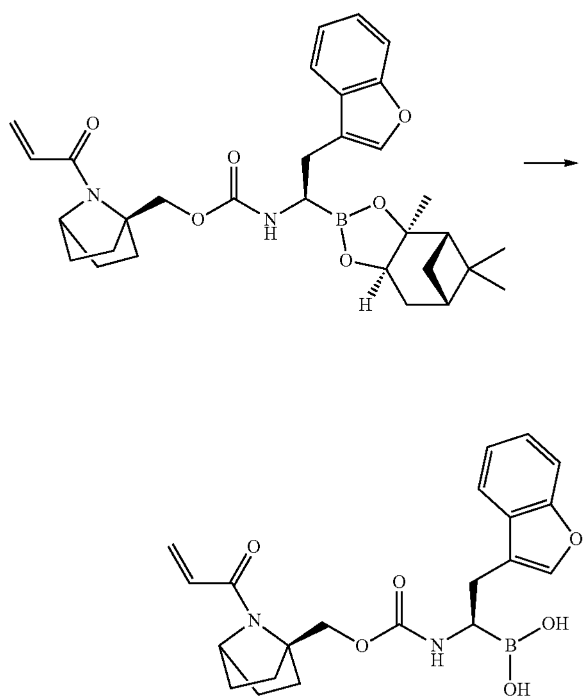

To a solution of (7-acryloyl-7-azabicyclo[2.2.1]heptan-1-yl)methyl ((R)-2-(benzofuran-3-yl)-1-((3aS,4S,6S,7aR)-3a,5,5-trimethylhexahydro-4,6-methanobenzo[d][1,3,2]dioxaborol-2-yl)ethyl)carbamate (110 mg, 0.2 mmol) in MeOH (2 mL) were added hexanes (2 mL) and 1 N HCl (1 mL), followed by isobutyl boric acid (62 mg, 0.6 mmol). After stirred at rt for 3 h and TLC suggested the reaction was completed, the hexanes layer was discarded. The methanol layer was diluted with water (20 mL) and 1N $NaHCO_3$ aq. (1 mL), then dried over lyophilization to give a crude product which was purified by gel column to afford 25 mg of (R)-(1-((((7-acryloyl-7-azabicyclo[2.2.1]heptan-1-yl)methoxy)carbonyl)amino)-2-(benzofuran-3-yl)ethyl)boronic acid as a colorless solid. LC-MS m/z: 435 [M+23].

Example 64

((R)-1-(3-(((R)-1-(2-cyano-4-(3,3-difluoropyrrolidin-1-yl)-4-methylpent-2-enoyl)piperidin-2-yl)methyl)-3-methylureido)-2-phenylethyl)boronic Acid

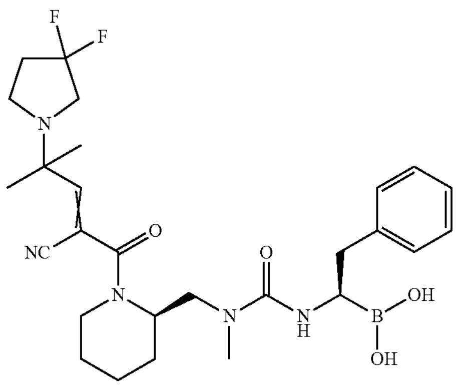

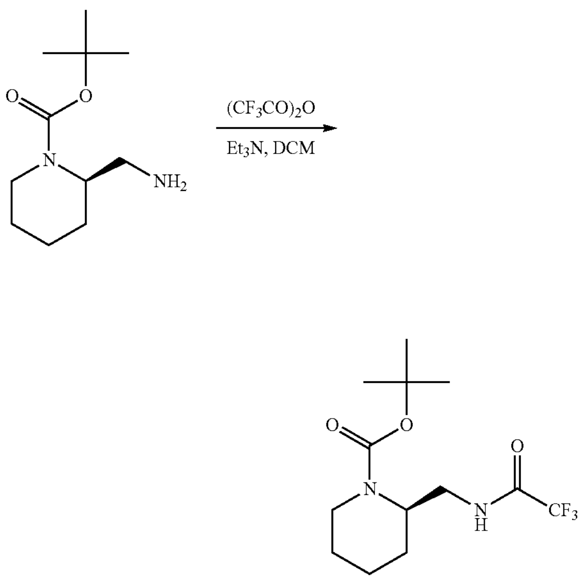

Into a 250-mL 3-necked round-bottom flask purged and maintained with an inert atmosphere of nitrogen, was placed tert-butyl (2R)-2-(aminomethyl)piperidine-1-carboxylate (2.5 g, 11.7 mmol, 1 eq.), DCM (50 mL) and $Et_3N$ (1.78 g, 17.6 mmol, 1.5 eq.). The solution was stirred and cooled to 0° C. Trifluoroacetyl 2,2,2-trifluoroacetate (2.94 g, 14 mmol, 1.2 eq.) was added dropwise. The resulting solution was warmed to rt and stirred for 30 min. The resulting solution was washed with brine (50 mL). The organic layer was dried over anhydrous sodium sulfate and concentrated under vacuum. The residue was purified by flash silica gel column with pure petroleum ether increasing to ethyl acetate:petroleum ether (1:3). This resulted in 3.20 g of tert-butyl (2R)-2-[(trifluoroacetamido)methyl]piperidine-1-carboxylate as a white solid.

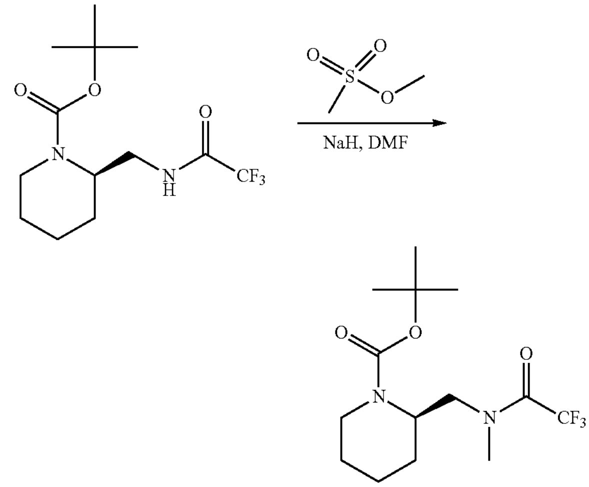

Into a 100-mL 3-necked round-bottom flask purged and maintained with an inert atmosphere of nitrogen, was placed tert-butyl (2R)-2-[(trifluoroacetamido)methyl]piperidine-1-carboxylate (3.20 g, 10.31 mmol, 1.0 eq.) and DMF (32 mL). The mixture was stirred and cooled to 0° C. 60% NaH in oil (454 mg, 11.35 mmol, 1.1 eq.) was added. The mixture was stirred at 0° C. for 30 min. Methyl methanesulfonate (1.37 g, 12.44 mmol, 1.2 eq.) was added. The resulting mixture was warmed to rt and stirred for another 2 h. The reaction was then quenched by the addition of sat. aq. sodium hydrogen carbonate solution (64 mL). The resulting solution was extracted with ethyl acetate (2×50 mL). The combined organic layers were washed brine (2×50 mL), dried over anhydrous sodium sulfate and concentrated under vacuum. The residue was purified by flash silica gel column with pure petroleum ether increasing to ethyl acetate:petroleum ether (1:3). This resulted in 2.5 g (75%) of tert-butyl (2R)-2-[(2,2,2-trifluoro-N-methylacetamido)methyl]piperidine-1-carboxylate as a white solid.

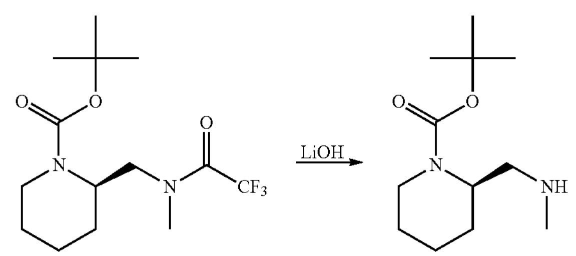

Into a 100-mL round-bottom flask, was placed tert-butyl (2R)-2-[(2,2,2-trifluoro-N-methylacetamido)methyl]piperidine-1-carboxylate (2.5 g, 7.7 mmol, 1 eq.) and MeOH (25 mL). The mixture was stirred and a solution of $LiOH.H_2O$ (971 mg, 23.1 mmol, 3 eq.) in water (23 mL) was added. The resulting mixture was stirred for 1 h at rt. The resulting mixture was concentrated under vacuum. The residue was dissolved in DCM (60 mL) and water (60 mL). The two layers were separated. The organic layer was washed with brine (40 mL), dried over anhydrous sodium sulfate and concentrated under vacuum. This resulted in 1.50 g (85%) of tert-butyl (2R)-2-[(methylamino)methyl]piperidine-1-carboxylate as a light yellow oil.

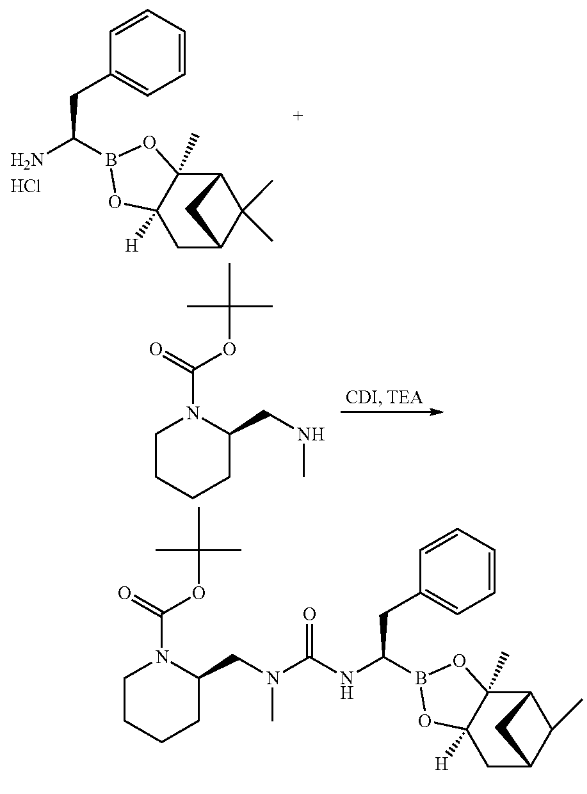

Into a 100-mL round-bottom flask, was placed (1R)-2-phenyl-1-[(1S,2S,6R,8S)-2,9,9-trimethyl-3,5-dioxa-4-boratricyclo[6.1.1.0^[2,6]]decan-4-yl]ethan-1-amine hydrochloride (800 mg, 2.38 mmol, 1 eq.), ACN (16 mL), TEA (970 mg, 9.59 mmol, 4 eq.) and CDI (1160 mg, 7.15 mmol, 3 eq.). The mixture was stirred for 1 h at rt and tert-butyl (2R)-2-[(methylamino)methyl]piperidine-1-carboxylate (282 mg, 1.2 mmol, 2 eq.) was added. The resulting mixture was heated at 80° C. for another 2 h. The resulting mixture was concentrated under vacuum. The residue was dissolved in DCM (60 mL) and washed with brine (40 mL). The organic layer was dried over anhydrous sodium sulfate and concentrated under vacuum. The crude product was purified by flash-prep-HPLC with the following conditions: Column, C18 silica gel; mobile phase, $H_2O$:$CH_3CN$ (19:1) increasing to 100% $CH_3CN$ within 50 min; Detector, UV 220 nm. This resulted in 900 mg (68%) of tert-butyl (2R)-2-[[methyl([[(1R)-2-phenyl-1-[(1S,2S,6R,8S)-2,9,9-trimethyl-3,5-dioxa-4-boratricyclo[6.1.1.0^[2,6]]decan-4-yl]ethyl]carbamoyl])amino]methyl]piperidine-1-carboxylate as a light yellow solid.

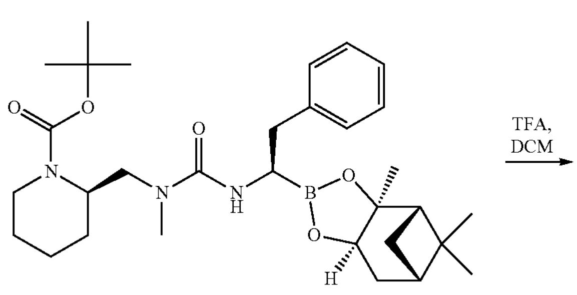

-continued

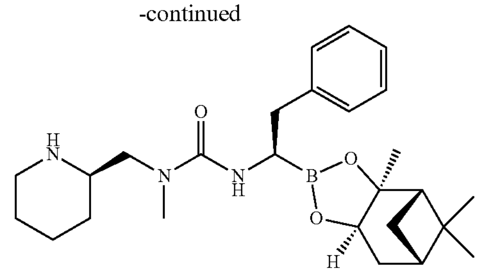

Into a 100-mL round-bottom flask, was placed tert-butyl (2R)-2-[[methyl([[(1R)-2-phenyl-1-[(1S,2S,6R,8S)-2,9,9-trimethyl-3,5-dioxa-4-boratricyclo[6.1.1.0^[2,6]]decan-4-yl]ethyl]carbamoyl])amino]methyl]piperidine-1-carboxylate (590 mg, 1.1 mmol, 1 eq.), DCM (12 mL) and TFA (2.4 mL). The resulting solution was stirred for 30 min at rt. The resulting mixture was concentrated under vacuum. This resulted in 483 mg (99%) of 3-methyl-1-[(1R)-2-phenyl-1-[(1S,2S,6R,8S)-2,9,9-trimethyl-3,5-dioxa-4-boratricyclo[6.1.1.0^[2,6]]decan-4-yl]ethyl]-3-[(2R)-piperidin-2-ylmethyl]urea as a yellow oil.

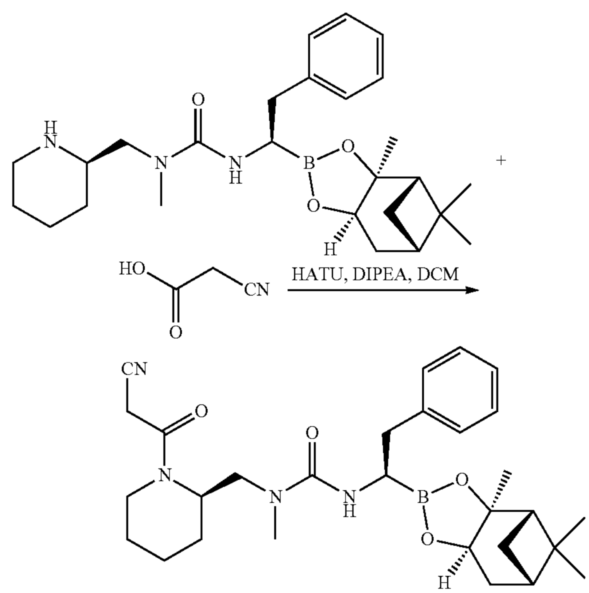

Into a 100-mL round-bottom flask, was placed 3-methyl-1-[(1R)-2-phenyl-1-[(1S,2S,6R,8S)-2,9,9-trimethyl-3,5-dioxa-4-boratricyclo[6.1.1.0^[2,6]]decan-4-yl]ethyl]-3-[(2R)-piperidin-2-ylmethyl]urea (483 mg, 1.1 mmol, 1 eq.), DCM (12 mL), 2-cyanoacetic acid (136 mg, 1.6 mmol, 1.5 eq.), HATU (608 mg, 1.6 mmol, 1.5 eq.) and DIPEA (413 mg, 3.2 mmol, 3 eq.). The resulting mixture was stirred for 30 min at rt. The resulting solution was diluted with DCM (50 mL) and washed with brine (2×40 mL). The organic layer was dried over anhydrous sodium sulfate and concentrated under vacuum. The crude product was purified by flash-prep-HPLC with the following conditions: Column, C18 silica gel; mobile phase, $H_2O$:$CH_3CN$ (19:1) increasing to 100% $CH_3CN$ within 50 min; Detector, UV 220 nm. This resulted in 430 mg (78%) of 3-[[(2R)-1-(2-cyanoacetyl)piperidin-2-yl]methyl]-3-methyl-1-[(1R)-2-phenyl-1-[(1S,2S,6R,8 S)-2,9,9-trimethyl-3,5-dioxa-4-boratricyclo[6.1.1.0^[2,6]]decan-4-yl]ethyl]urea as a light yellow solid.

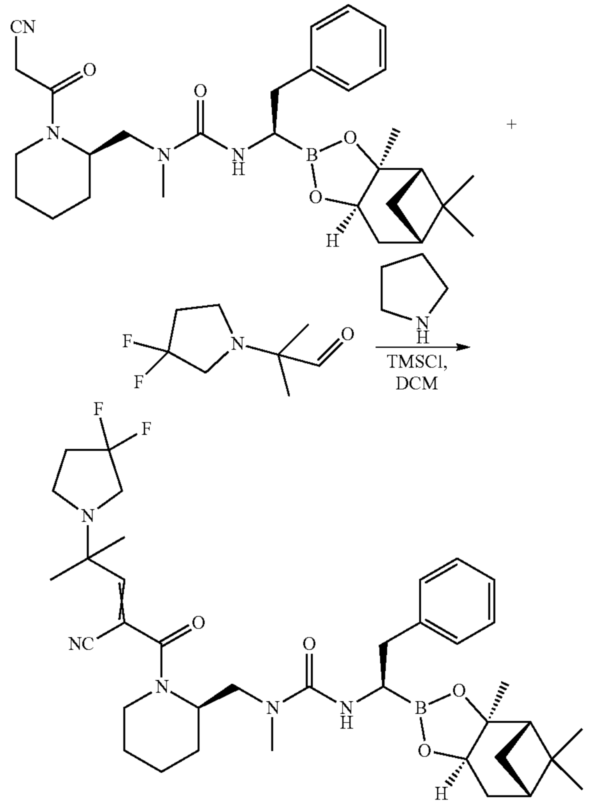

Into a 100-mL round-bottom flask purged and maintained with an inert atmosphere of nitrogen, was placed 3-[[(2R)-1-(2-cyanoacetyl)piperidin-2-yl]methyl]-3-methyl-1-[(1R)-2-phenyl-1-[(1S,2S,6R,8S)-2,9,9-trimethyl-3,5-dioxa-4-boratricyclo[6.1.1.0^[2,6]]decan-4-yl]ethyl]urea (380 mg, 0.73 mmol, 1 eq.), DCM (19 mL), 2-(3,3-difluoropyrrolidin-1-yl)-2-methylpropanal (388 mg, 2.2 mmol, 3 eq.), pyrrolidine (260 mg, 3.66 mmol, 5 eq.), and chlorotrimethylsilane (396 mg, 3.64 mmol, 5 eq.). The resulting solution was stirred for 1 h at rt. The resulting solution was diluted with DCM (40 mL) and washed with brine (2×40 mL). The organic layer was dried over anhydrous sodium sulfate and concentrated under vacuum. The crude product was purified by flash-prep-HPLC with the following conditions: Column, C18 silica gel; mobile phase, $H_2O$:$CH_3CN$ (19:1) increasing to 100% $CH_3CN$ within 50 min; Detector, UV 220 nm. This resulted in 200 mg (40%) of 3-[[(2R)-1-[2-cyano-2-[2-(3,3-difluoropyrrolidin-1-yl)-2-methylpropylidene]acetyl]piperidin-2-yl]methyl]-3-methyl-1-[(1R)-2-phenyl-1-[(1S,2S,6R,8S)-2,9,9-trimethyl-3,5-dioxa-4-boratricyclo[6.1.1.0^[2,6]]decan-4-yl]ethyl]urea as a light yellow solid.

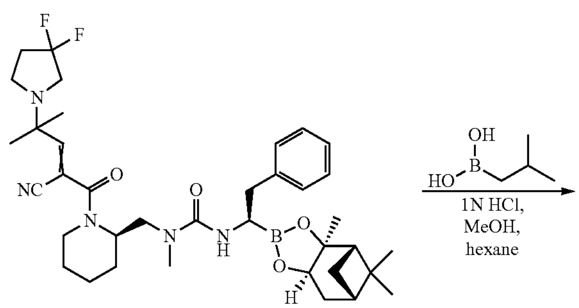

-continued

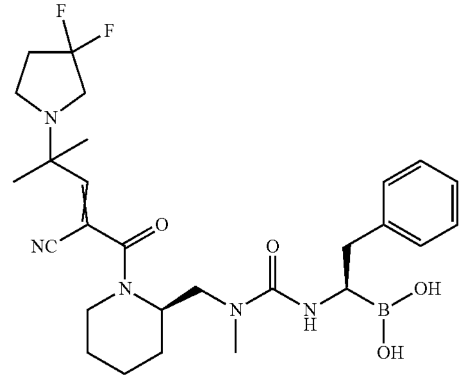

Into a 100-mL round-bottom flask, was placed 3-[[(2R)-1-[2-cyano-2-[2-(3,3-difluoropyrrolidin-1-yl)-2-methylpropylidene]acetyl]piperidin-2-yl]methyl]-3-methyl-1-[(1R)-2-phenyl-1-[(1S,2S,6R,8S)-2,9,9-trimethyl-3,5-dioxa-4-boratricyclo[6.1.1.0^[2,6]]decan-4-yl]ethyl]urea (200 mg, 0.29 mmol, 1 eq.), (2-methylpropyl)boronic acid (90 mg, 0.88 mmol, 3 eq.), MeOH (8 mL), hexane (8 mL), and 1N HCl (3 mL, 3.0 mmol, 10 eq.). The resulting solution was stirred for 1 h at rt. The resulting solution was diluted with water (20 mL) and extracted with hexane (2×20 mL). The aqueous layer was dried over lyophilization to give a crude product, which was purified by prep-HPLC with the following conditions: Column: XBridge Prep OBD C18 Column 30×150 mm 5 um; Mobile Phase A: Water (10 mmol/L $NH_4HCO_3$+0.1% $NH_3.H_2O$), Mobile Phase B: ACN; Flow rate: 60 mL/min; Gradient: 25% B to 45% B in 8 min; 254 nm; Rt: 7 min. This resulted in 100 mg (63%) of ((R)-1-(3-(((R)-1-(2-cyano-4-(3,3-difluoropyrrolidin-1-yl)-4-methylpent-2-enoyl)piperidin-2-yl)methyl)-3-methylureido)-2-phenylethyl)boronic acid as a white solid. LC-MS m/z: 528 [M-17)].

Example 65

((R)-1-(((((S)-1-acryloylpiperidin-3-yl)oxy)carbonyl)amino)-2-(benzofuran-3-yl)ethyl)boronic Acid

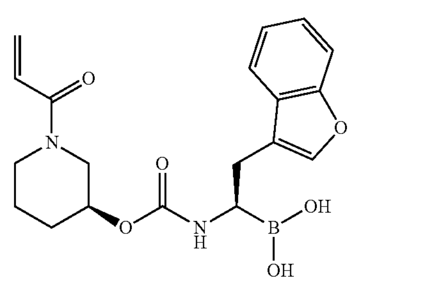

-continued

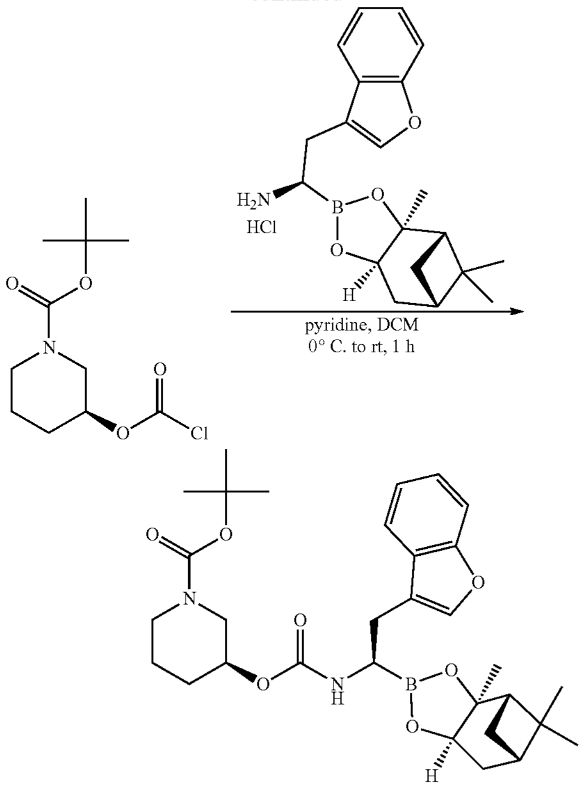

Into a 100-mL round-bottom flask, was placed a solution of (1R)-2-(1-benzofuran-3-yl)-1-[(1S,2S,6R,8S)-2,9,9-trimethyl-3,5-dioxa-4-boratricyclo[6.1.1.0^2,6]decan-4-yl]ethan-1-amine hydrochloride (793 mg, 2.11 mmol, 0.85 eq.) in dichloromethane (16 mL), and pyridine (400 mg, 5.06 mmol, 2 eq.). To this solution was added a solution of tert-butyl (3S)-3-[(chlorocarbonyl)oxy]piperidine-1-carboxylate (654 mg, 2.48 mmol, 1 eq.) in dichloromethane (12 mL) dropwise with stirring at 0° C. The resulting solution was stirred for 1 h at rt. The resulting solution was diluted with DCM (20 mL). The resulting mixture was washed with brine (20 mL). The mixture was dried over anhydrous sodium sulfate. The residue was applied onto a silica gel column with ethyl acetate:petroleum ether (20:80). This resulted in 740 mg (53%) of tert-butyl (3S)-3-([[(1R)-2-(1-benzofuran-3-yl)-1-[(1S,2S,6R,8S)-2,9,9-trimethyl-3,5-dioxa-4-boratricyclo [6.1.1.0^[2,6]]decan-4-yl]ethyl]carbamoyl]oxy)piperidine-1-carboxylate as a colorless oil.

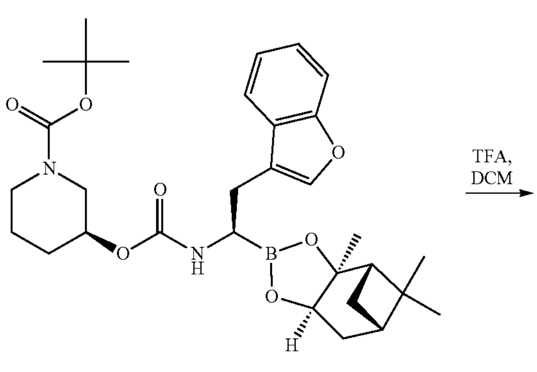

-continued

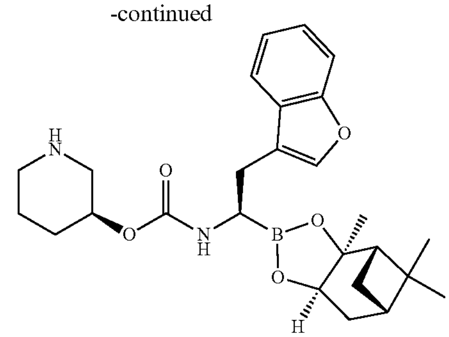

Into a 50-mL round-bottom flask, was placed a solution of tert-butyl (3S)-3-([[(1R)-2-(1-benzofuran-3-yl)-1-[(1S,2S,6R,8S)-2,9,9-trimethyl-3,5-dioxa-4-boratricyclo[6.1.1.0^[2,6]]decan-4-yl]ethyl]carbamoyl]oxy)piperidine-1-carboxylate (200 mg, 0.35 mmol, 1 eq.) in dichloromethane (4 mL), and trifluoroacetic acid (0.8 mL). The resulting solution was stirred for 20 min at rt. The resulting mixture was concentrated under vacuum. This resulted in 164 mg of crude (3S)-piperidin-3-yl N-[(1R)-2-(1-benzofuran-3-yl)-1-[(1S,2S,6R,8S)-2,9,9-trimethyl-3,5-dioxa-4-boratricyclo[6.1.1.0^[2,6]]decan-4-yl]ethyl]carbamate as a yellow oil.

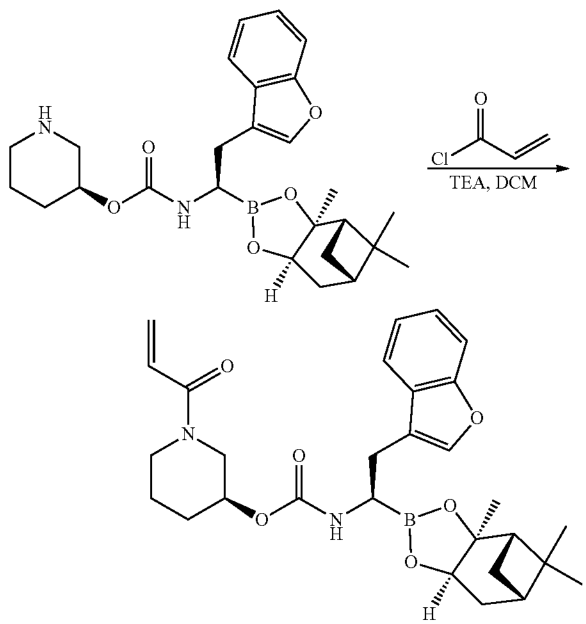

Into a 50-mL round-bottom flask, was placed a solution of (3S)-piperidin-3-yl N-[(1R)-2-(1-benzofuran-3-yl)-1-[(1S,2S,6R,8S)-2,9,9-trimethyl-3,5-dioxa-4-boratricyclo[6.1.1.0^[2,6]]decan-4-yl]ethyl]carbamate (288 mg, 0.62 mmol, 1 eq.) in dichloromethane (5 mL), TEA (187 mg, 1.85 mmol, 3 eq.), and prop-2-enoyl chloride (67 mg, 0.74 mmol, 1.20 eq.). The resulting solution was stirred for 20 min at rt. The resulting solution was diluted with DCM (20 mL). The resulting mixture was washed with brine (20 mL). The mixture was dried over anhydrous sodium sulfate. The residue was applied onto a silica gel column with ethyl acetate:petroleum ether (50:50). This resulted in 110 mg of (3S)-1-(prop-2-enoyl)piperidin-3-yl N-[(1R)-2-(1-benzofuran-3-yl)-1-[(1S,2S,6R,8S)-2,9,9-trimethyl-3,5-dioxa-4-boratricyclo[6.1.1.0^[2,6]]decan-4-yl]ethyl]carbamate as a yellow oil.

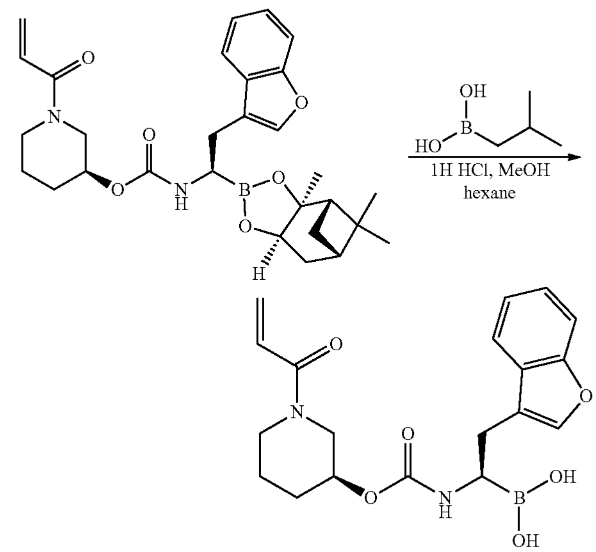

Into a 100-mL round-bottom flask, was placed (3S)-1-(prop-2-enoyl)piperidin-3-yl N-[(1R)-2-(1-benzofuran-3-yl)-1-[(1S,2S,6R,8S)-2,9,9-trimethyl-3,5-dioxa-4-boratricyclo[6.1.1.0^[2,6]]decan-4-yl]ethyl]carbamate (130 mg, 0.25 mmol, 1 eq.), methanol (3 mL), hexane (3 mL), 1N HCl (3 mL), and (2-methylpropyl)boronic acid (76 mg, 0.75 mmol, 3 eq.). The resulting solution was stirred for 1 h at rt. The hexane layer was discarded. The methanol layer was diluted with water (10 mL) then dried over lyophilization. The crude product was purified by prep-HPLC with the following conditions: Column, XBridge Prep OBD C18 Column, 30*150 mm 5 um; mobile phase, Water (10 mmol/L $NH_4HCO_3$+0.1% $NH_3.H_2O$) and ACN (15.0% ACN up to 35.0% in 8 min); Detector, UV 254 nm. This resulted in 30 mg (31%) of ((R)-1-(((((S)-1-acryloylpiperidin-3-yl)oxy)carbonyl)amino)-2-(benzofuran-3-yl)ethyl)boronic acid as a white solid. LC-MS m/z: 386 [M-17], 409 [M+23].

Example 66

((R)-1-(((((S)-1-acryloylpiperidin-3-yl)oxy)carbonyl)amino)-2-(4-(trifluoromethyl)phenyl)ethyl)boronic Acid

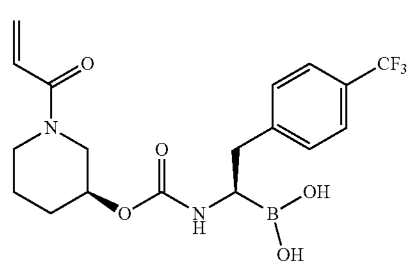

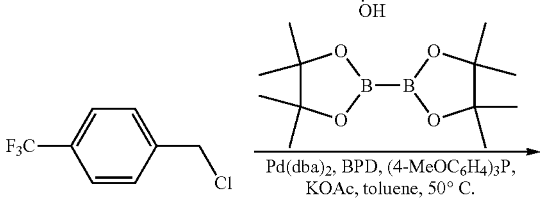

-continued

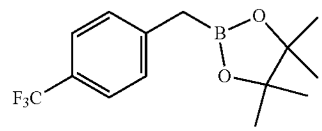

Into a 250-mL round-bottom flask purged and maintained with an inert atmosphere of nitrogen, was placed $Pd(dba)_2$ (264 mg, 0.46 mmol, 0.03 eq.), $(4\text{-}MeOC_6H_4)_3P$ (0.294 mL, 0.06 eq.), 4,4,5,5-tetramethyl-2-(tetramethyl-1,3,2-dioxaborolan-2-yl)-1,3,2-dioxaborolane (4.32 g, 17. mmol, 1.1 eq.), KOAc (2.27 g, 23.13 mmol, 1.5 eq.), toluene (90 mL), and 1-(chloromethyl)-4-(trifluoromethyl)benzene (3.0 g, 15.4 mmol, 1 eq.). The resulting solution was stirred for 48 h at 50° C. The solids were filtered off. The resulting mixture was concentrated. The residue was applied onto a silica gel column with ethyl acetate:petroleum ether (0:100-3:97). This resulted in 2.2 g (50%) of 4,4,5,5-tetramethyl-2-[[4-(trifluoromethyl)phenyl]methyl]-1,3,2-dioxaborolane as a light yellow liquid.

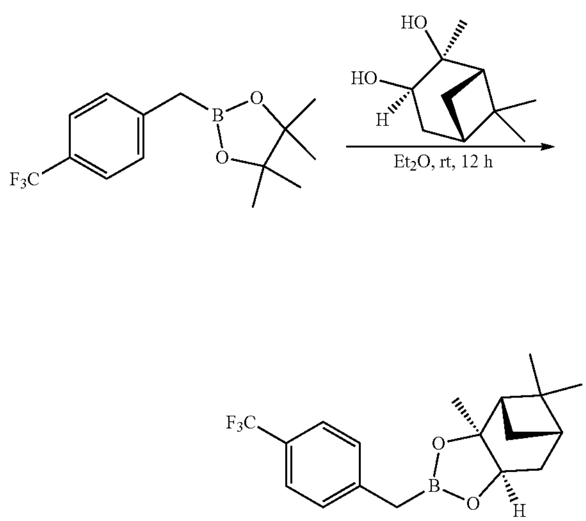

Into a 250-mL round-bottom flask, was placed 4,4,5,5-tetramethyl-2-[[4-(trifluoro methyl)phenyl]methyl]-1,3,2-dioxaborolane (2.36 g, 8.25 mmol, 1 eq.), $Et_2O$ (30 mL), and (1S,2S,3R,5S)-2,6,6-trimethylbicyclo[3.1.1]heptane-2,3-diol (2.8 g, 16.5 mmol, 2 eq.). The resulting solution was stirred for 16 h at rt. The resulting mixture was concentrated. The residue was applied onto a silica gel column with ethyl acetate:petroleum ether (0:100-3:97). This resulted in 2.2 g (79%) of (1S,2S,6R,8S)-2,9,9-trimethyl-4-[[4-(trifluoromethyl)phenyl]methyl]-3,5-dioxa-4-boratricyclo[6.1.1.0^[2,6]]decane as a solid.

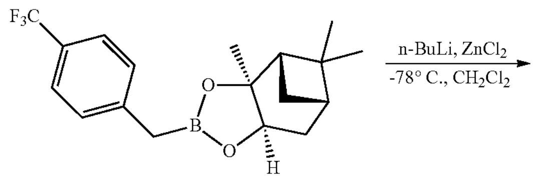

-continued

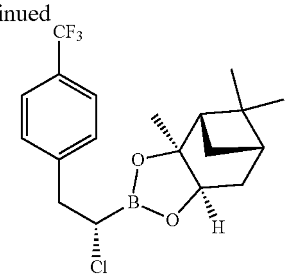

Into a 250-mL round-bottom flask purged and maintained with an inert atmosphere of nitrogen, was placed DCM (1.41 mL, 22.18 mmol, 1.54 eq.), THF (20 mL). To this solution was added n-BuLi (2.5 M in THF) (6.84 mL, 1.2 eq.) dropwise at −100° C. with stirring for 20 min. To this mixture was added a solution of (1S,2S,6R,8S)-2,9,9-trimethyl-4-[[4-(trifluoromethyl)phenyl]methyl]-3,5-dioxa-4-boratricyclo[6.1.1.0^[2,6]]decane (4.82 g, 4.73 mmol, 1 eq.) in THF (2 mL) dropwise with stirring in 5 min. To this mixture was added $ZnCl_2$ (0.5 M in THF, 22.8 mL, 0.8 eq.) dropwise at −78° C. The resulting solution was allowed to stir for 16 h overnight at −78° C. and then allowed to warm to rt. The resulting mixture was concentrated. The residue was dissolved in hexane (100 mL). The resulting mixture was washed with aq. solution of $NH_4Cl$ (100 mL). The solid was dried in an oven under reduced pressure. The residue was applied onto a silica gel column with ethyl acetate: petroleum ether (1:9). This resulted in 4.8 g (87%) of (1S,2S,6R,8S)-4-[(1 S)-1-chloro-2-[4-(trifluoromethyl)phenyl]ethyl]-2,9,9-trimethyl-3,5-dioxa-4-boratricyclo[6.1.1.0^[2,6]]decane as a light yellow oil.

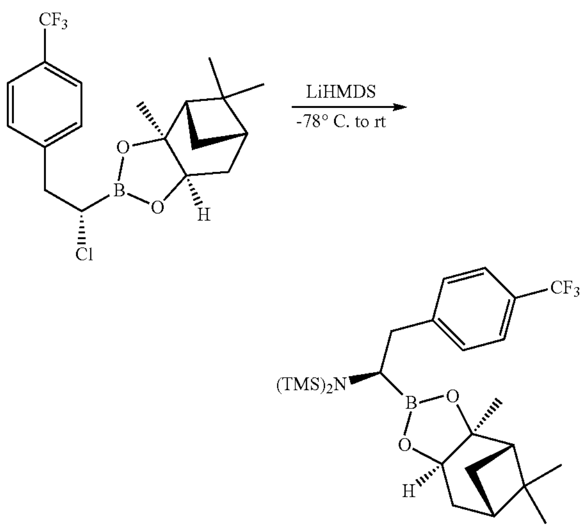

Into a 250-mL round-bottom flask, was placed (1S,2S,6R,8S)-4-[(1S)-1-chloro-2-[4-(trifluoromethyl)phenyl]ethyl]-2,9,9-trimethyl-3,5-dioxa-4-boratricyclo[6.1.1.0^[2,6]]decane (4.8 g, 12.5 mmol, 1 eq.), and THF (45 mL). To this mixture was added LiHMDS (15 mL, 1M in THF, 1.2 eq.) at −78° C. The resulting solution was stirred for 16 h at −78° C. initially and then allowed to warm to rt. The residue was dissolved in n-hexane (100 mL). The solids were filtered off. This resulted in 6.0 g (94%) of [(1R)-2-[4-(trifluoromethyl)phenyl]-1-[(1S,2S,6R,8S)-2,9,9-trimethyl-3,5-dioxa-4-boratricyclo[6.1.1.0^[2,6]]decan-4-yl]ethyl]bis(trimethylsilyl)amine as a yellow solid.

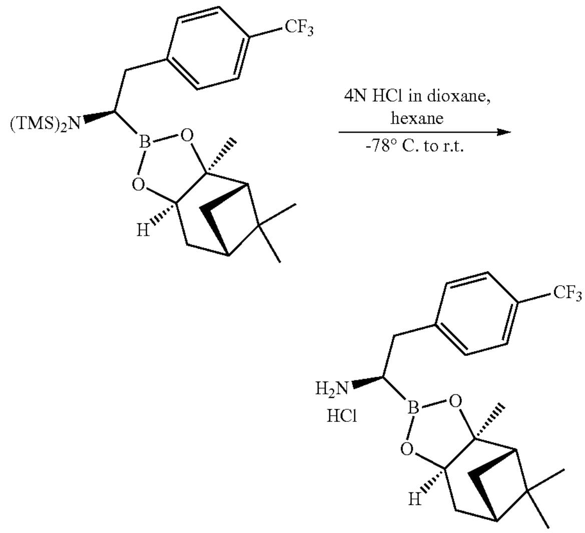

Into a 250-mL 3-necked round-bottom flask purged and maintained with an inert atmosphere of nitrogen, was placed [(1R)-2-[4-(trifluoromethyl)phenyl]-1-[(1S,2S,6R,8S)-2,9,9-trimethyl-3,5-dioxa-4-boratricyclo[6.1.1.0^[2,6]]decan-4-yl]ethyl]bis(trimethylsilyl)amine (6.0 g, 11.7 mmol, 1 eq.). To this solution was added of n-hexane (100 mL). To this mixture was added 4N HCl in dioxane (11.5 mL) at −78° C. The resulting solution was stirred for 4 h at −78° C. to rt. The solids were collected by filtration. This resulted in 3.9 g (82%) of (1R)-2-[4-(trifluoromethyl)phenyl]-1-[(1S,2S,6R,8S)-2,9,9-trimethyl-3,5-dioxa-4-boratricyclo[6.1.1.0^[2,6]]decan-4-yl]ethan-1-amine hydrochloride as an off-white solid.

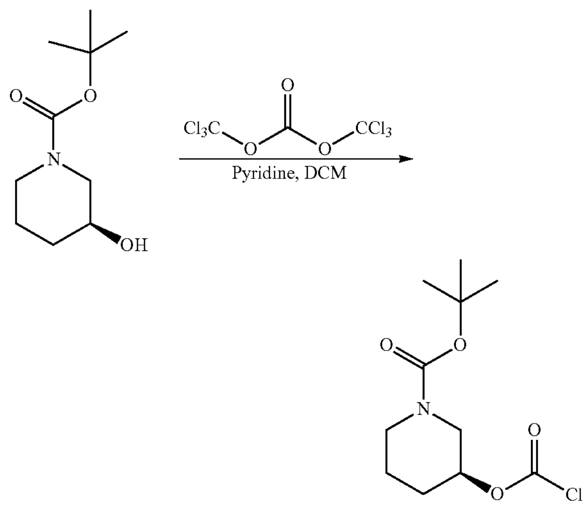

Into a 50-mL 3-necked round-bottom flask purged and maintained with an inert atmosphere of nitrogen, was placed tert-butyl (3S)-3-hydroxypiperidine-1-carboxylate (200 mg, 1 mmol, 1 eq.). To this solid was added DCM (2 mL), followed by pyridine (0.238 mL, 3 mmol, 3 eq.). To this solution was added a solution of ditrichloromethyl carbonate (147.2 mg, 0.5 mmol, 0.5 eq.) in DCM (4 mL) dropwise with stirring at 0° C. The resulting solution was stirred for 2 h at 0° C. The reaction mixture was used directly to the next step.

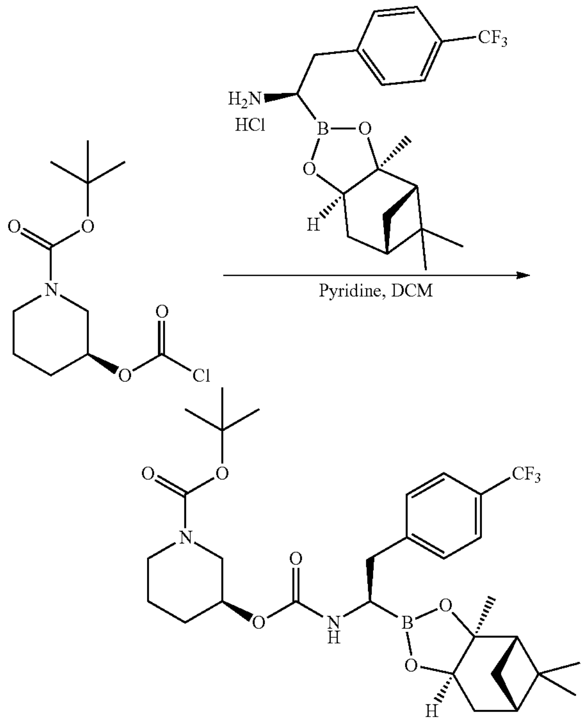

Into a 100-mL round-bottom flask, was placed (1R)-2-[4-(trifluoromethyl)phenyl]-1-[(1S,2S,6R,8S)-2,9,9-trimethyl-3,5-dioxa-4-boratricyclo[6.1.1.0^[2,6]]decan-4-yl]ethan-1-amine hydrochloride (360 mg, 0.9 mmol, 0.9 eq.), DCM (7 mL), and pyridine (0.238 mL). To this solution was followed by the addition of a solution of tert-butyl (3S)-3-[(chlorocarbonyl)oxy]piperidine-1-carboxylate (261 mg, 1 mmol, 1 eq.) in DCM (6 mL) at 0° C. The resulting solution was stirred for 1 h at rt. The resulting mixture was washed with water (100 mL) and brine (50 mL). The mixture was dried over anhydrous sodium sulfate and concentrated. The crude product was purified by flash-prep-HPLC with the following conditions: Column, $C_{18}$ silica gel; mobile phase, ACN-Water (5:95) increasing to ACN-Water (100:0) within 60 min; Detector, 220 nm. This resulted in 330 mg (56%) of tert-butyl (3S)-3-([[(1R)-2-[4-(trifluoromethyl)phenyl]-1-[(1S,2S,6R,8S)-2,9,9-trimethyl-3,5-dioxa-4-boratricyclo[6.1.1.0^[2,6]]decan-4-yl]ethyl]carbamoyl]oxy)piperidine-1-carboxylate as an off-white solid.

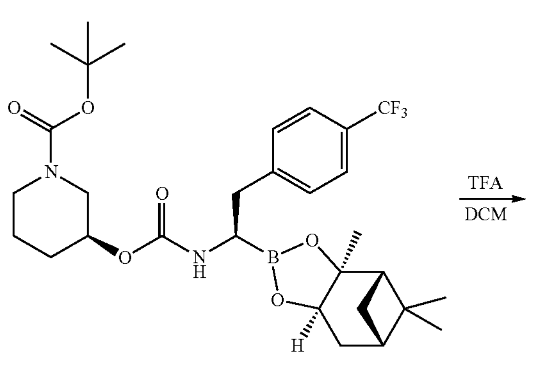

-continued

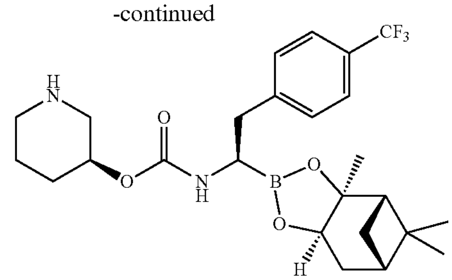

Into a 50-mL round-bottom flask, was placed tert-butyl (3S)-3-([[(1R)-2-[4-(trifluoromethyl)phenyl]-1-[(1S,2S,6R,8S)-2,9,9-trimethyl-3,5-dioxa-4-boratricyclo[6.1.1.0^[2,6]]decan-4-yl]ethyl]carbamoyl]oxy)piperidine-1-carboxylate (330 mg, 0.56 mmol, 1 eq.), DCM (10 mL), and TFA (2 mL). The resulting solution was stirred for 30 min at rt. The resulting mixture was concentrated under vacuum. This resulted in 274 mg (99%) of (3S)-piperidin-3-yl N-[(1R)-2-[4-(trifluoromethyl)phenyl]-1-[(1S,2S,6R,8S)-2,9,9-trimethyl-3,5-dioxa-4-boratricyclo[6.1.1.0^[2,6]]decan-4-yl]ethyl]carbamate as a light yellow solid.

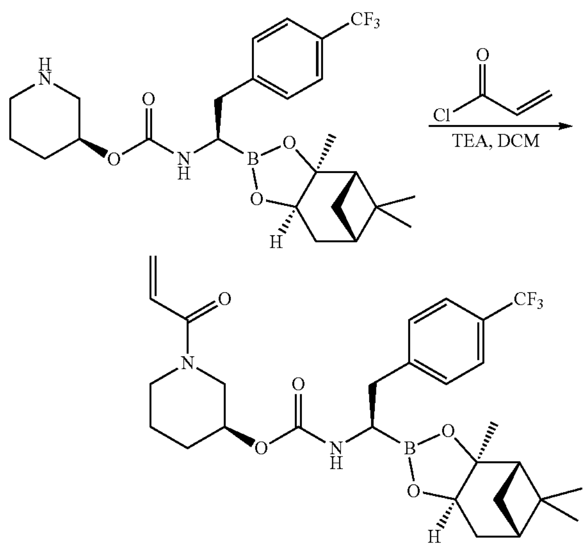

Into a 100-mL round-bottom flask, was placed (3S)-piperidin-3-yl N-[(1R)-2-[4-(trifluoromethyl)phenyl]-1-[(1S,2S,6R,8S)-2,9,9-trimethyl-3,5-dioxa-4-boratricyclo[6.1.1.0^[2,6]]decan-4-yl]ethyl]carbamate (357 mg, 0.72 mmol, 1 eq.), DCM (10 mL), TEA (0.327 mL), and prop-2-enoyl chloride (0.095 mL). The resulting solution was stirred for 30 min at rt. The resulting mixture was washed with water (50 mL) and brine (50 mL). The mixture was dried over anhydrous sodium sulfate and concentrated. The crude product was purified by flash-prep-HPLC with the following conditions: Column, C18 silica gel; mobile phase, ACN:Water (5:95) increasing to ACN:Water (100:0) within 60 min; Detector, UV 220. This resulted in 0.3 g (76%) of (3S)-1-(prop-2-enoyl)piperidin-3-yl N-[(1R)-2-[4-(trifluoromethyl)phenyl]-1-[(1S,2S,6R,8S)-2,9,9-trimethyl-3,5-dioxa-4-boratricyclo[6.1.1.0^[2,6]]decan-4-yl]ethyl]carbamate as an off-white solid.

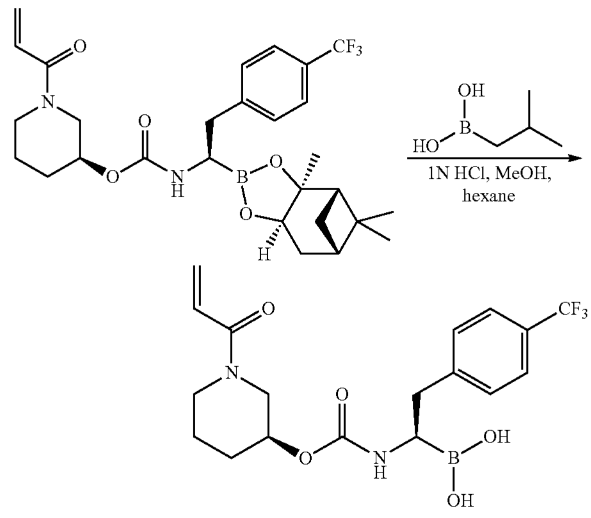

Into a 100-mL round-bottom flask, was placed (3S)-1-(prop-2-enoyl)piperidin-3-yl N-[(1R)-2-[4-(trifluoromethyl)phenyl]-1-[(1S,2S,6R,8S)-2,9,9-trimethyl-3,5-dioxa-4-boratricyclo[6.1.1.0^[2,6]]decan-4-yl]ethyl]carbamate (0.3 g, 0.55 mmol, 1 eq.), MeOH (10 mL), (2-methylpropyl)boronic acid (167 mg, 1.64 mmol, 3 eq.), hexane (10 mL), and 1N HCl (10.9 mL, 20 eq.). The resulting solution was stirred for 1 h at rt. The hexane layer was discarded. The methanol layer was diluted with water (10 mL) and then dried over lyophilization. The crude product was purified by prep-HPLC with the following conditions: Column, XBridge Prep OBD C18 Column, 30*150 mm 5 um; mobile phase, Water (10 mmol/L $NH_4HCO_3$+0.1% $NH_3.H_2O$) and ACN (15% CH3CN up to 35% in 8 min); Detector, 254 nm. This resulted in 33.3 mg (15%) of ((R)-1-(((((S)-1-acryloylpiperidin-3-yl)oxy)carbonyl)amino)-2-(4-(trifluoromethyl)phenyl)ethyl)boronic acid as a white solid. LC-MS m/z: 415 [M+1].

Example 67

((R)-1-(((((S)-1-acryloylpiperidin-3-yl)oxy)carbonyl)amino)-2-phenylethyl)boronic Acid

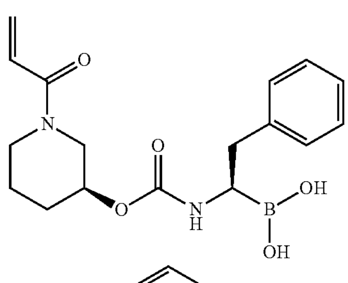

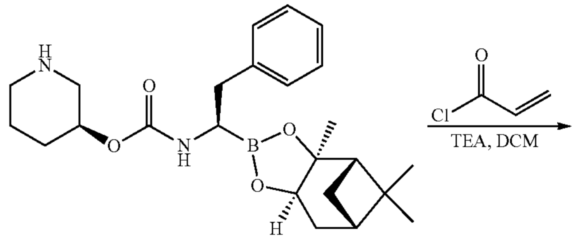

-continued

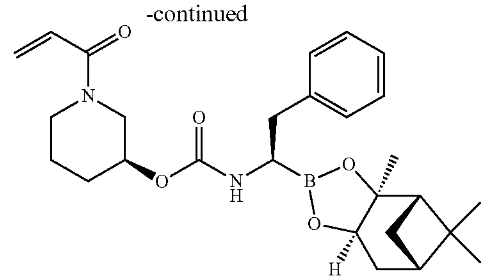

Into a 25-mL round-bottom flask, was placed (3S)-piperidin-3-yl N-[(1R)-2-phenyl-1-[(1S,2S,6R,8S)-2,9,9-trimethyl-3,5-dioxa-4-boratricyclo[6.1.1.0^[2,6]]decan-4-yl]ethyl]carbamate (270 mg, 0.63 mmol, 1 eq.), DCM (5 mL), TEA (194.2 mg, 1.92 mmol, 3 eq.), and prop-2-enoyl chloride (87.1 mg, 0.96 mmol, 1.52 eq.). The resulting solution was stirred for 10 min at rt. The resulting mixture was washed with water (20 mL) and brine (20 mL). The mixture was dried over anhydrous sodium sulfate and concentrated under vacuum. The crude product was purified by flash-prep-HPLC with the following conditions: Column, C18 silica gel; mobile phase, ACN:$H_2O$ (5:95) increasing to ACN:$H_2O$ (100:0) within 60 min; Detector, UV 220 nm. This resulted in 221 mg (73%) of (3S)-1-(prop-2-enoyl)piperidin-3-yl N-[(1R)-2-phenyl-1-[(1S,2S,6R,8S)-2,9,9-trimethyl-3,5-dioxa-4-boratricyclo[6.1.1.0^[2,6]]decan-4-yl]ethyl]carbamate as a white solid.

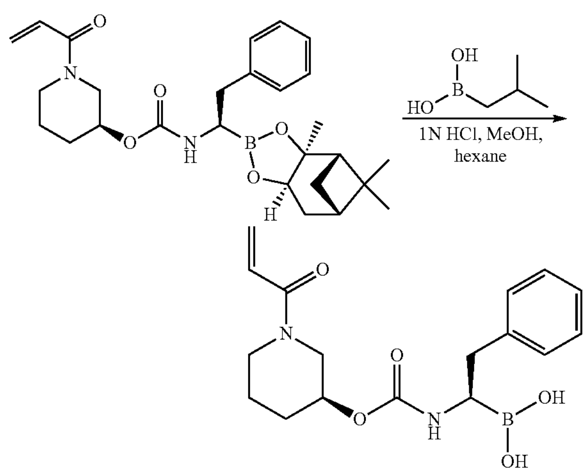

Into a 100-mL round-bottom flask, was placed (3S)-1-(prop-2-enoyl)piperidin-3-yl N-[(1R)-2-phenyl-1-[(1S,2S,6R,8S)-2,9,9-trimethyl-3,5-dioxa-4-boratricyclo[6.1.1.0^[2,6]]decan-4-yl]ethyl]carbamate (208 mg, 0.43 mmol, 1 eq.), MeOH (6 mL), (2-methylpropyl)boronic acid (132.9 mg, 1.30 mmol, 3 eq.), and hexane (6 mL), 1N HCl (9 mL). The methanol layer was diluted with of water (20 mL), and dried over lyophilization to give a crude product which was further purified by prep-HPLC with the following conditions: Column, XBridge Prep C18 OBD Column, 19×150 mm, 5 um; mobile phase, Water (10 mmol/L $NH_4HCO_3$+0.1% $NH_3.H_2O$) and ACN (35.0% ACN up to 59.0% in 7 min); Detector, UV 254/220 nm. This resulted in 57 mg (38%) of ((R)-1-(((((S)-1-acryloylpiperidin-3-yl)oxy)carbonyl)amino)-2-phenylethyl)boronic acid. LC-MS m/z: 369 [M+23].

Example 68

((R)-2-(benzofuran-3-yl)-1-(((((S)-1-(2-cyano-4-(3,3-dimethylpyrrolidin-1-yl)-4-methylpent-2-enoyl)piperidin-3-yl)oxy)carbonyl)amino)ethyl)boronic Acid

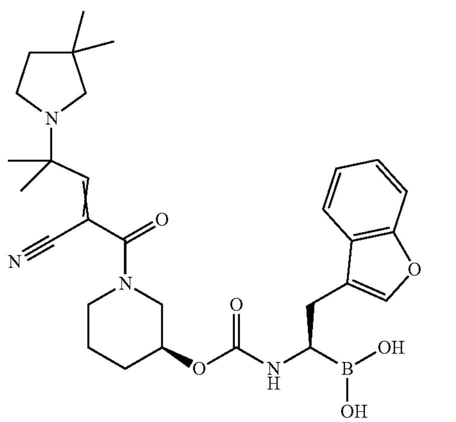

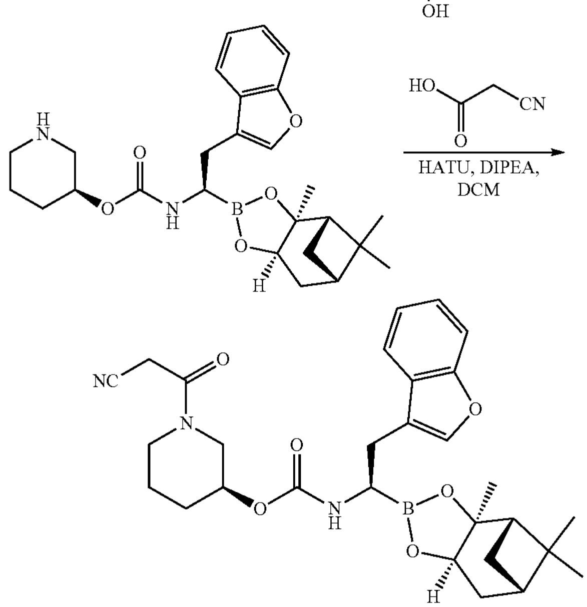

Into a 50-mL round-bottom flask, was placed a solution of (3S)-piperidin-3-yl N-[(1R)-2-(1-benzofuran-3-yl)-1-[(1S,2S,6R,8S)-2,9,9-trimethyl-3,5-dioxa-4-boratricyclo[6.1.1.0^[2,6]]decan-4-yl]ethyl]carbamate (164 mg, 0.35 mmol, 1 eq.) in dichloromethane (2 mL), DIEA (136 mg, 1.05 mmol, 3 eq.), 2-cyanoacetic acid (45 mg, 0.53 mmol, 1.5 eq.), and HATU (200 mg, 0.53 mmol, 1.5 eq.). The resulting solution was stirred for 1 h at rt. The resulting solution was diluted with DCM (20 mL). The resulting mixture was washed with sodium chloride (10 mL). The mixture was dried over anhydrous sodium sulfate and concentrated under vacuum. The residue was applied onto a silica gel column with ethyl acetate:petroleum ether (60:40). This resulted in 100 mg (53%) of (3S)-1-(2-cyanoacetyl)piperidin-3-yl N-[(1R)-2-(1-benzofuran-3-yl)-1-[(1S,2S,6R,8S)-2,9,9-trimethyl-3,5-dioxa-4-boratricyclo[6.1.1.0^[2,6]]decan-4-yl]ethyl]carbamate as a yellow oil.

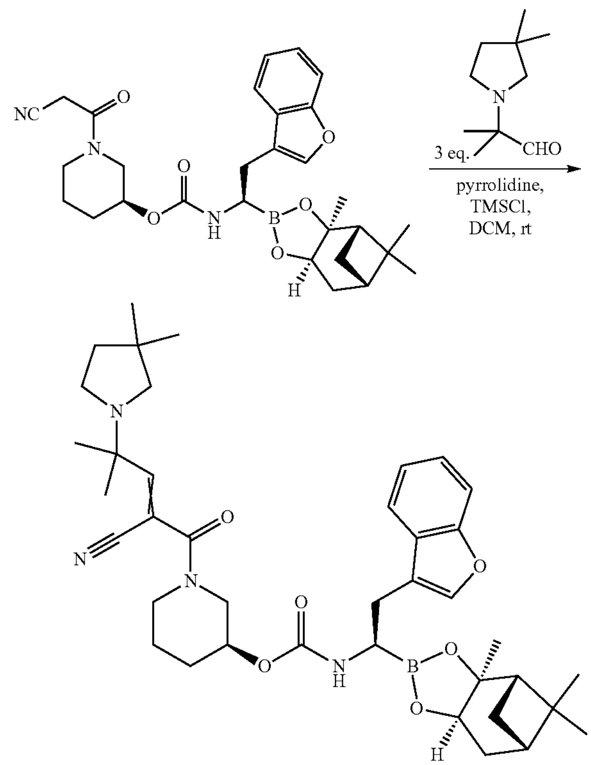

Into a 100-mL round-bottom flask, was placed a solution of (3S)-1-(2-cyanoacetyl)piperidin-3-yl N-[(1R)-2-(1-benzofuran-3-yl)-1-[(1S,2S,6R,8S)-2,9,9-trimethyl-3,5-dioxa-4-boratricyclo[6.1.1.0^[2,6]]decan-4-yl]ethyl]carbamate (190 mg, 0.36 mmol, 1 eq.) in dichloromethane (5 mL), 2-(3,3-dimethylpyrrolidin-1-yl)-2-methylpropanal (181 mg, 1 mmol, 3 eq.), pyrrolidine (127 mg, 1.8 mmol, 5 eq.), and TMSCl (194 mg, 1.8 mmol, 5 eq.). The resulting solution was stirred for 2 h at rt. The resulting solution was diluted with DCM (20 mL). The resulting mixture was washed with brine (10 mL). The mixture was dried over anhydrous sodium sulfate and concentrated under vacuum. The residue was applied onto a silica gel column with ethyl acetate:petroleum ether (70:30). This resulted in 150 mg (62%) of (3S)-1-[2-cyano-2-[2-(3,3-dimethylpyrrolidin-1-yl)-2-methylpropylidene]acetyl]piperidin-3-yl N-[(1R)-2-(1-benzofuran-3-yl)-1-[(1S,2S,6R,8S)-2,9,9-trimethyl-3,5-dioxa-4-boratricyclo[6.1.1.0^[2,6]]decan-4-yl]ethyl]carbamate as a yellow oil.

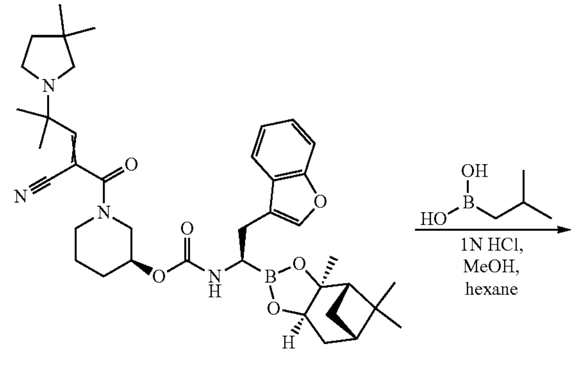

-continued

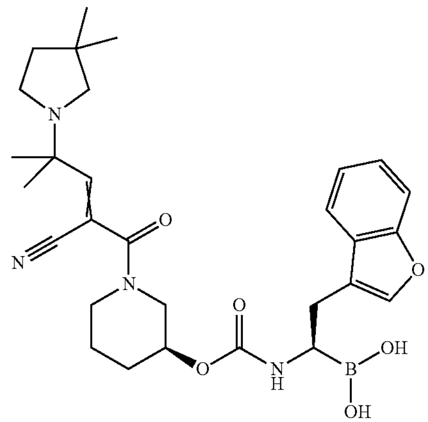

Into a 50-mL round-bottom flask, was placed (3S)-1-[2-cyano-2-[2-(3,3-dimethylpyrrolidin-1-yl)-2-methylpropylidene]acetyl]piperidin-3-yl N-[(1R)-2-(1-benzofuran-3-yl)-1-[(1S,2S,6R,8S)-2,9,9-trimethyl-3,5-dioxa-4-boratricyclo [6.1.1.0^[2,6]]decan-4-yl]ethyl]carbamate (140 mg, 0.2 mmol, 1 eq.), methanol (4 mL), hexane (4 mL), 1N HCl (4 mL), and (2-methylpropyl)boronic acid (63 mg, 0.62 mmol, 3 eq.). The resulting solution was stirred for 1 h at rt. The hexane layer was discarded. The methanol layer was diluted with water (10 mL) then dried over lyophilization. The crude product was purified by prep-HPLC with the following conditions: Column, XBridge Shield RP18 OBD Column, 5 um, 19×150 mm; mobile phase, Water (0.05% TFA) and ACN (39% ACN to 63% in 4 min); Detector, 254 nm. This resulted in 26 mg (23%) of ((R)-2-(benzofuran-3-yl)-1-(((((S)-1-(2-cyano-4-(3,3-dimethylpyrrolidin-1-yl)-4-methylpent-2-enoyl)piperidin-3-yl)oxy)carbonyl)amino)ethyl) boronic acid as a white solid. LC-MS m/z: 551 [M+1].

Example 69

((R)-1-(((((S)-1-(2-cyano-4-(3,3-dimethylpyrrolidin-1-yl)-4-methylpent-2-enoyl)piperidin-3-yl)oxy)carbonyl)amino)-2-(4-(trifluoromethyl)phenyl)ethyl) boronic Acid

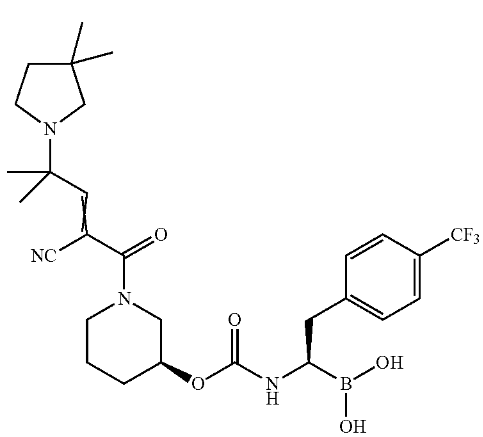

-continued

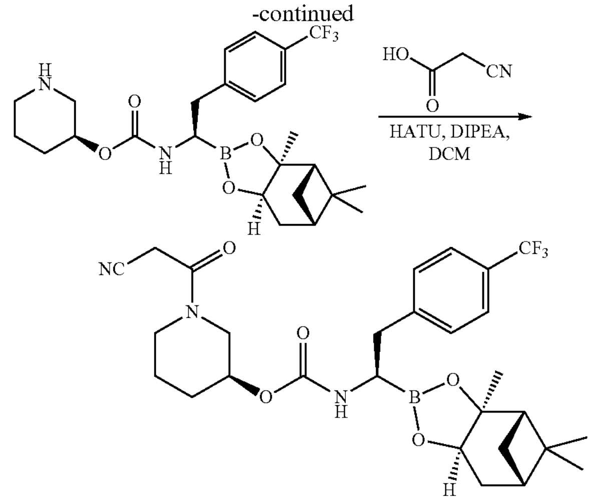

Into a 100-mL round-bottom flask, was placed (3S)-piperidin-3-yl N-[(1R)-2-[4-(trifluoromethyl)phenyl]-1-[(1S,2S,6R,8S)-2,9,9-trimethyl-3,5-dioxa-4-boratricyclo [6.1.1.0^[2,6]]decan-4-yl]ethyl]carbamate (274 mg, 0.55 mmol, 1 eq.), DCM (10 mL), DIEA (0.29 mL, 3 eq.), 2-cyanoacetic acid (71 mg, 0.83 mmol, 1.5 eq.), and HATU (633 mg, 1.66 mmol, 3 eq.). The resulting solution was stirred for 1 h at rt. The resulting mixture was washed with water (50 mL) and brine (100 mL). The mixture was dried over anhydrous sodium sulfate and concentrated. The crude product was purified by flash-prep-HPLC with the following conditions: Column, $C_{18}$ silica gel; mobile phase, ACN:Water (5:95) increasing to ACN:Water (100:0) within 1 h; Detector, 220 nm. This resulted in 290 mg (93%) of (3S)-1-(2-cyanoacetyl)piperidin-3-yl N-[(1R)-2-[4-(trifluoromethyl)phenyl]-1-[(1S,2S,6R,8S)-2,9,9-trimethyl-3,5-dioxa-4-boratricyclo[6.1.1.0^[2,6]]decan-4-yl]ethyl]carbamate as an off-white solid.

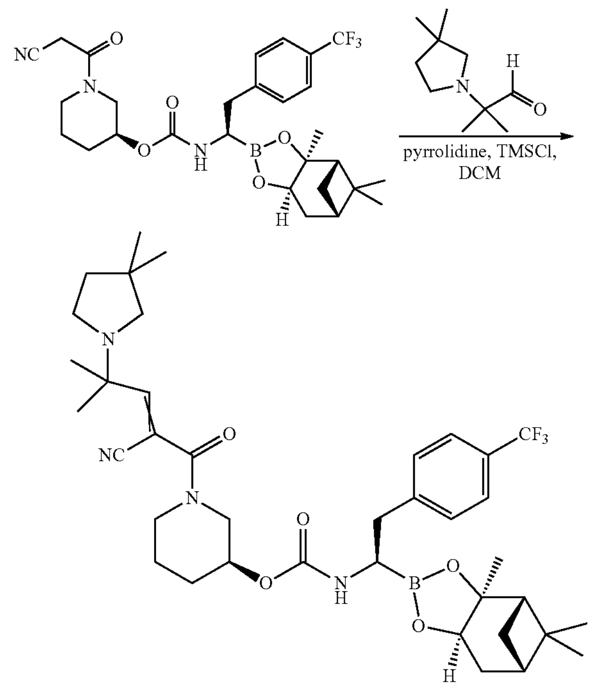

Into a 50-mL round-bottom flask, was placed (3S)-1-(2-cyanoacetyl)piperidin-3-yl N-[(1R)-2-[4-(trifluoromethyl)phenyl]-1-[(1S,2S,6R,8S)-2,9,9-trimethyl-3,5-dioxa-4-boratricyclo[6.1.1.0^[2,6]]decan-4-yl]ethyl]carbamate (290 mg, 0.52 mmol, 1 eq.), DCM (10 mL), 2-(3,3-dimethylpyrrolidin-1-yl)-2-methylpropanal (262 mg, 1.55 mmol, 3 eq.), pyrrolidine (0.212 mL, 5 eq.), TMSCl (0.223 mL, 5 eq.). The resulting solution was stirred for 1 h at rt. The resulting mixture was washed with brine (2×100 mL). The mixture was dried over anhydrous sodium sulfate and concentrated. The crude product was purified by flash-prep-HPLC with the following conditions: Column, $C_{18}$ silica gel; mobile phase, ACN:Water (5:95) increasing to ACN:Water (100:0) within 60 min; Detector, 220 nm. This resulted in 205 mg (56%) of (S)-1-(2-cyano-4-(3,3-dimethylpyrrolidin-1-yl)-4-methylpent-2-enoyl)piperidin-3-yl ((R)-2-(4-(trifluoromethyl)phenyl)-1-((3aS,4S,6S,7aR)-3a,5,5-trimethylhexahydro-4,6-methanobenzo[d][1,3,2]dioxaborol-2-yl)ethyl)carbamate, as an off-white solid.

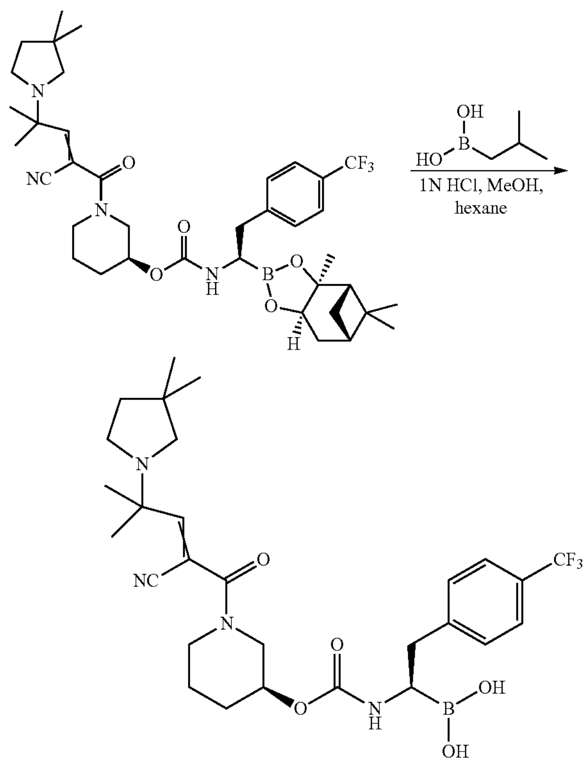

Into a 100-mL round-bottom flask, was placed (S)-1-(2-cyano-4-(3,3-dimethylpyrrolidin-1-yl)-4-methylpent-2-enoyl)piperidin-3-yl ((R)-2-(4-(trifluoromethyl)phenyl)-1-((3aS,4S,6S,7aR)-3a,5,5-trimethylhexahydro-4,6-methanobenzo[d][1,3,2]dioxaborol-2-yl)ethyl)carbamate, (260 mg, 0.36 mmol, 1 eq.), MeOH (8 mL), (2-methylpropyl)boronic acid (112 mg, 1.1 mmol, 3 eq.), hexane (8 mL), and 1N HCl (3.6 mL, 10 eq.). The resulting solution was stirred for 1 h at rt. The methanol phase was dried in a lyophilizer. The crude product was purified by prep-HPLC with the following conditions: Column, XSelect CSH Prep $C_{18}$ OBD Column, 5 um, 19×150 mm; mobile phase, Water (0.05% TFA) and ACN (25% up to 34% in 10 min); Detector, UV 254 nm. This resulted in 67 mg (32%) of ((R)-1-(((((S)-1-(2-cyano-4-(3,3-dimethylpyrrolidin-1-yl)-4-methylpent-2-enoyl)piperidin-3-yl)oxy)carbonyl)amino)-2-(4-(trifluoromethyl)phenyl)ethyl)boronic acid as a white solid. LC-MS m/z: 579 [M+1].

Example 70

((R)-1-(((((S)-1-acryloylpiperidin-3-yl)oxy)carbonyl)amino)-2-(4-fluorophenyl)ethyl)boronic Acid

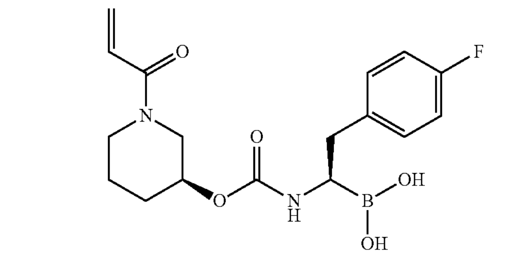

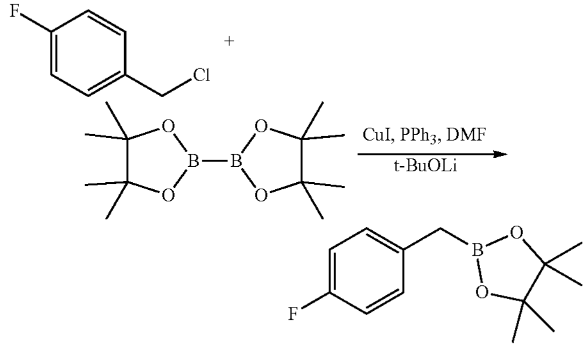

In a 500-mL 3-necked round-bottom flask purged and maintained with an inert atmosphere of nitrogen, was placed 1-(chloromethyl)-4-fluorobenzene (15 g, 103.75 mmol, 1 eq.), 4,4,5,5-tetramethyl-2-(tetramethyl-1,3,2-dioxaborolan-2-yl)-1,3,2-dioxaborolane (29 g, 114.20 mmol, 1.1 eq.), CuI (2 g, 10.4 mmol, 0.1 eq.), $PPh_3$ (2.73 g, 10.4 mmol, 0.1 eq.) and DMF (150 mL). The mixture was stirred and cooled to 0° C. To this mixture was added (tert-butoxy)lithium (13.3 g, 166 mmol, 1.6 eq.) dropwise. The resulting mixture was stirred for 1 h at rt. The resulting mixture was diluted with brine (225 mL) and ethyl acetate (225 mL). The solids were filtered off. The resulting solution was extracted with ethyl acetate (2×150 mL). The combined organic layers were washed with brine (2×150 mL), dried over anhydrous sodium sulfate and concentrated under vacuum. The residue was purified by flash silica gel column with pure petroleum ether increasing to ethyl acetate:petroleum ether (1:3). This resulted in 15.3 g (62%) of 2-[(4-fluorophenyl)methyl]-4,4,5,5-tetramethyl-1,3,2-dioxaborolane as a colorless oil.

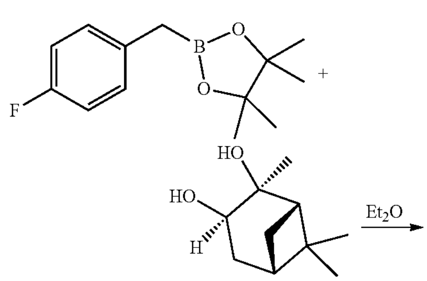

-continued

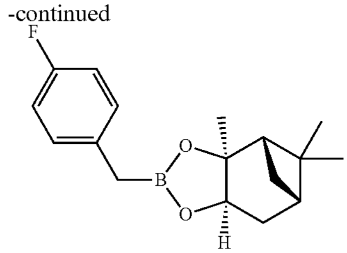

In a 500-mL round-bottom flask purged and maintained with an inert atmosphere of nitrogen, was placed 2-[(4-fluorophenyl)methyl]-4,4,5,5-tetramethyl-1,3,2-dioxaborolane (15.3 g, 64.8 mmol, 1 eq.), (1S,2S,3R,5S)-2,6,6-trimethylbicyclo[3.1.1]heptane-2,3-diol (14.3 g, 84 mmol, 1.3 eq.) and ethoxyethane (153 mL). The resulting solution was stirred 16 h at rt. The resulting mixture was washed with brine (160 mL). The aqueous layer was extracted with ethyl acetate (2×100 mL). The combined organic layers were dried over anhydrous sodium sulfate and concentrated under vacuum. The residue was purified by flash silica gel column with pure petroleum ether increasing to ethyl acetate:petroleum ether (1:3). This resulted in 16.7 g (89%) of (1S,2S,6R,8S)-4-[(4-fluorophenyl)methyl]-2,9,9-trimethyl-3,5-dioxa-4-boratricyclo[6.1.1.0^[2,6]]decane as a colorless oil.

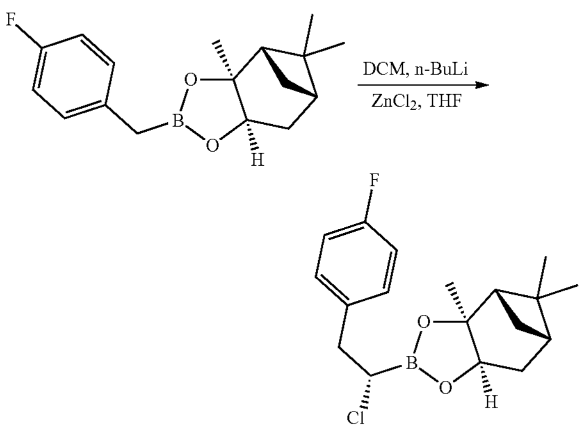

In a 500-mL 3-necked round-bottom flask purged and maintained with an inert atmosphere of nitrogen, was placed THF (110 mL) and DCM (7.60 g, 89.5 mmol, 1.5 eq.). The solution was cooled to −100° C. To the resulting solution was added n-BuLi (2.5 M in hexane, 28 mL, 70 mmol, 1.2 eq.) dropwise. The resulting mixture was stirred for 20 min at -100° C. A solution of (1S,2S,6R,8S)-4-[(4-fluorophenyl)methyl]-2,9,9-trimethyl-3,5-dioxa-4-boratricyclo[6.1.1.0^[2,6]]decane (16.7 g, 58 mmol, 1 eq.) in THF (57 mL) was added dropwise to the cooled mixture within 15 min. After 5 min, $ZnCl_2$ (0.5 M in THF, 105 mL, 52.5 mmol, 0.9 eq.) was added dropwise to the cooled mixture within 10 min. The resulting mixture was warmed up to rt and stirred for 16 h. The resulting solution was concentrated under vacuum. The residue was dissolved in ethyl acetate (300 mL) and saturated aqueous $NH_4Cl$ solution (300 mL). The two layers were separated. The aqueous layer was extracted with ethyl acetate (150 mL). The combined organic layers were dried over anhydrous sodium sulfate and concentrated under vacuum. The residue was purified by flash silica gel column with pure petroleum ether increasing to ethyl acetate:petroleum ether (1:3). This resulted in 17.5 g (90%) of (1S,2S,6R,8S)-4-[(1S)-1-chloro-2-(4-fluorophenyl)ethyl]-2,9,9-trimethyl-3,5-dioxa-4-boratricyclo[6.1.1.0 [2,6]]decane as a colorless oil.

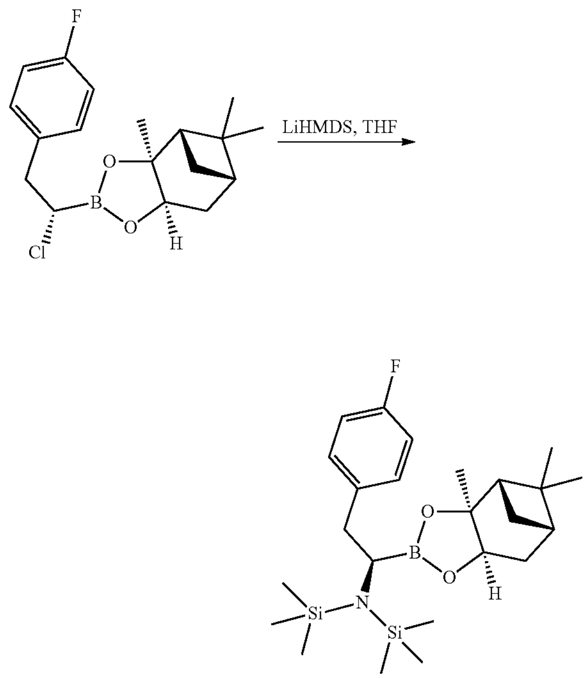

In a 500-mL 3-necked round-bottom flask purged and maintained with an inert atmosphere of nitrogen, was placed (1S,2S,6R,8S)-4-[(1S)-1-chloro-2-(4-fluorophenyl)ethyl]-2,9,9-trimethyl-3,5-dioxa-4-boratricyclo[6.1.1.0^[2,6]]decane (17.5 g, 52 mmol, 1 eq.) and THF (175 mL). The solution was cooled to −78° C. To the resulting mixture was added LiHMDS in THF solution (1.0 M, 62.4 mL, 62.4 mmol, 1.2 eq.) dropwise. The resulting mixture was allowed to warm up to rt and the reaction was stirred overnight. The resulting mixture was concentrated under vacuum. To the residue was added hexane (300 mL). The mixture was stirred for 1 h at rt. The solids were filtered off. The filter cake was washed with hexane (150 mL). The filtrate was concentrated under vacuum. This resulted in 18.2 g (76%) of [(1R)-2-(4-fluorophenyl)-1-[(1S,2S,6R,8S)-2,9,9-trimethyl-3,5-dioxa-4-boratricyclo[6.1.1.0^[2,6]]decan-4-yl]ethyl]bis(trimethylsilyl)amine as a light yellow oil.

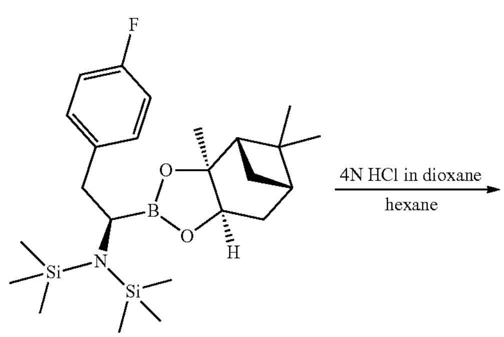

-continued

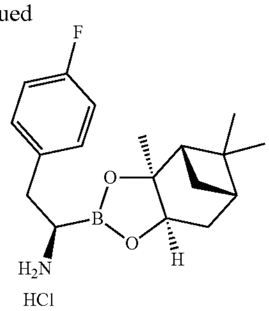

In a 500-mL 3-necked round-bottom flask purged and maintained with an inert atmosphere of nitrogen, was placed [(1R)-2-(4-fluorophenyl)-1-[(1S,2S,6R,8S)-2,9,9-trimethyl-3,5-dioxa-4-boratricyclo[6.1.1.0^[2,6]]decan-4-yl]ethyl]bis(trimethylsilyl)amine (18.2 g, 39.5 mmol, 1 eq.) and hexane (182 mL). The mixture was cooled to −78° C. To the resulting mixture was added 4N HCl in dioxane (29.7 mL, 119 mmol, 3 eq.) dropwise. The resulting mixture was allowed to warm to rt and then stirred for 3 h. The mixture was filtered. The filter cake was washed with hexane (90 mL) and dried under vacuum. This resulted in 11.7 g (84%) of (1R)-2-(4-fluorophenyl)-1-[(1S,2S,6R,8S)-2,9,9-trimethyl-3,5-dioxa-4-boratricyclo[6.1.1.0^[2,6]]decan-4-yl]ethan-1-amine hydrochloride as a light yellow solid.

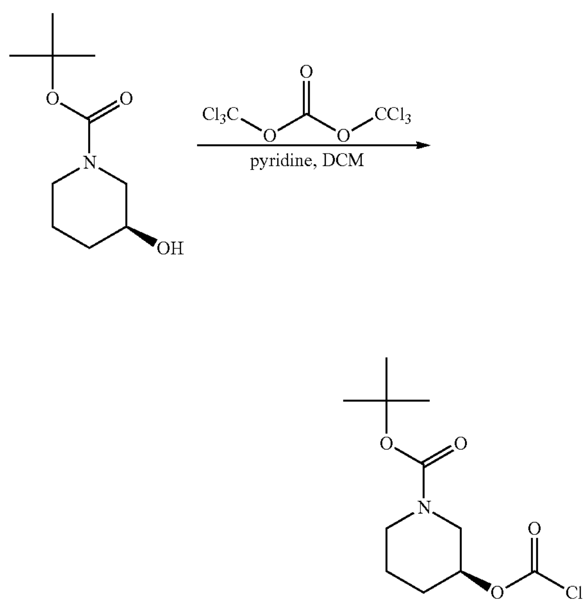

In a 25-mL 3-necked round-bottom flask purged and maintained with an inert atmosphere of nitrogen, was placed tert-butyl (3S)-3-hydroxypiperidine-1-carboxylate (200 mg, 1 mmol, 1 eq.), DCM (4 mL) and pyridine (236 mg, 3 mmol, 3 eq.). The mixture was stirred and cooled to 0° C. A solution of ditrichloromethyl carbonate (148 mg, 0.5 mmol, 0.5 eq.) in DCM (2 mL) was added dropwise to the cooled mixture. The resulting suspension was stirred for 2 h at 0° C. and used directly to the next step.

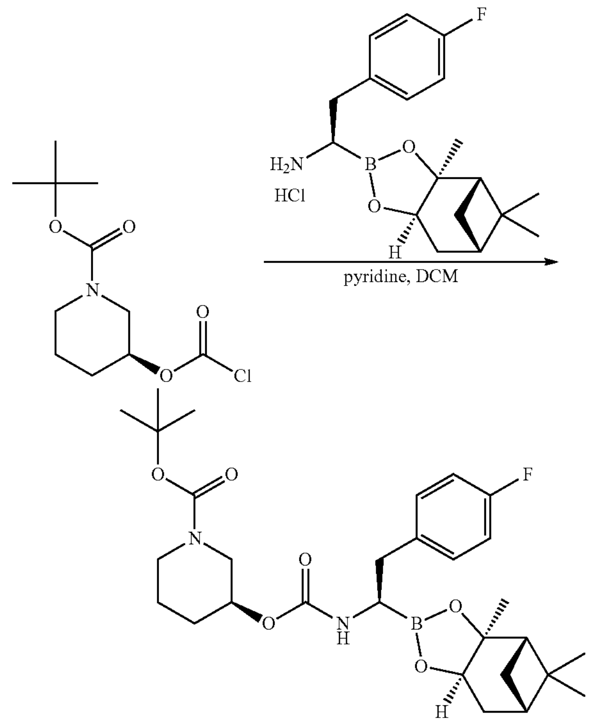

In a 25-mL 3-necked round-bottom flask purged and maintained with an inert atmosphere of nitrogen, was placed (1R)-2-(4-fluorophenyl)-1-[(1S,2S,6R,8S)-2,9,9-trimethyl-3,5-dioxa-4-boratricyclo[6.1.1.0^[2,6]]decan-4-yl]ethan-1-amine hydrochloride (284 mg, 0.80 mmol, 1.0 eq.), DCM (4 mL) and pyridine (236 mg, 3 mmol, 3.7 eq.). The mixture was stirred and cooled to 0° C. A suspension of tert-butyl (3S)-3-[(chlorocarbonyl)oxy]piperidine-1-carboxylate (262 mg, 1 mmol, 1.24 eq.) in DCM was added to the cooled mixture. The resulting mixture was stirred for 1 h at 0° C. The resulting mixture was diluted with DCM (20 mL) and washed with brine (2×20 mL). The organic layer was dried over anhydrous sodium sulfate and concentrated under vacuum. The crude product was purified by flash-prep-HPLC with the following conditions: Column, C18 silica gel; mobile phase, $H_2O$:$CH_3CN$ (19:1) increasing to 100% $CH_3CN$ within 50 min; Detector, UV 220 nm. This resulted in 250 mg (57%) of tert-butyl (3S)-3-([[(1R)-2-(4-fluorophenyl)-1-[(1S,2S,6R,8S)-2,9,9-trimethyl-3,5-dioxa-4-boratricyclo[6.1.1.0^[2,6]]decan-4-yl]ethyl]carbamoyl]oxy)piperidine-1-carboxylate as a colorless oil.

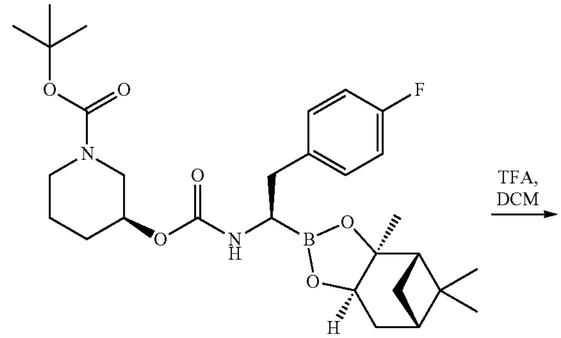

-continued

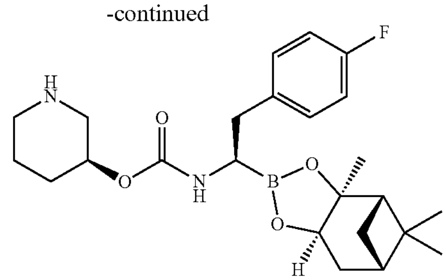

In a 25-mL round-bottom flask purged and maintained with an inert atmosphere of nitrogen, was placed tert-butyl (3S)-3-([[(1R)-2-(4-fluorophenyl)-1-[(1S,2S,6R,8S)-2,9,9-trimethyl-3,5-dioxa-4-boratricyclo[6.1.1.0^[2,6]]decan-4-yl]ethyl]carbamoyl]oxy)piperidine-1-carboxylate (250 mg, 0.46 mmol, 1 eq.), DCM (5 mL), and TFA (1 mL). The resulting solution was stirred for 30 min at rt. The resulting mixture was concentrated under vacuum. This resulted in 204 mg (99%) of (3S)-piperidin-3-yl N-[(1R)-2-(4-fluorophenyl)-1-[(1S,2S,6R,8S)-2,9,9-trimethyl-3,5-dioxa-4-boratricyclo[6.1.1.0^[2,6]]decan-4-yl]ethyl]carbamate as a yellow oil.

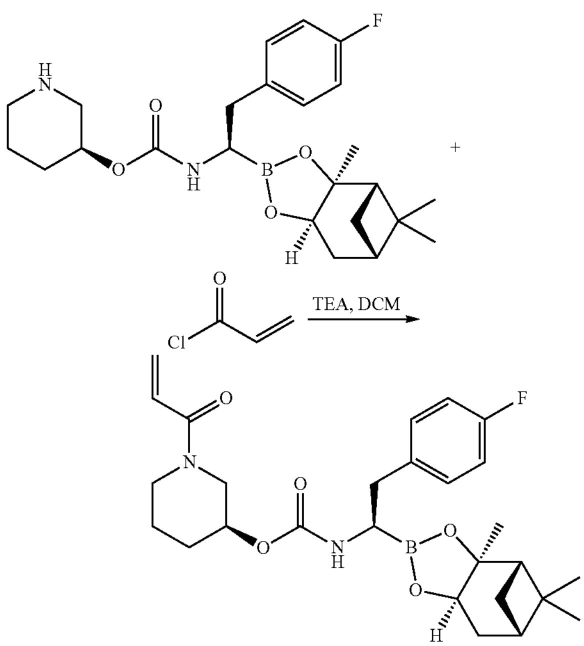

In a 25-mL 3-necked round-bottom flask purged and maintained with an inert atmosphere of nitrogen, was placed (3S)-piperidin-3-yl N-[(1R)-2-(4-fluorophenyl)-1-[(1S,2S,6R,8S)-2,9,9-trimethyl-3,5-dioxa-4-boratricyclo[6.1.1.0^[2,6]]decan-4-yl]ethyl]carbamate (204 mg, 0.46 mmol, 1 eq.), DCM (5 mL) and TEA (140 mg, 1.38 mmol, 3 eq.). The mixture was stirred and cooled to 0° C. To this cooled mixture was added prop-2-enoyl chloride (51 mg, 0.56 mmol, 1.2 eq.) dropwise. The resulting solution was stirred for 1 h at 0° C. The resulting solution was diluted with DCM (30 mL) and washed with brine (30 mL). The organic layer was dried over anhydrous sodium sulfate and concentrated under vacuum. The crude product was purified by flash-prep-HPLC with the following conditions: Column, C18 silica gel; mobile phase, $H_2O$:$CH_3CN$ (19:1) increasing to 100% $CH_3CN$ within 45 min; Detector, UV 220 nm. This resulted in 160 mg (70%) of (3S)-1-(prop-2-enoyl)piperidin-3-yl N-[(1R)-2-(4-fluorophenyl)-1-[(1S,2S,6R,8S)-2,9,9-trimethyl-3,5-dioxa-4-boratricyclo[6.1.1.0^[2,6]]decan-4-yl]ethyl]carbamate as a colorless oil.

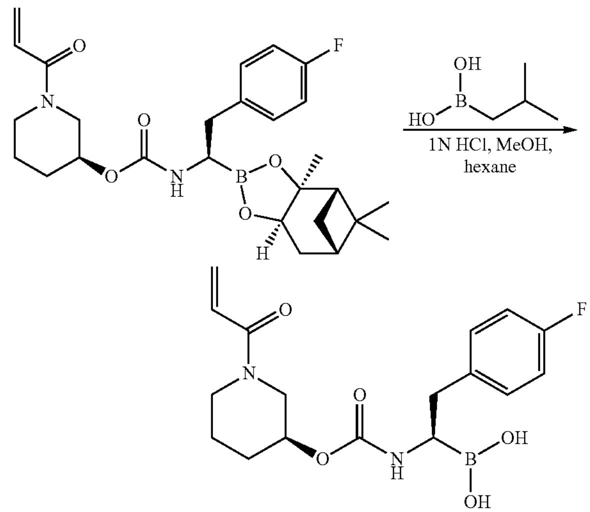

In a 100-mL round-bottom flask, was placed (3S)-1-(prop-2-enoyl)piperidin-3-yl N-[(1R)-2-(4-fluorophenyl)-1-[(1S,2S,6R,8S)-2,9,9-trimethyl-3,5-dioxa-4-boratricyclo[6.1.1.0^[2,6]]decan-4-yl]ethyl]carbamate (160 mg, 0.32 mmol, 1 eq.), methanol (5 mL), hexane (5 mL), (2-methylpropyl)boronic acid (99 mg, 1 mmol, 3 eq.), and 1N HCl (3.2 mL, 3.2 mmol, 10 eq.). The resulting solution was stirred for 1 h at rt. The two layers were separated. The methanol layer was diluted with water (20 mL) and extracted with hexane (2×20 mL). The aqueous layer was dried over lyophilization to give a crude product, which was purified by prep-HPLC with the following conditions: Column: XBridge Prep OBD C18 Column 30×150 mm 5 um; Mobile Phase A: Water (10 mmol/L $NH_4HCO_3$+0.1% $NH_3.H_2O$), Mobile Phase B: ACN; Flow rate: 60 mL/min; Gradient: 14% B to 44% B in 8 min; UV 254 nm; Rt: 5.62 min. This resulted in 50 mg (43%) of ((R)-1-(((((S)-1-acryloylpiperidin-3-yl)oxy)carbonyl)amino)-2-(4-fluorophenyl)ethyl)boronic acid as a white solid. LC-MS m/z: 347 [M-17].

Example 71

(R)-(1-((((7-acryloyl-7-azabicyclo[2.2.1]heptan-1-yl)methoxy)carbonyl)amino)-3-phenylpropyl)boronic Acid

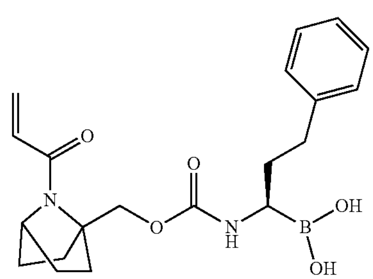

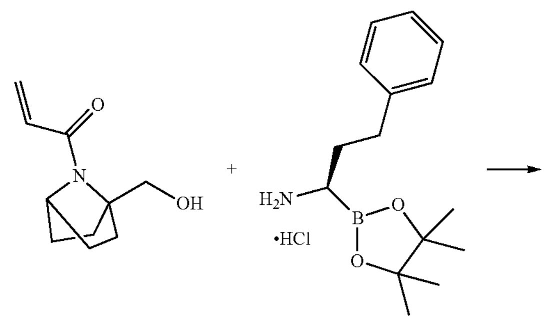

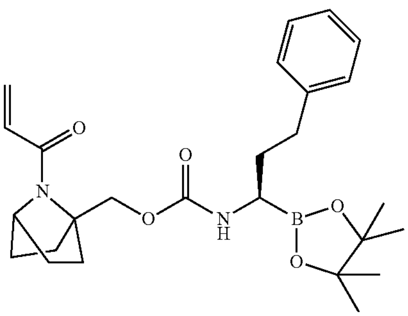

Bis(trichloromethyl) carbonate (206 mg, 0.69 mmol) in DCM (1 mL) was added dropwise into a stirring solution of 1-(1-(hydroxymethyl)-7-azabicyclo[2.2.1]heptan-7-yl)prop-2-en-1-one (140 mg, 0.77 mmol) and DIPEA (599 mg, 4.63 mmol) in DCM (3 mL) at 0° C. The mixture was stirred for 2 h at 0° C. This resulting mixture was added dropwise into a well-stirred solution of (R)-3-phenyl-1-(4,4,5,5-tetramethyl-1,3,2-dioxaborolan-2-yl)propan-1-amine hydrochloride (345 mg, 1.16 mmol) and DIPEA (449 mg, 3.48 mmol) in DCM (4 mL) at 0° C. The reaction was stirred at 0° C. for 2 h, then diluted with DCM (25 mL), washed with water (5 mL) followed by brine (5 mL), and then dried over $Na_2SO_4$, concentrated in vacuo. The residue was purified by prep-HPLC to afford ((1s,4S)-7-acryloyl-7-azabicyclo[2.2.1]heptan-1-yl)methyl ((R)-3-phenyl-1-(4,4,5,5-tetramethyl-1,3,2-dioxaborolan-2-yl)propyl)carbamate as a white solid (100 mg, 28%).

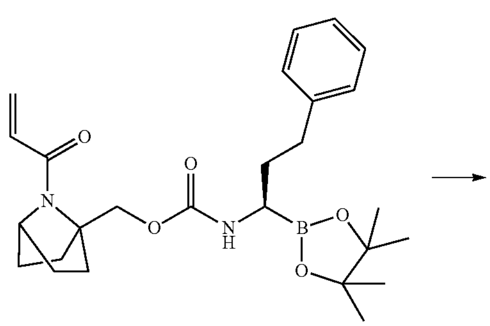

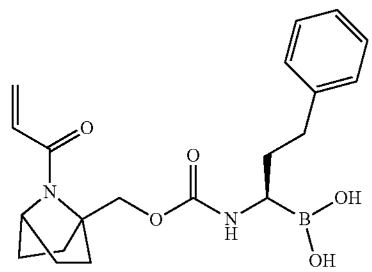

To a solution of ((1s,4S)-7-acryloyl-7-azabicyclo[2.2.1]heptan-1-yl)methyl ((R)-3-phenyl-1-(4,4,5,5-tetramethyl-1,3,2-dioxaborolan-2-yl)propyl)carbamate (100 mg, 0.2 mmol) in MeOH (4 mL) were added hexanes (4 mL) and 1N HCl (2 mL), followed by isobutyl boric acid (44 mg, 0.4 mmol). After stirred at rt for 1 h, the hexanes layer was discarded. The methanol layer was diluted with water (20 mL) and a 1N solution of aq. $NaHCO_3$ (2 mL), followed by lyophilization to give a crude product, which was purified by prep-HPLC to afford (R)-(1-((((7-acryloyl-7-azabicyclo[2.2.1]heptan-1-yl)methoxy)carbonyl)amino)-3-phenylpropyl)boronic acid as a white solid (49 mg, 59%).

Example 72

((R)-1-(((((S)-1-(2-cyano-4-(3,3-dimethylpyrrolidin-1-yl)-4-methylpent-2-enoyl)piperidin-3-yl)oxy)carbonyl)amino)-2-(4-fluorophenyl)ethyl)boronic Acid

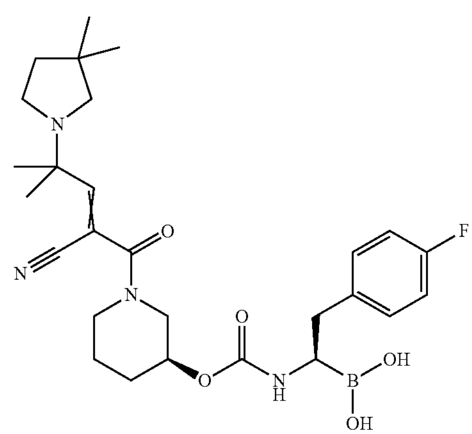

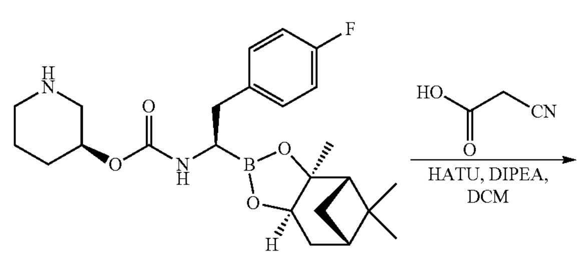

-continued

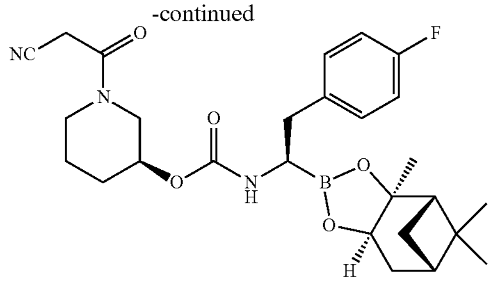

In a 25-mL round-bottom flask, was placed (3S)-piperidin-3-yl N-[(1R)-2-(4-fluorophenyl)-1-[(1S,2S,6R,8S)-2,9,9-trimethyl-3,5-dioxa-4-boratricyclo[6.1.1.0^[2,6]]decan-4-yl]ethyl]carbamate (240 mg, 0.54 mmol, 1 eq.), DCM (5 mL), DIPEA (214 mg, 1.65 mmol, 3 eq.), 2-cyanoacetic acid (47 mg, 0.55 mmol, 1 eq.), and HATU (314 mg, 0.83 mmol, 1.5 eq.), which followed that order of addition. The resulting solution was stirred for 1 h at rt. The resulting mixture was washed with water (20 mL) and brine (20 mL). The mixture was dried over anhydrous sodium sulfate and concentrated under vacuum. The crude product was purified by flash-prep-HPLC with the following conditions: Column, C18 silica gel; mobile phase, ACN:$H_2O$ (5:95) increasing to ACN:$H_2O$ (100:0) within 60 min; Detector, 220 nm. This resulted in 250 mg (91%) of (3S)-1-(2-cyanoacetyl)piperidin-3-yl N-[(1R)-2-(4-fluorophenyl)-1-[(1S,2S,6R,8S)-2,9,9-trimethyl-3,5-dioxa-4-boratricyclo[6.1.1.0^[2,6]]decan-4-yl]ethyl]carbamate as a light yellow solid.

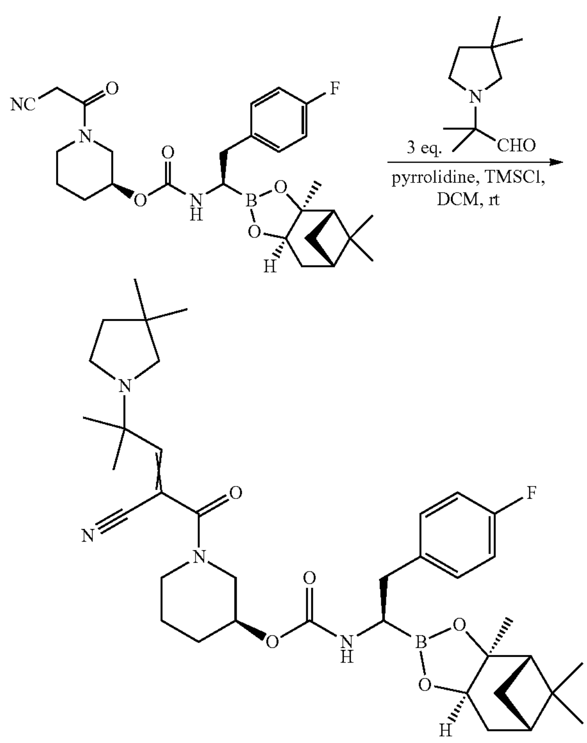

In a 25-mL round-bottom flask, was placed (3S)-1-(2-cyanoacetyl)piperidin-3-yl N-[(1R)-2-(4-fluorophenyl)-1-[(1S,2S,6R,8S)-2,9,9-trimethyl-3,5-dioxa-4-boratricyclo[6.1.1.0^[2,6]]decan-4-yl]ethyl]carbamate (245 mg, 0.48 mmol, 1 eq.), DCM (5 mL), 2-(3,3-dimethylpyrrolidin-1-yl)-2-methylpropanal (243 mg, 1.44 mmol, 3 eq.), pyrrolidine (170 mg, 2.4 mmol, 5 eq.), and chlorotrimethylsilane (260 mg, 2.4 mmol, 5 eq.). The resulting solution was stirred for 1 h at rt. The resulting mixture was washed with water (20 mL) and brine (20 mL). The mixture was dried over anhydrous sodium sulfate and concentrated under vacuum. The crude product was purified by flash-prep-HPLC with the following conditions: Column, C18 silica gel; mobile phase, ACN:$H_2O$ (5:95) increasing to ACN:$H_2O$ (100:0) within 60 min; Detector, 220 nm. This resulted in 166 mg (52%) of (S)-1-(2-cyano-4-(3,3-dimethylpyrrolidin-1-yl)-4-methylpent-2-enoyl)piperidin-3-yl ((R)-2-(4-fluorophenyl)-1-((3aS,4S,6S,7aR)-3a,5,5-trimethylhexahydro-4,6-methanobenzo[d][1,3,2]dioxaborol-2-yl)ethyl)carbamate as a light yellow solid.

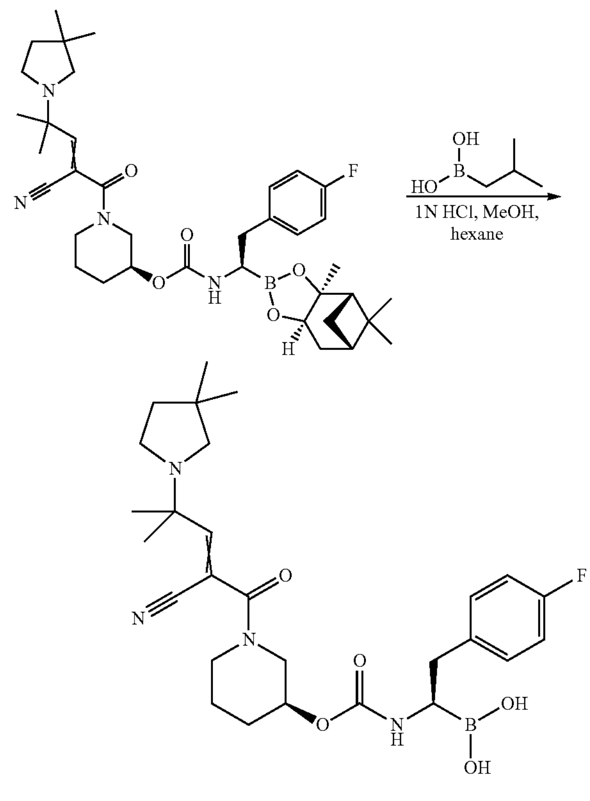

In a 100-mL round-bottom flask, was placed (S)-1-(2-cyano-4-(3,3-dimethylpyrrolidin-1-yl)-4-methylpent-2-enoyl)piperidin-3-yl ((R)-2-(4-fluorophenyl)-1-((3aS,4S,6S,7aR)-3a,5,5-trimethylhexahydro-4,6-methanobenzo[d][1,3,2]dioxaborol-2-yl)ethyl)carbamate (220 mg, 0.33 mmol, 1 eq.), MeOH (7 mL), (2-methylpropyl)boronic acid (102 mg, 1 mmol, 3 eq.), hexane (7 mL), and 1N HCl (7 mL). The resulting solution was stirred for 1 h at rt. The methanol layer was diluted with water (25 mL), and dried over lyophylization to give a crude product. The crude product was purified by prep-HPLC with the following conditions: Column, XBridge Prep OBD C18 Column, 30*150 mm, 5 um; mobile phase, Water (10 mmol/L $NH_4HCO_3$+0.1% $NH_3.H_2O$) and ACN (33% PhaseB up to 63% in 8 min); Detector, UV 254/220 nm. This resulted in 92 mg (52%) of ((R)-1-(((((S)-1-(2-cyano-4-(3,3-dimethylpyrrolidin-1-yl)-4-methylpent-2-enoyl)piperidin-3-yl)oxy)carbonyl)amino)-2-(4-fluorophenyl)ethyl)boronic acid as a white solid. LC-MS m/z: 529 [M+1].

Example 73

((R)-2-(benzofuran-3-yl)-1-(((((S)-1-(2-cyano-4-(3,3-difluoropyrrolidin-1-yl)-4-methylpent-2-enoyl)piperidin-3-yl)oxy)carbonyl)amino)ethyl)boronic Acid

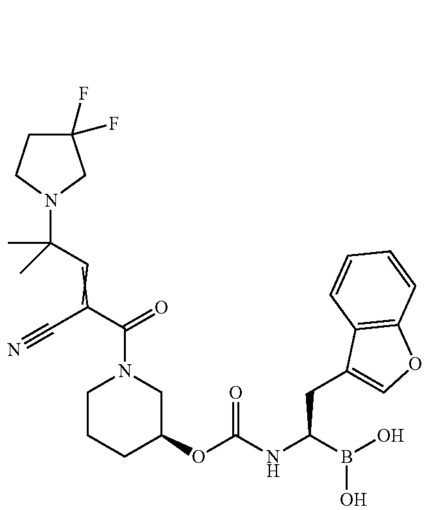

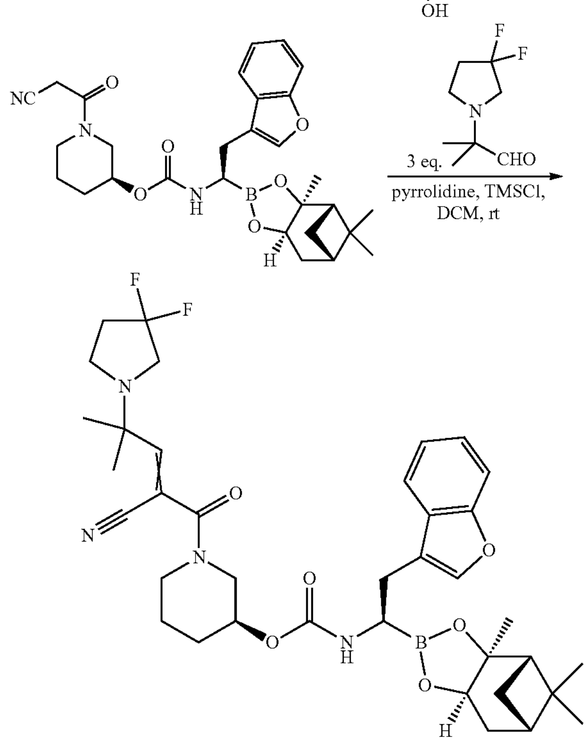

In a 100-mL 3-necked round-bottom flask, was placed a solution of (3S)-1-(2-cyanoacetyl)piperidin-3-yl N-[(1R)-2-(l-benzofuran-3-yl)-1-[(1S,2S,6R,8S)-2,9,9-trimethyl-3,5-dioxa-4-boratricyclo[6.1.1.0^[2,6]]decan-4-yl]ethyl]carbamate (230 mg, 0.43 mmol, 1 eq.) in dichloromethane (4 mL), 2-(3,3-difluoropyrrolidin-1-yl)-2-methylpropanal (230 mg, 1.30 mmol, 3 eq.), pyrrolidine (153 mg, 0.86 mmol, 5 eq.), and TMSCl (234 mg, 2.15 mmol, 5 eq.). The resulting solution was stirred for 1 h at rt. The resulting solution was diluted with DCM (10 mL). The resulting mixture was washed with brine (10 mL). The mixture was dried over anhydrous sodium sulfate and concentrated under vacuum. The residue was applied onto a silica gel column with ethyl acetate:petroleum ether (30:70). This resulted in 160 mg (54%) of (3S)-1-[2-cyano-2-[2-(3,3-difluoropyrrolidin-1-yl)-2-methylpropylidene]acetyl]piperidin-3-yl N-[(1R)-2-(1-benzofuran-3-yl)-1-[(1S,2S,6R,8S)-2,9,9-trimethyl-3,5-dioxa-4-boratricyclo[6.1.1.0^[2,6]]decan-4-yl]ethyl] carbamate as a colorless oil.

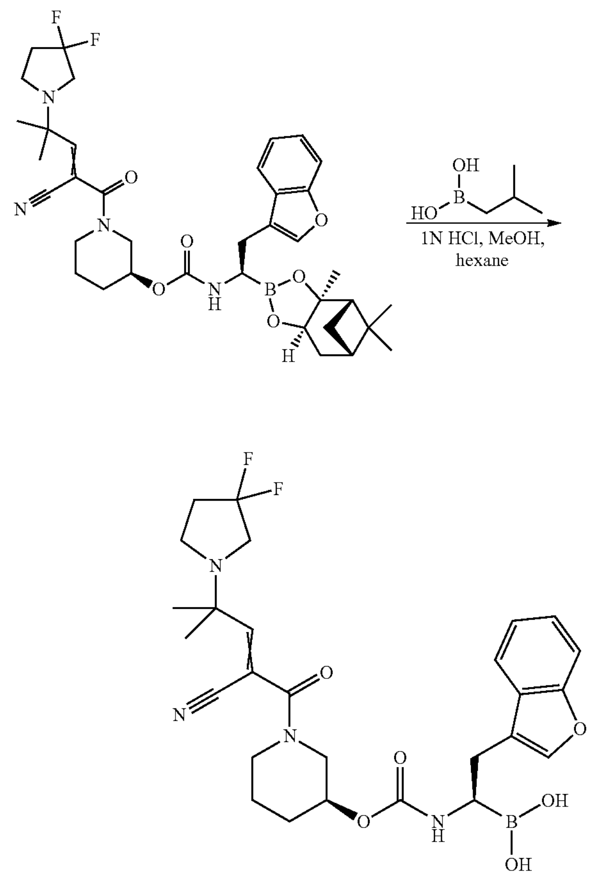

In a 100-mL round-bottom flask, was placed (3S)-1-[2-cyano-2-[2-(3,3-difluoropyrrolidin-1-yl)-2-methylpropylidene]acetyl]piperidin-3-yl N-[(1R)-2-(1-benzofuran-3-yl)-1-[(1S,2S,6R,8S)-2,9,9-trimethyl-3,5-dioxa-4-boratricyclo[6.1.1.0^[2,6]]decan-4-yl]ethyl]carbamate (130 mg, 0.19 mmol, 1 eq.), MeOH (4 mL), hexane (4 mL), 1N HCl (4 mL), and (2-methylpropyl)boronic acid (57.4 mg, 0.56 mmol, 3 eq.). The resulting solution was stirred for 1 h at rt. The hexane layer was discarded. The methanol layer was diluted with water (10 mL) and dried over lyophilization. The crude product was purified by prep-HPLC with the following conditions: Column, XBridge Prep OBD C18 Column, 30*150 mm, 5 um; mobile phase, Water (10 mmol/L $NH_4HCO_3$+0.1% $NH_3.H_2O$) and ACN (34% $CH_3CN$ up to 64% in 8 min); Detector, uv 254 nm. This resulted in 59 mg (55%) of ((R)-2-(benzofuran-3-yl)-1-(((((S)-1-(2-cyano-4-(3,3-difluoropyrrolidin-1-yl)-4-methylpent-2-enoyl)piperidin-3-yl)oxy)carbonyl)amino)ethyl) boronic acid as a white solid. LC-MS m/z: 559 [M+1].

Example 74

((R)-1-(((((S)-1-(2-fluoroacryloyl)piperidin-3-yl) oxy)carbonyl)amino)-2-(4-fluorophenyl)ethyl)boronic Acid

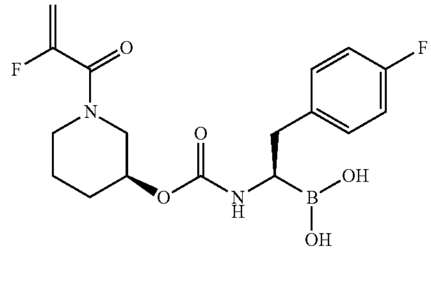

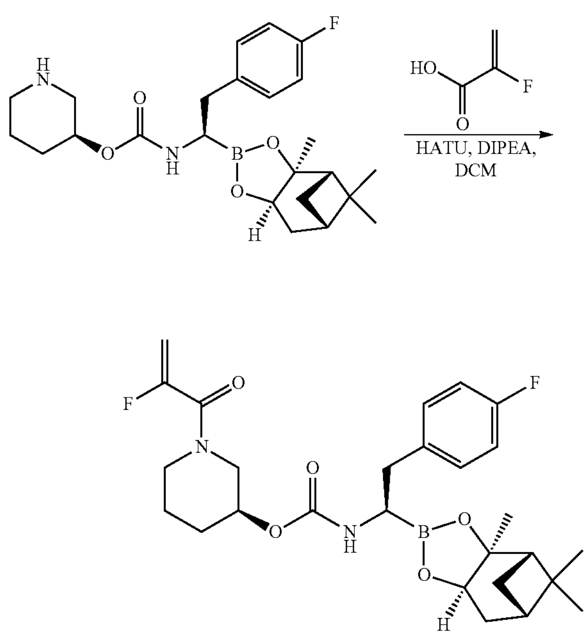

In a 25-mL round-bottom flask, was placed (3S)-piperidin-3-yl N-[(1R)-2-(4-fluorophenyl)-1-[(1S,2S,6R,8S)-2,9,9-trimethyl-3,5-dioxa-4-boratricyclo[6.1.1.0^[2,6]]decan-4-yl]ethyl]carbamate (155 mg, 0.35 mmol, 1 eq.), DCM (5 mL), DIPEA (145.2 mg, 1.12 mmol, 3.22 eq.), 2-fluoroprop-2-enoic acid (32 mg, 0.36 mmol, 1 eq.), and HATU (202.9 mg, 0.53 mmol, 1.5 eq.). The resulting solution was stirred for 1 h at rt. The resulting mixture was washed with water (10 mL) and brine (10 mL). The mixture was dried over anhydrous sodium sulfate and concentrated under vacuum. The crude product was purified by flash-prep-HPLC with the following conditions: Column, C18 silica gel; mobile phase, ACN:$H_2O$ (5:100) increasing to ACN:$H_2O$ (99:1) within 60 min; Detector, 220 nm. This resulted in 157 mg (87%) of (3S)-1-(2-fluoroprop-2-enoyl)piperidin-3-yl N-[(1R)-2-(4-fluorophenyl)-1-[(1S,2S,6R,8S)-2,9,9-trimethyl-3,5-dioxa-4-boratricyclo[6.1.1.0^[2,6]]decan-4-yl]ethyl]carbamate as a yellow oil.

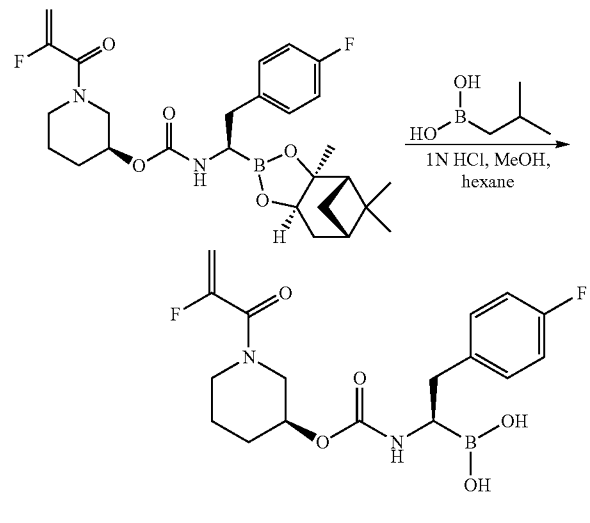

In a 100-mL round-bottom flask, was introduced (3S)-1-(2-fluoroprop-2-enoyl)piperidin-3-yl N-[(1R)-2-(4-fluorophenyl)-1-[(1S,2S,6R,8S)-2,9,9-trimethyl-3,5-dioxa-4-boratricyclo[6.1.1.0^[2,6]]decan-4-yl]ethyl]carbamate (189.0 mg, 0.37 mmol, 1.00 eq.), followed by MeOH (6 mL), (2-methylpropyl)boronic acid (112 mg, 1.10 mmol, 3 eq.), hexane (6 mL), and 1N HCl (7.5 mL). The resulting solution was stirred for 1 h at rt. The methanol layer was diluted with water (25 mL), and dried over lyophylization to give a crude product. The crude product was purified by prep-HPLC with the following conditions: Column, XBridge Prep OBD C18 Column, 30*150 mm 5 um; mobile phase, Water (10 mmol/L $NH_4HCO_3$+0.1% $NH_3.H_2O$) and ACN (15% PhaseB up to 45% in 8 min); Detector, UV 254/220 nm. This resulted in 52 mg (37%) of ((R)-1-(((((S)-1-(2-fluoroacryloyl)piperidin-3-yl)oxy)carbonyl)amino)-2-(4-fluorophenyl)ethyl)boronic acid as a white solid. LC-MS m/z: 365 [M-17].

Example 75

(R)-(1-((((7-(2-fluoroacryloyl)-7-azabicyclo[2.2.1]heptan-1-yl)methoxy)carbonyl)amino)-2-(4-fluorophenyl)ethyl)boronic Acid

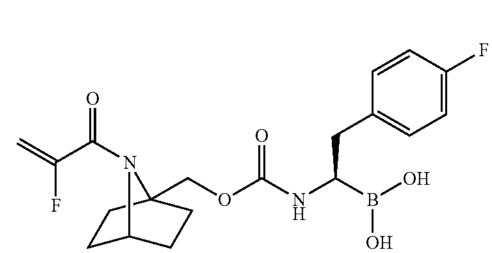

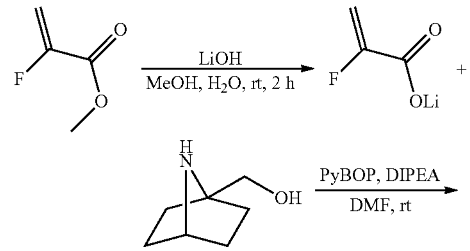

-continued

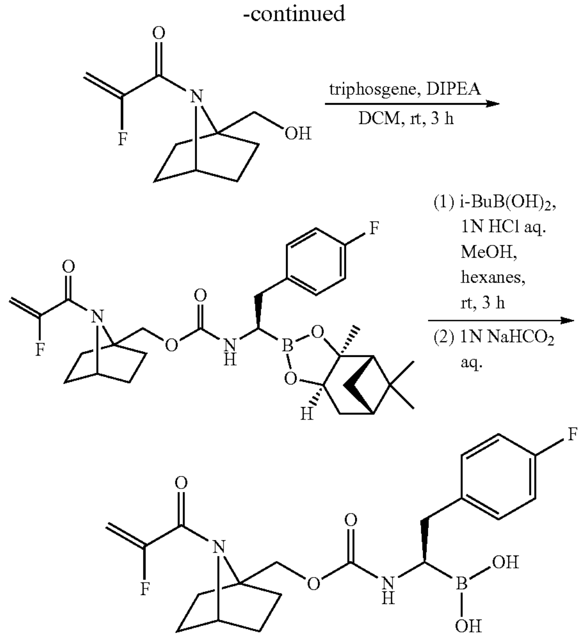

To a stirred solution of methyl 2-fluoroacrylate (1 g, 9.61 mmol) in MeOH:$H_2O$=10:1 (10 mL), LiOH (460.16 mg, 19.22 mmol) was added at rt. The reaction mixture was stirred for 2 h. After completion of the reaction, the mixture was concentrated under reduced pressure to get crude product lithium 2-fluoroacrylate (1.05 g). The crude product was directly used to next step without purification.

To a mixture of crude lithium 2-fluoroacrylate (215 mg), (7-azabicyclo[2.2.1]heptan-1-yl)methanol (200 mg, 1.57 mmol) and DIPEA (867 mg, 6.72 mmol) in $CH_3CN$ (10 mL) were added, followed by PyBOP (1.17 g, 2.24 mmol) at rt. The mixture was stirred at rt for 1 h. The mixture was concentrated and the crude was purified by column chromatography on silica gel, eluting with 10%-50% of ethyl acetate in petroleum ether to afford 2-fluoro-1-((1s,4s)-1-(hydroxymethyl)-7-azabicyclo[2.2.1]heptan-7-yl)prop-2-en-1-one (114 mg, 26%) as a colorless oil.

Bis(trichloromethyl) carbonate (170 mg, 0.572 mmol) in DCM (2 mL) was added dropwise into a stirring solution of 2-fluoro-1-((1s,4s)-1-(hydroxymethyl)-7-azabicyclo[2.2.1]heptan-7-yl)prop-2-en-1-one (114 mg, 0.572 mmol) and DIPEA (222 mg, 1.72 mmol) in DCM (2 mL) at 0° C. The mixture was stirred for 1 h at 0° C. This resulting solution was added dropwise into a well-stirred solution of (R)-2-(benzofuran-3-yl)-1-((3aS,4S,6S,7aR)-3a,5,5-trimethylhexahydro-4,6-methanobenzo[d][1,3,2]dioxaborol-2-yl)ethan-1-amine hydrochloride (202 mg, 0.572 mmol) and DIPEA (222 mg, 1.72 mmol) in DCM (2 mL) at 0° C. The reaction was stirred at 0° C. for 1 h, then diluted with DCM (25 mL), washed with water (5 mL) and brine (5 mL), dried over $Na_2SO_4$, and concentrated in vacuo. The residue was purified by prep-HPLC to afford ((1 s,4S)-7-(2-fluoroacryloyl)-7-azabicyclo[2.2.1]heptan-1-yl)methyl ((R)-2-(4-fluorophenyl)-1-((3aS,4S,6S,7aR)-3a,5,5-trimethylhexahydro-4,6-methanobenzo[d][1,3,2]dioxaborol-2-yl)ethyl)carbamate as a white solid (180 mg, 58%).

To a solution of ((1s,4S)-7-(2-fluoroacryloyl)-7-azabicyclo[2.2.1]heptan-1-yl)methyl ((R)-2-(4-fluorophenyl)-1-((3aS,4S,6S,7aR)-3a,5,5-trimethylhexahydro-4,6-methanobenzo[d][1,3,2]dioxaborol-2-yl)ethyl)carbamate (180 mg, 0.33 mmol) in MeOH (2 mL) were added hexanes (2 mL) and 1 N HCl (1 mL), followed by isobutylboronic acid (101.48 mg, 0.995 mmol). After stirred at rt for 3 h, the hexanes layer was discarded. The methanol layer was diluted with water (20 mL) and 1N $NaHCO_3$ aq. (1 mL), then dried over lyophilization to give a crude product which was purified by prep-HPLC (C8 column) to afford (R)-(1-(((((7-(2-fluoroacryloyl)-7-azabicyclo[2.2.1]heptan-1-yl)methoxy)carbonyl)amino)-2-(4-fluorophenyl)ethyl)boronic acid as a white solid (49 mg, 36%).

Example 76

(R)-(1-(((((7-acryloyl-7-azabicyclo[2.2.1]heptan-1-yl)methoxy)carbonyl)amino)-2-(4-fluorophenyl)ethyl)boronic Acid

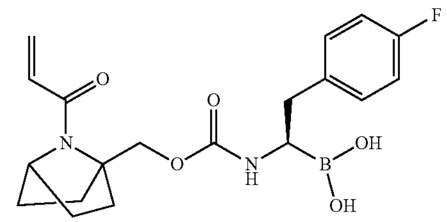

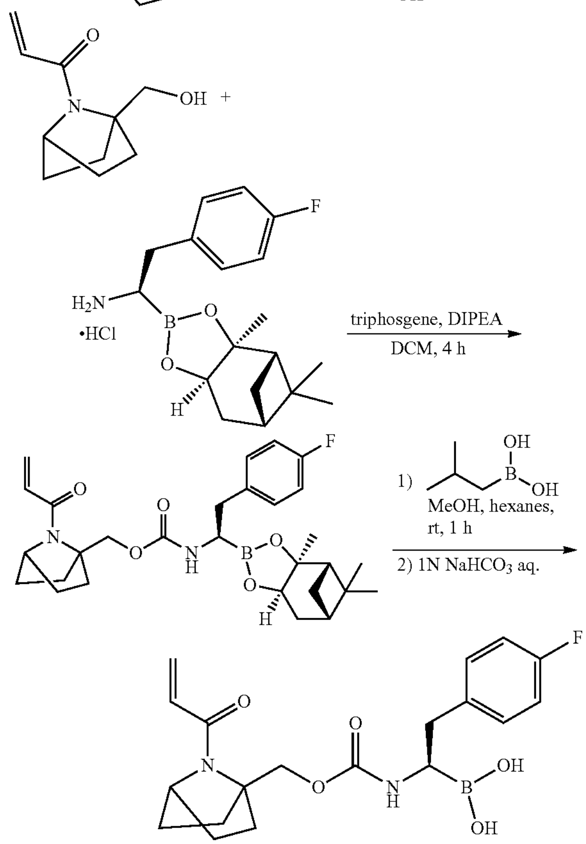

Bis(trichloromethyl) carbonate (206 mg, 0.69 mmol) in DCM (1 mL) was added dropwise into a stirring solution of 1-(1-(hydroxymethyl)-7-azabicyclo[2.2.1]heptan-7-yl)prop-2-en-1-one (140 mg, 0.77 mmol) and DIPEA (599 mg, 4.63 mmol) in DCM (3 mL) at 0° C. The mixture was stirred for 2 h at 0° C. This resulting solution was added dropwise into a well-stirred solution of (R)-2-(4-fluorophenyl)-1-((3aS,4S,6S,7aR)-3a,5,5-trimethylhexahydro-4,6-methanobenzo[d]

[1,3,2]dioxaborol-2-yl)ethan-1-amine (409 mg, 1.16 mmol) and DIPEA (449 mg, 3.48 mmol) in DCM (4 mL) at 0° C. The reaction was stirred at 0° C. for 2 h, then diluted with DCM (25 mL), washed with water (5 mL) and brine (5 mL), dried over $Na_2SO_4$, and then concentrated in vacuo. The residue was purified by prep-HPLC to afford (7-acryloyl-7-azabicyclo[2.2.1]heptan-1-yl)methyl ((R)-2-(4-fluorophenyl)-1-((3aS,4S,6S,7aR)-3a,5,5-trimethylhexahydro-4,6-methanobenzo[d][1,3,2]dioxaborol-2-yl)ethyl)carbamate as a white solid (150 mg, 36%).

To a solution of (7-acryloyl-7-azabicyclo[2.2.1]heptan-1-yl)methyl ((R)-2-(4-fluorophenyl)-1-((3aS,4S,6S,7aR)-3a,5,5-trimethylhexahydro-4,6-methanobenzo[d][1,3,2]dioxaborol-2-yl)ethyl)carbamate (150 mg, 0.28 mmol) in MeOH (4 mL) were added hexanes (4 mL) and 1 N HCl (2 mL), followed by isobutyl boric acid (44 mg, 0.4 mmol). After stirred at rt for 1 h, the hexanes layer was discarded. The methanol layer was diluted with water (20 mL) and 1N $NaHCO_3$ aqueous solution (2 mL), and then dried over lyophilization to give a crude product which was purified by prep-HPLC to afford (R)-(1-((((7-acryloyl-7-azabicyclo[2.2.1]heptan-1-yl)methoxy)carbonyl)amino)-2-(4-fluorophenyl)ethyl)boronic acid as a white solid (62 mg, 55%).

Example 77

(R)-(1-((((7-(2-cyano-4-(3,3-difluoropyrrolidin-1-yl)-4-methylpent-2-enoyl)-7-azabicyclo[2.2.1]heptan-1-yl)methoxy)carbonyl)amino)-3-phenylpropyl)boronic Acid

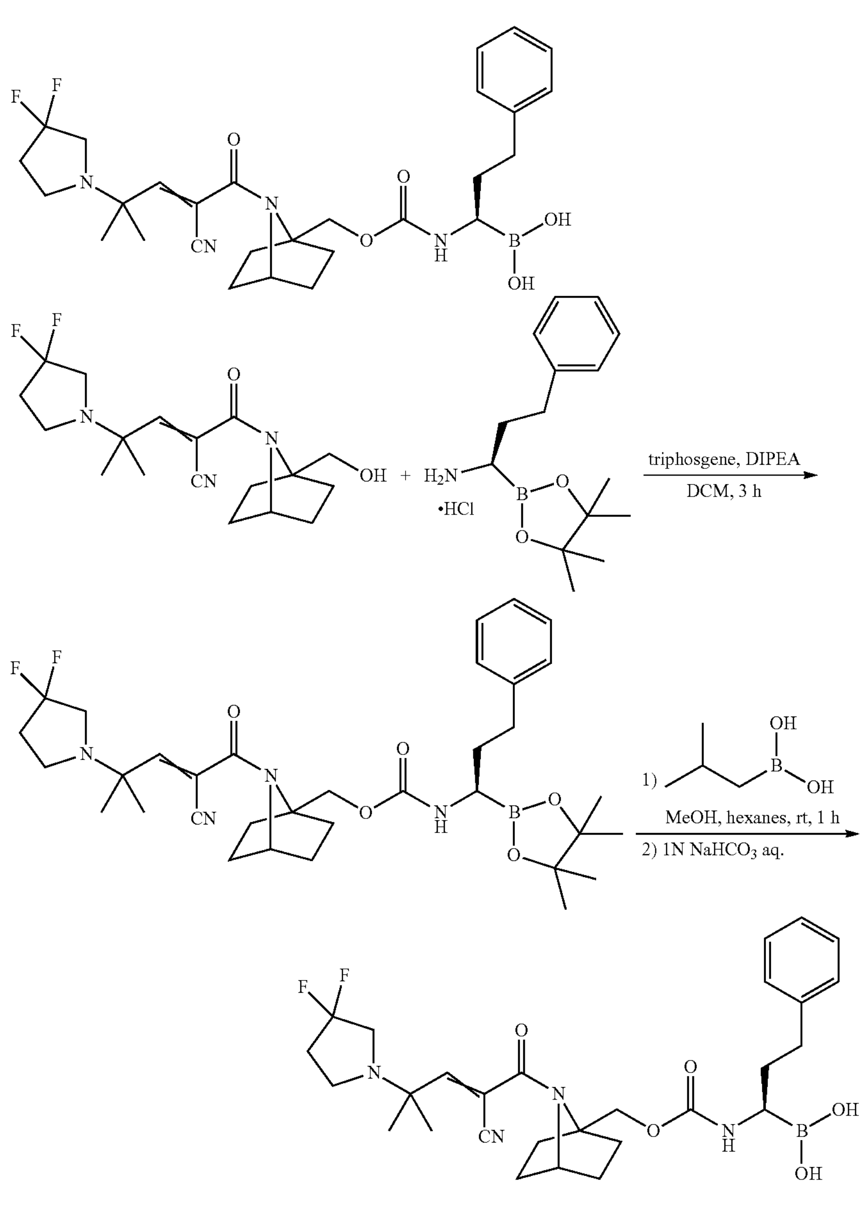

Bis(trichloromethyl) carbonate (106 mg, 0.36 mmol) in DCM (1 mL) was added dropwise into a stirring solution of 4-(3,3-difluoropyrrolidin-1-yl)-2-((1s,4s)-1-(hydroxymethyl)-7-azabicyclo[2.2.1]heptane-7-carbonyl)-4-methylpent-2-enenitrile (140 mg, 0.39 mmol) and DIPEA (307 mg, 2.38 mmol) in DCM (3 mL) at 0° C. The mixture was stirred for 2 h at 0° C. This resulting solution was added dropwise into a well-stirred solution of (R)-3-phenyl-1-(4,4,5,5-tetramethyl-1,3,2-dioxaborolan-2-yl)propan-1-amine hydrochloride (177 mg, 0.59 mmol) and DIPEA (230 mg, 1.78 mmol) in DCM (4 mL) at 0° C. The reaction was stirred at 0° C. for 1 h, then diluted with DCM (25 mL), washed with water (5 mL) and brine (5 mL), dried over $Na_2SO_4$, and finally concentrated in vacuo. The residue was purified by prep-HPLC to afford ((1 s,4S)-7-(2-cyano-4-(3,3-difluoropyrrolidin-1-yl)-4-methylpent-2-enoyl)-7-azabicyclo[2.2.1]heptan-1-yl)methyl ((R)-3-phenyl-1-(4,4,5,5-tetramethyl-1,3,2-dioxaborolan-2-yl)propyl)carbamate as a white solid (100 mg, 39%).

To a solution of ((1s,4S)-7-(2-cyano-4-(3,3-difluoropyrrolidin-1-yl)-4-methylpent-2-enoyl)-7-azabicyclo[2.2.1]heptan-1-yl)methyl ((R)-3-phenyl-1-(4,4,5,5-tetramethyl-1,3,2-dioxaborolan-2-yl)propyl)carbamate (100 mg, 0.16 mmol) in MeOH (4 mL) were added hexanes (4 mL) and 1 N HCl (2 mL), followed by isobutyl boric acid (64 mg, 0.62 mmol). After it was stirred at rt for 1 h, the hexanes layer was discarded. The methanol layer was diluted with water (20 mL), followed by 1N $NaHCO_3$ aqueous solution (2 mL), and then dried over lyophilization to give a crude product which was purified by prep-HPLC to afford (R)-(1-((((7-(2-cyano-4-(3,3-difluoropyrrolidin-1-yl)-4-methylpent-2-enoyl)-7-azabicyclo[2.2.1]heptan-1-yl)methoxy)carbonyl)amino)-3-phenylpropyl)boronic acid as a white solid (64 mg, 73%).

Example 78

((R)-1-(((((S)-1-(2-cyano-4-(3,3-difluoropyrrolidin-1-yl)-4-methylpent-2-enoyl)piperidin-3-yl)oxy)carbonyl)amino)-2-(4-fluorophenyl)ethyl)boronic Acid

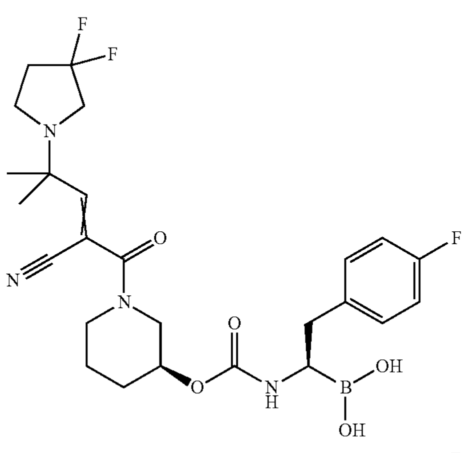

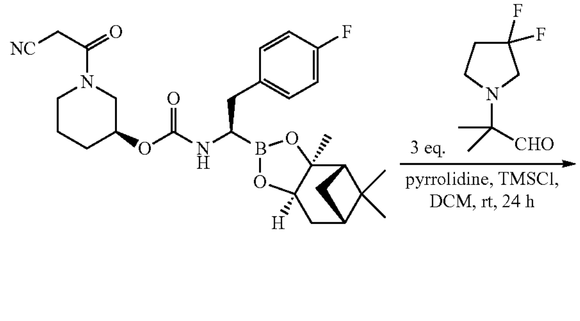

-continued

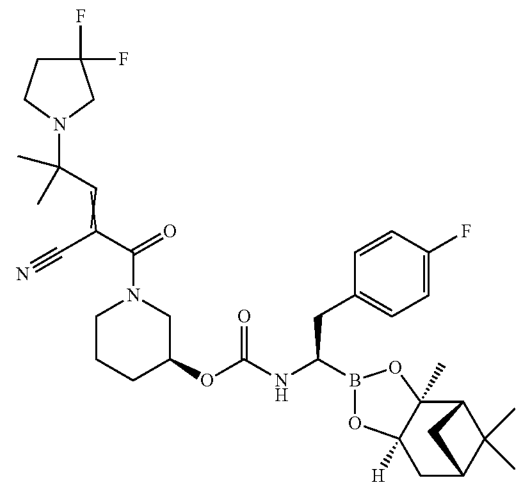

In a 25-mL round-bottom flask, (3S)-1-(2-cyanoacetyl)piperidin-3-yl N-[(1R)-2-(4-fluorophenyl)-1-[(1S,2S,6R,8S)-2,9,9-trimethyl-3,5-dioxa-4-boratricyclo[6.1.1.0^[2,6]]decan-4-yl]ethyl]carbamate (200 mg, 0.39 mmol, 1 eq.) was placed, followed by DCM (5 mL), 2-(3,3-difluoropyrrolidin-1-yl)-2-methylpropanal (210 mg, 1.2 mmol, 3 eq.), pyrrolidine (140 mg, 1.97 mmol, 5 eq.), and chlorotrimethylsilane (210 mg, 1.93 mmol, 5 eq.). The resulting solution was stirred for 1 h at rt. The resulting mixture was washed with water (10 mL) and brine (10 mL). The mixture was dried over anhydrous sodium sulfate and concentrated under vacuum. The crude product was purified by flash-prep-HPLC with the following conditions: Column, C18 silica gel; mobile phase, ACN:$H_2O$ (5:95) increasing to ACN:$H_2O$ (100:0) within 60 min; Detector, 220 nm. This resulted in 170 mg (65%) of (S)-1-(2-cyano-4-(3,3-difluoropyrrolidin-1-yl)-4-methylpent-2-enoyl)piperidin-3-yl ((R)-2-(4-fluorophenyl)-1-((3aS,4S,6S,7aR)-3a,5,5-trimethylhexahydro-4,6-methanobenzo[d][1,3,2]dioxaborol-2-yl)ethyl)carbamate as a yellow oil.

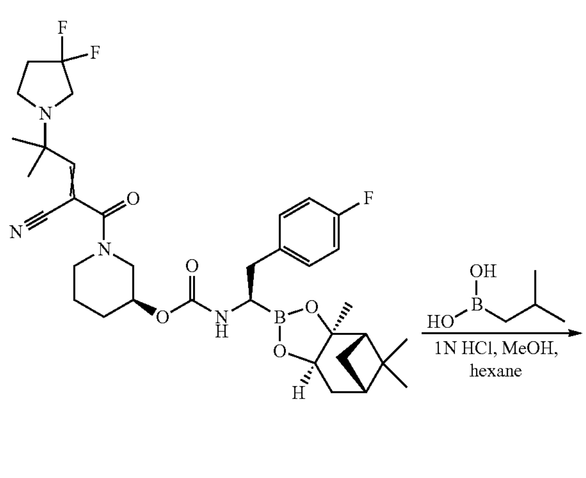

-continued

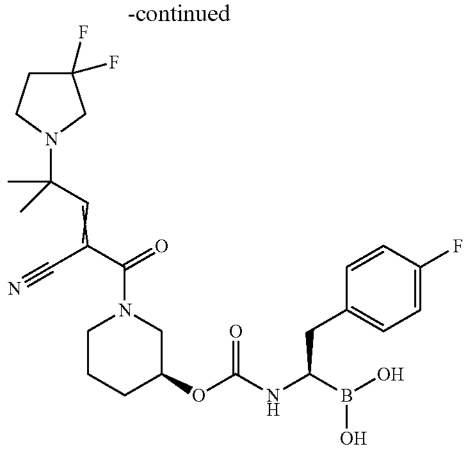

In a 250-mL round-bottom flask was introduced (S)-1-(2-cyano-4-(3,3-difluoropyrrolidin-1-yl)-4-methylpent-2-enoyl)piperidin-3-yl ((R)-2-(4-fluorophenyl)-1-((3aS,4S,6S,7aR)-3a,5,5-trimethylhexahydro-4,6-methanobenzo[d][1,3,2]dioxaborol-2-yl)ethyl)carbamate (1327 mg, 1.98 mmol, 1 eq.), MeOH (30 mL), (2-methylpropyl)boronic acid (605 mg, 5.94 mmol, 3 eq.), hexane (30 mL), and 1N HCl (40 mL). The resulting solution was stirred for 1 h at rt. The methanol layer was diluted with water (20 mL), and dried over lyophylization to give a crude product. The crude product was purified by prep-HPLC with the following conditions: Column, XBridge Shield RP18 OBD Column, 5 um, 19×150 mm; mobile phase, Water (0.1% FA) and ACN (34% PhaseB up to 40% in 13 min; Detector, UV 220/254 nm. This resulted in 396 mg (37%) of ((R)-1-(((((S)-1-(2-cyano-4-(3,3-difluoropyrrolidin-1-yl)-4-methylpent-2-enoyl)piperidin-3-yl)oxy)carbonyl)amino)-2-(4-fluorophenyl)ethyl)boronic acid as a white solid. LC-MS m/z: 519 [M-17].

Example 79

((R)-1-(((((S)-1-(2-cyano-4-methyl-4-(4-(oxetan-3-yl)piperazin-1-yl)pent-2-enoyl)piperidin-3-yl)oxy)carbonyl)amino)-2-phenylethyl)boronic Acid

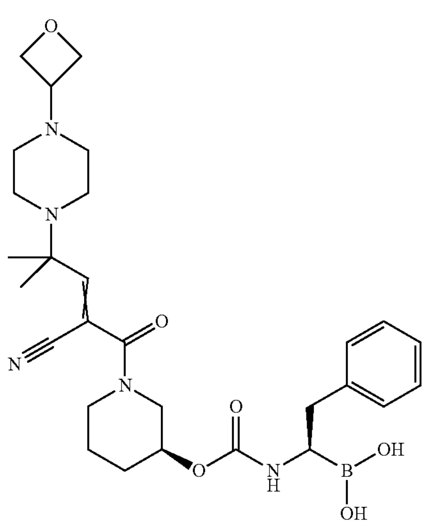

-continued

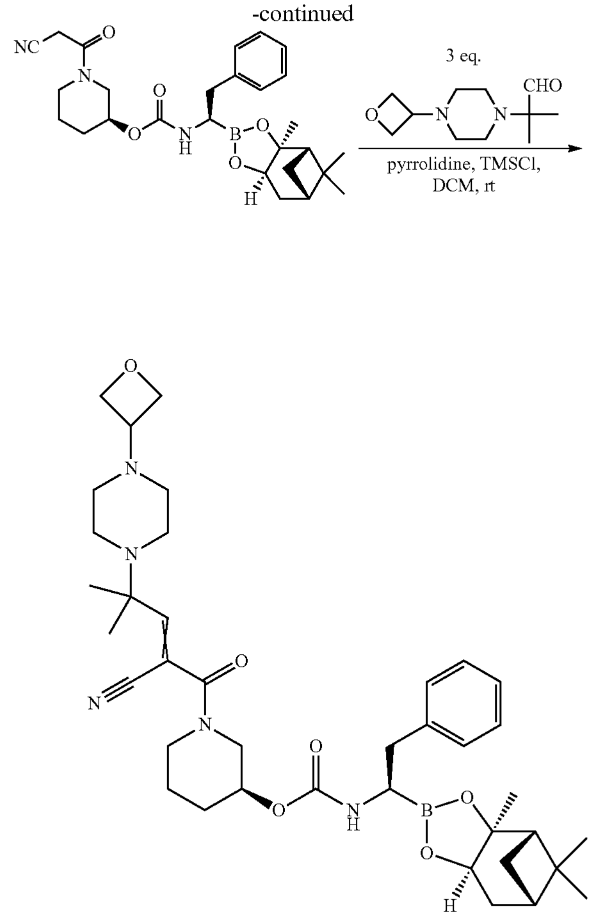

Into a 50-mL round-bottom flask, was placed a solution of (3S)-1-(2-cyanoacetyl)piperidin-3-yl N-[(1R)-2-phenyl-1-[(1S,2S,6R,8S)-2,9,9-trimethyl-3,5-dioxa-4-boratricyclo[6.1.1.0^[2,6]]decan-4-yl]ethyl]carbamate (300 mg, 0.61 mmol, 1 eq.) in DCM (2 mL), 2-methyl-2-[4-(oxetan-3-yl)piperazin-1-yl]propanal (387 mg, 1.82 mmol, 3 eq.), pyrrolidine (216 mg, 3.04 mmol, 5 eq.), and TMSCl (330 mg, 3.04 mmol, 5 eq.). The resulting solution was stirred for 2 h at rt. The resulting solution was diluted with DCM (10 mL). The resulting mixture was washed with brine (5 mL). The mixture was dried over anhydrous sodium sulfate and concentrated under vacuum. The residue was applied onto a silica gel column with ethyl acetate:petroleum ether (99:1). This resulted in 310 mg (74%) of (3S)-1-(2-cyano-2-[2-methyl-2-[4-(oxetan-3-yl)piperazin-1-yl]propylidene]acetyl)piperidin-3-yl N-[(1R)-2-phenyl-1-[(1S,2S,6R,8S)-2,9,9-trimethyl-3,5-dioxa-4-boratricyclo[6.1.1.0^[2,6]]decan-4-yl]ethyl]carbamate as a colorless oil.

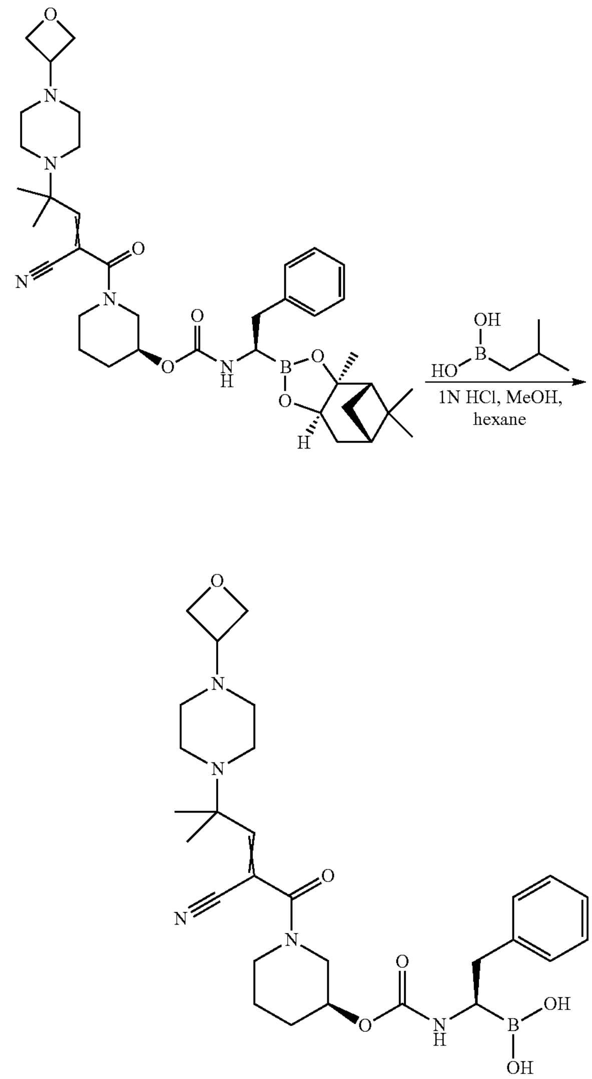

Into a 100-mL round-bottom flask, was introduced (3S)-1-(2-cyano-2-[2-methyl-2-[4-(oxetan-3-yl)piperazin-1-yl] propylidene]acetyl)piperidin-3-yl N-[(1R)-2-phenyl-1-[(1S,2S,6R,8S)-2,9,9-trimethyl-3,5-dioxa-4-boratricyclo[6.1.1.0^[2,6]]decan-4-yl]ethyl]carbamate (90 mg, 1 eq.), followed by MeOH (3 mL), hexane (3 mL), 1N HCl (3 mL, 20 eq.), and (2-methylpropyl)boronic acid (67 mg, 3 eq.). The resulting solution was stirred for 1 h at rt. The hexane layer was discarded. The methanol was diluted with water (10 mL) and dried over lyophilization. The crude product was purified by prep-HPLC with the following conditions: Column, XSelect CSH Prep C18 OBD Column, 5 um, 19×150 mm; mobile phase, Water (10 mmol/$NH_4HCO_3$+0.1% $NH_3.H_2O$) and ACN (5% ACN up to 95% in 8 min); Detector, UV 254 nm. This resulted in 16.3 mg of ((R)-1-(((((S)-1-(2-cyano-4-methyl-4-(4-(oxetan-3-yl)piperazin-1-yl)pent-2-enoyl)piperidin-3-yl)oxy)carbonyl)amino)-2-phenylethyl)boronic acid as a white solid. LC-MS m/z: 554 [M+1].

Example 80

((R)-1-(((((S)-1-(2-cyano-4-methyl-4-(4-methylpiperazin-1-yl)pent-2-enoyl)piperidin-3-yl)oxy)carbonyl)amino)-2-phenylethyl)boronic Acid

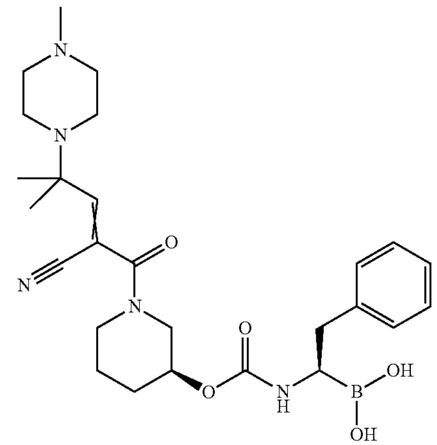

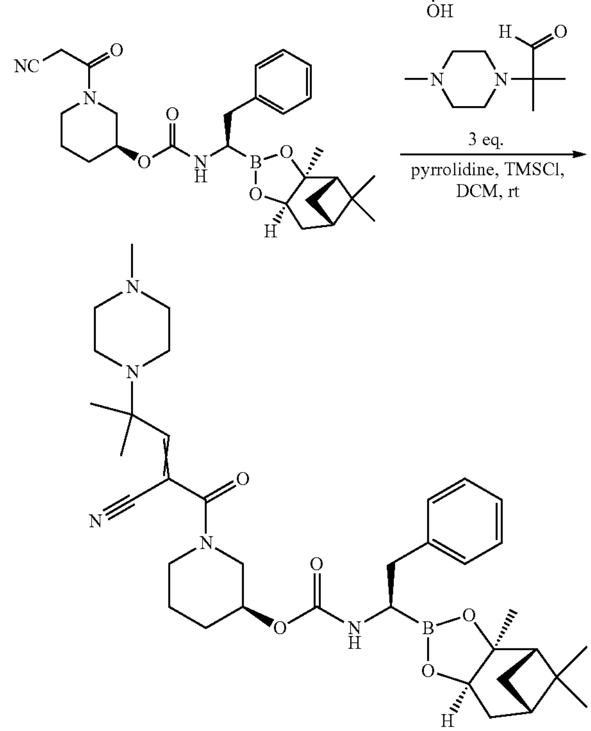

Into a 50-mL round-bottom flask, was introduced a solution of (3S)-1-(2-cyanoacetyl)piperidin-3-yl N-[(1R)-2-phenyl-1-[(1S,2S,6R,8S)-2,9,9-trimethyl-3,5-dioxa-4-boratricyclo[6.1.1.0^[2,6]]decan-4-yl]ethyl]carbamate (300 mg, 0.61 mmol, 1 eq.) in dichloromethane (2 mL), followed by 2-methyl-2-(4-methylpiperazin-1-yl)propanal (310 mg, 1.82 mmol, 3 eq.), pyrrolidine (216 mg, 1.27 mmol, 3 eq.), and TMSCl (330 mg, 3.04 mmol, 5 eq.). The resulting solution was stirred for 2 h at rt. The resulting solution was diluted with DCM (10 mL). The resulting mixture was washed with brine (5 mL). The mixture was dried over anhydrous sodium sulfate and concentrated under vacuum. The residue was purified on a silica gel column with dichloromethane:methanol (10:1). This resulted in 270 mg (69%) of (3S)-1-[2- cyano-2-[2-methyl-2-(4-methylpiperazin-1-yl)propylidene]acetyl]piperidin-3-ylN-[(1R)-2-phenyl-1-[(1S,2S,6R,8S)-2,9,9-trimethyl-3,5-dioxa-4-boratricyclo[6.1.1.0^[2,6]]decan-4-yl]ethyl]carbamate as a yellow oil.

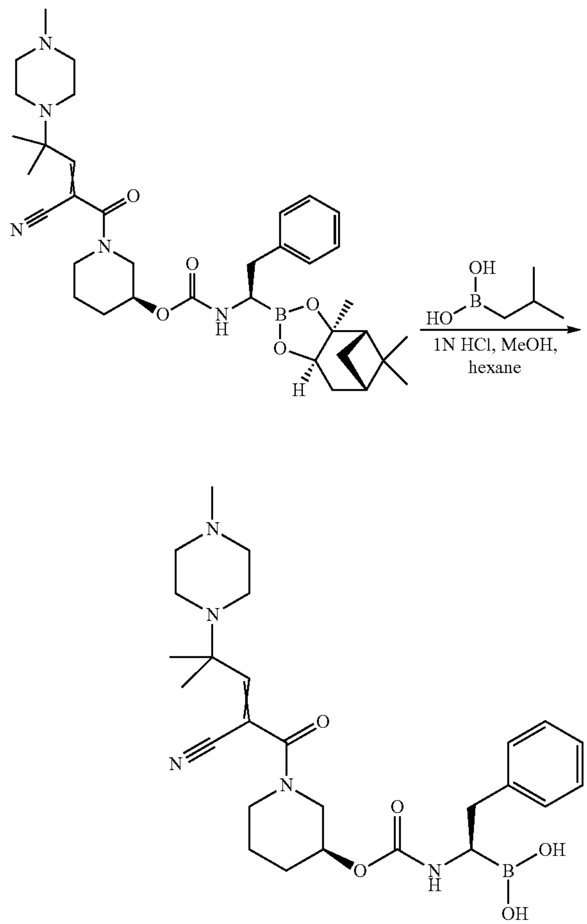

Into a 100-mL round-bottom flask, was placed (3S)-1-[2-cyano-2-[2-methyl-2-(4-methylpiperazin-1-yl)propylidene]acetyl]piperidin-3-yl N-[(1R)-2-phenyl-1-[(1S,2S,6R,8S)-2,9,9-trimethyl-3,5-dioxa-4-boratricyclo[6.1.1.0^[2,6]]decan-4-yl]ethyl]carbamate (100 mg, 0.15 mmol, 1 eq.), followed by MeOH (3 mL), hexane (3 mL), 1N HCl (3 mL), and (2-methylpropyl)boronic acid (47.4 mg, 0.46 mmol, 3.00 eq.). The resulting solution was stirred for 1 h at rt The hexane layer was discarded. The methanol layer was diluted with water (20 mL) and then dried over lyophilization. The crude product was purified by prep-HPLC with the following conditions: Column, XBridge Prep OBD C18 Column, 30*150 mm 5 um; mobile phase, water (10 mmol/L $NH_4HCO_3$+0.1% $NH_3.H_2O$) and ACN (15% CH3CN up to 35% in 8 min); Detector, 220 nm. This resulted in 32 mg (38%) of ((R)-1-(((((S)-1-(2-cyano-4-methyl-4-(4-methylpiperazin-1-yl)pent-2-enoyl)piperidin-3-yl)oxy)carbonyl)amino)-2-phenylethyl)boronic acid as a white solid. LC-MS m/z: 512 [M+1].

Example 81

(R)-(1-((((7-(2-cyano-4-methyl-4-morpholinopent-2-enoyl)-7-azabicyclo[2.2.1]heptan-1-yl)methoxy)carbonyl)amino)-2-phenylethyl)boronic Acid

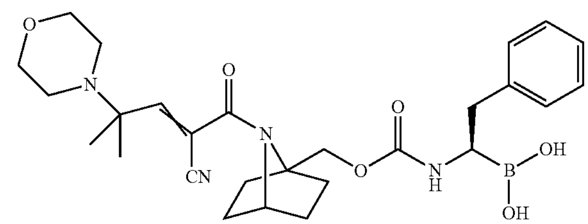

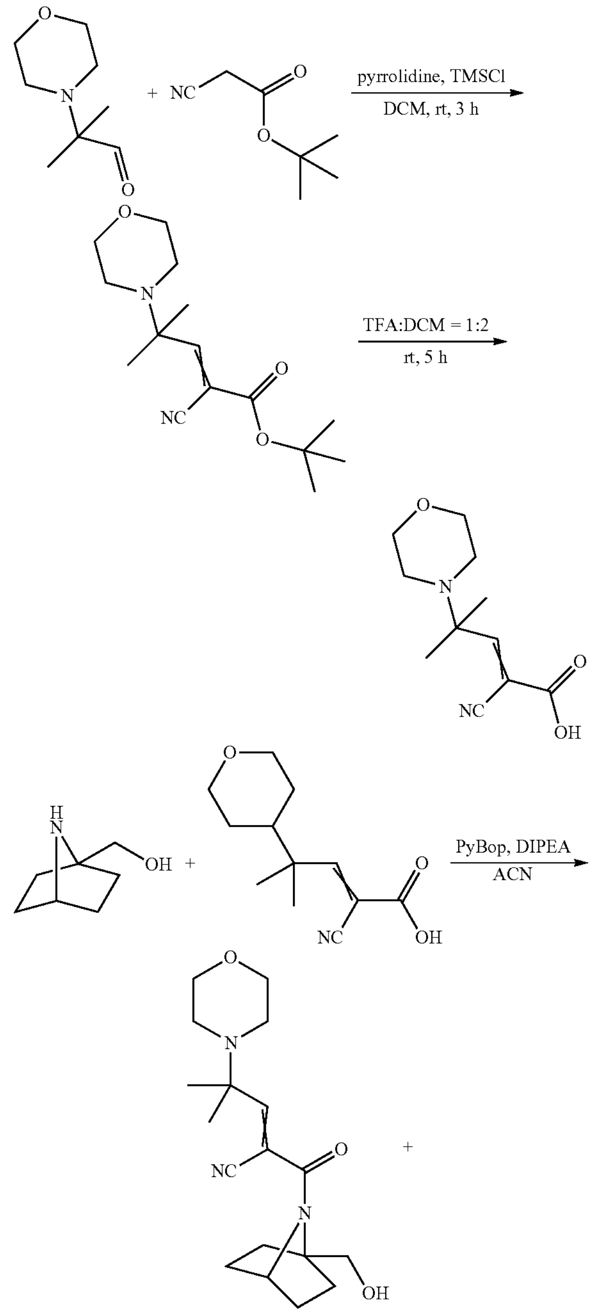

-continued

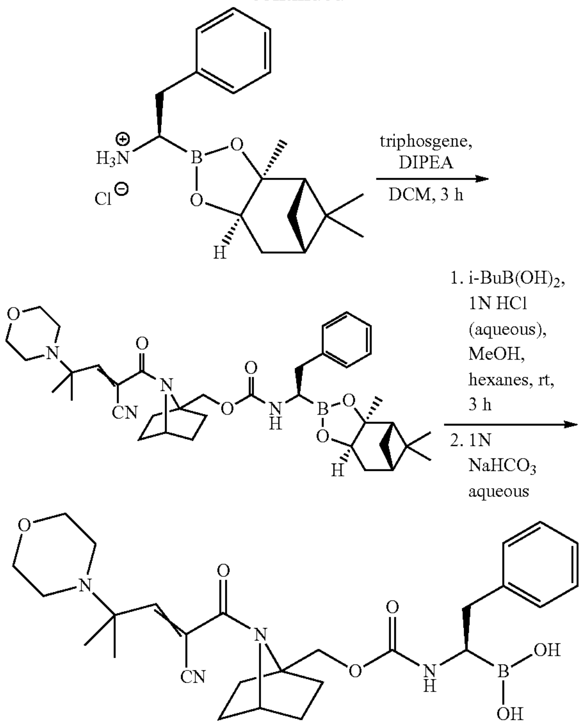

To a solution of 2-methyl-2-morpholinopropanal (1.5 g, 9.5 mmol), tert-butyl 2-cyanoacetate (1.35 mg, 9.5 mmol) and pyrrolidine (2.7 g, 38 mmol) in DCM (40 mL) in an ice-water bath, was added dropwise chloro(trimethyl)silane (2 g, 19 mmol). The reaction was stirred at 0° C. for 30 min, and then washed with brine (5 mL). The DCM layer was dried over $Na_2SO_4$ and concentrated to dryness. The crude residue was purified via silica chromatography and a gradient of 0-100% EtOAc in hexanes to afford tert-butyl 2-cyano-4-methyl-4-morpholinopent-2-enoate as a yellow oil (2 g, 75%).

In a round-bottom flask, tert-butyl 2-cyano-4-methyl-4-morpholinopent-2-enoate (2 g, 7.1 mmol) was dissolved in DCM (30 mL), followed by TFA (15 mL). The mixture was stirred at rt for 5 h, and then concentrated to afford 2-cyano-4-methyl-4-morpholinopent-2-enoic acid compound as a yellow oil TFA salt (700 mg, 32%).

To a mixture of 2-cyano-4-methyl-4-(tetrahydro-2H-pyran-4-yl)pent-2-enoic acid (577 mg, crude), ((1s,4s)-7-azabicyclo[2.2.1]heptan-1-yl)methanol (229 mg, 1.8 mmol) and DIPEA (696 mg, 5.3 mmol) in ACN (12 mL), was added PyBOP (1.11 g, 2.14 mmol). The mixture was stirred at rt for 1 h. The mixture was concentrated, and the crude was purified by column chromatography on silica gel, eluting with 10% to 50% of ethyl acetate in petroleum ether to afford 2-((1s,4s)-1-(hydroxymethyl)-7-azabicyclo[2.2.1]heptane-7-carbonyl)-4-methyl-4-morpholinopent-2-enenitrile (300 mg, 50%) as a colorless oil.

(Bis(trichloromethyl) carbonate (89 mg, 300 mmol) in DCM (2 mL) was added dropwise into a stirring solution of 2-((1s,4s)-1-(hydroxymethyl)-7-azabicyclo[2.2.1]heptane-7-carbonyl)-4-methyl-4-morpholinopent-2-enenitrile (100 mg, 0.3 mmol) and DIPEA (116.29 mg, 0.9 mmol) in DCM (2 mL) at 0° C. The mixture was stirred for 1 h at 0° C. This resulted solution was added dropwise into a well-stirred solution of (R)-2-phenyl-1-((3aS,4S,6S,7aR)-3a,5,5-trimethylhexahydro-4,6-methanobenzo[d][1,3,2]dioxaborol-2-yl)ethan-1-amine hydrochloride (100.67 mg, 0.3 mmol) and DIPEA 116.3 mg, 0.9 mmol) in DCM (2 mL) at 0° C. The reaction was stirred at 0° C. for 1 h, then diluted with DCM (25 mL), washed with water (5 mL) and brine (5 mL), dried over $Na_2SO_4$, and concentrated in vacuo. The residue was purified by prep-HPLC to afford ((1s,4S)-7-(2-cyano-4-methyl-4-morpholinopent-2-enoyl)-7-azabicyclo[2.2.1]heptan-1-yl)methyl ((R)-2-phenyl-1-((3aS,4S,6S,7aR)-3a,5,5-trimethylhexahydro-4,6-methanobenzo[d][1,3,2]dioxaborol-2-yl)ethyl)carbamate as a white solid (84 mg, 43%).

To a solution of ((1s,4S)-7-(2-cyano-4-methyl-4-morpholinopent-2-enoyl)-7-azabicyclo[2.2.1]heptan-1-yl)methyl ((R)-2-phenyl-1-((3aS,4S,6S,7aR)-3a,5,5-trimethylhexahydro-4,6-methanobenzo[d][1,3,2]dioxaborol-2-yl)ethyl)carbamate (84 mg, 0.13 mmol) in MeOH (2 mL) were added hexanes (2 mL) and 1 N HCl (1 mL), followed by isobutylboronic acid (52 mg, 0.51 mmol). After the mixture was stirred at rt for 3 h, and the hexanes layer was discarded. The methanol layer was diluted with water (20 mL) and 1N $NaHCO_3$ aqueous solution (1 mL), and then dried over lyophilization to give a crude product which was purified by prep-HPLC (C8 column) to afford (R)-(1-((((7-(2-cyano-4-methyl-4-morpholinopent-2-enoyl)-7-azabicyclo[2.2.1]heptan-1-yl)methoxy)carbonyl)amino)-2-phenylethyl)boronic acid as a white solid (13 mg, 19%).

Example 82

(R)-(1-((((7-(2-cyano-4-methyl-4-morpholinopent-2-enoyl)-7-azabicyclo[2.2.1]heptan-1-yl)methoxy)carbonyl)amino)-2-(4-fluorophenyl)ethyl)boronic Acid

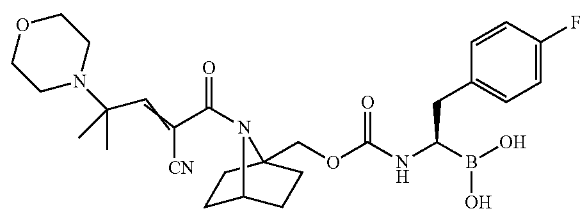

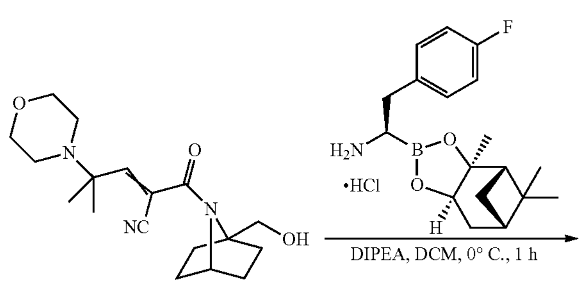

-continued

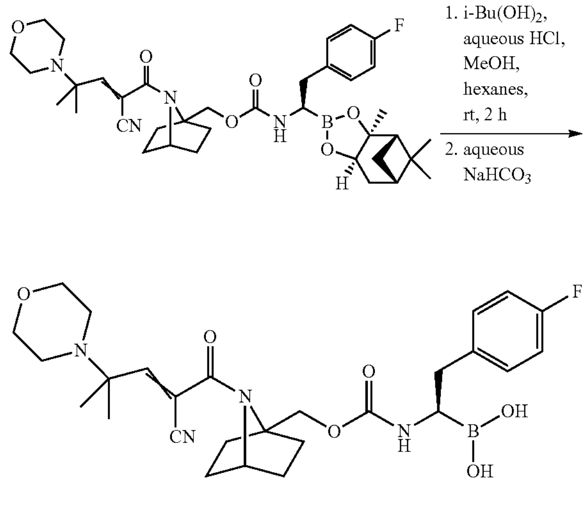

Bis(trichloromethyl) carbonate (168 mg, 0.57 mmol) in DCM (1.5 mL) was added dropwise into a stirring solution of 2-((1s,4s)-1-(hydroxymethyl)-7-azabicyclo[2.2.1]heptane-7-carbonyl)-4-methyl-4-morpholinopent-2-enenitrile (95 mg, 0.28 mmol) and DIPEA (216 mg, 1.68 mmol) in DCM (10 mL) at 0° C. The mixture was stirred for 2 h at 0° C. The resulting solution was added dropwise into a well-stirred solution of (R)-2-(4-fluorophenyl)-1-((3aS,4S,6S,7aR)-3a,5,5-trimethylhexahydro-4,6-methanobenzo[d][1,3,2]dioxaborol-2-yl)ethan-1-amine hydrochloride (197 mg, 0.56 mmol) and DIPEA (108 mg, 0.84 mmol) in DCM (10 mL) at 0° C. The reaction was stirred at 0° C. for 1 h, then diluted with DCM (25 mL), washed with water (10 mL) and brine (10 mL), dried over $Na_2SO_4$, and concentrated in vacuo. The residue was purified via silica chromatography and a gradient of 50-90% EtOAc in hexanes to afford ((1s,4S)-7-(2-cyano-4-methyl-4-morpholinopent-2-enoyl)-7-azabicyclo[2.2.1]heptan-1-yl)methyl ((R)-2-(4-fluorophenyl)-1-((3aS,4S,6S,7aR)-3a,5,5-trimethylhexahydro-4,6-methanobenzo[d][1,3,2]dioxaborol-2-yl)ethyl)carbamate as a yellow oil (35 mg, 18%).

To a solution of ((1s,4S)-7-(2-cyano-4-methyl-4-morpholinopent-2-enoyl)-7-azabicyclo[2.2.1]heptan-1-yl) methyl ((R)-2-(4-fluorophenyl)-1-((3aS,4S,6S,7aR)-3a,5,5-trimethylhexahydro-4,6-methanobenzo[d][1,3,2] dioxaborol-2-yl)ethyl)carbamate (35 mg, 0.05 mmol) in MeOH (3 mL) were added hexanes (3 mL) and 1 N HCl (1.5 mL), followed by isobutyl boric acid (16 mg, 0.15 mmol). After the mixture was stirred at rt for 3 h, the pH of the mixture was adjusted to 7 with aq. sat. $NaHCO_3$ solution, before the hexanes layer was discarded. The methanol layer was diluted with water (20 mL), then dried over lyophilization to give a crude product which was purified by prep-HPLC to afford (R)-(1-((((7-(2-cyano-4-methyl-4-morpholinopent-2-enoyl)-7-azabicyclo[2.2.1]heptan-1-yl) methoxy)carbonyl)amino)-2-(4-fluorophenyl)ethyl)boronic acid as a white solid (22 mg, 82%).

Example 83

((R)-1-(((((S)-1-(2-cyano-4-(4-(methoxycarbonyl) piperazin-1-yl)-4-methylpent-2-enoyl)piperidin-3-yl) oxy)carbonyl)amino)-2-phenylethyl)boronic Acid

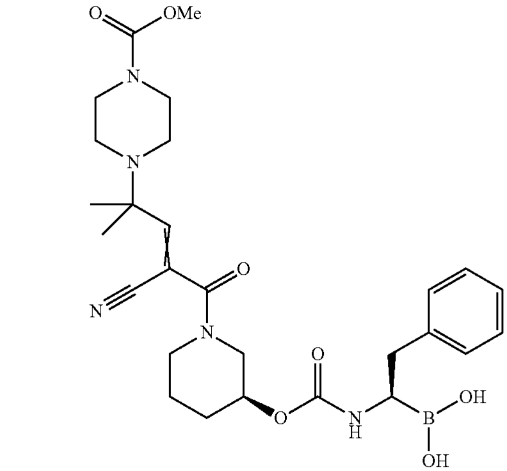

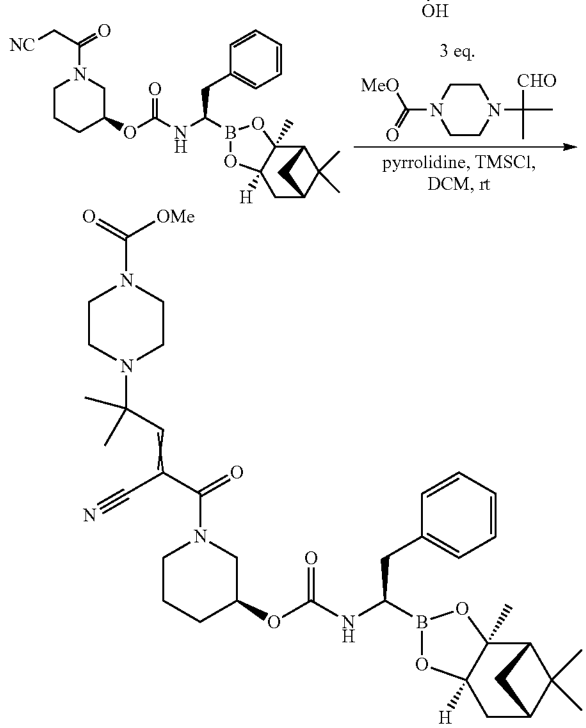

Into a 50-mL round-bottom flask, was placed a solution of (3S)-1-(2-cyanoacetyl)piperidin-3-yl N-[(1R)-2-phenyl-1-[(1S,2S,6R,8S)-2,9,9-trimethyl-3,5-dioxa-4-boratricyclo [6.1.1.0^[2,6]]decan-4-yl]ethyl]carbamate (180 mg, 0.36 mmol, 1 eq.) in dichloromethane (2 mL), followed by methyl 4-(2-methyl-1-oxopropan-2-yl)piperazine-1-carboxylate (234 mg, 1.1 mmol, 3 eq.), pyrrolidine (130 mg, 1.83 mmol, 5.00 eq.), and TMSCl (198 mg, 1.82 mmol, 5 eq.). The resulting solution was stirred for 1 h at rt. The resulting solution was diluted with DCM (10 mL). The resulting mixture was washed with brine (5 mL). The mixture was dried over anhydrous sodium sulfate and concentrated under vacuum. The residue was purified on a silica gel column with ethyl acetate:petroleum ether (60:40). This resulted in 130 mg (52%) of methyl 4-[4-cyano-2-methyl-4-[(3S)-3-([[(1R)-2-phenyl-1-[(1S,2S,6R,8S)-2,9,9-trimethyl-3,5-dioxa-4-boratricyclo[6.1.1.0^[2,6]]decan-4-yl]ethyl]carbamoyl]oxy)piperidine-1-carbonyl]but-3-en-2-yl]piperazine-1-carboxylate as a colorless oil.

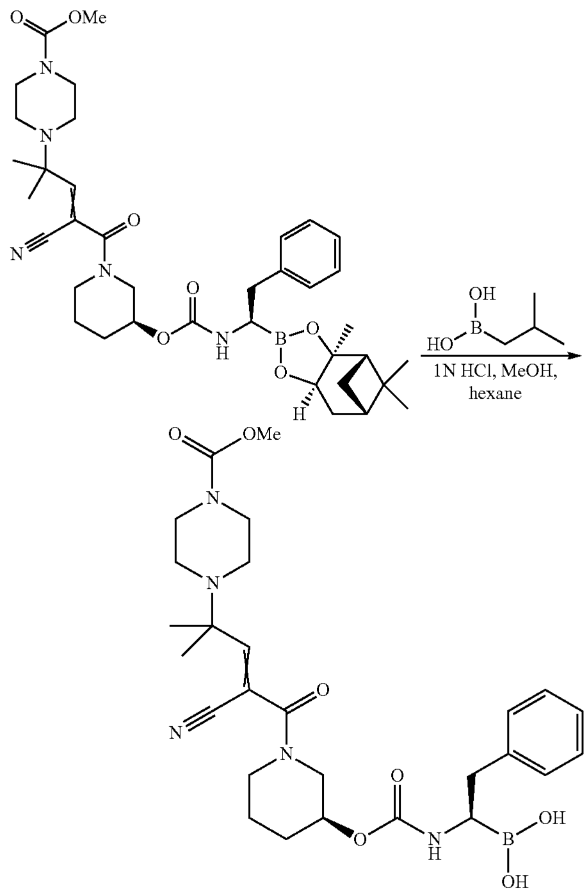

Into a 100-mL round-bottom flask, was placed methyl 4-[4-cyano-2-methyl-4-[(3S)-3-([[(1R)-2-phenyl-1-[(1S,2S,6R,8S)-2,9,9-trimethyl-3,5-dioxa-4-boratricyclo[6.1.1.0^[2,6]]decan-4-yl]ethyl]carbamoyl]oxy)piperidine-1-carbonyl]but-3-en-2-yl]piperazine-1-carboxylate (100 mg, 0.14 mmol, 1 eq.), MeOH (3 mL), hexane (3 mL, 0.03 mmol), 1N HCl (3 mL), and (2-methylpropyl)boronic acid (44 mg, 0.43 mmol, 3 eq.). The resulting solution was stirred for 1 h at rt. The hexane layer of the mixture was discarded, and then the methanol layer was diluted with water (20 mL) and dried over lyophylization. The crude product was purified by prep-HPLC with the following conditions: Column, XBridge Prep C18 OBD Column, 19×150 mm, 5 um; mobile phase, water (10 mmol/L $NH_4HCO_3$) and MeCN (30% MeCN up to 45% in 7 min); Detector, UV: 220 nm. This resulted in 28 mg (34%) of ((R)-1-(((((S)-1-(2-cyano-4-(4-(methoxycarbonyl)piperazin-1-yl)-4-methylpent-2-enoyl)piperidin-3-yl)oxy)carbonyl)amino)-2-phenylethyl)boronic acid as a white solid. LC-MS m/z: 556 [M+1].

Example 84

(R)-(1-((((7-(2-cyano-4-(3,3-difluoropyrrolidin-1-yl)-4-methylpent-2-enoyl)-7-azabicyclo[2.2.1]heptan-1-yl)methoxy)carbonyl)amino)-2-(4-fluorophenyl)ethyl)boronic Acid

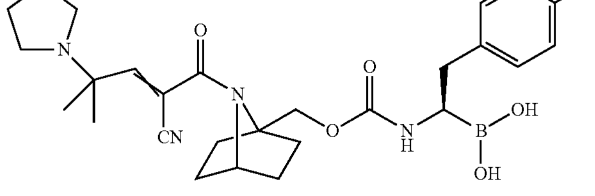

-continued

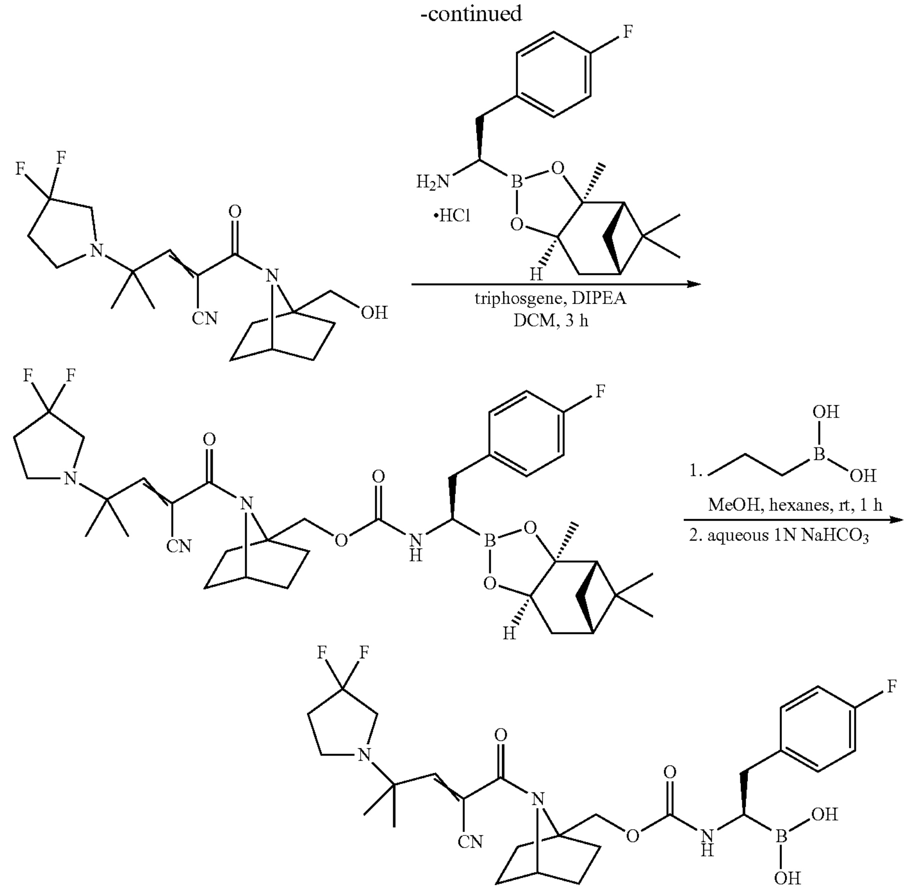

Bis(trichloromethyl) carbonate (252 mg, 0.85 mmol) in DCM (1 mL) was added dropwise into a stirring solution of 4-(3,3-difluoropyrrolidin-1-yl)-2-((1s,4s)-1-(hydroxymethyl)-7-azabicyclo[2.2.1]heptane-7-carbonyl)-4-methylpent-2-enenitrile (150 mg, 0.42 mmol) and DIPEA (330 mg, 2.55 mmol) in DCM (3 mL) at 0° C. The mixture was stirred for 2 h at 0° C. This resulting solution was added dropwise into a well-stirred solution (R)-2-(4-fluorophenyl)-1-((3aS,4S,6S,7aR)-3a,5,5-trimethylhexahydro-4,6-methanobenzo[d][1,3,2]dioxaborol-2-yl)ethan-1-amine hydrochloride (133 mg, 0.42 mmol) and DIPEA (164 mg, 1.27 mmol) in DCM (4 mL) at 0° C. The reaction was stirred at 0° C. for 1 h, then diluted with DCM (25 mL), washed with water (5 mL) and brine (5 mL), dried over $Na_2SO_4$, and finally concentrated in vacuo. The residue was purified by prep-HPLC to afford ((1s,4S)-7-(2-cyano-4-(3,3-difluoropyrrolidin-1-yl)-4-methylpent-2-enoyl)-7-azabicyclo[2.2.1]heptan-1-yl)methyl ((R)-2-(4-fluorophenyl)-1-((3aS,4S,6S,7aR)-3a,5,5-trimethylhexahydro-4,6-methanobenzo[d][1,3,2]dioxaborol-2-yl)ethyl)carbamate as a white solid (190 mg, 64%).

To a solution of ((1s,4S)-7-(2-cyano-4-(3,3-difluoropyrrolidin-1-yl)-4-methylpent-2-enoyl)-7-azabicyclo[2.2.1]heptan-1-yl)methyl ((R)-2-(4-fluorophenyl)-1-((3aS,4S,6S,7aR)-3a,5,5-trimethylhexahydro-4,6-methanobenzo[d][1,3,2]dioxaborol-2-yl)ethyl)carbamate (190 mg, 0.27 mmol) in MeOH (4 mL) were added hexanes (4 mL) and 1 N HCl (2 mL), followed by isobutyl boric acid (83 mg, 0.81 mmol). After stirred at rt for 1 h, the hexanes layer was discarded from the mixture. The methanol layer was diluted with water (20 mL) and aq. 1N $NaHCO_3$ solution (2 mL), and then dried over lyophilization to give a crude product which was purified by pre-HPLC to afford (R)-(1-((((7-(2-cyano-4-(3,3-difluoropyrrolidin-1-yl)-4-methylpent-2-enoyl)-7-azabicyclo[2.2.1]heptan-1-yl)methoxy)carbonyl)amino)-2-(4-fluorophenyl)ethyl)boronic acid as a white solid (55 mg, 36%).

Example 85

((1R)-1-((((1-acryloyl-3-methylpiperidin-3-yl)oxy)carbonyl)amino)-2-phenylethyl)boronic Acid

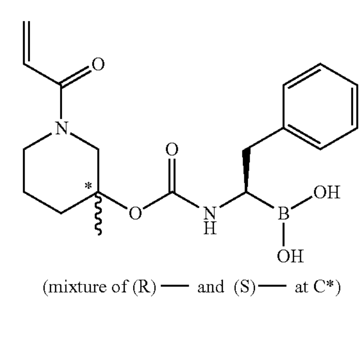

(mixture of (R)— and (S)— at C*)

Step 1

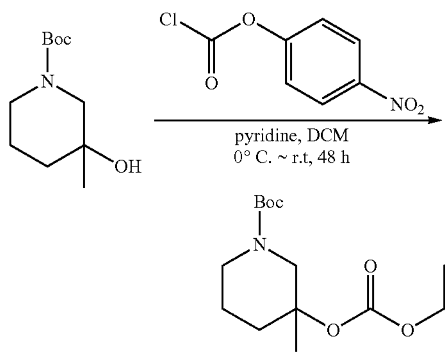

Into a 250-mL round-bottomed flask, was placed tert-butyl 3-hydroxy-3-methylpiperidine-1-carboxylate (3 g, 13.9 mmol, 1 eq.), DCM (60 mL), pyridine (2.2 g, 0.03 mmol, 2 eq.). This was followed by the addition of a solution of 4-nitrophenyl carbonochloridate (8.4 g, 0.04 mmol, 3 eq.) in DCM (30 mL) dropwise with stirring at 0° C. The resulting solution was stirred for 3 days at rt. The reaction was then quenched by the addition of water (50 mL). The resulting mixture was washed with $H_2O$ (1×50 mL). The mixture was dried over anhydrous sodium sulfate and concentrated. The residue was applied onto a silica gel column with ethyl acetate:petroleum ether (10:90). This resulted in 2.5 g (47.16%) of tert-butyl 3-methyl-3-[[(4-nitrophenoxy) carbonyl]oxy]piperidine-1-carboxylate as a colorless oil.

Step 2

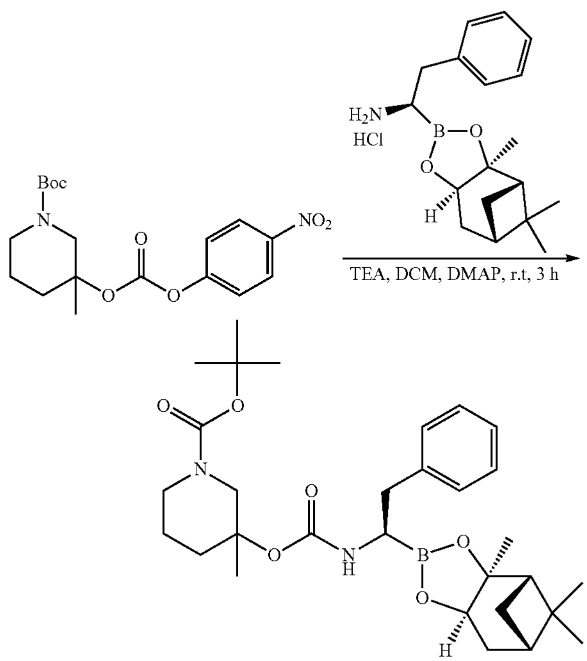

Into a 100-mL round-bottomed flask, was placed tert-butyl 3-methyl-3-[[(4-nitrophenoxy)carbonyl]oxy]piperidine-1-carboxylate (900 mg, 2.37 mmol, 1 eq.), DCM (22.5 mL), TEA (718 mg, 7.10 mmol, 3 eq.), (1R)-2-phenyl-1-[(1S,2S,6R,8S)-2,9,9-trimethyl-3,5-dioxa-4-boratricyclo [6.1.1.0^[2,6]]decan-4-yl]ethan-1-amine hydrochloride (794.2 mg, 2.37 mmol, 1 eq.), and DMAP (289.0 mg, 2.37 mmol, 1.00 eq.). The resulting solution was stirred for 3 h at rt. The resulting solution was diluted with DCM (20 mL) and washed with NaCl (1×20 mL). The mixture was dried over anhydrous sodium sulfate and concentrated. The residue was applied onto a silica gel column with ethyl acetate:petroleum ether (10:90). This resulted in 500 mg (39.10%) of tert-butyl3-methyl-3-([[(1R)-2-phenyl-1-[(1S,2S,6R,8S)-2,9,9-trimethyl-3,5-dioxa-4-boratricyclo[6.1.1.0^[2,6]]decan-4-yl]ethyl]carbamoyl]oxy)piperidine-1-carboxylate as a brown oil.

Step 3

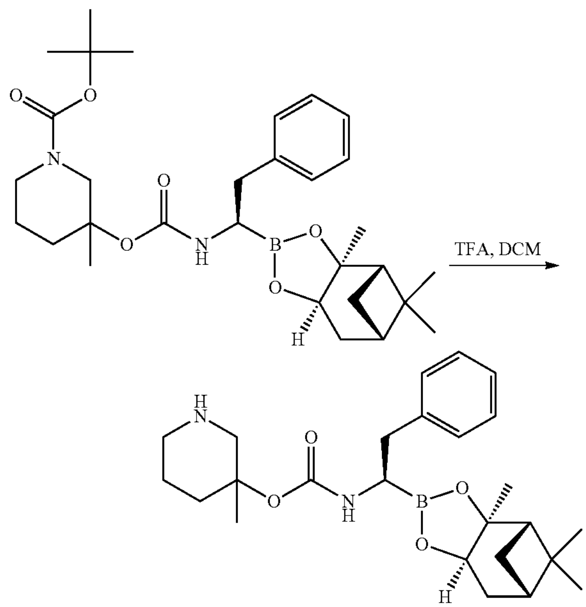

Into a 100-mL round-bottom flask, was placed tert-butyl 3-methyl-3-([[(1R)-2-phenyl-1-[(1S,2S,6R,8S)-2,9,9-trimethyl-3,5-dioxa-4-boratricyclo[6.1.1.0^[2,6]]decan-4-yl] ethyl]carbamoyl]oxy)piperidine-1-carboxylate (700 mg, 1.30 mmol, 1 eq.), DCM (14 mL, 0.02 mmol, 0.13 eq.), and TFA (3 mL, 40.39 mmol, 31.19 eq.). The resulting solution was stirred for 1 h at rt. The resulting mixture was concentrated. This resulted in 570 mg (crude) of 3-methylpiperidin-3-ylN-[(1R)-2-phenyl-1-[(1S,2S,6R,8S)-2,9,9-trimethyl-3,5-dioxa-4-boratricyclo[6.1.1.0^[2,6]]decan-4-yl]ethyl] carbamate as a yellow oil.

Step 4

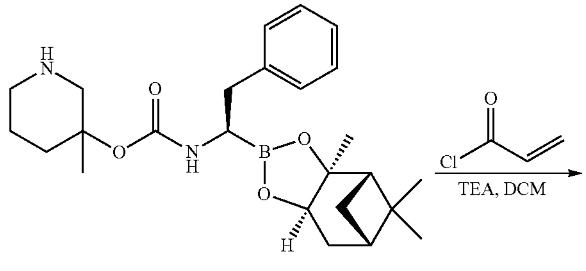

-continued

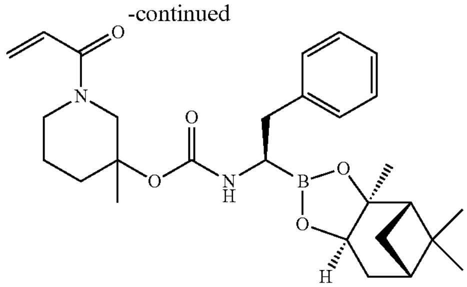

Into a 100-mL round-bottom flask, was placed 3-methylpiperidin-3-yl N-[(1R)-2-phenyl-1-[(1S,2S,6R,8S)-2,9,9-trimethyl-3,5-dioxa-4-boratricyclo[6.1.1.0^[2,6]]decan-4-yl]ethyl]carbamate (570 mg, 1.29 mmol, 1 eq.), DCM (2 mL), TEA (392.9 mg, 3.88 mmol, 3 eq.), and prop-2-enoyl chloride (140.6 mg, 1.55 mmol, 1.20 eq.). The resulting solution was stirred for 20 min at rt. The resulting solution was diluted with DCM (20 mL). The resulting mixture was washed with NaCl (1×10 mL). The mixture was dried over anhydrous sodium sulfate and concentrated under vacuum. The residue was applied onto a silica gel column with ethyl acetate:petroleum ether (30:70). This resulted in 260 mg of 3-methyl-1-(prop-2-enoyl)piperidin-3-ylN-[(1R)-2-phenyl-1-[(1S,2S,6R,8S)-2,9,9-trimethyl-3,5-dioxa-4-boratricyclo[6.1.1.0^[2,6]]decan-4-yl]ethyl]carbamate as a yellow oil.

Step 5

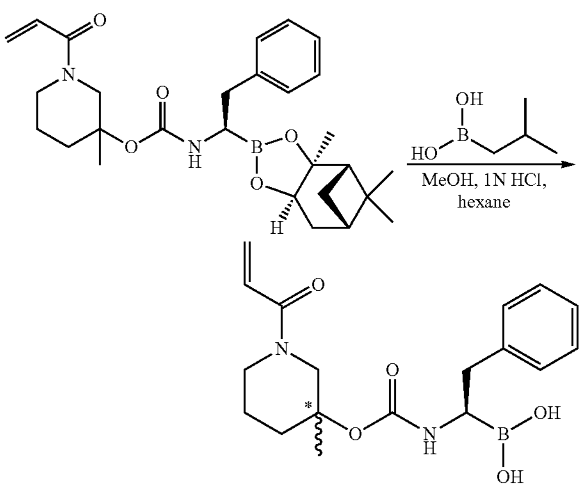

(mixture of (R)- and (S)- at C*)

Into a 100-mL round-bottom flask, was placed 3-methyl-1-(prop-2-enoyl)piperidin-3-ylN-[(1R)-2-phenyl-1-[(1S,2S,6R,8S)-2,9,9-trimethyl-3,5-dioxa-4-boratricyclo[6.1.1.0^[2,6]]decan-4-yl]ethyl]carbamate(first peak) (30 mg, 0.06 mmol, 1 eq.), MeOH (1 mL), hexane (1 mL), 1NHCl (1 mL, 20 eq.), and (2-methylpropyl)boronic acid (18.5 mg, 0.18 mmol, 3.00 eq.). The resulting solution was stirred for 1 h at rt. The hexane layer was discarded. The methanol layer was diluted with water (10 mL) then dried over lyophilization. The crude product was purified by prep-HPLC to afford 14.1 mg of ((1R)-1-((((1-acryloyl-3-methylpiperidin-3-yl)oxy)carbonyl)amino)-2-phenylethyl)boronic acid as a white solid. LC-MS m/z: 383.0 [M+23].

Example 86

(R)-(1-((((1-acryloylazetidin-3-yl)methoxy)carbonyl)amino)-2-phenylethyl)boronic acid Step 1

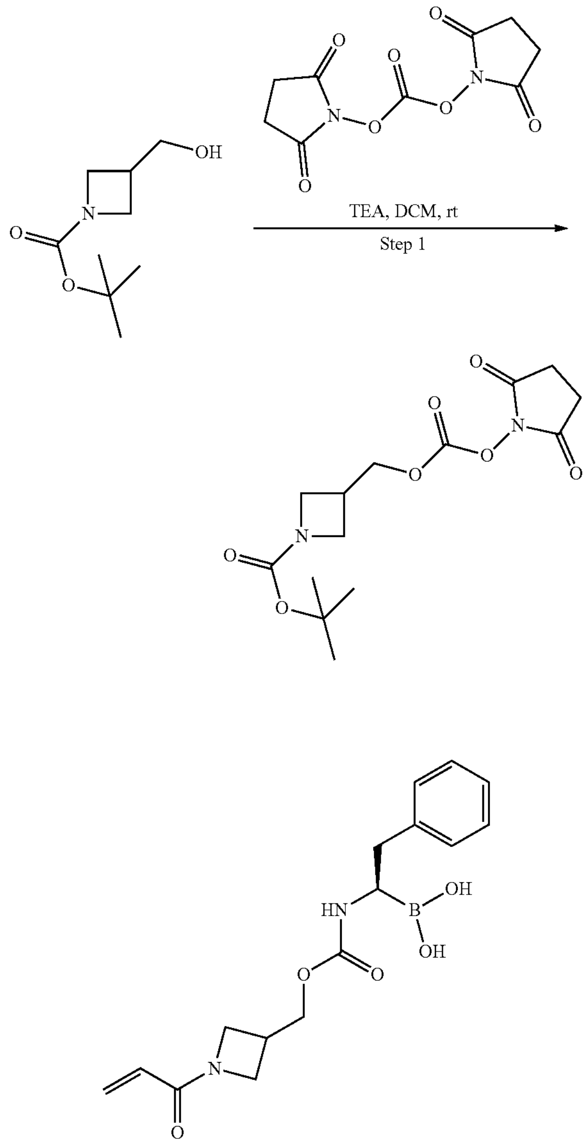

Into a 100-mL round-bottom flask, was placed a solution of 1-Boc-3-(hydroxymethyl)azetidine (2.3 g, 12.4 mmol, 1 eq.) and triethylamine (5.2 mL, 37.3 mmol, 3 eq.) in dichloromethane (20 mL). To this solution was added bis (2,5-dioxopyrrolidin-1-yl) carbonate (3.8 g, 14.9 mmol, 1.2 eq.). The resulting solution was stirred for 2 h at rt. The reaction mixture was worked up with water (50 mL) and DCM (2×50 mL). The organic layer was dried with $MgSO_4$ and concentrated to obtain tert-butyl 3-[(2,5-dioxopyrrolidin-1-yl)oxycarbonyloxymethyl]azetidine-1-carboxylate, 4.0 g (98%) which was used without further purification.

Step 2

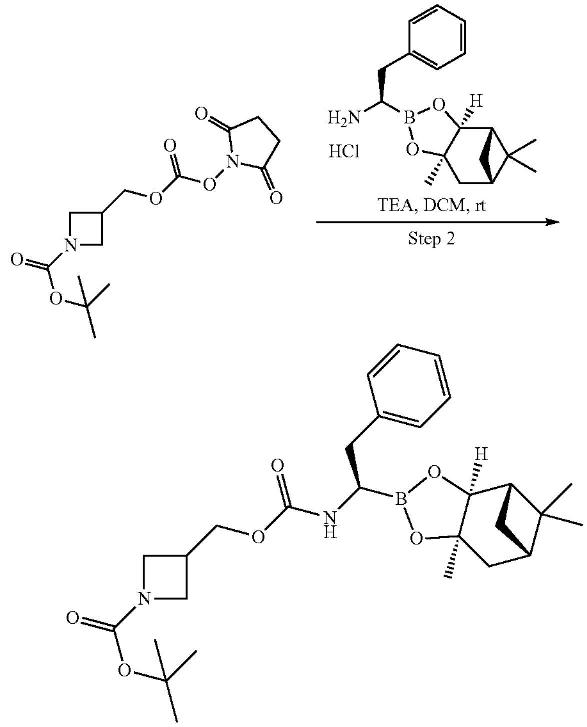

Into a 100-mL round-bottom flask, 2-phenyl-1-((3aS,4S,6S,7aR)-3a,5,5,7a-tetramethylhexahydro-4,6-methanobenzo[d][1,3,2]dioxaborol-2-yl)ethan-1-amine hydrochloride (1.8 g, 5.5 mmol, 1 eq.) was added to a solution of tert-butyl 3-[(2,5-dioxopyrrolidin-1-yl)oxycarbonyloxymethyl]azetidine-1-carboxylate (3.62 g, 11 mmol) and triethylamine (2.6 mL, 18.6 mmol, 3.0 eq.) in dichloromethane (60 mL). The resulting mixture was allowed to stir at rt for 1 h. The reaction mixture was worked up with water (50 mL) and DCM (2×50 mL). The organic layer was dried with $MgSO_4$ and concentrated to crude oil which was purified by normal phase silica gel chromatography (50 g column size, gradient 0-20% MeOH in DCM using 1 L of solvent). The desired fractions were collected and concentrated to obtain 1.7 g (54%) of tert-butyl 3-(((((R)-2-phenyl-1-((3aS,4S,6S,7aR)-5,5,7a-trimethylhexahydro-4,6-methanobenzo [d][1,3,2]dioxaborol-2-yl)ethyl)carbamoyl)oxy)methyl)azetidine-1-carboxylate.

Step 3

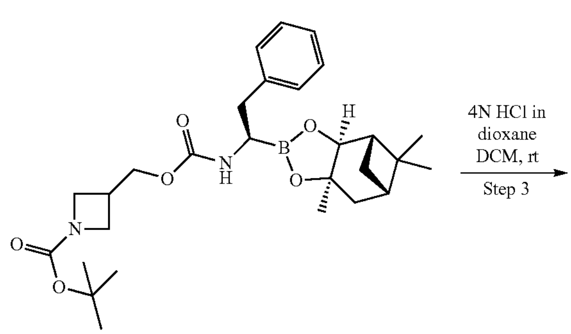

-continued

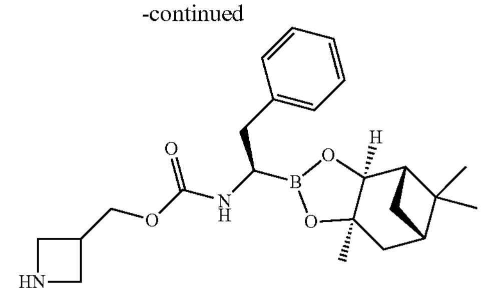

Into a 25-mL round-bottom flask tert-butyl 3-(((((R)-2-phenyl-1-((3aS,4S,6S,7aR)-5,5,7a-trimethylhexahydro-4,6-methanobenzo [d][1,3,2]dioxaborol-2-yl)ethyl)carbamoyl)oxy)methyl)azetidine-1-carboxylate (1.7 g, 3.3 mmol) from step 2 was placed in a solution of dichloromethane (10 mL). 4N HCl in dioxane (6.0 mL) was added to the solution. The resulting mixture was allowed to stir at rt for 1 h. The crude was concentrated to oil and placed under high-vacuum overnight before using azetidin-3-ylmethyl ((R)-2-phenyl-1-((3aS,4S,6S,7aR)-5,5,7a-trimethylhexahydro-4,6-methanobenzo[d][1,3,2]dioxaborol-2-yl)ethyl)carbamate for the next step. LC-MS m/z: 413 [M+1].

Step 4

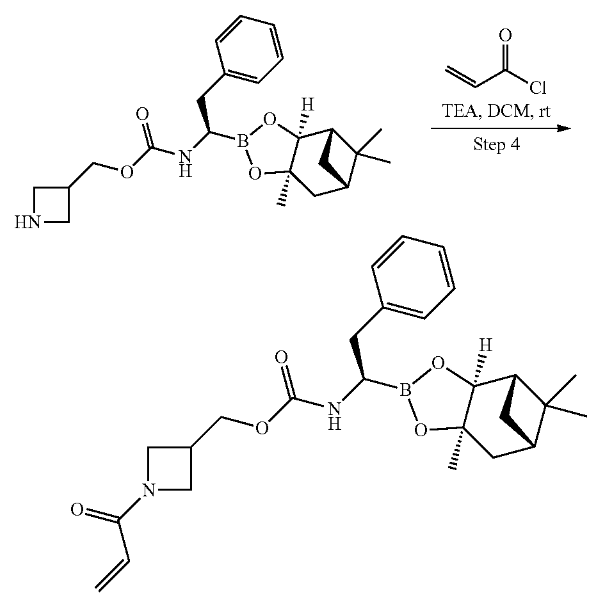

Into a 25-mL round-bottom flask, acryloyl chloride (0.3 mL, 4.0 mmol) was placed a solution of azetidin-3-ylmethyl ((R)-2-phenyl-1-((3aS,4S,6S,7aR)-5,5,7a-trimethylhexahydro-4,6-methanobenzo[d][1,3,2]dioxaborol-2-yl)ethyl) carbamate (1.37 g, 3.32 mmol) from step 3 and TEA (2.8 mL, 19.9 mmol) in dichloromethane (5 mL). The resulting solution was allowed to stir at rt for 1 h. The reaction mixture was worked up with water (40 mL) and DCM (2×40 mL). The organic layer was dried with $MgSO_4$ and concentrated to crude oil which was purified by normal phase silica gel chromatography (50 g column size, gradient 0-20% MeOH in DCM using 1 L for eluent). The desired fractions were concentrated to obtain 800 mg (52%) of (1-acryloylazetidin-3-yl)methyl ((R)-2-phenyl-1-((3aS,4S,6S,7aR)-5, 5,7a-trimethylhexahydro-4,6-methanobenzo[d][1,3,2]dioxaborol-2-yl)ethyl)carbamate.

Step 5

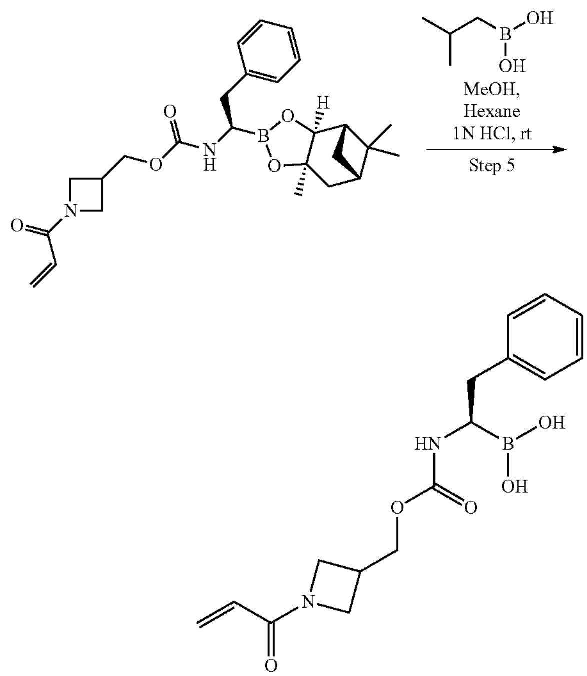

Into a 50-mL round-bottom flask, isobutylboronic acid (655.73 mg, 6.43 mmol) was placed in a solution of (1-acryloylazetidin-3-yl)methyl ((R)-2-phenyl-1-((3aS,4S,6S,7aR)-5,5,7a-trimethylhexahydro-4,6-methanobenzo[d][1,3,2]dioxaborol-2-yl)ethyl)carbamate (800.00 mg, 1.72 mmol) from step 4 in methanol (10 mL) hexane (10 mL) and 1N HCl (1.5 mL). The resulting mixture was stirred at rt for 2 h. The reaction mixture was concentrated to an oil which was purified using prep-HPLC to obtain 78 mg (14%) of (R)-(1-((((1-acryloylazetidin-3-yl)methoxy)carbonyl)amino)-2-phenylethyl)boronic acid. LC-MS m/z: 333 [M+1].

Example 87

((R)-1-(((((S)-1-((E)-2-cyano-4,4-dimethylpent-2-enoyl)pyrrolidin-3-yl)oxy)carbonyl)amino)-2-phenylethyl)boronic Acid

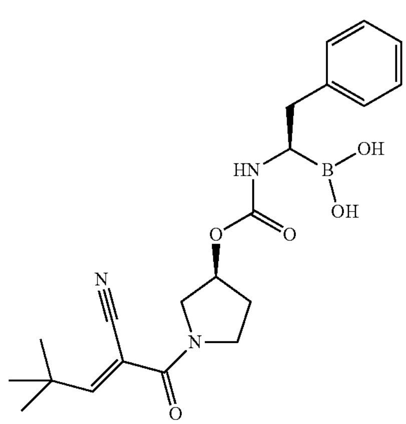 [SMILES: CC(C)(C)/C=C(\C#N)C(=O)N1CC[C@H](OC(=O)N[C@@H](Cc2ccccc2)B(O)O)C1]

Step 1

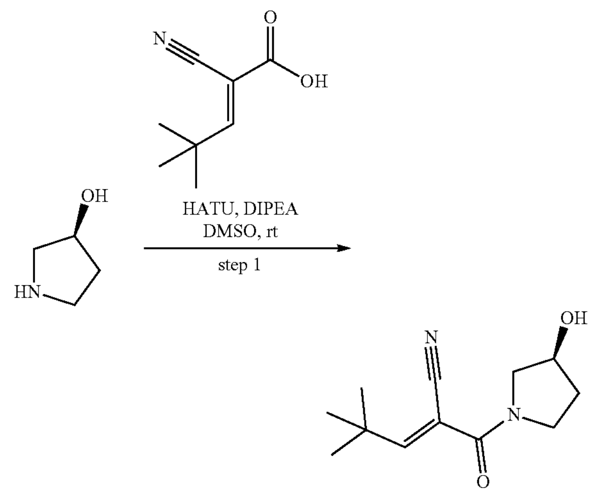

Into a 100-mL round-bottom flask (E)-2-cyano-4,4-dimethyl-pent-2-enoic acid (3.1 mL, 28.4 mmol), was placed in a solution of (3S)-pyrrolidin-3-ol (1.9 g, 21.8 mmol), N,N-diisopropylethylamine (7.8 mL, 43.6 mmol) and DMF (70 mL) then allowed to stir for 10 min at rt. HATU (9.9 g, 26 mmol) was added to mixture and continued stirring for 2 h. The mixture was worked up with DCM (2×70 mL) and water (70 mL). The organic layer was dried with $MgSO_4$ and concentrated under reduced pressure to obtain 728 mg (15%) of (E)-2-[(3S)-3-hydroxypyrrolidine-1-carbonyl]-4,4-dimethyl-pent-2-enenitrile as a pure oil. LC-MS m/z: 223 [M+1].

Step 2

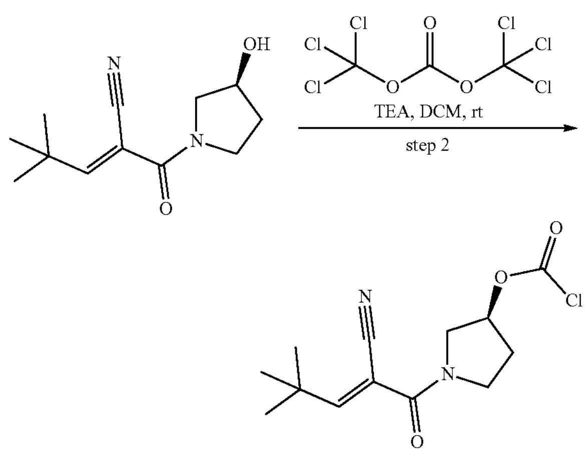

Into a 25-mL round-bottom flask, bis(trichloromethyl) carbonate (1.17 g, 3.9 mmol) was added to a solution of (E)-2-[(3S)-3-hydroxypyrrolidine-1-carbonyl]-4,4-dimethyl-pent-2-enenitrile (728 mg, 3.28 mmol), triethylamine (0.91 mL, 6.55 mmol), and DCM (7 mL) while it was stirring at 0° C. The resulting solution was allowed to gradually warm up to rt. The reaction mixture was stirred for 20 minutes and directly used in step 3.

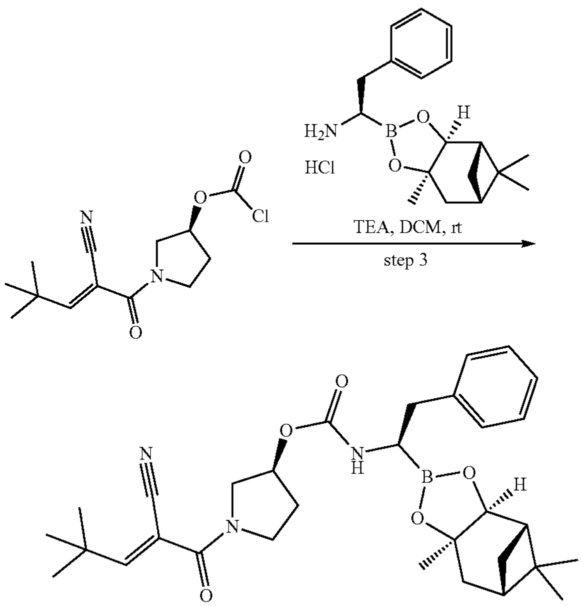

Into a 25-mL round-bottom flask, 2-phenyl-1-((3aS,4S,6S,7aR)-3a,5,5,7a-tetramethylhexahydro-4,6-methanobenzo[d][1,3,2]dioxaborol-2-yl)ethan-1-amine hydrochloride (600 mg, 1.8 mmol) was added to the reaction mixture from step 2. The resulting mixture was allowed to stir at rt for 20 min, and the crude was concentrated to oil which was purified by Shimadzu preparative-HPLC. The collected desired fractions were neutralized with sat. aq. $NaHCO_3$ solution (50 mL) and DCM (70 mL). The organic layer was dried with $MgSO_4$ and concentrated to obtain 152 mg (15%) of (S)-1-((E)-2-cyano-4,4-dimethylpent-2-enoyl)pyrrolidin-3-yl ((R)-2-phenyl-1-((3aS,4S,6S,7aR)-5,5,7a-trimethylhexahydro-4,6-methanobenzo[d][1,3,2]dioxaborol-2-yl)ethyl)carbamate as a solid. LC-MS m/z: 548 [M+1].

Step 4

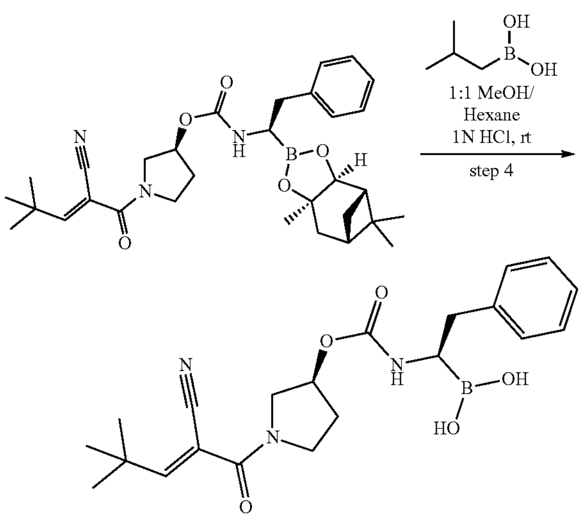

Into a 25-mL round-bottom flask, isobutylboronic acid (84.9 mg, 0.83 mmol) was added into a solution of (S)-1-((E)-2-cyano-4,4-dimethylpent-2-enoyl)pyrrolidin-3-yl ((R)-2-phenyl-1-((3aS,4S,6S,7aR)-5,5,7a-trimethylhexahydro-4,6-methanobenzo[d][1,3,2]dioxaborol-2-yl)ethyl) carbamate (152 mg, 0.28 mmol), hexane (7 mL) and 1N HCl (1.5 mL). The resulting mixture was stirred at rt for 1 h. The crude mixture was concentrated and purified by Shimadzu preparative-HPLC. Collected desired fractions were neutralized by sat. aq. $NaHCO_3$ (50 mL) and DCM (50 mL). The organic layer was concentrated and restituted with acetonitrile:water (10 mL, 7:3), frozen and then lyophilized to obtain 20 mg (17%) of ((R)-1-(((((S)-1-((E)-2-cyano-4,4-dimethylpent-2-enoyl)pyrrolidin-3-yl)oxy)carbonyl)amino)-2-phenylethyl)boronic acid as a white powder. LC-MS m/z: 396 [M+1-18].

Example 88

((R)-1-(((((S)-1-acryloylpyrrolidin-3-yl)oxy)carbonyl)amino)-2-phenylethyl)boronic Acid

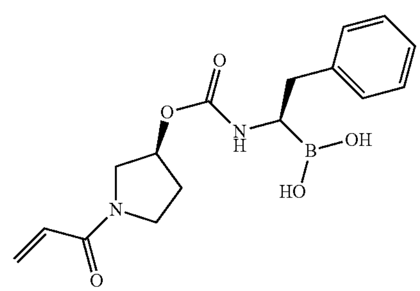 [SMILES: C=CC(=O)N1CC[C@H](OC(=O)N[C@@H](Cc2ccccc2)B(O)O)C1]

Step 1

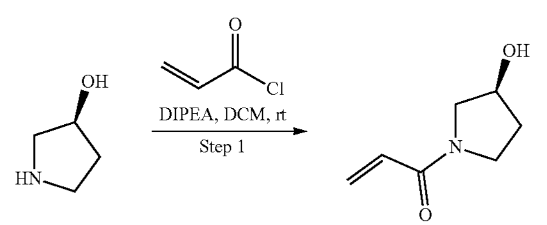

Into a 25-mL round-bottom flask, acryloyl chloride (1 mL, 12.9 mmol) was added into the solution of (3S)-pyrrolidin-3-ol (1.1 g, 12.9 mmol), N,N-diisopropylethylamine (3 mL, 16.8 mmol), and DCM (20 mL). The resulting solution was allowed to stir at rt for 1 h. The reaction mixture was worked up with water (40 mL) and DCM (2×40 mL). The organic layer was dried with $MgSO_4$ and concentrated to a crude oil, which was purified by normal phase silica gel chromatography (50 g column size, gradient 0-20% MeOH in DCM using a total amount of 500 mL eluent). The desired fractions were concentrated to obtain 772 mg (42%) of 1-[(3S)-3-hydroxypyrrolidin-1-yl]prop-2-en-1-one as an oil.

Step 2

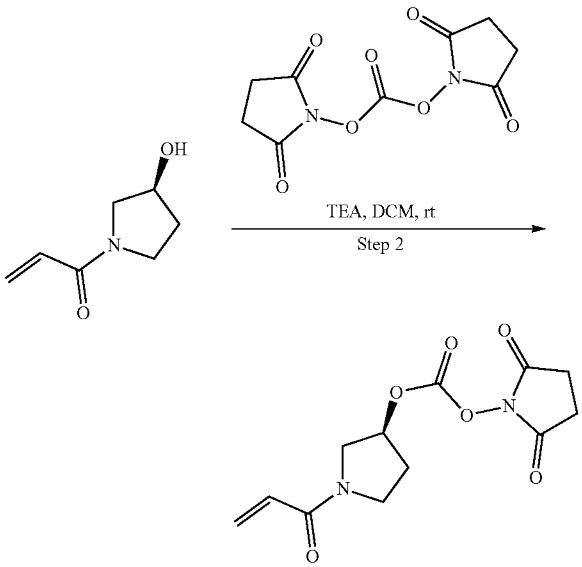

Into a 50-mL round-bottom flask, bis(2,5-dioxopyrrolidin-1-yl) carbonate (1.68 g, 6.6 mmol) was added to solution of 1-[(3S)-3-hydroxypyrrolidin-1-yl]prop-2-en-1-one (772 mg, 5.47 mmol), triethylamine (1.14 mL, 8.2 mmol), and DCM (25 mL). The result was allowed to stir at rt for 1 h. The reaction mixture was worked up with water (50 mL) and DCM (2×50 mL). The organic layer was dried with $MgSO_4$, concentrated, and then purified by normal phase silica gel chromatography with 25 g column size, 0-15% MeOH:DCM. The desired fractions were collected and concentrated to obtain 775 mg (50%) of (2,5-dioxopyrrolidin-1-yl) [(3S)-1-prop-2-enoylpyrrolidin-3-yl]carbonate as a solid. LC-MS m/z: 283 [M+1].

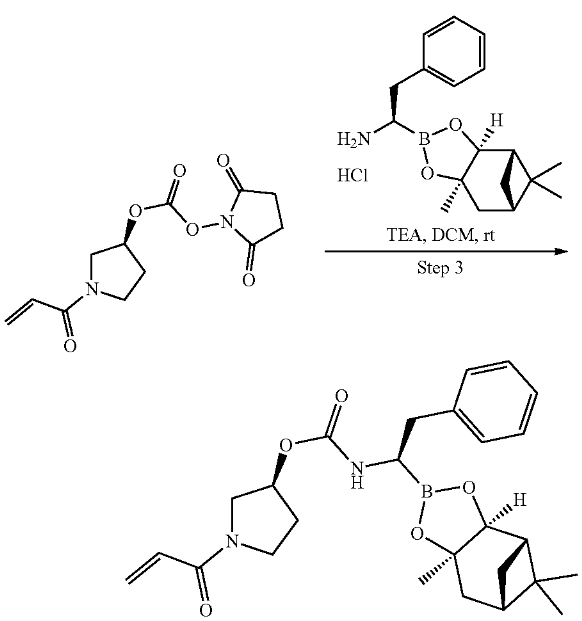

Step 3

Into a 25-mL round-bottom flask, 2-phenyl-1-((3aS,4S,6S,7aR)-3a,5,5,7a-tetramethylhexahydro-4,6-methanobenzo[d][1,3,2]dioxaborol-2-yl)ethan-1-amine (387 mg, 1.15 mmol) was added to a solution of (2,5-dioxopyrrolidin-1-yl) [(3S)-1-prop-2-enoylpyrrolidin-3-yl]carbonate (488 mg, 1.73 mmol), triethylamine (0.32 mL, 2.31 mmol), and DCM (10 mL). The resulting mixture was allowed to stir at rt for 2 h. The mixture was worked up with water (50 mL) and DCM (2×50 mL). The organic layer was dried with $MgSO_4$ and concentrated then purified by normal phase silica gel chromatography with 25 g column size and a 0-20% gradient of MeOH in DCM. The desired fractions were collected and concentrated to obtain 420 mg (78%) of (R)-1-acryloylpyrrolidin-3-yl ((R)-2-phenyl-1-((3aS,4S,6S,7aR)-5,5,7a-trimethylhexahydro-4,6-methanobenzo[d][1,3,2]dioxaborol-2-yl)ethyl)carbamate as a solid. LC-MS m/z: 467 [M+1].

Step 4

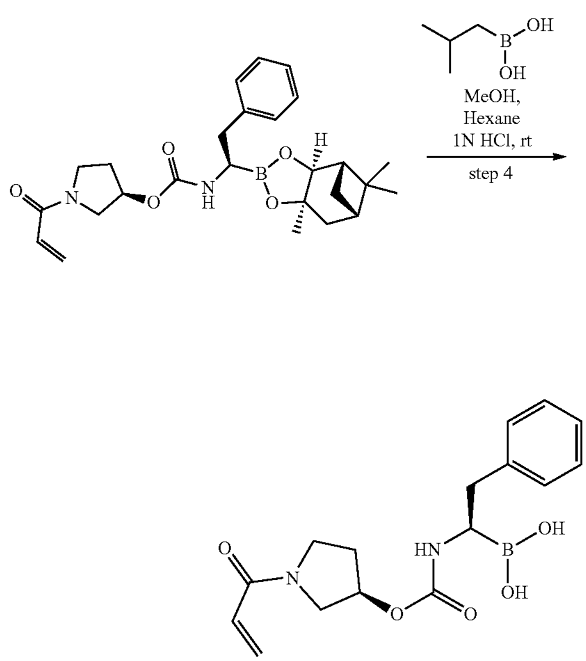

Into a 25-mL round-bottom flask, isobutylboronic acid (275.41 mg, 2.7 mmol) was added to solution of (R)-1-acryloylpyrrolidin-3-yl ((R)-2-phenyl-1-((3aS,4S,6S,7aR)-5,5,7a-trimethylhexahydro-4,6-methanobenzo[d][1,3,2]dioxaborol-2-yl)ethyl)carbamate (420.00 mg, 0.90 mmol), methanol (5 mL), hexane (5 mL) and 1N HCl (1.5 mL). The resulting mixture was allowed to stir at rt for 1 h. The mixture was concentrated under reduced pressure and then purified by Shimadzu preparative-HPLC. The desired fractions were collected and neutralized with sat. aq. $NaHCO_3$ and DCM (50 mL). The organic layer was dried with $MgSO_4$ and restituted to ACN:water (10 mL, 7:3) then frozen and lyophilized to obtain 93 mg (31%) of ((R)-1-(((((S)-1-acryloylpyrrolidin-3-yl)oxy)carbonyl)amino)-2-phenylethyl)boronic acid as a white powder. LC-MS m/z: 315 [M+1-18].

Example 89

((R)-1-(((((S)-1-(2-cyano-4-(3,3-difluoropyrrolidin-1-yl)-4-methylpent-2-enoyl)pyrrolidin-3-yl)oxy)carbonyl)amino)-2-phenylethyl)boronic Acid

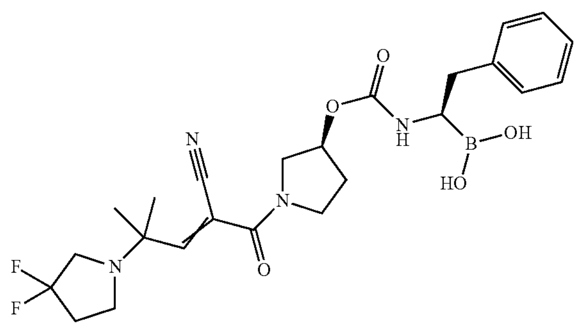 [SMILES: CC(C)(C=C(C#N)C(=O)N1CC[C@H](OC(=O)N[C@@H](Cc2ccccc2)B(O)O)C1)N1CCC(F)(F)C1]

Step 1

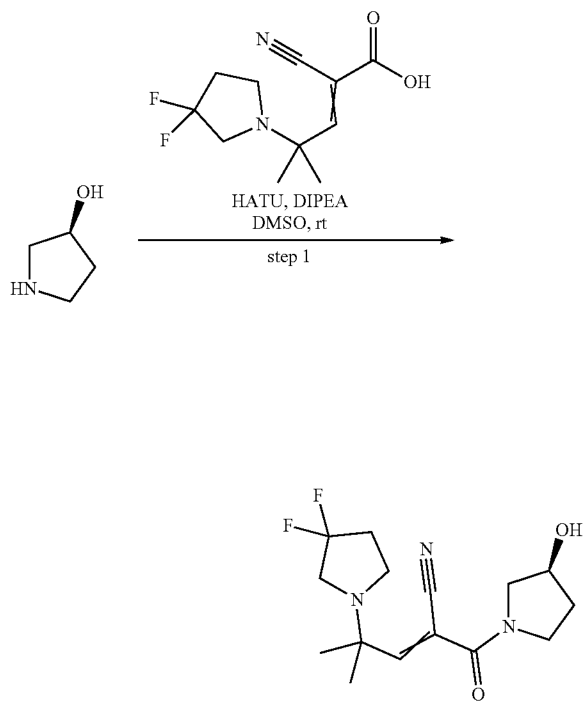

Into a 100-mL round-bottom flask, (3S)-pyrrolidin-3-ol (428 mg, 4.91 mmol) was placed in a solution of N,N-diisopropylethylamine (0.58 mL, 3.28 mmol) and DMF (70 mL) and then allowed to stir for 10 min. HATU (933.51 mg, 2.46 mmol) was added to the reaction mixture and then stirred for 2 h. The mixture was worked up with DCM (2×70 mL) and water (70 mL). The organic layer was dried with $MgSO_4$ and concentrated to obtain 400 mg (78%) of 4-(3,3-difluoropyrrolidin-1-yl)-2-[(3S)-3-hydroxypyrrolidine-1-carbonyl]-4-methyl-pent-2-enenitrile as an oil. LC-MS m/z: 314 [M+1].

Step 2

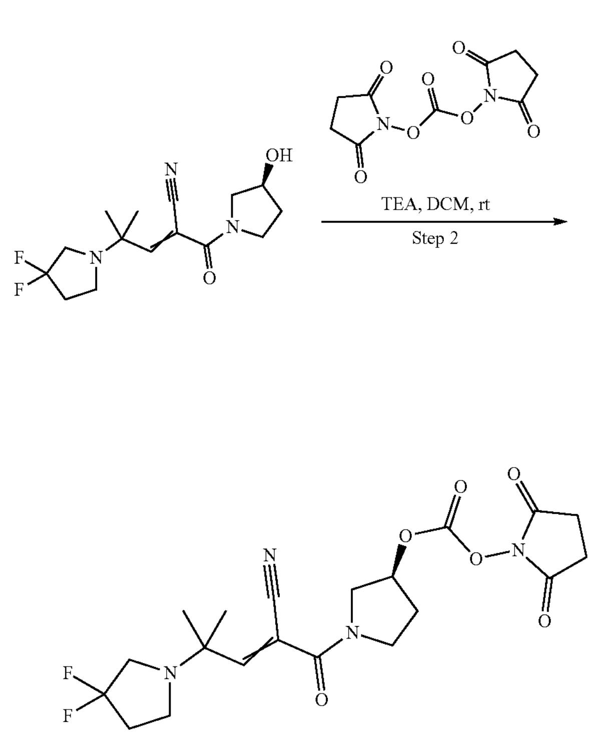 [SMILES: CC(C)(C=C(C#N)C(=O)N1CC[C@H](O)C1)N1CCC(F)(F)C1 ; O=C(ON1C(=O)CCC1=O)ON1C(=O)CCC1=O ; CC(C)(C=C(C#N)C(=O)N1CC[C@H](OC(=O)ON2C(=O)CCC2=O)C1)N1CCC(F)(F)C1]

Into a 100-mL round-bottom flask, bis(2,5-dioxopyrrolidin-1-yl) carbonate (392 mg, 1.53 mmol) was added to solution of 4-(3,3-difluoropyrrolidin-1-yl)-2-[(3S)-3-hydroxypyrrolidine-1-carbonyl]-4-methyl-pent-2-enenitrile (400 mg, 1.28 mmol), triethylamine (0.27 mL, 1.91 mmol), and DCM (25 mL). The resulting mixture was stirred at rt for 1.5 h. The reaction mixture was worked up with DCM (60 mL) and water (60 mL). The organic layer was dried with $MgSO_4$ and concentrated to a crude oil which was purified by normal phase silica gel chromatography by using a 25 g column, 0-15% MeOH in DCM to obtain 282 mg (48%) of [(3S)-1-[2-cyano-4-(3,3-difluoropyrrolidin-1-yl)-4-methyl-pent-2-enoyl]pyrrolidin-3-yl](2,5-dioxopyrrolidin-1-yl) carbonate as a solid. LC-MS m/z: 455 [M+1].

Step 3

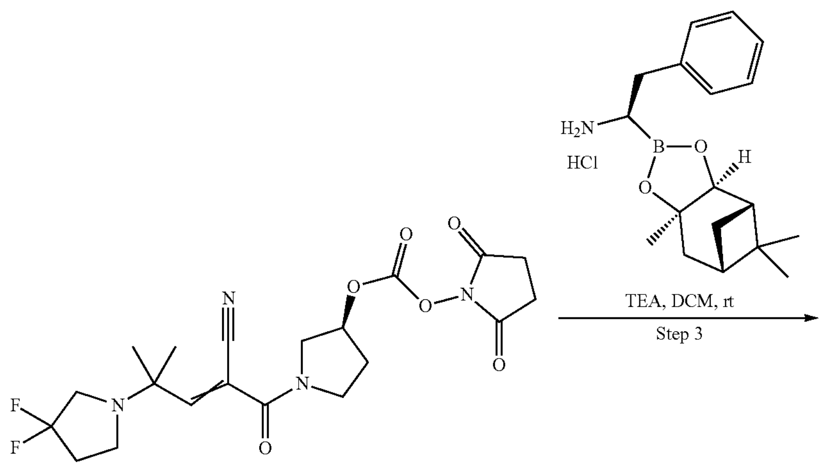

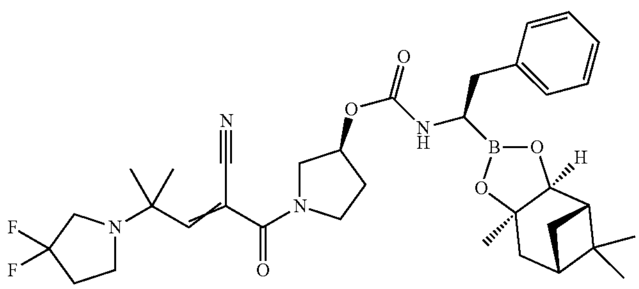

Into a 50-mL round-bottom flask, 2-phenyl-1-((3aS,4S,6S,7aR)-3a,5,5,7a-tetramethylhexahydro-4,6-methanobenzo[d][1,3,2]dioxaborol-2-yl)ethan-1-amine hydrochloride (170 mg, 0.51 mmol) was added into solution of [(3S)-1-[2-cyano-4-(3,3-difluoropyrrolidin-1-yl)-4-methyl-pent-2-enoyl]pyrrolidin-3-yl](2,5-dioxopyrrolidin-1-yl) carbonate (276 mg, 0.61 mmol), triethylamine (0.35 mL, 2.5 mmol), and DCM (20 mL). The result was stirred at rt for 1.5 h. The mixture was worked up with DCM (60 mL) and water (60 mL). The organic layer was dried with $MgSO_4$ and concentrated to oil which was purified by Shimadzu prep-HPLC. The desired fractions were neutralized with sat. aq. $NaHCO_3$ with DCM (50 mL), and the organic layer was dried with $MgSO_4$. The concentrated product was placed in the high-vacuum overnight to obtain 252 mg (78%) of (S)-1-(2-cyano-4-(3,3-difluoropyrrolidin-1-yl)-4-methyl-pent-2-enoyl)pyrrolidin-3-yl ((R)-2-phenyl-1-((3aS,4S,6S,7aR)-5,5,7a-trimethylhexahydro-4,6-methanobenzo[d][1,3,2]dioxaborol-2-yl)ethyl)carbamate. LC-MS m/z: 639 [M+1].

Step 4

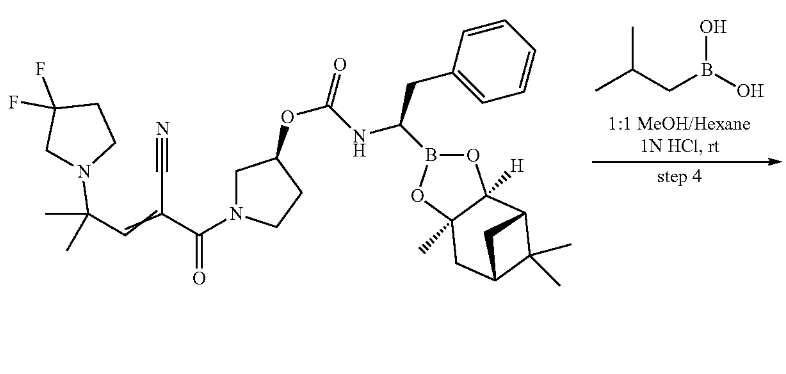

-continued

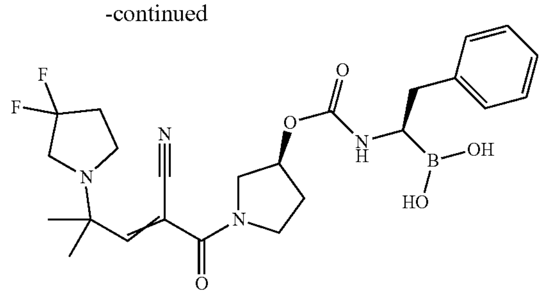

Into a 25-mL round-bottom flask, isobutylboronic acid (85 mg, 0.83 mmol) was added into a solution of (S)-1-(2-cyano-4-(3,3-difluoropyrrolidin-1-yl)-4-methylpent-2-enoyl)pyrrolidin-3-yl ((R)-2-phenyl-1-((3aS,4S,6S,7aR)-5,5,7a-trimethylhexahydro-4,6-methanobenzo[d][1,3,2]dioxaborol-2-yl)ethyl)carbamate (252 mg, 0.39 mmol), methanol (7 mL), hexane (7 mL), and 1N HCl (1.5 mL). The resulting mixture was stirred at rt for 1 h. The crude mixture was concentrated and purified by Shimadzu preparative-HPLC. The desired fractions were neutralized with sat. aq. $NaHCO_3$ (50 mL) and DCM (50 mL). The organic layer was concentrated and restituted with acetonitrile:water (10 mL, 7:3), frozen, and then lyophilized to obtain 84 mg (42%) of ((R)-1-(((((S)-1-(2-cyano-4-(3,3-difluoropyrrolidin-1-yl)-4-methylpent-2-enoyl)pyrrolidin-3-yl)oxy)carbonyl)amino)-2-phenylethyl)boronic acid as a white powder. LC-MS m/z: 487 [M+1-18].

Example 90

((R)-1-(((((R)-1-(2-cyano-4-(3,3-difluoropyrrolidin-1-yl)-4-methylpent-2-enoyl)pyrrolidin-3-yl)oxy)carbonyl)amino)-2-phenylethyl)boronic Acid

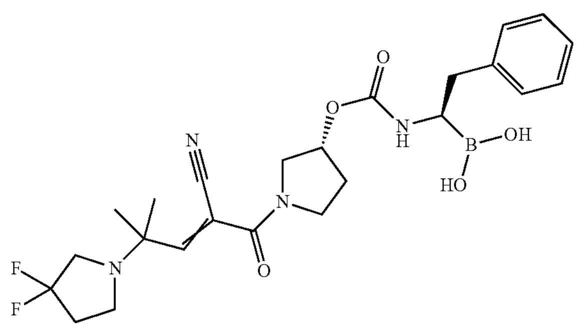 [SMILES: CC(C)(C=C(C#N)C(=O)N1CC[C@@H](OC(=O)N[C@@H](Cc2ccccc2)B(O)O)C1)N1CCC(F)(F)C1]

Following the sequence in example 89, with the exception of using (3R)-pyrrolidin-3-ol (314.61 mg, 3.61 mmol) in the first step, 168 mg (61%) of the title compound, ((R)-1-(((((R)-1-(2-cyano-4-(3,3-difluoropyrrolidin-1-yl)-4-methylpent-2-enoyl)pyrrolidin-3-yl)oxy)carbonyl)amino)-2-phenylethyl)boronic acid was obtained as a colorless solid. LC-MS m/z: 487 [M+1-18].

Example 91

((1R)-1-((((1-acryloyl-3-methylpiperidin-3-yl)oxy)carbonyl)amino)-2-(4-fluorophenyl)ethyl)boronic Acid

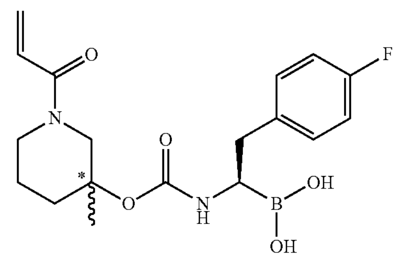

(Mixture of (R)— and (S)— at C*)

Step 1

Into a 100-mL round-bottom flask, was placed tert-butyl 3-methyl-3-[[(4-nitrophenoxy)carbonyl]oxy]piperidine-1-carboxylate (1 g, 2.63 mmol, 1 eq.), DCM (15 mL), TEA (0.53 g, 5.26 mmol, 2 eq.), (1R)-2-(4-fluorophenyl)-1-[(1S,2S,6R,8S)-2,9,9-trimethyl-3,5-dioxa-4-boratricyclo[6.1.1.0^[2,6]]decan-4-yl]ethan-1-amine hydrochloride (936 mg, 2.63 mmol 1 eq.), and DMAP (320 mg, 2.63 mmol, 1 eq.). The resulting solution was stirred for 3 h at rt. The resulting solution was diluted with DCM (20 mL). The resulting mixture was washed with NaCl (1×20 mL). The mixture was dried over anhydrous sodium sulfate and concentrated under vacuum. The residue was purified with silica gel column with ethyl acetate:petroleum ether (10:90). This resulted in 600 mg (40.9%) of tert-butyl 3-([[(1R)-2-(4-fluorophenyl)-1-[(1S,2S,6R,8S)-2,9,9-trimethyl-3,5-dioxa-4-boratricyclo[6.1.1.0^[2,6]]decan-4-yl]ethyl]carbamoyl]oxy)-3-methylpiperidine-1-carboxylate as a colorless oil.

Step 2

Into a 100-mL round-bottom flask, was placed tert-butyl 3-([[(1R)-2-(4-fluorophenyl)-1-[(1S,2S,6R,8S)-2,9,9-trimethyl-3,5-dioxa-4-boratricyclo[6.1.1.0^[2,6]]decan-4-yl]ethyl]carbamoyl]oxy)-3-methylpiperidine-1-carboxylate (500 mg, 1 eq.), DCM (10 mL), and TFA (2 mL). The resulting solution was stirred for 20 min at rt. The resulting mixture was concentrated under vacuum. This resulted in 401 mg (crude) of 3-methylpiperidin-3-yl N-[(1R)-2-(4-fluorophenyl)-1-[(1S,2S,6R,8S)-2,9,9-trimethyl-3,5-dioxa-4-boratricyclo[6.1.1.0^[2,6]]decan-4-yl]ethyl]carbamate as a yellow oil.

Step 3

Into a 100-mL round-bottom flask, was placed 3-methylpiperidin-3-yl N-[(1R)-2-(4-fluorophenyl)-1-[(1S,2S,6R,8S)-2,9,9-trimethyl-3,5-dioxa-4-boratricyclo[6.1.1.0^[2,6]]decan-4-yl]ethyl]carbamate (401 mg, 0.87 mmol, 1 eq.), DCM (2 mL), TEA (265.6 mg, 2.62 mmol, 3 eq.), and prop-2-enoyl chloride (95.0 mg, 1.05 mmol, 1.2 eq.). The resulting solution was stirred for 20 min at rt. The resulting solution was diluted with DCM (10 mL) and washed with NaCl (1×10 mL). The mixture was dried over anhydrous sodium sulfate and concentrated. The residue was purified by silica gel chromatography to afford 90 mg (20%) of 3-methyl-1-(prop-2-enoyl)piperidin-3-ylN-[(1R)-2-(4-fluorophenyl)-1-[(1S,2S,6R,8S)-2,9,9-trimethyl-3,5-dioxa-4-boratricyclo[6.1.1.0^[2,6]]decan-4-yl]ethyl]carbamate as a yellow oil.

Step 4

Into a 100-mL round-bottom flask, was placed 3-methyl-1-(prop-2-enoyl)piperidin-3-ylN-[(1R)-2-(4-fluorophenyl)-1-[(1S,2S,6R,8S)-2,9,9-trimethyl-3,5-dioxa-4-boratricyclo[6.1.1.0^[2,6]]decan-4-yl]ethyl]carbamate (50 mg, 0.10 mmol, 1 eq.), MeOH (2 mL), hexane (2 mL), 1N HCl (2 mL, 20 eq.), and (2-methylpropyl)boronic acid (29.8 mg, 0.29 mmol, 3 eq.). The resulting solution was stirred for 2 h at rt. The hexane layer was discarded. The methanol layer was diluted with water (8 mL) then dried over lyophilization. The crude product was purified by prep-HPLC with the following conditions: Column, XBridge Prep OBD C18 Column, 30*150 mm, 5 um; mobile phase, Water (10 mmol/L $NH_4HCO_3$+0.1% $NH_3.H_2O$) and ACN (18% CH3CN up to 43% in 8 min); Detector, uv 254 nm. This resulted in 19.1 mg (50.7%) of the title compound as a white solid. LC-MS m/z: 401 [M+23].

Examples 92-93

((R)-1-(((((S)-1-(2-cyano-4-(3,3-difluoropyrrolidin-1-yl)-4-methylpent-2-enoyl)-3-methylpiperidin-3-yl)oxy)carbonyl)amino)-2-phenylethyl)boronic acid (Example 92)

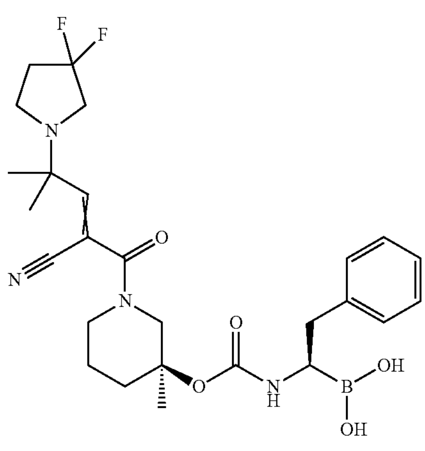 [SMILES: CC(C)(C=C(C#N)C(=O)N1CCC[C@](C)(OC(=O)N[C@@H](Cc2ccccc2)B(O)O)C1)N1CCC(F)(F)C1]

((R)-1-(((((R)-1-(2-cyano-4-(3,3-difluoropyrrolidin-1-yl)-4-methylpent-2-enoyl)-3-methylpiperidin-3-yl)oxy)carbonyl)amino)-2-phenylethyl)boronic acid (Example 93)

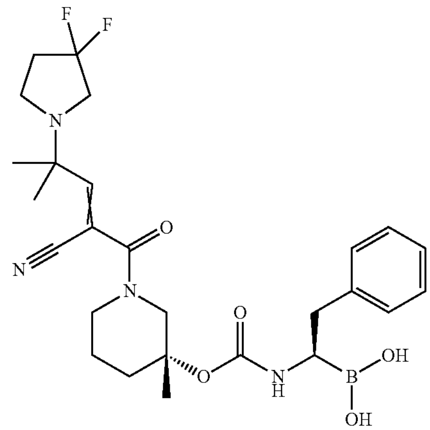 [SMILES: CC(C)(C=C(C#N)C(=O)N1CCC[C@@](C)(OC(=O)N[C@@H](Cc2ccccc2)B(O)O)C1)N1CCC(F)(F)C1]

Step 1

Into a 100-mL round-bottom flask, was placed 2-cyano-4-(3,3-difluoropyrrolidin-1-yl)-4-methylpent-2-enoic acid (1.7 g, 0.01 mmol, 2 eq.), DCM (20 mL), EDCI (3.9 g, 0.02 mmol, 6 eq.), HOBT (1.4 g, 0.01 mmol, 3 eq.), and 3-methylpiperidin-3-yl N-[(1R)-2-phenyl-1-[(1S,2S,6R,8S)-2,9,9-trimethyl-3,5-dioxa-4-boratricyclo[6.1.1.0^[2,6]]decan-4-yl]ethyl]carbamate (1.5 g, 3.41 mmol, 1 eq.) prepared as in Ex 85. The resulting solution was stirred for 1 h at rt. The reaction was then quenched by the addition of water. The resulting solution was extracted with dichloromethane. The organic layers were combined, washed with sodium carbonate and brine, dried, filtered, and concentrated under vacuum. The crude product was purified by prep-HPLC to afford 500 mg of 1-[2-cyano-2-[2-(3,3-difluoropyrrolidin-1-yl)-2-methylpropylidene]acetyl]-3-methylpiperidin-3-yl N-[(1R)-2-phenyl-1-[(1S,2S,6R,8S)-2,9,9-trimethyl-3,5-dioxa-4-boratricyclo[6.1.1.0 [2,6]]decan-4-yl]ethyl]carbamate as a yellow oil.

Step 2

1-(2-cyano-4-(3,3-difluoropyrrolidin-1-yl)-4-methylpent-2-enoyl)-3-methylpiperidin-3-yl((R)-2-phenyl-1-((3aS,4S,6S,7aR)-3a,5,5-trimethylhexahydro-4,6-methanobenzo[d][1,3,2]dioxaborol-2-yl)ethyl)carbamate (500 mg) was purified by chiral-prep-HPLC with the following conditions: Column: CHIRALPAK IC, 2*25 cm, 5 um; Mobile Phase A: Hex (8 mmol/L $NH_3$.MeOH)-HPLC, Mobile Phase B: IPA-HPLC; Flow rate: 20 mL/min; Gradient: 30 B to 30 B in 18 min; 220/254 nm; This resulted in the isolation of 50 mg of each isomer of 1-(2-cyano-4-(3,3-difluoropyrrolidin-1-yl)-4-methylpent-2-enoyl)-3-methylpiperidin-3-yl((R)-2-phenyl-1-((3aS,4S,6S,7aR)-3a,5,5-trimethylhexahydro-4,6-methanobenzo[d][1,3,2]dioxaborol-2-yl)ethyl)carbamate. Treatment of the first and second eluting isomers as in the final step of Ex 85 afforded the title compounds 92 and 93. LC-MS m/z: 533.1 [M+1].

Example 94

((1R)-1-((((1-(2-cyano-4-(3,3-difluoropyrrolidin-1-yl)-4-methylpent-2-enoyl)-3-methylpiperidin-3-yl)oxy)carbonyl)amino)-2-(4-fluorophenyl)ethyl)boronic Acid

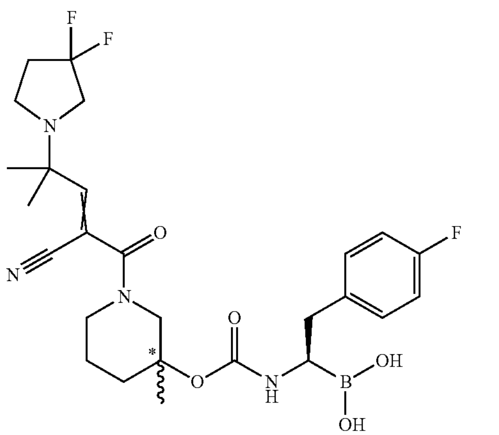

(mixture of (R)— and (S)— at C*)

Following the procedure used for Example 92 and 93 but replacing (1R)-2-phenyl-1-[(1S,2S,6R,8S)-2,9,9-trimethyl-3,5-dioxa-4-boratricyclo[6.1.1.0^[2,6]]decan-4-yl]ethan-1-amine hydrochloride with (R)-2-(4-fluorophenyl)-1-((3aS,4S,6S,7aR)-3a,5,5-trimethylhexahydro-4,6-methanobenzo[d][1,3,2]dioxaborol-2-yl)ethan-1-amine hydrochloride afforded the title compound (the diastereomeric isomers were not separated). LC-MS m/z: 533 [M -17].

Example 95

((R)-1-(((((S)-1-(2-cyano-4-(3,3-difluoropyrrolidin-1-yl)-4-methylpent-2-enoyl)pyrrolidin-3-yl)methoxy)carbonyl)amino)-2-phenylethyl)boronic Acid

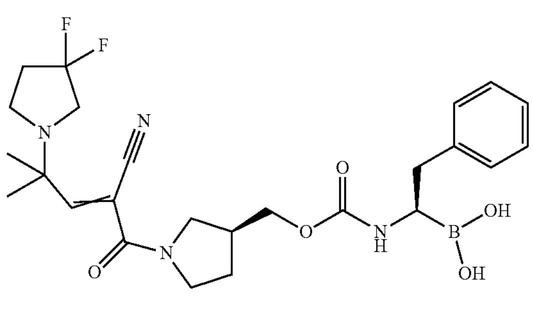 [SMILES: CC(C)(C=C(C#N)C(=O)N1CC[C@H](COC(=O)N[C@@H](Cc2ccccc2)B(O)O)C1)N1CCC(F)(F)C1]

Step 1

Into a 100-mL 3-necked round-bottom flask purged and maintained with an inert atmosphere of nitrogen, was placed tert-butyl (3S)-3-(hydroxymethyl)pyrrolidine-1-carboxylate (800 mg, 3.97 mmol, 1 eq.), DCM (15 mL), and DIEA (1540 mg, 11.9 mmol, 3.00 eq.). This was followed by the addition of a solution of ditrichloromethyl carbonate (590 mg, 1.99 mmol, 0.50 eq.) in DCM (5 mL) dropwise with stirring at 0° C. The resulting solution was stirred for 2 h at 0° C. The reaction mixture solution was used directly to the next step.

Step 2

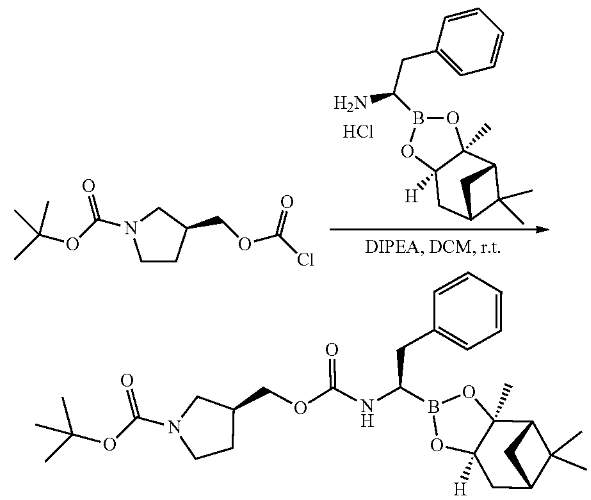

Into a 250-mL 3-necked round-bottom flask purged and maintained with an inert atmosphere of nitrogen, was placed (1R)-2-phenyl-1-[(1S,2S,6R,8S)-2,9,9-trimethyl-3,5-dioxa-4-boratricyclo[6.1.1.0^[2,6]]decan-4-yl]ethan-1-amine hydrochloride (1360 mg, 4.06 mmol, 1.03 eq.), DCM (20 mL), and DIPEA (1570 mg, 12.1 mmol, 3.08 eq.). This was followed by the addition of a solution of tert-butyl (3S)-3-[[(chlorocarbonyl)oxy]methyl]pyrrolidine-1-carboxylate (1040 mg, 3.94 mmol, 1 eq.) in DCM (15 mL) dropwise with stirring at 0° C. The resulting solution was stirred for 1 h at rt, then washed with water (1×30 mL). The mixture was dried over anhydrous sodium sulfate and concentrated under vacuum. The crude product was purified by flash-prep-HPLC to afford 1520 mg (73.2%) of tert-butyl (S)-3-(((((R)-2-phenyl-1-((3aS,4S,6S,7aR)-3a,5,5-trimethylhexahydro-4,6-methanobenzo[d][1,3,2]dioxaborol-2-yl)ethyl)carbamoyl)oxy)methyl)pyrrolidine-1-carboxylate as a white solid.

Step 3

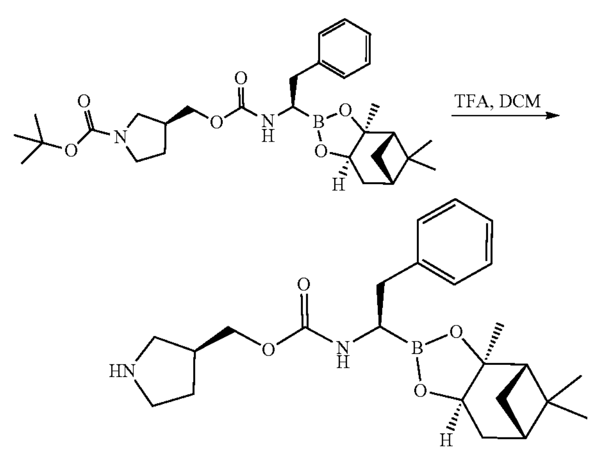

Into a 100-mL round-bottom flask, was placed tert-butyl (S)-3-(((((R)-2-phenyl-1-((3aS,4S,6S,7aR)-3a,5,5-trimethylhexahydro-4,6-methanobenzo[d][1,3,2]dioxaborol-2-yl) ethyl)carbamoyl)oxy)methyl)pyrrolidine-1-carboxylate (550 mg, 1.04 mmol, 1 eq.), DCM (10 mL), and 2,2,2-trifluoroacetaldehyde (2 mL). The resulting solution was stirred for 30 min at rt. The resulting mixture was concentrated under vacuum. This resulted in 440 mg (98.8%) of ((S)-pyrrolidin-3-yl)methyl ((R)-2-phenyl-1-((3aS,4S,6S,7aR)-3a,5,5-trimethylhexahydro-4,6-methanobenzo[d][1,3,2]dioxaborol-2-yl)ethyl)carbamate as a yellow oil.

Step 4

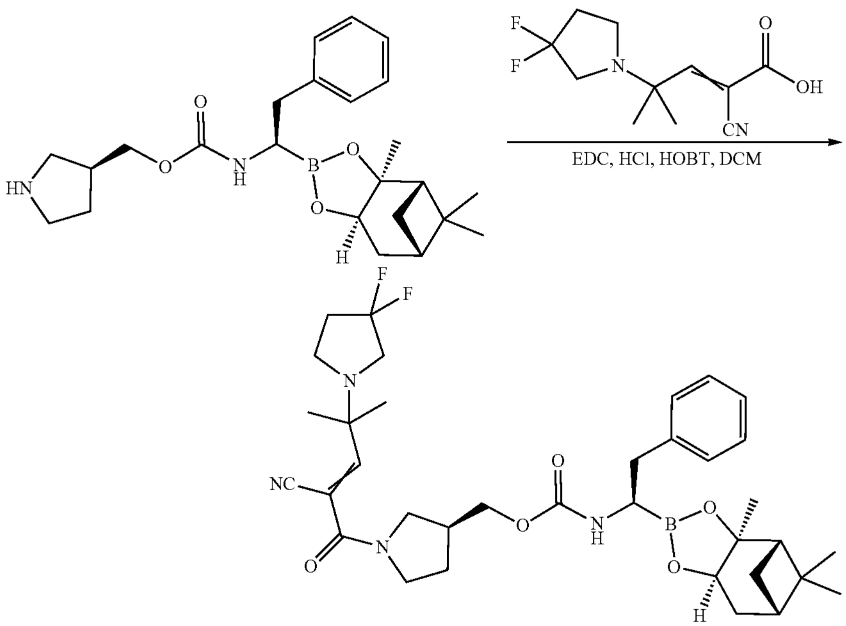

Into a 50-mL round-bottom flask, was placed 2-cyano-4-(3,3-difluoropyrrolidin-1-yl)-4-methylpent-2-enoic acid (185 mg, 0.76 mmol, 2.02 eq.), HOBT (154 mg, 1.14 mmol, 3.04 eq.), EDC.HCl (437 mg, 2.28 mmol, 6.07 eq.), and DCM (5 mL). This was followed by the addition of a solution of ((S)-pyrrolidin-3-yl)methyl ((R)-2-phenyl-1-((3aS,4S,6S,7aR)-3a,5,5-trimethylhexahydro-4,6-methanobenzo[d][1,3,2]dioxaborol-2-yl)ethyl)carbamate (160 mg, 0.38 mmol, 1 eq.) in DCM (2 mL) dropwise with stirring. The resulting solution was stirred for 2 h at rt and then washed with water (1×20 mL). The mixture was dried over anhydrous sodium sulfate and concentrated under vacuum. The crude product was purified by flash-prep-HPLC to afford 200 mg (81.7%) of ((S)-1-(2-cyano-4-(3,3-difluoropyrrolidin-1-yl)-4-methylpent-2-enoyl)pyrrolidin-3-yl) methyl ((R)-2-phenyl-1-((3aS,4S,6S,7aR)-3a,5,5-trimethylhexahydro-4,6-methanobenzo[d][1,3,2]dioxaborol-2-yl) ethyl)carbamate as a light yellow oil.

Step 5

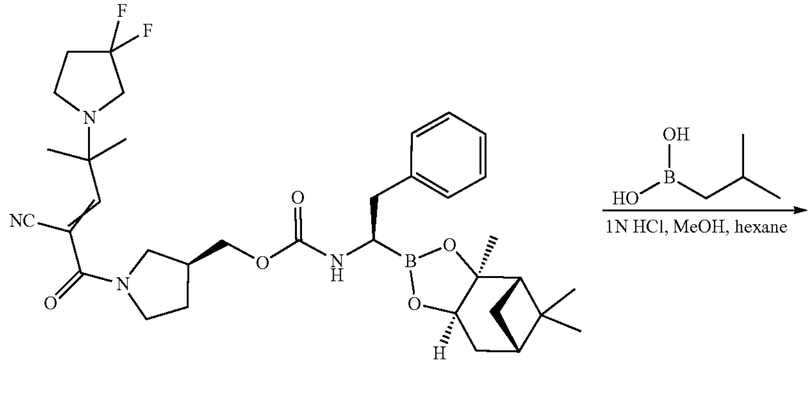

-continued

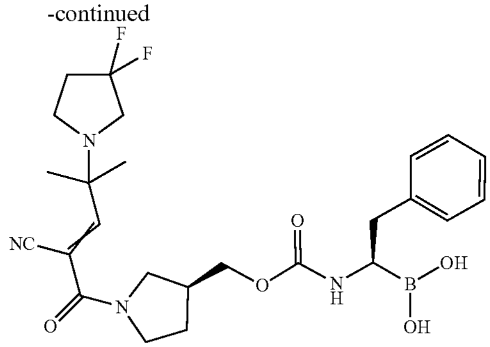

Into a 100-mL round-bottom flask, was placed ((S)-1-(2-cyano-4-(3,3-difluoropyrrolidin-1-yl)-4-methylpent-2-enoyl)pyrrolidin-3-yl)methyl ((R)-2-phenyl-1-((3aS,4S,6S,7aR)-3a,5,5-trimethylhexahydro-4,6-methanobenzo[d][1,3,2]dioxaborol-2-yl)ethyl)carbamate (250 mg, 0.38 mmol, 1 eq.), MeOH (6 mL), (2-methylpropyl)boronic acid (117 mg, 1.15 mmol, 3.00 eq.), hexane (6 mL), and 1N HCl (8 mL). The resulting solution was stirred for 1 h at rt. The methanol layer was diluted with water (25 mL), and dried over lyophylization to give a crude product which was purified by prep-HPLC to obtain 80.4 mg of the title compound as a white solid. LC-MS m/z: 501 [M+1].

Example 96

((R)-1-(((((S)-1-(2-cyano-4-(4-(methoxycarbonyl)piperazin-1-yl)-4-methylpent-2-enoyl)pyrrolidin-3-yl)methoxy)carbonyl)amino)-2-phenylethyl)boronic Acid

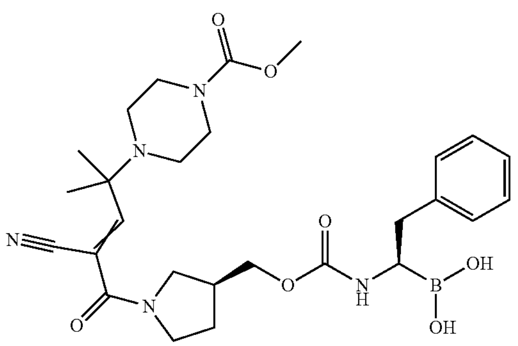 [SMILES: COC(=O)N1CCN(C(C)(C)C=C(C#N)C(=O)N2CC[C@H](COC(=O)N[C@@H](Cc3ccccc3)B(O)O)C2)CC1]

Step 1

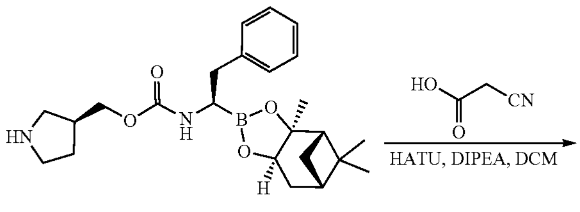

-continued

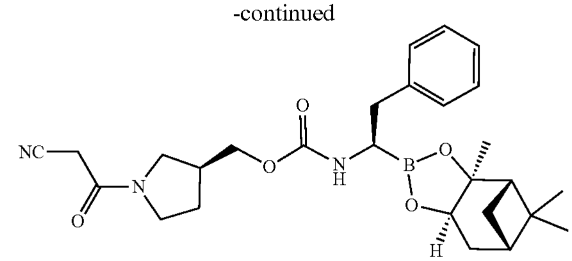

Into a 100-mL round-bottom flask, was placed ((S)-pyrrolidin-3-yl)methyl ((R)-2-phenyl-1-((3aS,4S,6S,7aR)-3a,5,5-trimethylhexahydro-4,6-methanobenzo[d][1,3,2]dioxaborol-2-yl)ethyl)carbamate (440 mg, 1.03 mmol, 1 eq.), DCM (10 mL), DIPEA (404 mg, 3.13 mmol, 3.03 eq.), 2-cyanoacetic acid (87.8 mg, 1.03 mmol, 1.00 eq.), and HATU (596 mg, 1.57 mmol, 1.52 eq.). The resulting solution was stirred for 1 h at rt. The resulting mixture was washed with water (1×20 mL). The mixture was dried over anhydrous sodium sulfate and concentrated under vacuum. The crude product was purified by flash-prep-HPLC to afford 412 mg (81%) of ((S)-1-(2-cyanoacetyl)pyrrolidin-3-yl)methyl ((R)-2-phenyl-1-((3aS,4S,6S,7aR)-3a,5,5-trimethylhexahydro-4,6-methanobenzo[d][1,3,2]dioxaborol-2-yl)ethyl)carbamate as a white solid.

Step 2

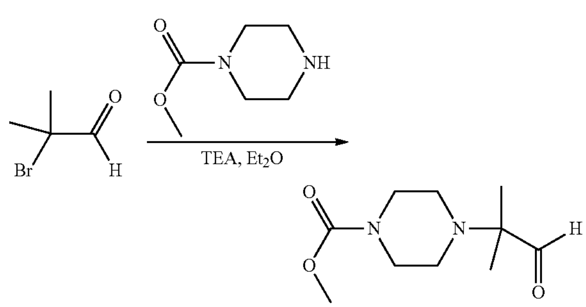

Into a 100-mL round-bottom flask purged and maintained with an inert atmosphere of nitrogen, was placed methyl piperazine-1-carboxylate (2.00 g, 13.87 mmol, 1 eq.), Et2O (25 mL), TEA (4.22 g, 41.70 mmol, 3.01 eq.), and 2-bromo-2-methylpropanal (3.15 g, 20.86 mmol, 1.50 eq.). The resulting mixture was stirred for 3 days at rt. The resulting mixture was washed with 10% aq. sodium chloride solution (30 mL). The aqueous layer was extracted with ethyl acetate (2×20 mL). The combined organic layer were dried over anhydrous sodium sulfate and concentrated under vacuum. The residue was purified by flash silica gel column to afford 1.90 g (63.9%) of methyl 4-(2-methyl-1-oxopropan-2-yl)piperazine-1-carboxylate as a colorless oil.

Step 3

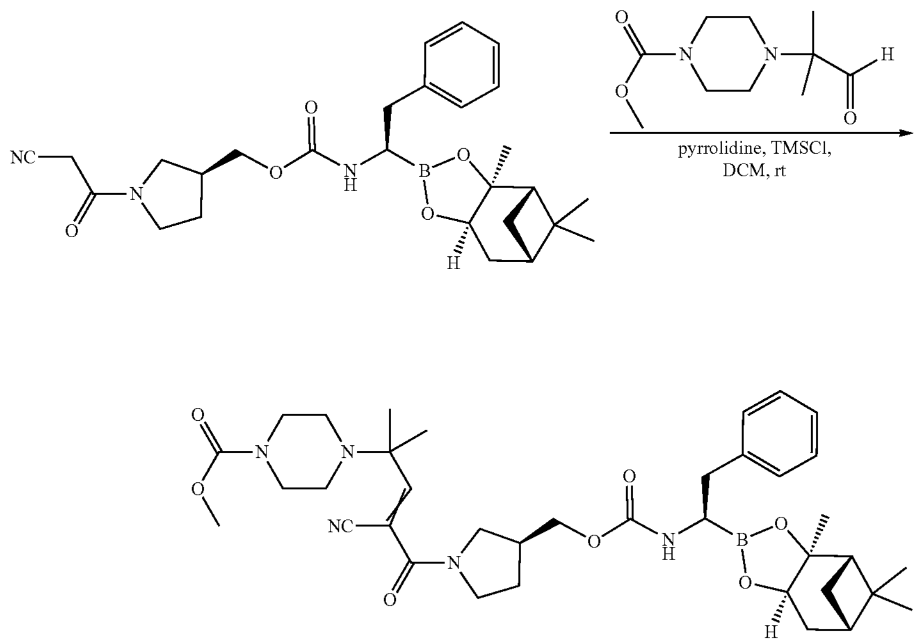

Into a 50-mL round-bottom flask, was placed ((S)-1-(2-cyanoacetyl)pyrrolidin-3-yl)methyl ((R)-2-phenyl-1-((3aS,4S,6S,7aR)-3a,5,5-trimethylhexahydro-4,6-methanobenzo[d][1,3,2]dioxaborol-2-yl)ethyl)carbamate (175 mg, 0.35 mmol, 1 eq.), DCM (5 mL), methyl 4-(2-methyl-1-oxopropan-2-yl)piperazine-1-carboxylate (238.7 mg, 1.12 mmol, 3.17 eq.), pyrrolidine (126.1 mg, 1.77 mmol, 5.00 eq.), and TMSCl (188.8 mg, 1.74 mmol, 4.90 eq.). The resulting solution was stirred for 2 h at rt. The resulting mixture was washed with water, dried over anhydrous sodium sulfate and concentrated under vacuum. The crude product was purified by flash-prep-HPLC to afford 169 mg of methyl 4-(4-cyano-2-methyl-5-oxo-5-((S)-3-(((((R)-2-phenyl-1-((3aS,4S,6S,7aR)-3a,5,5-trimethylhexahydro-4,6-methanobenzo [d][1,3,2]dioxaborol-2-yl)ethyl)carbamoyl)oxy)methyl)pyrrolidin-1-yl)pent-3-en-2-yl)piperazine-1-carboxylate as a light yellow oil.

Step 4

Following the procedure as in step 5 of Ex 95 ((R)-1-(((((S)-1-(2-cyano-4-(4-(methoxycarbonyl)piperazin-1-yl)-4-methylpent-2-enoyl)pyrrolidin-3-yl)methoxy)carbonyl)amino)-2-phenylethyl)boronic acid was prepared as a white solid. LC-MS m/z: 556 [M+1].

Examples 97 and 98

((R)-1-(((((S)-1-(2-cyano-4-methyl-4-((S)-3-oxotetrahydro-3H-oxazol[3,4-a]pyrazin-7(1H)-yl)pent-2-enoyl)piperidin-3-yl)oxy)carbonyl)amino)-2-phenylethyl)boronic acid (Example 97)

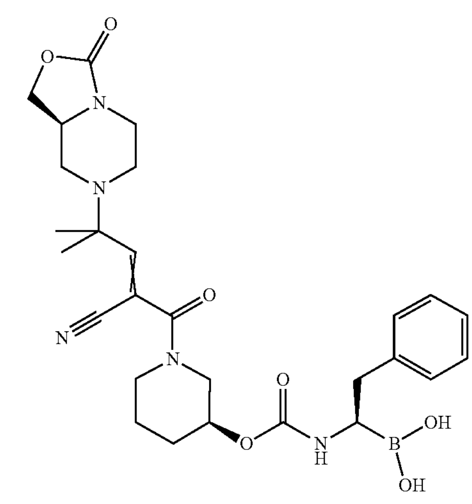 [SMILES: CC(C)(C=C(C#N)C(=O)N1CCC[C@H](OC(=O)N[C@@H](Cc2ccccc2)B(O)O)C1)N1CCN2C(=O)OC[C@@H]2C1]

((R)-1-(((((S)-1-(2-cyano-4-methyl-4-((R)-3-oxotetrahydro-3H-oxazol[3,4-a]pyrazin-7(1H)-yl)pent-2-enoyl)piperidin-3-yl)oxy)carbonyl)amino)-2-phenylethyl)boronic acid (Example 98)

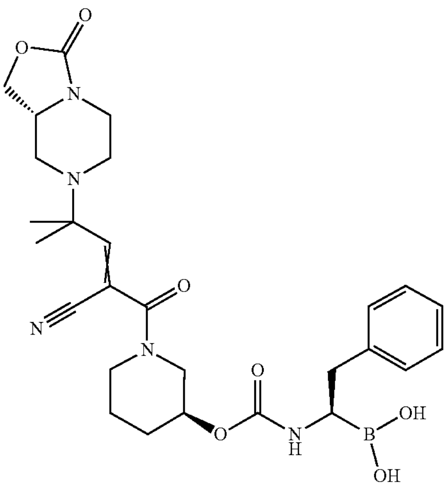 [SMILES: CC(C)(C=C(C#N)C(=O)N1CCC[C@H](OC(=O)N[C@@H](Cc2ccccc2)B(O)O)C1)N1CCN2C(=O)OC[C@H]2C1]

The title compounds of Ex 97 and 98 were prepared using the method described in example 80 but replacing 2-methyl-2-(4-methylpiperazin-1-yl)propanal with (S)-2-methyl-2-(3-oxotetrahydro-3H-oxazolo[3,4-a]pyrazin-7(1H)-yl)propanal and (R)-2-methyl-2-(3-oxotetrahydro-3H-oxazolo[3,4-a]pyrazin-7(1H)-yl)propanal respectively. LC-MS m/z: 536 [M-17] and 554 [M+1].

Example 99

((R)-1-(((((S)-1-(2-cyano-4-methyl-4-morpholinopent-2-enoyl)pyrrolidin-3-yl)methoxy)carbonyl)amino)-2-phenylethyl)boronic Acid

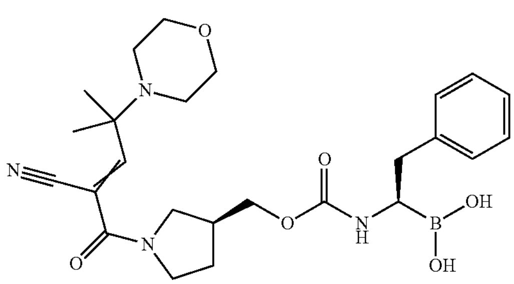 [SMILES: CC(C)(C=C(C#N)C(=O)N1CC[C@H](COC(=O)N[C@@H](Cc2ccccc2)B(O)O)C1)N1CCOCC1]

The title compound was prepared using the method in Ex 95. LC-MS m/z: 499 [M+1].

Example 100

((R)-1-(3-((S)-1-(2-cyano-4-(3,3-difluoropyrrolidin-1-yl)-4-methylpent-2-enoyl)pyrrolidin-3-yl)ureido)-2-phenylethyl)boronic Acid

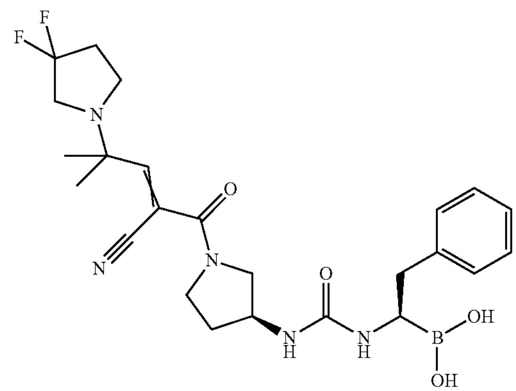 [SMILES: CC(C)(C=C(C#N)C(=O)N1CC[C@H](NC(=O)N[C@@H](Cc2ccccc2)B(O)O)C1)N1CCC(F)(F)C1]

Step 1

To a mixture of 2-cyano-4-(3,3-difluoropyrrolidin-1-yl)-4-methylpent-2-enoic acid (500 mg, 2.05 mmol) and (S)-tert-butyl pyrrolidin-3-ylcarbamate (458 mg, 2.46 mmol) in DCM (10 mL) was added HATU (935 mg, 2.46 mmol) and DIPEA (529 mg, 4.1 mmol) at 0° C. The mixture was warmed to rt and stirred for 4 h. The crude was purified by flash chromatography to afford 183 mg of (S)-tert-butyl (1-(2-cyano-4-(3, 3-difluoropyrrolidin-1-yl)-4-methylpent-2-enoyl) pyrrolidin-3-yl) carbamate as a light yellow oil.

Step 2

To a solution of (S)-tert-butyl (1-(2-cyano-4-(3, 3-difluoropyrrolidin-1-yl)-4-methylpent-2-enoyl) pyrrolidin-3-yl) carbamate (183 mg, 0.44 mmol) in 1 mL dioxane was added HCl (4N in dioxane) at rt, and the mixture was stirred for 2 h, then concentrated in vacuum to afford 255 mg of (R)-2-phenyl-1-((3aS,4S,6S,7aR)-3a,5,5-trimethylhexahydro-4,6-methanobenzo[d][1,3,2]dioxaborol-2-yl)ethan-1-amine hydrochloride as a white solid, which was used directly for next step.

Step 3

To a suspension of (R)-2-phenyl-1-((3aS,4S,6S,7aR)-3a,5,5-trimethylhexahydro-4,6-methanobenzo[d][1,3,2]dioxaborol-2-yl)ethan-1-amine hydrochloride (200 mg, 0.6 mmol) and DSC (230 mg, 0.9 mmol) in DCM (3 mL) was treated with DIPEA (0.78 g, 0.1 mmol) at -15° C. and stirred for 15 min. The mixture was diluted with water, extracted with DCM, dried over $Na_2SO_4$ and concentrated in vacuo. The residue was purified by prep-TLC to afford 170 mg (64%) of 2,5-dioxopyrrolidin-1-yl((R)-2-phenyl-1-((3aS,4S,6S,7aR)-3a,5,5-trimethylhexahydro-4,6-methanobenzo [d][1,3,2]dioxaborol-2-yl)ethyl)carbamate as a yellow oil.

Step 4

To a suspension of 2,5-dioxopyrrolidin-1-yl((R)-2-phenyl-1-((3aS,4S,6S,7aR)-3a,5,5-trimethylhexahydro-4,6- methanobenzo[d][1,3,2]dioxaborol-2-yl)ethyl)carbamate (193 mg, 0.44 mmol) and (S)-2-(3-aminopyrrolidine-1-carbonyl)-4-(3,3-difluoropyrrolidin-1-yl)-4-methylpent-2-enenitrile hydrochloride (152 mg, 0.44 mmol) in anhydrous acetonitrile (3 mL) was added dropwise DIPEA (284 mg, 2.2 mmol) at rt. The mixture was stirred for 2 h. The mixture then diluted with water, extracted with DCM (2×). The combined organic phase was washed with brine (3 mL), dried over $Na_2SO_4$, and concentrated in vacuo. The residue was purified by prep-TLC to afford 160 mg, (57%) of 1-((S)-1-(2-cyano-4-(3,3-difluoropyrrolidin-1-yl)-4-methylpent-2-enoyl)pyrrolidin-3-yl)-3-((R)-2-phenyl-1-((3 aS,4S,6S,7aR)-3a,5,5-trimethylhexahydro-4,6-methanobenzo[d][1,3,2]dioxaborol-2-yl)ethyl)urea as a colorless oil.

Step 5

To a solution of 1-((S)-1-(2-cyano-4-(3,3-difluoropyrrolidin-1-yl)-4-methylpent-2-enoyl)pyrrolidin-3-yl)-3-((R)-2-phenyl-1-((3aS,4S,6S,7aR)-3a,5,5-trimethylhexahydro-4,6-methanobenzo[d][1,3,2]dioxaborol-2-yl)ethyl)urea (160 mg, 0.25 mmol) in MeOH (2 mL) were added hexanes (2 mL) and 1N HCl (1 mL), followed by isobutyl boric acid (75 mg, 0.75 mmol). After stirring for 1 h the pH of the mixture was adjusted to 7 with aq. $NaHCO_3$ before the hexanes layer was discarded. The methanol layer was diluted with water (20 mL), then dried by lyophilization to give a crude product which was purified by prep-HPLC to afford 20 mg of ((R)-1-(3-((S)-1-(2-cyano-4-(3,3-difluoropyrrolidin-1-yl)-4-methylpent-2-enoyl)pyrrolidin-3-yl)ureido)-2-phenylethyl)boronic acid as a white solid. LC-MS m/z: 504 [M+1].

Example 101

((R)-1-(3-((R)-1-(2-cyano-4-(3,3-difluoropyrrolidin-1-yl)-4-methylpent-2-enoyl)piperidin-3-yl)ureido)-2-phenylethyl)boronic Acid

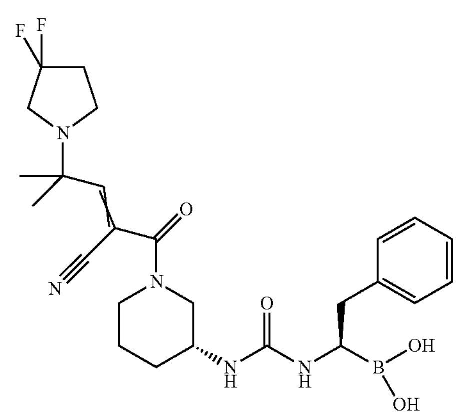 [SMILES: CC(C)(C=C(C#N)C(=O)N1CCC[C@@H](NC(=O)N[C@@H](Cc2ccccc2)B(O)O)C1)N1CCC(F)(F)C1]

The title compound was prepared by the method used in Ex 100, but replacing (S)-tert-butyl pyrrolidin-3-ylcarbamate with tert-butyl (R)-piperidin-3-ylcarbamate. LC-MS m/z: 518 [M+1].

Example 102

((R)-1-(((((3R,4R)-1-acryloyl-4-fluoropyrrolidin-3-yl)oxy)carbonyl)amino)-2-phenylethyl)boronic Acid

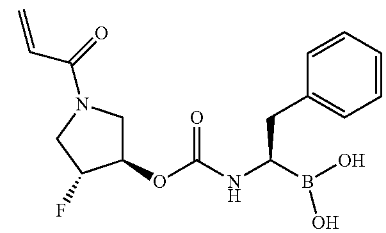 [SMILES: C=CC(=O)N1C[C@@H](F)[C@H](OC(=O)N[C@@H](Cc2ccccc2)B(O)O)C1]

Step 1

To a mixture of (3R,4R)-4-fluoropyrrolidin-3-ol hydrochloride (200 mg, 1.4 mmol) in THF (5 mL) and sat. $NaHCO_3$aq. (2 mL), was added dropwise acryloyl chloride (127 mg, 1.4 mmol) at rt. The mixture was stirred at rt for 1 h. The mixture was concentrated, and the crude was purified by column chromatography on silica gel, eluting with 50%-80% of ethyl acetate in petroleum ether to afford 120 mg (53%) 1-((3R,4R)-3-fluoro-4-hydroxypyrrolidin-1-yl)prop-2-en-1-one as a colorless oil.

Step 2

To a mixture of 1-((3R,4R)-3-fluoro-4-hydroxypyrrolidin-1-yl)prop-2-en-1-one (120 mg, 0.72 mmol) and DIPEA (208 mg, 1.44 mmol) in acetonitrile (5 mL) was added DSC (289 mg, 1.13 mmol) at rt. The mixture was stirred at rt for 2 h, then concentrated. The crude was purified by column chromatography on silica gel to afford 20 mg (8%) (3R,4R)-1-acryloyl-4-fluoropyrrolidin-3-yl (2,5-dioxopyrrolidin-1-yl) carbonate as a colorless oil.

Step 3

To a solution (3R,4R)-1-acryloyl-4-fluoropyrrolidin-3-yl (2,5-dioxopyrrolidin-1-yl) carbonate (20 mg, 0.07 mmol) in DCM (3 mL) was added dropwise a solution of (R)-2-phenyl-1-((3aS,4S,6S,7aR)-3a,5,5-trimethylhexahydro-4,6-methanobenzo[d][1,3,2]dioxaborol-2-yl)ethan-1-amine hydrochloride (24 mg, 0.07 mmol) and DIPEA (27 mg, 0.21 mmol) in DCM (2 mL) at rt. The resultant mixture was stirred for 1 h, then diluted with DCM, washed with brine, dried over $Na_2SO_4$, and concentrated in vacuo. The residue was purified by prep-TLC on silica gel, eluting with 2.5% of MeOH in DCM to afford 20 mg (58%) (3R,4R)-1-acryloyl-4-fluoropyrrolidin-3-yl ((R)-2-phenyl-1-((3aS,4S,6S,7aR)-3a,5,5-trimethylhexahydro-4,6-methanobenzo[d][1,3,2]dioxaborol-2-yl)ethyl)carbamate as a colorless oil.

Step 4

To a solution of (3R,4R)-1-acryloyl-4-fluoropyrrolidin-3-yl ((R)-2-phenyl-1-((3aS,4S,6S,7aR)-3a,5,5-trimethylhexahydro-4,6-methanobenzo[d][1,3,2]dioxaborol-2-yl)ethyl) carbamate (20 mg, 0.04 mmol) in MeOH (2 mL) were added hexanes (2 mL) and 1 N HCl (1 mL), followed by isobutyl boric acid (17 mg, 0.12 mmol). After stirring at rt for 1 h, the hexanes layer was discarded. The methanol layer was diluted with water (10 mL) and 1N $NaHCO_3$ aq. (1 mL), then dried over lyophilization to give a crude product which was purified by pre-HPLC to afford 2 mg of the title compound as a white solid. LC-MS m/z: 373 [M+23].

Example 103

((R)-1-(((((R)-1-(2-cyano-4-methyl-4-morpholino-pent-2-enoyl)azepan-3-yl)oxy)carbonyl)amino)-2-phenylethyl)boronic Acid

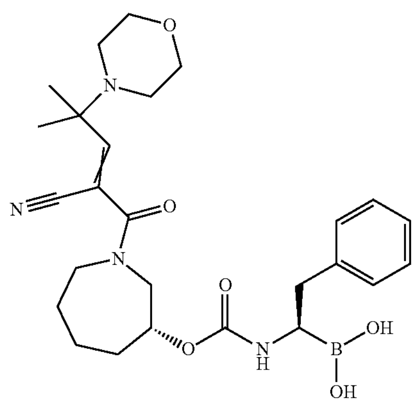 [SMILES: CC(C)(C=C(C#N)C(=O)N1CCCC[C@@H](OC(=O)N[C@@H](Cc2ccccc2)B(O)O)C1)N1CCOCC1]

Step 1

Into a 50-mL 3-necked round-bottom flask purged and maintained with an inert atmosphere of nitrogen, was placed tert-butyl 3-hydroxyazepane-1-carboxylate (500 mg, 2.32 mmol, 1.0 eq.), DCM (16 mL) and pyridine (552 mg, 6.98 mmol, 3.0 eq.). The mixture was stirred and cooled to 0° C. A solution of ditrichloromethyl carbonate (345 mg, 1.16 mmol, 0.50 eq.) in DCM (4 mL) was added dropwise. The resulting mixture was stirred for 2 h at 0° C. and used directly in the next step.

Step 2

Into a 100-mL 3-necked round-bottom flask purged and maintained with an inert atmosphere of nitrogen, was placed (1R)-2-phenyl-1-[(1S,2S,6R,8S)-2,9,9-trimethyl-3,5-dioxa-4-boratricyclo[6.1.1.0^[2,6]]decan-4-yl]ethan-1-amine hydrochloride (702 mg, 2.09 mmol, 1.0 eq.), DCM (20 mL) and pyridine (1654 mg, 20.91 mmol, 10.0 eq.). The mixture was stirred and cooled to 0° C. A solution of tert-butyl 3-[(chlorocarbonyl)oxy]azepane-1-carboxylate (645 mg, 2.32 mmol, 1.1 eq.) in DCM was added dropwise, and the resulting mixture was warmed to rt and stirred for 1 h. The resulting solution was washed with brine (40 mL). The organic layer was dried over anhydrous sodium sulfate and concentrated under vacuum. The crude product was purified by prep-HPLC with the following conditions: Column, C18 silica gel; mobile phase, $H_2O$:$CH_3CN$ (19:1) increasing to 100% $CH_3CN$ within 45 min; Detector, UV 220 nm. This resulted in 700 mg (61.9%) of tert-butyl 3-([[(1R)-2-phenyl-1-[(1S,2S,6R,8S)-2,9,9-trimethyl-3,5-dioxa-4-boratricyclo[6.1.1.0^[2,6]]decan-4-yl]ethyl]carbamoyl]oxy)azepane-1-carboxylate as a light yellow solid.

Step 3

Into a 100-mL round-bottom flask, was placed tert-butyl 3-([[(1R)-2-phenyl-1-[(1S,2S,6R,8S)-2,9,9-trimethyl-3,5-dioxa-4-boratricyclo[6.1.1.0^[2,6]]decan-4-yl]ethyl]carbamoyl]oxy)azepane-1-carboxylate (700 mg, 1.30 mmol, 1.0 eq.), DCM (15 mL), and 2,2,2-trifluoroacetaldehyde (3 mL). The resulting mixture was stirred for 30 min at rt and then concentrated under vacuum. This resulted in 570 mg (99.9%) of azepan-3-yl N-[(1R)-2-phenyl-1-[(1S,2S,6R,8S)-2,9,9-trimethyl-3,5-dioxa-4-boratricyclo[6.1.1.0^[2,6]]decan-4-yl]ethyl]carbamate as a yellow oil.

Step 4

Into a 100-mL round-bottom flask purged and maintained with an inert atmosphere of nitrogen, was placed azepan-3-yl N-[(1R)-2-phenyl-1-[(1S,2S,6R,8S)-2,9,9-trimethyl-3,5-dioxa-4-boratricyclo[6.1.1.0^[2,6]]decan-4-yl]ethyl]carbamate (570 mg, 1.29 mmol, 1.0 eq.), 2-cyanoacetic acid (165 mg, 1.94 mmol, 1.5 eq.), DCM (17 mL), DIPEA (503 mg, 3.89 mmol, 3.0 eq.) and HATU (738 mg, 1.94 mmol, 1.5 eq.). The resulting mixture was stirred for 30 min at rt. The resulting solution was diluted with DCM and washed with 10% aq. sodium chloride solution. The organic layer was dried over anhydrous sodium sulfate and concentrated under vacuum. The crude product was purified by flash-prep-HPLC with the following conditions: Column, C18 silica gel; mobile phase, $H_2O$:$CH_3CN$ (19:1) increasing to 100% $CH_3CN$ within 40 min; Detector, UV 220 nm. This resulted in 560 mg (85%) of 1-(2-cyanoacetyl)azepan-3-ylN-[(1R)-2-phenyl-1-[(1S,2S,6R,8S)-2,9,9-trimethyl-3,5-dioxa-4-boratricyclo[6.1.1.0^[2,6]]decan-4-yl]ethyl]carbamate as a light yellow solid.

Step 5

1-(2-Cyanoacetyl)azepan-3-ylN-[(1R)-2-phenyl-1-[(1S,2S,6R,8S)-2,9,9-trimethyl-3,5-dioxa-4-boratricyclo[6.1.1.0^[2,6]]decan-4-yl]ethyl]carbamate (560 mg, 1.10 mmol) was purified by Prep-SFC with the following conditions: Column: Lux 5 um Cellulose-4, 5*25 cm, 5 um; Mobile Phase A: CO2:50, Mobile Phase B: EtOH—preparative grade:50; Flow rate: 180 mL/min; UV: 220 nm; RT: 3.94 min. This resulted in 170 mg (30.36%) of (R)-1-(2-cyanoacetyl)azepan-3-yl ((R)-2-phenyl-1-((3aS,4S,6S,7aR)-3a,5,5-trimethylhexahydro-4,6-methanobenzo[d][1,3,2]dioxaborol-2-yl)ethyl)carbamate (first eluting peak) as a light yellow solid. The stereochemistry was assigned by correlation with the compound made from the single isomer of tert-butyl (R)-3-hydroxyazepane-1-carboxylate, prepared by literature method (Org. Process Res. Dev. 2013, 17, 1568-1571).

Step 6

Into a 100-mL round-bottom flask purged and maintained with an inert atmosphere of nitrogen, was placed (R)-1-(2-cyanoacetyl)azepan-3-yl ((R)-2-phenyl-1-((3aS,4S,6S,7aR)-3a,5,5-trimethylhexahydro-4,6-methanobenzo[d][1,3,2]dioxaborol-2-yl)ethyl)carbamate (170 mg, 0.34 mmol, 1.0 eq.), 2-methyl-2-(morpholin-4-yl)propanal (158 mg, 1.01 mmol, 3.0 eq.), DCM (17 mL), pyrrolidine (120 mg, 1.69 mmol, 5.0 eq.), and TMSCl (182 mg, 1.68 mmol, 5.0 eq.). The resulting mixture was stirred for 2 h at rt. The resulting solution was diluted with DCM and washed with brine. The organic layer was dried over anhydrous sodium sulfate and concentrated under vacuum. The crude product was purified by flash-prep-HPLC to afford 200 mg (92%) of (R)-1-(2-cyano-4-methyl-4-morpholinopent-2-enoyl)azepan-3-yl ((R)-2-phenyl-1-((3aS,4S,6S,7aR)-3a,5,5-trimethylhexahydro-4,6-methanobenzo [d][1,3,2]dioxaborol-2-yl)ethyl) carbamate as a light yellow solid.

Step 7

Into a 50-mL round-bottom flask, was placed (R)-1-(2-cyano-4-methyl-4-morpholinopent-2-enoyl)azepan-3-yl ((R)-2-phenyl-1-((3aS,4S,6S,7aR)-3a,5,5-trimethylhexahydro-4,6-methanobenzo[d][1,3,2]dioxaborol-2-yl)ethyl) carbamate (200 mg, 0.31 mmol, 1 eq.), (2-methylpropyl) boronic acid (95 mg, 0.93 mmol, 3.0 eq.), methanol (4 mL), hexane (4 mL), and 1N HCl (1.9 mL, 1.90 mmol, 6 eq.). The resulting mixture was stirred for 1 h at rt. The two layers were separated. The methanol layer was diluted with water (10 mL) and extracted with hexane (2×10 mL). The aqueous layer was dried over lyophilization to give a crude product, which was purified by prep-HPLC with the following conditions: Column: XBridge Prep OBD C18 Column 30×150 mm 5 um; Mobile Phase A: Water (10 mmol/L $NH_4HCO_3$+0.1% $NH_3.H_2O$), Mobile Phase B: ACN; Flow rate: 60 mL/min; Gradient: 25% B to 40% B in 7 min; UV: 220/254 nm; Rt: 6.72 min. This resulted in 87.9 mg of the title compound. LC-MS m/z: 513 [M+1].

Example 104

((R)-1-(((((S)-1-(2-cyano-4-methyl-4-morpholinopent-2-enoyl)azepan-3-yl)oxy)carbonyl)amino)-2-phenylethyl)boronic Acid

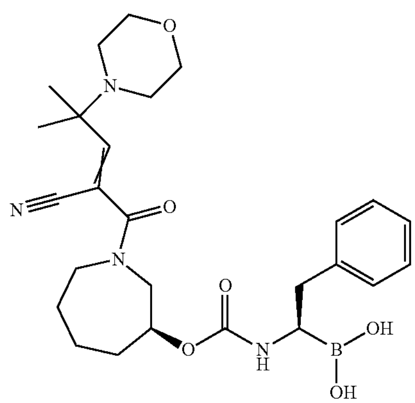 [SMILES: CC(C)(C=C(C#N)C(=O)N1CCCC[C@H](OC(=O)N[C@@H](Cc2ccccc2)B(O)O)C1)N1CCOCC1]

The title compound was prepared from the second eluting isomer in step 5 of Ex 103, (S)-1-(2-cyanoacetyl)azepan-3-yl ((R)-2-phenyl-1-((3aS,4S,6S,7aR)-3a,5,5-trimethylhexahydro-4,6-methanobenzo[d][1,3,2]dioxaborol-2-yl)ethyl) carbamate. LC-MS m/z: 513 [M+1].

Example 105

((R)-1-(((((R)-1-(2-cyano-4-(3,3-difluoropyrrolidin-1-yl)-4-methylpent-2-enoyl)azepan-3-yl)oxy)carbonyl)amino)-2-phenylethyl)boronic Acid

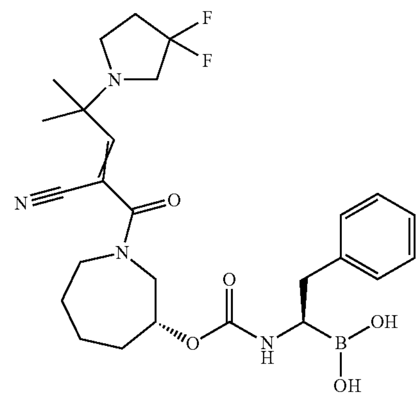 [SMILES: CC(C)(C=C(C#N)C(=O)N1CCCC[C@@H](OC(=O)N[C@@H](Cc2ccccc2)B(O)O)C1)N1CCC(F)(F)C1]

Into a 50-mL round-bottom flask, was placed (R)-1-(2-cyanoacetyl)azepan-3-yl ((R)-2-phenyl-1-((3aS,4S,6S,7aR)-3a,5,5-trimethylhexahydro-4,6-methanobenzo[d][1,3,2]dioxaborol-2-yl)ethyl)carbamate (first eluting isomer, Ex 103) (100 mg, 0.20 mmol, 1 eq.), DCM (5 mL), 2-(3,3-difluoropyrrolidin-1-yl)-2-methylpropanal (104.8 mg, 0.59 mmol, 3 eq.), pyrrolidine (70.1 mg, 0.99 mmol, 5 eq.), and TMSCl (107.0 mg, 0.99 mmol, 5 eq.). The resulting solution was stirred for 2-3 h at rt. The reaction was then quenched by the addition of water (15 mL). The resulting mixture was washed with sat. NaCl (1×15 mL), then dried over anhydrous sodium sulfate. The residue was purified by reverse flash chromatography with the following conditions: column, C18 silica gel; mobile phase, $CH_3CN$ in water, 5% to 100% gradient in 20 min; detector, UV 220 nm. This resulted in 110 mg (75.36%) of 1-[2-cyano-2-[2-(3,3-difluoropyrrolidin-1-yl)-2-methylpropylidene]acetyl]azepan-3-ylN-[(1R)-2-phenyl-1-[(1S,2S,6R,8S)-2,9,9-trimethyl-3,5-dioxa-4-boratricyclo[6.1.1.0^[2,6]]decan-4-yl]ethyl] carbamate as a white solid.

Hydrolysis of the boronate as in step 7 of Ex 103, afforded 39 mg of the title compound. LC-MS m/z: 533 [M+1].

Example 106

((R)-1-(((((S)-1-(2-cyano-4-(3,3-difluoropyrrolidin-1-yl)-4-methylpent-2-enoyl)azepan-3-yl)oxy)carbonyl)amino)-2-phenylethyl)boronic Acid

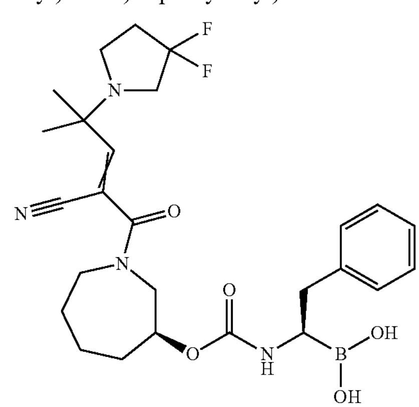

Proceeding from (S)-1-(2-cyanoacetyl)azepan-3-yl ((R)-2-phenyl-1-((3aS,4S,6S,7aR)-3a,5,5-trimethylhexahydro-4,6-methanobenzo[d][1,3,2]dioxaborol-2-yl)ethyl)carbamate (second eluting isomer, Ex 103) as in Ex 105 afforded the title compound. LC-MS m/z: 533 [M+1].

Example 107

((R)-1-(((((R)-1-(2-cyano-4-(4-(methoxycarbonyl) piperazin-1-yl)-4-methylpent-2-enoyl)azepan-3-yl) oxy)carbonyl)amino)-2-phenylethyl)boronic Acid

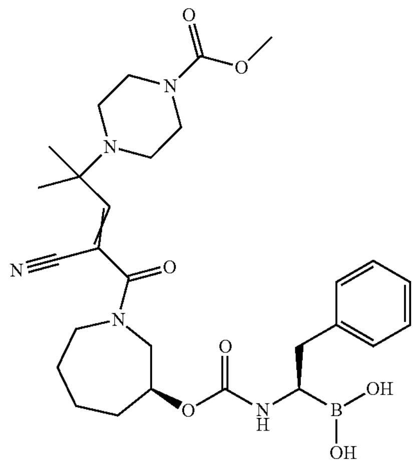 [SMILES: COC(=O)N1CCN(C(C)(C)C=C(C#N)C(=O)N2CCCC[C@H](OC(=O)N[C@@H](Cc3ccccc3)B(O)O)C2)CC1]

Into a 100-mL round-bottom flask purged and maintained with an inert atmosphere of nitrogen, was placed (R)-1-(2-cyanoacetyl)azepan-3-yl ((R)-2-phenyl-1-((3aS,4S,6S,7aR)-3a,5,5-trimethylhexahydro-4,6-methanobenzo[d][1,3,2]dioxaborol-2-yl)ethyl)carbamate (first eluting isomer, Ex 103) (200 mg, 0.39 mmol, 1.0 eq.), methyl 4-(2-methyl-1-oxopropan-2-yl)piperazine-1-carboxylate (254 mg, 1.19 mmol, 3.0 eq.), DCM (20 mL), pyrrolidine (141 mg, 1.98 mmol, 5.0 eq.), and chlorotrimethylsilane (214 mg, 1.97 mmol, 5.0 eq.). The resulting mixture was stirred for 2 h at rt. The resulting solution was diluted with DCM (20 mL) and washed with brine (40 mL). The organic layer was dried over anhydrous sodium sulfate and concentrated under vacuum. The crude product was purified by flash-prep-HPLC with the following conditions: Column, C18 silica gel; mobile phase, $H_2O:CH_3CN$ (19:1) increasing to 100% $CH_3CN$ within 45 min; Detector, UV 220 nm. This resulted in 210 mg (75.72%) of methyl 4-[4-cyano-2-methyl-4-[3-([[(1R)-2-phenyl-1-[(1S,2S,6R,8S)-2,9,9-trimethyl-3,5-dioxa-4-boratricyclo[6.1.1.0^[2,6]]decan-4-yl]ethyl]carbamoyl]oxy)azepane-1-carbonyl]but-3-en-2-yl]piperazine-1-carboxylate (first peak) as a light yellow solid. Proceeding as in Step 7 of Ex 103 afforded the 60 mg of the title compound. LC-MS m/z: 570 [M+1].

Example 108

((R)-1-(((((S)-1-(2-cyano-4-(4-(methoxycarbonyl) piperazin-1-yl)-4-methylpent-2-enoyl)azepan-3-yl) oxy)carbonyl)amino)-2-phenylethyl)boronic Acid

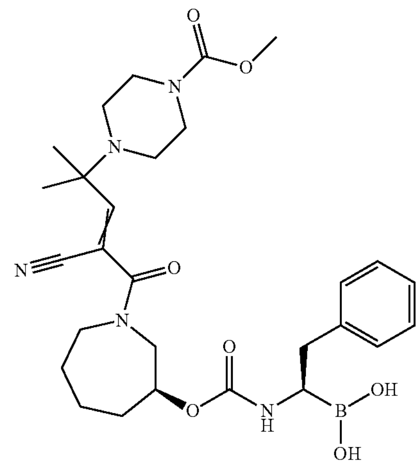 [SMILES: COC(=O)N1CCN(C(C)(C)C=C(C#N)C(=O)N2CCCC[C@H](OC(=O)N[C@@H](Cc3ccccc3)B(O)O)C2)CC1]

Proceeding from (S)-1-(2-cyanoacetyl)azepan-3-yl ((R)-2-phenyl-1-((3aS,4S,6S,7aR)-3a,5,5-trimethylhexahydro-4,6-methanobenzo[d][1,3,2]dioxaborol-2-yl)ethyl)carbamate (second eluting isomer, Ex 103) as in Ex 107 afforded the title compound. LC-MS m/z: 570 [M+1].

Example 109

((R)-1-(((((3S,4S)-1-(2-cyano-4-(3,3-difluoropyrrolidin-1-yl)-4-methylpent-2-enoyl)-4-fluoropyrrolidin-3-yl)oxy)carbonyl)amino)-2-phenylethyl)boronic Acid

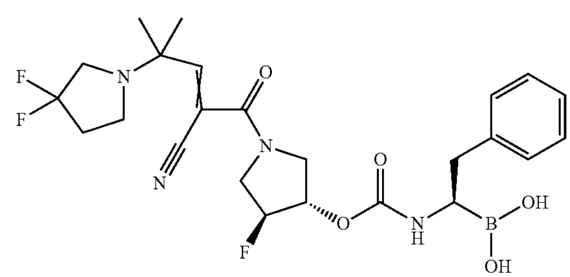 [SMILES: CC(C)(C=C(C#N)C(=O)N1C[C@H](OC(=O)N[C@@H](Cc2ccccc2)B(O)O)[C@@H](F)C1)N1CCC(F)(F)C1]

Step 1

To a mixture of 2-cyano-4-(3, 3-difluoropyrrolidin-1-yl)-4-methylpent-2-enoic acid (0.48 g, 1.4 mmol) and (3S,4S)-4-fluoropyrrolidin-3-ol hydrochloride (200 mg, 1.4 mmol) in DCM (5 mL) was added HATU (0.54 g, 1.4 mmol) at 0° C. The mixture was warmed to rt and stirred for 16 h. The crude was purified by prep-TLC on silica gel, eluting with 2.5% of MeOH in DCM to afford 200 mg 4-(3,3-difluoropyrrolidin-1-yl)-2-((3S,4S)-3-fluoro-4-hydroxypyrrolidine-1-carbonyl)-4-methylpent-2-enenitrile as a yellow oil.

Step 2

To a mixture of –4-(3,3-difluoropyrrolidin-1-yl)-2-((3S,4S)-3-fluoro-4-hydroxypyrrolidine-1-carbonyl)-4-methylpent-2-enenitrile (200 mg, 0.6 mmol) and DIPEA (234 mg, 1.8 mmol) in acetonitrile (5 mL) was added DSC (232 mg, 0.9 mmol) at rt. The mixture was stirred at rt for 2 h. The crude was purified by prep-TLC on silica gel, eluting with 100% of EA to afford 160 mg of (3S,4S)-1-(2-cyano-4-(3,3-difluoropyrrolidin-1-yl)-4-methylpent-2-enoyl)-4-fluoropyrrolidin-3-yl 2,5-dioxopyrrolidine-1-carboxylate as a colorless oil.

Step 3

To a solution of (3S,4S)-1-(2-cyano-4-(3,3-difluoropyrrolidin-1-yl)-4-methylpent-2-enoyl)-4-fluoropyrrolidin-3-yl 2,5-dioxopyrrolidine-1-carboxylate (160 mg, 0.34 mmol) in DCM (3 mL) was added dropwise a solution of (R)-2-phenyl-1-((3aS,4S,6S,7aR)-3a,5,5-trimethylhexahydro-4,6-methanobenzo[d][1,3,2]dioxaborol-2-yl)ethan-1-amine hydrochloride (114 mg, 0.34 mmol) and DIPEA (131 mg, 1.02 mmol) in DCM (2 mL) at rt. The resulted mixture was stirred at rt for 1 h, then diluted with DCM (20 mL), washed with brine (5 mL), dried over $Na_2SO_4$, concentrated in vacuo. The residue was purified by prep-TLC on silica gel, eluting with 2.5% of MeOH in DCM to afford 120 mg of (3S,4S)-1-(2-cyano-4-(3,3-difluoropyrrolidin-1-yl)-4-methylpent-2-enoyl)-4-fluoropyrrolidin-3-yl ((R)-2-phenyl-1-((3aS,4S,6S,7aR)-3a,5,5-trimethylhexahydro-4,6-methanobenzo[d][1,3,2]dioxaborol-2-yl)ethyl)carbamate as a colorless oil.

Step 4

Following the procedure in step 4 of Ex 102 afforded 37 mg of the title compound. LC-MS m/z: 523 [M+1].

Example 110

((R)-1-(((((3S,4S)-1-acryloyl-4-fluoropyrrolidin-3-yl)oxy)carbonyl)amino)-2-phenylethyl)boronic Acid

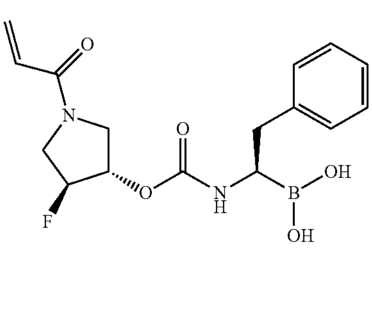 [SMILES: C=CC(=O)N1C[C@H](OC(=O)N[C@@H](Cc2ccccc2)B(O)O)[C@@H](F)C1]

The title compound was prepared proceeding as in Ex 102 but starting with (3S,4S)-4-fluoropyrrolidin-3-ol hydrochloride. LC-MS m/z: 373 [M+23].

Example 111

((R)-1-(((((3R,4S)-1-(2-cyano-4-(3,3-difluoropyrrolidin-1-yl)-4-methylpent-2-enoyl)-4-fluoropyrrolidin-3-yl)oxy)carbonyl)amino)-2-phenylethyl)boronic Acid

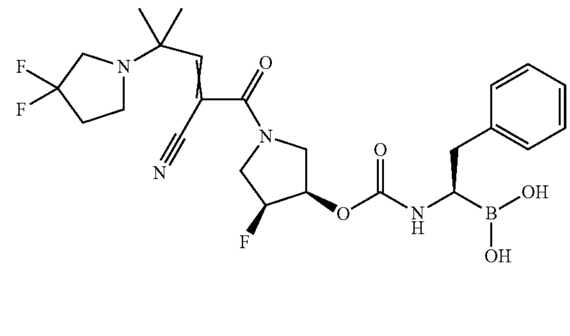 [SMILES: CC(C)(C=C(C#N)C(=O)N1C[C@H](F)[C@H](OC(=O)N[C@@H](Cc2ccccc2)B(O)O)C1)N1CCC(F)(F)C1]

The title compound was prepared following the procedure in Ex 109 but starting with (3R,4S)-4-fluoropyrrolidin-3-ol hydrochloride. LC-MS m/z: 523 [M+1].

Example 112

((R)-1-(3-((S)-1-(2-cyano-4-(3,3-difluoropyrrolidin-1-yl)-4-methylpent-2-enoyl)piperidin-3-yl)ureido)-2-phenylethyl)boronic Acid

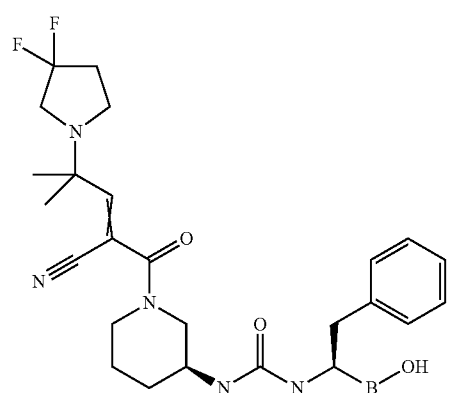

The title compound was prepared by the method used in Ex 101. LC-MS m/z: 518 [M+1].

Example 113

((R)-1-(((((3R,4R)-1-(2-cyano-4-(3,3-difluoropyrrolidin-1-yl)-4-methylpent-2-enoyl)-4-fluoropyrrolidin-3-yl)oxy)carbonyl)amino)-2-phenylethyl)boronic Acid

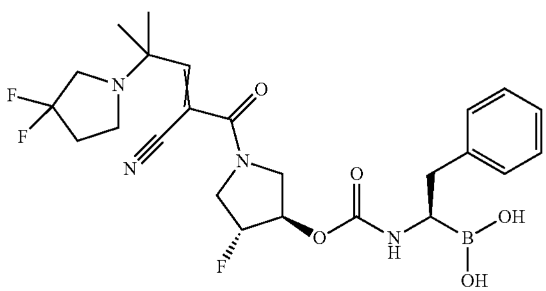 [SMILES: CC(C)(C=C(C#N)C(=O)N1C[C@@H](F)[C@H](OC(=O)N[C@@H](Cc2ccccc2)B(O)O)C1)N1CCC(F)(F)C1]

The title compound was prepared following the procedure in Ex 109 but starting with (3R,4R)-4-fluoropyrrolidin-3-ol hydrochloride. LC-MS m/z: 523 [M+1].

Example 114

((R)-1-((((7-(2-cyano-4-((2S,6R)-2,6-dimethylmorpholino)-4-methylpent-2-enoyl)-7-azabicyclo[2.2.1]heptan-1-yl)methoxy)carbonyl)amino)-2-phenylethyl)boronic Acid

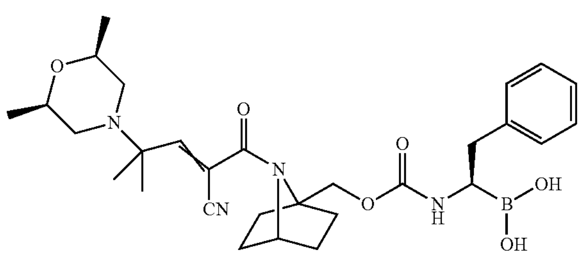 [SMILES: C[C@@H]1CN(C(C)(C)C=C(C#N)C(=O)N2C3CCC2(COC(=O)N[C@@H](Cc2ccccc2)B(O)O)CC3)C[C@H](C)O1]

Step 1

Into a 100-mL 3-necked round-bottom flask purged and maintained with an inert atmosphere of nitrogen, was placed tert-butyl 1-(hydroxymethyl)-7-azabicyclo[2.2.1]heptane-7-carboxylate (470 mg, 2.068 mmol, 1 eq.), DCM (10 mL), and DIPEA (802 mg, 6.20 mmol, 3.00 eq.). This was followed by the addition of a solution of ditrichloromethyl carbonate (490 mg, 1.65 mmol, 0.80 eq.) in DCM (2 mL) dropwise with stirring at 0° C. To this was added a solution of DMAP (126 mg, 1.03 mmol, 0.50 eq.) in DCM (1 mL) at 0° C. The resulting solution was stirred for 2 h at 0° C. and used directly to the next step.

Step 2

Into a 100-mL 3-necked round-bottom flask purged and maintained with an inert atmosphere of nitrogen, was placed (1R)-2-phenyl-1-[(1S,2S,6R,8S)-2,9,9-trimethyl-3,5-dioxa-4-boratricyclo[6.1.1.0^[2,6]]decan-4-yl]ethan-1-amine hydrochloride (683 mg, 2.04 mmol, 1.00 eq.), DCM (10 mL), and DIPEA (789 mg, 6.1 mmol, 3.00 eq.). This was followed by the addition of the solution of tert-butyl 1-[[(chlorocarbonyl)oxy]methyl]-7-azabicyclo[2.2.1]heptane-7-carboxylate from step 1 in DCM (10 mL) dropwise with stirring at 0° C. The resulting solution was stirred for 1 h at rt. The resulting mixture was washed with water, the mixture was dried over anhydrous sodium sulfate and concentrated under vacuum. The crude product was purified by column chromatography to afford 700 mg of tert-butyl 1-[([[(1R)-2-phenyl-1-[(1S,2S,6R,8S)-2,9,9-trimethyl-3,5-dioxa-4-boratricyclo[6.1.1.0^[2,6]]decan-4-yl]ethyl]carbamoyl]oxy)methyl]-7-azabicyclo[2.2.1]heptane-7-carboxylate as a light yellow solid.

Step 3

Into a 250-mL round-bottom flask, was placed tert-butyl 1-[([[(1R)-2-phenyl-1-[(1S,2S,6R,8S)-2,9,9-trimethyl-3,5-dioxa-4-boratricyclo[6.1.1.0^[2,6]]decan-4-yl]ethyl]carbamoyl]oxy)methyl]-7-azabicyclo[2.2.1]heptane-7-carboxylate (1.43 g, 2.6 mmol, 1 eq.), DCM (30 mL), and TFA (5 mL). The resulting solution was stirred for 1 h at rt. The resulting mixture was concentrated under vacuum. This resulted in 1.15 g of (7-azabicyclo[2.2.1]heptan-1-yl)methyl ((R)-2-phenyl-1-((3aS,4S,6S,7aR)-3a,5,5-trimethylhexahydro-4,6-methanobenzo[d][1,3,2]dioxaborol-2-yl)ethyl) carbamate as a yellow oil.

Step 4

Into a 250-mL round-bottom flask, was placed (7-azabicyclo[2.2.1]heptan-1-yl)methyl ((R)-2-phenyl-1-((3aS,4S,6S,7aR)-3a,5,5-trimethylhexahydro-4,6-methanobenzo [d][1,3,2]dioxaborol-2-yl)ethyl)carbamate (1.15 g, 2.54 mmol), DCM (30 mL), DIPEA (1.31 g, 10.1 mmol), 2-cyanoacetic acid (0.43 g, 5.0 mmol), and HATU (2.90 g, 7.6 mmol). The resulting solution was stirred for 1 h at rt. The resulting mixture was washed with water (1×30 mL). The mixture was dried over anhydrous sodium sulfate and concentrated under vacuum. The crude product was purified by prep-HPLC to afford 900 mg of (7-(2-cyanoacetyl)-7-azabicyclo[2.2.1]heptan-1-yl)methyl ((R)-2-phenyl-1-((3aS,4S,6S,7aR)-3a,5,5-trimethylhexahydro-4,6-methanobenzo[d][1,3,2]dioxaborol-2-yl)ethyl)carbamate as a yellow solid.

Step 5

Into a 100-mL round-bottom flask, was placed 2-bromo-2-methylpropanal (1.97 g, 13 mmol, 1.50 eq.), ethoxyethane (20 mL), (2S,6R)-2,6-dimethylmorpholine (1 g, 8.68 mmol, 1 eq.), and TEA (2.6 g, 26 mmol, 2.96 eq.). The resulting solution was stirred for 3 days at rt. The resulting mixture was washed with water (1×20 mL). The resulting solution was extracted with ethyl acetate (3×20 mL), and the organic layers combined and dried over anhydrous sodium sulfate. The residue was applied onto a silica gel column with ethyl acetate:petroleum ether (1:10). This resulted in 1.5 g (93.25%) of 2-[(2R,6S)-2,6-dimethylmorpholin-4-yl]-2-methylpropanal as a light yellow oil.

Step 6

Into a 50-mL round-bottom flask, was placed (7-(2-cyanoacetyl)-7-azabicyclo[2.2.1]heptan-1-yl)methyl ((R)-2-phenyl-1-((3aS,4S,6S,7aR)-3a,5,5-trimethylhexahydro-4,6-methanobenzo[d][1,3,2]dioxaborol-2-yl)ethyl)carbamate (160 mg, 0.31 mmol, 1 eq.), DCM (4 mL), 2-[(2R,6S)-2,6- dimethylmorpholin-4-yl]-2-methylpropanal (171.20 mg, 0.924 mmol, 3.0 eq.), pyrrolidine (219 mg, 3.08 mmol, 10 eq.), and TMSCl (334 mg, 3.08 mmol, 10 eq.). The resulting solution was stirred for 1 h at rt. The resulting mixture was washed with water (1×10 mL). The mixture was dried over anhydrous sodium sulfate and concentrated under vacuum. The crude product was purified by flash-prep-HPLC with the following conditions: Column, C18 silica gel; mobile phase, ACN:$H_2O$ (5:95) increasing to ACN:$H_2O$ (100:0) within 45 min; Detector, 220 nm. This resulted in 133 mg of (7-(2-cyano-4-((2S,6R)-2,6-dimethylmorpholino)-4-methylpent-2-enoyl)-7-azabicyclo[2.2.1]heptan-1-yl)methyl ((R)-2-phenyl-1-((3aS,4S,6S,7aR)-3a,5,5-trimethylhexahydro-4,6-methanobenzo[d][1,3,2]dioxaborol-2-yl)ethyl)carbamate as a light yellow solid.

Step 7

Into a 100-mL round-bottom flask, was placed (7-(2-cyano-4-((2S,6R)-2,6-dimethylmorpholino)-4-methylpent-2-enoyl)-7-azabicyclo[2.2.1]heptan-1-yl)methyl ((R)-2-phenyl-1-((3aS,4S,6S,7aR)-3a,5,5-trimethylhexahydro-4,6-methanobenzo[d][1,3,2]dioxaborol-2-yl)ethyl)carbamate (150 mg, 0.22 mmol, 1 eq.), MeOH (4 mL), (2-methylpropyl)boronic acid (66.8 mg, 0.655 mmol, 3.00 eq.), hexane (4 mL), and 1N HCl (4 mL). The resulting solution was stirred for 1 h at rt. The hexane layer was discarded. The methanol layer was diluted with water (25 mL), and dried over lyophilization to give a crude product. The crude product was purified by prep-HPLC with the following conditions: Column, XBridge Prep OBD C18 Column, 30*150 mm, 5 um; mobile phase, Water (10 mmol/L $NH_4HCO_3$+0.1% $NH_3.H_2O$) and ACN (20% PhaseB up to 40% in 8 min); Detector, UV 254/220 nm to afford 62.3 mg of the title compound as a white solid. LC-MS m/z: 553 [M+1].

Example 115

((R)-1-(((((3R,4S)-1-acryloyl-4-fluoropyrrolidin-3-yl)oxy)carbonyl)amino)-2-phenylethyl)boronic Acid

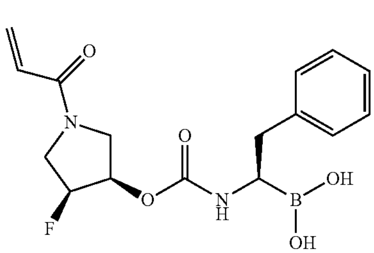 [SMILES: C=CC(=O)N1C[C@H](F)[C@H](OC(=O)N[C@@H](Cc2ccccc2)B(O)O)C1]

The title compound was prepared proceeding as in Ex 102 but starting with (3R,4S)-4-fluoropyrrolidin-3-ol hydrochloride. LC-MS m/z: 373 [M+23].

Example 116

(R)-(1-((((7-(2-cyano-4-methyl-4-(4-oxa-7-azaspiro[2.5]octan-7-yl)pent-2-enoyl)-7-azabicyclo[2.2.1]heptan-1-yl)methoxy)carbonyl)amino)-2-phenylethyl)boronic Acid

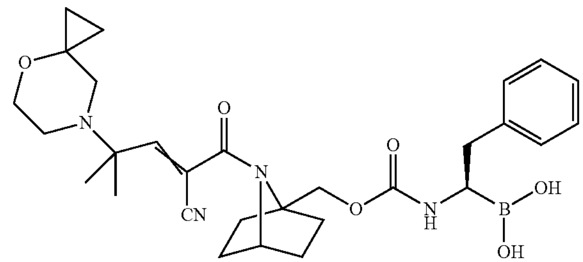 [SMILES: CC(C)(C=C(C#N)C(=O)N1C2CCC1(COC(=O)N[C@@H](Cc1ccccc1)B(O)O)CC2)N1CCOC2(CC2)C1]

The title compound was prepared proceeding as in Ex 114 but starting with 4-oxa-7-azaspiro[2.5]octane in place of (2S,6R)-2,6-dimethylmorpholine. LC-MS m/z: 551(M+1).

Example 117

((R)-1-(((((S)-1-(2-cyano-4-(3,3-difluoropyrrolidin-1-yl)-4-methylpent-2-enoyl)piperidin-3-yl)oxy)carbonyl)amino)-2-(cyclopent-1-en-1-yl)ethyl)boronic Acid

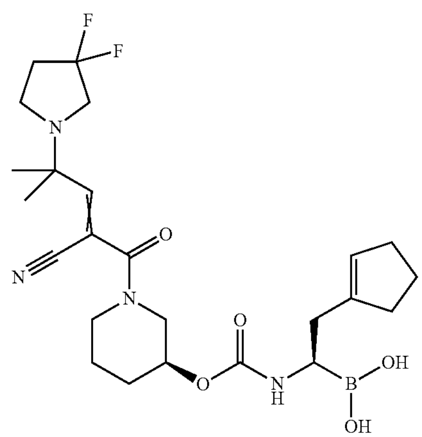 [SMILES: CC(C)(C=C(C#N)C(=O)N1CCC[C@H](OC(=O)N[C@@H](CC2=CCCC2)B(O)O)C1)N1CCC(F)(F)C1]

Step 1

Into a 500-mL 3-necked round-bottom flask containing tert-butyl acetate (30 g, 258.0 mmol, 1 equiv) and THF (120.0 mL) was added LDA (2M in THF) (129.0 mL, 129 mmol, 1 equiv) dropwise with stirring at -60° C. The resulting solution was stirred for 30 min at -60° C. To this was added cyclopentanone (18.0 g, 214.36 mmol, 0.83 equiv) dropwise with stirring at -60° C. The resulting solution was allowed to stir for an additional 1 hr at -60° C. The reaction was then quenched by the addition of 20 mL of saturated aqueous $NH_4Cl$ and allowed to warm to room temperature. The resulting mixture was partitioned between 150 mL ethyl acetate and 150 mL water. The organic layer was dried over anhydrous sodium sulfate and concentrated.

The residue was purified by silica gel chromatography to produce 30.0 g of tert-butyl 2-(1-hydroxycyclopentyl)acetate as a yellow liquid.

Step 2

Into a 1000-mL round-bottom flask containing tert-butyl 2-(1-hydroxycyclopentyl) acetate (30.0 g, 149.79 mmol, 1 equiv) and THF (300 mL) at 0° C. was added $LiAlH_4$ (17.06 g, 449.49 mmol, 3.0 equiv). The resulting solution was allowed to warm and stir at room temperature overnight. The reaction was then quenched by the addition of 17.0 mL water, 17.0 mL 15% NaOH, and 51.0 mL water. The solids were removed by filtration. The filtrate was dried over anhydrous sodium sulfate and concentrated under vacuum. The residue was purified by silica gel chromatography to produce 12 g of 1-(2-hydroxyethyl)cyclopentan-1-ol as light yellow oil.

Step 3

A solution of 1-(2-hydroxyethyl)cyclopentan-1-ol (12 g, 92.175 mmol, 1 equiv), DMSO (250 mL), and IBX (38.72 g, 138.263 mmol, 1.50 equiv) in a 500-mL round-bottom flask was stirred for 2 hr at 30° C. The reaction was then quenched by the addition of 200 mL of $Na_2S_2O_3$(aq.). The solids were removed by filtration. The filtrate was extracted with 3×150 mL of ethyl acetate. The organic layers were combined, washed with sodium carbonate (aq.) and brine, dried over anhydrous sodium sulfate and concentrated under vacuum. The residue was purified by silica gel chromatography to produce 11.0 g (93.11%) of 2-(1-hydroxycyclopentyl)acetaldehyde as yellow oil.

Step 4

Into a 1000-mL round-bottom flask was placed 2-(1-hydroxycyclopentyl) acetaldehyde (11 g, 1.10 equiv), THF (600 mL), (R)-2-methylpropane-2-sulfinamide (9.47 g, 1 equiv), and $Ti(Oi\text{-}Pr)_4$ (44.41 g, 2 equiv). The resulting solution was stirred overnight at room temperature. The reaction was then quenched by the addition of 600 mL of water. The solids were removed by filtration. The filtrate was extracted with 3×400 mL of ethyl acetate. The organic layers were combined, washed with sodium carbonate (aq.) (1×200 ml) and brine (1×200 ml), dried over anhydrous sodium sulfate and concentrated under vacuum. The residue was purified by silica gel chromatography to produce 11.0 g of (R)—N-[(1E)-2-(1-hydroxycyclopentyl)ethylidene]-2-methylpropane-2-sulfinamide as yellow oil.

Step 5

Into a 250-mL 3-necked round-bottom flask purged and maintained with an inert atmosphere of nitrogen, was placed (R)—N-[(1E)-2-(1-hydroxycyclopentyl)ethylidene]-2-methylpropane-2-sulfinamide (8 g, 34.580 mmol, 1 equiv), DCM (100 mL), and 2,6-dimethylpyridine (7.41 g, 69.152 mmol, 2.00 equiv). The reaction was cooled to 0° C. and tert-butyldimethylsilyl trifluoromethanesulfonate (13.71 g, 51.867 mmol, 1.50 equiv) was added dropwise with stirring. The reaction mixture was allowed to warm to room temperature and was stirred overnight. The reaction was then quenched by the addition of 100 mL of water. The resulting solution was extracted with 3×100 mL of dichloromethane. The organic layers were combined, washed with saturated brine (1×100 ml), dried over anhydrous sodium sulfate and concentrated under vacuum. The residue was purified by silica gel chromatography to produce 6.0 g of (R)—N-[(1E)-2-[1-[(tert-butyldimethylsilyl)oxy]cyclopentyl]ethylidene]-2-methylpropane-2-sulfinamide as light yellow oil.

Step 6

Into a 100-mL round-bottom flask purged and maintained with an inert atmosphere of nitrogen, was placed $PCy_3.HBF_4$ (233.75 mg, 0.635 mmol, 0.10 equiv), toluene (1.65 mL), $CuSO_4$ (50.6 mg, 0.317 mmol, 0.05 equiv), and $BnNH_2$ (0.347 mL, 0.05 equiv). The resulting solution was stirred for 10 min. at room temperature after which was added a solution of (R)—N-[(1E)-2-[1-[(tert-butyldimethylsilyl)oxy]cyclopentyl]ethylidene]-2-methylpropane-2-sulfinamide (2.2 g, 6.36 mmol, 1 equiv) and 4,4,5,5-tetramethyl-2-(4,4,5,5-tetramethyl-1,3,2-dioxaborolan-2-yl)-1,3,2-dioxaborolane (3.245 g, 12.779 mmol, 2.01 equiv) in toluene (13.75 mL). The resulting solution was stirred overnight at room temperature after which it was washed with 1×100 mL of water. The resulting solution was extracted with 100 mL of ethyl acetate and the organic layers combined and dried over anhydrous sodium sulfate and concentrated. This produced 2.2 g (crude) of (R)—N-[(1R)-2-[1-[(tert-butyldimethylsilyl)oxy]cyclopentyl]-1-(4,4,5,5-tetramethyl-1,3,2-dioxaborolan-2-yl)ethyl]-2-methylpropane-2-sulfinamide as light yellow oil.

Step 7

Into a 100-mL round-bottom flask, was placed (R)—N-[(1R)-2-[1-[(tert-butyldimethylsilyl)oxy]cyclopentyl]-1-(4,4,5,5-tetramethyl-1,3,2-dioxaborolan-2-yl)ethyl]-2-methylpropane-2-sulfinamide (2.2 g, 4.645 mmol, 1 equiv), ethoxyethane (20 mL), and (1S,2S,3R,5S)-2,6,6-trimethylbicyclo[3.1.1]heptane-2,3-diol (5.42 g, 31.83 mmol, 6.84 equiv). The resulting solution was stirred for overnight at room temperature, after which it was concentrated. The residue was dissolved in 100 mL of DCM. The resulting mixture was washed with 1×100 ml of water and 1×100 mL of brine. The organics were dried over anhydrous sodium sulfate and concentrated. The crude product was purified by reverse phase Flash-Prep-HPLC to produce 2.16 g of (R)—N-[(1R)-2-[1-[(tert-butyldimethylsilyl)oxy]cyclopentyl]-1-[(1S,2S,6R,8S)-2,9,9-trimethyl-3,5-dioxa-4-boratricyclo[6.1.1.0^[2,6]]decan-4-yl]ethyl]-2-methylpropane-2-sulfinamide as light yellow oil.

Step 8

Into a 250-mL 3-necked round-bottom flask containing (R)—N-[(1R)-2-[1-[(tert-butyldimethylsilyl)oxy]cyclopentyl]-1-[(1S,2S,6R,8S)-2,9,9-trimethyl-3,5-dioxa-4-boratricyclo[6.1.1.0^[2,6]]decan-4-yl]ethyl]-2-methylpropane-2-sulfinamide (2.5 g, 4.756 mmol, 1 equiv) and DCM (60 mL) was added $BF_3.Et_2O$ (1.175 mL, 9.272 mmol, 1.95 equiv) dropwise with stirring at 0° C. The resulting solution was stirred for 1.5 hr at 0° C. The reaction was then quenched by the addition of 100 mL of water/ice. The reaction mixture was extracted with 100 mL of dichloromethane, which was then dried over anhydrous sodium sulfate and concentrated. The crude product was purified by reverse phase Flash-Prep-HPLC to produce 1.6 g of (R)—N-[(1R)-2-(cyclopent-1-en-1-yl)-1-[(1S,2S,6R,8S)-2,9,9-trimethyl-3,5-dioxa-4-boratricyclo[6.1.1.0^[2,6]]decan-4-yl]ethyl]-2-methylpropane-2-sulfinamide as light yellow oil.

Step 9

Into a 100-mL round-bottom flask was placed (R)—N-[(1R)-2-(cyclopent-1-en-1-yl)-1-[(1S,2S,6R,8S)-2,9,9-trimethyl-3,5-dioxa-4-boratricyclo[6.1.1.0^[2,6]]decan-4-yl]ethyl]-2-methylpropane-2-sulfinamide (1.0 g, 2.542 mmol, 1 equiv), dioxane (15 mL, 177.061 mmol, 69.65 equiv), and HCl (4M in dioxane) (3 mL, 98.736 mmol, 38.84 equiv). The resulting solution was stirred for 1 hr at room temperature, after which it was concentrated. This resulted in 820 mg (crude) of (1R)-2-(cyclopent-1-en-1-yl)-1-[(1S,2S,6R,8S)-2,9,9-trimethyl-3,5-dioxa-4-boratricyclo[6.1.1.0^[2,6]]decan-4-yl]ethan-1-amine hydrochloride as yellow oil.

Steps 10 and 11

(3S)-Piperidin-3-yl N-[(1R)-2-(cyclopent-1-en-1-yl)-1-[(1S,2S,6R,8S)-2,9,9-trimethyl-3,5-dioxa-4-boratricyclo[6.1.1.0^[2,6]]decan-4-yl]ethyl]carbamate was prepared as in Ex 60, except that (1R)-2-(cyclopent-1-en-1-yl)-1-[(1S,2S,6R,8S)-2,9,9-trimethyl-3,5-dioxa-4-boratricyclo[6.1.1.0^[2,6]]decan-4-yl]ethan-1-amine hydrochloride was substituted for (1R)-2-phenyl-1-[(1S,2S,6R,8S)-2,9,9-trimethyl-3,5-dioxa-4-boratricyclo[6.1.1.0^[2,6]]decan-4-yl]ethan-1-amine hydrochloride.

Step 12

(3S)-1-[2-cyano-2-[2-(3,3-difluoropyrrolidin-1-yl)-2-methylpropylidene]acetyl]piperidin-3-yl N-[(1R)-2-(cyclopent-1-en-1-yl)-1-[(1S,2S,6R,8S)-2,9,9-trimethyl-3,5-dioxa-4-boratricyclo[6.1.1.0^[2,6]]decan-4-yl]ethyl]carbamate was prepared as in Ex 89, Step 1, except that (3S)-Piperidin-3-yl N-[(1R)-2-(cyclopent-1-en-1-yl)-1-[(1S,2S,6R,8S)-2,9,9-trimethyl-3,5-dioxa-4-boratricyclo[6.1.1.0^[2,6]]decan-4-yl]ethyl]carbamate was substituted for (3S)-pyrrolidin-3-ol.

Step 13

The title compound was prepared as described in Example 89, Step 4, except that (3S)-1-[2-cyano-2-[2-(3,3-difluoropyrrolidin-1-yl)-2-methylpropylidene]acetyl]piperidin-3-yl N-[(1R)-2-(cyclopent-1-en-1-yl)-1-[(1S,2S,6R,8S)-2,9,9-trimethyl-3,5-dioxa-4-boratricyclo[6.1.1.0^[2,6]]decan-4-yl]ethyl]carbamate was substituted for (S)-1-(2-cyano-4-(3,3-difluoropyrrolidin-1-yl)-4-methylpent-2-enoyl)pyrrolidin-3-yl ((R)-2-phenyl-1-((3aS,4S,6S,7aR)-5,5,7a-trimethylhexahydro-4,6-methanobenzo[d][1,3,2]dioxaborol-2-yl)ethyl)carbamate. LC-MS m/z: 491 (M-17).

Example 118

((R)-1-((((7-(2-cyano-4-methyl-4-((R)-2-methylmorpholino)pent-2-enoyl)-7-azabicyclo[2.2.1]heptan-1-yl)methoxy)carbonyl)amino)-2-phenylethyl)boronic Acid

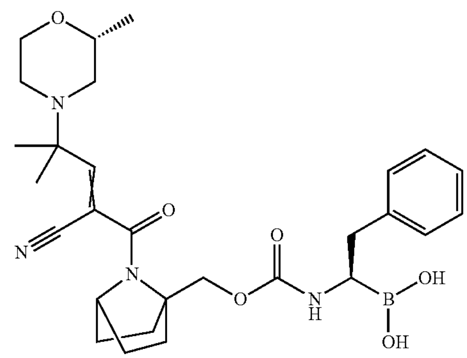 [SMILES: C[C@@H]1CN(C(C)(C)C=C(C#N)C(=O)N2C3CCC2(COC(=O)N[C@@H](Cc2ccccc2)B(O)O)CC3)CCO1]

The title compound was prepared proceeding as in Ex 114 but starting with (2R)-2-methylmorpholine in place of (2S,6R)-2,6-dimethylmorpholine. LC-MS m/z: 539 [M+1].

Example 119

(R)-(1-((((7-(2-cyano-4-(2,2-dimethylmorpholino)-4-methylpent-2-enoyl)-7-azabicyclo[2.2.1]heptan-1-yl)methoxy)carbonyl)amino)-2-phenylethyl)boronic Acid

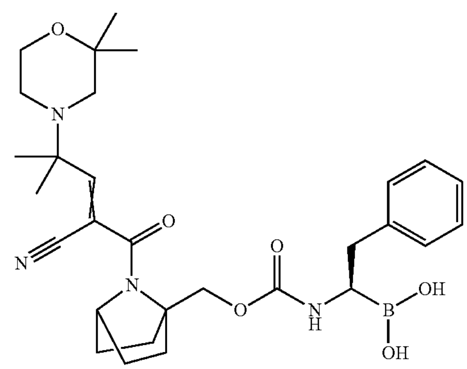 [SMILES: CC1(C)CN(C(C)(C)C=C(C#N)C(=O)N2C3CCC2(COC(=O)N[C@@H](Cc2ccccc2)B(O)O)CC3)CCO1]

The title compound was prepared proceeding as in Ex 114 but starting with 2,2-dimethylmorpholine in place of (2S, 6R)-2,6-dimethylmorpholine. LC-MS m/z: 553 [M+1].

Example 120

((R)-1-(((((S)-1-(2-cyano-4-(4-(methoxycarbonyl) piperazin-1-yl)-4-methylpent-2-enoyl)piperidin-3-yl) oxy)carbonyl)amino)-2-(cyclopent-1-en-1-yl)ethyl) boronic Acid

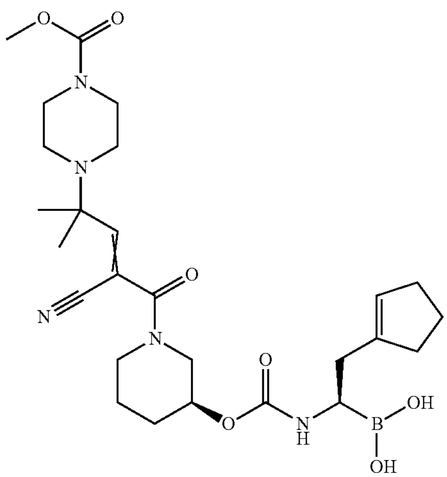 [SMILES: COC(=O)N1CCN(C(C)(C)C=C(C#N)C(=O)N2CCC[C@H](OC(=O)N[C@@H](CC3=CCCC3)B(O)O)C2)CC1]

OH (3S)-1-(2-cyanoacetyl)piperidin-3-yl N-[(1R)-2-(cyclopent-1-en-1-yl)-1-[(1S,2S,6R,8S)-2,9,9-trimethyl-3,5-dioxa-4-boratricyclo[6.1.1.0^[2,6]]decan-4-yl]ethyl]carbamate was prepared using the procedure described in Ex 69, step 1, except that (3S)-piperidin-3-yl N-[(1R)-2-(cyclopent-1-en-1-yl)-1-[(1S,2S,6R,8S)-2,9,9-trimethyl-3,5-dioxa-4-boratricyclo[6.1.1.0^[2,6]]decan-4-yl]ethyl]carbamate was substituted for (3S)-piperidin-3-yl N-[(1R)-2-[4-(trifluoromethyl)phenyl]-1-[(1S,2S,6R,8S)-2,9,9-trimethyl-3,5-dioxa-4-boratricyclo[6.1.1.0^[2,6]]decan-4-yl]ethyl] carbamate.

The title compound was prepared using procedures described for Ex 83, substituting (3S)-1-(2-cyanoacetyl) piperidin-3-yl N-[(1R)-2-(cyclopent-1-en-1-yl)-1-[(1S,2S,6R,8S)-2,9,9-trimethyl-3,5-dioxa-4-boratricyclo[6.1.1.0^[2,6]]decan-4-yl]ethyl]carbamate for (3S)-1-(2-cyanoacetyl) piperidin-3-yl N-[(1R)-2-phenyl-1-[(1S,2S,6R,8S)-2,9,9-trimethyl-3,5-dioxa-4-boratricyclo[6.1.1.0^[2,6]]decan-4-yl]ethyl]carbamate. LC-MS m/z: 528 [M-17].

Example 121

((R)-1-(((((S)-1-(2-cyano-4-methyl-4-morpholinopent-2-enoyl)piperidin-3-yl)oxy)carbonyl)amino)-2-(cyclopent-1-en-1-yl)ethyl)boronic Acid

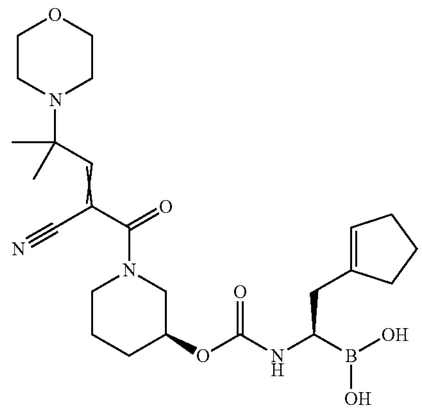 [SMILES: CC(C)(C=C(C#N)C(=O)N1CCC[C@H](OC(=O)N[C@@H](CC2=CCCC2)B(O)O)C1)N1CCOCC1]

The title compound was prepared as described for Ex 120, except that 2-methyl-2-(morpholin-4-yl)propanal was substituted for methyl 4-(2-methyl-1-oxopropan-2-yl)piperazine-1-carboxylate in the coupling with the cyanoacetamide. LC-MS m/z: 489 [M+1].

Example 122

((R)-1-((((7-(2-cyano-4-methyl-4-((S)-2-methylmorpholino)pent-2-enoyl)-7-azabicyclo[2.2.1]heptan-1-yl)methoxy)carbonyl)amino)-2-phenylethyl)boronic Acid

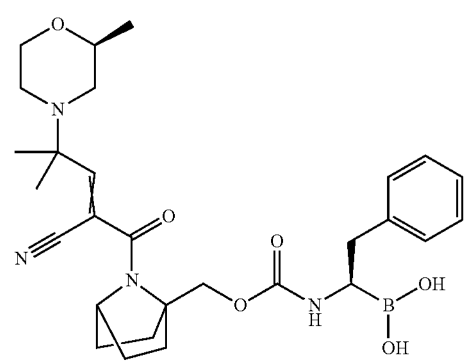 [SMILES: C[C@H]1CN(C(C)(C)C=C(C#N)C(=O)N2C3CCC2(COC(=O)N[C@@H](Cc2ccccc2)B(O)O)CC3)CCO1]

The title compound was prepared proceeding as in Ex 114 but starting with (2S)-2-methylmorpholine in place of (2S, 6R)-2,6-dimethylmorpholine. LC-MS m/z: 539 [M+1].

Example 123

((R)-1-((((7-(2-cyano-4-((2S,6S)-2,6-dimethylmorpholino)-4-methylpent-2-enoyl)-7-azabicyclo[2.2.1]heptan-1-yl)methoxy)carbonyl)amino)-2-phenylethyl)boronic Acid

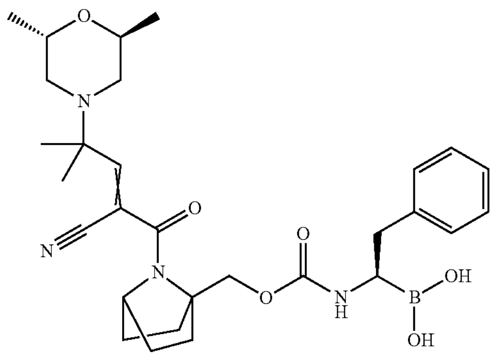 [SMILES: C[C@H]1CN(C(C)(C)C=C(C#N)C(=O)N2C3CCC2(COC(=O)N[C@@H](Cc2ccccc2)B(O)O)CC3)C[C@H](C)O1]

The title compound was prepared proceeding as in Ex 114 but starting with (2S,6S)-2,6-dimethylmorpholine in place of (2S,6R)-2,6-dimethylmorpholine. LC-MS m/z: 553(M+1).

Example 124

((R)-1-(((((3S,4R)-1-acryloyl-4-fluoropyrrolidin-3-yl)oxy)carbonyl)amino)-2-phenylethyl)boronic Acid

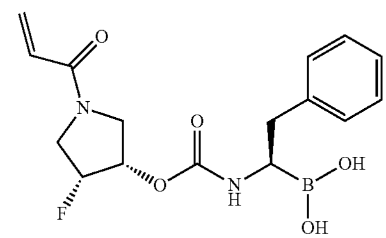

The title compound was prepared proceeding as in Ex 102 but starting with (3S,4R)-4-fluoropyrrolidin-3-ol hydrochloride. LC-MS m/z: 373 [M+23], 333 [M-17].

Example 125

((R)-1-(((((3S,4R)-1-(2-cyano-4-(3,3-difluoropyrrolidin-1-yl)-4-methylpent-2-enoyl)-4-fluoropyrrolidin-3-yl)oxy)carbonyl)amino)-2-phenylethyl)boronic Acid

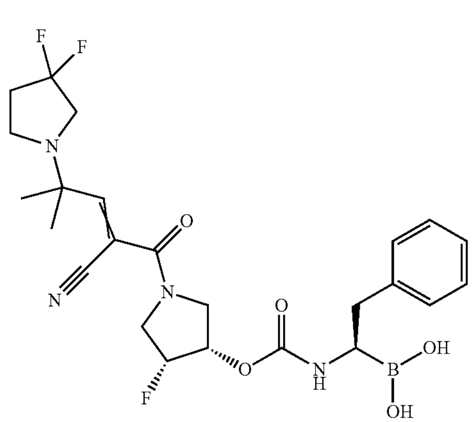

The title compound was prepared following the procedure in Ex 109 but starting with (3S,4R)-4-fluoropyrrolidin-3-ol hydrochloride. LC-MS m/z: 523 [M+1].

Example 126

((R)-1-((((7-(2-cyano-4-((2R,6R)-2,6-dimethylmorpholino)-4-methylpent-2-enoyl)-7-azabicyclo[2.2.1]heptan-1-yl)methoxy)carbonyl)amino)-2-phenylethyl)boronic Acid

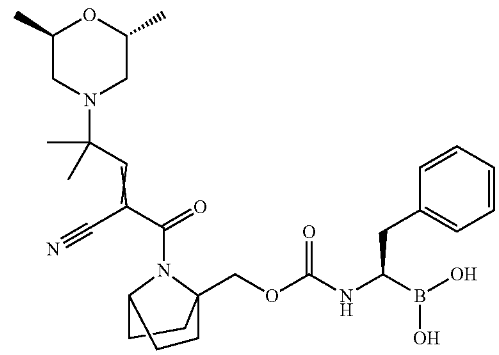 [SMILES: C[C@@H]1CN(C(C)(C)C=C(C#N)C(=O)N2C3CCC2(COC(=O)N[C@@H](Cc2ccccc2)B(O)O)CC3)C[C@@H](C)O1]

The title compound was prepared proceeding as in Ex 114 but starting with (2R,6R)-2,6-dimethylmorpholine in place of (2S,6R)-2,6-dimethylmorpholine. LC-MS m/z: 553 [M+1].

Example 127

((R)-1-(((((R)-1-(2-cyano-4-((2S,6R)-2,6-dimethylmorpholino)-4-methylpent-2-enoyl)azepan-3-yl)oxy)carbonyl)amino)-2-phenylethyl)boronic Acid

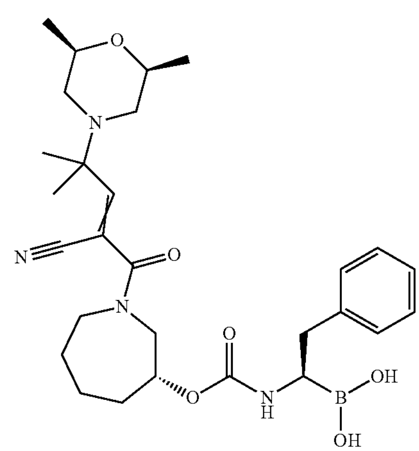 [SMILES: C[C@@H]1CN(C(C)(C)C=C(C#N)C(=O)N2CCCC[C@@H](OC(=O)N[C@@H](Cc3ccccc3)B(O)O)C2)C[C@H](C)O1]

The title compound was prepared proceeding as in Ex 105 but starting with 2-((2R,6S)-2,6-dimethyl-4-morpholinyl)-2-methylpropionaldehyde in place of 2-(3,3-difluoropyrrolidin-1-yl)-2-methylpropanal. LC-MS m/z: 541 [M+1].

Example 128

((R)-1-(((((R)-1-(2-cyano-4-((2S,6S)-2,6-dimethylmorpholino)-4-methylpent-2-enoyl)azepan-3-yl)oxy)carbonyl)amino)-2-phenylethyl)boronic Acid

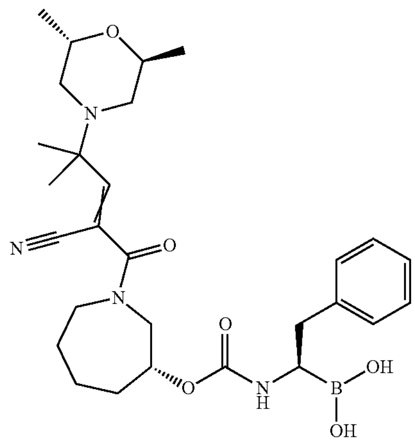 [SMILES: C[C@H]1CN(C(C)(C)C=C(C#N)C(=O)N2CCCC[C@@H](OC(=O)N[C@@H](Cc3ccccc3)B(O)O)C2)C[C@H](C)O1]

The title compound was prepared proceeding as in Ex 105 but starting with 2-((2S,6S)-2,6-dimethyl-4-morpholinyl)-2-methylpropionaldehyde in place of 2-(3,3-difluoropyrrolidin-1-yl)-2-methylpropanal. LC-MS m/z: 541 [M+1].

Example 129

((R)-1-(((((R)-1-(2-cyano-4-((2R,6R)-2,6-dimethylmorpholino)-4-methylpent-2-enoyl)azepan-3-yl)oxy)carbonyl)amino)-2-phenylethyl)boronic Acid

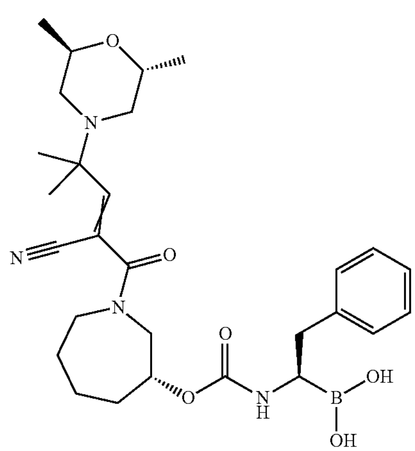 [SMILES: C[C@@H]1CN(C(C)(C)C=C(C#N)C(=O)N2CCCC[C@@H](OC(=O)N[C@@H](Cc3ccccc3)B(O)O)C2)C[C@@H](C)O1]

The title compound was prepared proceeding as in Ex 105 but starting with 2-((2R,6R)-2,6-dimethyl-4-morpholinyl)-2-methylpropionaldehyde in place of 2-(3,3-difluoropyrrolidin-1-yl)-2-methylpropanal. LC-MS m/z: 541 [M+1].

Example 130

((R)-1-(((((R)-1-(2-cyano-4-methyl-4-((S)-2-methylmorpholino)pent-2-enoyl)azepan-3-yl)oxy)carbonyl)amino)-2-phenylethyl)boronic Acid

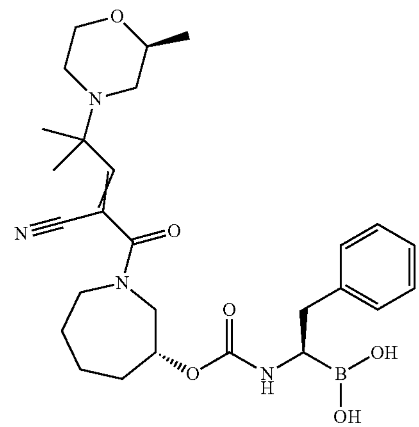 [SMILES: C[C@H]1CN(C(C)(C)C=C(C#N)C(=O)N2CCCC[C@@H](OC(=O)N[C@@H](Cc3ccccc3)B(O)O)C2)CCO1]

The title compound was prepared proceeding as in Ex 105 but starting with 2-((2S)-2-methyl-4-morpholinyl)-2-methylpropionaldehyde in place of 2-(3,3-difluoropyrrolidin-1-yl)-2-methylpropanal. LC-MS m/z: 527 [M+1].

Example 131

((R)-1-(((((R)-1-(2-cyano-4-methyl-4-((R)-2-methylmorpholino)pent-2-enoyl)azepan-3-yl)oxy)carbonyl)amino)-2-phenylethyl)boronic Acid

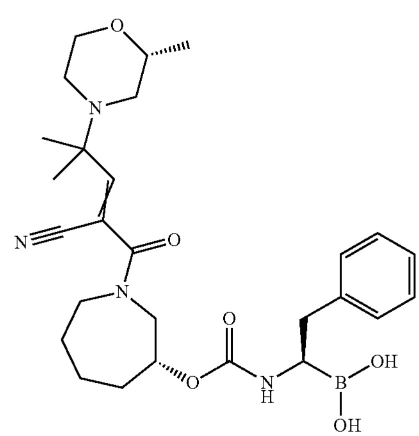 [SMILES: C[C@@H]1CN(C(C)(C)C=C(C#N)C(=O)N2CCCC[C@@H](OC(=O)N[C@@H](Cc3ccccc3)B(O)O)C2)CCO1]

The title compound was prepared proceeding as in Ex 105 but starting with 2-((2R)-2-methyl-4-morpholinyl)-2-methylpropionaldehyde in place of 2-(3,3-difluoropyrrolidin-1-yl)-2-methylpropanal. LC-MS m/z: 527 [M+1].

Example 132

((1R)-1-((((7-(4-(6-oxa-3-azabicyclo[3.1.1]heptan-3-yl)-2-cyano-4-methylpent-2-enoyl)-7-azabicyclo[2.2.1]heptan-1-yl)methoxy)carbonyl)amino)-2-phenylethyl)boronic Acid

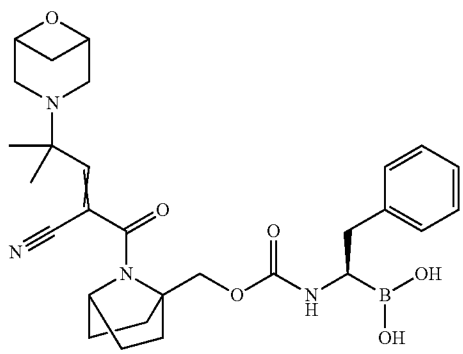 [SMILES: CC(C)(C=C(C#N)C(=O)N1C2CCC1(COC(=O)N[C@@H](Cc1ccccc1)B(O)O)CC2)N1CC2CC(C1)O2]

The title compound was prepared proceeding as in Ex 114 but starting with 6-oxa-3-azabicyclo[3.1.1]heptane in place of (2S,6R)-2,6-dimethylmorpholine. LC-MS m/z: 537 [M+1].

Example 133

((R)-1-(((((R)-1-(2-cyano-4-methyl-4-(4-oxa-7-azaspiro[2.5]octan-7-yl)pent-2-enoyl)azepan-3-yl)oxy)carbonyl)amino)-2-phenylethyl)boronic Acid

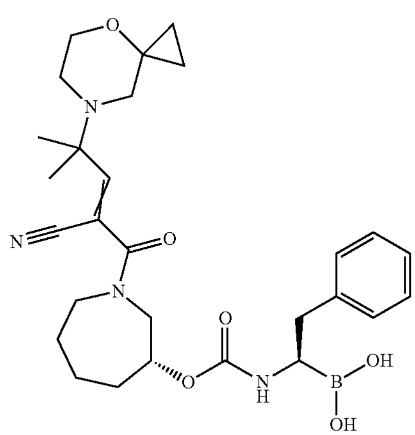 [SMILES: CC(C)(C=C(C#N)C(=O)N1CCCC[C@@H](OC(=O)N[C@@H](Cc2ccccc2)B(O)O)C1)N1CCOC2(CC2)C1]

The title compound was prepared proceeding as in Ex 105 but starting with 2-methyl-2-(4-oxa-7-azaspiro[2.5]oct-7-yl)propionaldehyde in place of 2-(3,3-difluoropyrrolidin-1-yl)-2-methylpropanal. LC-MS m/z: 539 [M+1].

Example 134

((1R)-1-(((((3R)-1-(4-(6-oxa-3-azabicyclo[3.1.1]heptan-3-yl)-2-cyano-4-methylpent-2-enoyl)azepan-3-yl)oxy)carbonyl)amino)-2-phenylethyl)boronic Acid

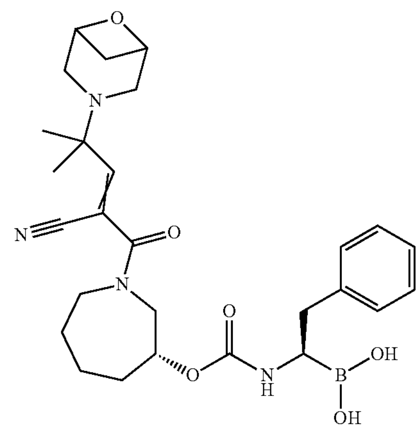 [SMILES: CC(C)(C=C(C#N)C(=O)N1CCCC[C@@H](OC(=O)N[C@@H](Cc2ccccc2)B(O)O)C1)N1CC2CC(C1)O2]

The title compound was prepared proceeding as in Ex 105 but starting with 2-methyl-2-(6-oxa-3-azabicyclo[3.1.1]hept-3-yl)propionaldehyde in place of 2-(3,3-difluoropyrrolidin-1-yl)-2-methylpropanal. LC-MS m/z: 525 [M+1].

Example 135

((R)-1-(((((3R,4R)-1-acryloyl-4-fluoropyrrolidin-3-yl)oxy)carbonyl)amino)-2-(4-fluorophenyl)ethyl)boronic Acid

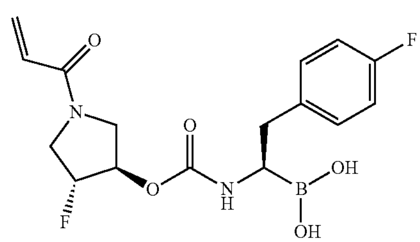 [SMILES: C=CC(=O)N1C[C@@H](F)[C@H](OC(=O)N[C@@H](Cc2ccc(F)cc2)B(O)O)C1]

The title compound was prepared proceeding as in Ex 102 but starting with (R)-2-(4-fluorophenyl)-1-((3aS,4S,6S,7aR)-3a,5,5-trimethylhexahydro-4,6-methanobenzo[d][1,3,2]dioxaborol-2-yl)ethan-1-amine hydrochloride in place of (1R)-2-phenyl-1-[(1S,2S,6R,8S)-2,9,9-trimethyl-3,5-dioxa-4-boratricyclo[6.1.1.0^[2,6]]decan-4-yl]ethan-1-amine hydrochloride. LC-MS m/z: 391 [M+23], 351 [M-17].

Example 136

((R)-1-(((((R)-1-(2-cyano-4-(2,2-dimethylmorpholino)-4-methylpent-2-enoyl)azepan-3-yl)oxy)carbonyl)amino)-2-phenylethyl)boronic Acid

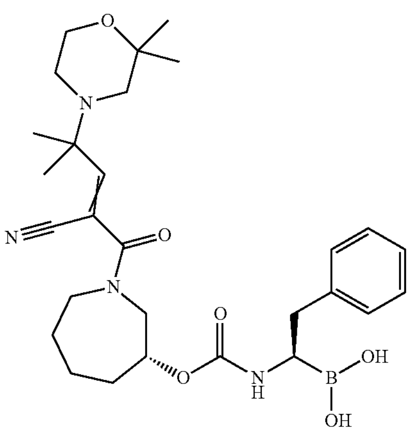 [SMILES: CC1(C)CN(C(C)(C)C=C(C#N)C(=O)N2CCCC[C@@H](OC(=O)N[C@@H](Cc3ccccc3)B(O)O)C2)CCO1]

The title compound was prepared proceeding as in Ex 105 but starting with 2-(2,2-dimethyl-4-morpholinyl)-2-methylpropionaldehyde in place of 2-(3,3-difluoropyrrolidin-1-yl)-2-methylpropanal. LC-MS m/z: 541 [M+1].

Example 137

((R)-1-(((((R)-1-(2-cyano-4-methyl-4-morpholinopent-2-enoyl)azepan-3-yl)oxy)carbonyl)amino)-2-(4-fluorophenyl)ethyl)boronic Acid

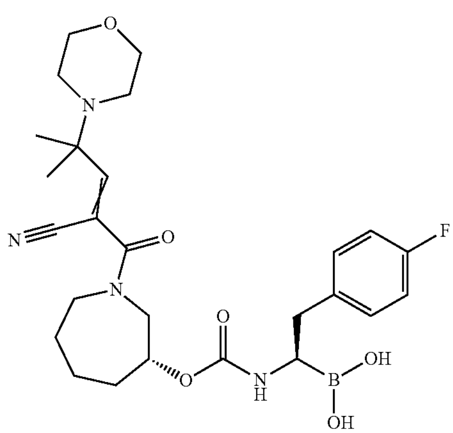 [SMILES: CC(C)(C=C(C#N)C(=O)N1CCCC[C@@H](OC(=O)N[C@@H](Cc2ccc(F)cc2)B(O)O)C1)N1CCOCC1]

The title compound was prepared proceeding as in Ex 103 but starting with (R)-2-(4-fluorophenyl)-1-((3aS,4S,6S,7aR)-3a,5,5-trimethylhexahydro-4,6-methanobenzo[d][1,3,2]dioxaborol-2-yl)ethan-1-amine hydrochloride in place of (1R)-2-phenyl-1-[(1S,2S,6R,8S)-2,9,9-trimethyl-3,5-dioxa-4-boratricyclo[6.1.1.0^[2,6]]decan-4-yl]ethan-1-amine hydrochloride. LC-MS m/z: 531 [M+1].

Example 138

((R)-1-(((((R)-1-(2-cyano-4-methyl-4-morpholinopent-2-enoyl)azepan-3-yl)oxy)carbonyl)amino)-2-(cyclopent-1-en-1-yl)ethyl)boronic Acid

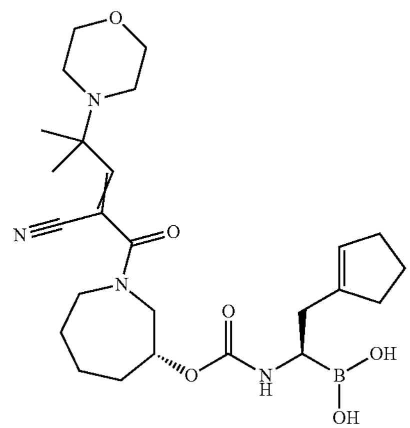 [SMILES: CC(C)(C=C(C#N)C(=O)N1CCCC[C@@H](OC(=O)N[C@@H](CC2=CCCC2)B(O)O)C1)N1CCOCC1]

The title compound was prepared proceeding as in Ex 103 but starting with(1R)-2-(cyclopent-1-en-1-yl)-1-[(1S,2S,6R,8S)-2,9,9-trimethyl-3,5-dioxa-4-boratricyclo[6.1.1.0^[2,6]]decan-4-yl]ethan-1-amine hydrochloride in place of (1R)-2-phenyl-1-[(1S,2S,6R,8S)-2,9,9-trimethyl-3,5-dioxa-4-boratricyclo[6.1.1.0^[2,6]]decan-4-yl]ethan-1-amine hydrochloride. LC-MS m/z: 503 [M+1].

BIOLOGICAL EXAMPLES

Example 1

Immunoproteasome and Constitutive Proteasome Enzymatic Activity Assays

A Caliper-based proteasome assay (Caliper Life Sciences, Hopkinton, Mass.) was used to measure inhibition of the immunoproteasome LMP7/B5i subunit, the immunoproteasome LPM2/βli subunit, and the constitutive proteasome β5c unit for a compound of Formula (I). For LMP7 and β5c, serial dilutions of test compounds were incubated with either human recombinant immunoproteasome or constitutive proteasome (0.3 nM enzyme) and a carboxyfluorescein (FAM)-labeled peptide substrate FAM-TYETFKSIMKKSPF-$NH_2$ (1 M) at rt for 3 h. The reaction was then terminated with a buffer containing the known proteasome inhibitor carfilzomib at a concentration of 5 uM. For LMP2, serial dilutions of test compounds were incubated with human recombinant immunoproteasome proteasome (0.3 nM enzyme) and a carboxyfluorescein (FAM)-labeled peptide substrate FAM-GLTNIKTEEISEVNLDAEFRK-$NH_2$ (1 μM) at rt for 2 h. The reaction was then terminated with a buffer containing the known proteasome inhibitor ixazomib at a concentration of 6.7 uM. The reaction buffer was 20 mM Hepes pH 7.4, 0.01% bovine serum albumin, 0.015% SDS, 0.5 mM EDTA, 1% DMSO. The peptide cleavage reaction product was quantified on a Caliper LabChip 3000. Percent inhibition was calculated for each compound dilution and the concentration that produced 50% inhibition was calculated. This value is presented as the $IC_{50}$. The $IC_{50}$ values for a representative no. of compounds are provided below.

| Synthetic Ex # | LMP7 subunit $IC_{50}$ (nM) | β5c subunit $IC_{50}$ (nM) | LMP2 subunit $IC_{50}$ (nM) |
|---|---|---|---|
| 1 | 20.9 | 12.1 | nd |
| 2 | 12.8 | 8.5 | 46.3 |
| 3 | 29.6 | 8.5 | nd |
| 4 | 14.0 | 23.7 | nd |
| 5 | 12.3 | 27.4 | 114.7 |
| 6 | 12.9 | 38.5 | 82.7 |
| 7 | 1.3 | 1.0 | nd |
| 8 | 2.4 | 4.4 | 79 |
| 9 | 8.2 | 9.4 | nd |
| 10 | 6.6 | 14.8 | nd |
| 11 | 2.6 | 4.0 | nd |
| 12 | 13.4 | 21.1 | nd |
| 13 | 67.1 | 292.0 | >5000 |
| 14 | 1.7 | 2.4 | 137.8 |
| 15 | 4.3 | 5.0 | 2.7 |
| 16 | 4.3 | 3.3 | nd |
| 17 | 6.4 | 10.9 | nd |
| 18 | 7.3 | 10.0 | nd |
| 19 | 9.6 | 15.6 | nd |
| 20 | 2.4 | 8.1 | 483 |
| 21 | 2.5 | 21.1 | nd |
| 22 | 22 | 308 | nd |
| 23 | 35 | 450 | nd |
| 24 | 26 | 166 | nd |
| 25 | 10 | 411 | 701.4 |
| 26 | 11 | 362 | nd |
| 27 | 72 | 175 | nd |
| 28 | 46 | 294 | nd |
| 29 | 319 | 964 | >5000 |
| 30 | 87 | 1835 | nd |
| 31 | 11.6 | 39.4 | nd |
| 32 | 37.2 | >5000 | >5000 |
| 33 | >5000 | >5000 | >5000 |
| 34 | 231 | >5000 | >5000 |
| 35 | 611 | >5000 | >5000 |
| 36 | 1140 | >5000 | >5000 |
| 37 | 4534 | >5000 | >5000 |
| 38 | >5000 | >5000 | >5000 |
| 39 | 78.8 | >5000 | >5000 |
| 40 | 669 | >5000 | >5000 |
| 41 | 30 | >5000 | >5000 |
| 42 | 13 | >5000 | >5000 |
| 43 | 4.4 | >5000 | >5000 |
| 44 | 2.2 | 2845 | >5000 |
| 45 | 4.7 | 2072 | >5000 |
| 46 | 4.0 | 1686 | >5000 |
| 47 | 3.5 | 1898 | >5000 |
| 48 | 8.7 | 383 | 3738 |
| 49 | 5.3 | 1809 | nd |
| 50 | 4.0 | 1196 | nd |
| 51 | 256 | 1434 | Nd |
| 52 | 1.7 | 715 | nd |
| 53 | 4.4 | >5000 | nd |
| 54 | 2.7 | 504 | nd |
| 55 | 5.1 | 3880 | Nd |
| 56 | 9.9 | 255 | nd |
| 57 | 2.6 | 1620 | 3190 |
| 58 | 10 | 139 | nd |
| 59 | 21 | 163 | nd |
| 60 | 1.4 | 463 | nd |
| 61 | 11 | 186 | nd |
| 62 | 2.3 | 126 | nd |
| 63 | 2 | 465 | nd |
| 64 | >5000 | >5000 | nd |
| 65 | 7.5 | 418 | nd |
| 66 | 148 | >5000 | nd |
| 67 | 249 | >5000 | nd |
| 68 | 31.8 | 1235 | nd |
| 69 | 26.1 | 3373 | nd |
| 70 | 106 | >5000 | nd |
| 71 | 528 | >5000 | nd |
| 72 | 5.4 | 851 | nd |
| 73 | 1.1 | 54.6 | >5000 |
| 74 | 149 | 2103 | nd |
| 75 | 129 | >5000 | nd |
| 76 | 21.1 | 4031 | nd |
| 77 | 0.9 | 3278 | nd |
| 78 | 2.3 | 501 | >5000 |

-continued

| Synthetic Ex # | LMP7 subunit $IC_{50}$ (nM) | β5c subunit $IC_{50}$ (nM) | LMP2 subunit $IC_{50}$ (nM) |
|---|---|---|---|
| 79 | 5.3 | 2783 | nd |
| 80 | 3.9 | 1381 | nd |
| 81 | 1.8 | 2220 | nd |
| 82 | 1.7 | 1379 | nd |
| 83 | 2.3 | 944 | >5000 |
| 84 | 0.7 | 279 | nd |
| 85 | >5000 | >5000 | nd |
| 86 | 59.1 | 218 | nd |
| 87 | 1.9 | 574 | nd |
| 88 | 113 | 1610 | 1860 |
| 89 | 1.8 | 1135 | nd |
| 90 | 3.2 | 1586 | nd |
| 91 | >5000 | >5000 | nd |
| 92 | 42.2 | >5000 | nd |
| 93 | 646 | >5000 | nd |
| 94 | 238 | >5000 | nd |
| 95 | 6.9 | 2639 | nd |
| 96 | 8.7 | 1622 | nd |
| 97 | 7.7 | 1950 | nd |
| 98 | 5.6 | 2495 | nd |
| 99 | 19.3 | 3763 | nd |
| 100 | 206 | 3557 | nd |
| 101 | 145 | 3917 | nd |
| 102 | 27.1 | 4699 | nd |
| 103 | 2.2 | 3184 | nd |
| 104 | 2.4 | >5000 | nd |
| 105 | 1.6 | 1345 | nd |
| 106 | 2.5 | 2656 | nd |
| 107 | 1.0 | 1073 | nd |
| 108 | 1.2 | 3000 | nd |
| 109 | 3.5 | 621 | nd |
| 110 | 78.3 | 2838 | nd |
| 111 | 1.9 | 140 | nd |
| 112 | 143 | 2242 | nd |
| 113 | 2.3 | 520 | nd |
| 114 | 2.1 | 1670 | nd |
| 115 | 18.3 | 207 | nd |
| 116 | 1.3 | 753 | nd |
| 117 | 4.3 | >5000 | nd |
| 118 | 1.9 | 1152 | nd |
| 119 | 1.0 | 685 | nd |
| 120 | 11.6 | >5000 | nd |
| 121 | 7.8 | >5000 | nd |
| 122 | 2.0 | 1170 | nd |
| 123 | 0.9 | 832 | nd |
| 124 | 37.3 | >5000 | nd |
| 125 | 3.7 | 810 | nd |
| 126 | 1.3 | 967 | nd |
| 127 | 2.4 | 2420 | nd |
| 128 | 4.7 | 1351 | nd |
| 129 | 2.7 | 734 | nd |
| 130 | 2.8 | 2042 | nd |
| 131 | 2.6 | 1481 | nd |
| 132 | 0.8 | 1080 | nd |
| 133 | 1.4 | 942 | nd |
| 134 | 1.9 | 1011 | nd |
| 135 | 18.2 | 3325 | nd |
| 136 | 1.3 | 1284 | nd |
| 137 | 1.9 | 2083 | nd |
| 138 | 1.2 | >5000 | nd |

nd = not determined

Example 2

Inhibition of Proteasome Activity Cells

The cell-based effects of a compound described herein on the immunoproteasome were determined by measuring inhibition of proteasome activity in cells using the Proteasome-Glo™ Cell-Based Reagent (Promega, Madison Wis.). The Proteasome-Glo™ assay contains a specific luminogenic proteasome substrate in a buffer optimized for cell permeabilization, proteasome activity, and luciferase activity. For the chymotrypsin-like activity (LMP7 and (35c), the peptide substrate is Suc-LLVY-aminoluciferin (Succinyl-leucine-leucine-valine-tyrosine-aminoluciferin). Cleavage of the substrate by proteasome results in luminescent signal which is proportional to the proteasome activity. The cell line THP-1 (a monocytic leukemia cell line enriched in immunoproteasome), the cell line HT-29 (a colorectal adenocarcinoma cell line enriched in constitutive proteasome), and primary human peripheral blood mononuclear cells (PBMC) were used to assess proteasome activity. Cells were seeded in a 96-well plate at 10,000 cells per well in RPMI 1640 high glucose medium with 10% fetal bovine serum (FBS). Compound dilutions were added to cells starting at a concentration of 5 uM and decreasing in tripling dilutions. The final DMSO concentration was 1%. The concentration range was adjusted as needed for compounds of different potencies. The cells treated with compounds were incubated for 2 h at 37° C. in 5% $CO_2$. At the end of the 2 hour incubation period, cells were transferred to white 384 well assay plates. 20 uL of Proteasome-Glo™ Reagent was added to each well and incubated for 10 minutes at rt. The plate was read in the Analyst HT instrument (Molecular Devices, Sunnyvale, Calif.) using luminescence mode. The percent inhibition of activity was plotted as a function of log compound concentration. The $IC_{50}$ was then calculated for each compound using Prism software from GraphPad Software Inc. (San Diego, Calif.).

| Synthetic Ex # | PBMC/LMP7 $IC_{50}$ (nM) | HT29/B5c $IC_{50}$ (nM) | PBMC/LMP2 $IC_{50}$ (nM) |
|---|---|---|---|
| 8 | 39 | nd | nd |
| 11 | 390 | nd | nd |
| 13 | 50 | 242 | nd |
| 14 | 31 | 60 | 274 |
| 15 | 35 | 141 | nd |
| 20 | 34 | nd | 208 |
| 21 | 73 | nd | nd |
| 22 | 39 | nd | nd |
| 25 | 28 | nd | nd |
| 29 | 307 | 3590 | nd |
| 32 | 110 | nd | nd |

nd = not determined

Example 3

IL-2 Production in Anti-CD3 and Anti-CD28 Stimulated Human PBMCs

Peripheral blood mononuclear cells (PBMCs) isolated from human whole blood were preincubated with or without the test compounds in RPMI 1640+10% fetal bovine serum at 37° C. for 30 min. PBMCs were stimulated with 2.5 ug/mL plate bound anti-CD3 and 1 ug/mL soluble anti-CD28 overnight and supernatant was collected for AlphaLISA IL2 assay. The IL-2 production was measured as AlphaLISA (Perkin Elmer) signal counts using Envision plate reader. Human Blood was obtained from healthy volunteer through Stanford Blood Center. Blood was collected by venipuncture into sodium heparin tubes. Blood was layered over Ficoll-Histopaque in 50 mL conical tube and centrifuged at 2000 rpm for 20 minutes at rt. Mononuclear cells were collected into 50 mL conical tubes, pooled and diluted with 1×PBS to make up final volume to 50 mL in each tube. Cells were pelleted at 1500 rpm for 5 minutes and cells are washed two times. The cells were counted in Vi-Cell using trypan blue to determine cell number and viability. PBMCs were then resuspended in RPMI 1640 with 10% fetal bovine serum at a concentration 1×106 cells/mL.

A 96-well polystyrene plate was coated with 2.5 ug/mL anti-CD3 in PBS overnight at 4° C. The wells in column one were coated with PBS only for unstimulated controls. Test compounds were dissolved at 10 mM in 100% DMSO and 1:3 serial dilutions of compounds were prepared in DMSO. The compounds were further diluted in RPMI with 10% fetal bovine serum medium to make final DMSO 0.2% in 96-well polypropylene plate. To treat PBMC with compounds, 100 uL of 1×105 cells were cultured in 96-well polypropylene plate. Then 8 uL of each diluted compound was added in the corresponding wells in duplicate and 8 uL of medium with 2.5% DMSO was added to control wells. The plates were incubated at 37° C. incubator for 30 min. The anti-CD3 coated plates were washed with PBS twice. 92 uL of media containing 1 ug/mL anti-CD28 were added to all wells except unstimulated controls. In unstimulated wells, 92 uL medium was added. Plates were incubated overnight at 37° C., 5% $CO_2$ incubator.

The next day, 150 uL of supernatant was removed from each well for AlphaLISA IL2 assay. According to manufacturer's protocol (Perkin Elmer), 1× buffer, IL2 standards (10 conc.), 2.5× acceptor plus biotinylated beads mixture, 2× streptavidin donor beads were prepared. To each well, 2.5 uL standards or samples were added and then 10 uL of 2.5× beads were added to each well. The plate was sealed with aluminum plate sealer and incubated at room temp on shaker for 1 h. 12.5 uL of streptavidin donor beads were added to each well in dark room. The plate was sealed with aluminum plate sealer and incubated at room temp on shaker for 30 min. The plate was read in an Envision plate reader.

The $IC_{50}$ for each compound was determined from a ten-point dose response curve for all compounds, each dose being tested in duplicate wells. The $IC_{50}$ represents the concentration of a compound that shows 50% inhibition of IL-2 production in response to anti-CD3+anti-CD28 stimulated PBMCs with compound to 50% of that in control wells without compounds, and was calculated using curve fitting software (Graphpad Prism, San Diego, Calif.).

Example 4

Recovery of Enzymatic Activity Upon Dialysis

The dialysis assay was done to determine if a compound binds reversibly or irreversibly to immunoproteasome thereby resulting in reversible or irreversible inhibition of proteasome activity. Compounds exhibiting an irreversible mode of binding will demonstrate no significant return of enzymatic activity following extensive dialysis. Partial or complete recovery of proteasome activity over extended periods of time during dialysis is indicative of slow off-rate kinetics due to formation of a reversible covalent bond. For rapidly reversible compounds complete recovery of proteasome activity upon dialysis should be observed.

A solution containing immunoproteasome was incubated with a compound described herein (test compound) or (S)-4-methyl-N—((S)-1-(((S)-4-methyl-1-((R)-2-methyloxiran-2-yl)-1-oxopentan-2-yl)amino)-1-oxo-3-phenylpropan-2-yl)-2-((S)-2-(2-morpholino-acetamido)-4-phenylbutanamido)-pentanamide (reference compound), an irreversible covalent inhibitor of the immunoproteasome which targets the catalytic threonine of the immunoproteasome subunits (see Kuhn, D. J., et al. 2007. Potent activity of carfilzomib, a novel, irreversible inhibitor of the ubiquitin-proteasome pathway, against preclinical models of multiple myeloma. Blood, 110(9), 3281-3290). Following pre-incubation, the solution containing immunoproteasome and the test compound or reference compound was dialyzed at rt in a buffer of 50 mM Hepes pH 7.5, 0.1% bovine serum albumin, 5 mM magnesium chloride, 1 mM dithiothreitol, and 0.01% Triton X-100 for 1 day, 2 days, and 3 days with a change of dialysis buffer twice daily. Following dialysis, enzymatic activity was measured using the Caliper-based proteasome activity assay (Caliper Life Sciences, Hopkinton, Mass.). The level of activity of solution with test or reference compound was compared to control samples (i.e., proteasome solution with no inhibitor) also dialyzed for 1 day, 2 days, and 3 days with a change of dialysis buffer twice daily.

Example 5

Durability of Binding in Cells

The durability of binding of proteasome inhibitors was assessed in cells using washout assays and the Proteasome-Glo™ Reagent kit. THP-1 cells, HT-29 cells, or PBMC were incubated with an 8-fold dilution series of inhibitor for 2 h. Following 2 h of incubation, cells were washed using 3 occasions of centrifugation followed by resuspension in culture medium. Following inhibitor washout, cells were returned to culture for either 30 minutes, 4 h, or 18 h. Cells were then transferred to white 384 plates, and 20 uL of Proteasome-Glo™ Reagent was added to each well for 10 minutes. Plates were then read on an Analyst HT plate reader using luminescence mode. The percent inhibition of activity was plotted as a function of log compound concentration. The $IC_{50}$ was then calculated for each compound using Prism software from GraphPad.

| Synthetic Ex #14 | PBMC/LMP7 $IC_{50}$ (nM) | HT29/B5c $IC_{50}$ (nM) | PBMC/LMP2 $IC_{50}$ (nM) |
|---|---|---|---|
| 30 min | 50 | 82 | 27 |
| 4 hr | 93 | 87 | 505 |
| 18 hr | 146 | 1849 | 2962 |

nd = not determined

Example 6

Biochemical Durability of Binding

The durability of binding of proteasome inhibitors was assessed in cells using purified constitutive and immune proteasome and an ELISA-based active site occupancy assay called Pro-CISE. Here, occupancy of a test compound within the active site is measured in a time dependent fashion by blocking binding of a high affinity probe to the proteasome. A buffer of 20 mM Tris-HCl pH 8, 0.5 mM EDTA, 0.03% SDS is utilized for initial steps. 200 nM test compound is incubated with 60 nM proteasome for 1 h at rt to facilitate compound binding. The mixture is then diluted 50-fold, and a high concentration of 5 uM biotinylated proteasome active binding probe (PABP) is added (See Kirk et al. Meth Mol Biol 1172:114 (2014)) at 1, 3, 6, and 24 hrs following dilution. The probe will bind irreversibly to any proteasome sites that become available following dissociation of the test molecule, providing a read-out of the test compound's durability. The ELISA steps of the procedure utilize a buffer of phosphate buffered saline, 1% bovine serum albumin, 0.1% Tween-20. Streptavidin coated ELISA plates are pre-blocked with ELISA buffer, buffer is removed, and the following are added: 20 uL ELISA buffer, 70 uL 8M guanidine HCl in 20 mM Tris HCl pH 8.0 with 0.5 mM EDTA, and 10 uL of PABP-treated proteasome samples. Mixture is incubated for 1 h at rt. Plates are washed, incubated with subunit selective immune or constitutive primary antibody overnight at 4° C., washed, incubated with secondary antibody for 2 hrs at rt, washed, and detected using SuperSignal ELISA Pico Kit solution and luminescence is detected on a Perkin Elmer Envision. The % occupancy at each time point is determined by normalization to conditions with no test compound (maximum signal) or no proteasome (minimum signal) and the compound dissociation half-life ($t_{1/2}$) is determined by fitting the time course to a one-phase exponential decay.

| Synthetic Ex # | LMP7 subunit $t_{1/2}$ (hrs) | β5c subunit $t_{1/2}$ (hrs) | LMP2 subunit $t_{1/2}$ (hrs) |
|---|---|---|---|
| 2 | 19.7 | 3.0 | >40 |
| 5 | >40 | 4.6 | >40 |
| 6 | >40 | 13 | >40 |
| 8 | 38.5 | 17.5 | >40 |
| 13 | 3.7 | 0.8 | nd |
| 14 | 38.3 | 6.0 | nd |
| 15 | 26.3 | 1.3 | nd |
| 20 | 20.3 | <0.5 | 0.5 |
| 21 | >40 | <0.5 | 2.9 |
| 22 | 2.8 | <0.5 | 0.6 |
| 23 | 2.5 | <0.5 | 0.8 |
| 24 | 3.8 | <0.5 | 0.6 |
| 25 | 13.8 | <0.5 | 4.8 |
| 26 | 16.1 | nd | 3.3 |
| 32 | 16.3 | 1.0 | <0.5 |
| 41 | >40 | nd | nd |
| 43 | 39.1 | nd | nd |
| 44 | 24.9 | nd | nd |
| 45 | >40 | nd | nd |
| 52 | 23.5 | nd | nd |
| 54 | >40 | nd | nd |
| 55 | 11.6 | nd | nd |
| 60 | >40 | nd | nd |
| 62 | >40 | nd | nd |
| 63 | >40 | nd | nd |
| 65 | 1.72 | nd | nd |
| 66 | 0.68 | nd | nd |
| 67 | 1.39 | nd | nd |
| 68 | <0.5 | nd | nd |
| 70 | 12.46 | nd | nd |
| 71 | <0.5 | nd | nd |
| 72 | 0.78 | nd | nd |
| 73 | >40 | nd | nd |
| 74 | <0.5 | nd | nd |
| 75 | 0.55 | nd | nd |
| 76 | >40 | nd | nd |
| 77 | 4.2 | nd | nd |
| 78 | 28.5 | nd | nd |
| 79 | 3.45 | nd | nd |
| 80 | <0.5 | nd | nd |
| 81 | >40 | nd | nd |
| 82 | >40 | nd | nd |
| 83 | >40 | nd | nd |
| 84 | >40 | nd | nd |
| 85 | <0.5 | nd | nd |
| 86 | <0.5 | nd | nd |
| 87 | 13 | nd | nd |
| 89 | 3.7 | nd | nd |
| 90 | 0.76 | nd | nd |
| 95 | 1.7 | nd | nd |
| 96 | 1.2 | nd | nd |
| 97 | >40 | nd | nd |
| 98 | >40 | nd | nd |
| 103 | 35 | nd | nd |
| 104 | 1.6 | nd | nd |
| 105 | >40 | nd | nd |
| 106 | 4 | nd | nd |
| 107 | >40 | nd | nd |

-continued

| Synthetic Ex # | LMP7 subunit $t_{1/2}$ (hrs) | β5c subunit $t_{1/2}$ (hrs) | LMP2 subunit $t_{1/2}$ (hrs) |
|---|---|---|---|
| 108 | 3.9 | nd | nd |
| 109 | 1.5 | nd | <0.5 |
| 111 | 2.2 | nd | <0.5 |
| 113 | 1.9 | nd | <0.5 |
| 114 | >40 | nd | <0.5 |
| 115 | 0.55 | nd | 0.78 |
| 116 | >40 | nd | <0.5 |
| 117 | 3.0 | nd | nd |
| 118 | >40 | nd | nd |
| 119 | >40 | nd | nd |
| 120 | 1.5 | nd | nd |
| 121 | 1.4 | nd | nd |
| 122 | >40 | nd | nd |
| 123 | >40 | nd | nd |
| 125 | 2.1 | nd | nd |
| 126 | >40 | nd | nd |
| 127 | >40 | nd | nd |
| 128 | >40 | nd | nd |
| 129 | >40 | nd | nd |
| 130 | >40 | nd | nd |
| 131 | >40 | nd | nd |
| 132 | >40 | nd | nd |
| 133 | >40 | nd | nd |
| 134 | >40 | nd | nd |
| 135 | >40 | nd | nd |
| 136 | >40 | nd | nd |
| 137 | >40 | nd | nd |
| 138 | 32 | nd | nd |

nd = not determined

The foregoing disclosure has been described in some detail by way of illustration and example, for purposes of clarity and understanding. It will be obvious to one of skill in the art that changes and modifications may be practiced within the scope of the appended claims. Therefore, it is to be understood that the above description is intended to be illustrative and not restrictive. The scope of the disclosure should, therefore, be determined not with reference to the above description, but should instead be determined with reference to the following appended claims, along with the full scope of equivalents to which such claims are entitled.

This application refers to various issued patents, published patent applications, journal articles, and other publications, each of which are incorporated herein by reference.

What is claimed is:

1. A compound of Formula (I'):

(I')

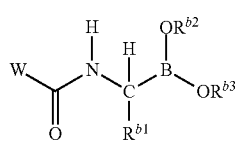

or a pharmaceutically acceptable salt thereof, wherein:

W is —O—P-Q-C($R^{8a}$)═C($R^{8b}$)($R^{8c}$) or —N(R')—P-Q-C($R^{8a}$)═C($R^{8b}$)($R^{8c}$);

wherein:

R' is H or alkyl;

P is -alkyl-N(R)—, -alkyl-aryl-N(R)—, or

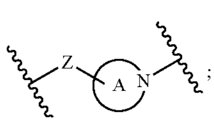

;

Z is a covalent bond, -alkyl-, or -alkyl-O-alkyl-;

ring A with the ring nitrogen atom shown is an optionally substituted saturated mono- or multicyclic 4 to 10 membered heterocyclyl;

each R independently is hydrogen or alkyl;

Q is C(═O)— or S(═O)$_2$—;

$R^{8a}$ is hydrogen, halogen, or cyano;

$R^{8b}$ is hydrogen or alkyl; or $R^{8a}$ and $R^{8b}$ are taken together to form a bond; and $R^{8c}$ is hydrogen or alkyl which is optionally substituted with 1-2 substituents chosen from cycloalkyl and heterocyclyl, wherein said heterocyclyl is optionally substituted with 1-2 substituents chosen from halo, alkyl, alkoxycarbonyl, and heterocyclyl;

$R^{b1}$ is alkyl which is optionally substituted with 1-2 substituents chosen from cycloalkenyl, aryl and heteroaryl, wherein each of said aryl and heteroaryl is optionally substituted with 1-2 substituents chosen from alkyl, halo, hydroxy, alkoxy, cyano, haloalkyl, —NH$_2$, —NH(alkyl), and —N(alkyl)$_2$;

$R^{b2}$ and $R^{b3}$ are independently hydrogen or $C_{1-6}$ alkyl; or $R^{b2}$ and $R^{b3}$ together with the boron atom to which they are shown attached form an optionally substituted cyclic boronic ester having 2 to 20 carbons, and optionally containing one or two additional heteroatoms chosen from N, O and S; and provided that when W is –O-P-Q-C($R^{8a}$)═C($R^{8b}$)($R^{8c}$), then P is not -alkyl-N(R)— or

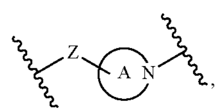

, wherein ring A with the ring nitrogen atom as shown is an optionally substituted saturated monocyclic five- to seven-membered heterocyclyl with only the one nitrogen shown as the ring heteroatom, and wherein Z is connected to ring A at a carbon atom adjacent to the ring nitrogen atom.

2. The compound and/or a pharmaceutically acceptable salt thereof of claim 1, wherein:

said -alkyl-N(R)— of P is —(CH$_2$)$_{1-4}$N(R)—;

said -alkyl-aryl-N(R)— of P is —(CH$_2$)$_{1-4}$-phenyl-N(R)—;

said -alkyl- of Z in

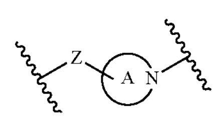

of P is —(CH$_2$)$_{1-4}$—; or said -alkyl-O-alkyl- of Z in

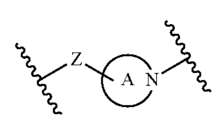

of P is —(CH$_2$)$_{1-4}$—O—(CH$_2$)$_{1-4}$—.

3. The compound or a pharmaceutically acceptable salt thereof of claim 2, wherein:

said -alkyl-N(R)— of P is
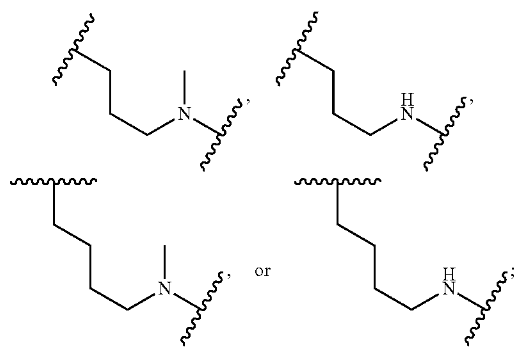
said -alkyl-aryl-N(R)— of P is
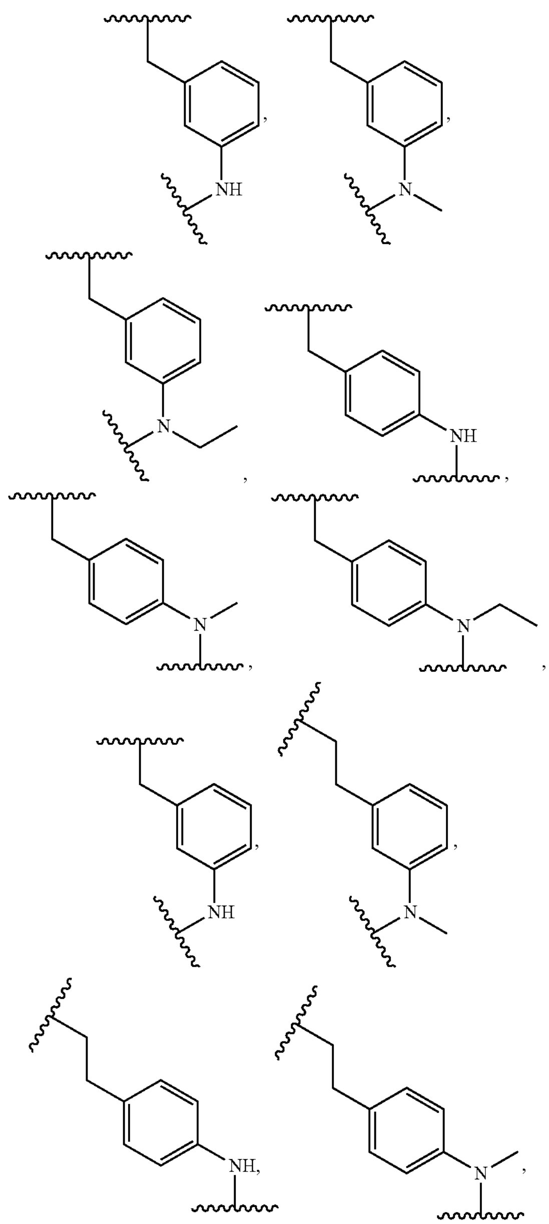
-continued
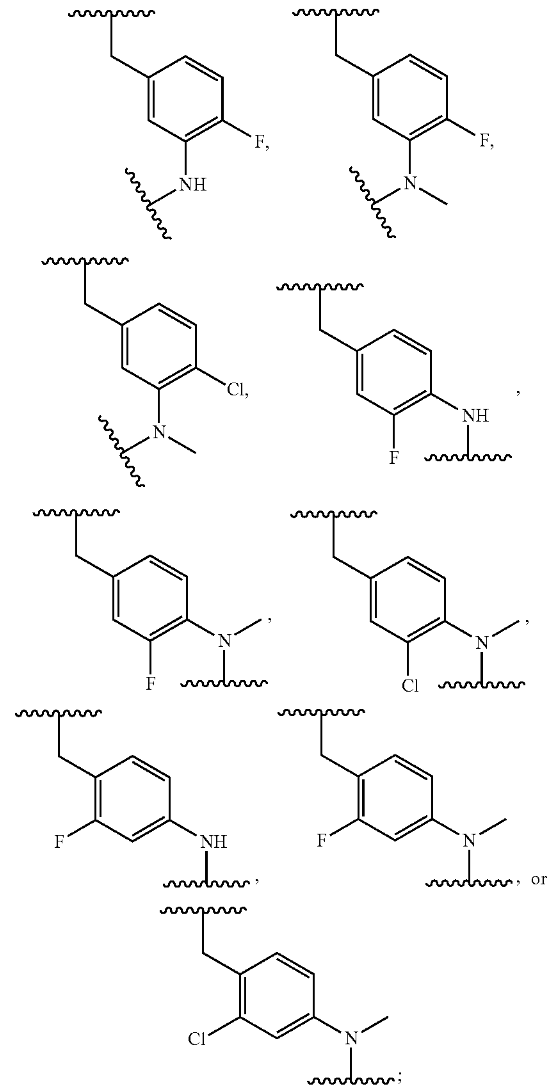
4. The compound or a pharmaceutically acceptable salt thereof of claim 2 wherein $R^{8c}$ is an unsubstituted or substituted alkyl chosen from:
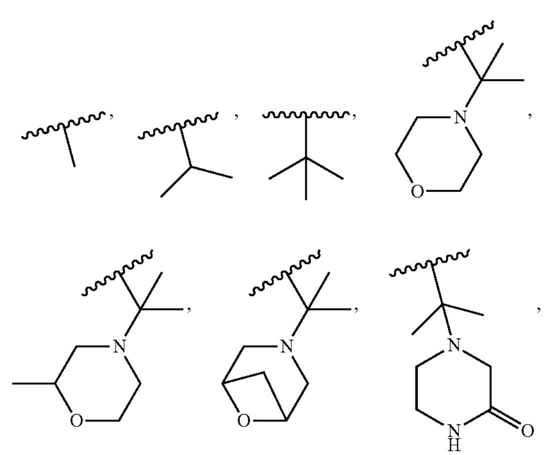

-continued
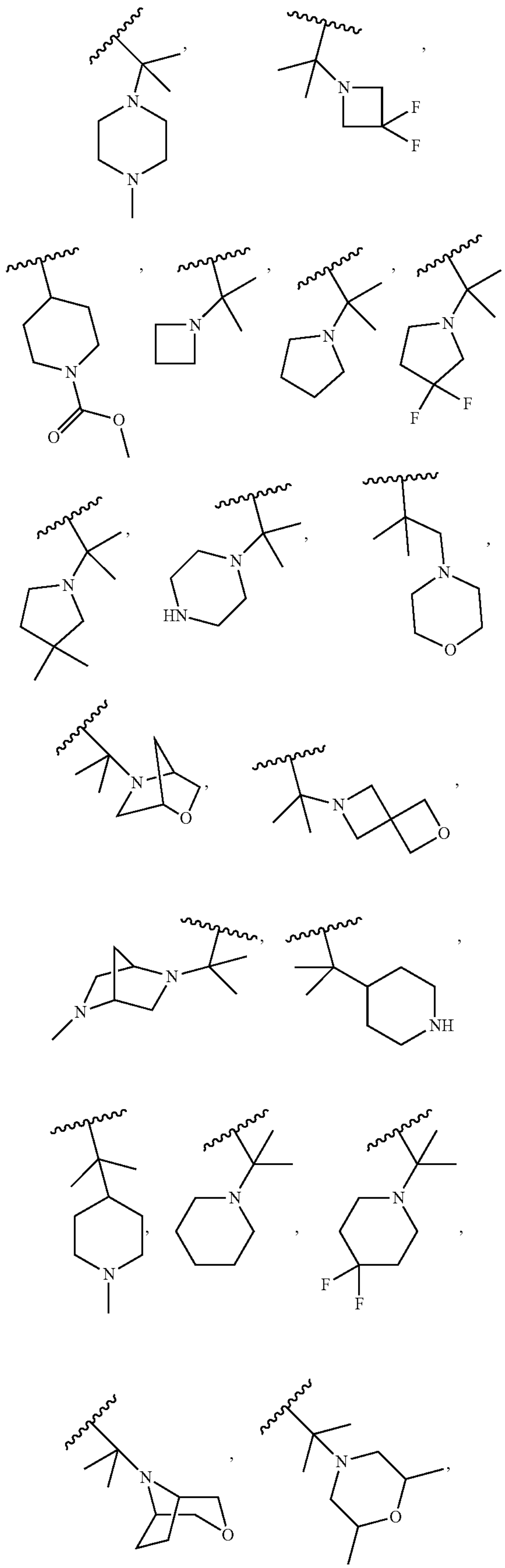
-continued
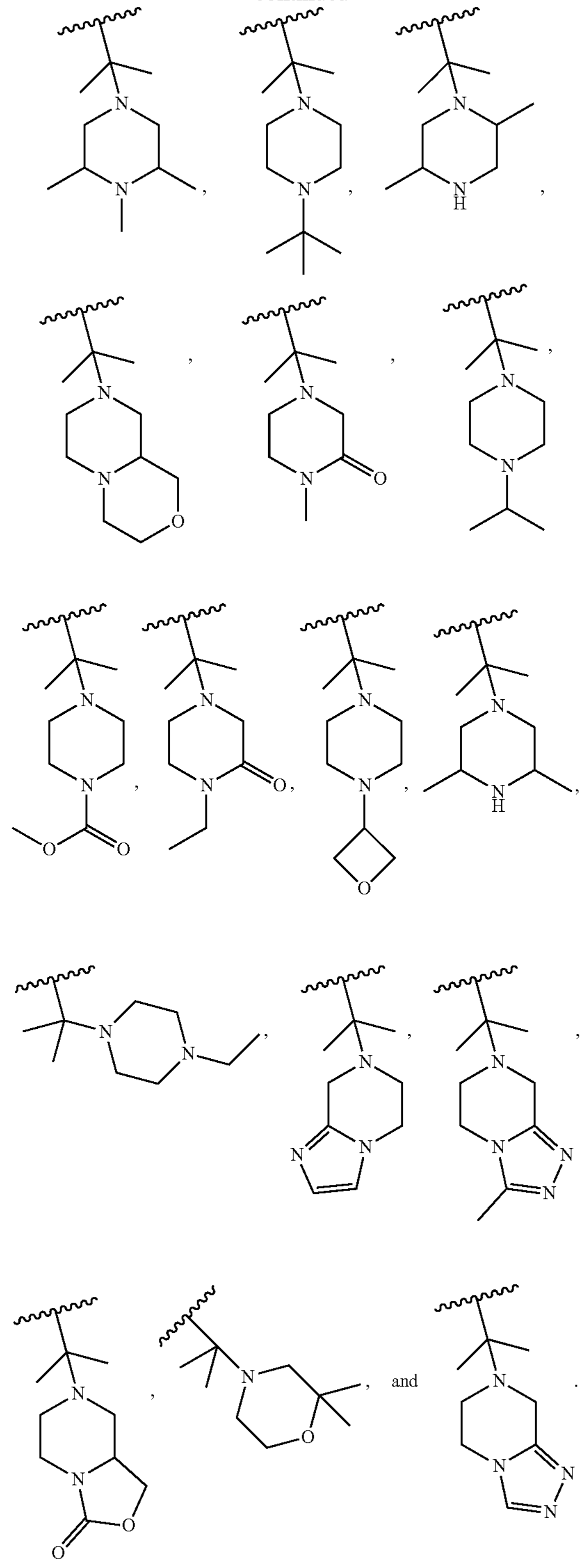
5. The compound or a pharmaceutically acceptable salt thereof of claim 1, wherein W is —O—P-Q-C($R^{8a}$)═C($R^{8b}$)($R^{8c}$).
6. The compound or a pharmaceutically acceptable salt thereof of claim 5, wherein P is

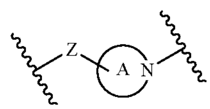

and Z is a covalent bond.

7. The compound or a pharmaceutically acceptable salt thereof of claim 5, wherein p is chosen from

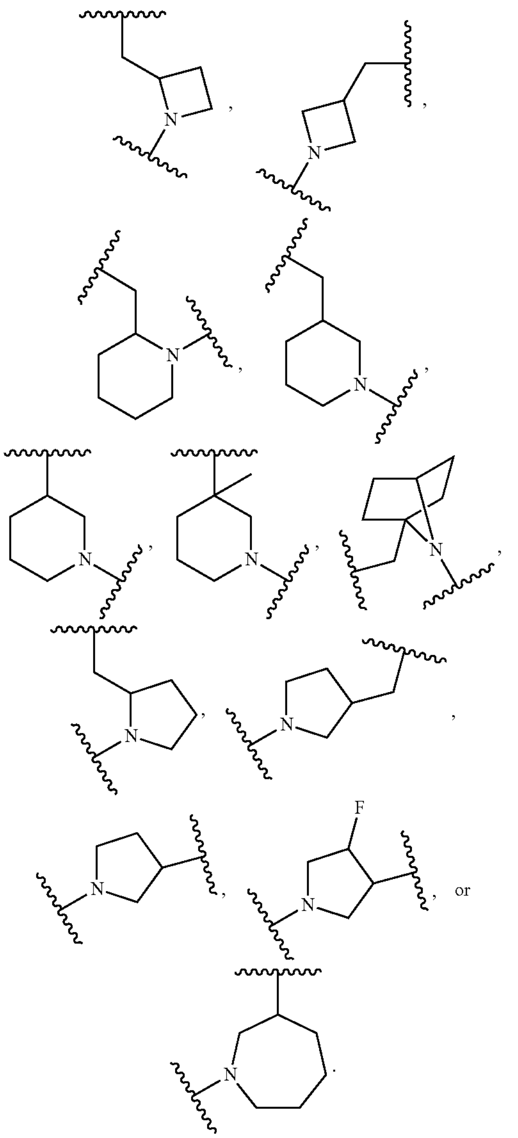

8. The compound or a pharmaceutically acceptable salt thereof of claim 1, wherein said $R^{b1}$ is chosen from —$CH_2CH(CH_3)_2$, —$CH_2C(CH_3)_3$, —$CH_2$-cyclopentenyl, —$CH_2$-phenyl, —$CH_2$-phenyl-methyl, —$CH_2$-phenyl-ethyl, —$CH_2CH_2$-phenyl, —$CH_2$-phenyl-trifluoromethyl, —$CH_2$-fluorophenyl, —$CH_2$-thiophenyl, —$CH_2$—$CH_2$-benzofuranyl, —$CH_2CH_2$-benzimidazolyl, —$CH_2CH_2$-dihydroindolyl, —$CH_2$-benzofuranyl, —$CH_2$-benzimidazolyl, and —$CH_2$-dihydroindolyl.

9. The compound or a pharmaceutically acceptable salt thereof of claim 1, wherein $R^{8a}$ is hydrogen or cyano and $R^{8b}$ is hydrogen or alkyl; or $R^{8a}$ and $R^{8b}$ are taken together to form a covalent bond; or $R^{8a}$, $R^{8b}$ and $R^{8c}$ are each hydrogen; or $R^{8a}$ is halogen, and $R^{8b}$ and $R^{8c}$ are each hydrogen.

10. The compound or a pharmaceutically acceptable salt thereof of claim 1, wherein $R^{b2}$ and $R^{b3}$ are each hydrogen; or $R^{b2}$ and $R^{b3}$ together with the boron atom to which they are shown attached form an optionally substituted cyclic boronic ester of the formula

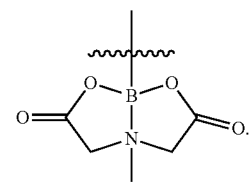

11. A compound chosen from:

((R)-1-(((((S)-1-(2-cyano-4,4-dimethylpent-2-enoyl)piperidin-3-yl)methoxy)carbonyl)amino)-2-(p-tolyl)ethyl)boronic acid;

((R)-1-(((((S)-1-(2-cyano-4,4-dimethylpent-2-enoyl)pyrrolidin-3-yl)methoxy)carbonyl)amino)-2-(p-tolyl)ethyl)boronic acid;

((R)-1-(((((S)-1-acryloylazetidin-2-yl)methoxy)carbonyl)amino)-2-phenylethyl)boronic acid;

((R)-1-(((((S)-1-(2-cyano-4-(3,3-difluoropyrrolidin-1-yl)-4-methylpent-2-enoyl)piperidin-3-yl)methoxy)carbonyl)amino)-2-(p-tolyl)ethyl)boronic acid;

((R)-1-(((((S)-1-(2-cyano-4-(3,3-difluoropyrrolidin-1-yl)-4-methylpent-2-enoyl)piperidin-3-yl)methoxy)carbonyl)amino)-2-phenylethyl)boronic acid;

((R)-1-(((((R)-1-(2-cyano-4-(3,3-difluoropyrrolidin-1-yl)-4-methylpent-2-enoyl)azetidin-2-yl)methoxy)carbonyl)amino)-2-phenylethyl)boronic acid;

((R)-1-(((((R)-1-(2-cyano-4-(3,3-difluoropyrrolidin-1-yl)-4-methylpent-2-enoyl)piperidin-3-yl)oxy)carbonyl)amino)-2-phenylethyl)boronic acid;

(R)-(1-((((7-(2-cyano-4-(3,3-difluoropyrrolidin-1-yl)-4-methylpent-2-enoyl)-7-azabicyclo[2.2.1]heptan-1-yl)methoxy)carbonyl)amino)-2-phenylethyl)boronic acid;

((R)-1-(((((S)-1-(2-cyano-4-(3,3-difluoropyrrolidin-1-yl)-4-methylpent-2-enoyl)piperidin-3-yl)oxy)carbonyl)amino)-2-phenylethyl)boronic acid;

((R)-1-(((((R)-1-acryloylazetidin-2-yl)methoxy)carbonyl)amino)-2-(benzofuran-3-yl)ethyl)boronic acid;

(R)-(1-((((7-acryloyl-7-azabicyclo[2.2.1]heptan-1-yl)methoxy)carbonyl)amino)-2-(benzofuran-3-yl)ethyl)boronic acid;

((R)-1-(((((S)-1-acryloylpiperidin-3-yl)oxy)carbonyl)amino)-2-(benzofuran-3-yl)ethyl)boronic acid;

((R)-1-(((((S)-1-acryloylpiperidin-3-yl)oxy)carbonyl)amino)-2-(4-(trifluoromethyl)phenyl)ethyl)boronic acid;

((R)-1-(((((S)-1-acryloylpiperidin-3-yl)oxy)carbonyl)amino)-2-phenylethyl)boronic acid;

((R)-2-(benzofuran-3-yl)-1-(((((S)-1-(2-cyano-4-(3,3-dimethylpyrrolidin-1-yl)-4-methylpent-2-enoyl)piperidin-3-yl)oxy)carbonyl)amino)ethyl)boronic acid;

((R)-1-(((((S)-1-(2-cyano-4-(3,3-dimethylpyrrolidin-1-yl)-4-methylpent-2-enoyl)piperidin-3-yl)oxy)carbonyl)amino)-2-(4-(trifluoromethyl)phenyl)ethyl)boronic acid;

((R)-1-(((((S)-1-acryloylpiperidin-3-yl)oxy)carbonyl)amino)-2-(4-fluorophenyl)ethyl)boronic acid;
(R)-(1-((((7-acryloyl-7-azabicyclo[2.2.1]heptan-1-yl)methoxy)carbonyl)amino)-3-phenylpropyl)boronic acid;
((R)-1-(((((S)-1-(2-cyano-4-(3,3-dimethylpyrrolidin-1-yl)-4-methylpent-2-enoyl)piperidin-3-yl)oxy)carbonyl)amino)-2-(4-fluorophenyl)ethyl)boronic acid;
((R)-2-(benzofuran-3-yl)-1-(((((S)-1-(2-cyano-4-(3,3-difluoropyrrolidin-1-yl)-4-methylpent-2-enoyl)piperidin-3-yl)oxy)carbonyl)amino)ethyl)boronic acid;
((R)-1-(((((S)-1-(2-fluoroacryloyl)piperidin-3-yl)oxy)carbonyl)amino)-2-(4-fluorophenyl)ethyl)boronic acid;
(R)-(1-((((7-(2-fluoroacryloyl)-7-azabicyclo[2.2.1]heptan-1-yl)methoxy)carbonyl)amino)-2-(4-fluorophenyl)ethyl)boronic acid;
(R)-(1-((((7-acryloyl-7-azabicyclo[2.2.1]heptan-1-yl)methoxy)carbonyl)amino)-2-(4-fluorophenyl)ethyl)boronic acid;
(R)-(1-((((7-(2-cyano-4-(3,3-difluoropyrrolidin-1-yl)-4-methylpent-2-enoyl)-7-azabicyclo[2.2.1]heptan-1-yl)methoxy)carbonyl)amino)-3-phenylpropyl)boronic acid;
((R)-1-(((((S)-1-(2-cyano-4-(3,3-difluoropyrrolidin-1-yl)-4-methylpent-2-enoyl)piperidin-3-yl)oxy)carbonyl)amino)-2-(4-fluorophenyl)ethyl)boronic acid;
((R)-1-(((((S)-1-(2-cyano-4-methyl-4-(4-(oxetan-3-yl)piperazin-1-yl)pent-2-enoyl)piperidin-3-yl)oxy)carbonyl)amino)-2-phenylethyl)boronic acid;
((R)-1-(((((S)-1-(2-cyano-4-methyl-4-(4-methylpiperazin-1-yl)pent-2-enoyl)piperidin-3-yl)oxy)carbonyl)amino)-2-phenylethyl)boronic acid;
(R)-(1-((((7-(2-cyano-4-methyl-4-morpholinopent-2-enoyl)-7-azabicyclo[2.2.1]heptan-1-yl)methoxy)carbonyl)amino)-2-phenylethyl)boronic acid;
(R)-(1-((((7-(2-cyano-4-methyl-4-morpholinopent-2-enoyl)-7-azabicyclo[2.2.1]heptan-1-yl)methoxy)carbonyl)amino)-2-(4-fluorophenyl)ethyl)boronic acid;
((R)-1-(((((S)-1-(2-cyano-4-(4-(methoxycarbonyl)piperazin-1-yl)-4-methylpent-2-enoyl)piperidin-3-yl)oxy)carbonyl)amino)-2-phenylethyl)boronic acid;
(R)-(1-((((7-(2-cyano-4-(3,3-difluoropyrrolidin-1-yl)-4-methylpent-2-enoyl)-7-azabicyclo[2.2.1]heptan-1-yl)methoxy)carbonyl)amino)-2-(4-fluorophenyl)ethyl)boronic acid;
((1R)-1-((((1-acryloyl-3-methylpiperidin-3-yl)oxy)carbonyl)amino)-2-phenylethyl)boronic acid;
(R)-(1-((((1-acryloylazetidin-3-yl)methoxy)carbonyl)amino)-2-phenylethyl)boronic acid;
((R)-1-(((((S)-1-((E)-2-cyano-4,4-dimethylpent-2-enoyl)pyrrolidin-3-yl)oxy)carbonyl)amino)-2-phenylethyl)boronic acid;
((R)-1-(((((S)-1-acryloylpyrrolidin-3-yl)oxy)carbonyl)amino)-2-phenylethyl)boronic acid;
((R)-1-(((((S)-1-(2-cyano-4-(3,3-difluoropyrrolidin-1-yl)-4-methylpent-2-enoyl)pyrrolidin-3-yl)oxy)carbonyl)amino)-2-phenylethyl)boronic acid;
((R)-1-(((((R)-1-(2-cyano-4-(3,3-difluoropyrrolidin-1-yl)-4-methylpent-2-enoyl)pyrrolidin-3-yl)oxy)carbonyl)amino)-2-phenylethyl)boronic acid;
((1R)-1-((((1-acryloyl-3-methylpiperidin-3-yl)oxy)carbonyl)amino)-2-(4-fluorophenyl)ethyl)boronic acid;
((R)-1-(((((R)-1-(2-cyano-4-(3,3-difluoropyrrolidin-1-yl)-4-methylpent-2-enoyl)-3-methylpiperidin-3-yl)oxy)carbonyl)amino)-2-phenylethyl)boronic acid;
((R)-1-(((((S)-1-(2-cyano-4-(3,3-difluoropyrrolidin-1-yl)-4-methylpent-2-enoyl)-3-methylpiperidin-3-yl)oxy)carbonyl)amino)-2-phenylethyl)boronic acid;
((1R)-1-((((1-(2-cyano-4-(3,3-difluoropyrrolidin-1-yl)-4-methylpent-2-enoyl)-3-methylpiperidin-3-yl)oxy)carbonyl)amino)-2-(4-fluorophenyl)ethyl)boronic acid;
((R)-1-(((((S)-1-(2-cyano-4-(3,3-difluoropyrrolidin-1-yl)-4-methylpent-2-enoyl)pyrrolidin-3-yl)methoxy)carbonyl)amino)-2-phenylethyl)boronic acid;
((R)-1-(((((S)-1-(2-cyano-4-(4-(methoxycarbonyl)piperazin-1-yl)-4-methylpent-2-enoyl)pyrrolidin-3-yl)methoxy)carbonyl)amino)-2-phenylethyl)boronic acid;
((R)-1-(((((S)-1-(2-cyano-4-methyl-4-((S)-3-oxotetrahydro-3H-oxazolo[3,4-a]pyrazin-7(1H)-yl)pent-2-enoyl)piperidin-3-yl)oxy)carbonyl)amino)-2-phenylethyl)boronic acid;
((R)-1-(((((S)-1-(2-cyano-4-methyl-4-((R)-3-oxotetrahydro-3H-oxazolo[3,4-a]pyrazin-7(1H)-yl)pent-2-enoyl)piperidin-3-yl)oxy)carbonyl)amino)-2-phenylethyl)boronic acid;
((R)-1-(((((S)-1-(2-cyano-4-methyl-4-morpholinopent-2-enoyl)pyrrolidin-3-yl)methoxy)carbonyl)amino)-2-phenylethyl)boronic acid;
((R)-1-(((((3R,4R)-1-acryloyl-4-fluoropyrrolidin-3-yl)oxy)carbonyl)amino)-2-phenylethyl)boronic acid;
((R)-1-(((((R)-1-(2-cyano-4-methyl-4-morpholinopent-2-enoyl)azepan-3-yl)oxy)carbonyl)amino)-2-phenylethyl)boronic acid;
((R)-1-(((((S)-1-(2-cyano-4-methyl-4-morpholinopent-2-enoyl)azepan-3-yl)oxy)carbonyl)amino)-2-phenylethyl)boronic acid;
((R)-1-(((((R)-1-(2-cyano-4-(3,3-difluoropyrrolidin-1-yl)-4-methylpent-2-enoyl)azepan-3-yl)oxy)carbonyl)amino)-2-phenylethyl)boronic acid;
((R)-1-(((((S)-1-(2-cyano-4-(3,3-difluoropyrrolidin-1-yl)-4-methylpent-2-enoyl)azepan-3-yl)oxy)carbonyl)amino)-2-phenylethyl)boronic acid;
((R)-1-(((((R)-1-(2-cyano-4-(4-(methoxycarbonyl)piperazin-1-yl)-4-methylpent-2-enoyl)azepan-3-yl)oxy)carbonyl)amino)-2-phenylethyl)boronic acid;
((R)-1-(((((S)-1-(2-cyano-4-(4-(methoxycarbonyl)piperazin-1-yl)-4-methylpent-2-enoyl)azepan-3-yl)oxy)carbonyl)amino)-2-phenylethyl)boronic acid;
((R)-1-(((((3S,4S)-1-(2-cyano-4-(3,3-difluoropyrrolidin-1-yl)-4-methylpent-2-enoyl)-4-fluoropyrrolidin-3-yl)oxy)carbonyl)amino)-2-phenylethyl)boronic acid;
((R)-1-(((((3S,4S)-1-acryloyl-4-fluoropyrrolidin-3-yl)oxy)carbonyl)amino)-2-phenylethyl)boronic acid;
((R)-1-(((((3R,4S)-1-(2-cyano-4-(3,3-difluoropyrrolidin-1-yl)-4-methylpent-2-enoyl)-4-fluoropyrrolidin-3-yl)oxy)carbonyl)amino)-2-phenylethyl)boronic acid;
((R)-1-(((((3R,4R)-1-(2-cyano-4-(3,3-difluoropyrrolidin-1-yl)-4-methylpent-2-enoyl)-4-fluoropyrrolidin-3-yl)oxy)carbonyl)amino)-2-phenylethyl)boronic acid;
((R)-1-((((7-(2-cyano-4-((2S,6R)-2,6-dimethylmorpholino)-4-methylpent-2-enoyl)-7-azabicyclo[2.2.1]heptan-1-yl)methoxy)carbonyl)amino)-2-phenylethyl)boronic acid;
((R)-1-(((((3R,4S)-1-acryloyl-4-fluoropyrrolidin-3-yl)oxy)carbonyl)amino)-2-phenylethyl)boronic acid;
(R)-(1-((((7-(2-cyano-4-methyl-4-(4-oxa-7-azaspiro[2.5]octan-7-yl)pent-2-enoyl)-7-azabicyclo[2.2.1]heptan-1-yl)methoxy)carbonyl)amino)-2-phenylethyl)boronic acid;
((R)-1-(((((S)-1-(2-cyano-4-(3,3-difluoropyrrolidin-1-yl)-4-methylpent-2-enoyl)piperidin-3-yl)oxy)carbonyl)amino)-2-(cyclopent-1-en-1-yl)ethyl)boronic acid;

((R)-1-((((7-(2-cyano-4-methyl-4-((R)-2-methylmorpholino)pent-2-enoyl)-7-azabicyclo[2.2.1]heptan-1-yl)methoxy)carbonyl)amino)-2-phenylethyl)boronic acid;

(R)-(1-((((7-(2-cyano-4-(2,2-dimethylmorpholino)-4-methylpent-2-enoyl)-7-azabicyclo[2.2.1]heptan-1-yl)methoxy)carbonyl)amino)-2-phenylethyl)boronic acid;

((R)-1-(((((S)-1-(2-cyano-4-(4-(methoxycarbonyl)piperazin-1-yl)-4-methylpent-2-enoyl)piperidin-3-yl)oxy)carbonyl)amino)-2-(cyclopent-1-en-1-yl)ethyl)boronic acid;

((R)-1-(((((S)-1-(2-cyano-4-methyl-4-morpholinopent-2-enoyl)piperidin-3-yl)oxy)carbonyl)amino)-2-(cyclopent-1-en-1-yl)ethyl)boronic acid;

((R)-1-((((7-(2-cyano-4-methyl-4-((S)-2-methylmorpholino)pent-2-enoyl)-7-azabicyclo[2.2.1]heptan-1-yl)methoxy)carbonyl)amino)-2-phenylethyl)boronic acid;

((R)-1-((((7-(2-cyano-4-((2S,6S)-2,6-dimethylmorpholino)-4-methylpent-2-enoyl)-7-azabicyclo[2.2.1]heptan-1-yl)methoxy)carbonyl)amino)-2-phenylethyl)boronic acid;

((R)-1-(((((3S,4R)-1-acryloyl-4-fluoropyrrolidin-3-yl)oxy)carbonyl)amino)-2-phenylethyl)boronic acid;

((R)-1-(((((3S,4R)-1-(2-cyano-4-(3,3-difluoropyrrolidin-1-yl)-4-methylpent-2-enoyl)-4-fluoropyrrolidin-3-yl)oxy)carbonyl)amino)-2-phenylethyl)boronic acid;

((R)-1-((((7-(2-cyano-4-((2R,6R)-2,6-dimethylmorpholino)-4-methylpent-2-enoyl)-7-azabicyclo[2.2.1]heptan-1-yl)methoxy)carbonyl)amino)-2-phenylethyl)boronic acid;

((R)-1-(((((R)-1-(2-cyano-4-((2S,6R)-2,6-dimethylmorpholino)-4-methylpent-2-enoyl)azepan-3-yl)oxy)carbonyl)amino)-2-phenylethyl)boronic acid;

((R)-1-(((((R)-1-(2-cyano-4-((2R,6S)-2,6-dimethylmorpholino)-4-methylpent-2-enoyl)azepan-3-yl)oxy)carbonyl)amino)-2-phenylethyl)boronic acid;

((R)-1-(((((R)-1-(2-cyano-4-((2R,6R)-2,6-dimethylmorpholino)-4-methylpent-2-enoyl)azepan-3-yl)oxy)carbonyl)amino)-2-phenylethyl)boronic acid;

((R)-1-(((((R)-1-(2-cyano-4-methyl-4-((S)-2-methylmorpholino)pent-2-enoyl)azepan-3-yl)oxy)carbonyl)amino)-2-phenylethyl)boronic acid;

((R)-1-(((((R)-1-(2-cyano-4-methyl-4-((R)-2-methylmorpholino)pent-2-enoyl)azepan-3-yl)oxy)carbonyl)amino)-2-phenylethyl)boronic acid;

((1R)-1-((((7-(4-(6-oxa-3-azabicyclo[3.1.1]heptan-3-yl)-2-cyano-4-methylpent-2-enoyl)-7-azabicyclo[2.2.1]heptan-1-yl)methoxy)carbonyl)amino)-2-phenylethyl)boronic acid;

((R)-1-(((((R)-1-(2-cyano-4-methyl-4-(4-oxa-7-azaspiro[2.5]octan-7-yl)pent-2-enoyl)azepan-3-yl)oxy)carbonyl)amino)-2-phenylethyl)boronic acid;

((1R)-1-(((((3R)-1-(4-(6-oxa-3-azabicyclo[3.1.1]heptan-3-yl)-2-cyano-4-methylpent-2-enoyl)azepan-3-yl)oxy)carbonyl)amino)-2-phenylethyl)boronic acid;

((R)-1-(((((3R,4R)-1-acryloyl-4-fluoropyrrolidin-3-yl)oxy)carbonyl)amino)-2-(4-fluorophenyl)ethyl)boronic acid;

((R)-1-(((((R)-1-(2-cyano-4-(2,2-dimethylmorpholino)-4-methylpent-2-enoyl)azepan-3-yl)oxy)carbonyl)amino)-2-phenylethyl)boronic acid;

((R)-1-(((((R)-1-(2-cyano-4-methyl-4-morpholinopent-2-enoyl)azepan-3-yl)oxy)carbonyl)amino)-2-(4-fluorophenyl)ethyl)boronic acid;

((R)-1-(((((R)-1-(2-cyano-4-methyl-4-morpholinopent-2-enoyl)azepan-3-yl)oxy)carbonyl)amino)-2-(cyclopent-1-en-1-yl)ethyl)boronic acid;

((R)-1-(((((R)-1-(2-cyano-4-methylpent-2-enoyl)pyrrolidin-2-yl)methyl)ureido)-2-phenylethyl)boronic acid;

((R)-1-(3-(((R)-1-(2-cyano-4-methylpent-2-enoyl)piperidin-2-yl)methyl)ureido)-2-phenylethyl)boronic acid;

((R)-1-(3-(((S)-1-(2-cyano-4-methylpent-2-enoyl)pyrrolidin-2-yl)methyl)ureido)-2-phenylethyl)boronic acid;

((R)-1-(3-(((S)-1-(2-cyano-4-methylpent-2-enoyl)piperidin-2-yl)methyl)ureido)-2-phenylethyl)boronic acid;

((R)-1-(3-(((R)-1-acryloylpyrrolidin-2-yl)methyl)ureido)-2-phenylethyl)boronic acid;

((R)-1-(3-(((S)-1-acryloylpyrrolidin-2-yl)methyl)ureido)-2-phenylethyl)boronic acid;

((R)-1-(3-(((S)-1-acryloylpiperidin-2-yl)methyl)ureido)-2-phenylethyl)boronic acid;

((R)-1-(3-(((S)-1-(2-cyano-4,4-dimethylpent-2-enoyl)pyrrolidin-2-yl)methyl)ureido)-2-phenylethyl)boronic acid;

((R)-1-(3-(((S)-1-(2-cyano-4,4-dimethylpent-2-enoyl)piperidin-2-yl)methyl)ureido)-2-phenylethyl)boronic acid;

((R)-1-(3-(((R)-1-acryloylpyrrolidin-2-yl)methyl)ureido)-2-(benzofuran-3-yl)ethyl)boronic acid;

((R)-1-(3-(((S)-1-(2-cyano-4,4-dimethylpent-2-enoyl)pyrrolidin-2-yl)methyl)ureido)-2-(p-tolyl)ethyl)boronic acid;

((R)-1-(3-(((R)-1-(2-cyano-4,4-dimethylpent-2-enoyl)pyrrolidin-2-yl)methyl)ureido)-2-(p-tolyl)ethyl)boronic acid;

((R)-2-(benzofuran-3-yl)-1-(3-(((R)-1-(2-cyano-4,4-dimethylpent-2-enoyl)pyrrolidin-2-yl)methyl)ureido)ethyl)boronic acid;

((R)-2-(benzofuran-3-yl)-1-(3-(((R)-1-(2-cyano-4-methyl-4-morpholinopent-2-enoyl)pyrrolidin-2-yl)methyl)ureido)ethyl)boronic acid;

((R)-2-(benzofuran-3-yl)-1-(3-(((R)-1-(2-cyano-4-methyl-4-(4-(oxetan-3-yl)piperazin-1-yl)pent-2-enoyl)pyrrolidin-2-yl)methyl)ureido)ethyl)boronic acid;

((R)-2-(benzofuran-3-yl)-1-(3-(((R)-1-(2-cyano-4-(4,4-difluoropiperidin-1-yl)-4-methylpent-2-enoyl)pyrrolidin-2-yl)methyl)ureido)ethyl)boronic acid;

((R)-2-(benzofuran-3-yl)-1-(3-(((R)-1-(2-cyano-4-(3,3-difluoropyrrolidin-1-yl)-4-methylpent-2-enoyl)pyrrolidin-2-yl)methyl)ureido)ethyl)boronic acid;

((R)-1-(3-(((R)-1-(2-cyano-4-(3,3-difluoropyrrolidin-1-yl)-4-methylpent-2-enoyl)piperidin-2-yl)methyl)-3-methylureido)-2-phenylethyl)boronic acid;

((R)-1-(3-((S)-1-(2-cyano-4-(3,3-difluoropyrrolidin-1-yl)-4-methylpent-2-enoyl)pyrrolidin-3-yl)ureido)-2-phenylethyl)boronic acid;

((R)-1-(3-((R)-1-(2-cyano-4-(3,3 -difluoropyrrolidin-1-yl)-4-methylpent-2-enoyl)piperidin-3-yl)ureido)-2-phenylethyl)boronic acid; and ((R)-1-(3-((S)-1-(2-cyano-4-(3,3 -difluoropyrrolidin-1-yl)-4-methylpent-2-enoyl)piperidin-3-yl)ureido)-2-phenylethyl)boronic acid;

an individual E or Z isomer thereof; and/or a pharmaceutically acceptable salt of any of the foregoing compounds.

12. A pharmaceutical composition comprising at least one compound of claim 1, or a pharmaceutical acceptable salt thereof, and a pharmaceutically acceptable excipient.

13. The compound or a pharmaceutically acceptable salt thereof of claim 9, wherein $R^{8a}$ is cyano; and $R^{8b}$ is hydrogen.

14. The compound or a pharmaceutically acceptable salt thereof of claim 13, wherein $R^{8c}$ is an alkyl substituted with an optionally substituted heterocyclyl, wherein the heterocyclyl of $R^{8c}$ is optionally substituted with an alkyl.

15. The compound or a pharmaceutically acceptable salt thereof of claim 14, wherein $R^{8c}$ is

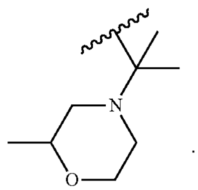 [SMILES: *C(C)(C)N1CCOC(C)C1]

16. The compound or a pharmaceutically acceptable salt thereof of claim 10, wherein $R^{b2}$ and $R^{b3}$ are each hydrogen.

17. The compound or a pharmaceutically acceptable salt thereof of claim 16, wherein said $R^{b1}$ is —$CH_2$-phenyl.

18. The compound or a pharmaceutically acceptable salt thereof of claim 5, wherein Q is —C(═O)—.

19. The compound or a pharmaceutically acceptable salt thereof of claim 7, wherein

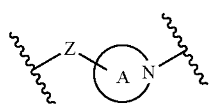

is

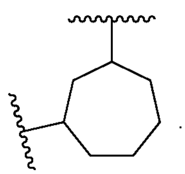 [SMILES: *C1CCCCC(*)C1]

20. The compound ((R)-1-(((((R)-1-(2-cyano-4-methyl-4-((R)-2-methylmorpholino)pent-2-enoyl)azepan-3-yl)oxy) carbonyl)amino)-2-phenylethyl)boronic acid, having the structure:

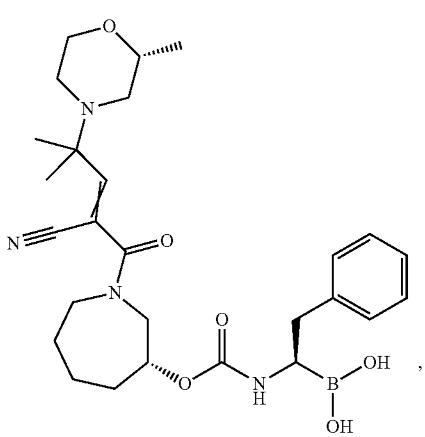 [SMILES: C[C@@H]1CN(C(C)(C)C=C(C#N)C(=O)N2CCCC[C@@H](OC(=O)N[C@@H](Cc3ccccc3)B(O)O)C2)CCO1]

or a pharmaceutically acceptable salt thereof.

21. A pharmaceutical composition comprising an effective amount of the compound of claim 20, or a pharmaceutical acceptable salt thereof, and a pharmaceutically acceptable excipient.

22. A pharmaceutical composition comprising an effective amount of the compound of claim 11, or a pharmaceutical acceptable salt thereof, and a pharmaceutically acceptable excipient.

23. The compound ((R)-1-((((7-(2-cyano-4-methyl-4-((S)-2-methylmorpholino)pent-2-enoyl) -7-azabicyclo [2.2.1]heptan-1-yl)methoxy)carbonyl)amino)-2-phenylethyl)boronic acid, having the structure:

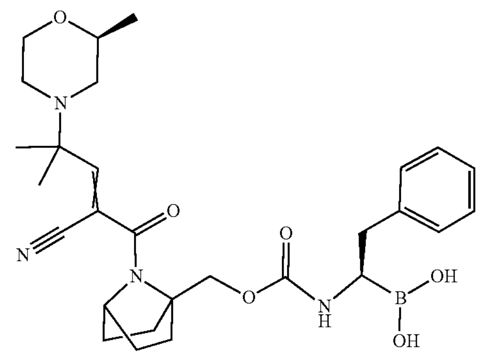

or a pharmaceutically acceptable salt thereof.

24. A pharmaceutical composition comprising an effective amount of the compound of claim 23, or a pharmaceutical acceptable salt thereof, and a pharmaceutically acceptable excipient.

25. The compound (R)-(1-((((7-(2-cyano-4-methyl-4-morpholinopent-2-enoyl)-7-azabicyclo [2.2.1]heptan-1-yl) methoxy)carbonyl)amino)-2-(4-fluorophenyl)ethyl)boronic acid, having the structure:

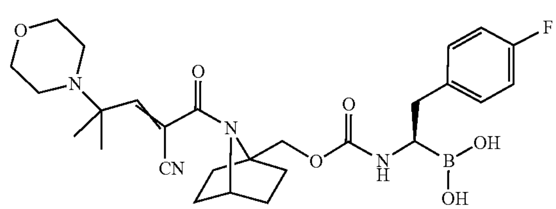 [SMILES: CC(C)(C=C(C#N)C(=O)N1C2CCC1(COC(=O)N[C@@H](Cc1ccc(F)cc1)B(O)O)CC2)N1CCOCC1]

or a pharmaceutically acceptable salt thereof.

26. A pharmaceutical composition comprising an effective amount of the compound of claim 25, or a pharmaceutical acceptable salt thereof, and a pharmaceutically acceptable excipient.

27. The compound ((R)-1-(((((R)-1-(2-cyano-4-methyl-4-morpholinopent-2-enoyl) azepan-3-yl)oxy)carbonyl) amino)-2-phenylethyl)boronic acid, having the structure:

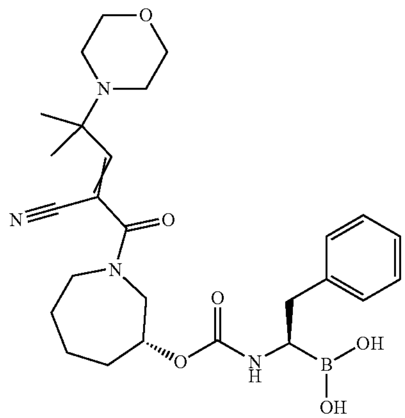 [SMILES: CC(C)(C=C(C#N)C(=O)N1CCCC[C@@H](OC(=O)N[C@@H](Cc2ccccc2)B(O)O)C1)N1CCOCC1]

or a pharmaceutically acceptable salt thereof.

28. A pharmaceutical composition comprising an effective amount of the compound of claim 27, or a pharmaceutical acceptable salt thereof, and a pharmaceutically acceptable excipient.

29. The compound ((R)-1-(((((R)-1-(2-cyano-4-((2S,6R)-2,6-dimethylmorpholino)-4-methylpent-2-enoyl)azepan-3-yl)oxy)carbonyl)amino)-2-phenylethyl)boronic acid, having the structure:

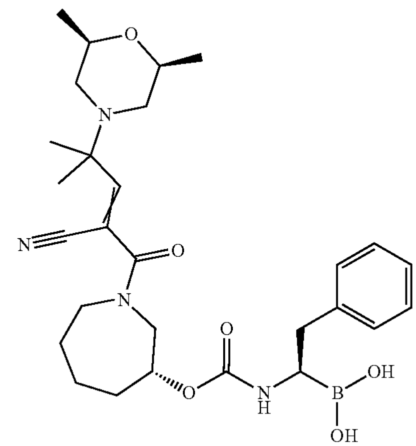 [SMILES: C[C@@H]1CN(C(C)(C)C=C(C#N)C(=O)N2CCCC[C@@H](OC(=O)N[C@@H](Cc3ccccc3)B(O)O)C2)C[C@H](C)O1]

or a pharmaceutically acceptable salt thereof.

30. A pharmaceutical composition comprising an effective amount of the compound of claim 29, or a pharmaceutical acceptable salt thereof, and a pharmaceutically acceptable excipient.

31. The compound ((R)-1-(((((3R,4R)-1-acryloyl-4-fluoropyrrolidin-3 -yl) oxy)carbonyl)amino)-2-(4-fluorophenyl) ethyl)boronic acid, having the structure:

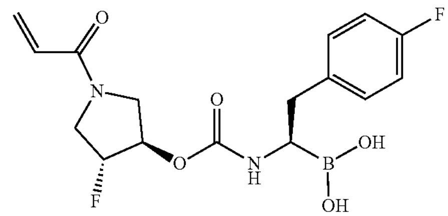 [SMILES: C=CC(=O)N1C[C@@H](F)[C@H](OC(=O)N[C@@H](Cc2ccc(F)cc2)B(O)O)C1]

or a pharmaceutically acceptable salt thereof.

32. A pharmaceutical composition comprising an effective amount of the compound of claim 31, or a pharmaceutical acceptable salt thereof, and a pharmaceutically acceptable excipient.

* * * * *